United States Patent [19]

Mellender et al.

[11] Patent Number: 4,989,132

[45] Date of Patent: Jan. 29, 1991

[54] OBJECT-ORIENTED, LOGIC, AND DATABASE PROGRAMMING TOOL WITH GARBAGE COLLECTION

[75] Inventors: Fredric H. Mellender, Rochester; Andrew G. Straw, Fairport; Stephen E. Riegel, Pittsford, all of N.Y.

[73] Assignee: Eastman Kodak Company, Rochester, N.Y.

[21] Appl. No.: 261,791

[22] Filed: Oct. 24, 1988

[51] Int. Cl.[5] .................................................. G06F 7/00

[52] U.S. Cl. ...................................... 364/200; 364/513

[58] Field of Search ................................ 364/513, 200

[56] References Cited

U.S. PATENT DOCUMENTS 3,622,762 11/1971 Dyer et al. .......................... 235/150
4,546,435 10/1985 Herbert et al. ...................... 364/300
4,570,217 2/1986 Allen et al. ......................... 364/188
4,622,545 11/1986 Atkinson ............................ 340/747
4,635,208 1/1987 Coleby et al. ....................... 364/491
4,736,320 4/1988 Bristol ................................ 364/300

OTHER PUBLICATIONS

Pundy et al, Integrating an Object Server with Other Worlds, ACM Transactions, Jan. 1987.

*Primary Examiner*—Allen R. MacDonald
*Attorney, Agent, or Firm*—Thomas H. Close

[57] ABSTRACT

A programming tool is provided which integrates an object-oriented programming language system, a logic programming language system, and a database in such a manner that logic terms can be treated as objects in the object-oriented programming language system, objects can be treated as logic terms in the logic programming language system, and logic terms and objects are stored in the database in a common data structure format. Automatic management of the database is provided which is transparent to the user.

33 Claims, 22 Drawing Sheets

| | | | |
|---|---|---|---|
| OLD "CURRENT REGION" | n | n+1 | n+2 |
| REGION OF CONTEXT TO WHICH WE RETURN | n | n | n |
| NEW "CURRENT REGION" | n | n+1 (n IS FULL) | n+1 (n IS FULL) |
| REGIONS COLLECTED | NONE (n NOT YET FULL) | NONE (n+1 NOT YET FULL) | REGIONS>= n+1 |

OBJECT-ORIENTED, LOGIC, AND DATABASE PROGRAMMING TOOL WITH GARBAGE COLLECTION

TECHNICAL FIELD OF THE INVENTION

The invention relates to a programming tool that allows application programming in both logic and object-oriented style, and which provides integrated database support.

BACKGROUND OF THE INVENTION

Object-oriented programming, logic programming, and database facilities have all been shown to have significant power in the writing of applications to run on a computer. No single programming tool has successfully integrated all three facilities in such a way as to eliminate an explicit interface between them. Normally, one must convert between object data to logic data to use the logic programming system, and then convert the logic data back again in order to use the object-oriented system. Furthermore, one must normally make explicit calls to a database manager in order to retrieve and store application data.

There have been some attempts to provide combined logic and object-oriented programming tools. For example, the Smalltalk/V (*Smalltalk Tutorial and Programming Handbook*, Digitalk, Inc., 1987) allows the user to invoke a logic programming tool (Prolog) from an object-oriented on (Smalltalk). However, the only kind of data (terms) that Prolog understands are strings, symbols, numbers, structures, and lists of any of the above. Furthermore, the Prolog structures are constrained to be a type of list from the object-oriented programming tool. Additionally, Smalltalk/V does not have database storage for the objects.

There have also been attempts to provide database support for object-oriented tools. For example, the Gemstone system, a product of Servio- Logic, Inc., while supporting a database server that can be programmed in Smalltalk, does not allow the application to be written in Smalltalk in such a way that the database server is transparent: i.e. the application must make speciific calls to the database server ('Integrating an Object Server with Other Worlds', by Alan Purdy et al, *ACM Transactions on Office Information*, Vol. 5, Number 1, Jan. 1987). Gemstone does not contain any logic programming tools.

Some so-called "expert system shells"(e.g., Nexpert Object from Neuron Data, Inc.) allow for objects, rules and database features to be combined, but these tools are for the construction of a certain class of application ("expert systems"), and do not provide a general-purpose programming tool.

It is the object of the present invention to solve the problem of providing a general purpose programming tool that smoothly integrates object-oriented and logic programming, and provides the user with database facilities that are transparent to the user.

SUMMARY OF THE INVENTION

The present invention solves the problem by providing a single programming tool (referred to herein as Alltalk) which allows the programmer to write applications in an object-oriented language (a dialect of Smalltalk, also referred to herein as Alltalk), a logic programming language, (which is an extension of Prolog, herein called ALF) or a combination of the object and logic programming languages which allows the logic programming language system to consider any object from the object-oriented programming language system as a term in the logic programming language, and which supplies database management on behalf of the programmer, without the need for any specific database management control statements to be supplied by the programmer.

The main components of the Alltalk tool include a work station having an operator interface, a mass memory, and a CPU. An object-oriented programming language system running on the work station includes an object-oriented programming language and an object-oriented language compiler for translating source code written in the object-oriented programming language into objects and interpreter code. Also running on the work station is a logic programming system including a logic programming language having components of terms, clauses, predicates, atoms, and logic variables, and a logic language compiler for translating source code written in the logic programming language into objects. A database residing in the mass memory stores objects and components of logic programs as objects in a common data structure format, applications data, and application stored as compiled interpreter code. The database is managed by an database manager that represents objects and components of the logic programming language in the common data structure format as objects and is responsive to calls for retrieving and storing objects in the database and for automatically deleting objects from the database when they have become obsolete. An interpreter executes the interpreter code and generates calls to the database manager. A logic subsystem solves logic queries and treats objects as components of a logic program.

According to a further aspect of the present invention, an improved database format is provided for an object-oriented programming language system. The database has a key file and a prime file. The prime file contains records of variable length for storing objects, and the key file contains records of fixed length for storing the address, record length, and type of object in the prime file. An improved database manager for managing this database includes an object manager employed by the compiler, interpreter, primitives and utilities for providing access to objects in the database, and for maintaining organization of objects in the database. An access manager is called by a buffer manager for retrieving objects from the database, a transaction manager for updating the database with new or changed objects at commit points, and for undoing changes to objects upon aborts, and the object manager for providing high level interface to the database. A buffer manager is called by the object manager for generating calls to the access manager, and by a pool manager for keeping an in-memory copy of objects. The pool manager maintains memory for buffers.

According to another aspect of the present invention, an improved garbage collector is provided for a heap based programming language system. The garbage collector employs the concept of regions for garbage collection. When a context (representing the state of a method which is executing in the system) is created, it is assigned a region number. When an object is created or accessed by a method, it is assigned the region number of the context of the method that created or accessed it, unless the object was previously assigned a lower number. When an object is returned from a called method to the calling method, the object is moved to the region of the calling method. When reference is made from a first object to a second object assigned to another reigon, the second object is moved to the region of the first object. When returning from a method, if the context to which it is returning belongs to a number at least two lower than the current region number before returning, the regions with the higher number than that of the context to which it is returning are collected (i.e.,.the objects in these regions are discarded).

According to a still further aspect of the present invention, the runtime performance of a Smalltalk programming language system is improved by implementing a technique called message flattening. The compiler flags any method which consists of a single return statement which returns either an instance variable, or the result of a primitive, for which the first argument is self, and the other arguments correspond to arguments to the method. The interpreter detects these flags at runtime and flattens any message that would normally invoke these methods, by replacing this message send in the first instance with an assign, and in the second instance with a primitive invocation.

DESCRIPTION OF THE INVENTION

A portion of the disclosure of this patent document contains material to which a claim of copyright protection is made. The copyright owner has no objection to the copying of the patent document or the patent disclosure, but reserves all other rights.

1. Introduction

Figure 1:
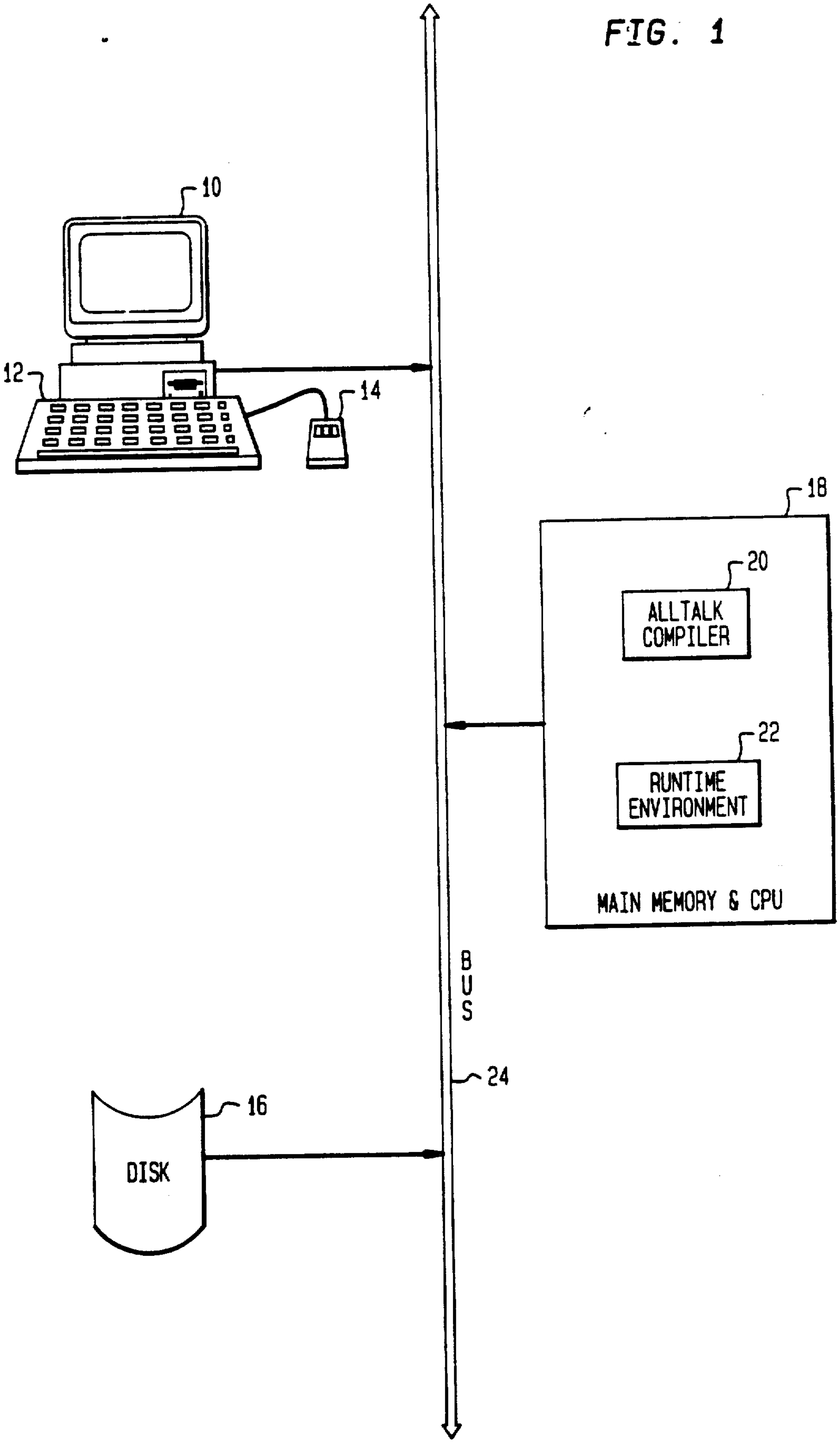
FIG. 1 is a schematic diagram showing an overview of the invention.

The Alltalk tool runs on workstation type hardware, such as a Sun 4/360 by Sun Microsystems, Inc., executing the UNIX operating system (UNIX is a trademark of AT&T). Referring to the Drawings, FIG. 1, the hardware includes an operator interface including a visual display (CRT) 10, a keyboard 12, and a pointing device 14, such as a 3 button mouse. The hardware also includes mass memory, such as a disk 16 on which the Alltalk database resides, as well as a CPU and main memory 18. The Alltalk software which is executed by the CPU and main memory 18 consists of an Alltalk compiler 20 for a dialect of the Smalltalk language (also called Alltalk) and an Alltalk runtime environment 22. The hardware components of the workstation are connected by a bus 24.

2. Overview

The Alltalk compiler 20 is a program for translating Alltalk language source statements into interpreter code. The compiler is generated by the YACC and LEX utilities in the UNIX operating system, and contains subroutines written in the C programming language.

Figure 2:
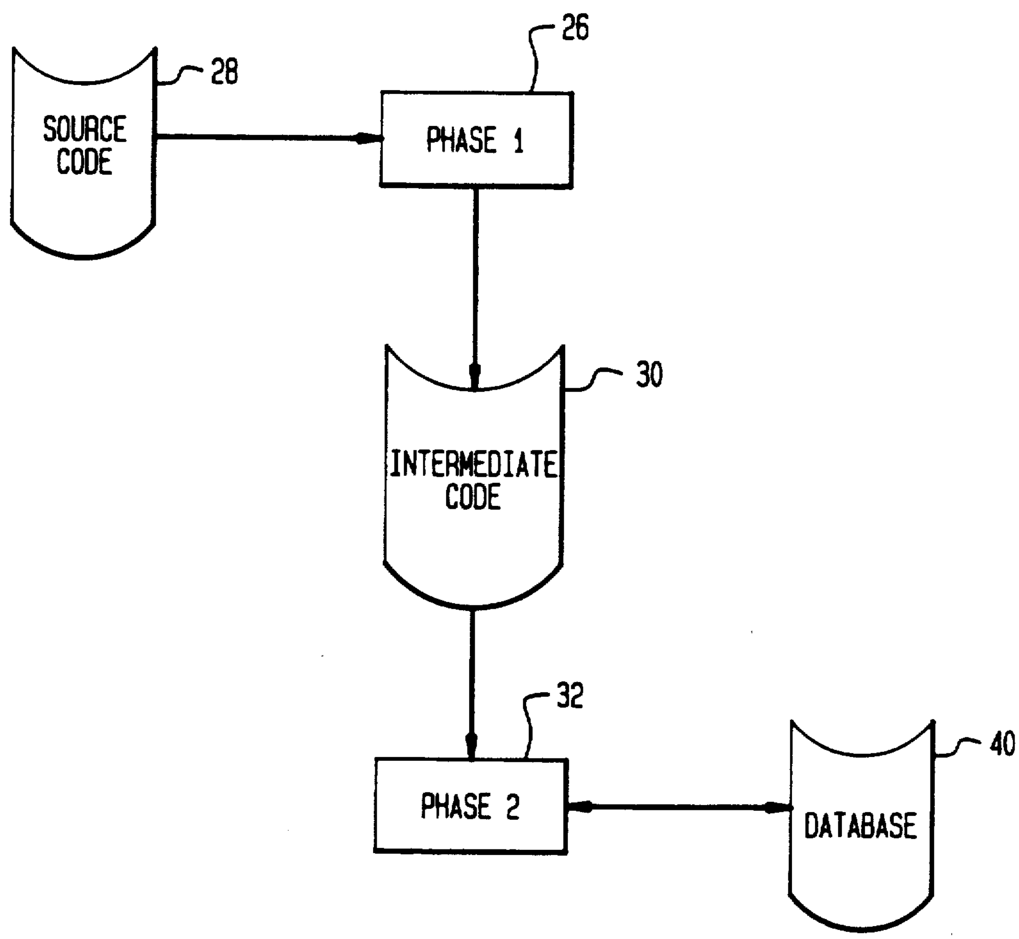
FIG. 2 is a schematic diagram of the compiler.

Referring to the Drawings, FIG. 2, the compiler operates in 2 phases: the first phase 26 parses the source code written in the Alltalk language 28 and constructs an intermediate code 30. The second phase 32 takes the intermediate code and generates class objects, constant objects, and method objects and places these in a database 40. These objects are subsequently retrieved by the runtime environment 22 (see FIG. 1).

Figure 3:
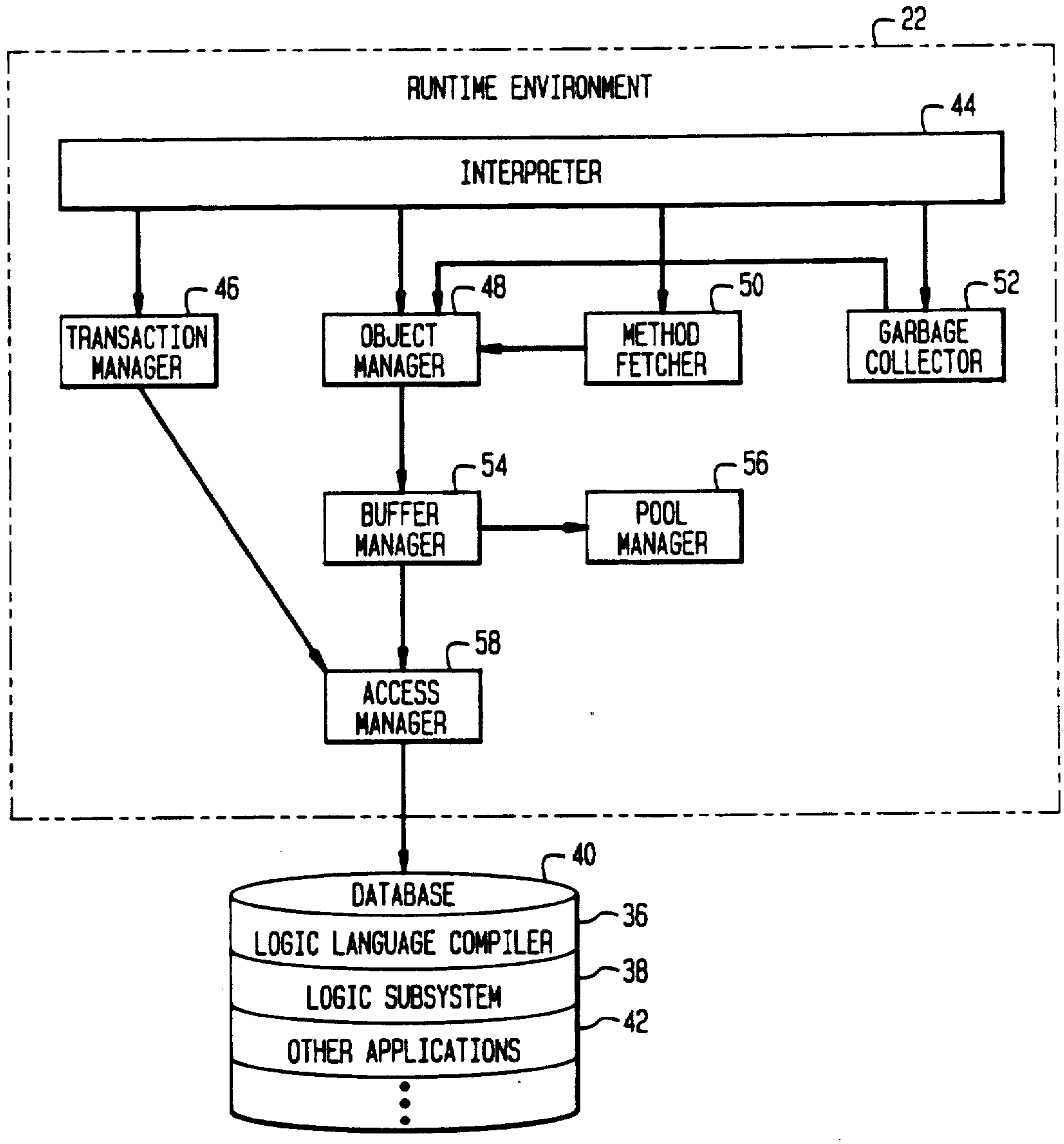
FIG. 3 is a schematic diagram of the runtime environment.

The runtime environment 22 is written in the C programming language, and in Alltalk. Referring to the Drawings, FIG. 3, the logic language compiler 36 and the logic subsystem 38 are both written in Alltalk. These are compiled through the previously mentioned Alltalk compiler 20, and the output placed in the database 40 and hence available to the runtime environment 22. Other applications 42 written in Alltalk are similarly available to the runtime environment after compilation. Application programs 42 (called methods) are processed by an interpreter 44, which calls other components of the runtime environment, which includes: a transaction manager 46 which can commit and abort transactions, an object manager 48 which is called to create and retrieve objects, a method fetcher 50 which determines the correct method to execute next, and a garbage collector 52 which detects and removes unneeded objects from main memory. The object manager 48 calls upon a buffer manager 54 to determine if a requested object is in memory or needs to be fetched from the database. If the object is to be retrieved from the database, a pool manager 56 is called to find space in an appropriate buffer, after which an access manager 58 is called. It is the access manager 58 that accesses the disk 16 containing the database 40.

3. Compiler

The Alltalk compiler 20 translates class descriptions written in a dialect of the Smalltalk language herein referred to as Alltalk into database objects for use by the Alltalk interpreter 44 during execution.

3.1. Synopsis

The Alltalk compiler 20 takes a file containing one or more complete Alltalk class descriptions, and for each class generates:

1. A class object, containing a dictionary of the methods in the class and specification of the instance and class variables,
2. Compiled methods, each consisting of "bytecodes", which drive the runtime interpreter, and 3. Objects representing constants encountered during compilation, (numeric values, strings, etc.)

which are placed in the database 40 for use by the interpreter 44 during execution.

The Alltalk compiler 20 consists of two phases. The first phase 26 (see FIG. 2) does the compilation work, (parse, optimization, and code generation), while the second phase 32 resolves global symbols and loads the results into the database. The two phases communicate via intermediate code 30 (written in an assembler-like intermediate language) which can be examined and altered by the user, if desired. The following is a description of the organization of the internals of the Alltalk compiler 20, including code generation strategies and optimization techniques.

3.2. Phase 1 (kcom)

3.2.1. Parsing

The first phase 26 of the Alltalk compiler 20 consists of two distinct processing stages:

1. Parse tree construction, and
2. Code generation, (including optimization).

The parsing phase is implemented in a fairly straightforward manner using the UNIX yacc/lex parser generator/lexical analyzer tools. The primary goal of the parsing stage is to create an internal parse tree representation of the class description and its methods which can be analyzed using a relatively simple set of mutually recursive tree-walking routines. In addition, the grammer of the input file is checked and errors are reported to the user.

The grammer specification of the object-oriented language is virtually identical to that specified in the syntax diagrams of the standard Smalltalk language reference, *Smalltalk*-80 *The Language and Its Implementation*, by Goldberg and Robson. The most notable variation in the Alltalk grammar is that of allowing a primitive invocation to be used as a primary expression and to have primary expressions as arguments, (this is adopted from *Little Smalltalk*, by Timothy Budd). This allows Alltalk primitives to be intermixed freely with the Alltalk language as if they were function calls which return a value, (which is essentially what the primitives really are), instead of as wholesale replacements for methods, as in standard Smalltalk.

Additional productions have been included to allow for reading an entire class description from a file, (in a form roughly similar to Smalltalk "fileIn/fileOut" format). These additional productions include "header" information such as superclass specification, instance/-class variable declarations, and instance/class method classification statements.

While it is possible to build the entire analysis and generation mechanisms directly into the action portions of the yacc productions, the conciseness of the analysis and generation stage would be lost in that it becomes difficult to piece together how the parser actions interact to accomplish that stage when the controlling function is the yacc parser. Clarity is enhanced by having the analysis and generation functions make explicit their own walking of the parsed information, since it may vary from that of the parser at various points in the compilation. For example, more complex/global optimization techniques, such as inter-statement optimizations, may need to determine their own scope of applicability across several statements worth of parsed information. Such techniques are harder to embody as a single understandable function when mixed with the simple actions of parsing.

The basic parse node is a simple binary node, (left and right child pointers), with placeholders for the node type constant, a source code line number, and a string pointer.

Parse nodes are created via a function called makenode(), which allocates storage storage for the node, inserts the current source line number, and sets the other elements as specified by the user. The storage allocated for these nodes, (as well as for the class and method structures and copies of strings), is not tracked in the Alltalk compiler 20 since the compiler is expected to be run only for the duration of the compilation of a file.

A sample parse tree for an Alltalk method is given in Table 3.1. Syntactical shorthand and default meanings, such as the return value of a method having no statements being "self", or a block having no statements being "nil", are fleshed out during the parse phase in order to limit the amount of special case logic in the analysis and generation phase.

TABLE 3.1

Parse Tree Example

Method Code

```
! SequenceableCollection methodsFor: 'enumerating'
do: aBlock
        | index length |
        index < - 0.
        length < - self size.
        [(index < - index + 1) < = length]
                whileTrue: [aBlock value: (self at: index)]
```

Parse Tree

| | | | | |
|---|---|---|---|---|
| statement | | statement | | |
| assign | | assign | | |
| "index" | | "length" | | |
| number | | unary_expr | | |
| "0" | | "size" | | |
| | | identifier | | |
| | | "self" | | |
| statement | | | | |
| keyword___expr | | keyword_arg | | |
| "whileTrue:" | | | | |
| block | | block | | |
| statement | | statement | | |
| binary_expr | | keyword_expr | keyword_arg | |
| "<=" | | "value:" | | |
| assign | identifier | identifier | keyword_expr | keyword_arg |
| "index" | "length" | "aBlock" | "at:" | |

TABLE 3.1 -continued

| Parse Tree Example | | | |
|---|---|---|---|
| binary_expr | | identifier | identifier |
| "+" | | "self" | "index" |
| identifier | number | | |
| "index" | "1" | | |

A successful parse generates a parse tree for the statements of each method in the class. These parse trees are anchored in a method structure for each method, which are all, in turn, linked to a single class structure. When the parsing of a class is complete, the class structure is handed to analysis and code generation routines.

3.2.2. Code Generation

The major components of this stage of the compiler are:

1. Symbol table (symbol.c)
2. Code generation (compile.c)
3. Code management (code.c)
4. Optimization (optimize.c)

Generally, the processing steps involved in this stage, (implemented by a function called compileClass()), proceed as follows:

1. The symbol table is initialized with the instance and class variables available via the superclass chain for the class. These symbols are retrieved from a symbol file in the local directory. It is considered a fatal error if the superclass cannot be found in the symbol file, (i.e., the superclass must be compiled first).
2. The instance and class variables for the class are added to the symbol table. Name clashes involving superclass variables are also considered fatal.
3. Each method is compiled. During method compilation, bytecodes are collected into segments corresponding to groups of statements in the method: one for the method itself, and one for each block within the method. When method compilation is complete, the method code segment is emitted first, followed by the segments for each block.
4. After the methods have been successfully compiled, a record of the class' instance and class variables are written to the symbol file in the local directory. This makes the class available for use as a superclass in subsequent compilations.

The method compilation step is the heart of the compilation task. Before describing this step in detail, a description of the compiler's view of symbolic references and the symbol table is given.

3.2.3. Symbols

Throughout the Alltalk compiler 20, references to named symbols in the program being compiled, as well as references to unnamed runtime storage are represented in a uniform manner. This uniform representation allows the code generation stage to freely create and pass references between the recursive routines which implement this stage without regard for their type until a leaf routine which needs detailed type information is executed. The conciseness of the code generation routines is greatly enhanced with this representation scheme.

There are nine reference types, as follows:

Named References
- Instance Variable
- Class Variable
- Method Parameter
- Formal Method Temporary
- Block Parameter
- Global Symbol ("true", "false", "nil", class name, etc.)

Unnamed References
- Constant ("10", "3.14", 'a string', #symbol, etc.)
- Compiler Temporary (used in evaluating intermediate expressions)
- Block Stub/Closure (reference to storage holding the runtime id of the closure)

The symbol table supports a subset of the named references, separating them into the three categories of: (1) class, (2) instance, and (3) temporary symbols. Temporary symbols encompass the method parameter, formal method temporary, and block parameter references. Global symbol references are never actually placed in the symbol table, but are materialized whenever the search for a name fails. These symbols are resolved by the second phase 32 of the Alltalk compiler 20, since the cross reference values for these names are actually present in the runtime system dictionary contained in the database 40.

The symbol table interface routines contain the usual routines for the addition of symbols, (addSymbol()), and name-based search for symbols, (findSymbol()). An initialization routine, (initSymbols()), purges the table and then uses the globally specified superclass name to populate the table with "ref" structures for the instance and class variable symbols available via the superclass chain, as recorded in the symbol file in the local directory. A routine for writing the instance and class variable symbols, (writeSymbols()), to the local symbol file for the globally specified class, (i.e., the one being compiled), is also provided. Finally, a pair of general routines, (markSymbols() and releaseSymbols()), are available for get/set of placeholders in the symbol table. These are primarily used to record the starting position of method and/or block temporary symbols, so that they can be removed at the end of the compilation of the method and/or block statements.

3.2.4. Method Compilation

In the runtime environment 22 (see FIG. 3), a method is executed with an associated "context" containing local storage organized as an array of temporary slots, analogous to a "stack frame" in a conventional language. This local storage is divided into the following five sections from the compiler's point of view:

1. The object id of the receiver, known as "self".
2. Method parameters.
3. Formal method temporaries, (named temporaries).
4. Compiler scratch area for intermediate expression evaluation.
5. Block stub/closure id storage for blocks in the method.

A general mechanism for tracking the use of the temporary slots is implemented in the compiler using a set of macro routines. This set includes routines for allocating a number of temporaries, (allocTemp()), which returns the starting slot for the requested count; freeing a number of temporaries, (freeTemp()); get/set of temporary usage information, (getTempUse() and setTempUse()); clearing usage information, (clearTempUse()); and requesting the high water mark for temporary usage, (maxTempUse()). Temporary usage is tracked with these routines for the first four kinds of temporaries listed above. Storage for block ids is tallied separately during method code generation since it is not known what the required number of compiler scratch temporaries will be until the method compilation has finished.

Before the method statements are examined, several initialization steps are performed:

1. The symbol table is populated with the entries for "self", "super", the parameters, and the formal temporaries. The slot index for each entry is determined by allocating a temporary as each symbol is added to the table.
2. A code segment is allocated for the method statements and made to be the "active" segment. During compilation, generated code is placed in the "active" code segment, which is switched when compilation of a new list of statements, (e.g., a block), is started or completed.
3. Label generation is reset, (used for branch targets and block entry points).
4. The block count is reset.

Also prior to commencing code generation, the parse tree of the method is examined to see if it can be tagged for "flattening" at runtime. "Method flattening" is a technique for determining whether a runtime message send can be avoided because the method is "trivial". A "trivial" method is one which contains a single statement returning either:

1. An instance variable, (can replace send with an assign), or
2. The result of a primitive for which first argument is self and the remaining arguments to the primitive invocation line up exactly with arguments to the method, (can replace send with primitive invocation).

At this point, compilation of the method statements is initiated by calling compileStatementList() with a pointer to the first statement parse node of the method. This routine invokes compileExpr() to compile the expression associated with each statement in the list. CompileStatementList() is used to compile lists of statements for blocks as well as methods, generating appropriate return bytecodes when explicit return statements are encountered and after the last statement in the method or block. CompileStatementList() distinguishes between method and block statement lists by the value of active code segment id, which is −1 for a method or >=0 for a block. Provision is also made for the case of "inline" block code generation, which is used in optimization of certain messages involving blocks, (such as messages to booleans), described later.

3.2.5. Expressions

Expression compilation is the center of most activity during the compilation of a method. CompileExpr() defines the compilation actions for all parse nodes other than statements in a concise manner. This routine is invoked with the node to be compiled and a destination specification for the result of compiling the expression indicated by the node in the form of a "ref" structure. The destination specification allows the calling routine to control placement of the expression's value, which is particularly useful for aligning values for message sends, minimizing unnecessary data movement at runtime. Simple expressions, such as identifiers and constants, are trivial compilations requiring only assignment of the value associated with the identifier or constant description to the specified destination. An explicit Alltalk assignment expression, (e.g., "a←b+c"), only requires compilation of the expression on the right of the "←", with the reference on the left as the destination, in addition to assigning this result into the specified destination for the assignment expression itself, (e.g., "d←(a←b+c)"), if indicated. The remaining expression types, (messages, cascades, primitive invocations and blocks), require somewhat more involved compilation steps, hence, these cases have been split into separate routines, (genSend(), genCascade(), genExecPrim(), and genBlock()). We now describe the compilation steps performed in each of these cases.

3.2.6. Messages and Cascades

The runtime implementation of the send message bytecode requires that the receiver and arguments be present in a contiguous set of the sending context's temporaries. The location for the return value of the message send is also required to be a temporary in the sending context, though it need not be adjacent to the receiver and arguments.

GenSend( ) ) complies with the first condition by allocating a contiguous set of temporaries, (via allocTemp( ) ), and compiling the receiver and argument expressions with each of these temporaries, (in order), as the specified destination. Hence, results of receiver and argument expressions are cleanly aligned with their use in containing message sends, eliminating unnecessary data re-positioning assignments. A simple optimization is also done at this point. If the receiver and argument temporaries already happen to line up,(detected by lineup( ) ), new temporaries are not allocated and the receiver and argument values need not be moved.

The second condition, (destination must be a temporary), is honored by examining the specified destination reference and allocating a temporary to hold the result of the message send if the destination is not already a temporary. This situation is remembered and code is generated for moving the result from the allocated temporary to the actual destination after the message send. This implementation style allows for the addition of variations of the send message bytecode for non-temporary destionations, if the need arises.

The previous comments also apply to cascaded message sends, (genCascade( ) ), except that the receiver expression is only evaluated once and the result placed in a temporary, to which the remaining messages in the cascade are sent, (genCascadeSend( ) ).

3.2.7. Primitive Invocations

As with message sends, Alltalk's primitive invocations require that arguments to the primitive be in a contiguous set of the invoking context's temporaries, and the destination for the result be a temporary in the invoking context. GenExecPrim( ) ) handles the non-temporary destination and argument alignment cases, (using lineup( ) ), in the same manner as is done for message sends. Each primitive argument is compiled, allowing arbitrary expressions to be used as arguments.

3.2.8. Blocks

Blocks are the most involved expression compilations in that they cause changes in the global state of the compiler. In Alltalk, a block is a list of statements which are to be executed with their own context when a "value" message is sent to it. The lexical aspects of a block allow it to refer to names available to the method in which the block is defined, as well as the names in any containing block. These names include the method's parameters and formal temporaries and any containing block's parameters. These semantics imply that a block is a static "object" of sorts which can potentially have muliple runtime activations, with each activation dynamically establishing variable name ⟷ storage bindings. Hence, from the compiler's point of view, a block is a separate list of statements to be compiled and "set-up" as an object, which may also include cross-context runtime references to be represented.

GenBlock( ) ) alters the global state of the compiler to create the proper compilation conditions to meet the needs described above. The block being compiled is given a unique id within the method, and a new code segment is allocated and marked with this id and connected to the list of code segments generated for the method so far. The currently active code segment is saved, along with its temporary usage, (since the block will have its own context), and the new segment is made the active segment, (generated code is always placed in the active segment). The previous code segment and its temporary usage are restored when compilation of the block is completed. The symbol table is marked so that the block's symbols, (block parameter names), can be released at the end of the block's compilation, and the block's symbols are added to symbol table for proper scoping. Finally, a label is generated to mark the start of the block's code in the method.

At this point, the state of the compiler has been properly altered, and compilation of the statements in the block is initiated via compileStatementList( ) ).

Once the block has been compiled, all the information needed to describe the block's activation characteristics at runtime, (temporary usage and entry point), has been established. This information is supplied to the runtime interpreter 44 via the set up block bytecode. This bytecode causes the interpreter to copy this information and associate it with a unique runtime id, known as a block stub id. A block stub id can be manipulated much the same way as any other object id. In the case of returning a block stub, or assigning a block stub to an instance variable, Alltalk establishes an object for the block stub. The information associated with the block stub id is used to establish a context for executing the statements of the associated block whenever the "value" message is sent to this id, (i.e., the evaluate block bytecode is executed for the id). Note that this requires that a block must be "set up" before it can be "evaluated" at runtime.

Alltalk choses placement of the set up bytecode for a specific block so that the bytecode is not executed an uncontrolled number of times. This is because the set up block implementation in the interpreter does not check for multiple "set ups" performed for the same block.

The solution to the placement problem is to group the set up block bytecodes for any "top level" block, (i.e., any block encountered while generating code for the method statements), and its contained blocks, and place them in the method code segment ahead of the first use of the "top level" block. This technique avoids executing set ups for any block(s) which are not in the specific control flow path at runtime. GenBlock( ) ) implements this strategy by setting a pointer to a position in the method segment code at which the set up block bytecodes are to be "spliced" when a "top level" block is entered.

3.2.9. Message Optimizations

Except for aiding the runtime environment for "method flattening", the rest of the compiler optimizations involve recognition of specific message selectors in the source code, (optimize.c). The optimization strategy for these selectors is to generate inline code to implement the specific semantics of the selector, (assuming a specific receiver class), in order to avoid sending the actual message at runtime. These optimizations are detected by the genOptiSend( ) ) routine which is invoked from compileExpr( ) ) when a message expression is compiled. If genOptiSend ( ) ) can handle the message, the normal compilation via genSend( ) ) is avoided by compileExpr( ) ). The message selectors/-receiver class combinations which are currently optimized are listed in Table 3.2.

TABLE 3.2

| Optimized Messages | |
|---|---|
| Class | Selector |
| Object | perform: |
| | perform:with: |
| | perform:with:with: |
| | perform:with:with:with: |
| Integer | + |
| | − |
| | = |
| Block | value |
| | value: |
| | value:value: |
| | value:value:value: |
| | value:value:value:value: |
| | value:value:value:value:value: |
| | whileTrue: |
| | whileFalse: |
| | whileTrue |
| | whileFalse |
| True/False | ifTrue: |
| | ifFalse: |
| | ifTrue:ifFalse: |
| | ifFalse:ifTrue: |
| | and: |
| | or: |
| | not |
| | & |
| | \| |
| Object/ UndefinedObject | isNil |
| | notNil |

The complexity of these optimizations vary from simply generating special bytecodes, (e.g., Integer messages), to inline block code generation with conditional branch bytecodes for implementing looping constructs, (e.g., Block "while" messages).

Due to the straightforward expression of these optimizations, they are not treated in detail here However, one of the more complex optimizations, (optWhile( ) ), will be described to highlight and convey an understanding of some of the issues and supporting procedure structure involved in these optimizations.

OptWhile( ) ) handles optimization of the various "while" messages which can be sent to blocks, (whileTrue:, whileFalse:, whileTrue, and whileFalse). This routine demonstrates the need to deal with:

1. Evaluation of literal or non-literal block objects in receiver and/or argument positions,
2. Proper placement of set up block bytecodes to avoid repeated set up of the same block(s), (described previously in the section on block expression compilation), and
3. Generation of additional code to implement the semantics of the message, (looping, in this case).

Since the semantics of the "while" messages clearly involves sequenced evaluation of receiver and argument blocks, it is possible, if either block is literal, to treat the statements of that block as if they were in the statement list of the method or block containing the "while" message. This causes code to be generated directly into the currently active code segment, ("in-line"), resulting in evaluation of that block in the current context at runtime, instead of setting up a separate context for evaluation of the block code. If either block is not a literal, (e.g., passed in as a parameter), that block must be evaluated in a separate context, (performed by the "evalb" bytecode).

This situation of block code generation strategy arises in the optimization of many other of the messages listed in Table 3.2. OptBlock( ) ) determines the code generation strategy based on the type of the parse node representing the block in the parse tree. If the node represents a literal block in the source code, the statement list for the block is compiled into the active code segment using compileStatementList( ) ). Otherwise, a "value" unary message expression, with the node representing the block as the receiver, is constructed and compiled under the explicit assumption that the receiver will be a block, (genEvalBlock( ) ). Note that this assumption is not made, (and a different bytecode is generated), when the "value" message is encountered in the original source code, since the actural receiver may not be a block at runtime, in this case.

Literal blocks which are part of the "while" message may be "top level" blocks, (i.e., outermost block of a nesting within a method). Beacuse of this, optWhile( ) ) must set the "splice point" in the method segment code for set up block bytecodes for any blocks contained in the "while" blocks, such that these bytecodes are placed outside the looping portion of the "while" code. This avoids the multiple "set up" problem for a block discussed in the previous section on block compilation.

With the background of the preceding discussion, the implementation of the optimization of "while" messages is summarized in the following steps:

1. If the "while" message is encountered in the method statement list, set a marker to the current position in the code as the "splice point" for set up block bytecodes for blocks which are encountered during compilation of the "while" message.
2. Generate a label to mark the start of the condition block, (i.e., the receiver of the "while" message).
3. Compile the condition block, (using optBlock( ) ), with an allocated temporary as the destination for its evaluation result.
4. Generate a conditional branch to the end of the "while" message code, (step 7), based on the result of evaluating the condition block and the specific message being compiled.
5. Compile the body block, (using optBlock( ) ), with no destination for its evaluation result.
6. Place an unconditional branch back to the label generated in step 2 to close the loop.
7. Generate code to assign "nil" to the destination specified for the value of the "while" message expression, (the destination may be "none"). This is the defined value for a "while" message expression.
8. Free the temporary allocated for the result of the condition block in step 3.

An example of the code generated for "while" message expressions with different combinations of literal and non-literal condition and body blocks is shown in Table 3.3.

TABLE 3.3

"While" Message Code Generation

| Source Statement | Generated Code | | |
|---|---|---|---|
| [x < y]whileTrue: | L1 | | |

TABLE 3.3-continued

"While" Message Code Generation

| Source Statement | Generated Code | | |
|---|---|---|---|
| [x < − x + 1]. | | | |
| | | send | t1[x],0,t5,2,# < |
| | | jne | L2,t5,'true |
| | | mov | t6,t1[x] |
| | | mov | t7,1 |
| | | send | t6,0,t1[x],2,# + |
| | | jmp | L1 |
| | L2 | | |
| b1 whileTrue: [x < − x + 1]. | L5 | | |
| | | evalb | t3[b1],t5,1 |
| | | jne | L6,t5,'true |
| | | mov | t6,t1[x] |
| | | mov | t7,1 |
| | | send | t6,0,t1[x],2,# + |
| | | jmp | L5 |
| | L6 | | |
| [x < y] whileTrue: b2. | L9 | | |
| | | send | t1[x],0,t5,2,# < |
| | | jne | L10,t5,'true |
| | | evalb | t4[b2],t6,1 |
| | | jmp | L9 |
| | L10 | | |
| b1 whileTrue: b2. | L13 | | |
| | | evalb | t3[b1],t5,1 |
| | | jne | L14,t5,'true |
| | | evalb | t4[b2],t6,1 |
| | | jmp | L13 |
| | L14 | | |

The intermediate language is discussed further in the next section.

3.3 . Phase 2 (kasm)

As noted in the synopsis, the second phase 32 of the Alltalk compiler 20 concerns itself with resolving symbols, and creating and loading the classes and methods into the database.

3.3.1. Intermediate Language

The intermediate language expected as input for this phase consists of tokens representing bytecodes, along with directives for establishing the class, delimiting methods, and tracking the Alltalk source file name and line numbers. A summary of these tokens and directives are listed in Tables 3.4 and 3.5, respectively.

TABLE 3.4

Intermediate Language Bytecode Tokens

| | |
|---|---|
| Message Send/Return | |
| send | send message |
| sendp | send parameterized message, ("perform") |
| mret | return from method, (" " in source code) |
| Integer Arithmetic Optimizations | |
| seq | send "=" message |
| sadd | send "+" message |
| sadd1 | send "+ 1" message |
| ssub | send "−" message |
| ssub1 | send "− 1" message |
| Block Set-Up/Evaluation/Return | |
| setb | set up block stub/closure |
| evalb | evaluate block (receiver must be a block) |
| evalbo | evaluate block (receiver might not be a block) |
| bret | return from block |
| Data Movement | |
| mov | src/dest specified by "effective addresses" |
| Primitive Invocation | |
| prim | execute specified primitive |
| Control Flow | |
| jeq | jump on target equal to constant |
| jne | jump on target not equal to constant |
| jmp | unconditional jump |

TABLE 3.5

| Intermediate Language Directives | |
|---|---|
| Class Information | |
| .class | start specified class |
| .supervar | number of inherited superclass variables |
| .ivar | instance variable names defined in this class |
| .cvar | class variable names defined in this class |
| Method Information | |
| .imethod | start instance method |
| .cmethod | start class method |
| .mparam | method parameter names |
| .mtemp | method temporary names |
| .mprim | "flattenable" primitive-only method |
| .mattr | "flattenable" attribute-return method |
| .mend | end method |
| Source File Tracking | |
| .file | source code file name |
| .line | source code line number |

In addition to the basic elements of the language, symbolic labels of the form "L<number>" are also available for use in the code, (for jeq, jne, jmp, and setb bytecodes), with target labels being required to start at the beginning of a line which contains no other tokens. Comments are allowed on any line, and are defined to be anything contained between a semicolon, (";"), and the end of the line. An example of this intermediate language for a method of a class call Foo, is shown in Table 3.6, which was constructed in order to demonstrate the variety of code and reference type representations generated by phase 1.

TABLE 3.6

Intermediate Code Examples

Method

```
Class Foo :Object
      | instvar Classvar |
[
|
do: aBlock
      | a b |
      instvar < - Classvar.
      instvar associationsDo:
            [:assoc | assoc value timesRepeat:
            [aBlock value: assoc key]].
      a < - 'hi andy'.
      b < - #(2 ( foo 'hi' $a ) 'fred').
]
```

Intermediate Language

```
.file Foo.st
.class Foo Object
.supervar 0
```

TABLE 3.6-continued

Intermediate Code Examples

```
.ivar instvar
.cvar Classvar
.imethod do:
.mparam aBlock
.mtemp a b
L0
      mov     i0[instvr],'Foo@i1[Classvar]
      mov     t5,i0[instvar]
      setb    b0,L1,5
      setb    b1,L2,5
      mov     t6,b0
      send    t5,0,t4,2,#associationsDo:
      mov     t2[a],'hi andy'
      mov     t3[b],( 2 ( #foo 'hi' $a ) 'fred')
      mret    t0[self]
L1
      evalbo  t1[assoc],t3,1
      send    t1[assoc],0,t3,1,#value
      mov     t4,b1
      send    t3,0,t2,2,#timesRepeat:
      bret    t2
L2
      mov     t2,mt1[aBlock]
      mov     t4,b0@t1[assoc]
      send    t4,0,t3,1,#key
      evalbo  t2,t1,2
      send    t2,0,t1,2,#value:
      bret    t1
.mend 7 2
```

3.3.2. Effective Addresses

References to various types of runtime variables and constants are represented in specific symbolic forms in the intermediate language which we call "effective addresses". These forms appear in the argument fields of many of the bytecode tokens, although not all forms are valid in specific argument positions of specific bytecodes. These effective address forms are summarized in Table 3.7, and the reader is again referred to the code in Table 3.6 for examples.

TABLE 3.7

Effective Address Forms

| Form | Example | Runtime Type | Description |
|---|---|---|---|
| <num> | 10.2 | 1 | Numeric constant. |
| $<char> | $a | 1 | Character constant. |
| '<chars>' | 'hello' | 1 | String constant. |
| #<chars> | #size | 1 | Symbol constant, (object id of symbol). |
| '<name> | 'Bag | 1 | Global symbol cross reference constant, (object id associated with symbol name). |
| #(<consts>) | #(1 'hi') | 1 | Array constant, (can be nested). |
| t<num> | t5 | 5 | Current context temporary. |
| mt<num> | mt2 | 2 | Owning method context temporary, (only found in block code). |
| b<num> | b1 | 2 | Block stub id as slot in owning method context temporary. |
| i<num> | i0 | 3 | Instance variable slot. |
| '<name>@i<num> | 'Bag@i2 | 4 | Class variable. Combination of cross reference constant, (the class name), and slot. |
| b<num>@t<num> | b1@t3 | 6 | Block parameter reference. Generated only when a block refers to a containing block's parameters. |

In the particular case of the "mov" bytecode, phase 2 translates both the source and destination effective address forms into one of six specific runtime reference types.

3.3.3. Operational Description

Phase 2 maintains a global state around the current class and method being "assembled", resulting in method-at-a-time assembly and placement into the database. Ths class object is not given to the object manager until all methods described in the input file have been successfully translated and passed to the object manager. This insures that the old version of the class, (hence, its methods), is not replaced unless assembly of the new version is successful.

In contrast to phase 1, this phase is very "flat", that is, it contains no recursive functions to walk parse trees, since each input statement is essentially a self-contained description. All the implementing functions, (assemble.c), are despatched directly from the parser on a per statement, (or group of statements), basis, resulting in a very simple control flow.

Assembly of a method essentially consists of collecting the bytecodes described by the bytecode statements into a scratch area, (MethodBytes), and recording labels, references to labels, and block references in these statements for resolution when the end of the method is reached. Each bytecode statement has a corresponding translation routine, (assemble.c), which builds the runtime representation of the bytecode in the scratch area.

When the end of the method is reached, (endMethod( ) ), all label and block references are resolved and the object manager is called upon to allocate space for the compiled method object. In this area, the instance variable slots for the method object are initialized, (noTemps, noParms, classOop, selectorSymbol, . . . , etc.), and the bytecodes are copied in from the scratch area. A dictionary entry relating the method selector symbol id of the method to the id of the compiled method object is also created and added to entries already established for other methods, (in the Methods global array). These dictionary entries are stored in the class object when the end of the class is reached, (i.e., when a new '.class' directive or end-of-file is encountered).

When the end of the class is reached, (endClass( ) ), space is obtained from the object manager under the same object id as the previous version of the class, to cause replacement of that class. The class is then built in this area by filling in control information, including the object id of the first instance of the class obtained from previous version, the object id of the class name symbol, the id of the superclass and the size of the method dictionary for the class. The method dictionary entries are then closed-hashed, (by method selector symbol id), into a dictionary area in the class object. The class object is then flushed to the database, signaling completion of the assembly of the class, ending phase 2.

4. Interpreter

The interpreter 44 (see FIG. 3) is that portion of the Alltalk runtime environment 22 which the user invokes to run Alltalk applications. The interpreter 44 decodes the object code generated by the compiler 20 (FIG. 2), and executes it, calling upon many of the other services of the runtime environment 22. The interpreter 44 also includes a debugger, described below, which allows the programmer to inspect the running program in a variety of ways.

4.1. Synopsis

The previously described Alltalk compiler 20 for the Alltalk dialect of the Smalltalk language translates Alltalk source code into an intermediate representation, called bytecodes, and stores this representation in the database 40. Each bytecode represents an instruction for the interpreter 44, and consists of an operation code (a = bit integer) and a variable number of parameters. Applications are executed using the Alltalk interpreter 44. The Alltalk interpreter 44 uses the object manager 48 as the interface to the database 40. It also calls on the transaction manager 46 and the garbage collector 52. In addition, it invokes primitives which interface to the UNIX operating system to do things like operating on primitive data types (integer addition, floating point multiplication, string concatenation, etc.), performing file I/O, managing the display, and controlling keyboard and mouse input.

The object manager 48, transaction manager 46, garbage collector 52, and primitives are described in later sections in more detail.

The main functions in the interpreter 44 that are discussed in this section can be grouped into the following main categories:

(1) bytecode loop;
(2) bytecode handlers;
(3) context management;
(4) process management;
(5) initialization and shutdown; and
(6) the debugger.

4.2. Bytecode Loop

The state of the Alltalk interpreter 44 is captured, essentially, in a global array called Processes. Each element of this array represents one Smalltalk process. At interpreter initialization, one process is created. The user's application can create new processes, switch processes, and destroy processes as needed. Associated with each process is a stack of contexts, and a pointer to one which is the currently-executing context of that process. A context is created when a message is sent or a block is evaluated, and is destroyed when the corresponding message/block returns. Associated with each context is a set of bytecodes for the corresponding method/block, and a pointer to one which is the currently-executing bytecode of that econtext. The bytecodes are the object code to which the user's application was compiled. Each context also has an array of temporaries which are used to hold intermediate results of the execution of the associated method/block.

At any given time, only one of the Processes is running; it is the current process. The current context of that process is, then, the current context. The current bytecode of that context is the current bytecode.

The basic operation of the Alltalk interpreter 44 is a bytecode decode/dispatch loop. Code exists in the interpreter for handling each type of bytecode generated by the compiler. The interpreter decodes a bytecode to determine its type, then invokes the appropriate code for that bytecode type. We call the piece of code for a particular bytecode type a bytecode handler. Each bytecode handler increments the bytecode pointer so that after the handler completes, the interpreter main loop can decode and dispatch the next bytecode. Bytecode handlers can manipulate the bytecode pointer and other interpreter data structures in ways to affect program flow.

The routine exec_bcodes( ) contains the bytecode loop. It decodes the bytecodes and invokes the appropriate bytecode handler. Before doing so, however, it checks to see if it should switch processes, i.e., it checks whether a different Smalltalk process should become the currently-active process. See the section below on Process Management for details on how process switches are handled and new processes are created.

4.3.Bytecode Handlers

There is one bytecode handler in the Alltalk interpreter 44 for each type of bytecode generated by the Alltalk compiler 20. Each handler is one (or more) case(s) in a C-language switch statement. The switch statement is part of exec_bcodes( ) in the file exec_b- codes.c. Each case of the switch is in a separate file to make source code maintenance easier. At compile time, these files are included in exec_bcodes.c via #include's. This strategy was chosen over making the bytecode handlers each separate procedures because it cuts down on call overhead in the bytecode loop. It also allows the use of machine registers for certain control variables, since the handlers are all within a single C language function. Note that thousands of bytecodes are executed each second; overhead for that many calls would be very large.

A complete description of the bytecodes and their parameters is included in Table 4.1.

---

Copyright 1988 Eastman Kodak Company. All rights reserved.

Note:

1. In the following, "current context" means the context (block or method) that is currently executing. "current METHOD context" means the home context of the current context. If the current context is a method context, "current METHOD context" and "current context" are the same; if the current context is a block context, "current METHOD context" is the block' home (i.e. defining) context.

2. 'Self' always refers to the id of the object that caused the home method to execute. 'Self' inside a block does not refer to the block, but to the object that is the recipient of the message in process.

```
/*************************************************************************

    0x'0nn'    "execute primitive number 'nn'"

    (Note that 'nn' is between 0 and decimal 255)

*************************************************************************/
    bytecode          bcode

        Number (identifier) of the primitive to be executed.


    num_args          unsigned short

        Number of arguments for this primitive; includes the receiver
        which is always the first 'argument' for our purposes.


    arg_start_slot          unsigned short

        Index into array of temporaries of current context. This
        marks the start of the argument list which continues for
        num_args. Receiver is at this slot, followed by the rest
        of the arguments.


    put_answ_slot          unsigned short

        Index into array of temporaries of current context. This
        is where the interpreter should place the value returned by
        the primitive.
*****************************************************************

    0x'100'    "send message"

*****************************************************************
    bytecode          bcode

        The bytecode type, i.e., 0x100.

    hashed_selector          long

        Hashed version of method name. This will be the oop of the
        symbol which represents the method name. This identifies
        an entry in a class method dictionary.
```

likely_class oop

Class of receiver at the time this bytecode was last executed. Set to the negative of the class when the message was a "class message" rather than an "instance message". Used for optimizations.

likely_meth_or_islot oop

If this "send" can be replaced by an "assign54", this field holds the slot number of the instance variable of the receiver to be returned as the answer to this message. If not, this field will hold the oop of the method executed when this bytecode was last executed. Used for optimizations. ~~Used for optimizations.~~ super_flag oop

Flag which indicates where to start search for method. If search should start in receiver's class, super_flag=0; a non-zero super_flag is an oop which identifies the superclass which should be the start of the search.

linenum unsigned short

Line number of Smalltalk source file at which this message send was encountered by the compiler. Used for debugging purposes.

likely_prim_or_bcode bcode

If this send can be replaced by a primitive call, this slot contains the number of that primitive. If this send can be replaced by an assign54, this field contains 0x154. Otherwise, this field contains -1.

num_args unsigned short

Number of arguments for this message; includes the receiver which is always the first 'argument' for our purposes.

arg_start_slot unsigned short

Index into array of temporaries of current context. This marks the start of the argument list which continues for num_args. Receiver is at this slot, followed by the rest of the arguments.

put_answ_slot unsigned short

Index into array of temporaries of current context. This is where the interpreter should place the value returned by the message.

/*********************************************************************

0x'101' "long return"

*********************************************************************/ bytecode bcode

The bytecode type, i.e., 0x101.

msg_ret_slot unsigned short

Index into array of temporaries of current context. This is where the interpreter can find the value to be returned by the context that is executing. The context returns this value to the context which invoked its home method; if current context is a method, its home context is itself, and the return is just to the sending context. If current context is a block, a long return is the same as a return from the block's home context.

```
/**********************************************************************

     0x'104'    "short return"

**********************************************************************/
```

bytecode bcode

The bytecode type, i.e., 0x104.

msg_ret_slot unsigned short

Index into array of temporaries of current context. This is where the interpreter can find the value to be returned by the context that is executing. The context returns this value to its sender; the current context is a block; the sending context can be a block or method.

```
/**********************************************************************

     0x'105'    "unconditional branch"

**********************************************************************/
```

bytecode bcode

The bytecode type, i.e., 0x105.

offset short

Number of bytes to increment the bytecode instruction pointer beyond the current bytecode. May be negative, i.e., can branch backward.

```
/**********************************************************************

     0x'106'    "set up block context"

**********************************************************************/
```

bytecode bcode

The bytecode type, i.e., 0x106.

bytecode_offset short

Start of the block bytecodes relative (in bytes) to the current bytecode pointer. Note that the block bytecodes are not a separate object, but rather are contained within the bytecodes of its home (i.e., defining) method.

blk_cntx_as_slot short

Index into array of temporaries of current METHOD context. This is where the interpreter should put the context id of the context it is about to set up. Even though a block might be executing, the id of the new block context goes in the home method's set of temporaries.

num_temps short

Number of temporaries used by context to be set up.

```
/**************************************************************************

    0x'107'    "branch on equal"

**************************************************************************/
```

bytecode bcode

The bytecode type, i.e., 0x107.

slot unsigned short

Slot in the temporaries of the current context. The value in this slot is compared to 'actual'; if equal, the branch is done; otherwise, the bytecode immediately following this one is executed.

offset short

Number of bytes to increment the bytecode instruction pointer beyond the current bytecode if the comparison shows that the values represented by 'slot' and 'value' are the same.

actual oop

An oop. This value is compared to the value indicated by 'slot'; if equal, the branch is done; otherwise, the bytecode immediately following this one is executed.

```
/**************************************************************************

    0x'108'    "branch on not equal"

**************************************************************************/
```

bytecode bcode

The bytecode type, i.e., 0x108.

slot unsigned short

Slot in the temporaries of the current context. The value in this slot is compared to 'actual'; if not equal, the branch is done; otherwise, the bytecode immediately following this one is executed.

offset short

Number of bytes to increment the bytecode instruction pointer beyond the current bytecode if the comparison shows that the values represented by 'slot' and 'value' are different.

actual oop

An oop. This value is compared to the value indicated by 'slot'; if not equal, the branch is done; otherwise, the bytecode immediately following this one is executed.

```
**************************************************************************

    0x'109'    and 0x'10A' "evaluate a block"
```

******************************************************************* bytecode bcode

The bytecode type, i.e., 0x109 or 0x10A.

rcvr_as_slot short

Index into array of temporaries of current context. The id of the block context to be evaluated is stored here.

num_args unsigned short

Number of parameters for this block; includes the block itself which is always the first 'argument' for our purposes.

arg_start_slot unsigned short

Index into array of temporaries of current context. This marks the start of the parameter list which continues for num_args. The block id is at this slot, followed by its paramcters.

put_answ_slot unsigned short

Index into array of temporaries of current context. This is where the interpreter should place the value returned by the block execution.

*******************************************************************

0x'10B' "send parameterized message (do a 'perform')"

******************************************************************* bytecode bcode

The bytecode type, i.e., 0x10B.

super_flag oop

Flag which indicates where to start search for method. If search should start in receiver's class, super_flag=0; a non-zero super_flag is an oop which identifies the superclass which should be the start of the search.

selector_slot unsigned short

Index into temporaries of current context. In that slot is the oop of the selector to be used for this message.

num_args unsigned short

Number of arguments for this message; includes the receiver which is always the first 'argument' for our purposes.

arg_start_slot unsigned short

Index into array of temporaries of current context. This marks the start of the argument list which continues for num_args. Receiver is at this slot, followed by the rest of the arguments.

put_answ_slot unsigned short

Index into array of temporaries of current context. This is where the interpreter should place the value returned by the message.

linenum unsigned short

Line number of Smalltalk source file at which this message send was encountered by the compiler. Used for debugging purposes.

likely_class oop

Class of receiver at the time this bytecode was last executed. Set to the negative of the class when the message was a "class message" rather than an "instance message". Used for optimizations.

likely_method oop

The oop of the method executed when this bytecode was last executed. Used for optimizations.

likely_selector oop

Selector cache. Used for optimizations.

/**********************************************************************

0x'1nm' "assign type 'n' variable from type 'm' variable"

**********************************************************************/

( Number and type of arguments depends on what type of variable 'n' and 'm' are.  SEE BELOW **)

**********************************************************************

0x'1n1' "assign from a type 1 variable"

oop oop

Interpreter will simply use this OOP as the source of the assignment statement.

**********************************************************************

0x'1n2' "assign from a type 2 variable"

methTempSlot unsigned short

Index into array of temporaries of current METHOD context. This is where the interpreter can find the OOP which is the source of the assignment statement. We may be in a block, but the reference is to the home method's set of temporaries.

*************************************************************************

0x'1n3' "assign from a type 3 variable"

objSlot unsigned short

Index into array of instance variables of the receiver. This is where the interpreter can find the OOP which is the source of the assignment statement.

*************************************************************************

0x'1n4' "assign from a type 4 variable"

obj oop

OOP of an object in which source of assignment statement can be found.

objSlot unsigned short

Index into the instance variables of the object identified by 'obj'. This is where the interpreter can find the OOP which is the source of the assignment statement.

*************************************************************************

0x'1n5' "assign from a type 5 variable"

blkTempSlot unsigned short

Index into array of temporaries of current context. This is where the interpreter can find the OOP which is the source of the assignment statement. It may refer to temporaries in a block, or a method - which ever is current at the time the statement is executed.

*************************************************************************

0x'1n6' "assign from a type 6 variable"

blkContextSlot unsigned short

Index into array of temporaries of the current METHOD context. This is where the interpreter can find the id of a context which has the OOP which is the source of the assignment statement. The id will always be for a block context. The slot always refers to the home METHOD's array of temporaries, never the currently executing block's.

blkTempslot unsigned short

Index into array of temporaries of the BLOCK context found via "blkContextSlot". This is where the interpreter can find the OOP which is the source of the assignment statement.

*************************************************************************

0x'12m' "assign to a type 2 variable"

methTempSlot unsigned short

Index into array of temporaries of current METHOD context.

This is where the interpreter should put the OOP which is the source of the assignment statement.

**********************************************************************

0x'13m' "assign to a type 3 variable"

objSlot unsigned short

Index into array of instance variables of the receiver. This is where the interpreter should put the OOP which is the source of the assignment statement.

NOTE:

a. Changes to instance variables of an object with oop < 600 is disallowed. These are regarded as system objects and are immutable at run time.

b. Instances variables of objects whose class has an oop < 400 may not be changed. These are numbers, single characters, etc, and are constants set up by the compiler.

**********************************************************************

0x'14m' "assign to a type 4 variable"

obj oop

OOP of an object in which source of assignment statement is to be put.

objSlot unsigned short

Index into the instance variables of the object identified by 'obj'. This is where the interpreter should put the OOP which is the source of the assignment statement.

**********************************************************************

0x'1n5' "assign from a type 5 variable"

blkTempSlot unsigned short

Index into array of temporaries of current context. This is where the interpreter should put the OOP which is the source of the assignment statement. It may refer to temporaries in a block, or a method - which ever is current at the time the statement is executed.

--------------------------------------------------------------------------

Table 4.1 Bytecode Descriptions

The bytecodes can be grouped into the following categories:

execute a primitive;
send a message;
define a block;
evaluate a block;
return from a block or method;
branch; and
assign from one variable to another.

We describe each of these next.

4.3.1. Execute a primitive bytecodes discussed:

0x000 —<0x0FF (primitives 0–255)

Primitives are called by Alltalk code to do the low-level tasks. These tasks generally depend on the underlying hardware and operating system, and include things like file I/O, integer and floating point arithmetic, and using the display. The bytecodes numbered from 0 to 255 (decimal), i.e., 00 to FF hex, are reserved for primitives. Primitives are similar to methods in that they have a receiver, they have optional arguments, and they return an object. They are unlike methods in that they are written in C rather than Alltalk, and no context is set up for them.

4.3.2. Send a message bytecodes discussed:

0x100 (send_msg_bcode) 0x10B (send_param_msg_bcode) 0x10C (send_message_add) 0x10D (send_message_sub) 0x10E (send_message_eq) 0x10F (send_message_add1) 0x110 (send_message_sub1)

The compiler generates several different types of bytecodes for messages. The normal message send is handled by send_msg_bcode. Messages of the type 'perform:' and 'perform:with:' are handled by send_param_msg_bcode. These two handlers operate in very similar manner. The main difference is that for send_msg_bcode, the message selector is known at compile time, and is included in the bytecode itself; for send_param_msg_bcode, the oop of the message selector is found, at run time, in a temporary of the current context.

The normal processing of a send_msg (and send_param_msg) is as follows. Note that we do not discuss various optimizations that we have put into send_msg bytecodes. These are discussed in a separate section below.

1) Get the oop of the receiver of the message from the temporaries of the sending context. The send_msg parameter arg_start_slot is the index into the temporaries at which this oop is found.

2) If the receiver is not a context or positive integer, call the object manager to fetch the receiver object. Note that contexts and positive integers are not managed by the object manager: contexts are not objects in Alltalk, and positive integers are encoded as negative oops.

) Determine the receiver's class. If the receiver is not a context or positive integer, its class is found in its object header.

) Call the object manager to fetch the method associated with the message we are processing. We pass to the object manager the hashed_selector and super_flag parameters from the bytecode, plus the class of the receiver. It returns the method object which contains the bytecodes for the message we are processing.

ı In the sending context, store the value of the bytecode parameter put_answ_slot. This is needed when we return to this context from the method we are about to execute. It represents the index of the sending context's temporaries into which the returned result is to be put.

ı Increment the bytecode pointer in the sending context. When we return to this context, we will continue executing bytecodes in this context at that point.

Create a new context for the message we are processing. Copy num_args arguments from the sending context, starting at arg_start_slot in the temporaries of the sending context. They are copied into the temporaries of the new context starting at slot 0. Note that this assures that the receiver of a message can always be found in context temporary 0. The new context will have a bytecode pointer which points to its first bytecode. We make this context the current context, and return to the bytecode loop.

.3.3. Define a block ytecodes discussed:

0x106 (setup_blk_bcode)

ı Alltalk, blocks are not objects managed by the ·ct manager, but rather are maintained by the inter·er as C data structures. When they are assigned to ınce variables, or returned as the result of a message, they are made into objects, is the home context (this is discussed in more detail below). They can, however, be assigned to method temporaries and passed as parameters in messages without being made into objects first.

When the interpreter encounters a setup_blk bytecode, it creates a data structure called a block stub, and gives it an object id (which is a 32 bit integer) which we call an oop). The oop is in a special range, i.e., greater than or equal to INIT_CNTX_ID, so it can be recognized later as a block by the interpreter. The block stub contains enough information to evaluate the block when an eval_blk bytecode is later encountered. Its oop is stored back in the temporaries of the home method in which it is defined. It can then be handled like any other oop stored in temporaries (except for the cases mentioned above).

4.3.4. Evaluate a block bytecodes discussed:

0x109 (eval_blk_bcode) 0x10A(eval_blk_bcode2)

Evaluating a block means executing the code that the block contains. Note that a block must be 'set up' before it can be evaluated. However, a block which is set up may or may not be evaluated. For example, the ifTrue: block and ifFalse: block of an ifTrue: ifFalse: message won't *both* be evaluated. A block may be evaluated immediately after it gets set up, or later. It may be evaluated by the context in which it was set up, or the context which sets it up may pass it as a parameter in a message send, so that it gets evaluated by another context.

The eval_blk bytecode handler causes a block to be evaluated by converting the block stub for that block into an active context on the context stack of the active process. It makes that new context be the current context, and makes the global bytecode pointer point to the block's first bytecode.

4.3.5. Return from a block or method bytecodes discussed:

0x101 (long_return) 0x104(short_return)

When the Alltalk interpreter 44 encounters a return bytecode, it means that the currently executing context is finished, and it switches control to a previous context. In addition, it passes back an object (actually the object's oop) to the context to which it is returning.

There are two different return bytecodes. What we call the long return (also known as return from method) causes the interpreter to return to the context just previous to the home context of the current context. The home context of a method context is itself; the home context of a block context is the context of the method in which the block is defined/setup. Therefore, a long return from a block is the same as doing a return from the block's home method. Long returns are indicated in the Alltalk code by the caret symbol,"^".

A short return causes the interpreter to return to the context just previous to the current context, regardless of what it is. A short return and a long return from a method context are the same. (The Alltalk compiler 20 always generates a long return for returns from a method context.) A short return from a block means to simply return to the previous context in the stack. This previous context is the context which caused the block to be evaluated; it may or may not be the block's home context.

4.3.6. Branch bytecodes discussed:

0x105 (branch) 0x107 (branch_on_equal) 0x108 (branch_on_not_equal)

Branch bytecodes are used to implement control structures. In addition, branching bytecodes are used by the compiler as part of several optimizations.

The unconditional branch bytecode (0x105) simply increments/decrements the bytecode pointer by a certain amount. The conditional branch bytecodes compare an oop found in a temporary of the current context with an oop contained in the bytecode itself. Whether or not the bytecode pointer is incremented depends on the results of comparing these two oops.

4.3.7. Assign from one variable to another bytecodes discussed:

0x1nm (assign type n variable from type m variable)

The Alltalk compiler 20 and the Alltalk interpreter 44 understand six different types of variables. These six types are as follows:

Type 1

This type of variable is simply an oop that the Alltalk compiler 20 generates, and includes as part of the assignment bytecode. Obviously, it cannot be the destination of an assignment statement, only the source. Examples of Type 1 variables are string, character, integer, and floating point constants, and class names.

Type 2

This type of variable is a temporary in the home context of the current context. The Alltalk compiler 20 specifies it as an index into the array of temporaries.

Type 3

This type of variable is an instance variable of the object which is 'self' in the current context. The Alltalk compiler 20 specifies it as an index into the instance variables of the receiver.

Type 4

This type of variable is an indirect reference to a particular instance variable of a particular object. The Alltalk compiler 20 specifies the instance variable by specifying an index into the temporaries of the current context (which specifies the object), plus an index into the instance variables of that object (which specifies the particular instance variable).

Type 5

This type of variable is a temporary in the current context. The Alltalk compiler 20 specifies it as an index into the array of temporaries. Note the difference between this and the type 2 variable. For a method context, type 2 and type 5 are the same because a method's home context is itself; for a block, type 2 refers to its home context's temporaries, and type 5 refers to its own temporaries.

Type 6

This type of variable is needed for nested blocks in which an inner block refers to an argument of an outer block. The Alltalk compiler 20 specifies the argument by giving two parameters in the bytecode. First is an index into the temporaries of the home context. In that particular temporary is found the id of the block stub of the outer block. The second parameter is an index into the temporaries of the outer block. In that particular temporary is found the oop of interest. Since Smalltalk does not allow assignment to the arguments of a block, a type 6 variable cannot be the destination of an assignment statement, only the source.

Each assignment bytecode has a source variable type and a destination variable type. The destination is specified first, then the source. Because type 1 and type 6 variables cannot be destinations, there are 24 assignment bytecodes (4 destination types * 6 source types). The assignment bytecode handlers simply put the oop specified by the source into the location specified by the destination.

4.4. Context Management

As mentioned above, the state of the Alltalk interpreter 44 is contained in the global array, Processes. Each element in that array represents a process. In addition to the interpreter's C-language data structure for a process, there is also an instance of Smalltalk Class Process for each Smalltalk process in an application. In the following, we concentrate on the interpreter's data structure for processes, and ignore the Smalltalk object. Each process has associated with it a set of contexts. In the following, we explain how contexts are implemented for one process, but one should remember that there is one set of contexts for each process.

In order to improve performance of the Alltalk interpreter 44, it does not treat contexts as objects. Instead, they are maintained by the interpreter as C data structures. (As mentioned above, however, the home context may be turned into an object if an owned block is turned into an object).

The Alltalk interpreter 44 manages contexts in two pieces. One piece contains what are called active contexts. These are contexts associated with methods which have not yet returned and blocks which are executing and have not yet returned. This piece operates like a stack: when a message is sent or a block starts execution, the Alltalk interpreter 44 pushes another context on the stack; when a method or block returns, the Alltalk interpreter 44 pops one context (or more, in the case of a long return from a block) off the stack.

The second piece contains what are called block stubs. A block stub is established as the result of a setup_blk bytecode (see setup_blk_bcode). In order to treat blocks as objects, object id's (oops) are given to such blocks. The block stubs represent these pseudo-objects. They hold just enough information so that when a block is evaluated (a value message is sent to it), the Alltalk interpreter 44 can create an active context for it. Note that a block stub exists as long as its home context exists; it does not go away just because its associated active context returns. In fact, in the case of loops in Smalltalk code, the same block stub might be evaluated many times, having an active context created from it and destroyed each time.

Because block stubs are stored as a separate piece, the active contexts can be allowed to obey a stack discipline. This simplifies context management, and improves performance.

The data structure for contexts is defined in "interp_types.h". Contexts are of fixed size, and have 64 temporaries each. (Smalltalk defines 64 as the maximum number of temporaries a context may have.) This allows the Alltalk interpreter 44 to allocate space for them and doubly link them at interpreter initialization time, rather than on the fly. They are allocated as an array, and have one array/stack of contexts per Smalltalk process. The routine init_cntx( ) initializes one context, and it is called by init_cntx_stack( ) which initializes and links all con- by init_cntx_stack( ) which initializes and links all contexts for a given process when the process gets created.

The data structure for block stubs is also defined in "interp_types.h". Block stubs are of fixed size. This allows space to be allocated for them and allows them to be linked at interpreter initialization time, rather than on the fly. They are allocated as an array, and have one array/stack of contexts per Smalltalk process. The routine init_blk_stub_stack( ) initializes and links all block stubs for a given process when the process gets created.

In addition to the two arrays, the Alltalk interpreter 44 maintains a pointer to the current active context, cur_cntx, and a pointer to the next available (unused) block stub, next_blk_stub, for each process.

The fields of a context that are important for context management are described next.

prev, next

Each context has a prev pointer which links it to the previous context in the array/stack, and a next pointer which links it to the next context in the array/stack. These pointers are used rather than the array index to move between contexts. The Alltalk interpreter 44 follows the next pointer of the current context when it needs to add a new context. This happens when a message is sent (see send_msg_bcode), or a block is evaluated (see eval_blk_bcode). The Alltalk interpreter 44 follows the prev pointer of the home context of the current context to find the context to which it should return when it does a long return; it follows the prev pointer of the current context itself when it does a short return(see "short return", Table 4.1).

home_cntx

For a method context, home_cntx points to itself. For a block context, home_cntx points to the context of the method in which the block is defined. This pointer is needed when the Alltalk interpreter 44 does long returns from blocks, and when blocks refer to the temporaries of their home method. By having a method context's home be itself, the Alltalk interpreter 44 can handle all long returns (both from method contexts and from block contexts) in the same way.

first_block

The first_block field of a context points to the first block stub that the context could allocate. This is used to free up block stubs when an active context returns.

my_blk_stub

For a method context, my_blk_stub is not used, and s NULL. For a block context, the field points to the :ontext's corresponding stub. This pointer is used by he debugger (described below), and is also used in :onjunction with the prev_active_cntx field to handle he case where one block stub has multiple active conexts at the same time.

prev_active_cntx

For a method context, prev_active_cntx is not used, nd is NULL. For a block context, it is used in conjunc-ion with the my_blk_stub field to handle the case vhere one block stub has multiple active contexts at the ame time. It saves a pointer to the previous active lock context associated with this block context's block tub. If this context is the only active context associated /ith the block stub, then this field holds a NULL ointer.

The fields of a block stub that are important for con-:xt management are described next.

id

Each block has an id which is an oop (long integer) in special range, that is, greater than or equal to the onstant INIT_CNTX_ID. The id's are assigned to a ub when the process to which it belongs is initialized. he id can be stored in the temporaries of other con-xts, and can be passed as a parameter in a message nd. In this way, blocks can be treated (almost) like al objects for flexibility, and yet be managed by the terpreter for good performance.

next

Each block stub has a next pointer which links it to e next block stub on the array/stack. When a new ock stub is needed, the Alltalk interpreter 44 uses the one pointed to by the global pointer, next_blk_stub. At that time, it follows the next pointer of the stub pointed to by next_blk_stub to update next_blk_stub.

home_cntx

Each block stub has a pointer to its home context. If the stub gets evaluated, the Alltalk interpreter 44 needs this pointer in the active context created for the block. Via this pointer, it can get at the temporaries of the home context.

active_cntx

When a block gets evaluated, the Alltalk interpreter 44 updates the stub with a pointer to the active context that gets created to do the evaluation. This pointer is needed in order to resolve references to type 6 variables.

When a block is stored in an instance variable, or passed back from a method the Alltalk interpreter 44 must make the block a persistent object. In so doing, it must also make the home context a persistent object as well, since the block can reference temporaries of the home context. Alltalk contains routines to make the block and its home context persistent objects (and thus they may then be stored in the database and manipulated as any other object), and to put the block and home context back on the stack so that the block can be executed.

Referring to the Drawings, FIGS. 4 through 13 show how context management is done in Alltalk. Each Figure shows the same portion of the active context stack and the block stub stack for one process. Each box in the Figures represents one context or one stub; only the fields involved in context management are shown. (The my_blk_stub and prev_active_cntx fields are shown only in FIG. 13.) Pointers are indicated by arrows; pointers "connected to ground" represent NULL pointers. Pointers shown in double lines indicate pointers which were changed from the previous figure. The stacks grow downward.

Figure 4:
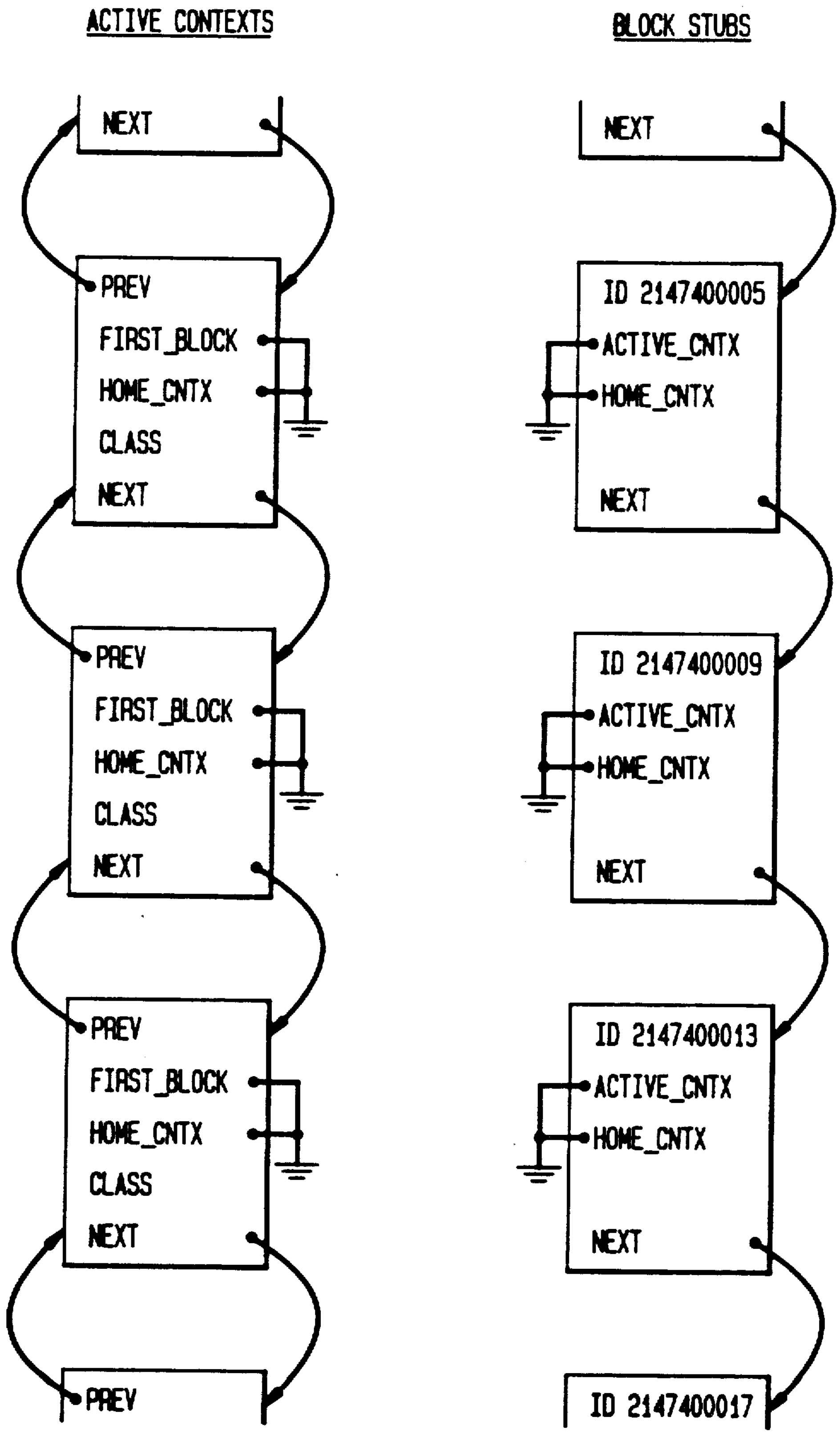
FIG. 4 is a schematic diagram showing initialized stacks for contexts and block stubs.

FIG. 4, shows the state of the two stacks after the interpreter has been initialized, but no messages have been sent. Note that the next and prev pointers of the contexts, and the next pointers of the stubs have been established. Also, the id's of the stubs have been set.

Figure 5:
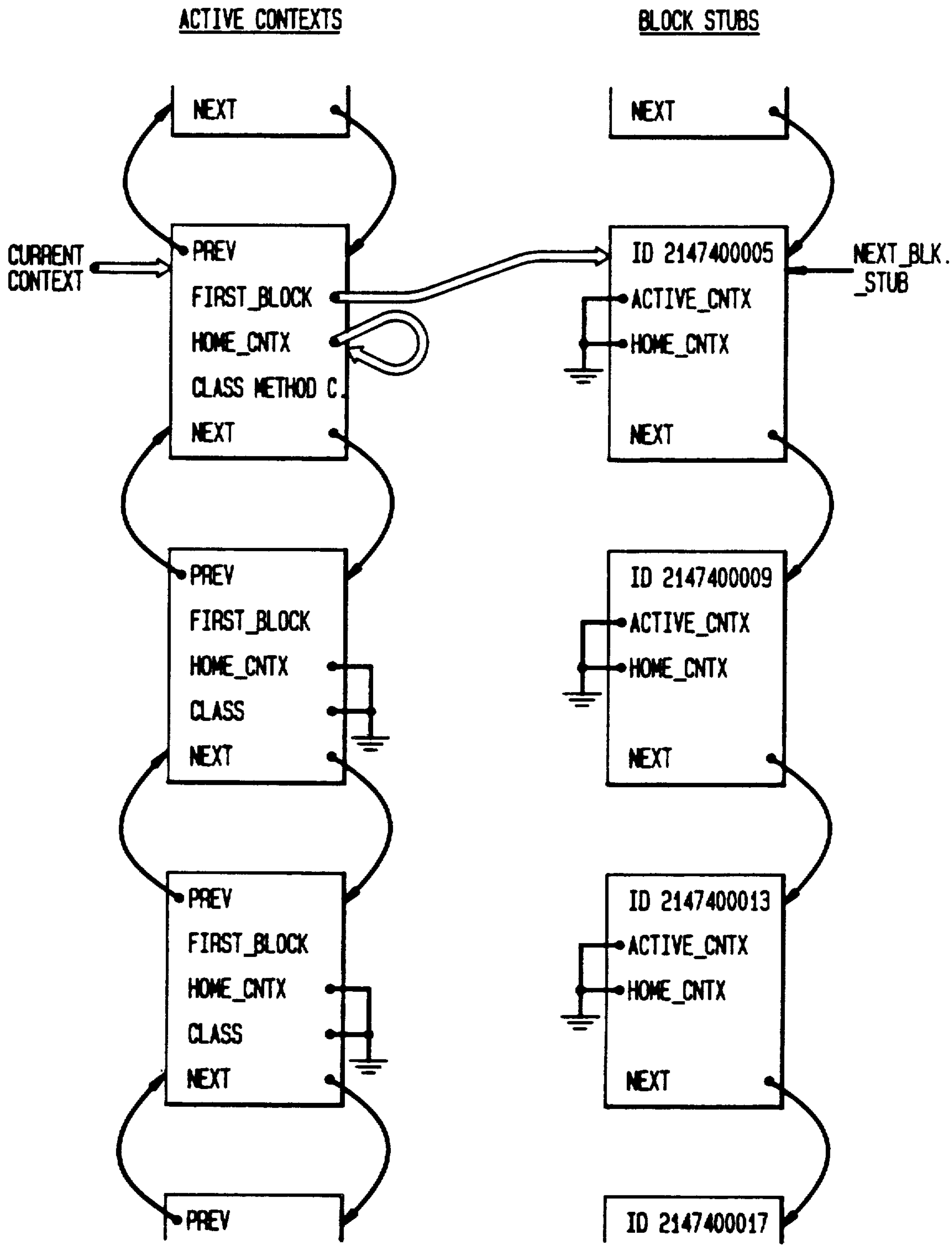
FIG. 5 is a schematic diagram showing the creation of a new context.

FIG. 5, shows what happens when a message is sent. (We assume that the sending context is just off the top of the figure; the context we are about to create is the top box we see in the figure.) We follow the next pointer of the sending context to "create" a new context (from here on, called method context #1). The new context becomes the cur_cntx, and its class is MethodContext. Since it's a method context, its home_cntx is made to point to itself. Its first_block pointer is made to point to the stub pointed to by next_blk_stub. Note that next_blk_stub is not moved; only when a block stub is used (i.e., set up) is the next_blk_stub moved forward.

Figure 6:
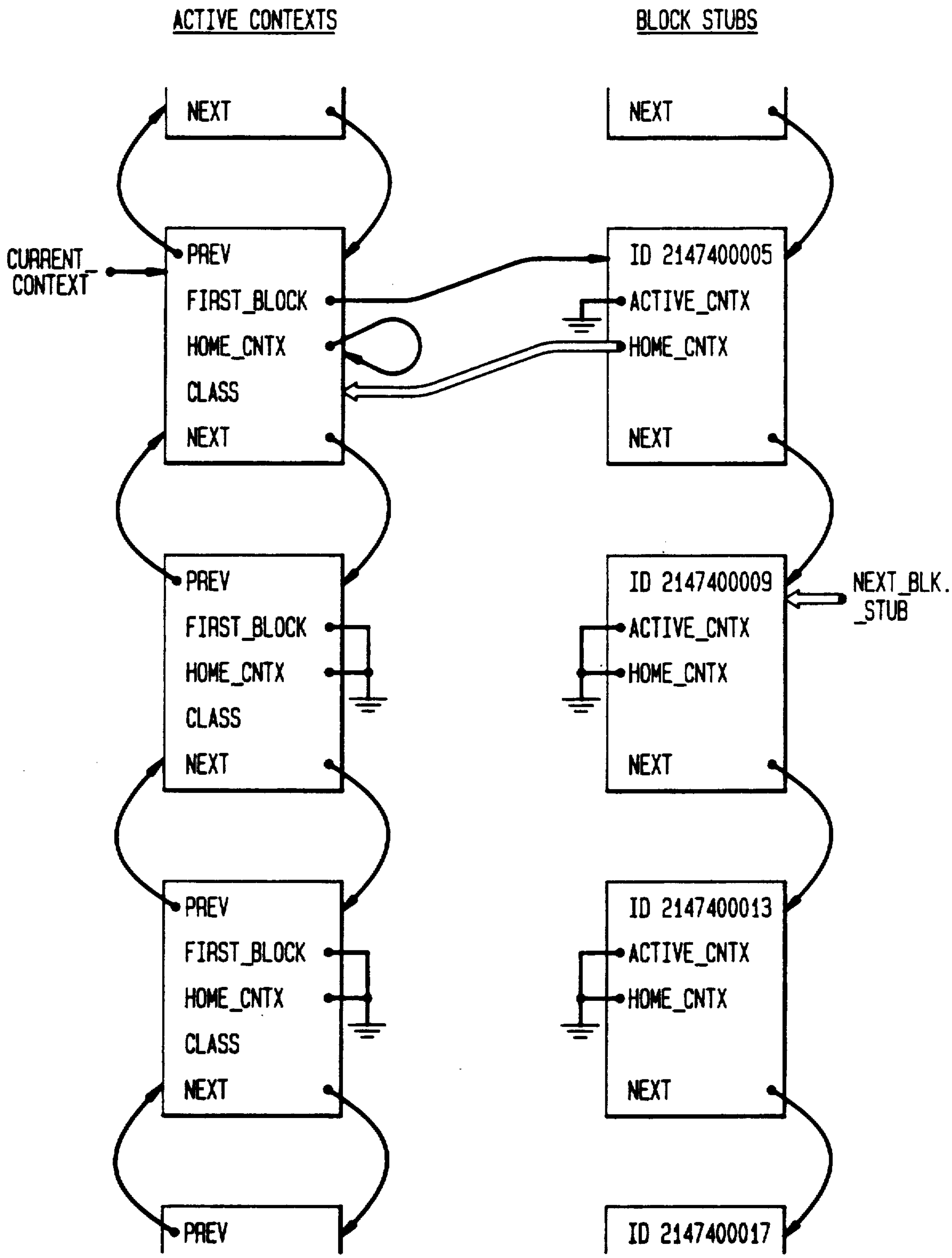
FIG. 6 is a schematic diagram showing creation of a block.

FIG. 6 shows the stacks after method context #1 sets up its first block. Setting up a block means that the Alltalk interpreter 44 created a block stub; it does *not* mean that the Alltalk interpreter 44 creates another active context. The block stub pointed to by next_blk_stub becomes the new block stub. The Alltalk interpreter 44 pushes next_blk_stub forward to the stub pointed to by the next field of the new block stub. The home_cntx field of the new block stub is made to point to the home_cntx of cur_cntx, i.e., method context #1. Note that if cur_cntx were a block context, the home_cntx of the new block stub would not be that block context, but rather the block's home context. Note also that method context #1 does not change.

Figure 7:
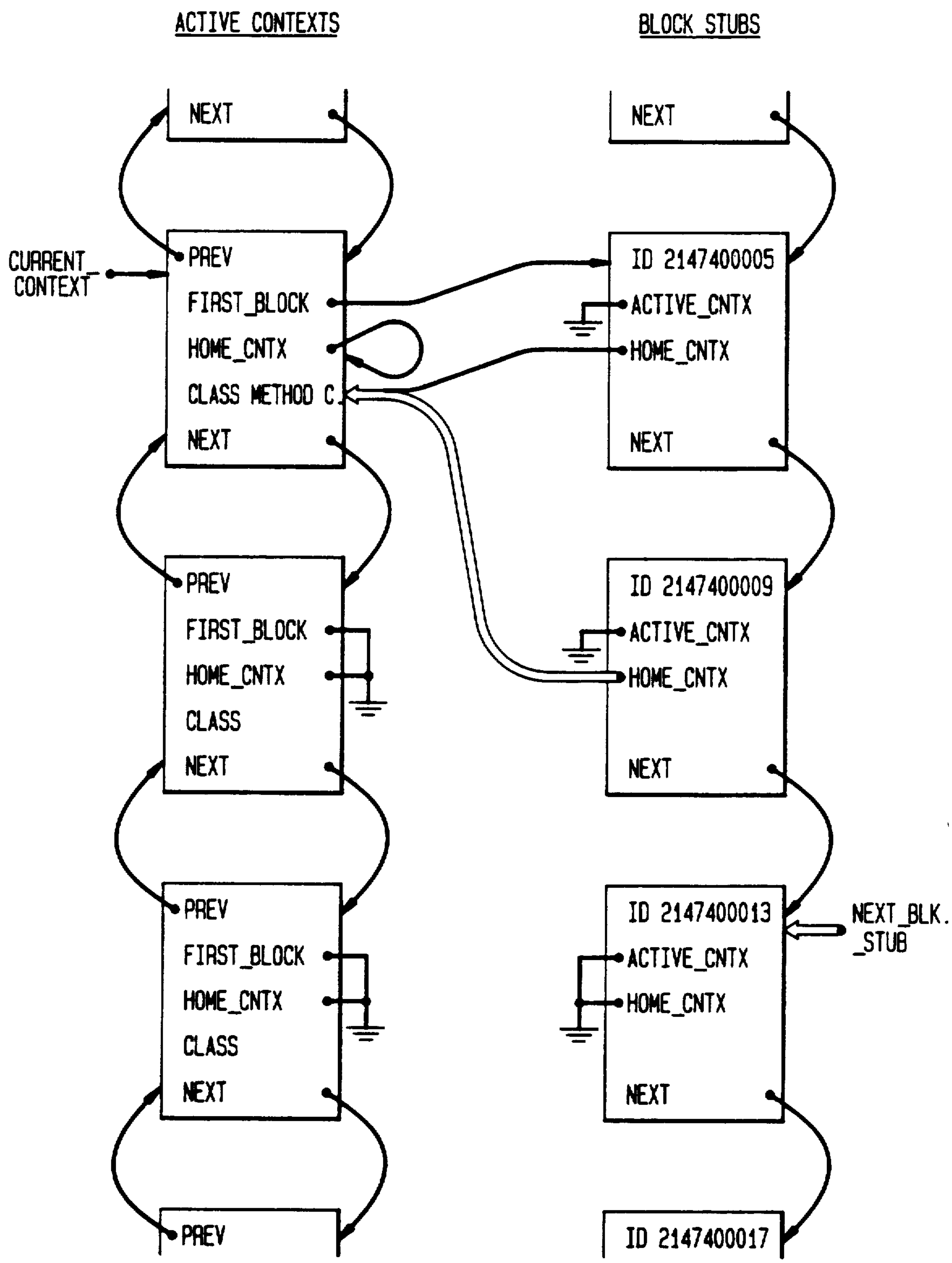
FIG. 7 is a schematic diagram showing creation of a second block.

FIG. 7 shows what the stacks look like after method context #1 sets up another block. We now have two block stubs whose home_cntx is method context #1.

Figure 8:
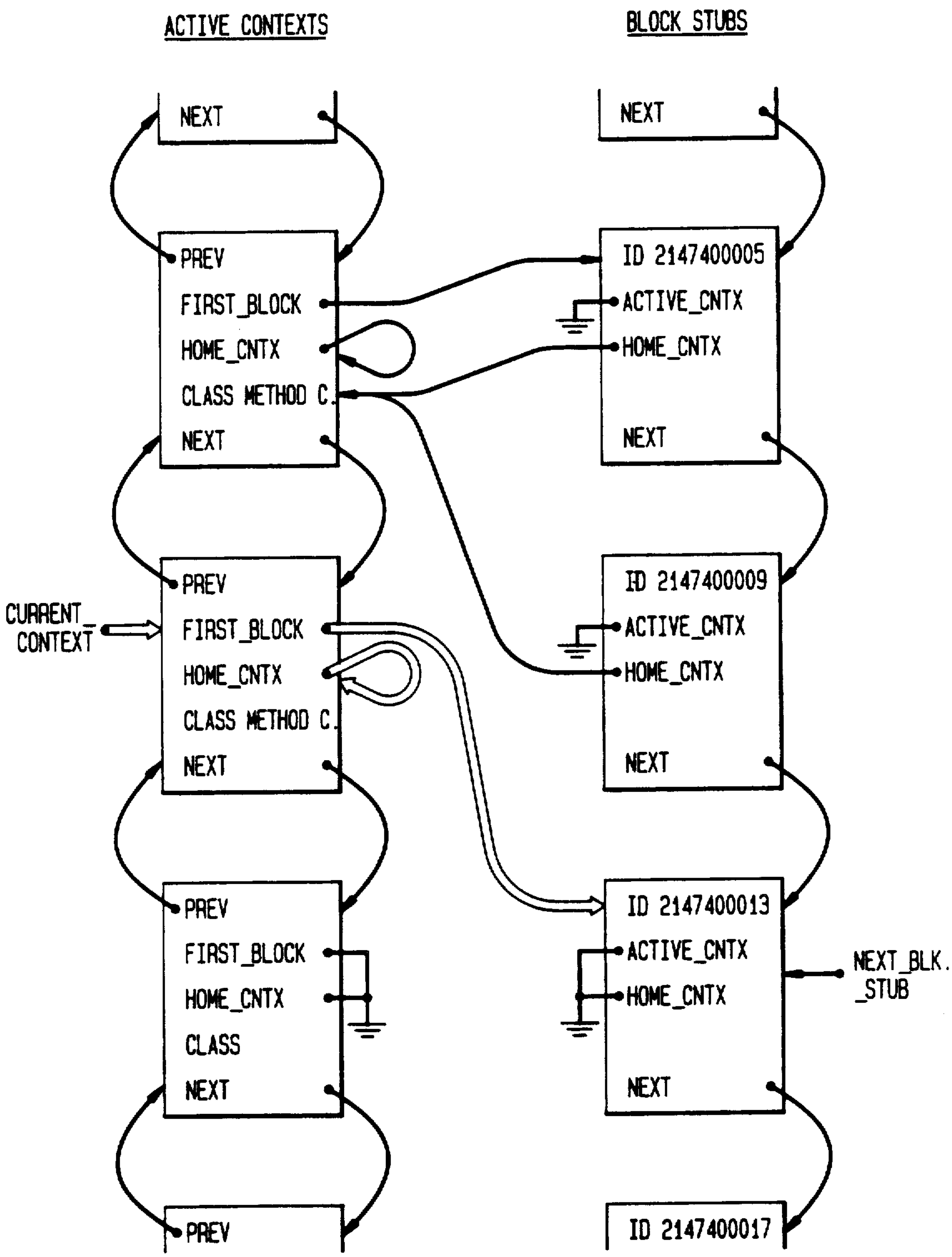
FIG. 8 is a schematic diagram showing the creation of a new context.

FIG. 8 shows the stacks after method context #1 sends a message. To handle this, the Alltalk interpreter 44 must "create" a new context (from here on, called method context #2). The Alltalk interpreter 44 follows the next pointer of the current context to find the next available active context, and make it the cur_cntx. Its first_block pointer is made to point to the block stub pointed to by next_blk_stub. Since the new context is a method context, its home_cntx field is made to point to itself.

Figure 9:
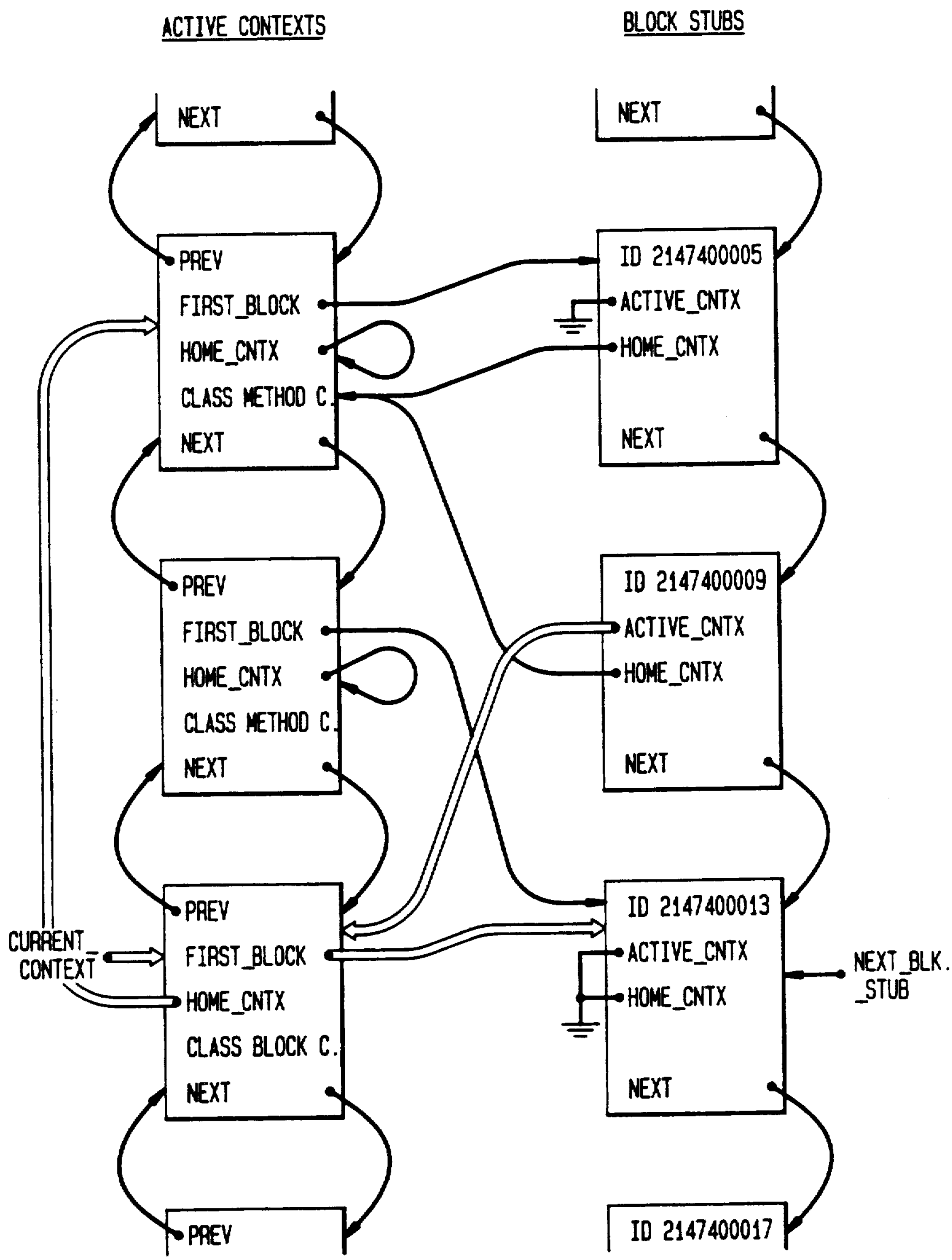
FIG. 9 is a schematic diagram showing a block evaluation.

FIG. 9 is somewhat more complicated. In that figure, we see the stacks after method context #2 starts to evaluate one of the blocks that was set up by method context #1. (We assume that the block was passed as a parameter in the message which resulted in the creation of method context #2.) The stub to be evaluated is #214740009. To handle this, the Alltalk interpreter 44 must "create" a new active context—but this time, it is a block context. Just as with method context creation, the Alltalk interpreter 44 follows the next pointer of the cur_cntx to find the next available active context, and make it the cur_cntx. Also, the Alltalk interpreter 44 makes its first_block pointer point to the block stub pointed to by next_blk_stub. However, the home_cntx pointer of the new context does not point to the new context itself; because the new context is a block context, its home_cntx pointer is gotten from its block stub. In this case, home_cntx points to method context #1. Note also that the block stub's active_cntx pointer is made to point to the new block context. The transformation of a block stub to an active context is handled by the routine stub_to_cntxO.

Figure 10:
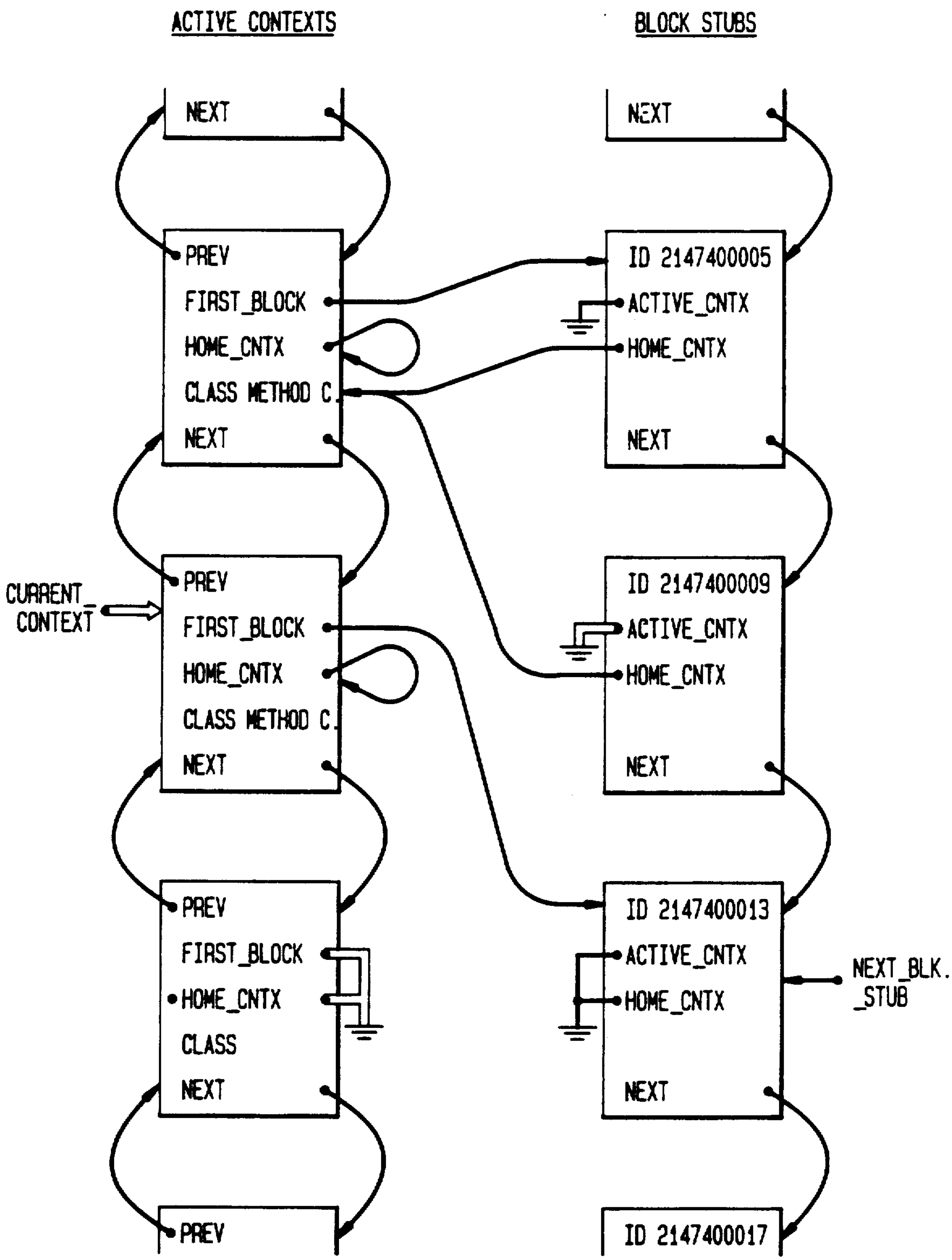
FIGS. 10–13 illustrate the modes of block execution.

FIG. 10, shows how the stacks would appear if the block were to do a short return. Note that the Alltalk interpreter 44 simply follows the prev pointer of the current context to find the context to return to; it is made the cur_cntx. Note also that the block stub associated with the evaluated block does not go away, even though its active context did go away. Block stubs go away when their home context goes away (returns). The Alltalk interpreter 44 also moves next_blk_stub to point to the block context's first_block. This effectively "destroys" and frees up any block stubs set up by the block context. (In this case, the block context created no block stubs, so next_blk_stub does not change.)

Figure 11:
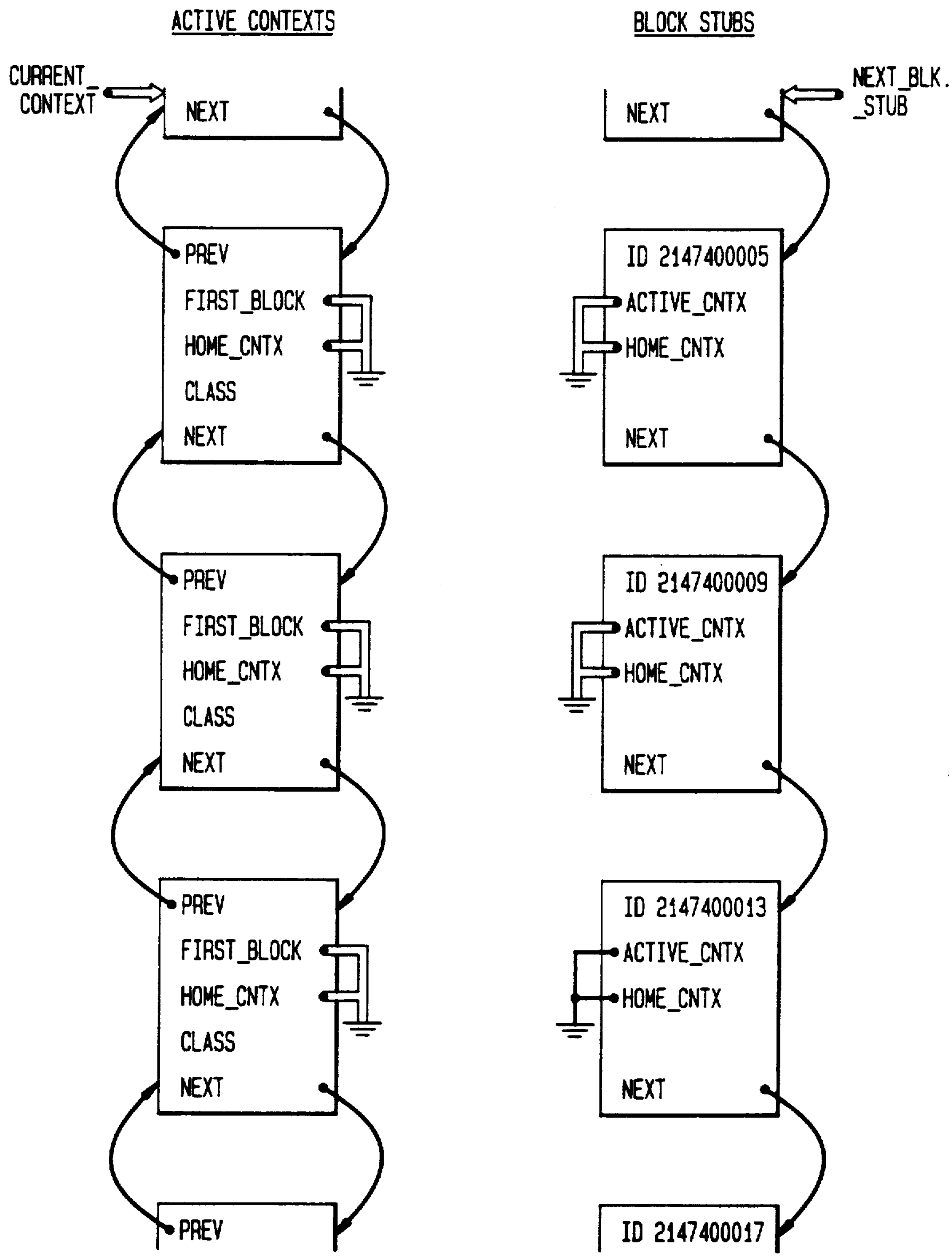

FIG. 11, shows how the stacks would appear if the block were to do a long return. Remember that a long return from a block is the same as doing a return from the block's home context. In this case, the block's home context is method context #1, so the Alltalk interpreter 44 (in essence) does a return from method context #1. It follows the prev pointer of method context #1 to find the context to return to; it becomes the cur_cntx. It also moves the next_blk_stub pointer back to point to the stub pointed to by first_block of method context #1. This effectively "destroys" and frees up all blocks created by method context #1 and any of its descendent contexts.

Figure 12:
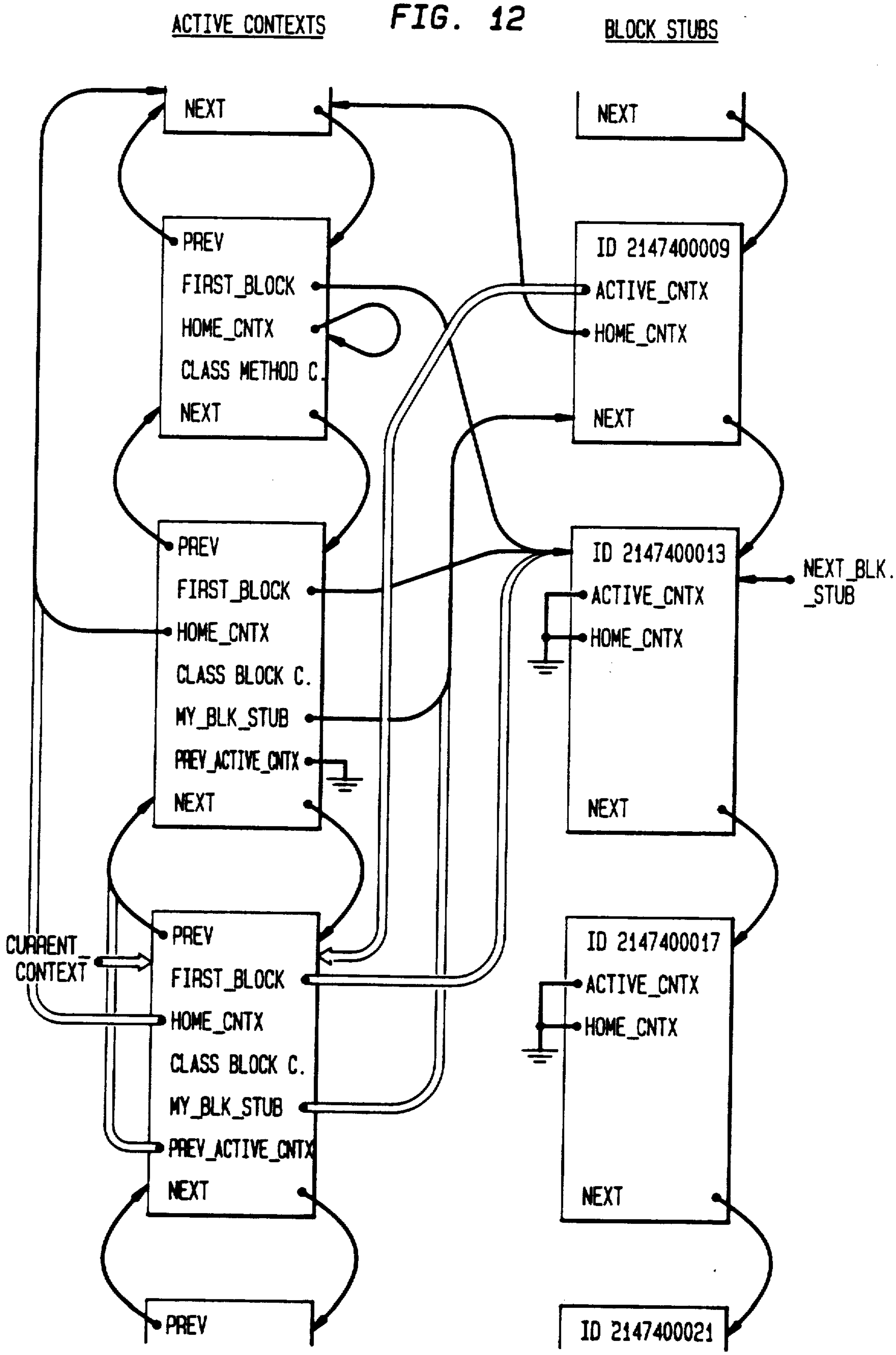
Figure 13:
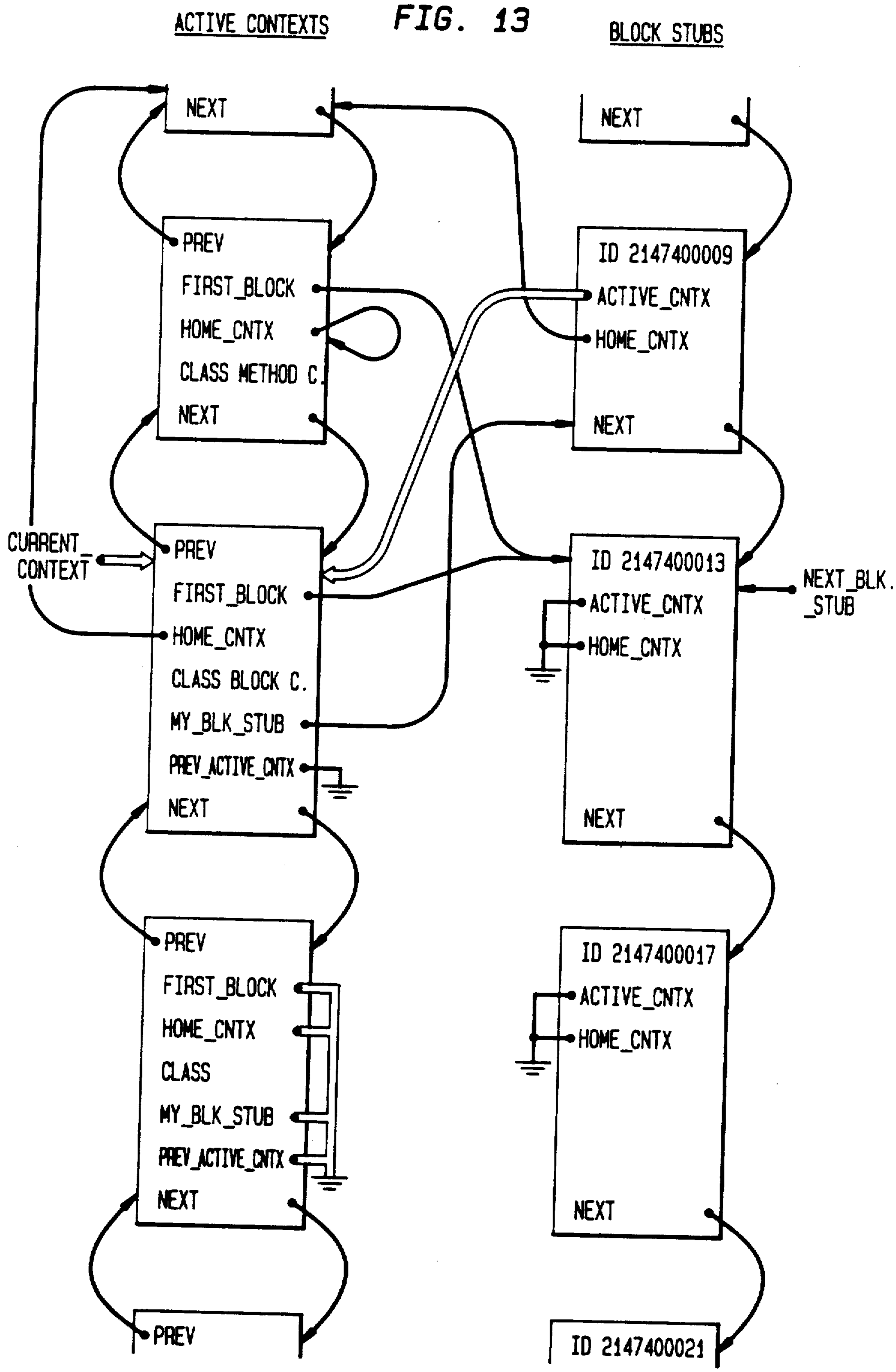

FIGS. 12 and 13 show how the my_blk_stub and prev_active_cntx fields are used to handle the case where a block stub may have multiple active contexts associated with it. Note that these fields are shown in these figures only, and only for block contexts. Note also that we have shifted our view of the stacks down (or up) by one context in order to fit the contexts of interest on the page.

FIG. 12 shows how the stacks would appear if a second block context was activated for the same block stub as the current context. Note that the two block contexts created from the same block stub are very similar; only their prev_active_cntx fields differ. Note that the second one uses this field to point back to the previous (first) one. Note also that the active_cntx field in the stub is updated so it points to the new context.

FIG. 13 shows how the stacks would appear if the second block context did a short return. The Alltalk interpreter 44 follows the my_blk_stub pointer of the returning block context to find its associated block stub. It copies the prev_active_cntx pointer of the returning block context into the active_cntx field of the stub. Then it does the normal processing for a short return, that is, follow the returning context's prev pointer to find the sending context, and makes it the new current context. Note that in this example, prev and prev_active_cntx point to the same context, that is, the first block context; however, this will not necessarily be the case. There could be other intervening contexts between these two activations of the same stub. This is why it must save this information in the newly-created context.

4.5. Process Management

As mentioned above, the Alltalk interpreter 44 maintains run time data structures for Smalltalk processes in an array called Processes[]. Each element in that array represents one Smalltalk process. Each element contains (basically) a stack of active contexts, a pointer to the current context in that stack, an array of block stubs, and a pointer to the next available stub. The management of these two stacks and two pointers was described in the previous section. However, we have not yet discussed how processes are created, switched, or destroyed. These topics will be discused in this section.

4.5.1. Creating Processes

A Smalltalk process is created by sending a message to a block. The block contains the code that is to be executed in the new process. The message sent to the block might be forkAt:, fork, etc. However, all of these messages eventually result in the message newProcess being sent to the block. The Smalltalk code for method newProcess in Class Block is shown in Table 4.2.

TABLE 4.2

```
newProcess
    "Answer a new process running the code in the receiver. The
    process is not scheduled."
      Process
        forContext:
            [self value.
            Processor terminateActive]
        priority: Processor activePriority
```

The forContext:priority: method in Class Process is a class method for creating new processes, and it is implemented as a primitive in Alltalk.

The routine createProcess( ) is the main routine for creating a new process. It first finds an available element in the Process[ ] array by calling get_proc_id( ). Then, in order to create a new process in Alltalk, the Alltalk interpreter 44 establishes the first context in that new process. It does that by copying appropriate active contexts and block stubs from the creator process to the created (new) process, and then making slight adjustments to the copies. This is best explained using an example.

Suppose an application wishes to create a process that simply prints a message. An example of code to do this is shown in Table 4.3.

TABLE 4.3

```
Class Test
!
myTest
    | aProc |
    aProc < – ['This is a new process' print.] newProcess.
        "create it"
    aProc resume. "schedule it"
    Processor yield. "switch to it"
```

What contexts and stubs should be copied? Obviously, the Alltalk interpreter 44 must copy the user's block, that is, the one in method myTest. Because a block may refer to its home method's temporaries (though in this case it does not), and because a block's bytecodes are actually contained in its home method, it copies both the block stub and its home. In this case, the home context is the method context associated with the execution of myTest. But this is not enough. Note that the method, Block newProcess, which actually sends the message which directly creates the new process (Process forContext:priority:) also creates a block. This block, [self value. Processor terminateActive.], also must be copied; and its home context must be copied as well. In what follows, we call this block the outer block. Note that self in the outer block refers to the user's block.

To summarize: the Alltalk interpreter 44 copies the user's block and its home context (see proc_copy_cntx1( )), plus the outer block and its home context (see proc_copy_cntx2( )). After that, it evaluates the )uter block, that is, it creates an active context from the )lock stub. When the new process becomes active, this, n turn, causes the user's block to be evaluated (as a 'esult of the message self value). When that block finshes, the new process is destroyed (as a result of the nessage Processor terminateActive).

Figure 14:
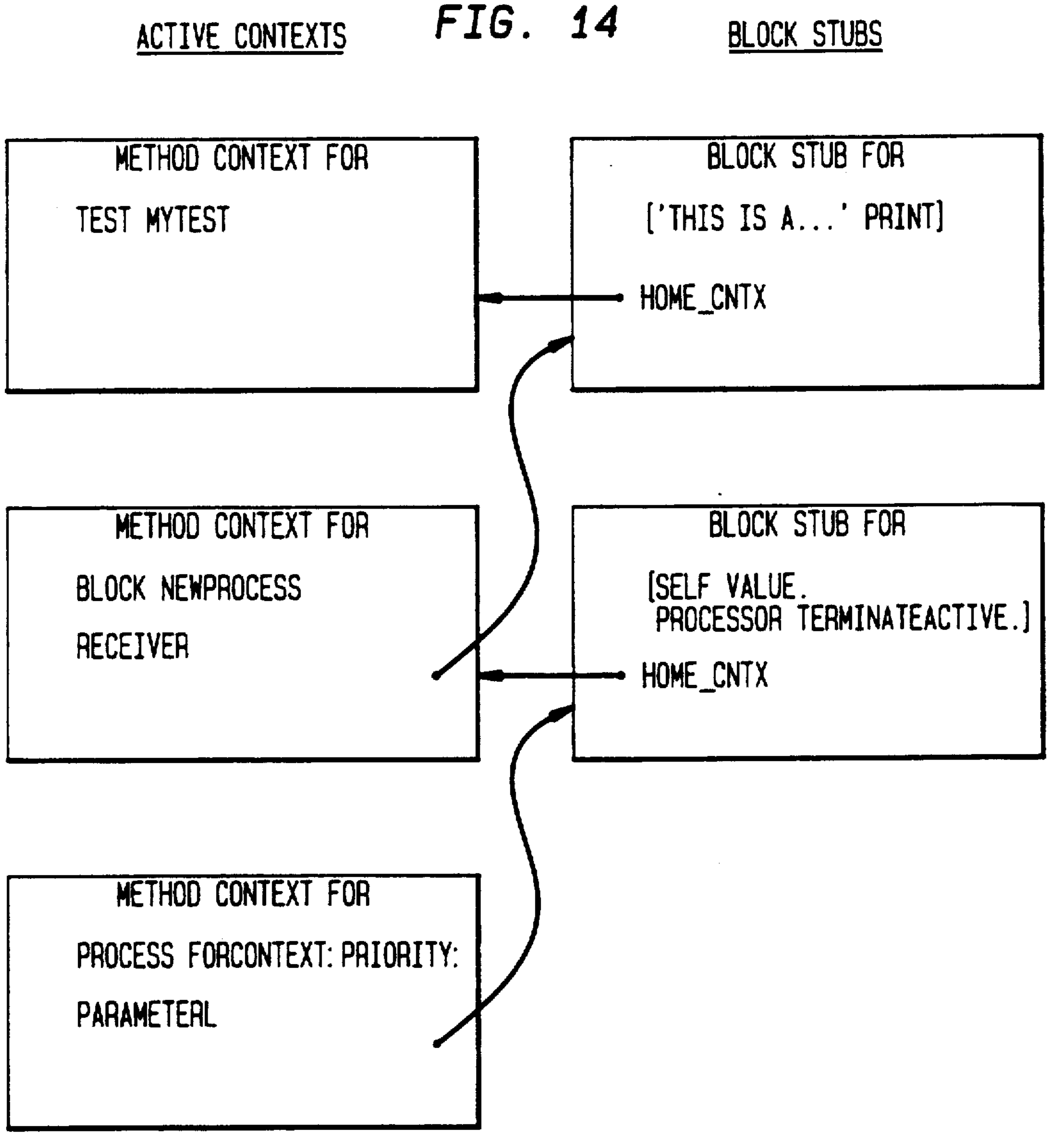
FIG. 14 shows the creation of a process.
Figure 15:
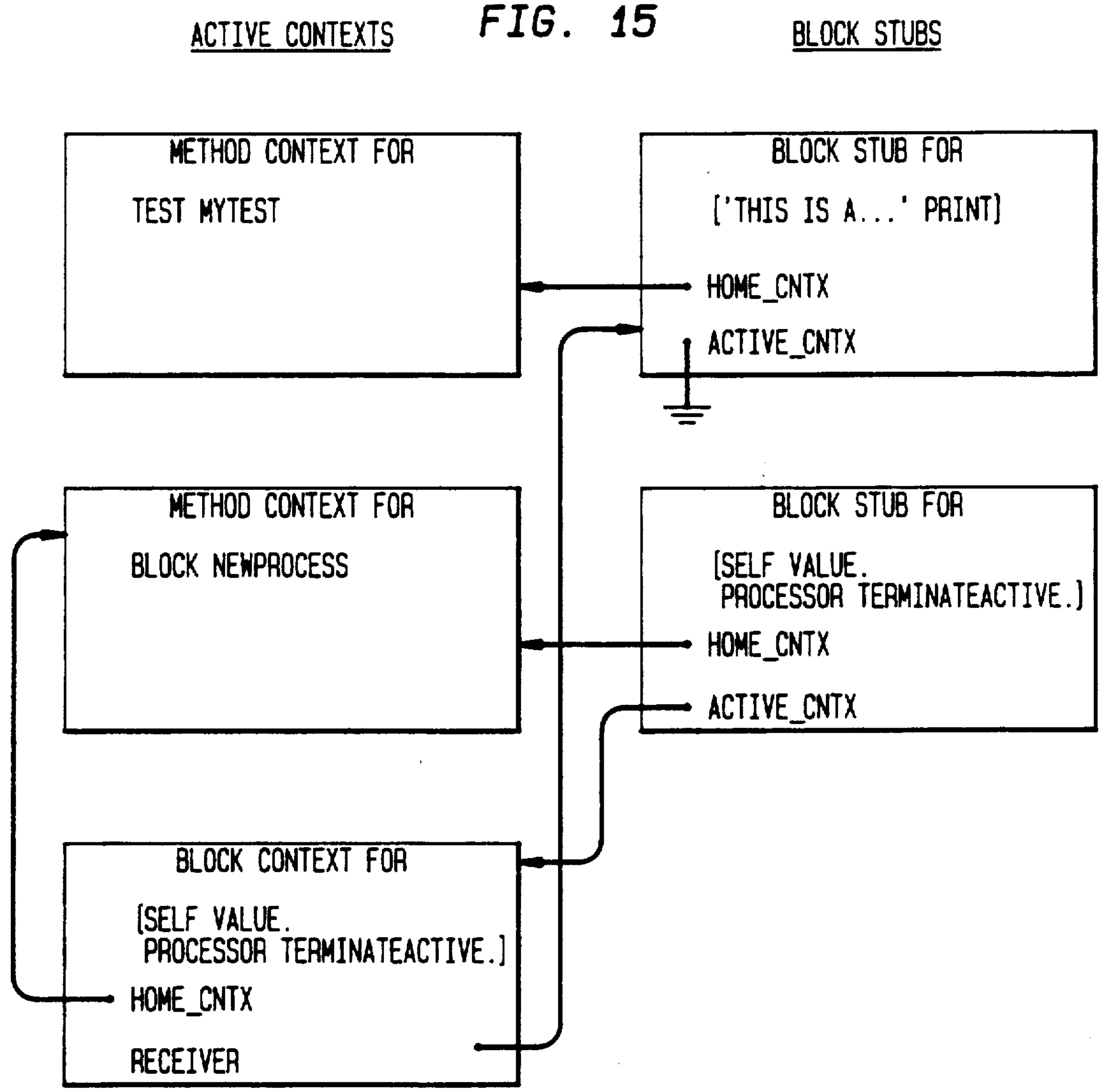
FIGS. 15–16 illustrate process management.
Figure 16:
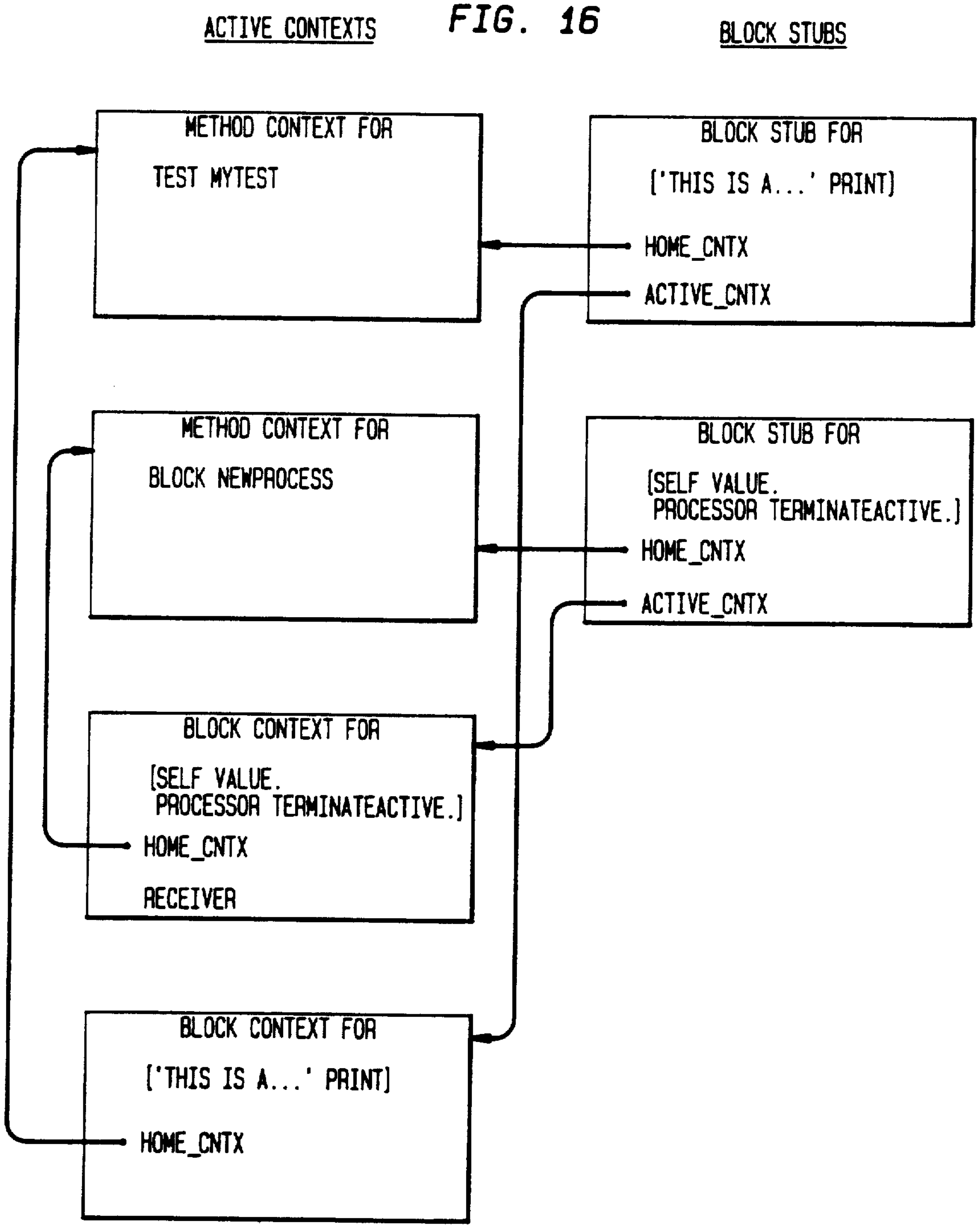

Referring to the Drawings, FIGS. 14 through 16 llustrate the relationships between these contexts and )locks. FIG. 14 shows a portion of the active context tack and block stub stack of the creator process. The :ontexts and stubs shown are the ones that are of inter-st when the Alltalk interpreter 44 creates the new rocess. FIG. 15 shows the active context stack and lock stub stack of the created process just after it is reated by the interpreter. FIG. 16 shows the same tack just after the new process has become active, and he user's block begins to execute.

4.5.2. Switching Processes

Switching processes is fairly straightforward. Before ach bytecode is executed, the Alltalk interpreter 44 ests the Divert flag; if set, it switches to the process eturned by the routine processSwitch( ). The routine rocessSwitch( ) returns an oop; the routine find_rocess( ) takes the oop as an argument, and returns a ointer to the corresponding element of the Process[ ] rray.

The machinery for managing process switches is ontained in the module process.c. It follows the impleientation described in the standard reference for Smallilk by Golberg and Robson, mentioned above.

4.5.3. Destroying Processes

Destroying (i.e., terminating) a process involves two asic steps. First, the appropriate element of the Prosses[ ] array is marked as not in use so it can be reused needed. Second, the garbage collector (described elow) is told to clean up after the process. The routine estroyProcess( ) handles these two tasks.

Processes are destroyed in two situations. The first ise is when the interpreter quits. At that time, all acve processes are destroyed so garbage collection can be performed correctly. The second case is when a terminate message is sent to a Process object. This second case is implemented via primitives. Note that process 0 is created automatically when the interpreter is initialized; it cannot be destroyed, except by shutting down the interpreter.

4.6. Optimizations

Various techniques are used to improve the run-time performance of the Alltalk tool. These techniques are useful independently of the Alltalk tool. They can be advantageously employed in any Smalltalk-like object-oriented programming tool to improve the runtime performance. We describe these techniques below.

4.6.1. Replacing certain message sends with less expensive processing

This is referred to as message flattening. The Alltalk interpreter 44 detects at runtime if a message send's only purpose is either of the following 2 cases:

1. Return of an instance variable.
2. Execution of a primitive.

The Alltalk compiler 20 flags methods that are of these types, for easy detection at runtime. The Alltalk interpreter 44 will execute the appropriate logic in-line, and modify flags in the bytecode that is being executed, as well as caching in the bytecode itself the class of the receiver. Subsequent executions of the bytecode involved will cause the class of the now current receiver to be checked against the class cached in the bytecode. If it matches, the Alltalk interpreter 44 performs the optimized logic, in-line, without fetching (or executing) the method. Thus this optimization saves the fetching of the method, allocation (and subsequent deallocation) of a new context, and interpretation of the method.

4.6.2. Treating primitives as bytecodes

Rather than have one bytecode just for dispatching primitives, (e.g., an execute_primitive bytecode), in Alltalk, each primitive is its own bytecode. This eliminates the extra level of indirection to get to the code for primitives. As mentioned previously, primitive bytecodes are in the range of 0×000 to 0×0FF hex; other bytecodes being at 0×100.

4.6.3. Saving a call to the object manager to fetch receiver

If the receiver of a message is the same as the receiver of the sending method, the Alltalk interpreter 44 avoids the call to the object manager to fetch the receiver again. Instead, since in Alltalk a pointer to the receiver is held in the associated context, the Alltalk interpreter 44 gets the receiver pointer from the associated context instead.

4.6.4. Replacing 'value' messages with block evaluation

Since evaluating a block is less expensive than sending a message, the Alltalk interpreter 44 attempts to replace send_msg_bcodes with eval_blk_bcodes when possible. The Alltalk compiler 20 recognizes messages with the selector value (and value:, etc.), and replaces them with eval_blk_bcode2 bytecodes. This bytecode is the same as the eval_blk_bcode, except that it must check to see that the "receiver" of the value message is a block. If it is not a block, eval_blk_bcode2 simply returns, and lets processing fall through to the next bytecode which is a send_msg_bcode for the value message; if the receiver is a block, eval_blk_bcode2 operates like eval_blk_bcode, except that it must push the bytecode pointer past the following send_msg_bcode which it replaces.

4.6.5. Caching methods in send_msg bytecodes

Alltalk uses a performance-improving technique, common to most Smalltalk implementations, known as method caching. The technique takes advantage of the fact that, while Smalltalk allows polymorphism, a given message often ends up being resolved to the same method every time. How Alltalk takes advantage of this is as follows.

The send_msg bytecode has two extra fields which implement a method cache. One field is likely_class. This saves the class of the receiver of the message when it was last sent. The second field is likely_method. This saves the oop of the compiled method to which the message was resolved last time it was sent. When the bytecode is encountered again, the Alltalk interpreter 44 checks to see if the new receiver's class matches likely_class; if it does, it uses the compiled method in likely_method. If the classes do not match, it must do the normal, more expensive processing to fetch the appropriate method. Note that in Alltalk, when the cache is used, the Alltalk interpreter 44 calls the object manager to reserve the method object, to insure the object is not garbage collected until the object is no longer needed. However, this is less expensive than normal method fetching. Note also, that if the cache is not usable (i.e., the receiver's class does not match likely_class), the Alltalk interpreter 44 updates the cache to match the receiver's class and the method's oop in the current message.

4.7. Initialization and Shutdown

The main procedure of the Alltalk interpreter 44 is contained in the module interp.c. It performs various types of initializations, then invokes the bytecode loop by calling exec_bcodes( ). When exec_bcodes( ) returns, main( ) does some minor clean up, and exits.

Initialization procedures are the following.

(1) Command line arguments are processed. These are parameters passed on the statement used to invoke the runtime environment 22. They include switches for relinquishing control of the keyboard and mouse to the Smalltalk application, and for avoiding the normal system booting procedures. Another parameter is an optional filename; it indicates that the interpreter should get the information for the initial message of the application from that file rather than by prompting the user.

(2) Signal handling is set up for the I/O primitives.

(3) The object manager 48 is initialized via a call to init_om( ).

(4) The values for the initial message are processed via a call to get_init_vals( ).

(5) Keyboard and Mouse are 'opened' via calls to openMouse( ) and openKeyboard( ), if appropriate.

(6) The oops of certain Alltalk objects are referenced in the Alltalk interpreter 44 via global variables. Some of these are fixed to certain oops. For example, true is always oop 257. However some of the oops referenced via interpreter globals must be determined at start up of the interpreter—they are not fixed forever, just for the duration of the interpreter's run. The appropriate assignments are made by calling initializeOops( ). Likewise, certain instance variable indices are referenced by the interpreter via globals. These, too, must be determined at start up. A call to initializeIndices( ) takes care of this.

(7) The first Smalltalk process is established. See the section above on Process Management for more details. The routines createProcess( ), and init_processor( ) do most of this work.

(8) The display is 'opened' via a call to openDisplay( ).

(9) The bytecodes and context for the first message are built and made the first one to be executed. Basically, the interpreter 44 builds:

(a) send_msg and return bytecodes for the message startUp sent to Class SystemBoot;

(b) send_msg and return bytecodes for the user-supplied initial message.

The routines bld_dummy_bcodes( ) and bld_dummy_cntx( ) perform these tasks.

4.8. The debugger

The debugger is named RAID, and it combines many of the features of the standard Smalltalk debugger and the UNIX debugger, dbx.

4.8.1. Overview of the Debugger

RAID (Revised Alltalk Interactive Debugger) is the debugger for the Alltalk system. We designed it to be used for debugging both Alltalk applications code, and the Alltalk system (implementation) itself. RAID provides typical debugger capabilities such as:

setting break points;

stepping through program execution;

tracing various types of information (messages, blocks, bytecodes, processes); and displaying values of data structures/variables.

RAID is written in C, and is integrated quite closely with the Alltalk interpreter.

The user interface is a simple command interpreter, that looks somewhat like the Unix debugger, dbx, to the user. The command interpreter uses UNIX utilities lex and yacc to parse input and dispatch the appropriate C routines that perform the tasks of the RAID commands.

4.8.2. Basic Architecture of RAID

There are several versions of the Alltalk interpreter 44, each geared to a particular need. Not all of these interpreters contain RAID. For example, one version is optimized for running debugged applications as fast as possible; leaving out the debugger improves performance considerably. Another version is geared toward the collection of performance statistics; it also does not include the debugger. The version of the interpreter built by default, however, does include RAID.

Conceptually, there are three pieces to the implementation of RAID. One piece is a set of C routines in a library separate from the interpreter, that performs the tasks associated with the RAID commands. Each command has a C procedure associated with it, and that procedure may use other utility procedures to do its work. This first piece is conditionally linked to the interpreter depending on which version of the interpreter is made.

A second piece is the code within the interpreter that can get conditionally compiled into the interpreter itself; by default, it is included, but it can be excluded if debugging is not needed. This code is included when the C compiler switch DEBUGGER is on.

The third piece is a set of global variables and constants that are used to communicate between the first two pieces.

In what follows, we will refer to piece one simply as the debugger; piece two will be referred to as RAID code in the interpreter; piece three will be called debugger globals.

RAID is invoked when the interpreter calls a routine in the debugger called, appropriately enough, debuggerO. Flow of control is as follows:

(1) RAID code in the interpreter calls debugger( ).

(2) debugger( ) prompts the user, and invokes the lex/yacc command interpreter.

(3) The command interpreter parses and interprets the user input, and calls the appropriate C-procedure with the appropriate parameters.

(4) The C-procedure performs the tasks associated with the desired command. This usually results in either display of some information (like the contents of the current context), or the updating of the debugger globals (like turning on or off the switch that tells the interpreter to stop at the next message-send).

(5) When the C-procedure returns, either control will be passed back to the interpreter at the point at which it called debugger( ), or the debugger goes to step 2. Which path is taken depends on the command just processed. For example, after the continue command executes, control is returned to the interpreter; after the print_active_cntx command executes, the user is given another RAID prompt.

(6) When control returns to the interpreter, it continues, executing both normal code and RAID code. RAID code within the interpreter may call debugger( ) (step 1 above); it may update debugger globals; or it may display data to the user based on the values of the debugger globals (switches).

4.8.3. Command Interpreter

As previously mentioned, the interactive interface to RAID is a simple command interpreter built using the UNIX utilities lex and yacc.

The utility lex defines what are valid tokens in the RAID "command language"; the grammar defines how these tokens can legally be put together to form commands. In addition, the grammar calls the C-procedure associated with the command, passing the command parameters as arguments.

The following naming/capitalization conventions are employed for tokens:

(1) Tokens representing command names are all uppercase, e.g., MSG_STEP.

(2) Other terminals have first letter uppercase, all others lowercase, e.g. Hex_numeric.

(3) Non-terminals are all lowercase, e.g., help_param.

4.8.4. Implementation of the Commands

This section will give a brief description of how each RAID command is implemented. For each command, we discuss how each of the three pieces of the RAID implementation (debugger, RAID code within the interpreter, and debugger globals) is used. First, we describe the naming/capitalization conventions used in the RAID implementation.

4.8.4.1. Naming conventions

Almost all variables, constants, and procedures that RAID uses begin with the letters "d_" or "D_" (the letter "d" or "D" followed by the underscore character). In addition, we use the following capitalization conventions:

1) RAID global constants are all uppercase, e.g., D_PROMPT_SYMBOL.

2) RAID typedefs and structure definitions are all lowercase, e.g., d_ostat_struct.

3) RAID global variables have first letter uppercase, all others lowercase, e.g., D_init_vals.

4) RAID macros are all uppercase, e.g., D_CRESET( ).

5) RAID procedures are all lowercase, e.g., d_where( ).

6) Associated with each command with name command_name is a routine with the name d_command_name( ).

4.8.4.2. RAID Switches

Some operations of RAID are controlled by two sets of binary switches. One set of switches controls the trace information that is displayed as the interpreter runs, e.g., message sends and returns. The other set holds state information, e.g., which RAID command is currently executing.

Each set of switches is implemented using a global variable bit vector, plus three macros: one for setting a particular switch (bit), one for resetting a particular switch (bit), and one for testing whether or not a switch (bit) is set. The first set of switches uses the global variable D_display_switches, and the corresponding macros are D_DSET( ), D_DRESET( ), and D_ISDSET( ). The second set of switches uses the global variable D_control_switches, and the corresponding macros are D_CSET( ), D_CRESET( ), and D_ISCSET( ).

4.8.4.3. Commands for starting and stopping execution continue

This command simply continues execution of the interpreter by causing debugger( ) to do a return. We cause debugger( ) to return by setting the global variable D_in_debugger to "0" (zero).

quit, restart, rerun

The quit command causes the interpreter to exit; restart aborts the current Alltalk application, restarts the interpreter on the same application, and gives a RAID prompt; rerun is equivalent to restart followed immediately by a continue—it does not re-prompt the user before restarting the application. It is important to do garbage collection before aborting an application, so these commands make sure each active Smalltalk process is explicitly destroyed before aborting. The code does different things depending on the state of the Alltalk interpreter 44 when the command is invoked.

If the bytecode loop has not yet started, the user is forced to get into the bytecode loop (by executing one bytecode, for example) before allowing any of these commands to be used.

If the interpreter is in the middle of an application, i.e., it is inside the bytecode loop, the debugger does longjmp( ) to an appropriate spot in exec_bcodes( ) where all active processes are destroyed in order to be sure garbage collection is done appropriately. Then it returns to interp( ).

If an application has just completed, it is already outside the bytecode loop, so the debugger simply returns to the routine interp( ); no garbage collection is needed since all active processes ran to completion.

In either of these last two cases, the debugger sets the appropriate global switch (D_QUIT, D_RERUN, or D_RESTART) so that when it returns to interp, it knows whether to exit, restart, or rerun.

run

The run command is similar to restart, but it is used when the user wants to run a different Alltalk application without leaving the interpreter. The code, then must clear all breakpoints (since these are probably not meaningful in the new application), and get new values for the interpreter's initial message.

4.8.4.4. Commands for finding out where you are print_message, where

The where command is analogous to the dbx command of the same name. It prints out the currently active messages, i.e., the messages sends that have not yet returned. Only those messages in the currently-active process are printed. The print_message command prints only the most-recently activated (last sent) message. Both commands use the routine d_print_msg( ) to print the message associated with a given context;

where calls this routine on all the contexts in the context stack of the current process; print_message calls this routine only on the current context.

4.8.4.5. Commands for setting breakpoints stop_at

This command handles a stop set for a particular bytecode type, e.g., send_msg_bcode. If the user enters the command without a parameter, the debugger simply prints out the currently-set stop, if any. If a parameter is given, the debugger stores it into the RAID global variable, D_stop_at_bcode. Bytecodes range from (hex) 0×100 to 0×156; primitives range from (decimal) 0 to 255. The user may specify a bytecode in either range. As the interpreter executes, within exec_bcodes( ), before executing a bytecode, it checks the bytecode against the D_stop_at_bcode; if it matches, the interpreter calls debugger( ).

stop_in, delete

These commands handle stops set for particular methods and/or classes and/or selectors. More than one stop can be set at a time; the constant D_MAX_STOPS determines how many stops can be used. Stops are stored in the global array D_stop_in_data. They are identified by number, from 1 to D_MAX_STOPS. The parameters of the stop_in command define a new stop; new stops are added using d_add_stop( ) called from d_stop_in( ). As with stop_at, if invoked with no parameters, stop_in simply prints the currently set stops using d_print_stop( ); Stops are deleted using the delete command. Note that deleted stops cannot be re-used.

During interpreter execution, in the send_msg bytecode handler, after each send_msg bytecode is executed, a check is made to see if the just-executed bytecode matches any of the stops. If so, the stop is printed, and debugger( ) is called.

4.8.4.6. Commands for executing a limited portion of the application bcode_step

This command simply causes the interpreter to continue execution until the next bytecode is about to be executed. It sets the D_BCODE_STEP switch. During interpreter execution, before a bytecode is executed in exec_bcodes( ), this switch is tested; if set, debugger( ) is called. The switch is reset every time debugger( ) is called.

goto, skip_msg

These commands cause the interpreter to continue execution until a particular message is sent. The message is identified by the process in which it executes, and by its sequence number within that process. With the goto command, the user specifies an absolute message sequence number; with the skip_msg command, he specifies a relative message sequence number. Note that goto also allows the user to specify a particular process; skip_msg uses the current process. The process and message sequence number are stored in D_goto_skip. These are cleared every time debugger( ) is called.

msg_step

This command is to messages as bcode_step is to bytecodes. It causes the interpreter to continue execution until the next message is sent. It sets the D_MSG_STEP switch. During interpreter execution, after a send_msg bytecode is executed, this switch is tested; if set, debugger( ) is called. The switch is reset every time debugger( ) is called.

next_msg

This command is rather more complicated than msg_step. This command is to msg_step as the dbx command next is to the dbx command step. That is, it causes the interpreter to continue executing until the next message at the current level is sent. In order to do this, it must keep track of what the current level was when the command was invoked; this is stored in D_base_cntx. As the interpreter executes a send_msg bytecode, it checks to see if the message just sent was sent from D_base_cntx. If so, then debugger( ) is called. Also, on every return bytecode, the interpreter checks to see if it is returning from (or past) D_base_cntx. If so, D_base_cntx is set to be the context to which it is returning, the user is given a warning message, and debugger( ) is called. This is analogous to doing a next in dbx past a return.

return

This command causes the interpreter to continue execution until it returns from (or past) the current context. Basically, d_return( ) sets the D_RETURN flag, and fills in the global D_ret_from with the current context and process id. ret_bcode checks these; if D_RETURN is set, and it is returning from or past the context specified in D_ret_from, the interpreter displays a message and calls debugger( ). This simple logic gets complicated because of the optimization that converts message sends into assign54 bytecodes and primitive bytecodes. Note that the user is unaware of these optimizations, so the interpreter makes these optimizations transparent to her. The interpreter uses the switches D_MSG_REPLACED and D_RET_FROM_REPLACED_MSG to keep track of these situations.

4.8.4.7. Commands for using the trace features

The set and unset commands turn on and off, respectively, the various display switches. See the section above on how these switches are implemented. How each of the switches is used is described next.

set/unset bcode

The D_BCODES switch is tested in exec_bcodes( ) before the interpreter executes each bytecode. If the switch is set, it calls print_bcode( ) on the bytecode about to be executed.

set/unset context

The D_CONTEXTS switch is tested in exec_bcodes( ) after the interpreter executes each bytecode. If the switch is set, it calls d_print_cntx( ) on the current context.

set/unset block

The D_BLOCKS switch is tested by the interpreter when a block is evaluated. If the switch is set, the debugger prints information about the block that the interpreter is about to evaluate. The switch is also tested when the interpreter does a return. If the switch is set, and it is returning from a block, the value returned is displayed. Note that this information is not printed if the debugger is currently executing a next_message command, and the interpreter is at a level below the level at which the next_message command was invoked.

set/unset process

When the D_PROCESSES switch is set, a message is printed whenever a process is created, destroyed, switched, or finished (returns from its first context). The switch is tested in, respectively, createProcess( ), destroyProcess( ), exec_bcodes( ), and ret_bcode.

set/unset message

The D_MESSAGES switch is tested when a message is sent. If the switch is set, the debugger prints information about the message that the interpreter is about to send. The switch is also tested when the interpreter does a return. If the switch is set, and the interpreter is returning from a message (rather than from a block), the value returned is displayed by the debugger. Note that this information is not printed if the debugger is currently executing a next_message command, and the interpreter is at a level below the level at which the next_message command was invoked. Also note that the interpreter takes care of the cases in which a message send is replaced by a primitive or an assign54 bytecode. The assign54 case is handled in send_msg_bcode; the primitive case is handled in send_msg_bcode (for the send) and exec_prim_bcode (for the return).

set/unset receiver

The D_RECEIVERS switch is tested in exec_bcodes( ) after the interpreter executes each bytecode. If the switch is set, the debugger calls d_print_receiver( ) on the current receiver.

4.8.4.8. Commands for displaying Alltalk runtime objects print_global, print_oop, print_receiver These commands use a database lister to print the contents of an object. The print_global command takes a string as a parameter; it's used for objects such as symbols, Class names, and other global objects. The print_oop command takes an oop (integer) as a parameter. The print_receiver command takes no parameter; it simply causes the debugger to print the contents of the current receiver.

print_temp

This command takes a small positive integer as parameter. The parameter corresponds to a method temporary of the currently executing method; 1 represents the first temporary, 2 the second, etc. The routine d_print_temp_num( ) calculates where to find this in the temporaries of the appropriate context on the stack, and prints it as an oop.

4.8.4.9. Commands for displaying Alltalk runtime data

The commands in this section simply print the contents of Alltalk interpreter data structures. They are meant to be used mainly by Alltalk systems (implementation) programmers.

print_bcode

This command simply causes the debugger to print the currently executing bytecode. Note that print_bcode is a general routine, which is also used by the database lister.

print_active_cntx, print_block_stub, print_cntx_of_stub

The interpreter maintains contexts, one for each currently-active message and block, in an array, one array per Smalltalk process. The interpreter also maintains an array (one for each Smalltalk process) for each block that has been set up and is active or has the potential to become active (we call these block stubs). These commands allow the user to print the contents of any of these contexts or block stubs.

The command print_active_cntx takes as a parameter a positive integer which is the index into the array of contexts of the current process. That particular context printed using d_print_cntx( ).

The command print_block_stub takes as a parameter a block stub id. This is a positive integer greater than NIT_CNTX_ID. This range of integers is used to track blocks independently of normal objects.

The routine d_print_block_stub( ) translates this into an index into the array of block stubs for the current process; the appropriate block stub is then printed.

The command print_cntx_of_stub also takes a block stub id as parameter. As with print_block_stub, it finds the appropriate stub; but it uses d_print_cntx( ) to print the active context associated with that stub, if there is one.

print_process

This command causes the debugger to print the contents of the interpreter data structure associated with a particular Smalltalk process, not including the context stack or the block stub stack.

status

This command is equivalent to executing the following commands, all without parameters:

stop_in (prints method stops, if any);
stop_at (prints bytecode stop, if any);
stat_status (prints statistics collections that are turned on, if any); and
set (prints the display/trace switches that are turned on, if any).

4.8.4.10. Commands for collecting message statistics

A tool for collecting statistics on Alltalk messages is implemented in Alltalk. This tool is invoked from within RAID. Basically, it keeps track of which methods are executed, how many times each is executed, and how much time is spent on behalf of each method and its descendants.

There are two main data structures for keeping these statistics. One is a table which keeps a running total of the messages stats for messages which have already returned; the table is stored in the global variable, D_stat_tab. The other is a stack of records, one record for each message which is active, i.e., has been sent, but has not yet returned. There is one stack per Smalltalk process, and these are stored in the global array, D_stat_stack. When a method returns, its record is popped from the stack, and 'added' to the table.

We now describe the records used on the stack. A stack record is defined by struct msg_rec. It contains the class and selector of the method; this is used to identify the method. It also contains the class and selector of the method which invoked it. The stack record also contains two pairs of the following form: a time stamp, and a cumulative time. One stamp/cum pair is used to keep track of time spent on behalf of this method and its descendants; the other stamp/cum pair keeps track of time spent in the method only.

In a field called self plus descendants, the statistics tool stores in the start_time sub-field the time at which the method begins executing. When the method returns, it subtracts start_time from the current time, and store the result in the elap_time sub-field.

In a field called self, the statistics tool stores in the time_stamp sub-field the time at which the method begins executing. When the method itself sends a message, time_stamp is subtracted from the current time, added to the cum_time sub-field which is initially zero. When control returns to this method, time_stamp is reset. When this method returns, time_stamp is again subtracted from the current time, and result added to cum_time. In this way, cum_time keeps track of only the time spent on behalf of this method, exclusive of its descendants.

We show the distinction between the two pairs of data in Table 4.4.

TABLE 4.4

| EVENT | SELF + DESC | SELF |
| --- | --- | --- |
| meth 1 starts | start_time set • | • time_stamp set |
| meth 1 sends msg | • | • cum_time re-calc'd |
| sent msg returns | • | • time_stamp set |
| meth 1 sends msg | • | • cum_time re-calc'd |
| sent msg returns | • | • time_stamp set |
| meth 1 returns | elap_time calc'd • | • cum_time re-calc'd |
| | elap_time (self + desc)— + | + — cum_time (self) |

The stats table is an array of records. Each record is of the type struct method_rec. A record contains a class and selector to identify its method, plus the number of times it has been sent (and returned), plus the total time spent on its behalf, plus the total time spent on behalf of it and its descendants. When a method returns, the routine shown in table 4.5 is performed.

TABLE 4.5

```
update top message_rec on D_stat_stack.
call d_stat_stack_pop( ) to pop this top message_
    rec from D_stat_stack.
call d_stat_tab_insert( ) to insert the top message_
    rec into the stats table, D_stat-tab.
```

The routine d_stat_tab_insert( ) works as shown in Table 4.6.

TABLE 4.6

```
if (message_rec to be inserted already has a corresponding
method_rec entry in D_stat_tab)
{
    call d_stat_tab_update( ) to add to the time fields
    in that record.
}
else
{
    if (D_stat_tab is full)
    {
        call d_stat_tab_overflow( )
    }
    else
    {
        call d_stat_tab_add( ) to add a new entry to the
        table
    }
    endif
}
endif
```

Five commands are available from RAID that affect message statistics collection. The command stat_on turns on collection of statistics; stat_off turns off collection. This is done by setting and resetting the switch, D_STAT. This switch is tested by send_msg_bcode (and send_param_msg_bcode) and ret_bcode; if the switch is set, these routines cause statistics collection to be done. Neither command affects the table, but both initialize (empty) the stack. The command stat_reset initializes the stack and empties the table. Any statistics collected up to this point are lost. The table can be printed to the screen or to a file using the stat_print command, and one can determine whether or not statistics collection is on by using the stat_status command.

4.8.4.11. Commands for collecting object manager statistics

The statistics tool also includes a means for collecting statistics related to the object manager 48. The statistics collected are mainly counts of various events, and maximum and minimum values of certain object manager variables/sizes.

Basically, the statistics tool uses two instances (D_ostats and D_obuffer_cnts) of one large structure (d_ostat_struct) to keep various statistics. Just as with the message statistics, the collection of object manager statistics can be turned on and off at any time via RAID commands. Also, as with the message statistics, commands are available for printing object manager statistics to the screen or to a file; for resetting the collection 'table'; and for determining whether or not collection is turned on or off.

4.8.4.12. Commands for getting help with RAID help, short_help

RAID has an on-line help facility. When the user enters the help command with a command name as a parameter, he is presented with a manual page (a la UNIX) for that command. The help files are written in UNIX nroff form. When the user requests help on a particular command, the debugger uses the system( ) UNIX library routine to invoke the UNIX more command on the appropriate help file.

Note that the grammar translates the parameter (the command name) from a string to a token (i.e., constant) before passing it on to the d_help( ) routine. The d_help( ) routine then does a switch based on that constant, and displays the correct file.

Invoking the help command without a parameter results in the display of a summary of all commands.

Invoking the short_help command (takes no parameters) causes an even shorter list of all the commands to be displayed.

5. Object Manager

The object manager 48 provides access to objects in the database 40 and in main memory 18. It is used by the compiler 20, interpreter 44, primitives, and utilities. It maintains the database 40 as well as the organization of objects in memory. Object manager 48 is also called by the method-fetcher 50 to fetch methods for the interpreter 44, using the class of the receiver of a message, and the Smalltalk superclass hierarchy. Although the object manager 48 is described herein with reference to the Alltalk tool, the object manager 48 is also useful as a general purpose object-oriented database manager.

5.1. Database Storage Layout

The database 40 consists of 2 UNIX files: db.key and db.prime. The key file provides associative access to the prime file: the access manager 58 hashes into the key file (all of whose records are of fixed length), and finds the address (file offset) of the object in the prime file. The key file record also contains the length of the prime record, so the access manager 58 knows how many bytes to retrieve.

Objects in the prime file are 1 of 6 types: OBJ_REC, a normal Alltalk object as seen by the Alltalk programmer; SYMBOL_XREF, a symbol cross-reference record that contains the string for the symbol and the associated oop of the Alltalk symbol object; and DICT_XREF, which is the Smalltalk dictionary cross-reference record. This dictionary record contains the string that is the name of the global symbol (e.g. Class name), the oop of the associated Alltalk symbol object, as well as the object id of the Alltalk object that has that symbol as the object's global name. The other types are CTL_REC, the control record; CKPT_REC, the checkpoint integrity record; and DLT_REC, a logically deleted object record..

The key file is divided into 2 parts, an objectKeySpace, and a symbolSpace. The objectKeySpace part of the file (which is first in the file) is used to find the address of an object, given the oop (object id). The second part of the file, symbolSpace, is used to find a cross-reference record, given the string associated with a symbol or global. To use the symbolSpace, the access manager 58 hashes the string to get an address in symbolSpace, retrieves the key record at that address, and then proceeds to the prime file to retrieve the cross-reference record, which contains the oop of the object being sought.

The records in the key file are of fixed length, and contain three fields:

1. the address (byte offset) of the object in the prime file
2. the size of the object (in bytes)
3. the type of the object record Collisions in the key file are handled by chaining the objects in the prime file together. If the object at the address indicated by the key file record does not have an id (oop, or string) that matches the target sought, the access manager 58 follows the 'overflow' chain in the records in the prime file, checking the target against the id until it is found. Fastest access to newest objects is provided by placing them first in the overflow chain.

5.2. Database access manager

The routines in the access manager 58 are called mainly by the buffer manager 54 (when objects are to be retrieved), and by the garbage collector 52 and the transaction manager 46 (when objects are to be added/updated in the database at commit points). They are also called by dictionary and symbol access routines discussed later.

Important to the access manager 58 is a "control record", which is stored as the first record in the prime file. This contains the next available oop (to use for new objects), and the next available address in the prime file (used and then updated when new records are added to the prime file). The control record also maintains certain database statistics, including the last checkpoint id. It is written to the database after every commit is complete, to insure proper restart.

The first call to the access routines will open the Unix files, and put a (UNIX) lock on the files, to assure single user access. The lock check can be overridden for read-only access (as in the database-lister utility). The checkpoint integrity record is also checked by the access manager 58 to make sure that the system was not aborted while a 'commit' was in progress. This record is updated in the database with the checkpoint id when the commit starts. If the first call to the access manager finds the checkpoint id in the control record out of sync with the checkpoint id in the checkpoint integrity record, the access manager 58 aborts (the control record is written to the database only after the commit is successful). The only way to recover is to restore from a back-up.

The fetchit function retrieves an object from the database 40, given a record type and a key. The fetched record is placed in the buffers (see buffer manager, below), along with the disk address of the retrieved record. This will be used if/when the record needs to be replaced in the database.

The storeit function is capable of adding a new object (or replacing same) in the database. First the access manager 58 looks at the record's disk address (which was stored with the record in the buffer, when (if) the record was previously retrieved). If this is not NULL, it knows that the record already exists in the database, and it replaces the record using this disk address (records never change their disk address during a run, except when they are lengthened—see below). The responsible program must NULL out this address if the record has changed its key, or if the record has lengthened. If the access manager 58 cannot use the disk address, it assumes it has a new record. It looks at the record to be added/replaced to determine its type (OBJ_REC, DICT_XREF, SYMBOL_XREF), and gets the appropriate key record. If no key entry exists for the new record, it sets one up and adds the record to the end of the prime file. If the key entry does exist a collision results. The access manager 58 fetches the record pointed to by the key, updates the new record's overflow pointer to point to the record currently pointed to by the key record, and then updates the key record to point to the new record being added. This insures that fastest access is to newest records (they are first in the overflow chain).

The forceit function will put a record in the database, but (unlike storeit) checks to see if it is already there. If so, it logically deletes the old copy and adds the new one. This function is called when an object is newly created with an oop that already exists (e.g. a Class), and when an object is lengthened. It uses the storeit function if the new object is not already in the database, or is smaller than the one it is replacing. Else, the access manager 58 gets the old object and logically deletes it (by placing a special mark in the rec_type), and then executes the storeit logic.

Callers of the access methods are expected to have determined the id of the object, even if it is a new one. They can call oop_gen to get the next available id. This routine will look at a table (filled in by the garbage collector 52, when an object is deleted) in an attempt to reuse oops. If none are available for reuse (e.g. at start of run), the access manager 58 creates a new one by using and then incrementing a field in the control record that keeps track of the next oop to create.

The function start_commit is called when a commit is started (normally in the transaction manager). This routine updates the special checkpoint integrity record mentioned above. If the run is aborted before the commit is finished the control record will be out of sync with the checkpoint integrity record, causing subsequent runs to be aborted.

The function chckpt_oop is called when a commit is finished. Presumably, the calling program called start_commit and has now finished writing all of the changed objects to the database (via storeit and forceit), and the database is now in sync with memory. Chckpt_oop will update the control record indicating the commit is finished, and write it to the database. The control record also keeps track of the next oop to use, and the next prime file address to use.

5.3. Buffer manager

The buffer manager 54 maintains the in-memory copy of objects. It is called by the object manager 48 when an existing object is to be fetched or when a new object is to be stored in the buffers. It can be called with the following operations:

1. FETCH_FROM_DB which means that the caller knows that the object is not in the buffers (buffer manager returns an error if it finds it there), and the object is to be fetched from the database and put in the buffers.

2. FETCH which means look in the buffers for the object; if it is not there retrieve it from the database, then update the buffers.

3. STORE which means that a new object is being added, or an existing one being replaced. The buffers are updated with the new (version of the) object.

4. FORCE which means that a new version of an existing object has been constructed, and the old one is to be invalidated (this happens when the length of an existing object is changed, or when the 'become' primitive is executed). New space in the buffer is allocated, the object's disk address is set to zeros (the disk address is control data kept with the object in the buffer), and the object table is updated to point to the new spot in the buffer where the new version of the object will be stored.

The buffer manager 54 uses an object table to keep track of which objects are already in the buffers. The table contains the id and a pointer to each object in the buffers. To retrieve an object the buffer manager hashes into the object table to see if it is already in memory. If not, the object is fetched from the database, placed it in the buffer, and the object table is updated. When the buffer manager 54 needs space in the buffers in which to place a new object, a "forced" object, or an object from the database, it calls upon the pool manager 56 to find the space in the correct buffer. In any case, the buffer manager 54 returns a pointer to the object to the calling program.

5.4. Pool Manager

The pool manager 56 maintains memory for the various buffers. It keeps a total of 7 buffers; small slot, medium slot, and large slot buffers for methods, another set of 3 for non-method objects, and one buffer, "huge", for oversize objects (methods and non-methods can both go in "huge"). Except for the "huge" buffer, all buffers have fixed size slots. Memory for the buffers is preallocated, except for "huge", which is maintained using the UNIX routines: malloc/free.

Pool manager is called to find a spot in a buffer for an object. It uses the size and type (method/non-method) of the object to determine which buffer to search for the empty slot. If a slot is found, a pointer to the slot is returned to the calling program (probably buffer manager 54). It searches for an available slot with the following algorithm.

1. For each buffer a "slot-indicator" is kept, which is the next slot to look at. This is maintained across calls to pool manager, and wraps around when the end of the particular buffer is encountered. It is updated to be one higher than the slot returned the last time the pool manager found space in that buffer.

2. Two searches of the buffer are made, starting at the slot-indicator. On the first pass, a search is made for a slot that is empty, or else holds an object that is not being used (i.e., not in the "in-use" table, see garbage collector section), and whose "usageCount" is 0. This usageCount is incremented every time the object manager 48 fetches the object, and decremented every time the pool manager 56 looks at the object's slot; it indicates the frequency of access to the object. If a slot can not be found on the first pass, the usageCount is ignored on the second pass. If a slot cannot be found on the second pass, it means the buffer is filled with objects that are being held by the interpreter 44, and the run must be stopped (memory is exhausted).

3. The object table is updated by removing the entry for the object in the buffer slot that is about to be reused, and an entry in the table is added for the new object just placed in the buffer.

By having different buffers for small, medium, and large objects the number of slots and the slot size can be tailored to fit the distribution of object sizes in the database. Alltalk runs faster with fixed size slots in each buffer, since this means that no compaction is required by the garbage collector 52. Different buffers are provided for methods vs. other objects because non-methods are expected to be more volatile in their usage than methods, and to have a different size distribution.

5.5. High Level Object Manager Protocol

The object manager 48 provides a set of high-level functions for object access. It is these functions that are used by the interpreter 44, compiler 20, primitives, and others. The access manager 58, pool manager 56, and buffer manager 54 are used to implement these higher level functions.

A program can call the object manager 48 with a call of NEW in order to establish a new object in memory. The class id of the new object must be supplied. The object manager 48 will fetch the class of the new object, and initialize the new object appropriately. The caller must also supply the number of index variables required. The latter parameter can not be changed for the object later: to "grow" an existing object, the FORCE call must be used. The FORCE call will accept the id of the object to be grown, and set up a new object with the specified quantity of index variables. It is up to the calling program (usually a primitive) to set all other data appropriately.

There are two retrieval routines available. Reserve_obj will fetch a requested object, and lock its position in memory until the current method (and all other users) ends. This is done by putting an entry in the "in-use" table for the process and region that is passed in the call to reserve_obj. This table is described in the garbage collector section; it serves to keep track of which objects have their memory address pinned down (until the the garbage collector processes the region specified). The entry does not leave the table until the object is either garbage collected, or, if updated, written to the database. It is the presence of this entry that keeps the pool manager from re-using the object's slot in the buffer. The reserve_obj routine must be used if the caller expects to either update the object, or re-access the object using the pointer returned from the call.

The other retrieval routine is get_obj which also returns a memory pointer to the object requested. This routine will not guarantee that the pointer is valid across calls to the object manager routines. It is used mainly by primitives where only temporary, read-only, access is required.

The object manager requires that no calling program cache object pointers except in the interpreter contexts. It also assumes that no program is maintaining local storage of object id's except the interpreter context temporaries, and instance variables of other objects. The reason for these restrictions is that the garbage collector only knows which objects are referenced through the instance variables of other objects (and context temporaries), and only knows which objects have their addresses cached by having entries in the in-use table; all other objects are fair game to be garbage collected. The entries in the in_use table are tagged with the region id (see the garbage collector), and it is assumed that when the region is collected, the memory pointers are no longer required, and the object's buffer space can then be used for other objects.

The object manager logic also depends on the calling program setting the UPDATE flag in the object if the object has been updated. This is the only indication that he object is to be (eventually) re-written to the database. If an object is to be made permanent in the database (even though it has not references from other object's instance variables), the calling program should 'referenced" to establish this (see the garbage collector section). An updated object's storage in the buffers will not be re-used until after the next commit call. This is assured by an entry being placed in the in-use table for he object, when reserve_obj was called.

New objects and existing objects that have been updated are written to the database when the transaction manager is called to do a commit, or when the garbage collector collects region O of a process (see the garbage collector section). This latter event happens whenever a process terminates, and at end of run. When an object is written to the database, its UPDATE flag is turned off and (if it is not otherwise pinned down), the pool manager can consider its slot in the buffer for reuse.

5.6. Dictionary and Symbol Access Routine

Routines getdictionary and putdictionary update the Smalltalk dictionary, and retrieve an object given a global name (a string). Similarly, getsymbol and putsymbol get an Alltalk symbol object, given the string it represents, and update the cross-reference with a new symbol.

5.7. Method Fetcher

The method fetcher 50 retrieves the appropriate compiled method object given a selector, the receiver's class, whether it is a "send super", and whether the message is to a class or an instance object. It fetches the class and looks up the selector in the dictionary. If not found, it fetches the class's class, and so forth. Normally, it stops in class Object, but continues on if the original message was to a class. In this case, it follows the metaclass chain, as described in the standard Smalltalk reference. The method fetcher 50 employs a table to retain the method id, given a selector, class, and method type. It examines this table first, before chasing the superclass chain.

6. Garbage Collector

Garbage is defined as objects that are no longer reachable, and therefore can be safely discarded. Since there is no explicit delete command available to the programmer in a Smalltalk language, removal of objects is entirely up to the system. Furthermore, since many objects are transient in an Alltalk session, it is important that the objects be collected efficiently with a minimum of disruption to response time. Although the garbage collector 52 is described in connection with the Alltalk tool, it is useful for garbage collection in any heap based language system (such as Lisp, Prolog, and a variety of object-oriented languages, such as Loops, and Flavors). The garbage collector 52 is integrated with the object manager 48 and interpreter 44.

Figure 19:
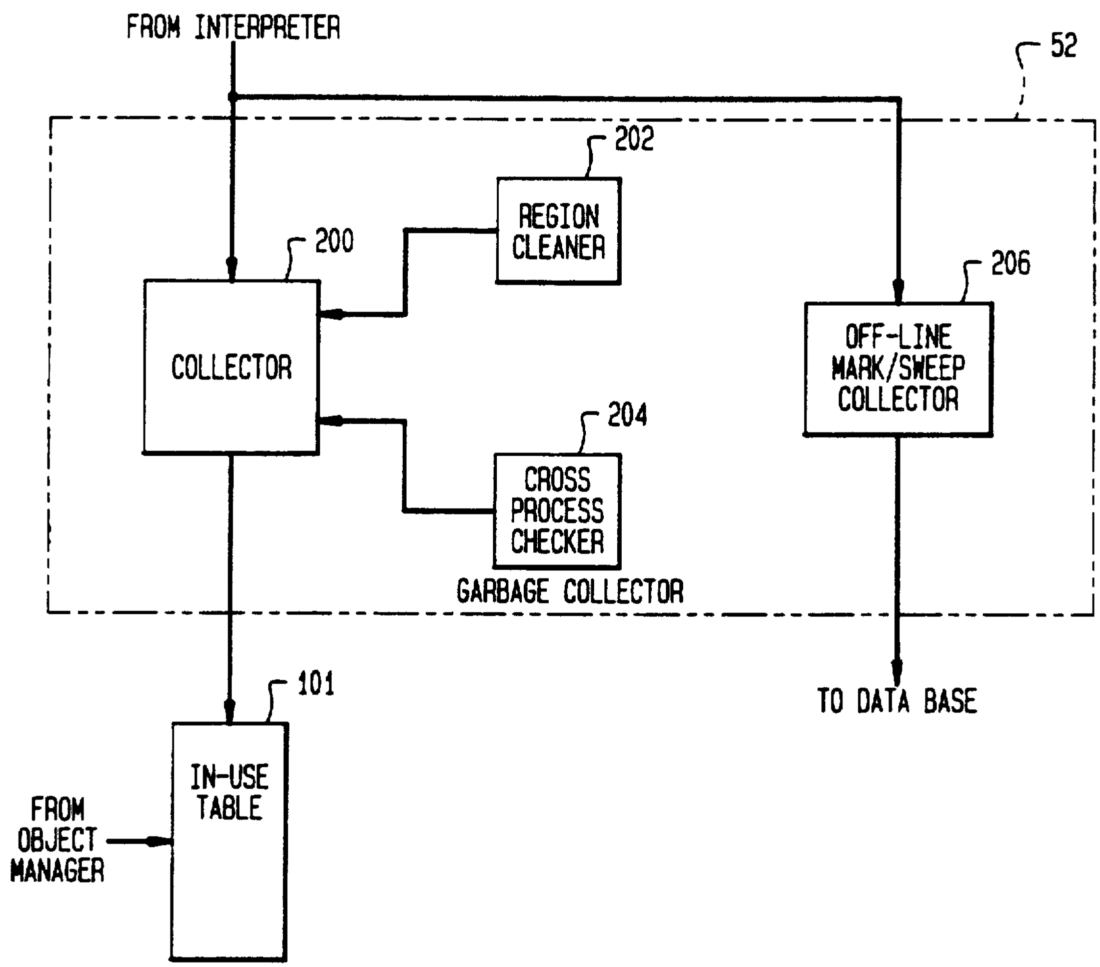
FIG. 19 is a schematic block diagram illustrating the functions of the garbage collector.

The garbage collector 52, shown in more detail in FIG. 19, includes a collector means 200 for implementing the actual garbage collection function, a region cleaner 202 for detecting regions that have accumulated an excess number of objects, and calling the collector 200 to clean such regions; a cross-process checker 204 for insuring that no object in-use by another process is discarded; and an off-line mark/sweep collector 206 called by the interpreter for periodically removing objects from the database 40 that have become unreachable (directly or indirectly) by any object in the database dictionary. The collector 200 employs an in-use table 101 described below, in executing the garbage collection function.

The following definitions will be helpful in describing the garbage collector.

Processes

A process is a Smalltalk object representing a lightweight thread of control. Multiple processes may exist, but only one is active at any time. Processes in Alltalk adhere to the definition in the standard Smalltalk reference.

Contexts

A context is a Smalltalk object representing the state of a method which is executing. Contexts are analogous to stack frames in procedural languages, with the notable exception that allocation/deallocation does not always obey a strict stack discipline. There is one set of contexts per Smalltalk process. In Alltalk, these are managed by the interpreter, rather than being full-fledged objects. As explained before, however, contexts will be transformed into objects when required (i.e. when an owned block is transformed into an object).

Regions

Figure 17:
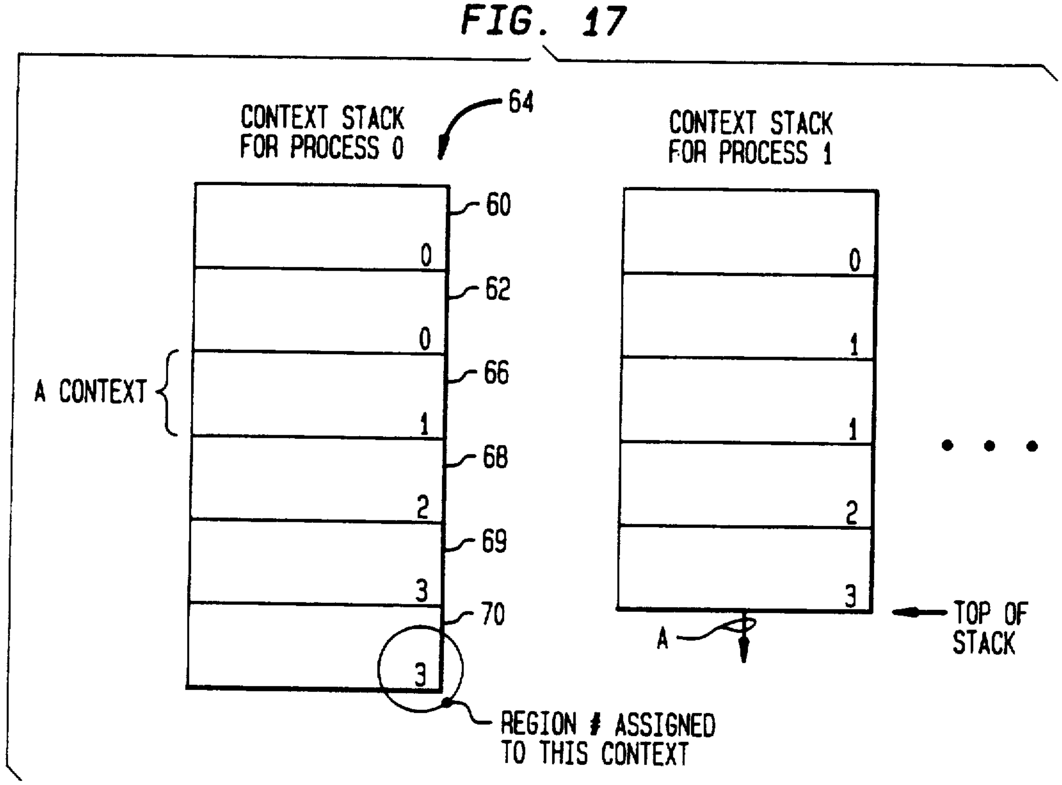
FIGS. 17–18 show the relationships between the context stack, processes, regions, and objects.
Figure 18:
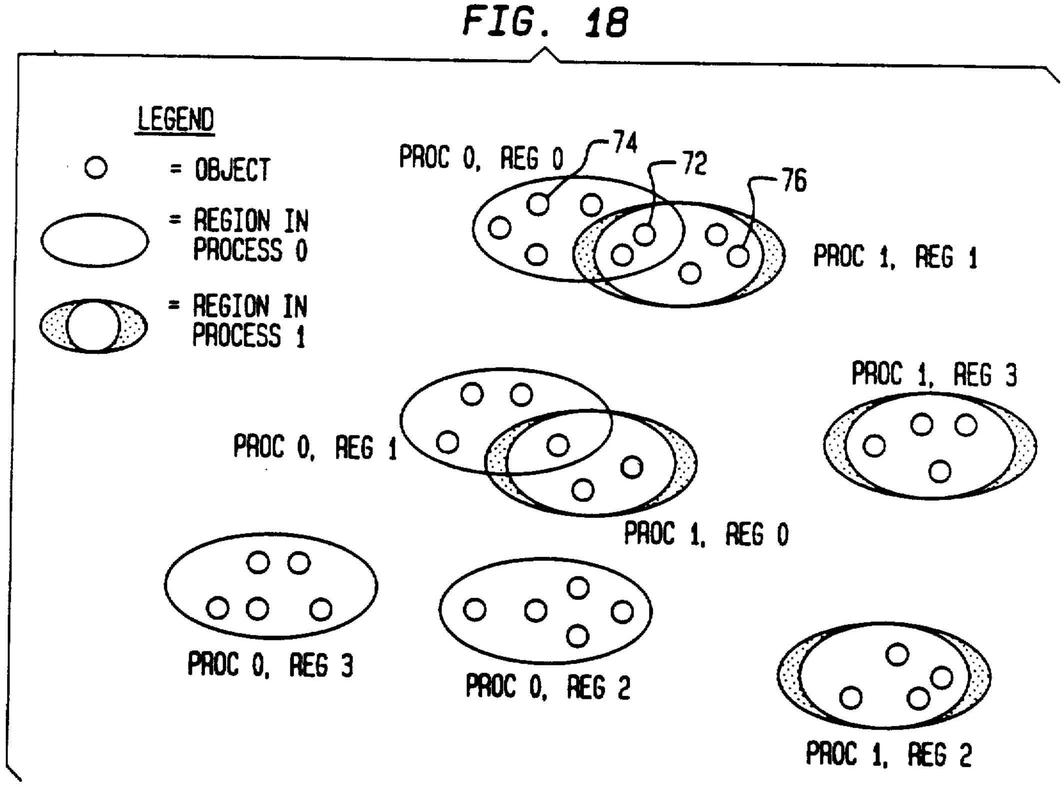

Regions are not Smalltalk objects. They are used in Alltalk for garbage collection. In Alltalk, each context belongs to a region. Several contexts from the same process may belong to the same region, but a context is associated with only one region, and regions do not span processes. When a context is created, it is assigned a region number. Once assigned, a context's region number never changes. Each object created or accessed is assigned the region number of the context that created or accessed it, unless it was already associated with a region with a lower number. After the number of objects in the 'current' region exceeds a fixed maximum, a new region (with an id one greater than the previous one) is started when the next context is created. Thus the region number is the same or increases as one travels down the context stack from sender to receiver. Referring to the Drawings, FIG. 17 shows a context stack for processes 0 and 1. The first two contexts 60 and 62 within the context stack 64 for process 0, belong to the same region (0). The next two contexts 66 and 68 in the stack belong different regions (1 and 2), and the last two contexts 69 and 70 in the stack 64 are assigned to the same region number (3). The stacks for each process grow in the direction of arrow A, by adding contexts to the tops of the stacks. FIG. 18 shows how objects belong to both regions and processes. For example, object 72 belongs to both process 0, region 0, and to process 1, region 1. Object 74, on the other hand, belongs only to process 0 region 0. Object 76 belongs only to process 1 region 1.

Parent/Children objects

If object A refers to object B via one of its instance variables, we call A the parent of B, and B the child of A. When we refer to the transitive closure of A, we mean A's instance variables, and their instance variables, and so on.

6.1. In-use table

The in-use table 101 in Alltalk keeps track of those objects in memory which must not be overwritten and whose location in memory must not be changed. Typically, such objects fall into one of the following categories.

1. Receivers

In Alltalk, the interpreter 44 retrieves the receiver of a message send, and caches a pointer to it in the corresponding context. Until the context returns, this pointer must remain valid.

2. Methods

In order to process a message, the corresponding compiled method must be retrieved. A pointer to this object (as well as a pointer to the currently executing bytecode within the method) is also cached in the corresponding context. Until the context returns, these pointers must remain valid.

3. Temporary objects

At any given time during the execution of an Alltalk application, any number of method executions may be suspended waiting for the return of a message send. Objects created or updated as the result of the execution of such a method may have to be kept in the in-use table until the method returns. They cannot be written to the database, because they may turn out to be garbage (i.e., created only to hold temporary results). This determination can only be made after the method finishes executing.

Figure 20:
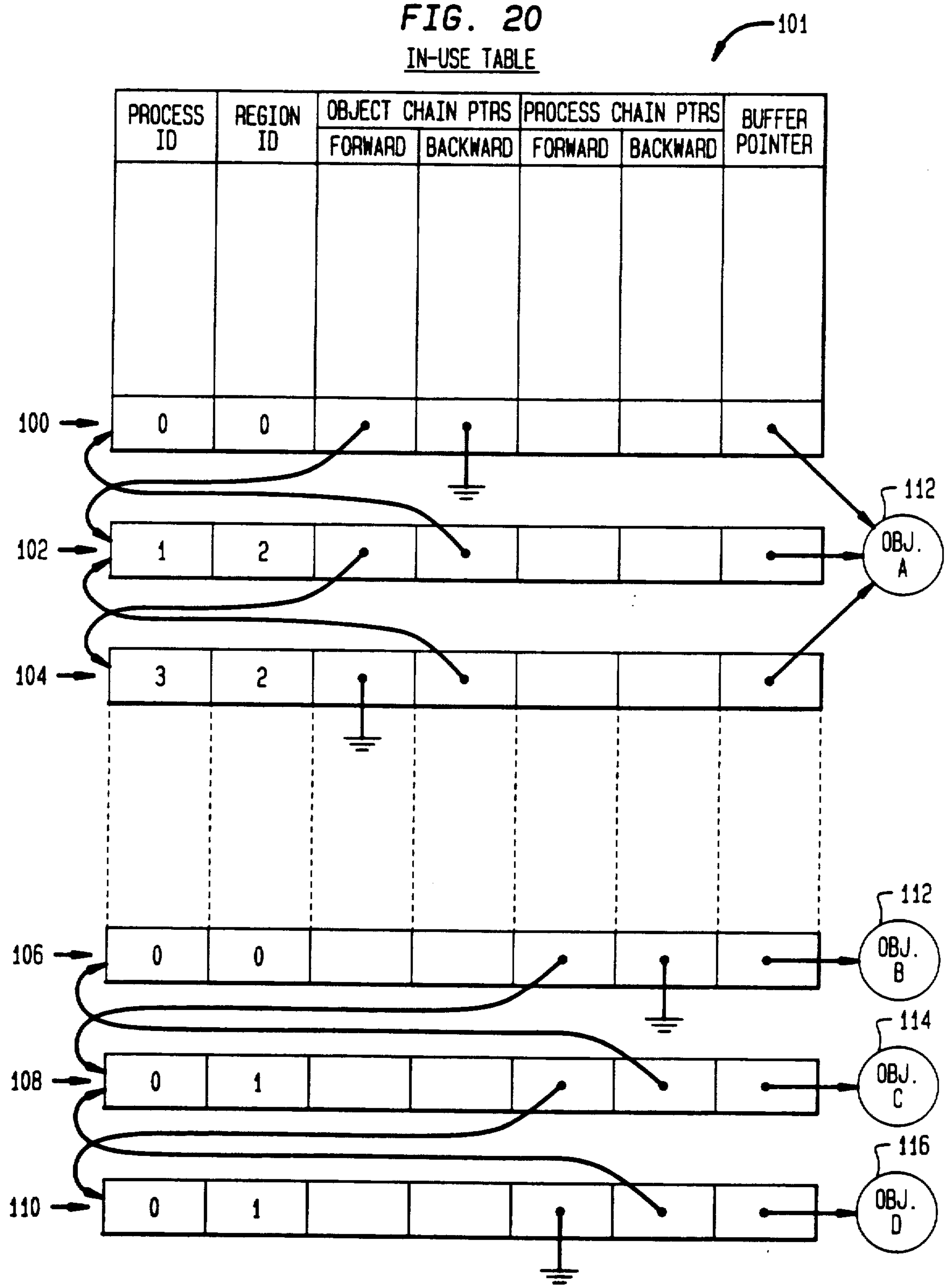
FIG. 20 shows the in-use table's structure and internal relationships.

The object manager 48 makes one entry in the in-use table for each object that needs to be kept in memory. If an object is referenced from multiple processes, it will have multiple entries, one for each process. However, if an object is referenced multiple times from the same process, it has only one entry for those references. Referring to the Drawings, FIG. 20 shows the format of entries in the in-use table 101. An entry has the following fields:

1. A pointer to the object in memory (buffer pointer);
2. The id of the process from which this object is referenced;
3. The region within that process with which the object is associated; and
4. Pointers for chaining this entry to others in the table.

Entries 100–110 in the in-use table 101 are chained together in two ways. First, all entries for a given object (e.g. object A, 112, entries 100–104) are chained across processes. In this way, the garbage collector 52 keeps track of the fact that an object may be referenced from more than one process. Additionally, all entries for a given process are chained across objects. For example, entries 106–110 are all for process 0. This chain connects objects from tail to head, in order from highest region to lowest, for a given process. This allows the garbage collector 52 to scan all objects within a process from high regions to low regions, in order to collect (discard) unused objects efficiently.

6.2. Assigning objects to regions

Objects are put into the in-use table by the object manager, and assigned to regions by the garbage collector as follows: (Note that when an object is 'moved' to another region, it is not physically moved; its region field in the in-use table changed).

New objects are put into the table when created, and are assigned to the region of the context in which they were created;

Objects retrieved from the database are put into the table, and assigned to the region of the context in which they were retrieved. When the object manager is called to fetch an object it is (barely) possible that the request contain a region less than that already associated with the object (in the in-use table). In this case, the existing reference is discarded, and the object is re-associated with the lower region. Whenever this is done, objects in the transitive closure are moved to the region of this parent, for any that are currently at a higher region than this parent;

When an object is assigned to an instance variable, it (and its transitive closure) are moved to the region of the parent object, if the parent is in a lower region. Note that only those children that are already in the in-use table have to be adjusted; those children that are not in the table do not have to be retrieved from the database; and When a method does a return, the returned object (and its transitive closure) are moved to the region of the context to which it is returned, if the latter is a lower region. Again, only those children that are already in the table and are in a higher region have to be adjusted.

6.4. How the buffers, object table, and in-use table are related

Figure 21:
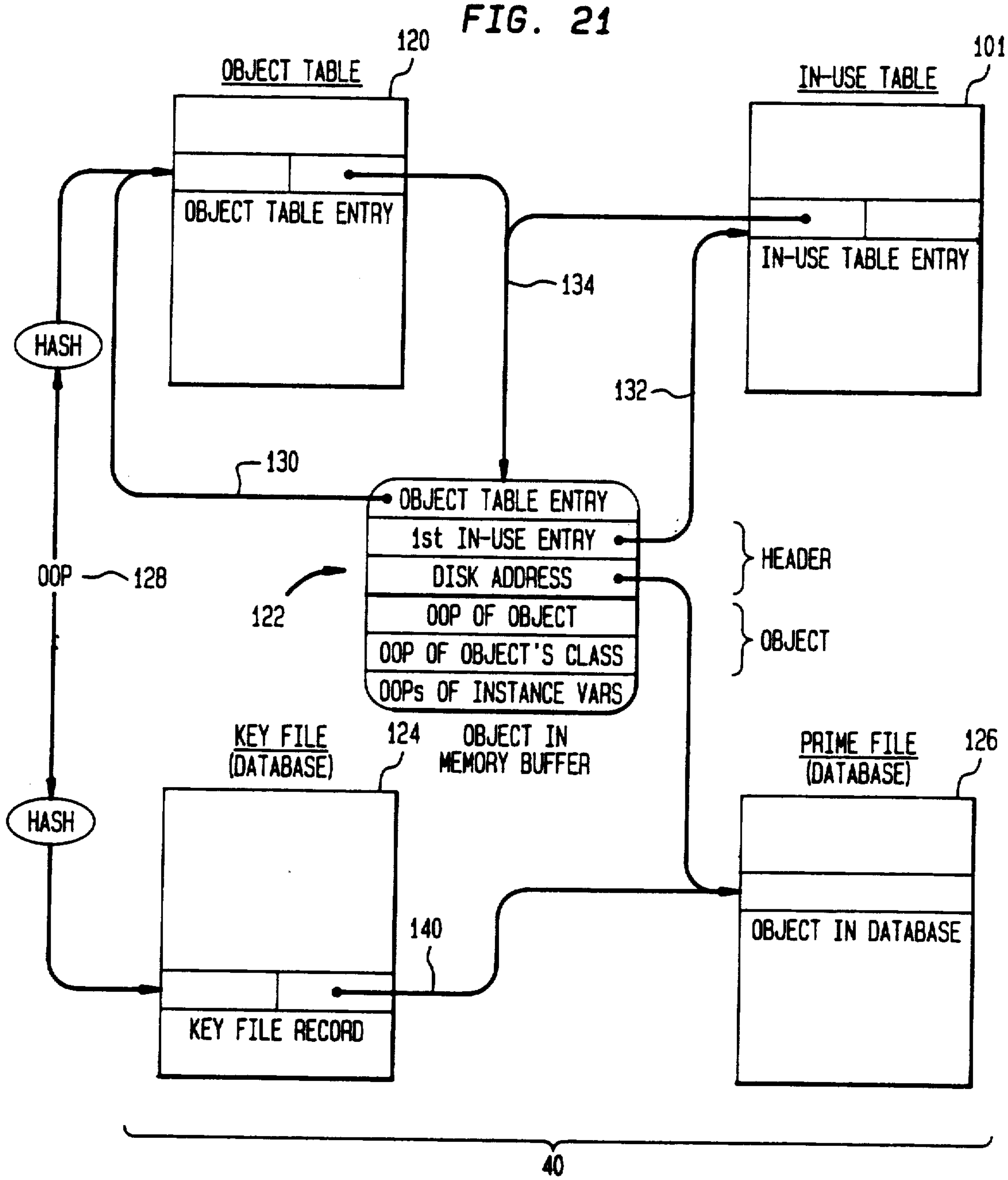
FIG. 21 shows the in-use table's relationships with the object table, the buffers, and the database.

Referring to the Drawings, FIG. 21 shows how the in-use table 101, the object table 120, an object in the buffers 122, and the key file 124 and the prime file 126 of the database 40 are all related. Given an object's id (oop) 128, the object manager hashes the oop to find the entry in the object table 120, and follows the pointer 134 to determine its location in memory (the buffers 122). The object in the buffer 122 has a header portion which is used only by the object manager; it is not visible to the interpreter, and it does not get written to the database 40. In addition to caching the disk address of the object, this header contains a pointer 130 back to the object's entry in the object table 120, and a pointer 132 to the object's first entry in the in-use table 101. FIG. 21 also shows how the object address in the key file 124 points to the location of the object in the prime file 126 of database 40. When the object manager cannot find the object in the object table 122, it retrieves the object from the database. It hashes the object's id 128 to access the key file, which contains the actual disk address 140 in the prime file 126 in the database 40.

6.5. Collecting regions

Figure 22:
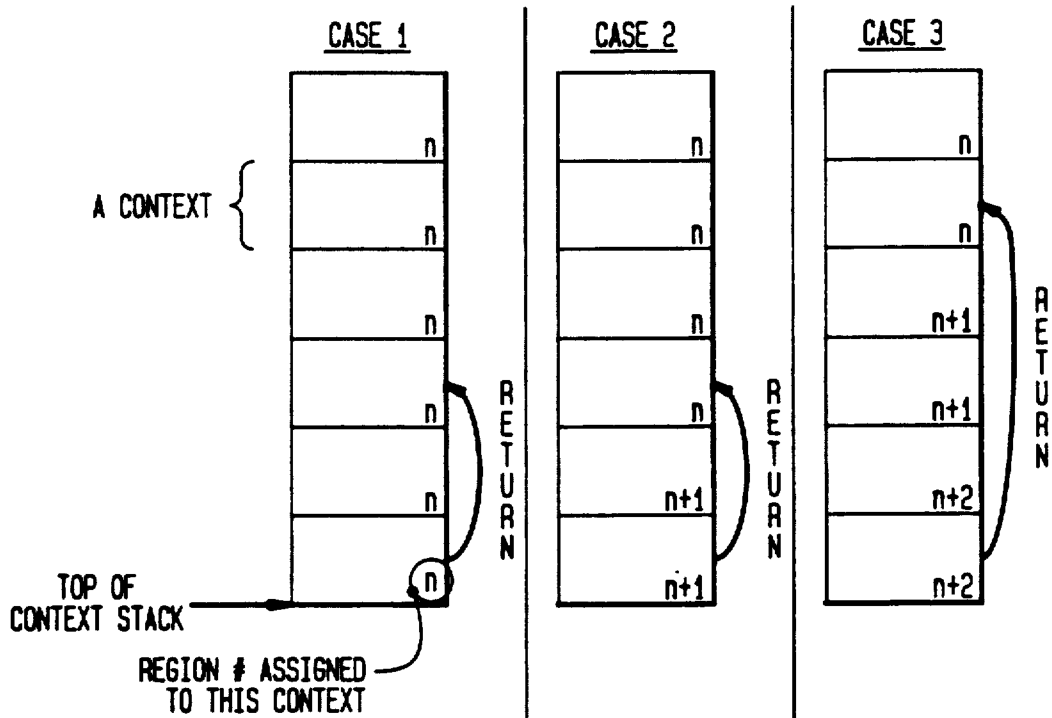
FIG. 22 shows how garbage is collected upon a method and return.

Most garbage objects are collected by the collector 200, using the following logic. When returning from a method, if the context to which the process is returning belongs to a region with an id at least two lower than the current region number before returning, the regions with id higher than that of the context to which it is returning are collected. Referring to the Drawings, FIG. 22 shows, in case 1, a context in region n returning to another in region n. Since the region number is the same, no action is taken. Case 2 shows a context in region n+1 returning to one in region n. Since n+1 is not two larger than n, no action is taken. Case 3 shows a context in region n+2 returning to one in region n. Since n+2 is two larger than n, the collector 200 collects regions n+2 and n+1, and all other regions having number greater than n.

A region is collected by following the chain of objects in the in-use table for the current process. Starting at the tail of the chain, entries are removed until an entry is reached belonging to the region of the context to which the process is returning. When an entry is removed, a check to see if it is the only entry in the table for that object (by checking the cross-process/by-object chain for the object). If it was the only entry for that object, the collector 52 goes to its header in memory, and null out its pointer to the in-use table. The pool manager 56 then knows that slot can be re-used. If the pool manager 56 decides to reuse the slot, it follows the back pointer to the object's entry in the object table, and deletes that entry.

The above architecture offers performance improvements over others for the following reasons:

a. Storage compaction

Some garbage collectors must compact any storage recovered. Because we have fixed size slots in our buffer pools, we do not have to compact the object space. This means that our collector need not move objects around in memory, but only deals with the in-use table entries.

b. Evenness of processing

Many (non-reference counting) garbage collectors do little processing at reference creation time, but wait until the collector is called in order to clean out a region by moving objects to other regions. Our collector does much of its work when cross-region instance variable assignments are made, and when processing Smalltalk 'return' statements, which distributes the garbage collection processing evenly throughout the run. This means that the periods when the system is doing garbage collection (and is thus unavailable to the user) is spread evenly throughout the session and there are no ong periods of time when the system is unavailable.

c. Connection with the interpreter

We have integrated the garbage collector with the nterpreter in a way that reduces the time spent in garbage collection, which improves overall performance. Because we invoke the collector upon a message 'return', and then move the returned object to another egion, we have a natural point where intermediate esults and other transient objects associated with the nethod that is terminating can be safely collected. All objects left in the regions being collected can now be iscarded. Thus garbage collection at these points is xtremely efficient, involving very little processing.

6.6. Region Cleaning

It is possible (but rare) for a region to accumulate an xcessive number of objects before the above collector invoked. The region cleaner 202 detects this and the ollector 200 "cleans" the region(s) involved. To detect hat a region needs to be cleaned, the region cleaner 202 eeps track (by region) of the number of objects accuulated since the last "region cleaning". When this xceeds a certain maximum point (e.g., 150 objects), the egion cleaner 202 invokes the collector 200 for the egion involved. The number of objects in one of the egions is checked every time any new object is created. he region that is checked is the "next" one, which is hat region in the same process that has a region number hat is 1 higher than that of the region that was checked on the previous object creation. Thus, for checking, gions are ordered by process number, and then region umber within process. After the last region has been hecked for a process, the next to be checked will be gion 0 of the process with a process number that is 1 gher than the previous one that was checked. When l regions within all processes have been checked, the next" region to be checked is set to be region 0, within ocess 0.

The region cleaner is a procedure that looks at the gion to be cleaned, and all regions with region numrs less than this, within the same process. All updated tabase objects, and all objects pointed to by the intereter contexts (within the same process/regions) are rked via direct memory pointers (i.e. receivers and ethod objects). Then the transitive closure of all obcts pointed to by marked objects is marked. However, y object that is not in memory, or not in a region ng cleaned, or that is neither a newly created nor an dated object is not marked. These restrictions limit number of objects examined during the mark/eep, and keep the mark/sweep entirely main memory that no disk accesses occur.

6.7. Cross-Process References

The above discussion related how contexts within a gle process interact with the garbage collector 52. r the most part, processes can be handled indepently vis a vis garbage collection. As mentioned ve, however, objects can be shared across processes, l we must insure that no object is discarded that is in by another process. This is handled with the following logic:

1. When the interpreter 44 establishes a new process, it knows which (non-global) objects from the spawning process are being shared with the new process. Upon creation of the new process, the interpreter asks the object manager 48 to place entries for each shared object in the in-use table, at the new process id. The object manager will create entries for the object and its transitive closure at the new process.

It may also happen that one process may request access to an object that is in use by another. When this happens, entries are placed in the in-use table for the requested object, and its transitive closure for the requesting process.

Thus we see that any object shared between 2 or more processes has entries for each process in the in-use table, and so do objects reachable from the shared object (children, etc). All entries for a single object, (used in multiple processes) are linked together, so it is easy to determine which processes share a given object.
2. The collector will not discard any object if it is in use by another process: when the region for a process is collected, all entries in the in-use table are removed for that process, but the object is not removed from the object table, nor is its space reclaimed, until there are no more processes sharing the object.
3. Whenever an instance variable in an object P is updated with the id of an object C, the cross process checker 204 checks to see if the new parent (P) is in use at multiple processes. If it is, the child C (and its children, etc), have entries placed in the in-use table for whatever other processes also share the parent, that do not already share the child (etc). The child is placed in the same region that owns the parent (for the process). This logic is in addition to the region checking between parent and child mentioned above.

It can be seen then, that any object reachable through an object P that is shared across processes, has entries for all children of P (etc) in each process that shares P. Thus collecting any single process will not remove any object that is still reachable by another process. Only when all processes that are sharing an object have removed their entries from the in-use table will the object manager 48 discard the object and re-use the space.

6.8. Offline Mark/Sweep Collector

Objects are not written to the database 40 unless they are reachable (at commit time) by some object in the database. An off-line mark/sweep collector 206 is run periodically to remove objects from the database that have subsequently become unreachable. The same utility removes logically deleted objects and re-organizes the database for efficiency.

The basic idea is to "mark" all objects that can be reached in the database, and then, during a second phase (the "sweep"), delete all objects that have not been marked. During the second phase, we also "unmark" all marked records, preparing for the next mark/sweep run.

It is not possible to run the Alltalk system and mark/sweep at the same time, since Alltalk could place new (unmarked) objects in the database which could be incorrectly deleted during the sweep phase. A UNIX lock in the object manager keeps mark/sweep from being started if Alltalk is running (and Alltalk from starting if mark/sweep is running). If mark/sweep is interrupted and re-started, the re-start will first unmark all marked records, and then re-do the mark phase.

Certain objects set up by the compiler are outside the mark/sweep logic: these are mainly constants compiled into methods. These constants are not 'reachable' in the normal way, and instead, have a flag ("PERMANENT OBJECT") set, that cause mark/sweep to treat these as already "marked". Other examples of permanent objects are symbol objects for selectors established by the compiler or other symbol objects pointed to from the global dictionary. The only way to get rid of these is to completely rebuild the database. This is not a problem, if applications avoid putting data in the global dictionary, but instead use regular Smalltalk dictionaries (pointed to by the global dictionary).

It is the existence of these "non-reachable" (but permanent) objects that require us to read all objects in the database in the mark phase (otherwise only the global dictionary entries would have to be processed).

The "root" of reachable trees in the database start at the dictionary records (see the object manager description above). These records have their "PERMANENT OBJECT" flag on and will cause the mark phase to retain them, and their children (see below).

6.8.1. Mark phase

The mark phase reads the database sequentially. It skips over any (already) marked objects, nonpermanent objects, and logically deleted objects (the latter objects are explained in the object manager description above). The remaining unmarked permanent objects are processed by:

1. Marking the object, and then writing the id of the object to a sequential file (the "reorg file"; the sweep phase will process this), which represents all reachable objects.
2. Placing all of the marked/permanent object's instance variables (its children) in a "kids" table. Classes have their method dictionary entries placed in the kids table as well to insure that the method objects will be marked.

Before processing the next sequential record from the database, the mark phase processes all of the children in the "kids" table first (fetching these from the database, and if they are not already marked: marking them, putting their keys in the reorg file, and adding their children to the kids table). It can be seen that the records placed on the reorg file are in "children depth first", which will cluster parents and their immediate children together.

During the mark phase, integrity checking and statistic gathering are also performed.

6.8.2. Sweep phase

First the old database (prime and index) is copied to back-up copies which will insure that we can recover if the sweep phase is interrupted. Then a new database is initialized. Then the reorg file is read sequentially. Each record is processed as follows:

1. Fetch the object indicated by the reorg record, from the (old) database. If the fetched object is not a class object, place the id of the last object processed for the class of the object, in the fetched object's class chain (this keeps a pointer chain between all objects of the same class). Store away the fetched object's id for use in updating the class of the next object, of the same class, that is processed during this phase.
2. Write the object fetched in step 1 to the new database at the next available byte (i.e., the objects are packed together in the order encountered on the reorg file).

At the end of the sweep phase, the mark/sweep collector 206 updates all of the classes with the first instance of that class (head of class chain), to anchor the class instance chain.

The sweep phase (like the mark phase) keeps various statistics and does integrity checking as it goes along, and reports them out at the end.

6.9. Transaction Management

When region 0 of a process is collected, that process has ended and all objects created by that process, that are reachable from the database, are written to the database by the garbage collector 52. To accomplish this, the collector will signal that a commit is in process, and then write out all objects to the database that remain in the process (all have been moved to region 0 by this time), and which cannot be garbage collected. Any object that is also shared by another process is not written out, since this will be taken care of when that other process terminates. Note that the shared object could be garbage collected between the time when one sharing process terminates, and the other sharing process terminates. Not writing the object out when the first process terminates results in fewer "garbage" objects being written to the database.

A commit routine flushes objects to the database that are reachable from database objects. An abort routine invalidates all objects in the buffers which have been updated or created since the last commit. This forces subsequent accesses to these objects to be fetched from the database, and thus effectively "backs out" any changes since the last commit.

7. Logic Facility

Next we describe ALF, the Alltalk Logic Facility, which gives the Smalltalk programmer logic programming capabilities, integrated in a natural way with the object-oriented programming paradigm. The word ALF stands for both the programming language (which is an extension to Prolog), and the runtime logic used to maintain, compile, and execute ALF programs.

7.1. Introduction

ALF is written entirely in Alltalk, and runs under the Alltalk system like any other application. Facilities are provided to compile logic programming statements, to group them into programs, and to submit logic queries against ALF programs. All of these features can be invoked from any Alltalk program and answers to queries can be subsequently used in Alltalk programs. Since ALF is implemented in the Alltalk system, ALF also provides permanence for its objects, i.e., rules, facts and queries.

In the following text, Smalltalk classes are capitalized, and in general Smalltalk nomenclature is in italics or boldface. Multiple word keywords are run together, with capital letters indicating word breaks, as in solveQuery.

7.2. ALF Language 7.2.1. Relationship to Prolog and LOGIN

The ALF language is similar to the LOGIN language developed by Hassan Ait-Kaci and Roger Nasr, which in turn is an extension to Prolog. ALF differs from LOGIN in some details of syntax, and in its integration with the Smalltalk language. Both ALF and LOGIN generalize unification by taking into account a lattice relationship among types, which in the case of ALF is the Smalltalk class hierarchy. Both ALF and LOGIN also generalizes the syntax for terms to allow "attribute labels", which for ALF are taken as identical to the Smalltalk (names of) instance variables.

7.2.2. Definition of ALF

As in Prolog, ALF statements are made up of clauses, vhich have a head, followed by an arrow, followed by . tail. The head is a single atom, while the tail is a list of .toms separated by commas. Clauses with both a head .nd a tail are called rules, those with only a head are :alled facts, and those with only a tail are called queries, s in standard Prolog terminology. Again, as in Prolog, toms are comprised of predicate symbols with argu- ıents (called terms). The terms are named (unlike Pro- ɔg) rather than being positional, and (again, unlike 'rolog) can be typed. The type is indicated by the name ·f a Smalltalk class, and the type itself can be further ualified by giving additional term values for the type lass (and these may again by typed, and so on, indefi- itely).

Unification of atoms in ALF is the same as in Prolog, xcept that the unification of logic variable terms takes ıto account the typing of the logic variable. The fol- ɔwing examples will make clear how this works.

7.2.3. Example of ALF rules

Here is an example of an ALF rule:

```
Hearty(thing=Person(name=X:)) ←
        Healthy(thing=Person(name=X:, age=Y:)),
        LessThan(smaller=Y:, large=100).
```

In this example, Hearty, Healthy, and LessThan are ll the names of (Smalltalk) subclasses of class Predi- ate. Hearty and Healthy have at least one instance ariable called thing. It may be that there are other ıstance variables in Hearty and/or Healthy but there is o way to tell from the rule's specification. Similarly, .essThan has at least two instance variables, called maller and larger. Person, which works like a Prolog ınctor, is merely some subclass of class Object. It has t least two instance variables called name and age. ınything followed by a colon is (the name of) a logic ariable, so X: and Y: are both logic variable names.

The rule states that anything that is a person, is ealthy, and whose age is less than 100 is also hearty. If 'e have an object in the Alltalk system of class Healthy 'hose instance variable thing has an assigned value that of class Person, and if this Person object is such as to ave an age that is smaller than 100, the ALF resolution ıechanism when applied against the above rule will llow us to assert that the name of our child is also the ame of a hearty person. Now consider the similar rule:

```
Hearty(thing=Person(name=X:)) ←
        Healthy(thing=Z:Person(name=X:, age=Y:)),
        LessThan(smaller=Y:, larger=100).
```

Typing the logic variable Z: allows the ALF unifica- on rule to consider objects of subclasses of class Per- ɔn (as well as objects of class Person itself) to unify 'ith the thing object. Thus, suppose we have an object ı the Alltalk system of class Healthy whose instance ariable thing has an assigned value that is of class hild. Further suppose that class Child is a subclass of .ass Person. Thus class Child also has instance vari- ɔles of name and age, inherited from class Person. The .LF unification algorithm, will allow the first atom of ıe tail of the above rule to unify with our fact, and our ıstance of Child (which we assigned into the thing :tribute) will unify with the "Person(name=X:, ʒe=Y:)" term, binding X: to the name that occurs in our specific instance of the class Child. If this ınstance's age (now bound to Y:) is less than 100, the ALF resolution mechanism will allow us to assert that the name of our child is also the name of a hearty person It is not required to type the instance variables at any level. For example the rule

```
Hearty(thing=X:)←Healthy(thing=X:).
```

asserts that any thing that is healthy is also hearty. On the other hand, typing one of the logic variables in the above:

```
Hearty(thing=X:)←Healthy(thing=X:Person).
```

asserts that healthy persons are also hearty (and so are any healthy things that happen to be instances of subclasses of class Person). Type qualification can be nested indefinitely. Thus we may have:

```
Hearty(thing=X:) ←
    Healthy(thing=X:Person(profile=Profile(age=W:,
        country=Y:,hobby=Sport(name=
        "jogging",level=Z:)))),
    LessThan(smaller=W:, larger=65),
    SportsLoving(Y:),
    LevelLessThan(lower="novice", higher=Z:).
```

which means that any person that is healthy, is less than 65 years of age, from a sports-loving country, and has a hobby of jogging with an expertise level greater than "novice" is hearty.

The syntax of the ALF language is discussed further in the section on the lexical analyzer.

7.2.4. Built-in Predicates in ALF

Unification is accomplished through a method in class Object. This method is overridden for built-in predicates (like LessThan and LevelLessThan in the above examples). Thus Smalltalk polymorphism allows one to specify different unification algorithms for each of the built-in predicates. It should also be noted that the unification algorithm tests for "=", implying that the "=" selector will be resolved in the class of the first unificand: another example of how Smalltalk's polymorphism is used during unification.

As a further integration of ALF and Smalltalk, we have established the following built-in predicates as subclasses of class Predicate: Send0, Send1, Send2, . . . in order to send Smalltalk messages from ALF programs. These predicates take arguments receiver, answer, selector, and n additional arguments. The receiver is the receiver of the message to be sent, the answer is the object returned from the message send, the selector is that of the message send (i.e., a Symbol representing the selector to accomplish the message send), and the remaining arguments, if any, are arguments to the message send itself. The unification algorithm in these SendN predicates cause the indicated message to be sent. The receiver must be bound, as must the selector. The message is sent, and the result is either bound to the answer or checked against it, depending on whether the answer is free or bound in the goal being proved.

In order to provide access to Alltalk objects that are not Predicates (or subclasses of class Predicate) we have established the built-in predicate Exists(is=X:). This will answer true if its single argument exists in the database. Thus SameNames(ssNo=X:)←Exists(is=Person(firstName=Z:, lastName=Z:,ssNo=X:))

when invoked by the query

←SameNames(ssNo=X:)

will cause the database to be scanned for all objects of class Person (and subclasses thereof) with the same first and last name. This Exists built-in predicate will allow any object in the database to be considered a atom, without the need to explicitly set up predicates and assign these objects to their arguments. That is, all ALF programs implicitly assume a set of facts: Exists(is=X:) where X: is any object in the Alltalk database. Exists may appear only in the tail of a clause, not in the head.

7.3. ALF Programs

In ALF, clauses are grouped into AlfPrograms. An instance of class AlfProgram has an instance variable ruleDictionary, which contains lists of the clauses (rules and facts) belonging to the program, keyed by the head predicate. As in standard Prolog, the order within the lists is the order of assertion, and the ALF resolution mechanism respects this. Other instance variables of AlfProgram are author, date, comment, and name. Removal of a clause from a program's ruleDictionary provides a Prolog-like retract facility. Addition of a clause to a program gives a Prolog-like assert facility.

There is a class variable in AlfProgram, called PgmDictionary, which registers all of the ALF programs in the system, keyed by the program's name. Queries in ALF are submitted against a specific AlfProgram. Throughout execution of the query, the resolution mechanism looks first at the ruleDictionary for the program requested. If a rule with the appropriate head is not found there, it looks at the rules in the ruleDictionary for the program alfBuiltIn. This is the way that programs can all share common rules (like the built-in predicates, and others, like the ubiquitous append).

7.4. Object representation of ALF clauses

All clauses are represented in Alltalk as instances of class Clause, and are ALF rules, facts, and queries. Included in the instance variables of class Clause are head and tail. If head is nil, we have a query. If tail is nil, we have a fact. Head must be of class Predicate, or a subclass thereof; tail is a LinkedList, whose links must be of class Predicate, or a subclass thereof. An example of compiling a rule is given below. The compilation process merely consists of setting up the appropriate instance of class Clause, and assigning to the head and tail the appropriate objects. If the fields (instance variables) in the predicates are further specified, we set up instance objects of the appropriate class and initialize the predicates' instance variables to these objects. For any instance variable not specified (either in the predicate or elsewhere in the terms), we set up separate instances of class LogicVariable and initialize these unstated instance variables appropriately.

As an example of the compilation process, consider the first "Hearty" rule specified above. To compile this we do the following:

1. Set up a new instance of class Clause to hold the rule. Call it newClause.
2. Compile the head of the rule.
   A. Set up an instance of class Hearty. Call it newHearty.
   B. Set up an instance of class Person. Call it newPerson. Set its instance variable name to a new instance of class LogicVariable which will be known by the user as X:. Set other instance variables, if any, in the new Person to new (anonymous) instances of class LogicVariable.
   C. Assign newPerson to the thing instance variable in the newHearty. Set any nonspecified instance variables in newHearty to new (anonymous) instances of class LogicVariable.
   D. Assign the newHearty into the head instance variable of newClause.
3. Build up the tail.
   A. Make a new instance of class Healthy. Call it newHealthy.
   B. Make a new instance of class Person, call it newPerson2, and assign its name instance variable from the same logicVariable assigned in the head (X:). Assign into the instance variable age in newPerson2 a new instance of class LogicVariable, which will be known to the user by the name Y:.
   C. Assign the newPerson2 into the thing instance variable of the newHealthy. As above, initialize any unspecified instance variables to new, anonymous instances of LogicVariable.
   D. Assign the instance newHealthy into the tail linked list of the newClause.
   E. Build a new instance of class LessThan, called newLessThan, and assign to its instance variable smaller the appropriate instance of LogicVariable, which has already been set up (Y:). Assign to the instance variable larger the integer object: 100. Set any uninitialized instance variables to new (anonymous) LogicVariables.
   F. Attach the newLessThan to the tail linked list in the newClause.
4. Attach the newClause to the ruleDictionary of the appropriate AlfProgram.

The representation of clauses, predicates, atoms, and logic variables as Smalltalk objects, and particularly the fact that an ALF term can be any Smalltalk object (and vice versa) is the key idea in the integration of ALF with the rest of the Alltalk system.

7.5. Use of ALF within Alltalk by Application Programmers

From the above, it can be seen that all clauses in ALF are simply objects in Alltalk, which means that the application programmer can move between the logic system (ALF) and the object system (Smalltalk) without converting data between the two systems.

The programmer can write Smalltalk methods that dynamically construct clause objects and insert them as rules in an AlfProgram (or, for that matter, dynamically construct new AlfPrograms). More commonly, the rules can be submitted as strings (like those above) from the program development environment, interactively, by the programmer. The strings will then be compiled to the appropriate clauses and stored in the database, awaiting query submission. The ALF compiler is described in a subsequent section.

Queries too can be submitted interactively as strings, compiled by the system, and the answers returned (as in standard Prolog systems). More commonly, the programmer can build up ALF queries from Smalltalk programs and submit them to existing AlfPrograms without ever building a string representation of the query. The idea is that some objects created by an application will have instance variables that are best calculated "procedurally", via normal Smalltalk, and others that are best calculated via the logic system. The appliation will first calculate the values of the "procedural" ıstance variables, and fill in the remaining ones with ppropriate instances of class LogicVariable. The contructed object can now represent a term to the logic ystem. Next, an instance of the appropriate Predicate ⁄ill be created, and the term will be assigned into an ıstance variable of this predicate. Now we have a uery. The application will then submit the query to the ppropriate AlfProgram, and the values of the logic ariables that are returned can be used to fill in the non-procedural" instance variables of the original ob- :ct, replacing the previously assigned LogicVariable ıstances. The fully instantiated object can then be used ı subsequent application logic.

We now examine the logic in the chief components of ıe ALF system.

7.6. Logic of the ALF Compiler 7.6.1. Overview

Figure 23:
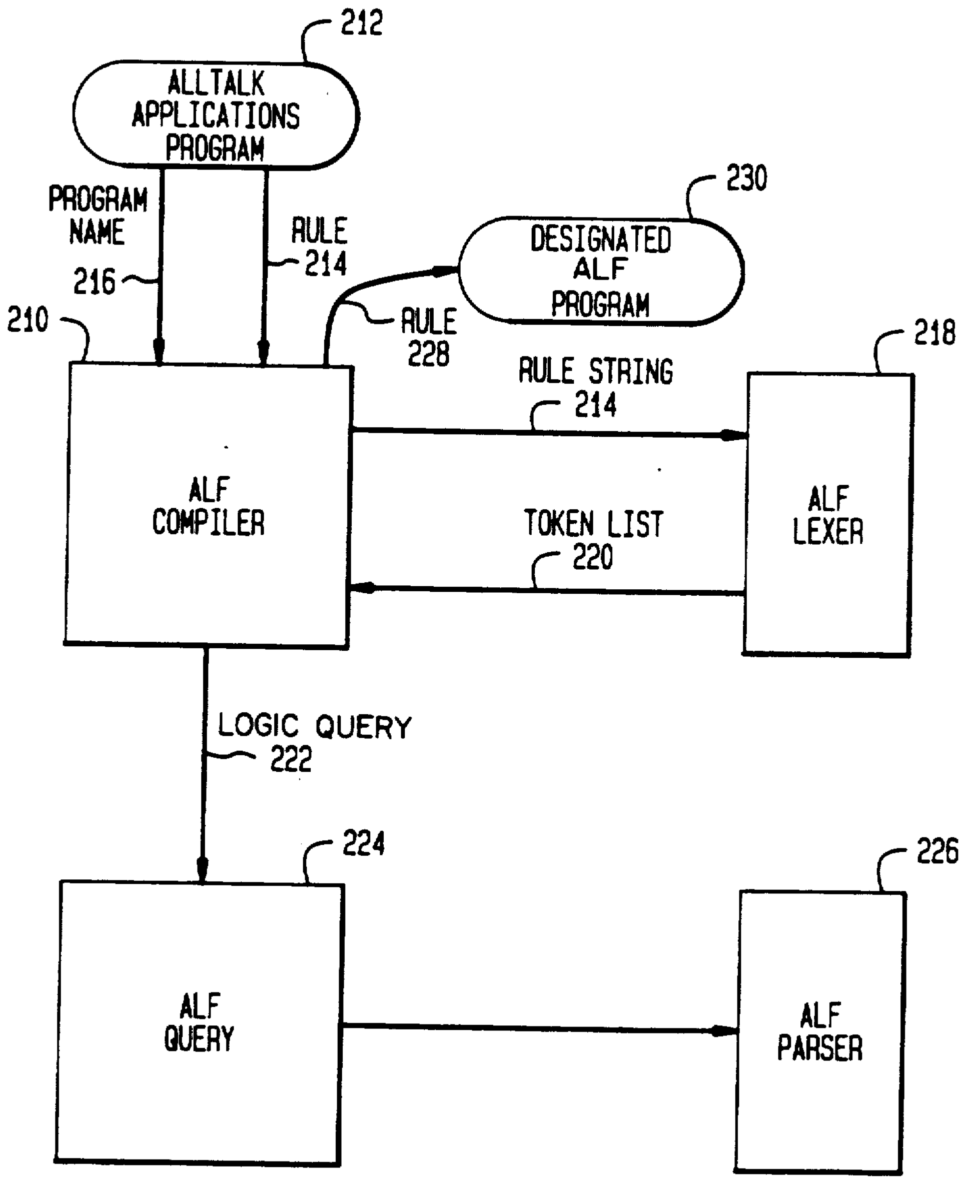
FIG. 23 is a schematic block diagram illustrating the functions of the ALF compiler.

The ALF compiler is a combination of an ALF proram and some Smalltalk programs. FIG. 23 shows an verview of the ALF compiler, which operates as fol- ›ws: a new instance of the class AlfCompiler 210 is stablished to compile a rule. A message is sent from an .lltalk application program 212 to the new instance 10. The parameters in the message are the rule 214 and ıe name 216 of the ALF program that the rule is for he rule is in the form of a string). The compiler in- :ance 210 will set up a new instance of an AlfLexer 18, and pass the rule 214 to be compiled to it. The ıstance of AlfLexer 218 will turn the rule string into a st of tokens 220, passing this back to the Alf compiler ıstance, 210. The compiler 210 will then set up a logic uery 222 using the token list, and establish an Alf- )uery instance 224 to process it. The AlfQuery instance 24 will process the query against a specific ALF proram called #alfParser 226. If the query is solved by the lfQuery 224, the alfCompiler 210 will return this indiation to the original program 212, after updating the .LF program 230 with the compiled rule 228. The .LF program 230 is the one whose name 216 was specied by the application 212.

The string submitted for compilation by the user is assed to an instance of class AlfCompiler via the mesıge

```
alfCompile: aString forPgm: aPgmName comment:
  aComment
```

'hich includes the string to be compiled, the name of ıe ALF program that is to include the string as a new .ause, and a user comment to document the new .ause. The compiler passes this string to an instance of .lfLexer, via the message

```
alfScan: aString
```

'hich returns a list of tokens, which is an instance of .ass AlfList. This AlfList instance that is returned :haves just like a Prolog list, and contains instances of .ass AlfToken. An AlfToken has, as instance variables, type (for the parser to identify the kind of token) and value (to be used in the code generation process). The ›mpiler passes the token list as a query to an ALF rogram (called #alfParser) 216, which will parse the ›ken list and construct the clause object (as in the ›ove example). The clause object is returned bound to ıe of the variables in the logic query. The logic query ›nstructed looks like:

```
←IsClause(tokenList=fromLexer, obj=X:,
  compiler=self)
```

where fromLexer is the object returned from the AlfLexer, and X: is a logic variable that will be bound by the query processor to the clause object that represents the input string.

Once returned, the clause object will be added to the other clauses in the Alf program which was specified when the clause string was submitted. The message that accomplishes this is

```
addRule: aClause
```

which is sent to the AlfProgram specified by the programmer when the input string was submitted. Adding a new clause to a program causes certain optimization logic to be executed, as will be explained in a subsequent section.

7.6.2. ALF Lexical Analyzer

The lexical analyzer 212 routines are all in class AlfLexer. The primary message is

```
alfScan: aString.
```

where, aString is the string to be scanned. The AlfLexer is organized as a finite state machine, and looks one character ahead to determine the next state to assume. The lexer removes all white space from the input string (blanks, tabs, new lines), as well as any ALF comments (which are designated by including text in single quote marks).

The states assumed by the lexer are:

0. Processing the first character of a new token.
1. Processing the interior of an identifier name (i.e. class name or instance variable name).
2. Processing the last character of an arrow symbol (i.e. the '—' in '←'), which separates the head from the tail of a clause.
3. Processing the interior of a number, to the left of an optional decimal point.
4. Processing the first character after the minus sign ('−') in a negative number.
5. Processing the first character ('_') of an anonymous logic variable.
6. Processing the interior of a number, to the right of an explicit decimal point.
7. Processing the interior of a string constant. Strings are enclosed in double quotes (") in the source text.
8. Processing the interior of a symbol. Symbols begin with a '#'.
9. Processing the interior of a symbolic constant. These begin with a '%', and stand for the constants nil, true, false. Class objects can also be designated via symbolic constants by following the '%' with a class name.

The lexer assumes a new state based upon the state it is in and the look ahead character (i.e. the next character in the input string). Before switching to state 0, we will have consumed a lexeme and be ready to output a token. This logic is handled via the "accept" methods, which are:

1. acceptLP: output token type and associated value is "(".
2. acceptRP: output token type and associated value is ")".

3. acceptEQ: output token type is and associated value "=".
4. acceptCOMMA: output token type and associated value is ","
5. acceptCUT: output token type is #CUT and associated value is a new instance object of class AlfCut. The AlfCut objects denote a Prolog type cut, and are represented by a '!' in the input string.
6. acceptArrow: output token type and associated value is "←".
7. acceptLB: output token type is "[". This represents the start of an AlfList (which is like a Prolog list). The associated value is an AlfEmptyList if the look ahead character is an "]". Otherwise, the value is a new instance of AlfList.
8. acceptRB: output token type and associated value is "]".
9. acceptBAR: output token type and associated value is "|". The "|" indicates the beginning of the tail of an AlfList, as in standard Prolog.
10. acceptNumber: output token type is #CONSTANT and associated value is an instance of either class Integer or Float, depending on whether the input string had no decimal specified, or had an explicit one specified.
11. acceptString: output token type is #CONSTANT, and the associated value is an instance of class String, as taken from the input.
12. acceptIdentifier: the lexer looks the identifier up in a symbol dictionary, which is maintained by the AlfLexer. If the identifier is in the dictionary, the associated token is used as the output. If it is not in the symbol dictionary, it is added and a token is associated as follows:
    a. If the first digit is uppercase, and the last is a colon (":"), a token is set up with type #logicVar and value a new instance of class LogicVariable.
    b. If the first digit is uppercase, and the last is not a colon (":"), and the string is the name of some Smalltalk class, then a token is set up with type #predicateName or #className depending on whether the string is the name of a class that does not, or does have class Predicate in the superclass chain.
    c. If the string is "_:", a token is set up whose type is #logicVar and whose value is a new instance of LogicVariable. This represents an anonymous logic variable.
    d. If none of the above cases hold, a token is set up whose type is #instVarName, and whose value is the symbol which is the same as the input. This represents the name of some instance variable. The parser will check that the instance variable does belong to the specified class.
13. acceptChar: output token type is #CONSTANT, and associated value is the instance of class Character that is the same as the input.
14. acceptSymbol: output token type is #CONSTANT, and associated value is the instance of class Symbol that is the same as the input.
15. acceptSymbolicConstant: output token type is #CONSTANT, and associated value is the instance nil, true, or else the Class object, that is represented by the input string.

After accepting a token, the lexer puts it in the evolving AlfList, and reverts to state 0. When all tokens have been constructed, the lexer returns the AlfList, unless an error was detected, in which case it returns the appropriate error.

7.6.3. Parser and code generator

As explained above, this is an ALF program and consists of clauses that parse the AlfList passed by the AlfLexer, and build up the objects that represent the clause. In the main, the objects necessary have already been constructed as the values of the various AlfTokens in the AlfList passed by the AlfLexer. Modification of these objects is accomplished in the parser by using the builtin predicates: AlfSend0, AlfSend1, AlfSend2, and AlfSend3. These predicates cause message sends to occur that will modify the objects in the AlfToken values.

Eventually, the parser rules will cause the final clause object to be created, and this is passed back to the compiler. If an error is discovered, an error message is passed back instead.

A complete listing of the ALF rules for the parser/-code generator can be found in Table 7.1.

---

Copyright 1988 Eastman Kodak Company. All rights reserved.

Rules for the Built-in Predicates

```
1. AlfSend0(receiver=nil, answer=nil, selector=nil) <-
2. AlfSend1(receiver=nil, answer=nil, selector=nil, parm1=nil) <-
3. AlfSend2(receiver=nil, answer=nil, selector=nil, parm1=nil, parm2=nil) <-
4. AlfSend3(receiver=nil, answer=nil, selector=nil, parm1=nil, parm2=nil,
      parm3=nil) <-
5. AlfSend1DerefParm(receiver=nil, answer=nil, selector=nil, parm1=nil) <-
6. AlfSend2DerefParm(receiver=nil, answer=nil, selector=nil, parm1=nil,
      parm2=nil) <-
7. AlfIs(value1=X1:, value2=X1:) <-
8. AlfIsNot(value1=X2:, value2=X3:) <-
9. AlfError(error=X:) <-
10. AlfAppend(list1=[], list2=L:, concat=L:) <-
11. AlfAppend(list1=[X: | L1:], list2=L2:, concat=[X: | L3:]) <-
      AlfAppend(list1=L1:, list2=L2:, concat=L3:)
12. AlfCut() <-
13. AlfSplitR(listToSplit=[X: | Y:], splittingElement=X:,
      result=AlfSplitList(leftList=[] rightList=[X: | Y:])) <-
```

14. AlfSplitR(listToSplit=[X: | Y:], splittingElement=Z:,
result=AlfSplitList(leftList=[X: | M:] rightList=R:)) <-
AlfSplitR(listToSplit=Y:, splittingElement=Z:,
result=AlfSplitList(leftList=M:, rightList=R:))

15. AlfSplitL(listToSplit=[X: | Y:], splittingElement=X:,
result=AlfSplitList(leftList=[X:], rightList=Y:)) <-

16. AlfSplitL(listToSplit=[X: | Y:], splittingElement=Z:,
result=AlfSplitList(leftList=[X: | M:], rightList=R:))
<- AlfSplitL(listToSplit=Y:, splittingElement=Z:,
result=AlfSplitList(leftList=M:, rightList=R:))

Rules for Pgm alfParser (the Parser)

1. IsClause(tokenList=T:, object=C:, compiler=Comp:) <-
IsFact(tokenList=T:, object=C:, compiler=Comp:)
2. IsClause(tokenList=T:, object=C:, compiler=Comp:) <-
IsRule(tokenList =T:, object=C:, compiler=Comp:)
3. IsClause(tokenList=T:, object=C:, compiler=Comp:) <-
IsQuery(tokenList=T:, object=C:, compiler=Comp:)
4. IsFact(tokenList=F:, object=C:, compiler=Comp:) <-
AlfSplitR(listToSplit=F:,
splittingElement=AlfToken(type=ARROW,tokenValue=_:,lexemeStart=S2:
lexemeEnd=E2:),
result=AlfSplitList(leftList=T:,rightList=[AlfToken(type=ARROW
tokenValue=_: lexemeStart=S: lexemeEnd=E:)])),
AlfCut(), IsAtom(tokenList=T:, object=H1:, compiler=Comp:),
AlfSend0(receiver=Clause(head=nil,tail=nil,copyEnv=nil,envSize=nil,
comment=nil.hasCut=nil,numberTailAtoms=nil),
answer=C:, selector=new), AlfSend1(receiver=C:, answer=_:,
selector=head:, parm1=H1:)

5. IsQuery(tokenList=F:, object=C:, compiler=Comp:) <-
AlfSplitL(listToSplit=F:, splittingElement=AlfToken(type=ARROW,
tokenValue=_:,lexemeStart=S2:,lexemeEnd=E2:),
result=AlfSplitList(leftList=[AlfToken(type=ARROW,tokenValue=_:,
lexemeStart=S:,lexemeEnd=E:)],
rightList=T:)), AlfCut(), AlfSend0(receiver=Clause(head=nil,
tail=nil,copyEnv=nil,envSize=nil,comment=nil,hasCut=nil,
numberTailAtoms=nil),answer=C:, selector=new),
AddTailList(tokenList=T:, clause=C:, compiler=Comp:)

6. IsRule(tokenList=R:, object=C:, compiler=Comp:) <-
AlfSplitR(listToSplit=R:, splittingElement=AlfToken(type=ARROW,
tokenValue=_:,lexemeStart=S2:,lexemeEnd=E2:),
result=AlfSplitList(leftList=Head:,
rightList=[AlfToken(type=ARROW,tokenValue=_:,lexemeStart=S:
lexemeEnd=E:) | Tail:])),
AlfCut(), IsAtom(tokenList=Head:, object=H1:,compiler=Comp:),
AlfCut(), AlfSend0(receiver=Clause(head=nil, tail=nil,copyEnv=nil,
envSize=nil,comment=nil,hasCut=nil,numberTailAtoms=nil),
answer=C:, selector=new),
AlfSend1(receiver=C:, answer=_:, selector=head:, parm1=H1:),
AddTailList(tokenList=Tail:, clause=C:, compiler=Comp:)

7. IsAtom(tokenList=[AlfToken(type=CUT,tokenValue=T:,lexemeStart=S:,
lexemeEnd=E:)], object=T:, compiler=Comp:) <-

8. IsAtom(tokenList=[AlfToken(type=predicateName,tokenValue=T:,
lexemeStart=S:,,lexemeEnd=E:),
AlfToken(type=LP,tokenValue=_:,lexemeStart=S1:,lexemeEnd=E1) X:],
object=T:, compiler=Comp::) <-
AlfAppend(list1=Y:, list2=[AlfToken(type=RP,tokenValue=_:,
lexemeStart=S2:,lexemeEnd=E2:)], concat=X:),
AlfIs(value1=X:, value2=[H: | __:]), AlfSend2DerefParm(
receiver=Comp:, answer=Ans:, selector=setSuccess:comment:,
parm1=H:, parm2='See AlfBootStrap/makeAtomRules rule 1'),
DoListAssign(list=Y:, targObj=T:, compiler=Comp:)

```
9. DoListAssign(list=[AlfToken(type=instVarName,tokenValue=InstVar:,
        lexemeStart=S:,lexemeEnd=E:),
    AlfToken(type=EQ,tokenValue=_:,lexemeStart=S1:,lexemeEnd=E1) Term:],
        targObj=Targ:, compiler=Comp:) <-
    AlfIs(value1=Term:, value2=[H: | __:]),
    AlfSend2DerefParm(receiver=Comp:, answer=Ans2,
        selector=setSuccess:comment:, parm1=H:,
        parm2='See AlfBootStrap/makeAtom Rules rule 2'),
    IsTerm(tokenList=Term:, object=Source:, compiler=Comp:),
    AlfSend2(receiver=Targ:, answer=Ans:, selector=atName:put:,
        parm1=InstVar:, parm2=Source:)

10. DoListAssign(list=[AlfToken(type=instVarName,tokenValue=InstVar:
        lexemeStart=S:,lexemeEnd=E:),
    AlfToken(type=EQ,tokenValue=_:,lexemeStart=S1:,lexemeEnd=E1) Tail:],
        targObj=Targ:, compiler=Comp:) <-
    AlfSplitR(listToSplit=Tail:, splittingElement=AlfToken(type=COMMA,
        tokenValue=_:,lexemeStart=S2:,lexemeEnd=E2:),
        result=AlfSplitList(leftList=Term:,
        rightList=[comma: | ToDo:])),
    IsTerm(tokenList=Term:, object=Source:, compiler=Comp:),
    AlfCut(), AlfSend2(receiver=Targ:, answer=Ans:, selector=atName:put:,
        parm1=InstVar:, parm2=Source:),
    AlfIs(value1=Tail:, value2 =[H: | __:]),
    AlfSend2DerefParm(receiver=Comp:, answer=Ans2,
        selector=setSuccess:comment:, parm1=H:,
        parm2='See AlfBootStrap/makeAtomRules rule 3'),
    DoListAssign(list=ToDo:, targObj=Targ:, compiler=Comp:)

11. AddTailList(tokenList=List:, clause=Rule:, compiler=Comp:) <-
    IsAtom(tokenList=List:, object=Obj:, compiler=Comp:),
    AlfSend1(receiver=Rule:, answer=_:, selector=addTail:, parm1=Obj:)

12. AddTailList(tokenList=List:, clause=Rule:, compiler=Comp:) <-
    AlfSplitR(listToSplit=List:, splittingElement=AlfToken(type=COMMA,
        tokenValue=_:,lexemeStart=S2:,lexemeEnd=E2:),
        result=AlfSplitList(leftList=Front:,rightList=[_ | Todo:])),
    IsAtom(tokenList=Front:, object=Obj:, compiler=Comp:),
    AlfCut(), AlfSend1(receiver=Rule:, answer=_:, selector=addTail:,
        parm1=Obj:),
    AlfIs(value1=Todo:, value2=[H: | __:]),
    AlfSend2DerefParm(receiver=Comp:, answer=Ans2,
        selector=setSuccess:comment:, parm1=H:,
        parm2='See AlfBootStrap/makeAddTailListRules rule 2'),
    AddTailList(tokenList=Todo:, clause=Rule:, compiler=Comp:)

13. IsTerm(tokenList=[AlfToken(type=CONSTANT,tokenValue=Term:,lexemeStart=S:,
        lexemeEnd=E:)], object=Term:, compiler=Comp:) <-

14. IsTerm(tokenList=[AlfToken(type=logicVar,tokenValue=Term:,lexemeStart=S:,
    lexemeEnd=E:)], object=Term:, compiler=Comp:) <-

15. IsTerm(tokenList=[AlfToken(type=logicVar,tokenValue=LogicVar:,
        lexemeStart=S:,lexemeEnd=E:),
    AlfToken(type=className,tokenValue=Inst:,lexemeStart=S1:,
        lexemeEnd=S2:)], object=LogicVar:, compiler=Comp:)
    <- AlfSend2(receiver=LogicVar:, answer=Ans:,
        selector=bindTo:withEnv:, parm1=Inst:, parm2=nil)

16. IsTerm(tokenList=[AlfToken(type=className,tokenValue=Term:,
        lexemeStart=S:, lexemeEnd=E:),
    AlfToken(type=LP,tokenValue=_:,lexemeStart=S1:,lexemeEnd=E1:) R:],
        object=Term:, compiler=Comp:) <- AlfAppend(list1=AssignList:,
        list2=[AlfToken(type=RP,tokenValue=_:,lexemeStart=S2:,
        lexemeEnd=E2:)], concat=R:),
    AlfCut(), AlfIs(value1=R:, value2=[H: | __:]),
    AlfSend2DerefParm(receiver=Comp:, answer=Ans:, selector=setSuccess:,
        comment:, parm1=H:,
        parm2='See AlfBootStrap/makeSimpleIsTermRules rule 5 '),
    DoListAssign(list=AssignList:, targObj=Term:, compiler=Comp:)
```

```
17. IsTerm(tokenList=[AlfToken(type=logicVar,tokenValue=LogicVar:,
        lexemeStart=S:,lexemeEnd=E:) | R:], object=LogicVar:,
        compiler=Comp:) <- IsTerm(tokenList=R:, object=Term:,
        compiler=Comp:),
    AlfSend2(receiver=LogicVar:, answer=Ans:, selector=bindTo:withEnv:,
        parm1=Term:, parm2=nil)

18. IsTerm(tokenList=[AlfToken(type=LB,tokenValue=Term:,lexemeStart=S:,
    lexemeEnd=E:) | R:], object=Term:, compiler=Comp:) <-
    AlfAppend(list1=TermList:, list2=[AlfToken(type=RB,tokenValue=_:,
        lexemeStart=S1:,lexemeEnd=E1:)], concat=R:),
    AlfIs(value1=R:, value2=[H: | __:]),
    AlfSend2DerefParm(receiver=Comp:, answer=Ans2,
        selector=setSuccess:comment:, parm1=H:,
        parm2='See AlfBootStrap/makeListIsTermRules rule 1'),
    IsTermList(tokenList=TermList:, object=Term:, compiler=Comp:)

19. IsTerm(tokenList=[AlfToken(type=LB,tokenValue=Term:,lexemeStart=S:
    lexemeEnd=E:) | R:], object=Term:, compiler=Comp:) <-
    AlfAppend(list1=TermList:, list2=[AlfToken(type=BAR,tokenValue=_:,
        lexemeStart=S1:,lexemeEnd=E1:) | TailPart:], concat=R:),
    AlfAppend(list1=TailTerm:, list2=[AlfToken(type=RB,tokenValue=_:,
        lexemeStart=S2:,lexemeEnd=E2:)], concat=TailPart:),
    IsTermList(tokenList=TermList:, object=Term:, compiler=Comp:),
    AlfCut(), AlfIs(value1=TailPart:, value2=[H: | __:]),
    AlfSend2DerefParm(receiver=Comp:, answer=Ans2,
        selector=setSuccess:comment:, parm1=H:,
        parm2='See AlfBootStrap/makeListIsTermRules rule 2'),
    IsTerm(tokenList=TailTerm:, object=TailObj:, compiler=Comp:),
    AlfSend1(receiver=Term:, answer=Ans:, selector=tail:, parm1=TailObj:)

20. IsTermList(tokenList=TermList:, object=Term:, compiler=Comp:) <-
    IsTerm(tokenList=TermList:, object=Obj:, compiler=Comp:),
    AlfSend1(receiver=Term:, answer=Ans:, selector=addLast:, parm1=Obj:)

21. IsTermList(tokenList=TermList:, object=Term:, compiler=Comp:) <-
    AlfAppend(list1=FirstTerm:, list2=R:, concat=TermList:),
    IsTerm(tokenList=FirstTerm:, object=Obj:, compiler=Comp:),
    AlfSend1(receiver=Term:, answer=Ans:, selector=addLast:,parm1=Obj:),
    AlfIs(value1=R:, value2=[H: | __:]),
    AlfSend2DerefParm(receiver=Comp:, answer=Ans2,
        selector=setSuccess:comment:, parm1=H:,
        parm2='See AlfBootStrap/makeIsTermListRules rule 2'),
    AlfCut(), IsTermList(tokenList=R:, object=Term:, compiler=Comp:)
-----------------------------------------------------------------
```

Table 7.1

7.6.4. Optimizations in class AlfProgram

The clause object that is passed back from the parser to the compiler is then sent to the AlfProgram specified in the original compilation message. The message to update the ALF program is:

addRule: aClause, where aClause is that returned from the parser. The receiver of this message is the AlfProgram specified by the programmer. If this program does not already exist, the ALF compiler 210 will set it up.

Class AlfProgram contains the necessary methods to update an AlfProgram with a new clause, and to delete old clauses. Each AlfProgram includes the following instance variables: clauseLists, which is the list of all clauses belonging to the program, and a ruleDictionary, which contains lists of clauses in the AlfProgram, keyed by the class of the head atom of the rule. Thus each element in this ruleDictionary is a sub-list of clauses contained within the program, all of whose heads belong to the same class (this class being the key to the dictionary).

To add a new clause, the message addRule: aRule is sent to the appropriate AlfProgram, and will execute the following logic:

1. Determine if rules already exist for the program with the same head as the new rule. If not, set up a new (empty) rule list and add it to the dictionary with a key that is the class of the head of the new rule.
2. Add the new clause to the linked list of rules that belong to this program (ruleList).
3. If the new rule's head already existed in the ruleDictionary, this single rule is optimized as follows:
   a. In the link object that links the new rule to the other rules for this program (in the LinkedList clauseLists) set up an array with size equal to the number of atoms in the tail of the new rule. We call this array ruleArray.
   b. At each element of the ruleArray, place the list of rules that could unify with the corresponding atom of the tail of the new rule. This list comes from the programs ruleDictionary, keyed by the class of the atom of the tail.
   c. If no rule list is found in ruleDictionary, look in the ALF program #AlfBuiltIn for built-in rules that will unify. If found, update the link's ruleArray accordingly.
4. If the rule being added contains a head that was not previously in the program's ruleDictionary, optimize all rules in the program (including the new one) according to the above logic.
5. If the rule being added is for the program #AlfBuiltIn, re-optimize all rules in all programs according to the above logic. There is a class variable in AlfProgram called ProgramDictionary that contains all of the AlfPrograms in the system, keyed by the name of the program.

Thus it can be seen that the optimization logic constructs for each atom of the tail of a rule, a list of rules whose heads the atom can potentially unify with. This will speed up the query solving logic discussed in a subsequent section.

7.7. Query Solving in ALF

The main logic for solving logic queries is contained in class AlfQuery. This class includes the following instance variables (their class is indicated inside "<>"):

1. queryClause <Clause> the clause to prove.
2. env <Array> the environment to use for this invocation of the query.
3. choicePointStack <Stack> of choicePoints. This acts like a stack in that the last choice point discovered is first on the list. When this is empty, there are no more choice points that can be taken, and thus there are no more answers to the query.
4. goalStack <GoalStack> of GoalStackLinks. This represents the current set of goals to prove. All must be solved in order to answer the query. If the AlfQuery fails to prove a goal, or if the goalStack becomes empty, next choice point is executed in order to obtain another answer to the query.
5. alfPgm <AlfProgram> against which to execute the query.
6. trail <Trail> the trail of bindings to undo at the various choice points. As unification proceeds, the AlfQuery keeps track of the old values of logic variables in this trail stack. Undoing these unifications restores the state of query processing to a point where the next choicePoint can be executed.
7. currentFreezePt <Integer> All goalLinks below, and including the one marked by this point are currently frozen, and must not be altered. This means that some choicePoint is pointing into the stack at this point, and hence the stack must be preserved starting with the goalLink marked by this currentFreezePoint. If the stack is not frozen above a given goal, the AlfQuery removes the goal from the stack. Otherwise, it copies the stack before removing the goal, so that existing choicePoints will be able to pick up using the old state of the goalStack.

The application programmer will normally set up a new AlfQuery by sending the message newQuery: queryClause forPgm: anAlfPgm to the class AlfQuery. This will set up a new query and initialize it. Answers to the query can be obtained by sending the message nextAnswer to the query. Repetitive nextAnswer messages will find new solutions, until the answer #fail is returned, indicating no more answers to the query exist. When an answer is found, AlfQuery returns the query itself. The env of the query will contain the logic variables (and thus their bindings) that were used in the original query. The programmer can send the message dereferenceCopyUsingEnv: queryEnv to the queryClause of the original query in order to obtain that clause with the logic variables replaced with their bindings.

7.7.1. Finding the Next Answer for a Query

The method nextAnswer checks the choicePointStack, and if this is empty returns #fail, since there are no more answers. Otherwise, it sets up the system to process the first choicePoint on the stack. To do this, it backs out all of the bindings of logic variables that were made subsequent to the establishment of the choicePoint. These bindings are all kept on the stack called trail, and each choicePoint points into this trail stack.

AlfQuery undoes the bindings required by processing those on the trail that follow the choicePoint's trail pointer. As in standard Prolog, these choice points represent alternative paths to take in the resolution logic for solving the query. They are placed on the choicePointStack as they are encountered.

In ALF, a single choicePoint object represents all alternatives for proving a given goal. Each choicePoint contains a nextRuleToTry which is a link in the LinkedList of rules that match the first atom in the goal stack for the choicePoint. If this nextRuleToTry is nil, AlfQuery removes the choicePoint and recalculates the freeze point of the current goal stack. If the nextRuleToTry is not nil, AlfQuery restores the goalStack to be that which was saved in the choicePoint, and sends the following message to the query:

```
solveChoice: nextChoicePoint
```

where nextChoicePoint is the current one on the :hoicePointStack. This method solveChoice continues ıntil another answer is found, or there are no more ınswers for the current choicePoint. The method nexAnswer continues the processing for the next choice?oint on the stack.

The initialization logic for the query will have established the first choicePoint (which is the query itself), ınd found the first ruleToTry by looking in the ruleDicionary of the program submitted with the query.

7.7.2. Solving a Choice Point

The method solveChoice: loops for so long as it can ırove atoms on the goal stack, until it cannot prove one, ır the goal stack is empty. The latter condition constiutes successful binding of the query variables, the forıer results in returning #fail as no more answers exist for the current choicePoint). If a choicePoint results in ailure, this method will not remove the choicePoint :om the stack, but return to method nextAnswer to try ıe next one. Before entering the main loop, the method ɔlveChoice initializes some temporary variables: rule'oTry, atomToProve with the first being set to a link in list of rules that is in the nextRuleToTry variable of ıe current choicePoint, and the latter (atomToProve) eing the first goal on the current goalStack.

The main loop in solveChoice sees if the current ıleToTry is nil, and if so, returns #fail, since no further rogress can be made on this choicePoint. Otherwise, it tempts to unify the current atomToProve with the :ad of the rule pointed to by the link ruleToTry by:

Obtaining a new environment for this execution of the rule by sending the message

```
newEnv
```

to the rule. An environment is an array of new logic variables to use for the execution of the rule, and is explained further below in the discussion of Logic Variables.

Attempting unification by sending the message

```
unifyUsingEnv: goalEnv withPredicate:
 ruleHead usingEnv: ruleEnv
iling: trail fromQuery: self.
```

ıis message is sent to the current atomToProve. The ification algorithm is discussed in section 7.9 below. the message returns #fail, indicating unsuccessful ification, the ruleToTry is obtained by following the current one (remember this is a linked list of rules whose heads are of the same class as the current atom on the goal stack). Unification is then attempted again, continuing until unification is achieved, or there are no more rules to try. The latter case causes #fail to be returned to the calling method (nextAnswer), which obtains the next choicePoint and tries again.

Assuming successful unification, and assuming the method is working on the choicePoint that was passed into this method, the current choicePoint's nextRuleToTry is updated so that the next time this choicePoint is taken the next available rule is used. In any case, all of the logic variables in the rule's environment are marked as "not local" (this means that subsequent binding of these logic variables will have to be undone on backtracking. I.e., they will be put on the trail prior to binding them during unification). Local and non-local logic variables are defined in section 7.9 below.

If there are other ways to prove the current atomToProve in the goal list, and if there is not already a choicePoint for this atom, the method sets up another choicePoint for this atom, and places it on the choicePointStack. Backtracking will then allow the method to resume execution, trying the alternative rule. There are potentially other ways to prove the current atomToProve if the ruleToTry points to a non-nil next link. This means that there are additional rules whose head could potentially unify with the atomToProve.

The goal that has been unified with the rule head can now be removed from the goalStack. If the rule that the method is using has a tail, it pushes all of the atoms in the tail on the goalStack: they represent new goals that must be proved. Next, the method examines the goalStack, and if it is empty, it returns since the query has been proven. At this point, the environment of the query will have all of its logic variables bound to the answer.

If goals remain on the goalStack, the method returns to the top of the main loop, after the following logic:

1. Set the new atomToProve to be the current one on the goalStack.
2. Look for a rule that can potentially unify with the new atomToProve, by looking at the array of rule lists kept in the link that links all of the rules together within a program (discussed above).
3. Set the new ruleToTry to be the first link in the list mentioned.

Branching back to the top of the main loop will then attempt unification of the new atomToProve with the new rule pointed to by the ruleToTry, and the method continues proving goals until it fails on an atom, or runs out of them.

7.7.3. Debugging

Class AlfQuery has debugging features that can be turned on or off (by sending messages to the query). Include are:

1. Counting. This will keep track of the total number of choice points at any time, and put out a message when this changes.
2. Tracing. There are multiple levels of tracing. It is possible to display the following:
   a. When backtracking occurs.
   b. When goals are removed from the stack to be proved. The goal is printed out.
   c. When a rule head tries to unify with a goal. The rule is printed.

d. When unification succeeds or fails. The goal is printed.

e. When a goal is proved. The goal is printed.

f. When the tail of a rule is pushed on the stack of goals to prove. The entire goal stack is printed.

There exists a long form and a short form for printing out the goals, which can be selected by the user.

7.8. Class Clause

As mentioned above, the basic unit of compilation in ALF is the clause. This class includes the instance variables head, tail, copyEnv, saveLV. When a clause has been constructed by the compiler (or by a programmer), it must be initialized with the message setCopyEnv. The purpose of this method is to construct the copyEnv for use during the resolution process. This environment is copied to obtain a new set of LogicVariables for every execution of the clause. The idea of an environment is to obtain a new set of logic variables that can be pointed to by those in the clause itself, and which are bound and unbound during unification. The logic variables in the clause itself hold the index into the environment array.

Thus during unification of an atom in the clause the logic variables that actually occur in the clause are not considered, but rather those that are pointed to (in the environment) by the index in the logic variables.

In order to construct the copyEnv, all of the logic variables that occur in the clause are examined, and an index, which increments by one, is assigned to each one. Logic variables that are the same in the clause are mapped to the same logic variable in the environment. This achieves the necessary common referencing during the unification process. Once constructed, the copyEnv is copied when the query processing sends the message

```
newEnv
```

to the clause to obtain a new environment for execution of the rule.

7.9. Unification and Logic Variables in ALF

Class Object contains the default unification algorithm. The algorithm checks to see if the second object (a parameter in the unification message) is of class LogicVariable, and if so, will resend the unification message to the second object, rather than using the default algorithm. Two objects will unify using this algorithm if they are of the same class, and each instance variable in the two objects unify. If an object has no instance variables, unification is achieved if the objects are equal.

The default algorithm is overridden in subclasses of class Predicate, where required, in order to implement the built in predicates. For example, the AlfFail predicate always returns #fail as the answer to the unification message.

The unification algorithm is also overridden in class LogicVariable. This class includes the following instance variables:

1. bound <Boolean>, true means the logic variable has been bound.
2. binding this can be of any class, and is the object that the logic variable has been bound to.
3. userName <String>, this is the name that the user has established for this logic variable.
4. isLocal <Boolean>, true means that the logic variable does not need to be unbound on backtracking.
5. environIndex nil means this LogicVariable is not resolved through the environment array, but points directly to its binding. notNil means that the LogicVariable must be resolved through the logic variable in the environIndex, in the environment. This is the case when the logic variable is in a rule, and copies of the logic variables are used to do unification (one environment set up for each invocation of the rule).
6. bindersEnv <Array> If a logic variable points to a term that itself has logic variables in it, this is used to resolve those logic variables. This is needed to track back the variables in the original query, and when a logic variable in one rule is bound to a term that contains a logic variable from another rule. For environment logicVariables (i.e. those with environIndex not nil), it is assured that the bindersEnv is always nil (that is the way they were set up when the clause was created).

We now summarize how logic variables are used and bound:

1. If the variable is in a clause, the method goes through the environIndex. A new environment (an array of logicVariables) is established every time the clause is executed, and the variable in the clause itself is used only to get the 'real' variable in the current environment, via the environIndex. Thus these 'environment variables' are never bound to anything, in the sense that binding is always nil.
2. It should be noted that whenever a logic variable X is bound to another logic variable Y, Y can not be an environment logic variable. The reason is that logic variables are always 'dereferenced' before binding them to another one. Thus if Y is unified with another logic variable (X), and X is an environment variable, X will be dereferenced to its 'non environment variable', Z, and bind Y to Z which is not an environment variable (Z is a member of the environment array, and has environIndex set to nil). Note that in our example, Z could itself be a term that contains environment logic variables, resolved by a different environment: the bindersEnv which will be found in Y.
3. When a logic is unified with another term, the two environments are passed: one for the logic variable and one for the term. If our term is not itself a logic variable, but contains logicVariables, the term environment is necessary for further unification if any. In order to be able to access the term's environment upon subsequent unifications, the term's environment is placed in th logic variable's bindersEnv. Then when unifying a new term (T) against the logic variable, the logic variable is dereferenced, but then the term is unified against T using as an environment for the term the bindersEnv stored in the logic variable.
4. Thus, in general, when attempting the recursive unification algorithm, logic variables are dereferenced either through their environIndex (first priority), or their binding. If they are bound, the environment to use for what they are bound to is found in the logic variables bindersEnv, the latter having meaning only for bound logic variable's, else it is nil.
5. Local versus Global logic variables. Logic variables in environments can sometimes be replaced in their home environment instead of bound to a term they are unifying with. The reason is that they need never be undone on backtracking and they are not being bound to terms that contain logic variables from another environment (these latter would pose a problem, since there is no place to store the bindersEnv if the environment slot is merely replaced with the term it is being unified with). Class Clause sets isLocal to true in the logic variables that are in the head of the clause. When unifying with an environment logic vvariable that has a local logic variable in its environment slot, which is unbound, replace the slot value with the unbound logic variable that the method is attempting to bind it to. Even if a term the method is attempting to bind it to is a bound logic variable (or not a logic variable at all), if the receiver logic variable is an unbound, local, environment variable the logic variable is not put on the trail, since it never needs to be undone.

Given the above, we now present the detailed algorithm. In the discussion below, we refer to the receiver of the unification message as "self". This is always a LogicVariable. We refer to the term that self is to be unified with by "aTerm".

1. If aTerm is a LogicVariable, self is a local logic variable, and aTerm is unbound, the appropriate self's environment slot is set to the aTerm, and success is returned.
2. If aTerm is a local, unbound LogicVariable, and self is unbound, aTerm's environment slot is updated with self, and success is returned.
3. If self and aTerm represent the same object, success is returned.
4. If self is a local, unbound LogicVariable, self is bound to the value of aTerm, and success is returned.
5. If self is unbound, but not a local LogicVariable, self is bound to the value of aTerm, self is put one the trail, and success is returned.
5. If self aTerm are bound to objects that are of the same class, the general purpose algorithm in class Object, is used, so a unification message using the binding of self as the receiver is sent, and the answer to this message is returned.
7. If the method has not yet returned by this point, the general purpose algorithm that checks to see if aTerm is bound to an object that is a subclass of the class of the object that self is bound to or vice-versa must be invoked. If either is the case, the appropriate logic variable is placed on the trail, and it is re-bound to the binding of the outer, provided all instance variables of the two bindings unify. If any instance variable fails to unify, failure is returned. Otherwise, success is returned. If both aTerm and self are bound, and the objects they are bound are not type compatible in the sense above, failure is returned from the unification.

ADVANTAGES

The Alltalk system provides the following advantages over the prior art:

1. The ability of a programmer to divide an application into a logic part and an object-oriented part, and to move between the programming styles easily, without conversion of data.
2. The ability of a programmer to write applications that store data on disk without explicit database management or file management statements.
3. The garbage collection system offers the following advantages:
   a. Little execution time overhead.
   b. Evenness of processing with no long gabs during which the system is unavailable due to garbage collection.

OBJECT-ORIENTED, LOGIC, AND DATABASE TOOL

List of Appendices

Appendix A: YACC, LEX, source code for the Alltalk compiler
Appendix B: Standard includes
Appendix C: Alltalk Computer C source code
Appendix D: Interpreter source code
Appendix E: Raid source code
Appendix F: Primitive source code
Appendix G: Object manager source code
Appendix H: Garbage collector source code
Appendix I: ALF class source code

Appendix A: YACC, LEX, Source Code for the Compiler.

```
=====================================================================

Phase 1.
        grammar.y
        scanner.l
Phase 2.
        ../co2/grammar.y
        ../co2/scanner.l
```

```
%token CHAR STRING IDENT

%token KEYWORD PRIMITIVE POUND KBUNCH
%token LPAR RPAR LBRA RBRA DOT MBAR BAR SEMI UPARR ASSIGN BANG COLON BSELECTOR
%token LT GT MINUS

%token METHODSFOR UC_IDENT LC_IDENT UC_CLASS LC_CLASS
%token NUMBER

%{

 /*Copyright 1988 Eastman Kodak Company.  All rights reserved.*/
/*
**      what we need to do here is make believe we are a smalltalk compiler.
**      that means we need to parse smalltalk, optimize whatever we can,
**      and direct our second phase to do instantiations, set up classes,
**      and make appropriate CompiledMethods.
**
**      that is a lot of work to do...
*/

#include <stdio.h>
#include "kcparse.h"

typedef struct pnode * YYSTYPE;

extern struct pnode *makenode();
extern struct pnode *changetype();

static struct pnode *n;
static struct pclass *c;
static struct pmethod *m;
static int meta;

static char buf[8192];

%}

%start file

%%

file            :       classes
                ;

classes         :       class
                |       classes class
                ;

class           :       class_descr class_var_decl LBRA class_pieces RBRA
                        {
                                compileClass(c);
                        }
                |       class_descr class_var_decl LBRA RBRA
                        {
                                compileClass(c);
                        }
                ;

class_pieces    :       class_piece
                |       class_pieces class_piece
                ;

class_piece     :       class_meth_sep
                |       meta_meth_sep
                |       method
                ;

class_descr     :       class_name class_super
                        {
                                c = (struct pclass *) calloc(1,
                                  sizeof(struct pclass));

                                if (c == NULL)
                                        fatal("y.class: Out of memory\n");

                                c->name = $1->str;
                                c->superclass = $2->str;
                        }
                ;

class_name      :       UC_CLASS uc_var_name
                        {
                                $$ = $2;
                        }

class_super     :       COLON uc_var_name
                        {
                                $$ = $2;
                        }
                |       /* nothing */
                        {
                                $$ = makenode(N_IDENT, "Object", 0, 0);
                        }

class_var_decl  :       bar bar
                |       bar lc_var_names bar
                        {
                                c->instVarList = $2;
                        }
                |       bar uc_var_names bar
                        {
                                c->classVarList = $2;
                        }
                |       bar lc_var_names uc_var_names bar
                        {
                                c->instVarList = $2;
                                c->classVarList = $3;
                        }
                |       bar uc_var_names lc_var_names bar
                        {
                                c->instVarList = $3;
                                c->classVarList = $2;
                        }
                |       /* nothing */
                ;

bar             :       BAR
                |       MBAR
                ;

class_meth_sep  :       BANG uc_var_name METHODSFOR string
                        {
                                meta = 0;
                        }
                ;
```

```
meta_meth_sep   :       BANG uc_var_name LC_CLASS METHODSFOR string
                        {
                                meta = 1;
                        }
                ;

method          :       MBAR
                        {
                                m = (struct pmethod *) calloc(1,
                                  sizeof(struct pmethod));

                                if (m == NULL)
                                        fatal("y.method: Out of memory\n");

                                m->meta = meta;
                        }
                        selector method_body
                        {
                                m->firstStatement = $4;
                                c->method[c->methodCount++] = m;
                        }
                ;
method_body     :       statements
                        {
                                $$ = $1;
                        }
                |       temporaries statements
                        {
                                $$ = $2;
                        }
                |       /* nothing at all ... returns self */
                        {
                                $$ = makenode(N_STATEMENT, 0,
                                  makenode(N_RETURN, 0,
                                  makenode(N_IDENT, "self", 0, 0), 0), 0);
                        }
                ;
selector        :       unary_selector
                        {
                                m->msgPattern = $1;
                                m->selector = $1->str;
                        }
                |       binary_selector lc_var_name
                        {
                                $1->left = $2;
                                m->msgPattern = $1;
                                m->selector = $1->str;
                        }
                |       keywords_list
                        {
                                m->msgPattern = $1;
                                buf[0] = '\0';
                                for ( n = m->msgPattern; n; n = n->right )
                                        strcat(buf, n->str);
                                m->selector = cp(buf);
                        }
                ;
keywords_list   :       keyword lc_var_name
                        {
                                $1->left = $2;
                                $$ = $1;
                        }
                |       keyword lc_var_name keywords_list
                        {
                                $1->left = $2;
                                $1->right = $3;
                                $$ = $1;
                        }
                ;
temporaries     :       BAR bar
                |       BAR temp_list bar
                        {
                                m->tempVarList = $2;
                        }
                ;
temp_list       :       lc_var_name
                        {
                                $$ = $1;
                        }
                |       lc_var_name temp_list
                        {
                                $1->right = $2;
                                $$ = $1;
                        }
                ;
block           :       LBRA block_guts RBRA
                        {
                                $$ = $2;
                        }
                ;
block_guts      :       statements
                        {
                                $$ = makenode(N_BLOCK, 0, 0, $1);
                        }
                |       block_temp_list         /* returns nil */
                        {
                                $$ = makenode(N_BLOCK, 0, $1,
                                  makenode(N_STATEMENT, 0,
                                  makenode(N_IDENT, "nil", 0, 0), 0));
                        }
                |       block_temp_list bar     /* returns nil */
                        {
                                $$ = makenode(N_BLOCK, 0, $1,
                                  makenode(N_STATEMENT, 0,
                                  makenode(N_IDENT, "nil", 0, 0), 0));
                        }
                |       block_temp_list bar statements
                        {
                                $$ = makenode(N_BLOCK, 0, $1, $3);
                        }
                |       /* nothing at all ... returns nil */
                        {
                                $$ = makenode(N_BLOCK, 0, 0,
                                  makenode(N_STATEMENT, 0,
                                  makenode(N_IDENT, "nil", 0, 0), 0));
                        }
                ;
block_temp_list :       COLON lc_var_name
```

```
                {
                        $$ = $2;
                }
        |       COLON lc_var_name block_temp_list
                {
                        $2->right = $3;
                        $$ = $2;
                }
        ;
statements      :       statement
                {
                        $$ = $1;
                }
        |       statement DOT
                {
                        $$ = $1;
                }
        |       statement DOT statements
                {
                        $1->right = $3;
                        $$ = $1;
                }
        ;
statement       :       expr
                {
                        $$ = makenode(N_STATEMENT, 0, $1, 0);
                }
        |       UPARR expr
                {
                        $$ = makenode(N_STATEMENT, 0,
                          makenode(N_RETURN, 0, $2, 0), 0);
                }
expr            :       primary
                {
                        $$ = $1;
                }
        |       msg_expr
                {
                        $$ = $1;
                }
        |       msg_expr SEMI msg_casc
                {
                        $$ = makenode(N_CASCADE, 0, $1, $3);
                }
        |       var_name ASSIGN expr
                {
                        $$ = makenode(N_ASSIGN, $1->str, $3, 0);
                }
        ;
msg_casc        :       msg_casc_elem
                {
                        $$ = makenode(N_CASCADE, 0, $1, 0);
                }
        |       msg_casc_elem SEMI msg_casc
                {
                        $$ = makenode(N_CASCADE, 0, $1, $3);
                }
        ;
msg_casc_elem   :       unary_selector
                {
                        $$ = makenode(N_UNARY_EXPR, $1->str, 0, 0);
                }
        |       binary_selector unary_obj_descr
                {
                        $$ = makenode(N_BINARY_EXPR, $1->str, 0, $2);
                }
        |       keyword_casc
                {
                        buf[0] = '\0';
                        for ( n = $1; n; n = n->right )
                                strcat(buf, n->str);
                        $$ = makenode(N_KEYWORD_EXPR, cp(buf), 0, $1);
                }
        ;
keyword_casc    :       keyword binary_obj_descr
                {
                        $$ = makenode(N_KEYWORD_ARGUMENT, $1->str,
                          $2, 0);
                }
        |       keyword binary_obj_descr keyword_casc
                {
                        $$ = makenode(N_KEYWORD_ARGUMENT, $1->str,
                          $2, $3);
                }
        ;
msg_expr        :       unary_expr
                {
                        $$ = $1;
                }
        |       binary_expr
                {
                        $$ = $1;
                }
        |       keyword_expr
                {
                        $$ = $1;
                }
        ;
keyword_expr    :       binary_obj_descr keyword_casc
                {
                        buf[0] = '\0';
                        for ( n = $2; n; n = n->right )
                                strcat(buf, n->str);
                        $$ = makenode(N_KEYWORD_EXPR, cp(buf), $1, $2);
                }
        ;
binary_expr     :       binary_obj_descr binary_selector unary_obj_descr
                {
                        $$ = makenode(N_BINARY_EXPR, $2->str, $1, $3);
                }
        ;
unary_expr      :       unary_obj_descr unary_selector
                {
                        $$ = makenode(N_UNARY_EXPR, $2->str, $1, 0);
                }
        ;
binary_obj_descr :      unary_obj_descr
```

```
                {
                        $$ = $1;
                }
        |       binary_expr
                {
                        $$ = $1;
                }
        ;
unary_obj_descr :       primary
                {
                        $$ = $1;
                }
        |       unary_expr
                {
                        $$ = $1;
                }
        ;
primary :       var_name
                {
                        $$ = $1;
                }
        |       literal
                {
                        $$ = $1;
                }
        |       block
                {
                        $$ = $1;
                }
        |       LPAR expr RPAR
                {
                        $$ = $2;
                }
        |       PRIMITIVE number GT
                {
                        $$ = makenode(N_PRIMITIVE, $2->str, 0, 0);
                }
        |       PRIMITIVE number primaries GT
                {
                        $$ = makenode(N_PRIMITIVE, $2->str, 0, $3);
                }
        ;
primaries       :       primary
                {
                        $$ = $1;
                }
        |       primary primaries
                {
                        $1->right = $2;
                        $$ = $1;
                }
        ;
unary_selector  :       var_name
                {
                        $$ = $1;
                }
        ;
binary_selector :       BSELECTOR
                {
                        $$ = makenode(N_IDENT, cp(yytext), 0, 0);
                }
        |       LT
                {
                        $$ = makenode(N_IDENT, cp(yytext), 0, 0);
                }
        |       GT
                {
                        $$ = makenode(N_IDENT, cp(yytext), 0, 0);
                }
        |       BAR
                {
                        $$ = makenode(N_IDENT, cp(yytext), 0, 0);
                }
        |       MINUS
                {
                        $$ = makenode(N_IDENT, cp(yytext), 0, 0);
                }
        ;
literal         :       number
                {
                        $$ = $1;
                }
        |       symbol_const
                {
                        $$ = $1;
                }
        |       char_const
                {
                        $$ = $1;
                }
        |       string
                {
                        $$ = $1;
                }
        |       array_const
                {
                        $$ = $1;
                }
        ;
array_const     :       POUND array
                {
                        $$ = $2;
                }
        ;
array           :       LPAR array_guts RPAR
                {
                        $$ = $2;
                }
        |       LPAR RPAR
                {
                        $$ = makenode(N_ARRAY, 0, 0, 0);
                }
        ;
array_guts      :       array_elem
                {
                        $$ = makenode(N_ARRAY, 0, $1, 0);
                }
        |       array_elem array_guts
                {
```

```
                $$ = makenode(N_ARRAY, 0, $1, $2);
        }
        ;
array_elem      :       number
        {
                $$ = $1;
        }
        |       symbol
        {
                $$ = $1;
        }
        |       string
        {
                $$ = $1;
        }
        |       char_const
        {
                $$ = $1;
        }
        |       array
        {
                $$ = $1;
        }
        ;
symbol_const    :       POUND symbol
        {
                $$ = changetype($2, N_SYMBOL);
        }
        ;
symbol          :       var_name
        {
                $$ = $1;
        }
        |       binary_selector
        {
                $$ = $1;
        }
        |       kbunch
        {
                $$ = $1;
        }
        |       keyword
        {
                $$ = $1;
        }
        ;
keyword         :       KEYWORD
        {
                $$ = makenode(N_IDENT, cp(yytext), 0, 0);
        }
        |       METHODSFOR
        {
                $$ = makenode(N_IDENT, cp(yytext), 0, 0);
        }
        ;
var_name        :       lc_var_name
        {
                $$ = $1;
        }
        |       uc_var_name
        {
                $$ = $1;
        }
        ;
lc_var_name     :       LC_IDENT
        {
                $$ = makenode(N_IDENT, cp(yytext), 0, 0);
        }
        |       LC_CLASS
        {
                $$ = makenode(N_IDENT, cp(yytext), 0, 0);
        }
        ;
uc_var_name     :       UC_IDENT
        {
                $$ = makenode(N_IDENT, cp(yytext), 0, 0);
        }
        |       UC_CLASS
        {
                $$ = makenode(N_IDENT, cp(yytext), 0, 0);
        }
        ;
uc_var_names    :       uc_var_name
        {
                $$ = $1;
        }
        |       uc_var_name uc_var_names
        {
                $1->right = $2;
                $$ = $1;
        }
        ;
lc_var_names    :       lc_var_name
        {
                $$ = $1;
        }
        |       lc_var_name lc_var_names
        {
                $1->right = $2;
                $$ = $1;
        }
        ;
string          :       STRING
        {
                $$ = makenode(N_STRING, cp(yytext), 0, 0);
        }
        ;
char_const      :       CHAR
        {
                $$ = makenode(N_CHAR, cp(yytext), 0, 0);
        }
        ;
kbunch          :       KBUNCH
        {
                $$ = makenode(N_IDENT, cp(yytext), 0, 0);
```

```
                }
                ;
number          :       NUMBER
                        {
                                $$ = makenode(N_NUMBER, cp(yytext), 0, 0);
                        }
                |       MINUS NUMBER
                        {
                                strcpy(buf, "-");
                                strcat(buf, yytext);
                                $$ = makenode(N_NUMBER, cp(buf), 0, 0);
                        }
                ;

%%
#include <stdio.h>

extern int linenum;
extern char yytext[];
extern char *progname;
extern char *filename;
extern FILE *fp;

fatal(s, a, b, c, d, e, f, g, h)
        char *s;
{
        fprintf(stderr, s, a, b, c, d, e, f, g, h);
        sayAbort(s, a, b, c, d, e, f, g, h);
        exit(1);
}

yywarn(s, v)
        char *s, *v;
{
        fprintf(stderr, "\"%s\", line %d: warning ", filename, linenum);
        fprintf(stderr, s, v);
        fprintf(stderr, "\n");
}

yyerror(s)
        char *s;
{
        fatal("\"%s\", line: %d: near '%s': %s\n", filename, linenum,
          yytext, s);
}

int
yywrap()
{
        return(1);
}

char *
cp(p)
        char *p;
{
        char *s;

        if (!p)
                return(p);

        s = (char *) malloc(strlen(p) + 1);
        if (!s)
                fatal("copy: Out of memory\n");

        strcpy(s, p);

        return(s);
}
```

```
%{
#include <stdio.h>
#include <ctype.h>
#include "y.tab.h"

#undef input
#undef unput

extern FILE *fp;
extern int linenum;

static int lstch = 0;

%}

D       [0-9]

LL      [a-z]
UL      [A-Z]

L       [a-zA-Z]

A       [a-zA-Z0-9]

SC      [\+\/\\\*\-\<\>\=\@\%\|\&\?\!\,]

%%
"<primitive"            { prtok("PRIMITIVE");return(PRIMITIVE); }
"methodsFor:"           { prtok("METHODSFOR");return(METHODSFOR); }
"class"                 { prtok("LC_CLASS");return(LC_CLASS); }
"Class"                 { prtok("UC_CLASS");return(UC_CLASS); }

{L}{A}*":"({L}{A}*":")+ { prtok("KBUNCH");return(KBUNCH); }
{L}{A}*":"              { prtok("KEYWORD");return(KEYWORD); }

_{LL}{A}*               { prtok("LC_IDENT");return(LC_IDENT); }
_{UL}{A}*               { prtok("UC_IDENT");return(UC_IDENT); }

{LL}{A}*                { prtok("LC_IDENT");return(LC_IDENT); }
{UL}{A}*                { prtok("UC_IDENT");return(UC_IDENT); }

"$".                    { prtok("CHAR");return(CHAR); }

'[^']*'                 { char c; unput(c = input());
                          if ( c == '\'' ) yymore();
                          else { prtok("STRING");return(STRING); } }

"-"                     { prtok("MINUS");return(MINUS); }

"("                     { prtok("LPAR");return(LPAR); }
")"                     { prtok("RPAR");return(RPAR); }
"["                     { prtok("LBRA");return(LBRA); }
"]"                     { prtok("RBRA");return(RBRA); }
"<"                     { prtok("LT");return(LT); }
">"                     { prtok("GT");return(GT); }
"."                     { prtok("DOT");return(DOT); }
"^|"                    { prtok("MBAR");return(MBAR); }
"|"                     { prtok("BAR");return(BAR); }
";"                     { prtok("SEMI");return(SEMI); }
"^"                     { prtok("UPARR");return(UPARR); }
"#"                     { prtok("POUND");return(POUND); }
"<-"                    { prtok("ASSIGN");return(ASSIGN); }
"!"                     { prtok("BANG");return(BANG); }
":"                     { prtok("COLON");return(COLON); }
{SC}{SC}                { prtok("BSELECTOR");return(BSELECTOR); }
{SC}                    { prtok("BSELECTOR");return(BSELECTOR); }
"@"                     { prtok("BSELECTOR");return(BSELECTOR); }

({D}+r-?)?{D}{A}*(\.{A}+)?(e-?{D}+)? { prtok("NUMBER");return(NUMBER); }

\"                      { readcomment(); }

[ \t]                   { }
[\n\r\f]                {linenum++;}

.                       { printf("bad character: [%c (%d)] ignored.\n", lstch, lstch); }

%%

#define INBUFSIZE (1024)
static int ocbuf = 0;
static int pbbuf[INBUFSIZE];

static int input()
{       int c;

        if (ocbuf) {c = pbbuf[--ocbuf]; }
        else {
                c = getc(fp);
                if (c == EOF) c = 0;
                }
        lstch = c;
        return(c);
}

static unput(c)
char c;
{
        if (ocbuf == INBUFSIZE)
                fatal("unput: input buffer overflow\n");

        if (c) pbbuf[ocbuf++] = c;
}

static readcomment()
{
        char c;
        char c2;

        while ((c = input()))
        {
                if (c == '\"')
                {
                        c2 = input();

                        if (c2 != '\"')
                        {
                                unput(c2);

                                break;
                        }
                }

                if (c == '\n') linenum++;
        }
```

```
	if (!c) yyerror("unterminated comment");
}

extern Tokens;

static prtok(s)
	char *s;
{
	if ( Tokens )
		printf("--token: %s -->%s<--\n", s, yytext);
}

/*Copyright 1988 Eastman Kodak Company.  All rights reserved.*/
```

```
%token CLASS SUPERVAR INSTVARS CLASSVARS IMETHOD CMETHOD
%token MPARAM MTEMP MPRIM MATTR MEND LINE FILENAME
%token SEND SEND_ADD SEND_ADD1 SEND_SUB SEND_SUB1 SEND_EQ SENDP
%token EVALB EVALBO MRET BRET JMP JNE JEQ SETB MOV PRIM LABELSTMT
%token LABEL MTVAR TVAR IVAR BVAR
%token IDENT STRING NUMBER CHAR SYMBOL XREF
%token LPAR RPAR COMMA AT MINUS

%{

#include <stdio.h>
#include "kaparse.h"
#include "types.h"
#include "constants.h"
#include "bytecodes.h"

 /*Copyright 1988 Eastman Kodak Company.  All rights reserved.*/
typedef struct pnode * YYSTYPE;

extern struct pnode *makenode();
extern struct pnode *changetype();

static char buf[256];

%}

%start file

%%

file            :       FILENAME
                        {
                                file(yytext);
                        }
                        classes
                ;

classes         :       class
                |       classes class
                ;

class           :       class_header methods
                        {
                                endClass();
                        }
                |       class_header
                        {
                                endClass();
                        }
                ;

class_header    :       CLASS name super SUPERVAR number INSTVARS idents
                          CLASSVARS idents
                        {
                                beginClass($2->str, $3->str, $5->str, $7, $9);
                        }
                |       CLASS name super SUPERVAR number INSTVARS idents
                        {
                                beginClass($2->str, $3->str, $5->str, $7, 0);
                        }
                |       CLASS name super SUPERVAR number CLASSVARS idents
                        {
                                beginClass($2->str, $3->str, $5->str, 0, $7);
                        }
                |       CLASS name super SUPERVAR number
                        {
                                beginClass($2->str, $3->str, $5->str, 0, 0);
                        }
                ;

name            :       ident
                        {
                                $$ = $1;
                        }
                ;

super           :       ident
                        {
                                $$ = $1;
                        }
                |       /* nothing */
                        {
                                $$ = makenode(N_IDENT, "Object", 0, 0);
                        }
                ;

methods         :       method
                |       methods method
                ;

method          :       method_header statements method_trailer
                ;

method_header   :       method_type selector MPARAM idents MTEMP idents optinfo
                        {
                                beginMethod($1->type, $2->str, $4, $6, $7);
                        }
                |       method_type selector MPARAM idents optinfo
                        {
                                beginMethod($1->type, $2->str, $4, 0, $5);
                        }
                |       method_type selector MTEMP idents optinfo
                        {
                                beginMethod($1->type, $2->str, 0, $4, $5);
                        }
                |       method_type selector optinfo
                        {
                                beginMethod($1->type, $2->str, 0, 0, $3);
                        }
                ;

method_trailer  :       MEND number number
                        {
                                endMethod($2->str, $3->str);
                        }
                ;

optinfo         :       MPRIM number
                        {
                                $$ = makenode(N_MPRIM, cp(yytext), 0, $2);
                        }
                |       MATTR number
                        {
                                $$ = makenode(N_MATTR, cp(yytext), 0, $2);
                        }
                |       /* nothing */
```

```
                {
                        $$ = 0;
                }
        ;
method_type     :       IMETHOD
                {
                        $$ = makenode(N_IMETH, 0, 0, 0);
                }
        |       CMETHOD
                {
                        $$ = makenode(N_CMETH, 0, 0, 0);
                }
        ;
statements      :       statement
                |       statements statement
                ;
statement       :       SEND varref COMMA number COMMA varref COMMA number
                          COMMA symbol
                {
                        genSend($2, $4->str, $6, $8->str, $10->str,
                          SEND_MESSAGE);
                }
        |       SEND_EQ varref COMMA number COMMA varref COMMA number
                          COMMA symbol
                {
                        genSend($2, $4->str, $6, $8->str, $10->str,
                          SEND_MESSAGE_EQ);
                }
        |       SEND_ADD varref COMMA number COMMA varref COMMA number
                          COMMA symbol
                {
                        genSend($2, $4->str, $6, $8->str, $10->str,
                          SEND_MESSAGE_ADD);
                }
        |       SEND_ADD1 varref COMMA number COMMA varref COMMA number
                          COMMA symbol
                {
                        genSend($2, $4->str, $6, $8->str, $10->str,
                          SEND_MESSAGE_ADD1);
                }
        |       SEND_SUB varref COMMA number COMMA varref COMMA number
                          COMMA symbol
                {
                        genSend($2, $4->str, $6, $8->str, $10->str,
                          SEND_MESSAGE_SUB);
                }
        |       SEND_SUB1 varref COMMA number COMMA varref COMMA number
                          COMMA symbol
                {
                        genSend($2, $4->str, $6, $8->str, $10->str,
                          SEND_MESSAGE_SUB1);
                }
        |       SENDP varref COMMA number COMMA varref COMMA number
                          COMMA varref
                {
                        genParamSend($2, $4->str, $6, $8->str, $10);
                }
        |       EVALB varref COMMA varref COMMA number
                {
                        genEvalBlock($2, $4, $6->str, 0);
                }
        |       EVALBO varref COMMA varref COMMA number
                {
                        genEvalBlock($2, $4, $6->str, 1);
                }
        |       MRET varref
                {
                        genMethodReturn($2);
                }
        |       BRET varref
                {
                        genBlockReturn($2);
                }
        |       JMP label
                {
                        genBranch($2->str);
                }
        |       JNE label COMMA varref COMMA xref
                {
                        genBranchNE($2->str, $4, $6);
                }
        |       JEQ label COMMA varref COMMA xref
                {
                        genBranchEQ($2->str, $4, $6);
                }
        |       SETB bvar COMMA label COMMA number
                {
                        genSetUpBlock($2, $4->str, $6->str);
                }
        |       MOV varref COMMA ref
                {
                        genAssign($2, $4);
                }
        |       PRIM varref COMMA number COMMA varref COMMA number
                {
                        genExecPrim($2, $4->str, $6, $8->str);
                }
        |       LABELSTMT
                {
                        label(yytext);
                }
        |       LINE
                {
                        line(yytext);
                }
        ;
ref             :       varref
                {
                        $$ = $1;
                }
        |       constref
                {
                        $$ = $1;
                }
        |       bvar
                {
                        $$ = $1;
                }
        ;
varref          :       xref AT ivar
                {
                        $1->right = $3;
                        $$ = $1;
```

```
		}
	|	bvar AT tvar
		{
			$1->right = $3;
			$$ = $1;
		}
	|	ivar
		{
			$$ = $1;
		}
	|	mtvar
		{
			$$ = $1;
		}
	|	tvar
		{
			$$ = $1;
		}
	;
constref	:	xref
		{
			$$ = $1;
		}
	|	constant
		{
			$$ = $1;
		}
	;
selector	:	ident
		{
			$$ = makenode(N_IDENT, cp(yytext), 0, 0);
		}
	;
idents	:	ident
		{
			$$ = $1;
		}
	|	ident idents
		{
			$1->right = $2;
			$$ = $1;
		}
	;
ident	:	IDENT
		{
			$$ = makenode(N_IDENT, cp(yytext), 0, 0);
		}
	|	label
		{
			$$ = changetype($1, N_IDENT);
		}
	|	mtvar
		{
			$$ = changetype($1, N_IDENT);
		}
	|	tvar
		{
			$$ = changetype($1, N_IDENT);
		}
	|	ivar
		{
			$$ = changetype($1, N_IDENT);
		}
	|	bvar
		{
			$$ = changetype($1, N_IDENT);
		}
	|	COMMA
		{
			$$ = makenode(N_IDENT, cp(yytext), 0, 0);
		}
	|	AT
		{
			$$ = makenode(N_IDENT, cp(yytext), 0, 0);
		}
	|	MINUS
		{
			$$ = makenode(N_IDENT, cp(yytext), 0, 0);
		}
	;
label	:	LABEL
		{
			$$ = makenode(N_LABEL, cp(yytext), 0, 0);
		}
	;
mtvar	:	MTVAR
		{
			$$ = makenode(N_MTVAR, cp(yytext), 0, 0);
		}
	;
tvar	:	TVAR
		{
			$$ = makenode(N_TVAR, cp(yytext), 0, 0);
		}
	;
ivar	:	IVAR
		{
			$$ = makenode(N_IVAR, cp(yytext), 0, 0);
		}
	;
bvar	:	BVAR
		{
			$$ = makenode(N_BVAR, cp(yytext), 0, 0);
		}
	;
symbol	:	SYMBOL
		{
			$$ = makenode(N_SYMBOL, cp(yytext+1), 0, 0);
		}
	;
xref	:	XREF
		{
			$$ = makenode(N_XREF, cp(yytext+1), 0, 0);
		}
	;
constant	:	string
```

```
		{
			$$ = $1;
		}
	|	symbol
		{
			$$ = $1;
		}
	|	number
		{
			$$ = $1;
		}
	|	character
		{
			$$ = $1;
		}
	|	array
		{
			$$ = $1;
		}
	;

string		:	STRING
		{
			$$ = makenode(N_STRING, cp(yytext+1), 0, 0);
		}
	;

number		:	NUMBER
		{
			$$ = makenode(N_NUMBER, cp(yytext), 0, 0);
		}
	|	MINUS NUMBER
		{
			strcpy(buf, "-");
			strcat(buf, yytext);
			$$ = makenode(N_NUMBER, cp(buf), 0, 0);
		}
	;

character	:	CHAR
		{
			$$ = makenode(N_CHAR, cp(yytext+1), 0, 0);
		}
	;

array		:	LPAR array_guts RPAR
		{
			$$ = $2;
		}
	|	LPAR RPAR
		{
			$$ = makenode(N_ARRAY, 0, 0, 0);
		}
	;

array_guts	:	array_elem
		{
			$$ = makenode(N_ARRAY, 0, $1, 0);
		}
	|	array_elem array_guts
		{
			$$ = makenode(N_ARRAY, 0, $1, $2);
		}
	;

array_elem	:	number
			{
				$$ = $1;
			}
		|	symbol
			{
				$$ = $1;
			}
		|	xref
			{
				$$ = $1;
			}
		|	string
			{
				$$ = $1;
			}
		|	character
			{
				$$ = $1;
			}
		|	array
			{
				$$ = $1;
			}
		;

%%
#include <stdio.h>

extern int linenum;
extern int SourceLine;
extern char SourceFile[];
extern char yytext[];
extern char *progname;
extern char *filename;
extern FILE *fp;

fatal(s, a, b, c, d, e, f, g, h)
	char *s;
{
	fprintf(stderr, "\"%s\", line %d: ", SourceFile, SourceLine);
	fprintf(stderr, s, a, b, c, d, e, f, g, h);
	fprintf(stderr, "\n");
	exit(1);
}

yywarn(s, v)
	char *s, *v;
{
	fprintf(stderr, "\"%s\", line %d: warning: ", SourceFile, SourceLine);
	fprintf(stderr, s, v);
	fprintf(stderr, "\n");
}

yyerror(s)
	char *s;
{
	fatal("near '%s': %s", yytext, s);
}

int
yywrap()
{
```

```
        return(1);
}

char *
cp(p)
        char *p;
{
        char *s;

        s = (char *) malloc(strlen(p) + 1);

        if (!s)
                fatal("copy: Out of memory");

        strcpy(s, p);

        return(s);
}
```

```
%{
#include <stdio.h>
#include <ctype.h>
#include "y.tab.h"

#undef input
#undef unput

extern FILE *fp;
extern int linenum;

static int lstch = 0;

%}

D       [0-9]

LL      [a-z]
UL      [A-Z]

SC      [\+\/\\\*\~\<\>\=\@\%\|\&\?\!\,]

L       [a-zA-Z]

A       [a-zA-Z0-9]

K       [a-zA-Z0-9:-]

C       [a-zA-Z0-9\+\/\\\*\~\<\>\=\@\%\|\&\?\!\,\-]

%%

^\.abort.*$             { fatal(yytext); }

^\.class                { prtok("CLASS");return(CLASS); }
^\.supervar             { prtok("SUPERVAR");return(SUPERVAR); }
^\.ivar                 { prtok("INSTVARS");return(INSTVARS); }
^\.cvar                 { prtok("CLASSVARS");return(CLASSVARS); }
^\.imethod              { prtok("IMETHOD");return(IMETHOD); }
^\.cmethod              { prtok("CMETHOD");return(CMETHOD); }
^\.mprim                { prtok("MPRIM");return(MPRIM); }
^\.mattr                { prtok("MATTR");return(MATTR); }
^\.mparam               { prtok("MPARAM");return(MPARAM); }
^\.mtemp                { prtok("MTEMP");return(MTEMP); }
^\.mend                 { prtok("MEND");return(MEND); }
^\.line.*$              { prtok("LINE");return(LINE); }
^\.file.*$              { prtok("FILENAME");return(FILENAME); }

^[ \t]*send             { prtok("SEND");return(SEND); }
^[ \t]*seq              { prtok("SEND_EQ");return(SEND_EQ); }
^[ \t]*sadd             { prtok("SEND_ADD");return(SEND_ADD); }
^[ \t]*saddl            { prtok("SEND_ADD1");return(SEND_ADD1); }
^[ \t]*ssub             { prtok("SEND_SUB");return(SEND_SUB); }
^[ \t]*ssubl            { prtok("SEND_SUB1");return(SEND_SUB1); }
^[ \t]*sendp            { prtok("SENDP");return(SENDP); }
^[ \t]*evalb            { prtok("EVALB");return(EVALB); }
^[ \t]*evalbo           { prtok("EVALBO");return(EVALBO); }
^[ \t]*mret             { prtok("MRET");return(MRET); }
^[ \t]*bret             { prtok("BRET");return(BRET); }
^[ \t]*jmp              { prtok("JMP");return(JMP); }
^[ \t]*jne              { prtok("JNE");return(JNE); }
^[ \t]*jeq              { prtok("JEQ");return(JEQ); }
^[ \t]*setb             { prtok("SETB");return(SETB); }
^[ \t]*mov              { prtok("MOV");return(MOV); }

^[ \t]*prim             { prtok("PRIM");return(PRIM); }

'[^']*                  { char c; input(); unput(c = input());
                          if ( c == '\'' ) yymore();
                          else { prtok("STRING");return(STRING); } }

({D}+r-?)?{D}{A}*(\.{A}+)?(e-?{D}+)? { prtok("NUMBER");return(NUMBER); }

\$.                     { prtok("CHAR");return(CHAR); }

^L{D}+                  { prtok("LABELSTMT");return(LABELSTMT); }
L{D}+                   { prtok("LABEL");return(LABEL); }
mt{D}+                  { prtok("MTVAR");return(MTVAR); }
t{D}+                   { prtok("TVAR");return(TVAR); }
i{D}+                   { prtok("IVAR");return(IVAR); }
b{D}+                   { prtok("BVAR");return(BVAR); }

"("                     { prtok("LPAR");return(LPAR); }
")"                     { prtok("RPAR");return(RPAR); }
","                     { prtok("COMMA");return(COMMA); }
"@"                     { prtok("AT");return(AT); }
"-"                     { prtok("MINUS");return(MINUS); }

#{L}{K}*                { prtok("SYMBOL");return(SYMBOL); }
#{SC}{SC}               { prtok("SYMBOL");return(SYMBOL); }
#{SC}                   { prtok("SYMBOL");return(SYMBOL); }
#-                      { prtok("SYMBOL");return(SYMBOL); }

'_{L}{K}*               { prtok("XREF");return(XREF); }
'{L}{K}*                { prtok("XREF");return(XREF); }
'{SC}{SC}               { prtok("XREF");return(XREF); }
'{SC}                   { prtok("XREF");return(XREF); }
'-                      { prtok("XREF");return(XREF); }

{L}{K}*                 { prtok("IDENT");return(IDENT); }
{SC}{SC}                { prtok("IDENT");return(IDENT); }
{SC}                    { prtok("IDENT");return(IDENT); }

\"[^\"]*\"              { }
;.*$                    { }
[ \t]                   { }
[\n\r\f]                { linenum++; }

.                       { printf("bad character: (%c (%d)) ignored.\n", lstch, lstch); }

%%

#define INBUFSIZE (1024)
static int ocbuf = 0;
static int pbbuf[INBUFSIZE];

static int input()
{       int c;

        if (ocbuf) {c = pbbuf[--ocbuf]; }
        else {
                c = getc(fp);
                if (c == EOF) c = 0;
                }
        lstch = c;
        return(c);
}
```

```
static unput(c)
char c;
{
        if (ocbuf == INBUFSIZE)
                fatal("unput: input buffer overflow");

        if (c) pbbuf[ocbuf++] = c;
}

extern Tokens;

static prtok(s)
        char *s;
{
        if ( Tokens )
                printf("--token: %s -->%s<--\n", s, yytext);
}
```

/*Copyright 1988 Eastman Kodak Company. All rights reserved.*/

Appendix B: Standard Includes a2c.h
acre.h
assign.h
assign.unaligned
basic.h
buffer.h
bytecodes.h
cif.h
constants.h
constants.h.org
dbm.h
debug_const.h
debug_externs.h
debug_types.h
dependency.h
error.h
fontdef.h
get_element.h
hashtbl.h
interp_const.h
interp_types.h
interp_types.old
kamisc.h
kaparse.h
kccode.h
kcmisc.h
kcparse.h
keycodes.h
macros.h
macros.old
math.h
obj_mgr.h
object_rec.h
oops_values.h
point_conversion.h
pool.h
prim_macro.h
sampler_const.h
sampler_externs.h
sampler_init.h
sampler_types.h
symbol_db.h
thread.h
types.h
units.h
xfontfile.h

```
/*
 * a2c unique structures and constants
 */

#define M_CLASS         0x01    /* class method */
#define M_PRIM          0x02    /* primitive-only method (for flattening) */
#define M_ATTR          0x04    /* attribute-fetch method (for flattening) */

/*
 * class and method lookup entries and hash table structures
 */

struct classEntry                       /* key is oop of class */
{
        char *name;                     /* class name */
        struct hashTable *methods;      /* method lookup table */
};

struct methEntry                        /* key is oop of selector symbol */
{
        char *selector;                 /* selector */
        int (*proc)();                  /* function pointer */
        int flags;                      /* method flags (M_*) */
};

struct hashEntry
{
        int key;
        union
        {
                struct classEntry class;
                struct methEntry meth;
        } value;
};

struct hashTable
{
        struct hashEntry *table;
        int size;
};
```

```
/*
 * acre structures
 */

/*
 * block stubs
 */

typedef struct
{
        int (*blockProc)();      /* block procedure */
        int *methodParams;       /* method parameters */
        int *methodTemps;        /* method formal temporaries */
        int *blockParams;        /* block params for most recent activation */
        int *prevBlockParams;    /* block params for previous activation */
        int longRetVal;          /* long return value */
        int *longRetEnv;         /* long return environment (jmp_buf) */
} stub;

/*
 * processes
 */

typedef struct
{
        int procId;              /* process id (internal use, not an oop!) */
        int regionCntr;          /* current gc region id */
        int objectCntr;          /* # of objects created in current gc region */
        stub *stubPtr;           /* top of block stub stack */
        stub *stubStack;         /* base of block stub stack */
} process;

/*
 * universal externs
 */

extern int Divert;
extern object *CurRcvr;
extern process *CurProcess;
extern hashTable *Classes;

/*
 * runtime macros
 */

#define blockStubMask           0xffff0000      /* derived from INIT_CNTX_ID */

#define objectSize(obj) \
        (sizeof((obj)->fp)+(sizeof((obj)->value[0])\
        *((obj)->fp.no_named_vars+(obj)->fp.no_indx_vars)))

#define classInfo(obj)  \
        ((class_cntrl *)((char *)(obj)+objectSize(obj)))

#define blockStub(sid, pid)     \
        (&Process[pid].stubStack[(sid & ~blockStubMask) >> MAX_PROC])

#define update(obj)             ((obj)->fp.flags |= UPDATED)

#define CurPid                  (CurProcess->procId)
#define CurRgn                  (CurProcess->regionCntr)
#define CurObjCnt               (CurProcess->objectCntr)
#define CurRcvrId               (CurRcvr->fp.id)
#define CurRcvrClass            (CurRcvr->fp.class)

#define CurRcvrSuper                    \
        (classInfo(get_obj(super, CurRgn, CurPid))->cfp.super_class)
#define self                    (CurRcvrId)

#define instVars(obj)           ((int *) &((obj)->value[0]))

#define getInstVar(slot)        (instVars(CurRcvr)[slot])
#define setInstVar(slot, val)   \
        if (val >= First_new_obj || instVars(CurRcvr)[slot] >= First_new_obj)\
                referenced(CurRcvr, val, instVars(CurRcvr)[slot], _region,\
                 CurPid);\
        instVars(CurRcvr)[slot] = val;\
        update(CurRcvr);

#define getClassVar(slot)       /* no getClassVar() yet */
#define setClassVar(slot, val)  /* no setClassVar() yet */

#define methTemp(slot)          ((_stub->methodTemps)[slot])
#define methParam(slot)         ((_stub->methodParams)[slot])
#define blockParam(block, slot) \
        (blockStub((_stub->methodTemps)[block], CurPid)[slot])

#define markBlockStubs()        (CurProcess->stubPtr)
#define releaseBlockStubs(stub) (CurProcess->stubPtr = stub)

#define setActiveBlock(stub, bparams)   /* no setActiveBlock() yet */
#define prevActiveBlock(stub)           /* no prevActiveBlock() yet */

#define setUpBlock(proc, mparams, mtemps, env)  \
        CurProcess->stubPtr->blockProc = proc;\
        CurProcess->stubPtr->methodParams = mparams;\
        CurProcess->stubPtr->methodTemps = mtemps;\
        CurProcess->stubPtr->longRetEnv = env;\
        CurProcess->stubPtr++;

#define lookUp(table, const, result) \
        {\
                register int index;\
                register int mask;\
                register int size;\
                size = table->size;\
                mask = size - 1;\
                index = const & mask;\
                for (;;) {\
                        if ( table->table[index].key == const )\
                                result = &table[index], break;\
                        if ( table->table[index].key == 0 || size == 0 )\
                                result = NULL, break;\
                        index = (index + 1) & mask;\
                        size--;\
                }\
        }

#define sendPro(msg, rcvr, super, class, meth) \
        if ( Divert )\
                syserr("send: can't divert yet!");\
        if ( rcvr != CurRcvrId ) {\
                prevRcvr = CurRcvr;\
                CurRcvr = reserve obj(rcvr, CurRgn, CurPid);\
                if ( CurRcvr == NULL )\
                        syserr("send: receiver not found (oop=%d)", rcvr);\
        }\
        if ( !((CurRcvrClass == class && CurRcvrClass != CurRcvrId)\
```

```
        || (CurRcvrClass == -class && CurRcvrClass == CurRcvrId)) ) {\
            register hashEntry *entry;\
            class = (super) ? CurRcvrSuper : CurRcvrClass ;\
            lookUp(_Classes, class, entry);\
            if ( entry == NULL )\
                    syserr("send: class not found (oop=%d)", class);\
            lookUp(entry->value.class.methods, msg, entry);\
            if ( entry == NULL )\
                    syserr("send: method not found (oop=%d)", msg);\
            meth = entry->value.meth.proc;\
            class = (CurRcvrClass != CurRcvrId) ? class : -class;\
        }

#define send(meth)      meth

#define sendEpiNRV() \
        if ( CurRgn - 1 > _region ) {\
                CurRgn = _region + 1;\
                collector(CurRgn, CurPid);\
                CurObjCnt = 0;\
        }\
        Rcvr = _prevRcvr;

#define sendEpiRV(val) \
        if ( val >= First_new_obj && CurRgn > _region )\
                change_region(val, CurPid, _region);\
        sendEpiNRV();
```

/*Copyright 1988 Eastman Kodak Company.  All rights reserved.*/

```
/*
** assign bytecodes
**
** the assign bytecode itself indicates source and destination variable
** types by the values of the low and high nibbles, respectively.
*/

#define ASSIGN_BCODE(dest, src) \
        ( (((dest) << 4) & 0x00f0) | ((src) & 0x000f) | 0x0100 )

#define ASSIGN_SRC(bcode)       ( (bcode) & 0x000f )

#define ASSIGN_DEST(bcode)      ( ( (bcode) >> 4 ) & 0x000f )

/*
** assign instruction source & destination types
*/

#define BCODE   \
        bcode   bytecode;

#define TYPE1(sd)       struct { oop obj; } sd;

#define TYPE2(sd)       struct { unsigned short methTempSlot; } sd;

#define TYPE3(sd)       struct { unsigned short objSlot; } sd;

#define TYPE4(sd)       struct { oop obj; unsigned short objSlot; \
                                short padding;} sd;

#define TYPE5(sd)       struct { unsigned short blkTempSlot; } sd;

#define TYPE6(sd)       struct { unsigned short blkContextSlot; unsigned short blkTempSlo

#define PAD2(pad)       struct { short pad2Bytes; } pad;

struct assignGeneric { BCODE };

#define A_GENERIC(ptr)  ( (struct assignGeneric *) (ptr) )

#define A21(ptr)        ( (struct assign21 *) (ptr) )
#define A22(ptr)        ( (struct assign22 *) (ptr) )
#define A23(ptr)        ( (struct assign23 *) (ptr) )
#define A24(ptr)        ( (struct assign24 *) (ptr) )
#define A25(ptr)        ( (struct assign25 *) (ptr) )
#define A26(ptr)        ( (struct assign26 *) (ptr) )
#define A31(ptr)        ( (struct assign31 *) (ptr) )
#define A32(ptr)        ( (struct assign32 *) (ptr) )
#define A33(ptr)        ( (struct assign33 *) (ptr) )
#define A34(ptr)        ( (struct assign34 *) (ptr) )
#define A35(ptr)        ( (struct assign35 *) (ptr) )
#define A36(ptr)        ( (struct assign36 *) (ptr) )
#define A41(ptr)        ( (struct assign41 *) (ptr) )
#define A42(ptr)        ( (struct assign42 *) (ptr) )
#define A43(ptr)        ( (struct assign43 *) (ptr) )
#define A44(ptr)        ( (struct assign44 *) (ptr) )
#define A45(ptr)        ( (struct assign45 *) (ptr) )
#define A46(ptr)        ( (struct assign46 *) (ptr) )
#define A51(ptr)        ( (struct assign51 *) (ptr) )
#define A52(ptr)        ( (struct assign52 *) (ptr) )
#define A53(ptr)        ( (struct assign53 *) (ptr) )
#define A54(ptr)        ( (struct assign54 *) (ptr) )
#define A55(ptr)        ( (struct assign55 *) (ptr) )
#define A56(ptr)        ( (struct assign56 *) (ptr) )

#define AGENERIC_SIZE   sizeof(struct assignGeneric)

#define A21_SIZE        sizeof(struct assign21)
#define A22_SIZE        sizeof(struct assign22)
#define A23_SIZE        sizeof(struct assign23)
#define A24_SIZE        sizeof(struct assign24)
#define A25_SIZE        sizeof(struct assign25)
#define A26_SIZE        sizeof(struct assign26)
#define A31_SIZE        sizeof(struct assign31)
#define A32_SIZE        sizeof(struct assign32)
#define A33_SIZE        sizeof(struct assign33)
#define A34_SIZE        sizeof(struct assign34)
```

```
struct assign21 { BCODE TYPE2(d) TYPE1(s) };
struct assign22 { BCODE TYPE2(d) TYPE2(s) PAD2(pad) };
struct assign23 { BCODE TYPE2(d) TYPE3(s) PAD2(pad) };
struct assign24 { BCODE TYPE2(d) TYPE4(s) };
struct assign25 { BCODE TYPE2(d) TYPE5(s) PAD2(pad) };
struct assign26 { BCODE TYPE2(d) TYPE6(s) };
struct assign31 { BCODE TYPE3(d) TYPE1(s) };
struct assign32 { BCODE TYPE3(d) TYPE2(s) PAD2(pad) };
struct assign33 { BCODE TYPE3(d) TYPE3(s) PAD2(pad) };
struct assign34 { BCODE TYPE3(d) TYPE4(s) };
struct assign35 { BCODE TYPE3(d) TYPE5(s) PAD2(pad) };
struct assign36 { BCODE TYPE3(d) TYPE6(s) };
struct assign41 { BCODE PAD2(pad1) TYPE4(d)  TYPE1(s) };
struct assign42 { BCODE PAD2(pad1) TYPE4(d) TYPE2(s) PAD2(pad2) };
struct assign43 { BCODE PAD2(pad1) TYPE4(d) TYPE3(s) PAD2(pad2) };
struct assign44 { BCODE PAD2(pad1) TYPE4(d) TYPE4(s) };
struct assign45 { BCODE PAD2(pad1) TYPE4(d) TYPE5(s) PAD2(pad2) };
struct assign46 { BCODE PAD2(pad1) TYPE4(d) TYPE6(s) };
struct assign51 { BCODE TYPE5(d) TYPE1(s) };
struct assign52 { BCODE TYPE5(d) TYPE2(s) PAD2(pad) };
struct assign53 { BCODE TYPE5(d) TYPE3(s) PAD2(pad) };
struct assign54 { BCODE TYPE5(d) TYPE4(s) };
struct assign55 { BCODE TYPE5(d) TYPE5(s) PAD2(pad) };
struct assign56 { BCODE TYPE5(d) TYPE6(s) };
 /*Copyright 1988 Eastman Kodak Company.  All rights reserved.*/
#ifndef basic_DEFINED
#define basic_DEFINED

#include <stdio.h>
#include <sys/file.h>
#include <sys/errno.h>
#include <strings.h>
#include <ctype.h>
#include "error.h"

#define GLOBAL
#define LOCAL   static

#ifdef TRUE
#undef TRUE
#endif

#ifdef FALSE
#undef FALSE
#endif

typedef enum {FALSE = 0, TRUE = 1}      BOOL;
typedef unsigned char                   BYTE;
typedef unsigned int                    UINT;

#define EOS     '\0'

#define ABS(v)                  ((v) < 0 ? -(v) : (v))
#define ALLOC(type,n)           ((type*) malloc((UINT)(sizeof(type) * (n))))
#define ALLOCZ(type,n)          ((type*) calloc((UINT)(n),(UINT)sizeof(type)))
#define DEALLOC(at)             (free((char *)(at)))
#define BCOPY(src,dst,n)        (bcopy((char *)(src),(char *)(dst),(int)(n)))
#define BZERO(at,n)             (bzero((char *)(at),(int)(n)))
#define MAX(v1,v2)              ((v1) > (v2) ? (v1) : (v2))
#define MIN(v1,v2)              ((v1) < (v2) ? (v1) : (v2))
#define SIGN(v)                 ((v) > 0 ? (1) : ((v) < 0 ? (-1) : (0)))
#define TOLOWER(c)              (isalpha(c) ? (islower(c) ? (c) : tolower(c)) : (c))
#define TOUPPER(c)              (isalpha(c) ? (isupper(c) ? (c) : toupper(c)) : (c))
#define SAMECHAR(c1,c2)         (TOLOWER(c1) == TOLOWER(c2))
#define ODD(n)                  ((n) % 2)

#define A35_SIZE        sizeof(struct assign35)
#define A36_SIZE        sizeof(struct assign36)
#define A41_SIZE        sizeof(struct assign41)
#define A42_SIZE        sizeof(struct assign42)
#define A43_SIZE        sizeof(struct assign43)
#define A44_SIZE        sizeof(struct assign44)
#define A45_SIZE        sizeof(struct assign45)
#define A46_SIZE        sizeof(struct assign46)
#define A51_SIZE        sizeof(struct assign51)
#define A52_SIZE        sizeof(struct assign52)
#define A53_SIZE        sizeof(struct assign53)
#define A54_SIZE        sizeof(struct assign54)
#define A55_SIZE        sizeof(struct assign55)
#define A56_SIZE        sizeof(struct assign56)

/*
** MAX_ASSIGN_SIZE is used during code generation in the second
** phase of the compiler
*/

#define MAX_ASSIGN_SIZE         A44_SIZE



extern char     *calloc ();
extern int      free ();
extern char     *malloc ();

#endif
```

```
#define EVEN(n)                  (!ODD(n))
#define SETBIT_ON(data,bitno)    ((data) | (1 << (bitno)))
#define SETBIT_OFF(data,bitno)   ((data) & ~(1 << (bitno)))
#define TESTBIT(data,bitno)      ((data) & (1 << (bitno)))
#define STREQ(s1,s2)             (strcmp((s1),(s2)) == 0)
#define STRNEQ(s1,s2)            (strcmp((s1),(s2)) != 0)
#define IS_DECIMAL_DIGIT(d)      ((d >= '0') && (d <= '9'))
#define IS_HEX_DIGIT(d)          (IS_DECIMAL_DIGIT(d) || \
                                  ((d >= 'a') && (d <= 'f')) || \
                                  ((d >= 'A') && (d <= 'F')))
#define IS_OCTAL_DIGIT(d)        ((d >= '0') && (d <= '7'))

#ifdef DEBUG

#define ASSERT(exp)              if (!(exp)) assertfailed(__FILE__,__LINE__)

#else

#define ASSERT(exp)              /* do nothing */

#endif
```

```
/*Copyright 1988 Eastman Kodak Company.  All rights reserved.*/
/*buffer.h:  constants for the buffer manager*/

/*use of this include assumes object_rec.h has
  already been included, and pool.h as well.*/

/*

  Please note that elements in obj_table are initialized with oop set to
  -1.  An oop of 0 is legitimate.  The pointers in obj_table are initialized
  to NULL.

 */

#define HASH(input) (input) & MAX_OBJECTS

#define FIND_OBJ(TARGET,HIT)                                        \
        /*TARGET is oop to find, HIT is answer*/                    \
        for ((HIT) = &obj_table[HASH(TARGET)];                      \
                (HIT)->oop != TARGET && (HIT) -> fwd_ovfl != NULL ;  \
                (HIT) = (HIT) -> fwd_ovfl);
```

```
/*Copyright 1988 Eastman Kodak Company.  All rights reserved.*/
/*
** bytecode value definitions, (except for assign)
*/

#define BLOCK_VALUE_PRIM          ( 0x0ff )
#define SEND_MESSAGE              ( 0x100 )
#define LONG_RETURN               ( 0x101 )
#define SHORT_RETURN              ( 0x104 )
#define BRANCH                    ( 0x105 )
#define SET_UP_BLOCK_CONTEXT      ( 0x106 )
#define BRANCH_ON_EQUAL           ( 0x107 )
#define BRANCH_ON_NOT_EQUAL       ( 0x108 )
#define EVALUATE_BLOCK            ( 0x109 )
#define EVALUATE_BLOCK_2          ( 0x10a )
#define SEND_PARAM_MESSAGE        ( 0x10b )
#define SEND_MESSAGE_ADD          ( 0x10c )
#define SEND_MESSAGE_SUB          ( 0x10d )
#define SEND_MESSAGE_EQ           ( 0x10e )
#define SEND_MESSAGE_ADD1         ( 0x10f )
#define SEND_MESSAGE_SUB1         ( 0x110 )
#define ASSIGN5FROM1              ( 0x151 )
#define ASSIGN5FROM3              ( 0x153 )
#define ASSIGN5FROM4              ( 0x154 )
#define ASSIGN5FROM5              ( 0x155 )

/*
** bytecode instruction structures
**
** All structures should assure proper alignment of fields, and
   be a multiple of 4 bytes
*/

struct  send_message      /*0x'100'*/
{
        bcode    bytecode;
        unsigned short  linenum;        /*refers back to ST source code that
                                  generated this bytecode*/
        long     hashed_selector;/*entry into class's selector dictionary*/
        oop      likely_class;    /*class of last receiver of this bytecode.
                                   We set this to the negative of the class
                                   when the message is to a class object,
                                   instead of to an instance.  */

        oop      likely_meth_or_islot; /*if class of rcvr = likely_class,
                                  use this for method id.  If
                                  likely_prim_or_bcode is a bcode, then
                                  the message send can be replaced
                                  by an assign bytecode, and this will contain
                                  the slot number of the instance variable
                                  (in the receiver) to be returned as the
                                  answer to the message send.*/
        oop      super_flag;  /*0 means start in class of
                                receiver; non-0 will be an oop,
                                whose superclass is the starting
                                point for selector search*/
        short    likely_prim_or_bcode;    /*-1 means that this has not
                                   been calculated, or is N.A.
                                   If the message send can be
                                   replaced with a primitive call,
                                   or with a single bcode, this
                                   field will contain the
                                   information*/
        unsigned short  num_args;       /*this includes 'self', which is
                                  always the first 'parm' to the
                                  send-msg or primitive*/

        unsigned short  arg_start_slot;/*temp slot where args start.  'Self'
                                  (i.e. the receiver) is always in this
                                  spot, followed by the other parms*/
        unsigned short  put_answ_slot; /*where to put obj returned by this msg.*/
};

/*It is important that the execute prim bcode structure match the
  send_message bcode structure, starting at likely_prim_or_bcode field,
  so that the optimization that sets a pointer to this field in the
  send_message_bcode will allow this pointer to be interpreted as pointing
  to an execute_primitive bcode*/

struct  execute_primitive   /*bytecode is primitive number*/
{
        bcode   bytecode;
        unsigned short  num_args;
        unsigned short  arg_start_slot;
        unsigned short  put_answ_slot;  /*temp in which to place
                                          obj returned by primitive*/
};


struct  send_param_message      /*0x'10B'*/
{
        bcode    bytecode;
        unsigned short  linenum;        /*refers back to ST source code that
                                  generated this bytecode*/
        oop      super_flag;  /*0 means start in class of
                                receiver; non-0 will be an oop,
                                whose superclass is the starting
                                point for selector search*/
        unsigned short  selector_slot;  /*temp slot of selector oop*/
        unsigned short  num_args;       /*this includes 'self', which is
                                  always the first 'parm' to the
                                  send-msg or primitive*/
        unsigned short  arg_start_slot;/*temp slot where args start.  'Self'
                                  (i.e. the receiver) is always in this
                                  spot, followed by the other parms*/
        unsigned short  put_answ_slot; /*where to put obj returned by this msg.*/
        oop      likely_class;   /*class of last receiver of this bytecode.
                                   We set this to the negative of the class
                                   when the message is to a class object,
                                   instead of to an instance.  */
        oop      likely_method;         /* method object cache */
        oop      likely_selector;       /* selector cache */
};

struct  returnx     /*0x'101' ,0x'104'*/
{
        bcode    bytecode;
        unsigned short  msg_ret_slot;  /*temp slot that holds obj to return*/
};

struct  branch    /*0x'105'*/
{
        bcode    bytecode;
        short    offset;     /*increment to add to instruction counter*/
};

struct  conditional_branch      /* 0x'107': branch on equal */
```

```
                                /* 0x'108': branch on not equal */
{
        bcode   bytecode;
        unsigned short   slot;  /*temp slot of current context that holds
                                    obj to compare to constant*/
        oop     actual;         /*constant to compare contents of slot
                                   against*/
        short   offset;         /*increment to add to instr cntr
                                        if equal/not equal */
        short   padding;
};

struct  set_up_block_context    /*0x'106'*/
{
        bcode   bytecode;
        short   bytecode_offset;   /*start of block bytecodes relative
                                         to start of method bytecodes*/
        unsigned short  blk_cntx_as_slot;  /*temp slot to hold context id*/
        unsigned short  num_temps;          /*that the block context needs*/
};

struct  evaluate_block      /*0x'109' evaluate a block */
{
        bcode   bytecode;
        unsigned short  num_args;
        unsigned short  arg_start_slot;  /*temp slot holding first arg:
                                   we always put block id in the
                                   first arg slot, so this is always >= 1*/
        unsigned short  put_answ_slot;   /*where to put block's returned obj*/
};
** convenient casts ...
*/

#define SM(ptr)         ( (struct send_message *) (ptr) )
#define SPM(ptr)        ( (struct send_param_message *) (ptr) )
#define RET(ptr)        ( (struct returnx *) (ptr) )
#define EP(ptr)         ( (struct execute_primitive *) (ptr) )
#define BR(ptr)         ( (struct branch *) (ptr) )
#define CBR(ptr)        ( (struct conditional_branch *) (ptr) )
#define SUBC(ptr)       ( (struct set_up_block_context *) (ptr) )
#define EB(ptr)         ( (struct evaluate_block *) (ptr) )

/*
** and sizes ...
*/

#define SM_SIZE         sizeof(struct send_message)
#define SPM_SIZE        sizeof(struct send_param_message)
#define RET_SIZE        sizeof(struct returnx)
#define EP_SIZE         sizeof(struct execute_primitive)
#define BR_SIZE         sizeof(struct branch)
#define CBR_SIZE        sizeof(struct conditional_branch)
#define SUBC_SIZE       sizeof(struct set_up_block_context)
#define EB_SIZE         sizeof(struct evaluate_block)
/*
 * Copyright 1988 Eastman Kodak Company.  All rights reserved.
 */
 * c-language interfaces to some classes.  some are macros.  the cif source
 * directory contains those interfaces and support routines which are
 * implemented as subroutines.
 */

/*
 * OrderedCollection
 */

#define
```

```
/*Copyright 1988 Eastman Kodak Company.  All rights reserved.*/

/*constants:  misc constants/formats/macros used across st subsystems*/
#define MAX_BLOCKS              150     /*max blocks in a class*/
#define MAX_NESTED_BLOCKS       10      /*max nested blocks */
#define MAX_SEL_SIZE            100
#define MAX_TEXT_SIZE           40
#define MAX_OBJ_SIZE            130000  /*maximum size in bytes of any object
                                          This MUST be a multiple of 4.*/
#define MAX_SYMBOL_LENGTH       100     /*maximum size of any symbol, must be*/
                                        /*even for alignment purposes on
                                          68010 */
#define MAX_STRING_LEN          500     /*maximum length of a string*/
#define MAX_PROC                3       /*maximum processes as a power of 2*/
#define MAX_PROCESSES           (1 << MAX_PROC)
                                        /*set low for testing 9/3/86*/
#define MAX_REGIONS             30      /* Max number of db regions which
                                           can be open at any time FOR EACH
                                           PROCESS.  Used by interpreter within
                                           the Processes data. */
#define PRIORITY_LEVELS         8       /* process priority levels */
#define SEMAPHORE_BUFFER_SIZE   512     /* maximum number of outstanding
                                           asynchronous signals to semaphores
                                           allowed at any time */
#define PERFORM_PRIM_NUM        30      /* number of primitive which
                                        handles 'perform:with:' msgs.*/

#define OBJLIB                  "/usr/users/st/common"

#define LEN_ERR_MSG             80      /*length of the error msg, including
                                          the null terminator*/

/*object types and locations*/
# define COMPILER       0       /*compiler only object*/
# define BLOCK          1
# define INSTANCE       2
# define SYMBOL         3
# define METHOD_TEMP    4
# define METHOD_PARM    5
# define BLOCK_PARM     6
# define ARRAY          7
# define INTEGER        8
# define FLOAT          9
# define STRING         10
# define CHAR           11
# define TEMP           12
# define SUPR           13      /*super*/
# define CLASS_VAR      14
# define COMP_TEMP      15
# define BYTEARRAY      16
# define SUPER_CLASS_VAR        17
# define CLASS_MSG      (unsigned short) 18 /*CLASS_MSG < INST_MSG is a MUST !!*/
# define INST_MSG       (unsigned short)        19

typedef struct                  /*inst of an object */
{
        struct  fp                      /*sizof(fp) MUST be a
                                          multiple of 4*/
        {
                unsigned int    length;         /*length of object*/
                char    rec_type;       /*0 for this kind of obj*/
                char    mark;           /*used in mark/sweep garbage
                                          collection*/
                unsigned short  flags;          /*used by object manager*/
                long    ovfl_chain;     /*NULL means end of chain*/
                unsigned int size_ovfl_rec;     /*size of rec pointed to by
                                                  ovfl_chain; needed in
                                                  dbm routines*/
                short   no_named_vars;  /*number of named variables
                                          in object */
                short   no_indx_vars;   /*number of indexed
                                          variables in object */
                oop     class;          /*class of this object*/
                oop     id;             /*oop of the object*/
                oop     class_chain;    /*oop of the next object, in
                                          the same class.
                                          This implements
                                          the set of all instances of
                                          a given class.*/
        }
                fp;             /*fixed part of the object
                                  structure*/

        oop     value[1];       /*first instance variable in object.
                                  there will be a varying number of
                                  these depending on the values of
                                  no_named_vars and no_indx_vars*/
}
        object;

typedef struct                  /*control data for class objects*/
{
        struct  cfp             /*sizeof(cfp) MUST be a multiple of
                                  4*/
        {
                short   no_nmed_inst;
                                /*no. of named variables in each
                                  instance*/
                short   no_dict;
                                /*number of dictionary entries for
                                  methods and blocks*/
                oop     super_class;
                oop     symbol_oop;     /*oop of name of class*/
                oop     first_inst;
                                /*oop of first instance of this
                                  class.  This is the head of
                                  the class chain, that implements
                                  the set of all instances of this
                                  class.  For some (heavily used) classes, this
                                  chain is not implemented, for
                                  efficiencies sake.  This is
                                  controlled by FIRST_CLASS_CHAINED*/
        }
                cfp;            /*fixed part of the class control
                                  structure*/
        struct  dictionary
        {
                unsigned short  msg_type;/*acceptable messages: CLASS_MSG or INST_MSG*/
                short   padding;
                oop     opers;  /*this is the oop for the symbol
                                  that is the selector name for
                                  the method*/
                oop     method oop;
                                /*there will be a varying number
                                  of oop id's corr. to the string
                                  opers in the previous array.
```

```
                                -1 means this slot is unused.*/
        }
                dictionary[2]; /*every dictionary should have
                                a power of 2 entries */
}
        class_cntrl;

typedef struct                  /*inst of a class object */
{
        object  obj;

                                /*the format of the class object
                                  should agree with that of the
                                  instance object format to this
                                  point*/
        class_cntrl class_cntl;
}
        class_object;

typedef struct                          /*symbol xref record*/
{
        struct                  /*MUST agree with object.fp through
                                        size_ovfl_rec*/
        {
            unsigned int    length;         /*length of rec*/
            char    rec_type;       /*1 for this kind of obj*/
            char    mark;           /*used in mark/sweep garbage
                                            collection*/
            unsigned short  flags;          /*used by object manager*/
            long    ovfl_chain;     /*NULL means end of chain*/
            unsigned int size_ovfl_rec;     /*size of rec pointed to by
                                        ovfl_chain: needed in
                                        dbm routines*/
            oop     symbol_oop;     /*oop of the symbol object*/
        }
            fp;

        char    symbol[MAX_SYMBOL_LENGTH];  /*value of the symbol
                                        itself.  Only the actual length
                                        is held in the record, and it is
                                        NULL terminated*/
}
        symbol_xref;

typedef struct                          /*dictionary xref record*/
{
        struct                  /*MUST agree with object.fp through
                                        size_ovfl_rec*/
        {
            unsigned int length;            /*length of rec*/
            char    rec_type;       /*2 for this kind of obj*/
            char    mark;           /*used in mark/sweep garbage
                                            collection*/
            unsigned short  flags;          /*used by object manager*/
            long    ovfl_chain;     /*NULL means end of chain*/
            unsigned int size_ovfl_rec;     /*size of rec pointed to by
                                        ovfl_chain: needed in
                                        dbm routines*/
            oop     object_oop;     /*oop of the object this
                                    dictionary  entry points to. */
            oop     symbol_oop;     /*oop of the symbol object, whose
                                        value is same as dictionary entry*/
        }
                fp;

        char    symbol[MAX_SYMBOL_LENGTH];  /*value of the symbol
                                        itself.  Only the actual length
                                        is held in the record, and it is
                                        NULL terminated*/
}
        dict_xref;

/*misc constants used by various functions as call parameters, flags, ...*/

#define GARBAGE         (unsigned short)1       /*object flag indicating the object
                                        is garbage and should not be
                                        written to the db*/
#define NO_INDEX_VARS   (unsigned short)4       /*object is not of regular format in
                                        that index variable portion does
                                        not hold index variables.  See
                                        macro SET_NO_INDEX_VARS macro
                                        to set this flag. Normally the
                                        object manager will set when a
                                        new object is set up.  People
                                        who use FORCE must set it
                                        themselves explicitly*/
#define PERM_OBJ        (unsigned short)2       /*object flag indicating
                                        non-deletion*/
#define UPDATED         (unsigned short)8       /*object flag indicating
                                        object was updated this time*/

#define COMPILE_TYPE    (int)0          /*parm to indicate a compile type
                                          of object*/
#define OBJECT_TYPE     (int)1          /*parm to indicate a regular type
                                          of object*/
#define FETCH           (int)0          /*parm to indicate operation of
                                          fetch an object*/
#define STORE           (int)1          /*parm to indicate operation of
                                          storing a (new) object*/
#define DELETE          (int)2          /*parm to indicate deletion of
                                          an object*/
#define NEW             (int)3          /*parm to indicate operation of
                                          setting up a new object*/
#define FORCE           (int)4          /*parm to indicate operation of
                                          setting up a new object,
                                          or changing the length of
                                          and existing object, without
                                          any controls.*/
#define FETCH_FROM_DB   (int)5          /*go directly to db: object table
                                          has already been checked, and
                                          object is not in buffers*/

#define COMMIT          (int)6          /*parm to indicate operation of
                                          updating db for commit*/
#define ABORT           (int)7          /*parm to indicate discard of all
                                          updates to db */
#define CLASS_START     (long)0         /*parm to indicate start at class of
                                          object, in super class chain */

#define OBJ_REC         (char)'0'       /*rec_type for regular objects*/
#define SYMBOL_XREF     (char)'1'       /*rec_type for symbol xref rec*/
#define DICT_XREF       (char)'2'       /*rec_type for dictioary xref rec*/
#define CTL_REC         (char)'a'       /*rec_type for db control record*/
#define CKPT_REC        (char)'b'       /*rec_type for db ckpt record*/
#define DELETED_REC     (char)'x'       /*rec_type for record that has
                                          been logically deleted.  May
                                          still be involved in overflow
```

```c
                                        chain, which keeps it from being
                                        physically deleted*/
#define MARKED          (char)1         /*in obj.fp.mark means object was
                                        marked during mark phase of
                                        mark/sweep*/
#define UNMARKED        (char)0         /*means object is not marked*/
#define RMARK           (char)2         /*means object is temporarily
                                        reachable*/
#define GMARK           (char)3         /*means object is reachable from a
                                        non-garbage object*/

/*selectors for optimizing integer operations*/
#define EQ      1       /*=*/
#define SUBTR   2       /*-*/
#define ADD     3       /*+*/
#define LE      4       /*<=*/
#define GE      5       /*>=*/
#define GT      6       /*>*/
#define LT      7       /*<*/
#define NE      8       /*~=*/
#define TIMES   9       /* * */

/*
** macros for finding the next specified (base) power of two boundary above
** a value (x), (a "ceiling" function, of sorts).  particularly handy for
** aligning addresses.
**
** note that CEIL(x, base) will only work for values of base which are a
** power of two, (i.e., 1, 2, 4, 8, 16, 32, etc.).
*/

#define CEIL(x, base)   ( ( (int) (x) + ( (base) - 1 ) ) & ~( (base) - 1 ) )
#define CEIL2(x)                ( ( (int) (x) + 1 ) & -1 )
#define CEIL4(x)                ( ( (int) (x) + 3 ) & -3 )

/*
** some other handy-dandy macros ...
*/

#define ENDSTR(str)             ( (char *) (str) + ( strlen(str) + 1 ) )

#define MIN(x, y)       ( ( (x) < (y) ) ? (x) : (y) )
#define MAX(x, y)       ( ( (x) > (y) ) ? (x) : (y) )

#define SIGN(n) (((n) == 0  ? (0) : (((n) < 0) ? (-1) : (1)))
#define ABS(n)  (((n) < 0) ? (-(n)) : (n))

#define AS_UPPERCASE(x) ( ( islower(x) ) ? toupper(x) : (x) )
#define AS_LOWERCASE(x) ( ( isupper(x) ) ? tolower(x) : (x) )

#define INTEGER_VALUE(obj)              ( ( (obj) == zERO ) ? 0 : -(obj) )
#define INTEGER_OBJECT(num)             ( ( (num) <= 0 ) ? zERO : -(num) )
#define INCREMENT_INTEGER_OBJECT(obj, i)        ( INTEGER_OBJECT(INTEGER_VALUE(obj) + (i)
#define DECREMENT_INTEGER_OBJECT(obj, i)        ( INTEGER_OBJECT(INTEGER_VALUE(obj) - (i)

#define INSTANCE_VARS(obj)      ( (oop *) &((obj)->value[0]) )
#define INDEXED_VARS(obj)       ( (oop *) &((obj)->value[(obj)->fp.no_named_vars]) )

extern unsigned short WordArraySizeIndex;
extern unsigned short ByteArraySizeIndex;

#define ARRAY_SIZE(obj)         ( (obj)->fp.no_indx_vars )
#define ARRAY_DATA(obj)         ( INDEXED_VARS(obj) )

#define WORDARRAY_SIZE(obj)     ( INTEGER_VALUE(INSTANCE_VARS(obj)[WordArraySizeIndex]) )
#define WORDARRAY_DATA(obj)     ( (unsigned short *) INDEXED_VARS(obj) )
#define BYTEARRAY_SIZE(obj)     ( INTEGER_VALUE(INSTANCE_VARS(obj)[ByteArraySizeIndex]) )
#define BYTEARRAY_DATA(obj)     ( (unsigned char *) INDEXED_VARS(obj) )

#define UPDATE(obj)             (obj)->fp.flags |= UPDATED;

/*
** detemine #of slots necessary to hold #bytes ...
** used to allocate space for ByteArrays, Strings, CompiledMethods ...
** (slots are longs and sizeof(long) = 4 bytes)
** the idea is to divide by four, and round up to the nearest int
*/

#define SLOTS_FOR_BYTES(bytes)  ( ( (bytes) + 3 ) >> 2 )
#define SLOTS_FOR_WORDS(words)  ( ( (words) + 1 ) >> 1 )

/*
** the current active process for the interpreter/primitive routines
** which implement processes and semaphores must take into account
** whether a new process is waiting or not, (see resume() for a
** case where this is necessary), hence, the following macro.
*/

#define CURRENT_ACTIVE_PROCESS() \
        ( ( NewProcessWaiting ) ? NewProcess :  \
        ( ( Cur_process->proc_id < 0 ) ? nIL : Cur_process->proc_oop ) )

#define OBJECT_SIZE(optr) \
        ( sizeof((optr)->fp) + ( sizeof((optr)->value[0])       \
        * ( (optr)->fp.no_named_vars + (optr)->fp.no_indx_vars ) ) )

#define CLASS_CONTROL(optr) \
        ( (class_cntrl *) ( (char *) (optr) + OBJECT_SIZE(optr) ) )
```

```
/*Copyright 1988 Eastman Kodak Company.  All rights reserved.*/
/*dbm.h:  constants used in the database mgr*/

#define OBJKEYSPACE      16383   /*max no. objects: must be 2**n-1*/
#define SYMBOLSPACE      4095    /*max no. symbols: must be 2**n-1*/
#define DBKEY            "./db.key"
#define DBPRIME          "./db.prime"
#define FIRST_OOP        600
#define MAX_OLD_OOPS     200

typedef struct
        {
        unsigned int    length;         /*length of rec*/
        char    rec_type;       /*'a' for this kind of obj*/
        char    mark;           /*used in mark/sweep garbage
                                        collection*/
        unsigned short  flags;          /*used by object manager*/
        long    ovfl_chain;     /*NULL means end of chain*/
        unsigned int    size_ovfl_rec;  /*size of rec pointed to by
                                        ovfl_chain: needed in
                                        dbm routines*/
        long    next_avail_oop;
        long    next_prime_addr;
        int     no_objects;
        int     no_symbols;
        int     last_ckpt;
        int     extra[25];
        } dbmctl;

typedef struct     /*integrity check record*/
        {
        unsigned int    length;         /*length of rec*/
        char    rec_type;       /*'b' for this kind of obj*/
        char    mark;           /*used in mark/sweep garbage
                                        collection*/
        unsigned short  flags;          /*used by object manager*/
        long    ovfl_chain;     /*NULL means end of chain*/
        unsigned int    size_ovfl_rec;  /*size of rec pointed to by
                                        ovfl_chain: needed in
                                        dbm routines*/
        long    last_ckpt;
        } dbmckpt;
typedef struct
        {
        object *obj_ptr;
        long    disk_addr;
        } dbmret;

typedef struct
        {
        long    prime_addr;
        unsigned int    size_rec;  /*size of prime record*/
        char    rec_type;
        char    extra;
        short   padding;
        } key;    /*format of record in keyspace*/

typedef struct
        {
        long    old_oops[MAX_OLD_OOPS];  /*object ids to re-use*/
        int     give;                    /*next spot to place reusable oop*/
        int     take;                    /*next spot from which to take
                                           an oop*/
        } reusable_oops;

#define OBJHASH(input)  ((input)&(long)OBJKEYSPACE)
#define SYMHASH(input)  (hash_string(input)&(long)(SYMBOLSPACE))
```

```c
/*Copyright 1988 Eastman Kodak Company.  All rights reserved.*/
#define D_PROMPT_SYMBOL          "raid> "

/* for MARK and BACKUP commands */

#define D_MAX_MARKS              8
#define D_MAX_MARK_LABEL_SIZE    8


/* for STOP_IN command */

#define D_MAX_STOPS              8


/* for msg stats routines */

#define D_STAT_TAB_SIZE          1000    /* size of message stat table */
#define D_STAT_TAB_FULL          (D_stat_tab.num_entries >= D_STAT_TAB_SIZE)
#define D_STAT_TAB_INIT          D_stat_tab.num_entries = 0; D_stat_tab.tot_msgs = 0;


/* used by object stats */

#define OBJ_GRAIN                800
#define METH_GRAIN               800
#define OBJ_SCALE                8
#define METH_SCALE               8


/* display switches - bits that can be set or unset in D_display_switches */

#define D_BCODES                 1
#define D_BLOCKS                 2
#define D_CONTEXTS               4
#define D_MESSAGES               8
#define D_PROCESSES              16
#define D_RECEIVERS              32

#define D_DSET(a_switch)         (D_display_switches |= a_switch)
#define D_DRESET(a_switch)       (D_display_switches &= ~a_switch)
#define D_ISDSET(a_switch)       (D_display_switches & a_switch)


/* control switches - bits that can be set or unset in D_control_switches */

#define D_BCODE_STEP             1
#define D_RETURN                 2
#define D_NEXT_MSG               4
#define D_QUIT                   8
#define D_RERUN                  16
#define D_RUN                    32
#define D_STATEMENT_STEP         64
#define D_STOP_IN                128
#define D_RESTART                256
#define D_NOT_STARTED            512
#define D_DONE                   1024
#define D_SYSERR                 2048
#define D_INITIALIZED            4096
#define D_STAT                   8192
#define D_OSTAT                  16384
#define D_MSG_REPLACED           32768
#define D_RET_FROM_REPLACED_MSG  65536
#define D_MSG_STEP               131272

#define D_CSET(a_switch)         (D_control_switches |= a_switch)
#define D_CRESET(a_switch)       (D_control_switches &= ~a_switch)
#define D_ISCSET(a_switch)       (D_control_switches & a_switch)

/* Used by HELP command */

#define D_HELP_PRINT_CMD                 "more /users/ktalk/src/raid/cat/"

/* help files */

#define D_HELP_BASIC                     "BASIC"
#define D_HELP_BCODE_STEP                "bcode_step"
#define D_HELP_RETURN                    "return"
#define D_HELP_CONTINUE                  "continue"
#define D_HELP_DELETE                    "delete"
#define D_HELP_GOTO                      "goto"
#define D_HELP_HELP                      "help"
#define D_HELP_MSG_STEP                  "msg_step"
#define D_HELP_NEXT_MSG                  "next_msg"
#define D_HELP_OSTAT_OFF                 "ostat_off"
#define D_HELP_OSTAT_ON                  "ostat_on"
#define D_HELP_OSTAT_PRINT               "ostat_print"
#define D_HELP_OSTAT_RESET               "ostat_reset"
#define D_HELP_PRINT_ACTIVE_CNTX         "print_active_cntx"
#define D_HELP_PRINT_ALL                 "print_all"
#define D_HELP_PRINT_BCODE               "print_bcode"
#define D_HELP_PRINT_BLOCK_STUB          "print_block_stub"
#define D_HELP_PRINT_CNTX_OF_STUB        "print_cntx_of_stub"
#define D_HELP_PRINT_GLOBAL              "global"
#define D_HELP_PRINT_MESSAGE             "print_message"
#define D_HELP_PRINT_OOP                 "print_oop"
#define D_HELP_PRINT_PROCESS             "print_process"
#define D_HELP_PRINT_RECEIVER            "print_receiver"
#define D_HELP_PRINT_TEMP                "print_temp"
#define D_HELP_QUIT                      "quit"
#define D_HELP_RERUN                     "rerun"
#define D_HELP_RESTART                   "restart"
#define D_HELP_RUN                       "run"
#define D_HELP_SET                       "set"
#define D_HELP_SHORT                     "SHORT"
#define D_HELP_SHORT_HELP                "short_help"
#define D_HELP_SKIP_MSG                  "skip_msg"
#define D_HELP_STAT_OFF                  "stat_off"
#define D_HELP_STAT_ON                   "stat_on"
#define D_HELP_STAT_PRINT                "stat_print"
#define D_HELP_STAT_RESET                "stat_reset"
#define D_HELP_STAT_STATUS               "stat_status"
#define D_HELP_STATUS                    "status"
#define D_HELP_STOP_AT                   "stop_at"
#define D_HELP_STOP_IN                   "stop_in"
#define D_HELP_UNSET                     "set"
#define D_HELP_WHERE                     "where"
```

/*Copyright 1988 Eastman Kodak Company. All rights reserved.*/

```
extern  long                    D_display_switches;     /* bit vector; bits set
                                                        indicate what debugger
                                                        traces are on */

extern  long                    D_control_switches;     /* bit vector; bits set
                                                        indicate what commands
                                                        are in progress, or
                                                        other state info needed
                                                        by RAID */

extern  short                   D_reprompt_flag;        /* indicates whether or
                                                        not RAID should
                                                        re-prompt */

extern  short                   D_syntax_error;         /* non-zero when a RAID
                                                        syntax error has been
                                                        encountered by lexer */

extern  short                   D_in_debugger;          /* indicates whether
                                                        RAID should return
                                                        control to interpreter,
                                                        or process another
                                                        command */

extern  d_stop_in_struct        D_stop_in_data;         /* array of method
                                                        stops */

/*
** extern d_mark_struct         D_mark_data;               array of marks -
**                                                      NOT IMPLEMENTED YET
*/

extern  d_stat_tab_struct       D_stat_tab;             /* msg stats table */

extern  d_stat_stack_struct     D_stat_stack[MAX_PROCESSES];
                                                        /* stack of currently
                                                        executing msgs - used
                                                        for msg stats */

extern  d_ostat_struct          D_ostats;               /* obj stats table */
extern  d_ostat_struct          D_obuffer_cnts;         /* obj stats table */

extern  bcode                   *D_cur_bcode;           /* currently executing
                                                        bytecode */

extern  cntx                    *D_cur_cntx;            /* current context */

extern  d_ret_from_struct       D_ret_from;             /* context from which
                                                        user wants to return */

extern  struct  init_vals       D_init_vals;            /* values for initial
                                                        message sends; needed
                                                        for 'restart' and
                                                        'rerun' commands */

/*
** extern d_stop_at_struct      D_stop_at_data;            array of bytecode
**                                                      stops -
**                                                      NOT IMPLEMENTED YET
*/
extern  bcode                   D_stop_at_bcode;        /* bytecode stop; only
                                                        one in effect at any
                                                        time */

extern  d_goto_skip_struct      D_goto_skip;            /* msg at which user
                                                        wants to stop as result
                                                        of 'skip_msg' or 'goto'
                                                        command */

extern  cntx                    *D_base_cntx;           /* context from which a
                                                        'next_msg' command was
                                                        given */

extern  short                   d_find_stop ( );        /* routine for finding
                                                        a method stop in
                                                        D_stop_in_data */
```

```
/*Copyright 1988 Eastman Kodak Company.  All rights reserved.*/
/****** Used with WHERE, PRINT MESSAGE ******/

typedef struct
        {
        oop             cntx_type;      /* method or block */
        char            *rcvr_class;    /* class of msg receiver */
        char            *meth_class;    /* class in which message
                                                resolved */
        char            *selector;      /* selector for message */
        short           linenum;        /* sending method's line no. */
        short           indent;         /* indentation */
        } d_msg_struct;


/****** Used with STOP_AT ******/

typedef struct
        {
        bcode           bytecode;       /* stop when we begin executing this
                                                bytecode */
        short           deleted_flag;   /* = 1 means deleted */
        } d_stop2_struct;

typedef struct
        {
        short           num_stops;
        d_stop2_struct  stops[D_MAX_STOPS];
        } d_stop_at_struct;             /* list of stops currently set */


/****** Used with STOP_IN ******/

typedef struct
        {
        char            *class_name;
        char            *selector_name;
        oop             method_oop;
        short           deleted_flag;   /* = 1 means deleted */
        } d_stop_struct;        /* stop when we begin executing this
                                        method */

typedef struct
        {
        short           num_stops;
        d_stop_struct   stops[D_MAX_STOPS];
        } d_stop_in_struct;     /* list of stops currently set */


/****** Used with MARK, BACKUP (not yet implemented) ******/

typedef struct
        {
        short                   num_marks;
        struct  d_mark_list
                {
                char    *mark_label[D_MAX_MARK_LABEL_SIZE];
                /* ?    save_data; */
                }               marks[D_MAX_MARKS];
        } d_mark_struct;        /* list of marks currently set */

/****** Used by SKIP and GOTO ******/

typedef struct
        {
        int             proc_id;
        long            msg_id;
        } d_goto_skip_struct;   /* process and message id at which we should
                                        stop as result of skip_msg or goto command */


/****** Used by CNTX_RETURN ******/

typedef struct
        {
        cntx            *cntx;
        int             proc_id;
        } d_ret_from_struct;    /* process and context from which user wants to
                                        return; stop when we return from it */


/****** used by STAT_ commands ******/

struct  msg_rec         /* holds info for one of currently executing msgs */
        {
        struct  msg_rec         *next;
                long            id;             /* my sequence number */
                oop             self_class;     /* my class */
                oop             self_selector;  /* my selector */
                oop             par_class;      /* my sender's class */
                oop             par_selector;   /* my sender's selector */
                long            start_time;     /* when msg starts executing */
                long            elap_time;      /* self + descendents time */
                long            time_stamp;     /* when msg last contd execn */
                long            cum_time;       /* self time */
        };


typedef struct
        {
        struct  msg_rec         *top_msg;       /* top msg on stack of
                                                        executing msgs */
                long            tot_msgs;       /* # msgs currently on stack */
        } d_stat_stack_struct;  /* stack of currently executing msgs */


struct  method_rec      /* holds running stats for one (method / parent method)
                                pair */
        {
                oop             self_class;     /* my class */
                oop             self_selector;  /* my selector */
                oop             par_class;      /* my sender's class */
                oop             par_selector;   /* my sender's selector */
                long            num_calls;      /* # times I've been called */
                long            cum_self_time;  /* my total time */
                long            cum_selfplus_time;/* total time of me plus my
                                                        descendants */
        };


typedef struct
        {
```

```
        struct  method_rec        stats[D_STAT_TAB_SIZE];
                int               num_entries;    /* # distinct methods */
                long              tot_msgs;       /* total # methods */
        } d_stat_tab_struct;      /* table of message stats */


/****** used by OSTAT_ commands ******/

typedef struct   /*this structure called 'D_ostats' as extern variable */
{
                        /*obj_mgr stats*/
        int     fetches;
        int     reserves;
        int     news;
        int     forces;
                        /*collector stats*/
        int     collector;
        int     clean_region;
                        /*trans mgr stats*/
        int     abort;
        int     commit;
                        /*access stats*/
        int     db_store;
        int     db_fetch;
        int     db_delete;
        int     store_ovfl;
        int     fetch_ovfl;
        int     meth_slots_reused;
                        /*fetch method stats*/
        int     sel_cache;      /*method found in selector cache*/
        int     fetch_meth1;    /*method found in first class chased*/
        int     fetch_meth2;    /*method found further in chain*/

                                /*high water marks of objects in use at
                                one time*/
        int     over_meths;
        int     large_meths;
        int     medium_meths;
        int     small_meths;
        int     over_objs;
        int     large_objs;
        int     medium_objs;
        int     small_objs;

        int     largest_over_obj;
        int     smallest_over_obj;
        int     avg_over_obj;
        int     largest_over_meth;
        int     smallest_over_meth;
        int     avg_over_meth;

        /*the following stats measure buffer usage by size of object*/

        int     obj_sizes[OBJ_GRAIN];
        int     meth_sizes[METH_GRAIN];
        int     qty_meths;
        int     qty_objs;
        }
        d_ostat_struct;
```

```
/*Copyright 1988 Eastman Kodak Company.  All rights reserved.*/
#define MAX_INCLUDES            50
#define MAX_SOURCES             100
#define MAX_INCLUDE_PATHS       10
#define MAX_PATH_LENGTH         200
#define LIBDIR                  "$(LIBDIR)/"
#define FALSE                   0
#define TRUE                    1

typedef struct x
{
        char    source_file[MAX_PATH_LENGTH];
        int     number_of_includes;
        char    include_file[MAX_INCLUDES][MAX_PATH_LENGTH];
} SOURCE_ENTRY;
```

```
/*Copyright 1988 Eastman Kodak Company.  All rights reserved.*/
#ifndef error_DEFINED
#define error_DEFINED
#endif

#define WARNING         (1 << 0)
#define FATAL           (1 << 1)
#define SYSTEM          (1 << 2)
#define LOG             (1 << 3)
#define FATALSYSTEM     (FATAL | SYSTEM)
#define WARNINGSYSTEM   (WARNING | SYSTEM)
#define MAXERRORLENGTH 80

#define KERROR(type,msg)        ehandler(type,msg,__FILE__,__LINE__)
```

```
/*Copyright 1988 Eastman Kodak Company.  All rights reserved.*/
#ifndef fontdef_DEFINED
#define fontdef_DEFINED

#define FONTNAME_SIZE    50
#define MAX_FONT_CHARS   256
#define PSHANDLE_SIZE    50

#include <pixrect/pixrect_hs.h>
#include "basic.h"
#include "units.h"
#include "point_conversion.h"
#include "hashtbl.h"

typedef struct
{
        SP_POS          width;          /* displacement to next character */
        SP_POS          home;           /* displacement to bitmap */
        Pixrect         *bitmap;
        char            *pshandle;
} FONT_CHAR;

typedef struct
{
        SCALED_POINT    shrink;
        SCALED_POINT    stretch;
        SCALED_POINT    width;
} FONT_GLUE;

typedef struct
{
        BYTE            char1;
        BYTE            char2;
        SP_POS          width;
} FONT_KERNING_PAIR;

typedef struct
{
        char            *common_fontname;
        char            *acorn_fontname;
        char            *ps_fontname;
        int             resolution;
        SCALED_POINT    pointsize;
        FONT_GLUE       glue;
        SCALED_POINT    font_height;
        SCALED_POINT    font_depth;
        FONT_CHAR       *font_char[MAX_FONT_CHARS];
        HASHTBL         *kerning_pairs;
} FONT_INFO;

#endif
```

```
/*Copyright 1988 Eastman Kodak Company.  All rights reserved.*/
/*get_element.h:  macro used in pool manager to get free element*/


/*GET_ELEMENT  we have 6 pools that can be treated alike, except for
  the size of each element, and the number of elements per pool.
  These macros allow us to not re-write the code 6 times*/


/*get_element returns a free element, based on the size and
  type of object*/

/*defined element STAT_INCR should be defined by pgms that use
get_element.h; definition depends on whether DEBUGGER flag is
set.  See pool_mgr.c*/

#define GET_ELEMENT(QTY,IND,PTR,OBJ)                                  \
                j = QTY + QTY; /*try the scan twice, the second        \
                                  time, ignoring usage count*/        \
                for (i = 0; i < j; i++)                               \
                        {                                             \
                        if (IND >= QTY)                               \
                                IND = 0;  /*wrap around*/             \
                                                                      \
                        PTR = &space.OBJ[IND]; /*cntrld object*/      \
                        o_ptr = (object *)(PTR->words); /*obj w/o     \
                                                cntl data*/           \
                        cntl_ptr = &(PTR -> cntl); /*cntl data*/      \
                        if (i > QTY)                                  \
                                cntl_ptr -> usage_cntr = 0;           \
                                                        /*give up     \
                                  on least heavily used algorithm*/   \
                        if (cntl_ptr -> usage_cntr != 0)              \
                                cntl_ptr -> usage_cntr--;             \
                                /*usage degrades upon every pass of   \
                                  pool manager*/                      \
                        if ((cntl_ptr -> usage_cntr == 0) &&          \
                                (cntl_ptr->first_in_use == NULL) &&   \
                                 cntl_ptr -> num_new_kids == 0)       \
                                {                                     \
                                IND++;                                \
                                /*at this point, we must free the     \
                                  previously used element in the object \
                                  table.  */                          \
                                STAT_INCR                             \
                                FREE(cntl_ptr -> obj_table_ptr)       \
                                cntl_ptr -> disk_addr = NULL;         \
                                cntl_ptr -> obj_table_ptr = NULL;     \
                                cntl_ptr -> temp_chain_reset = 0;     \
                                return((char *) PTR);                 \
                                /*note that the object is returned    \
                                  with its control data*/             \
                                }                                     \
                        IND ++;                                       \
                        }
```

```
/*Copyright 1988 Eastman Kodak Company.  All rights reserved.*/
#ifndef HASHTBL_H
#define HASHTBL_H

#include "basic.h"

#define MIN_HASHTBL_SIZE        (1000)

typedef struct hashtbl_link
{
        char                    *entry; /* to be casted appropriately */
        struct hashtbl_link     *next_link;
} HASHTBL_LINK;

typedef struct
{
        long            number_of_buckets;
        long            number_of_buckets_in_use;
        long            grow_threshold;
        long            shrink_threshold;
        long            length_of_longest_chain;
        long            number_of_entries;
        long            (*hashfunc) ();
        BOOL            (*entries_equal) ();
        HASHTBL_LINK    **table;
} HASHTBL;

#endif
```

```
/*Copyright 1988 Eastman Kodak Company.  All rights reserved.*/
#ifndef TRUE
#define TRUE    1               /* used with boolean typedef */
#endif

#ifndef FALSE
#define FALSE   0               /* used with boolean typedef */
#endif

#define MAX_CNTXS        500            /* size of array allocated for
                                               contexts for each process */

#define MAX_TEMPS        64             /* size of temp array in each context */

#define INIT_CNTX_ID     0x7fff0000     /* first oop available for use by
                                           interpreter as an id for contexts
                                           (used as a mask in some places) */

#define MAX_BLK_STUBS    100            /* size of array allocated for blocks
                                               which have been set up, but not
                                               yet executed. one array per
                                               process. */

#define MAX_PRIM         256            /* number of primitives.  this quantity
                                           must be a power of 2 and <= 2048 to
                                           avoid the running into the range of
                                           the bytecode values */

#define PROC_IN_USE      0x01           /* bit flag which indicates
                                        whether an element of the
                                        Processes array is in use or
                                        not */

#define CNTXS_ALLOCD     0x02           /* bit flag which indicates
                                        whether the context buffer has
                                        been allocated for an element
                                        of the Processes array */

#define INIT_PRIORITY    1              /* priority of the first
                                        process */
```

```
/*Copyright 1988 Eastman Kodak Company.  All rights reserved.*/

typedef              long            cntx_id;

typedef              unsigned short  regionId;

/*****************************************/

struct  cntx_struct
        {
        struct  fp                           obj_hdr;
        struct  cntx_struct                  *prev;
        struct  cntx_struct                  *next;
        struct  cntx_ctrl
                {
/***************/
                long                 msg_id;
                short                linenum;
                unsigned short       msg_type;
/***************/
                struct blk_stub_struct  *my_blk_stub;
                struct cntx_struct      *prev_active_cntx;
                bcode                   *next_bcode;
                struct blk_stub_struct  *first_block;
                unsigned short          answ_slot;
                regionId                region;
                object                  *code_ptr;
                oop                     rcvr_oop;
                object                  *rcvr_ptr;
                struct cntx_struct      *home_cntx;
                unsigned short          to_be_objd;
                oop                     temp_array[MAX_TEMPS];

                }                            ctrl_vars;
        };

typedef struct  cntx_struct          cntx;

/*****************************************/

struct  blk_stub_struct
        {
        struct  fp                                 fp;
        struct  stub_ctrl
                {
                oop                     id;
                oop                     oop;
                cntx                    *active_cntx;
                bcode                   *first_bcode;
                cntx                    *home_cntx;
                struct blk_stub_struct  *next;
                unsigned short          num_temps;
                unsigned short          bcode_offset;
                }                                  vp;
        };

typedef struct  blk_stub_struct      blk_stub;

/*****************************************/

struct  process
        {
        long            msg_id;         /* used by debugger */
        oop             proc_oop;
        blk_stub        *next_blk_stub;
        cntx            *cur_cntx;
        cntx            *latest_objd_cntx;
        regionId        region_cntr;
        unsigned short  flags;
        int             proc_id;
        long            obj_counter;
        cntx            *cntx_stack;
        blk_stub        *blk_stub_stack;
        };

struct  init_vals
        {
        oop             class_oop;
        oop             rcvr_id;
        oop             super_flag;
        oop             hashed_selector;
        oop             msg_args[5];
        unsigned short  num_args;
        char            msg_type;
        char            str_selector[MAX_SEL_SIZE];
        };
```

```
/*Copyright 1988 Eastman Kodak Company.  All rights reserved.*/
/*
** labels & branches
*/

#define MAX_LABELS          150
#define MAX_BRANCHES        300

struct label
{
        int label;
        char *offset;
};

struct labelref
{
        short *location;
        char *reladdr;
};
```

```
/*Copyright 1988 Eastman Kodak Company.  All rights reserved.*/
/*
**      str     -       string value
**      left    -       ?
**      right   -       ?
*/
#define N_IDENT (1)

/*
**      str     -       number string
**      left    -       ?
**      right   -       ?
*/
#define N_NUMBER (2)

/*
**      str     -       string value
**      left    -       ?
**      right   -       ?
*/
#define N_SYMBOL (3)

/*
**      str     -       string value
**      left    -       ?
**      right   -       ?
*/
#define N_XREF (4)

/*
**      str     -       char value
**      left    -       ?
**      right   -       ?
*/
#define N_CHAR (5)

/*
**      str     -       string value
**      left    -       ?
**      right   -       ?
*/
#define N_STRING (6)

/*
**      str     -       ?
**      left    -       array element
**      right   -       continuation of array
*/
#define N_ARRAY (7)

/*
**      str     -       label string (ex: "L25")
**      left    -       ?
**      right   -       ?
*/
#define N_LABEL (8)

/*
**      str     -       ?
**      left    -       ?
**      right   -       ?
*/
#define N_CMETH (9)

/*
**      str     -       ?
**      left    -       ?
**      right   -       ?
*/
#define N_IMETH (19)

/*
**      str     -       ?
**      left    -       ?
**      right   -       ?
*/
#define N_MATTR (11)

/*
**      str     -       ?
**      left    -       ?
**      right   -       ?
*/
#define N_MPRIM (12)

/*
**      str     -       block reference (ex: b2)
**      left    -       ?
**      right   -       ?
*/
#define N_BVAR (13)

/*
**      str     -       instance variable reference (ex: i2)
**      left    -       ?
**      right   -       ?
*/
#define N_IVAR (14)

/*
**      str     -       temporary variable reference (ex: t5)
**      left    -       ?
**      right   -       ?
*/
#define N_TVAR (15)

/*
**      str     -       method temporary reference (ex: mt3)
**      left    -       ?
**      right   -       ?
*/
#define N_MTVAR (16)


typedef struct pnode
{
        char *str;
        int type;
        struct pnode *left;
        struct pnode *right;
};
```

```
/*Copyright 1988 Eastman Kodak Company.  All rights reserved.*/
/*
 * assembly code statement types
 */

#define C_SEG           (1)
#define C_LABEL         (2)
#define C_SEND          (3)
#define C_SENDP         (4)
#define C_MRET          (5)
#define C_BRET          (6)
#define C_EVALB         (7)
#define C_EVALBO        (8)
#define C_SUBC          (9)
#define C_JMP           (10)
#define C_JEQ           (11)
#define C_JNE           (12)
#define C_MOV           (13)
#define C_PRIM          (14)
#define C_SEND_EQ       (15)
#define C_SEND_ADD      (16)
#define C_SEND_SUB      (17)
#define C_SEND_ADD1     (18)
#define C_SEND_SUB1     (19)

/*
 * assembly code statement structures
 */

struct seg
{
        short id;
        struct code *tail;
        struct code *nextmng;
};

struct label
{
        short label;
};

struct send
{
        struct ref rcvr;
        short super;
        struct ref dest;
        short args;
        char *selector;
};

struct sendp
{
        struct ref rcvr;
        short super;
        struct ref dest;
        short args;
        struct ref selector;
};

struct ret
{
        struct ref dest;
};

struct evalb
{
        struct ref rcvr;
        struct ref dest;
        short args;
};

struct subc
{
        short block;
        short label;
        short temps;
};

struct jmp
{
        short label;
};

struct jc
{
        short label;
        struct ref ref1;
        struct ref ref2;
};

struct mov
{
        struct ref dest;
        struct ref src;
};

struct prim
{
        struct ref dest;
        char *num;
        struct ref argstart;
        short args;
};


/*
 * the "code node" ... (sounds stuffed up, eh?!)
 */

struct code
{
        struct code *next;
        int type;
        int line;
        union
        {
                struct seg      seg;
                struct label    label;
                struct send     send;
                struct sendp    sendp;
                struct ret      ret;
                struct evalb    evalb;
                struct subc     subc;
                struct jmp      jmp;
                struct jc       jc;
                struct mov      mov;
                struct prim     prim;
```

| code;

l;

```
/*Copyright 1988 Eastman Kodak Company.  All rights reserved.*/
/*
** miscellaneous definitions for compiler
*/

/*
** method "flattening" tags
*/

#define REG_METH        0
#define INST_METH       1
#define PRIM_METH       2

/*
** temporary usage
*/

struct tusage
{
        int slot;
        int max;
};

struct tusage Tu;
int TuTempSlot;

#define clearTempUse()  ( Tu.max = Tu.slot = 0 );
#define setTempUse(tu)  ( Tu = (tu) )
#define getTempUse()    ( Tu )
#define maxTempUse()    ( Tu.max )
#define allocTemp(x) \
        ( TuTempSlot = Tu.slot,           \
          Tu.slot += (x),                 \
          Tu.max = MAX(Tu.max, Tu.slot),  \
          TuTempSlot )
#define freeTemp(x)     ( Tu.slot -= (x) )

/*
** label generation
*/

int Label;

#define clearLabels()   ( Label = 0 )
#define makeLabel()     ( Label++ )

/*
** symbol table mark
*/

struct mark
{
        int classVarCount;
        int instVarCount;
        int tempVarCount;
};

/*
** variable references
*/

struct ref
{
        int type;
        char *name;
        char *cname;
        struct pnode *node;
        int slot;
        int block;
};

struct ref TempRef;

#define makeref(t, n, cn, nd, s, b)     \
        ( TempRef.type  = (t),          \
          TempRef.name  = (n),          \
          TempRef.cname = (cn),         \
          TempRef.node  = (nd),         \
          TempRef.slot  = (s),          \
          TempRef.block = (b),          \
          TempRef )

/*
** compiler reference types
*/

/*
**      name  = ?
**      cname = ?
**      node  = ?
**      slot  = ?
**      block = ?
*/
#define R_NONE                  0

/*
**      name  = ?
**      cname = ?
**      node  = parse node describing constant
**      slot  = ?
**      block = ?
*/
#define R_CONSTANT              1

/*
**      name  = instance variable name
**      cname = class name
**      node  = ?
**      slot  = slot in object
**      block = ?
*/
#define R_INSTANCE_VAR          2

/*
**      name  = class variable name
**      cname = class name
**      node  = ?
**      slot  = slot in class object
**      block = ?
*/
#define R_CLASS_VAR             3

/*
**      name  = method parameter name
**      cname = ?
**      node  = ?
**      slot  = slot in method context
```

```
**      block = ?
*/
#define R_METHOD_PARAM          4

/*
**      name  = method temporary name
**      cname = ?
**      node  = ?
**      slot  = slot in method context
**      block = ?
*/
#define R_METHOD_TEMP           5

/*
**      name  = ?
**      cname = ?
**      node  = ?
**      slot  = slot in current context (method or block)
**      block = ?
*/
#define R_COMPILER_TEMP         6

/*
**      name  = ?
**      cname = ?
**      node  = ?
**      slot  = ?
**      block = block id
*/
#define R_BLOCK_CNTX            7

/*
**      name  = block parameter name
**      cname = ?
**      node  = ?
**      slot  = slot in block context
**      block = block id
*/
#define R_BLOCK_PARAM           8

/*
**      name  = symbol name
**      cname = ?
**      node  = ?
**      slot  = ?
**      block = ?
*/
#define R_XREF          9

/*
** useful parse node tests
*/

struct ref Tref;

extern struct ref findSymbol();
extern struct code *CodeSegment;

#define istempref(ref)  \
        (  ref.type == R_COMPILER_TEMP                                  \
        || ref.type == R_BLOCK_CNTX && CodeSegment->code.seg.id == -1   \
        || ref.type == R_METHOD_PARAM && CodeSegment->code.seg.id == -1 \
        || ref.type == R_METHOD_TEMP && CodeSegment->code.seg.id == -1  \
        || ref.type == R_BLOCK_PARAM && CodeSegment->code.seg.id == ref.block )

#define istemp(pn)      \
        ( ( (pn)->type == N_IDENT || (pn)->type == N_ASSIGN )   \
          && ( Tref = findSymbol((pn)->str), istempref(Tref) ) )

#define issuper(n)      \
        ( (n)->type == N_IDENT && !strcmp((n)->str, "super") )
```

```
/*Copyright 1988 Eastman Kodak Company.  All rights reserved.*/
/*
**      str     -       ?
**      left    -       parse tree to return
**      right   -       ?
*/
#define N_RETURN (1)

/*
**      str     -       ?
**      left    -       parse tree to perform
**      right   -       continuation of cascade or NULL
*/
#define N_CASCADE (2)

/*
**      str     -       variable assigned to
**      left    -       parse tree to evaluate
**      right   -       ?
*/
#define N_ASSIGN (3)

/*
**      str     -       unary operator
**      left    -       receiver
**      right   -       ?
*/
#define N_UNARY_EXPR (4)

/*
**      str     -       binary operator
**      left    -       receiver
**      right   -       argument
*/
#define N_BINARY_EXPR (5)

/*
**      str     -       ?
**      left    -       receiver
**      right   -       tree of keyword arguments
*/
#define N_KEYWORD_EXPR (6)

/*
**      str     -       keyword string (part)
**      left    -       parse tree
**      right   -       another keyword argument or NULL
*/
#define N_KEYWORD_ARGUMENT (7)

/*
**      str     -       ?
**      left    -       parse tree
**      right   -       next statement
*/
#define N_STATEMENT (8)

/*
**      str     -       ?
**      left    -       block stuff
**      right   -       block statements
*/
#define N_BLOCK (9)

/*
**      str     -       number string
**      left    -       ?
**      right   -       ?
*/
#define N_NUMBER (19)

/*
**      str     -       constant value (string)
**      left    -       ?
**      right   -       ?
*/
#define N_IDENT (20)

/*
**      str     -       constant value (string)
**      left    -       ?
**      right   -       ?
*/
#define N_SYMBOL (21)

/*
**      str     -       char value
**      left    -       ?
**      right   -       ?
*/
#define N_CHAR (22)

/*
**      str     -       string value
**      left    -       ?
**      right   -       ?
*/
#define N_STRING (23)

/*
**      str     -       temp name
**      left    -       ?
**      right   -       another temp var
*/
#define N_TEMPVAR (24)

/*
**      str     -       ?
**      left    -       array element
**      right   -       continuation of array
*/
#define N_ARRAY (25)

/*
**      str     -       primitive #
**      left    -       ?
**      right   -       arguments
*/
#define N_PRIMITIVE (26)

#define MAX_METHODS (512)
#define MAX_INST_VARS (64)
#define MAX_CLASS_VARS (64)
#define MAX_POOL_DICTS (64)
#define MAX_ARGS (64)
#define MAX_STATEMENTS (4096)
```

```
#define MAX_TEMPS (64)

struct pnode
{
        char *str;
        int type;
        int line;
        struct pnode *left;
        struct pnode *right;
};

struct pmethod
{
        char *selector;
        int meta;
        int opttype;
        int optdata;
        int temps;
        int blocks;
        struct pnode *firstStatement;
        struct pnode *msgPattern;
        struct pnode *tempVarList;
};

struct pclass
{
        char *name;
        char *superclass;
        struct pnode *instVarList;
        struct pnode *classVarList;
        int methodCount;
        struct pmethod *method[MAX_METHODS];
};
```

```
/*Copyright 1988 Eastman Kodak Company.  All rights reserved.*/
/*
** smalltalk key codes
*/

#define BS      8
#define HT      9
#define NL      10
#define CR      13
#define ESC     27
#define SP      32
#define DEL     127

#define LSHFT   136
#define RSHFT   137
#define CNTRL   138
#define ALOCK   139

/*
** pointing device buttons
*/

#define RIGHT   128
#define MID     129
#define LEFT    130

/*
** five paddle keyset (?!)
*/

#define K1      131
#define K2      132
#define K3      133
#define K4      134
#define K5      135

/*
** something out of range ...
*/

#define NOKEY   0
```

```c
/*Copyright 1988 Eastman Kodak Company.  All rights reserved.*/
/*
** widely used macros
*/

extern struct process *Cur_process;

/*
** shorthand
*/

#define CUR_CNTX_STACK          ( &(Cur_process->contexts) )
#define RECEIVER                ( cur_cntx->ctrl_vars.rcvr_ptr )

#define CUR_CNTX_MEM    ( Cur_process->cur_cntx )
#define BCP_MEM         ( CUR_CNTX_MEM->ctrl_vars.next_bcode )
#define RCVR_MEM        ( CUR_CNTX_MEM->ctrl_vars.rcvr_ptr )

/*
** macros for referencing current process and checkpoint ids ... usually
** used in calls to the object manager.
*/

#define CUR_PID         ( Cur_process->proc_id )
#define CUR_REGION      ( Cur_process->cur_cntx->ctrl_vars.region )
#define CUR_GC_REGION   ( cur_cntx->ctrl_vars.region )
#define OWN_GC_REGION   ( cur_cntx->ctrl_vars.home_cntx->ctrl_vars.region )

/*
** shorthand for accessing context information
*/

#define CONTEXT_TEMPS(cntx)     ( &((cntx)->ctrl_vars.temp_array[0]) )
#define METHOD_TEMPS(cntx)      ( &((cntx)->ctrl_vars.home_cntx->ctrl_vars.temp_array[0])

/*
** primitive argument access
*/

#define PRIMARG(i)      ( CONTEXT_TEMPS(CUR_CNTX_MEM)[EP(BCP_MEM)->arg_start_slot + (i)]

/*
** get receiver ... checks to see if the previously fetched receiver
** is the same object.
*/

#define GET_RCVR(i)     \
        ( ( RCVR_MEM && RCVR_MEM->fp.id == (i) )                \
        ? RCVR_MEM : reserve_obj((i), CUR_REGION, CUR_PID)      )

/*
** checking to see if an oop is a block stub id
*/

#define IS_STUB(an_oop)         ((an_oop) >= INIT_CNTX_ID)

/*
** finding a block stub
*/

#define FIND_BLK_STUB(target_stub_id,a_process) \
        ( &Processes[a_process->proc_id].blk_stub_stack \
          [(unsigned) (target_stub_id - INIT_CNTX_ID) >> MAX_PROC] )

/*
** object manager access which must tally newly created objects
** for proper garbage collection
*/

#define OBJ_REGION_CNT  100

#define OM_NEW(c, i)    \
        ( obj_mgr((c), NEW, (i), -1, CUR_REGION, CUR_PID) )

#define OM_FORCE(o,c,i) \
        ( force_obj((o), (c), (i), -1, CUR_REGION, CUR_PID) )
```

```
/*Copyright 1988 Eastman Kodak Company.  All rights reserved.*/
/*
 * math macros used in primitives
 *
 * two integer operation macros, ADD_INT and SUB_INT, assume
 * that they are given the negative of the actual integer parameter
 * values ... this is so we can manipulate our representation of
 * positive integers as quickly as possible in these particular cases,
 * (positive integers are represented as negative oops).
 */

#define OP_INT(i1, i2, op)       \
{                                \
        register int t1;                                        \
        t1 = i1 op i2;                                          \
        if ( t1 > 0 )                                           \
                return ( -t1 );                                 \
        if ( t1 == 0 )                                          \
                return ( zERO );                                \
        obj = OM_NEW(Integer,  1);                              \
        *((int *) INDEXED_VARS(obj)) = t1;                      \
        check_garbage(obj->fp.id);                              \
        return ( obj->fp.id );                                  \
}

#define ADD_INT(i1, i2)          \
{                                \
        register int t1;                                        \
        t1 = i1 + i2;                                           \
        if ( t1 < 0 )                                           \
                return ( t1 );                                  \
        if ( t1 == 0 )                                          \
                return ( zERO );                                \
        obj = OM_NEW(Integer,  1);                              \
        *((int *) INDEXED_VARS(obj)) = -t1;                     \
        check_garbage(obj->fp.id);                              \
        return ( obj->fp.id );                                  \
}

#define SUB_INT(i1, i2)          \
{                                \
        register int t1;                                        \
        t1 = i1 - i2;                                           \
        if ( t1 < 0 )                                           \
                return ( t1 );                                  \
        if ( t1 == 0 )                                          \
                return ( zERO );                                \
        obj = OM_NEW(Integer,  1);                              \
        *((int *) INDEXED_VARS(obj)) = -t1;                     \
        check_garbage(obj->fp.id);                              \
        return ( obj->fp.id );                                  \
}

#define DIV_INT_NEGINF(i1, i2)   \
{                                \
        register int t1;                                        \
        if ( i1 < 0 && i2 < 0 || i1 >= 0 && i2 >= 0 )          \
                t1 = i1 / i2;                                   \
        else                                                    \
                i1 = ABS(i1), i2 = ABS(i2),                     \
                t1 = -( ( i1 + i2 - 1 ) / i2 );                 \
        if ( t1 > 0 )                                           \
                return ( -t1 );                                 \
        if ( t1 == 0 )                                          \
                return ( zERO );                                \
        obj = OM_NEW(Integer,  1);                              \
        *((int *) INDEXED_VARS(obj)) = t1;                      \
        check_garbage(obj->fp.id);                              \
        return ( obj->fp.id );                                  \
}

#define GCD_INT(i1, i2)          \
{                                \
        register int t1;                                        \
        i1 = ABS(i1);                                           \
        i2 = ABS(i2);                                           \
        if ( i1 > i2 )                                          \
                t1 = i1, i1 = i2, i2 = t1;                      \
        while ( i2 != 0 )                                       \
                t1 = i1 % i2, i1 = i2, i2 = t1;                 \
        return ( -i1 );                                         \
}

#define OP_FLOAT(f1, f2, op)     \
{                                \
        f1 = f1 op f2;                                          \
        if ( f1 == 0 )                                          \
                return ( zERO );                                \
        obj = OM_NEW(Float,  sizeof(double)/sizeof(oop));       \
        *((double *) INDEXED_VARS(obj)) = f1;                   \
        check_garbage(obj->fp.id);                              \
        return ( obj->fp.id );                                  \
}

#define DIV_FLOAT_NEGINF(f1, f2)         \
{                                        \
        register int t1;                                        \
        if ( f1 < 0 && f2 < 0 || f1 >= 0 && f2 >= 0 )          \
                t1 = f1 / f2;                                   \
        else                                                    \
                f1 = ABS(f1), f2 = ABS(f2),                     \
                t1 = -( ( f1 + f2 - 1 ) / f2 );                 \
        if ( t1 > 0 )                                           \
                return ( -t1 );                                 \
        if ( t1 == 0 )                                          \
                return ( zERO );                                \
        obj = OM_NEW(Integer,  1);                              \
        *((int *) INDEXED_VARS(obj)) = t1;                      \
        check_garbage(obj->fp.id);                              \
        return ( obj->fp.id );                                  \
}

#define CMP(i1, i2, op) \
        if ( i1 op i2 )                                         \
                return (tRUE);                                  \
        else                                                    \
                return (fALSE);
```

```
/*Copyright 1988 Eastman Kodak Company.  All rights reserved.*/
/*obj_mgr.h:  constants, etc, used by obj_mgr*/

/*method types*/
#define REG_METH        (int) 0
#define INST_METH       (int) 1
#define PRIM_METH       (int) 2

#define MAX_HELD_OBJ    40:5     /*maximum held objects (in in_use table)*/
                                 /*this should be <= sum of all obj
                                   quantities in pool.h*/

#define FIRST_CLASS_CHAINED 7000L       /*classes with oops higher than
                                          this implement the chain of
                                          instances anchored in the
                                          class object*/
#define FIRST_OBJ_OOP   261L   /*first oop that can have instance variables*/
#define DIRTY_REGION    250      /*the maximum number of objects allowed
                                   to accumulate in a region before
                                   cleaning it*/

/**************************************************************
The following macro should be used prior to calling set_in_use
to see if the object is already in the in_use table:  it must
not be put in the table twice.  Set_in_use could check for this,
but this macro was written to avoid the call when it is not
necessary, saving some execution time
***************************************************************/

#define IN_USE(BUF,PID,ANSW)                                   \
for ((ANSW) = (BUF)->cntl.first_in_use;                        \
      (ANSW) != NULL && (ANSW)->pid != (PID);                  \
      (ANSW) = (ANSW)->obj_fwd_chain);

/*call this macro to set the objects NO_INDEX_VARS flag.  When the
object is a class, use Class as the class parameter.  Else, use the
objects true class.  The flag set means that the instance variables
are bogus, and do not hold object references at all (mainly, used to
hold internal representation of the object in this case).*/

#define SET_NO_INDEX_VARS(CLASS,FLAG)                          \
switch (CLASS)     /*some object's index variables are used    \
                     to hold values, not oops*/                \
        {                                                      \
        case Integer:            (FLAG) |= NO_INDEX_VARS;break; \
        case String:             (FLAG) |= NO_INDEX_VARS;break; \
        case True:               (FLAG) |= NO_INDEX_VARS;break; \
        case False:              (FLAG) |= NO_INDEX_VARS;break; \
        case ByteArray:          (FLAG) |= NO_INDEX_VARS;break; \
        case WordArray:          (FLAG) |= NO_INDEX_VARS;break; \
        case DisplayBitmap:      (FLAG) |= NO_INDEX_VARS;break; \
        case Float:              (FLAG) |= NO_INDEX_VARS;break; \
        case Character:          (FLAG) |= NO_INDEX_VARS;break; \
        case CompiledMethod:     (FLAG) |= NO_INDEX_VARS;break; \
        case Symbol:             (FLAG) |= NO_INDEX_VARS;break; \
        case UndefinedObject:    (FLAG) |= NO_INDEX_VARS;break; \
        }
```

```
/*Copyright 1988 Eastman Kodak Company.  All rights reserved.*/
/*object_rec.h:  format of a object records, and various
  control structures*/

#define O_TABLE_SIZE    9530    /*total size for primary and overflow of
                                  object table. See below*/
#define MAX_OBJECTS     (long)8191/*must be of the form (2**n)-1.   This is
                                both the number of objects held in the
                                primary table (directly hashed), and
                                the mask used to hash the oop to get
                                the table slot. It must be of type
                                long since we '&' it with an oop.*/

                              /*we should have MAX_OBJECTS/TABLE_SIZE
                                approx = .86 (or <.86 is ok too)*/

/***********************************************************************
note:  The O_TABLE_SIZE must be larger than the sum of all the object
       quantities in pool.h.

***********************************************************************/

typedef struct{          /*control data heading each object in the buffer
                              pool*/
        short   not_used;
        short   temp_chain_reset; /*keeps track whether or not the
                                   temp inst chain has been adjusted
                                   when an object is made permanent
                                   or garbage collected.  0 means
                                   the chain has yet to be adjusted,
                                   1 means it has been adjusted.*/
        unsigned short usage_cntr; /*counts no. of times accessed*/
        unsigned short num_new_kids; /*counts no. of new children
                                   set up while class is in memory.
                                   non-0 keeps the class object from
                                   being purged from the buffer, since
                                   this contains the head of the
                                   (new) instance chain.  For
                                   non-class objects, this is 0*/
        long    temp_inst_chain;   /*maintains the chain from class
                                 through the instances, including
                                 non-committed objects*/
        long  disk_addr;           /*disk address of object.  Used to
                                 cache same, for replacement of
                                 existing object.  NULL means object
                                 does not exist on disk (yet)*/
        struct in_use_table *first_in_use;      /*anchor for obj_chain in
                                    in_use_table*/
        struct obj_table  *obj_table_ptr;
                            /*points back to element in object_table
                                 that points to this object.  used for
                                 freeing the object table element when
                                 the object is freed*/
            } object_control;  /*control data for the object*/

typedef struct{
        object_control  cntl;
        object          obj;
            } cntrld_object;


struct obj_table {              /*the object table element definition*/
          long                  oop;
                 cntrld_object   *obj_ptr;  /*ptr to storage for the
                                          controlled object (control
                                          field preceed the object)*/
                 struct obj_table       *fwd_ovfl;  /*next ovfl element*/
                 struct obj_table       *bkwd_ovfl; /*prev ovfl element*/
                 };

struct in_use_table
        {
        cntrld_object           * buffer_ptr;
        struct in_use_table     * obj_fwd_chain;
        struct in_use_table     * obj_bkwd_chain;
        struct in_use_table     * pid_fwd_chain;
        struct in_use_table     * pid_bkwd_chain;
        struct in_use_table     * free_space_fwd;
        unsigned short                 region;  /*the region that the
                                object is currently assigned in*/

        short                   orig_region;   /*The region that the
                                        object was first placed in.
                                        When this region is collected,
                                        the object is no longer pinned
                                        by any pointer reference (in
                                        the interp or primitives,
                                        and we can consider releasing
                                        its memory.  -1 means we
                                        have collected its original
                                        region.*/

        short                   slot_id;
        unsigned char            pid;
        };

struct process_data
        {
        struct in_use_table     * pid_tail;
        int                     next_reg_to_clean;
        int                     gc_obj_count[MAX_REGIONS];
        int                     true_obj_count[MAX_REGIONS];
        };

/*macro to get the buffer control data, given an object ptr*/
#define BUF_CONTROL_PTR(OBJ_PTR)  ((object_control *)((char *)  (OBJ_PTR)  - \
                sizeof(object_control)))
```

```
/*Copyright 1988 Eastman Kodak Company.  All rights reserved.*/
/*oops_values.h:  constant values for some oops*/

/*following are oops of classes*/

#define  Object                   301L
#define  Magnitude                302L
#define  Integer                  303L
#define  String                   304L
#define  True                     305L
#define  False                    306L
#define  Boolean                  307L
#define  Number                   308L
#define  Interval                 309L
#define  Class                    310L
#define  Block                    311L
#define  ByteArray                312L
#define  Float                    313L
#define  Array                    314L
#define  Collection               315L
#define  Character                316L
#define  UndefinedObject          317L
#define  MethodContext            318L
#define  BlockContext             319L
#define  CompiledMethod           320L
#define  RTMethodContext          321L
#define  Symbol                   322L
#define  Point                    323L
#define  RTBlock                  324L
#define  KeyedCollection          325L
#define  SequenceableCollection   326L
#define  ArrayedCollection        327L
#define  Bag                      328L
#define  Set                      329L
#define  Dictionary               330L
#define  ClassDescription         332L
#define  LinkedList               333L
#define  Process                  334L
#define  ProcessorScheduler       335L
#define  Link                     336L
#define  Semaphore                337L
#define  ErrorArray               338L     /*superclass Array*/
#define  WordArray                339L
#define  DisplayBitmap            340L

/*following are oops of instances*/

#define  nIL            256L
#define  tRUE           257L
#define  fALSE          258L
#define  fAIL           259L    /* used to signal optimized msg send failures */
#define  zERO           260L /*integer 0*/
#define  eRROR          261L /*the array of error messages, 1 per
                                process.  Class is ErrorArray */
#define  pROCESSOR      262L    /* the single instance of ProcessScheduler */
#define  dISPLAY        263L    /* the single instance of DisplayScreen */
#define  sENSOR         264L    /* the single instance of InputSensor */

#define  START_CACHE    301L    /*start of oop to cache in obj mgr*/
#define  CACHE_SIZE     17      /*qty of objects to cache*/
                                /*oops for permanent objects must be
                                  contiguous between START_CACHE and
                                  START_CACHE+CACHE_SIZE-1.
                                  Furthermore, no class in the cache
                                  can have class variables which
                                  could be updated at run time*/
```

```
/*Copyright 1988 Eastman Kodak Company.  All rights reserved.*/
#define PTS_PER_INCH            72
#define PIXELS_TO_PTS(pixels,resolution) \
        ((double)((pixels) * PTS_PER_INCH) / (resolution))
#define PTS_TO_PIXELS(pts,resolution) \
        ((int)(((pts) * (resolution)) / PTS_PER_INCH))
```

```
/*Copyright 1988 Eastman Kodak Company.  All rights reserved.*/
/*pool.h:  constants and macros for the pool manager*/

/*note:  any pgm that includes pool.h should include object_rec.h
        first*/

/*all sizes in words (=4 bytes)*/
/*these values should be set based on the Smalltalk80 implementation
  book, and experimentation.  Small values will help in testing
  overflows*/
/*4/14/87: sizes based on object manager stats during a run of our
        document processor.
*/

#define SO_SIZE         11      /*size of small objects*/
#define MO_SIZE         21      /*size of medium size objects*/
#define LO_SIZE         517     /*size of large objects*/

#define SC_SIZE         25      /*size of small compiled objs*/
#define MC_SIZE         98      /*size of medium size compiled objs*/
#define LC_SIZE         570     /*size of large compiled objs*/

#define SO_QTY          4915    /*qty of small objects*/
#define MO_QTY          1110    /*qty of medium objects*/
#define LO_QTY          695     /*qty of large objects*/

#define SC_QTY          255     /*qty of small compiled objs*/
#define MC_QTY          380     /*qty of medium compiled objs*/
#define LC_QTY          207     /*qty of large compiled objs*/

#define HUGE_QTY        200     /*qty of huge elements of arbitrary size*/

/*******************************************************************
note:  the sum of all the quantities of objects must not exceed the
       constant O_TABLE_SIZE in buffer.h
*******************************************************************/

/*structures that contain an array whose size is one object :*/
/*control data, which is not part of the object, preceeds the
  object for easy access*/


typedef struct{
        object_control cntl;
        long words[SO_SIZE];
        } small_o;

typedef struct{
        object_control cntl;
        long words[MO_SIZE];
        } medium_o;

typedef struct{
        object_control cntl;
        long words[LO_SIZE];
        } large_o;

typedef struct{
        object_control cntl;
        long words[SC_SIZE];
        } small_c;

typedef struct{
        object_control cntl;
        long words[MC_SIZE];
        } medium_c;

typedef struct{
        object_control cntl;
        long words[LC_SIZE];
        } large_c;

/*the storage pool for all (reasonably sized) objects:*/

typedef struct{
        small_o small_obj[SO_QTY];
        medium_o medium_obj[MO_QTY];
        large_o large_obj[LO_QTY];
        small_c small_comp[SC_QTY];
        medium_c medium_comp[MC_QTY];
        large_c large_comp[LC_QTY];
        /*large_c huge_space[LC_QTY]; */ /*variable slotted space*/
        } pool;

/*macro functions*/

/*FREE free the element in the object table pointed to by the
  pointer passed*/

#define FREE(TBL_PTR)  /*TBL_PTR points to an element in the obj_table  \
                         */                                             \
if ((TBL_PTR) != NULL)                                                  \
        {                                                               \
        if ((TBL_PTR)->bkwd_ovfl != NULL)                               \
                {                                                       \
                /*not the primary bucket*/                              \
                /*note that if we are freeing primary bucket, we        \
                  cannot delete either primary fwd chain, or            \
                  first ovfl's backward chain (we would lose the        \
                  chain of non-empty buckets that hash to the           \
                  primary slot)*/                                       \
                (TBL_PTR)->bkwd_ovfl -> fwd_ovfl = (TBL_PTR)-> fwd_ovfl;  \
                if ((TBL_PTR) -> fwd_ovfl != NULL)       \
                  (TBL_PTR)->fwd_ovfl -> bkwd_ovfl = (TBL_PTR) -> bkwd_ovfl; \
                (TBL_PTR)->fwd_ovfl=  NULL;                             \
                }                                                       \
        (TBL_PTR)->obj_ptr =  NULL;                                     \
        (TBL_PTR)->oop =  -1;                                           \
        }
```

```
/*Copyright 1988 Eastman Kodak Company.  All rights reserved.*/
/*prim_macro.h:   macros used in primitives*/
/*increment the bcode counter*/

#define PRIM_INCR        \
cur_cntx->ctrl_vars.next_bcode = (bcode *)       \
        ( (char *) cur_cntx->ctrl_vars.next_bcode       \
        + sizeof(struct execute_primitive) );
```

```
/*Copyright 1988 Eastman Kodak Company.  All rights reserved.*/
#define S_MAX_ENTRIES          64      /* Max num entries in a sampler table */
#define S_MAX_TESTS            4       /* Max num variables we can track */
#define S_DESCR_LEN            32      /* Max length for description of a
                                          value for a test, or of a name
                                          for a test */
```

```
/*Copyright 1988 Eastman Kodak Company.  All rights reserved.*/
/* Sampler data tables: there are S_MAX_TESTS tables, each with S_MAX_ENTRIES
   entries in them. */

extern  sampler_tab_rec         Sampler_data[S_MAX_TESTS][S_MAX_ENTRIES];

/* Sampler data current values: the user can keep track of up to S_MAX_TESTS
   values for a given run of the interpreter. */

extern  sampler_test                      Sampler_vals[S_MAX_TESTS];
```

```
/*Copyright 1988 Eastman Kodak Company.  All rights reserved.*/
/* Sampler data tables: there are S_MAX_TESTS tables, each with S_MAX_ENTRIES
   entries in them. */

      sampler_tab_rec         Sampler_data[S_MAX_TESTS][S_MAX_ENTRIES] =
{
      /*       key            tally  descr    */

      {
            { 0x200,          0,     "* Initialization and shutdown *", },
            { 0x000,          0,     "** Outside any bcode handler **", },
            { 0x0ff,          0,     "Blk_value_bcode                 ", },
            { 0x100,          0,     "Send_msg_bcode                  ", },
            { 0x101,          0,     "Return_bcodes                   ", },
            { 0x102,          0,     "Exec_prim_bcode                 ", },
            { 0x105,          0,     "Branch_bcode                    ", },
            { 0x106,          0,     "Set_up_blk_bcode                ", },
            { 0x107,          0,     "Branch_on_equal_bcode           ", },
            { 0x108,          0,     "Branch_on_noteq_bcode           ", },
            { 0x109,          0,     "Eval_blk_bcode                  ", },
            { 0x10a,          0,     "Eval_blk2_bcode                 ", },
            { 0x10b,          0,     "Send_param_msg_bcode            ", },
            { 0x10c,          0,     "Send_add_bcode                  ", },
            { 0x10d,          0,     "Send_sub_bcode                  ", },
            { 0x10e,          0,     "Send_eq_bcode                   ", },
            { 0x10f,          0,     "Send_add1_bcode                 ", },
            { 0x110,          0,     "Send_sub1_bcode                 ", },
            { 0x121,          0,     "Assign21 bcode                  ", },
            { 0x122,          0,     "Assign22 bcode                  ", },
            { 0x123,          0,     "Assign23 bcode                  ", },
            { 0x124,          0,     "Assign24 bcode                  ", },
            { 0x125,          0,     "Assign25 bcode                  ", },
            { 0x126,          0,     "Assign26 bcode                  ", },
            { 0x131,          0,     "Assign31 bcode                  ", },
            { 0x132,          0,     "Assign32 bcode                  ", },
            { 0x133,          0,     "Assign33 bcode                  ", },
            { 0x134,          0,     "Assign34 bcode                  ", },
            { 0x135,          0,     "Assign35 bcode                  ", },
            { 0x136,          0,     "Assign36 bcode                  ", },
            { 0x141,          0,     "Assign41 bcode                  ", },
            { 0x142,          0,     "Assign42 bcode                  ", },
            { 0x143,          0,     "Assign43 bcode                  ", },
            { 0x144,          0,     "Assign44 bcode                  ", },
            { 0x145,          0,     "Assign45 bcode                  ", },
            { 0x146,          0,     "Assign46 bcode                  ", },
            { 0x151,          0,     "Assign51 bcode                  ", },
            { 0x152,          0,     "Assign52 bcode                  ", },
            { 0x153,          0,     "Assign53 bcode                  ", },
            { 0x154,          0,     "Assign54 bcode                  ", },
            { 0x155,          0,     "Assign55 bcode                  ", },
            { 0x156,          0,     "Assign56 bcode                  ", },
      },

      {
            { 0,              0,     "** Not in send_msg_bcode     **", },
            { 1,              0,     "** In send_msg_bcode         **", },
            { 2,              0,     "** In send_msg reserving rcvr  ", },
            { 3,              0,     "** In send_msg building cntx   ", },
            { 4,              0,     "** In send_msg reserving meth  ", },
            { 5,              0,     "** In send_msg calling fetch_m ", },
            { 6,              0,     "** In fetch_method             ", },
            { 7,              0,     "** In bcopy - params           ", },
      },

      {
            { 0,              0,     "** Not in ret_bcode          **", },
            { 1,              0,     "** In ret_bcode              **", },
            { 2,              0,     "** In change_region            ", },
            { 3,              0,     "** In collector                ", },
      },

      {
            { 0,              0,     "** Not in eval_blk_bcode     **", },
            { 1,              0,     "** In eval_blk_bcode         **", },
            { 2,              0,     "** In stub_to_cntx             ", },
            { 3,              0,     "** In bcopy - cntx             ", },
            { 4,              0,     "** In bcopy - params           ", },
      },
};

/* Current state of sampler: for each test, we have:

      a current value for the sampled variable;
      the number of keys so far entered in the table; and
      a description of what the test represents. */

      sampler_test            Sampler_vals[S_MAX_TESTS] =
{
/*    cur_value,     total_tallies,  num_entries,    descr    */

      0,             0,              S_MAX_ENTRIES,  "Bytecodes breakdown",
      0,             0,              S_MAX_ENTRIES,  "Send_msg  breakdown",
      0,             0,              S_MAX_ENTRIES,  "Ret_bcode breakdown",
      0,             0,              S_MAX_ENTRIES,  "Eval_blk  breakdown",
};
```

```
/*Copyright 1988 Eastman Kodak Company.  All rights reserved.*/
/* Sampler data table entry definition */

typedef struct
        {
        long            key;
        long            tally;
        char            descr[S_DESCR_LEN];
        } sampler_tab_rec;

/* Sampler test/current values definition */

typedef struct
        {
        long            cur_value;
        long            total_tallies;
        short           num_entries;
        char            descr[S_DESCR_LEN];
        } sampler_test;
```

```
/*Copyright 1988 Eastman Kodak Company.  All rights reserved.*/
/*
** structures and constants for using the symbol database
**
** note that the symbol database is implemented with dbm(3) ...
*/

#define MAX_SYMBOLS             90
#define SYMBOL_DB               "symbol_db"
#define MAX_NAME_LENGTH         36      /*must be multiple of 4*/
#define MAX_SYM_DB_STRINGS      4000    /*must be multiple of 4*/
#define MAX_SUPER_CLASS_VARS    52
#define MAX_CHAIN_LENGTH        28

struct symbolrec        /*internal record for class symbol tables*/
        {
        struct fpt
                {
                char classname[MAX_NAME_LENGTH];
                char superclass_name[MAX_NAME_LENGTH];
                short no_named_vars;
                } fpt;
        char named_vars[MAX_SYMBOLS][MAX_NAME_LENGTH];  /*contains instance
                    variables and class variables for this class*/
        int no_super_vars;
        int no_super_names;
        struct supers
                {
                int     owning_class;  /*index to supernames below*/
                int     super_index;    /*spot in super's array of inst vars*/
                char    super_var[MAX_NAME_LENGTH]; /*class variables for
                                                superclasses*/
                } supers[MAX_SUPER_CLASS_VARS];
        char supernames[MAX_CHAIN_LENGTH][MAX_NAME_LENGTH];  /*names of
                                                superclasses*/
        };

struct symdb_rec        /*disk record for class symbol tables*/
{
        struct fpx
        {
                char    classname[MAX_NAME_LENGTH];
                char    superclass_name[MAX_NAME_LENGTH];
                short   no_named_vars;
                short   size_strings;
        }
                fpt;
        char    symbol_strings[MAX_SYM_DB_STRINGS];  /*all packed together*/
};
/*
** the standard dbm(3) datum structure ...
*/

typedef struct
{
        char *dptr;
        int dsize;
}
        datum;

/*
** structure of the keys used for accessing the symbol database
*/
```

```
/*
** warning!
**
** since keytype is used as the key data in a dbm datum for fetch(),
** it must not have any 'holes', (due to alignments), that might take
** on unknown values since this will result in varying key data, even
** though the elements of keytype were assigned consistently.
**
** additionally, the 68010 processor requires references to words
** (2 bytes) or longs (4 bytes) to be aligned on word boundaries.
** this implies that any byte arrays of data to which structure
** casts (overlays) are going to be applied must be aligned on
** word boundaries, (the compiler aligns all structures on word
** boundaries anyway!).
**
** so, to keep all involved cpu's happy, we're creating a convention of
** having all elements in a structure be an integral multiple of 2 in size,
** i.e., no single char's or odd-length arrays of char's, so
** MAX_NAME_LENGTH had better be even!

** To make the Sun 4 happy, we force our alignments to 4 byte boundaries.
*/

typedef struct
{
        unsigned short  keyclass;
        short           padding;
        char            classname[MAX_NAME_LENGTH];
}
        keytype;

/*
** dbmkey is a specific datum structure used in phase 1 of the compiler ...
*/

typedef struct
{
        keytype         *kptr;          /* key data */
        int             ksize;          /* key length */
}
        dbmkey;
```

```
/*Copyright 1988 Eastman Kodak Company.  All rights reserved.*/
/*
** threaded bytecode support
*/

/*
** control transfer
**
** assumes that bcp is tied to register a5.  this is valid if bcp is
** declared as first register pointer value in exec_bcodes().
*/

#define THREADIT()      asm(" movl a5@,a0\n jra a0@\n")

/*
** bytecode threading
*/

#define THREADMETH(start, size) \
{                                                                       \
        register int foo;                                               \
        foo = (int) bcp;        /* save bcp temporarily */              \
        bcp = (char *) (start);                                         \
        while ( bcp < (char *) (start) + (size) - sizeof(int *) )       \
        {                                                               \
                switch ( A_GENERIC(bcp)->bytecode )                     \
                {                                                       \
                case BRANCH:                                            \
                        *((int **)bcp) = jmp;   bcp += BR_SIZE; break;  \
                case BRANCH_ON_EQUAL:                                   \
                        *((int **)bcp) = jeq;   bcp += CBR_SIZE; break; \
                case BRANCH_ON_NOT_EQUAL:                               \
                        *((int **)bcp) = jne;   bcp += CBR_SIZE; break; \
                case EVALUATE_BLOCK:                                    \
                case EVALUATE_BLOCK_2:                                  \
                        *((int **)bcp) = eb;    bcp += EB_SIZE; break;  \
                case SHORT_RETURN:                                      \
                case LONG_RETURN:                                       \
                        *((int **)bcp) = ret;   bcp += RET_SIZE; break; \
                case SEND_MESSAGE:                                      \
                        *((int **)bcp) = send;  bcp += SM_SIZE; break;  \
                case SEND_MESSAGE_ADD:                                  \
                        *((int **)bcp) = sadd;  bcp += SM_SIZE; break;  \
                case SEND_MESSAGE_ADD1:                                 \
                        *((int **)bcp) = saddl; bcp += SM_SIZE; break;  \
                case SEND_MESSAGE_SUB:                                  \
                        *((int **)bcp) = ssub;  bcp += SM_SIZE; break;  \
                case SEND_MESSAGE_SUB1:                                 \
                        *((int **)bcp) = ssubl; bcp += SM_SIZE; break;  \
                case SEND_MESSAGE_EQ:                                   \
                        *((int **)bcp) = seq;   bcp += SM_SIZE; break;  \
                case SEND_PARAM_MESSAGE:                                \
                        *((int **)bcp) = sendp; bcp += SPM_SIZE; break; \
                case SET_UP_BLOCK_CONTEXT:                              \
                        *((int **)bcp) = subc;  bcp += SUBC_SIZE; break;\
                case 0x121:                                             \
                        *((int **)bcp) = a21;   bcp += A21_SIZE; break; \
                case 0x122:                                             \
                        *((int **)bcp) = a22;   bcp += A22_SIZE; break; \
                case 0x123:                                             \
                        *((int **)bcp) = a23;   bcp += A23_SIZE; break; \
                case 0x124:                                             \
                        *((int **)bcp) = a24;   bcp += A24_SIZE; break; \
                case 0x125:                                             \
                        *((int **)bcp) = a25;   bcp += A25_SIZE; break; \
                case 0x126:                                             \
                        *((int **)bcp) = a26;   bcp += A26_SIZE; break; \
                case 0x131:                                             \
                        *((int **)bcp) = a31;   bcp += A31_SIZE; break; \
                case 0x132:                                             \
                        *((int **)bcp) = a32;   bcp += A32_SIZE; break; \
                case 0x133:                                             \
                        *((int **)bcp) = a33;   bcp += A33_SIZE; break; \
                case 0x134:                                             \
                        *((int **)bcp) = a34;   bcp += A34_SIZE; break; \
                case 0x135:                                             \
                        *((int **)bcp) = a35;   bcp += A35_SIZE; break; \
                case 0x136:                                             \
                        *((int **)bcp) = a36;   bcp += A36_SIZE; break; \
                case 0x141:                                             \
                        *((int **)bcp) = a41;   bcp += A41_SIZE; break; \
                case 0x142:                                             \
                        *((int **)bcp) = a42;   bcp += A42_SIZE; break; \
                case 0x143:                                             \
                        *((int **)bcp) = a43;   bcp += A43_SIZE; break; \
                case 0x144:                                             \
                        *((int **)bcp) = a44;   bcp += A44_SIZE; break; \
                case 0x145:                                             \
                        *((int **)bcp) = a45;   bcp += A45_SIZE; break; \
                case 0x146:                                             \
                        *((int **)bcp) = a46;   bcp += A46_SIZE; break; \
                case 0x151:                                             \
                        *((int **)bcp) = a51;   bcp += A51_SIZE; break; \
                case 0x152:                                             \
                        *((int **)bcp) = a52;   bcp += A52_SIZE; break; \
                case 0x153:                                             \
                        *((int **)bcp) = a53;   bcp += A53_SIZE; break; \
                case 0x154:                                             \
                        *((int **)bcp) = a54;   bcp += A54_SIZE; break; \
                case 0x155:                                             \
                        *((int **)bcp) = a55;   bcp += A55_SIZE; break; \
                case 0x156:                                             \
                        *((int **)bcp) = a56;   bcp += A56_SIZE; break; \
                default:                                                \
                        *((int **)bcp) = prim;  bcp += EP_SIZE; break;  \
                }                                                       \
        }                                                               \
        bcp = (char *) foo;     /* restore bcp */                       \
}

/*
** bytecode thread target definitions
** (forces definition of bytcode entry point labels)
*/

#define THREADDEF()     \
        if (0) goto jmp;        \
        if (0) goto jeq;        \
        if (0) goto jne;        \
        if (0) goto eb;         \
        if (0) goto ret;        \
        if (0) goto send;       \
        if (0) goto sadd;       \
        if (0) goto saddl;      \
        if (0) goto ssub;       \
        if (0) goto ssubl;      \
        if (0) goto seq;        \
```

```
if (0) goto sendp;      \
if (0) goto subc;       \
if (0) goto a21;        \
if (0) goto a22;        \
if (0) goto a23;        \
if (0) goto a24;        \
if (0) goto a25;        \
if (0) goto a26;        \
if (0) goto a31;        \
if (0) goto a32;        \
if (0) goto a33;        \
if (0) goto a34;        \
if (0) goto a35;        \
if (0) goto a36;        \
if (0) goto a41;        \
if (0) goto a42;        \
if (0) goto a43;        \
if (0) goto a44;        \
if (0) goto a45;        \
if (0) goto a46;        \
if (0) goto a51;        \
if (0) goto a52;        \
if (0) goto a53;        \
if (0) goto a54;        \
if (0) goto a55;        \
if (0) goto a56;        \
if (0) goto prim;
```

```
/* Copyright 1988 Eastman Kodak Company.  All rights reserved. */

/*
 * system-wide typedefs.  typedefs should be upper case in the future.
 */

typedef long oop;               /* object ids */
typedef int PID;                /* process ids */
typedef unsigned short bcode;   /* bytecode (2 bytes for alignment reasons) */
```

```
/*Copyright 1988 Eastman Kodak Company.  All rights reserved.*/
#ifndef units_DEFINED
#define units_DEFINED

#include        <sys/types.h>

/*
 * A SCALED_POINT is the basic unit of measurement in a document. Each unit is
 * 1/65536 of a point. This is small enough to allow us to use integer
 * arithmetic for all calculations. The upper 16 bits represent integral
 * points, while fractional points are in the lower 16 bits
 */
typedef long    SCALED_POINT;

/*
 * SP_POS describes a page coordinate
 */
typedef struct sp_pos
{
        SCALED_POINT    x;
        SCALED_POINT    y;
} SP_POS;

/*
 * SP_RECTs are used to define rectangular areas on the page
 */
typedef struct sp_rect
{
        SCALED_POINT    x;
        SCALED_POINT    y;
        SCALED_POINT    width;
        SCALED_POINT    height;
} SP_RECT;

/*
 * These macros convert from screen pixels to SCALED_POINTs and
 * visa-versa. We are using an approximate value of 72 points/inch.
 * Therefore, an 8.5 x 11 inch page is 612 pixels by 792 pixels
 */
#define PIXELS_TO_SP(x) (x * 65536)
#define SP_TO_PIXELS(x) ((x) < 0 ?      ((x) - 32768) / 65536 :\
                                        ((x) + 32768) / 65536)
#define POINTS_TO_SP(x) (x * 65536)
#define SP_TO_F(sp)     ((double)sp / 65536.)
#define F_TO_SP(f)      ((SCALED_POINT)((double)(f) * 65536))

#endif units_DEFINED
```

```
/*Copyright 1988 Eastman Kodak Company.  All rights reserved.*/
#ifndef xfontfile_DEFINED
#define xfontfile_DEFINED

#include "fontdef.h"

typedef struct
{
        SP_POS                  width;  /* displacement to next character */
        SP_POS                  home;   /* displacement to bitmap */

        struct
        {
                int             width;  /* width of picture in bits */
                int             height; /* height of picture in bits */
                int             depth;  /* depth of picture in bits */
                int             nwords; /* number of picture data words */
        } bitmap;

        char                    pshandle[PSHANDLE_SIZE];
} XFONTFILE_CHAR;

typedef struct
{
        long                    number_of_pairs;
        FONT_KERNING_PAIR       *pair;
} XFONTFILE_KERNING;

typedef struct
{
        char                    common_fontname[FONTNAME_SIZE];
        char                    acorn_fontname[FONTNAME_SIZE];
        char                    ps_fontname[FONTNAME_SIZE];
        int                     resolution;
        SCALED_POINT            pointsize;
        FONT_GLUE               glue;
        SCALED_POINT            font_height;
        SCALED_POINT            font_depth;
        XFONTFILE_CHAR          font_char[MAX_FONT_CHARS];
        XFONTFILE_KERNING       kerning;
} XFONTFILE_HEADER;

typedef struct
{
        FILE                    *fp;
        XFONTFILE_HEADER        header;
        unsigned short          *word_aligned_bitmap[MAX_FONT_CHARS];
} XFONTFILE;

#define XFONTMAGIC      042752

#endif
```

code.c
compile.c
kcom.c
misc.c
optimize.c
say.c
symbol.c
assemble.c
constant.c
kasm.c
misc.c

```
/*Copyright 1988 Eastman Kodak Company.  All rights reserved.*/
/*
 * code generation routines
 */

#include <stdio.h>
#include "kcmisc.h"
#include "kcparse.h"
#include "kccode.h"

static char s1[2048];
static char s2[2048];

/*
 * "code node" support
 */

struct code *
allocCode(type, line)
	int type;
	int line;
{
	struct code *cn;

	cn = (struct code *) malloc(sizeof(struct code));

	if (cn == NULL)
		fatal("allocCode: out of memory\n");

	cn->next = NULL;
	cn->type = type;
	cn->line = line;

	return(cn);
}

freeCode(c)
	struct code *c;
{
	free(c);

	return;
}

/*
 * code segment support
 */

struct code *
allocCodeSegment(id)
	int id;
{
	struct code *seg;

	seg = allocCode(C_SEG, 0);

	seg->next = NULL;
	seg->code.seg.id = id;
	seg->code.seg.tail = seg;
	seg->code.seg.nextseg = NULL;

	return(seg);
}

freeCodeSegment(seg)
	struct code *seg;
{
	struct code *c;

	if (seg == NULL)
		fatal("freeCodeSegment: no segment specified\n");

	if (seg->type != C_SEG)
		fatal("freeCodeSegment: argument not a segment\n");

	for (c = seg->next; c; c = c->next)
		freeCode(c);

	free(seg);

	return;
}

addCodeSegment(head, seg)
	struct code *head;
	struct code *seg;
{
	if (head == NULL || seg == NULL)
		fatal("addCodeSegment: no list or segment specified\n");

	if (head->type != C_SEG || seg->type != C_SEG)
		fatal("addCodeSegment: arguments not segments\n");

	while (head->code.seg.nextseg != NULL) head = head->code.seg.nextseg;

	head->code.seg.nextseg = seg;

	return;
}

addCode(seg, c)
	struct code *seg;
	struct code *c;
{
	if (seg == NULL)
		fatal("addCode: no segment specified\n");

	if (seg->type != C_SEG)
		fatal("addCode: argument not a segment\n");

	if (c == NULL)
		return;

	seg->code.seg.tail->next = c;
	seg->code.seg.tail = c;

	return;
}

spliceCode(seg, pos, c)
	struct code *seg;
	struct code *pos;
	struct code *c;
{
	register struct code *p;

	if (seg == NULL)
		fatal("spliceCode: no segment specified\n");
```

```
	if (pos == NULL)
		fatal("spliceCode: no position specified\n");

	for (p = seg->next; p != pos; p = p->next)
		if (p == NULL)
			fatal("spliceCode: position not in segment\n");

	if (c == NULL)
		return;

	if (seg->code.seg.tail == pos)
	{
		addCode(seg, c);
	}
	else
	{
		c->next = pos->next;
		pos->next = c;
	}

	return;
}

/*
 * code statements
 */

struct code *
codeLabel(label)
	int label;
{
	struct code *cn;

	cn = allocCode(C_LABEL, 0);

	cn->code.label.label = label;

	return (cn);
}

struct code *
codeSend(type, dest, super, selector, rcvr, args, line)
	int type;
	struct ref dest;
	int super;
	char *selector;
	struct ref rcvr;
	int args;
	int line;
{
	struct code *cn;

	cn = allocCode(type, line);

	cn->code.send.rcvr = rcvr;
	cn->code.send.super = super;
	cn->code.send.dest = dest;
	cn->code.send.args = args;
	cn->code.send.selector = selector;

	return (cn);
}

struct code *
codeParamSend(dest, super, selarg, rcvr, args, line)
	struct ref dest;
	int super;
	struct ref selarg;
	struct ref rcvr;
	int args;
	int line;
{
	struct code *cn;

	cn = allocCode(C_SENDP, line);

	cn->code.sendp.rcvr = rcvr;
	cn->code.sendp.super = super;
	cn->code.sendp.dest = dest;
	cn->code.sendp.args = args;
	cn->code.sendp.selector = selarg;

	return (cn);
}

struct code *
codeEvalBlock(dest, rcvr, args, opt, line)
	struct ref dest;
	struct ref rcvr;
	int args;
	int opt;
	int line;
{
	struct code *cn;

	if ( opt )
		cn = allocCode(C_EVALBO, line);
	else
		cn = allocCode(C_EVALB, line);

	cn->code.evalb.rcvr = rcvr;
	cn->code.evalb.dest = dest;
	cn->code.evalb.args = args;

	return (cn);
}

struct code *
codeMethodReturn(dest, line)
	struct ref dest;
	int line;
{
	struct code *cn;

	cn = allocCode(C_MRET, line);

	cn->code.ret.dest = dest;

	return (cn);
}

struct code *
codeBlockReturn(dest, line)
	struct ref dest;
	int line;
```

```
{
        struct code *cn;

        cn = allocCode(C_BRET, line);

        cn->code.ret.dest = dest;

        return (cn);
}

struct code *
codeBranch(label, line)
        int label;
        int line;
{
        struct code *cn;

        cn = allocCode(C_JMP, line);

        cn->code.jmp.label = label;

        return (cn);
}

struct code *
codeBranchNE(label, ref1, ref2, line)
        int label;
        struct ref ref1;
        struct ref ref2;
        int line;
{
        struct code *cn;

        cn = allocCode(C_JNE, line);

        cn->code.jc.label = label;
        cn->code.jc.ref1 = ref1;
        cn->code.jc.ref2 = ref2;

        return (cn);
}

struct code *
codeBranchEQ(label, ref1, ref2, line)
        int label;
        struct ref ref1;
        struct ref ref2;
        int line;
{
        struct code *cn;

        cn = allocCode(C_JEQ, line);

        cn->code.jc.label = label;
        cn->code.jc.ref1 = ref1;
        cn->code.jc.ref2 = ref2;

        return (cn);
}

struct code *
codeSetUpBlock(label, block, temps, line)
        int label;
        int block;
        int temps;
        int line;
{
        struct code *cn;

        cn = allocCode(C_SUBC, line);

        cn->code.subc.block = block;
        cn->code.subc.label = label;
        cn->code.subc.temps = temps;

        return (cn);
}

struct code *
codeAssign(dest, src, line)
        struct ref dest;
        struct ref src;
        int line;
{
        struct code *cn;

        /*
        ** don't generate an assign if the destination is null, or
        ** the source and destination are the same.
        **
        ** note that when determining whether the source and destination
        ** are the same, we use the string representation since refstr()
        ** takes the current code segment context into account.
        **
        ** we only compare up to the name comment field, (enclosed by "()"),
        ** of the reference.  this implies the name comment field must be
        ** at the end of the reference string, (see refstr()).
        */

        if ( dest.type == R_NONE )
                return (NULL);

        refstr(s1, dest);
        refstr(s2, src);

        if ( !strncmp(s1, s2, strcspn(s1, "(")) )
                return (NULL);

        cn = allocCode(C_MOV, line);

        cn->code.mov.dest = dest;
        cn->code.mov.src = src;

        return (cn);
}

struct code *
codeExecPrim(dest, num, argstart, args, line)
        struct ref dest;
        char *num;
        struct ref argstart;
        int args;
        int line;
{
        struct code *cn;

        cn = allocCode(C_PRIM, line);
```

```
        cn->code.prim.dest = dest;
        cn->code.prim.num = num;
        cn->code.prim.argstart = argstart;
        cn->code.prim.args = args;

        return (cn);
}
```

```
/*Copyright 1988 Eastman Kodak Company.  All rights reserved.*/
#include <stdio.h>
#include "types.h"
#include "constants.h"
#include "symbol_db.h"
#include "kcmisc.h"
#include "kcparse.h"
#include "kccode.h"

extern struct tusage getTempUse();
extern struct mark markSymbols();
extern struct ref findSymbol();
extern struct code *allocCodeSegment();
extern char *filename;

char Classname[MAX_NAME_LENGTH];
char SuperClass[MAX_NAME_LENGTH];

compileClass(c)
        struct pclass *c;
{
        struct pmethod **m;
        struct pnode *n;
        struct mark classSymbolsMark;
        int i;

        /*
        ** set up ...
        */

        strcpy(Classname, c->name);
        strcpy(SuperClass, c->superclass);

        initSymbols();

        classSymbolsMark = markSymbols();

        /*
        ** add our variable names to the symbol table.
        */

        for ( n = c->instVarList; n; n = n->right )
                addSymbol(n->str, R_INSTANCE_VAR, 0, 0);

        for ( n = c->classVarList; n; n = n->right )
                addSymbol(n->str, R_CLASS_VAR, 0, 0);

        /*
        ** emit class info ...
        */

        sayClassHeader(c);

        /*
        ** compile the methods ...
        */

        for ( i = 0; i < c->methodCount; i++ )
                compileMethod(c->method[i]);

        /*
        ** write symbols to symbol database
        */

        writeSymbols();

        return;
}

int BlockNest;
int BlockCount;
int Meta;

struct code *Code;              /* head of all the code segments */
struct code *CodeSegment;       /* the current code segment */
struct code *SetUpCode;         /* position for block set up instructions */

compileMethod(m)
        struct pmethod *m;
{
        struct ref var;
        struct pnode *n;
        struct code *seg;
        struct mark methodSymbolsMark;
        struct tusage tu;
        int slot;

        /*
        ** mark the start of local method symbols in the symbol table
        ** so we can release them at the end of method compilation.
        */

        methodSymbolsMark = markSymbols();

        /*
        ** track temporary usage for method
        */

        clearTempUse();

        /*
        ** reset label generation
        */

        clearLabels();

        /*
        ** add method symbols ... (self/super are always in first temp)
        */

        slot = allocTemp(1);

        addSymbol("self", R_METHOD_TEMP, slot, 0);
        addSymbol("super", R_METHOD_TEMP, slot, 0);

        for ( n = m->msgPattern; n && n->left; n = n->right )
                addSymbol(n->left->str, R_METHOD_PARAM, allocTemp(1), 0);

        for ( n = m->tempVarList; n; n = n->right )
                addSymbol(n->str, R_METHOD_TEMP, allocTemp(1), 0);

        /*
        ** initialize ...
        */

        Meta = m->meta;
        BlockNest = 0;
```

```
BlockCount = 0;
Code = CodeSegment = allocCodeSegment(-1);      /* -1 -> method seg */
SetUpCode = NULL;

/*
** determine whether method can be tagged as "flattenable"
** by the interpreter.
**
** a method is "flattenable" if the method consists of a single
** statement returning one of the following items:
**
** 1  an instance variable, (can transform send into an assign).
** 2. the result of a primitive for which the first argument is
**    self and the arguments to the primitive invocation line up
**    exactly with arguments to the method, (can transform the
**    send into a primitive execution).
*/

m->opttype = REG_METH;

if ( m->firstStatement->left->type == N_RETURN
  && m->firstStatement->right == NULL )
{
        n = m->firstStatement->left->left;

        if ( n->type == N_IDENT )
        {
                var = findSymbol(n->str);

                if ( var.type == R_INSTANCE_VAR )
                {
                        m->opttype = INST_METH;
                        m->optdata = var.slot;
                }
        }
        else if ( n->type == N_PRIMITIVE )
        {
                if ( n->right && n->right->type == N_IDENT
                  && !strcmp(n->right->str, "self")
                  && lineup(0, n->right) )
                {
                        m->opttype = PRIM_METH;
                        m->optdata = atoi(n->str);
                }
        }
}

/*
** compile ...
*/

addCode(CodeSegment, codeLabel(makeLabel()));

compileStatementList(m->firstStatement,
  makeref(R_NONE, 0, 0, 0, 0, 0), 0);

m->temps = maxTempUse();
m->blocks = BlockCount;

/*
** print the code ...
*/

sayMethod(m);

        /*
        ** all done ...
        */

        for (seg = Code; seg; seg = seg->code.seg.nextseg)
                freeCodeSegment(seg);

        releaseSymbols(methodSymbolsMark);

        return;
}

compileStatementList(n, dest, inline)
        struct pnode *n;
        struct ref dest;
        int inline;
{
        struct pnode *p;
        struct ref nextdest;
        int temp;

        for ( p = n; p; p = p->right )
        {
                /*
                ** a statement only needs to generate a value if it is an
                ** explicit return statement or the last statement of a
                ** method or block.
                */

                if ( p->left->type == N_RETURN )
                {
                        /*
                        ** explicit return
                        */

                        if ( temp = istemp(p->left->left) )
                                nextdest = findSymbol(p->left->left->str);
                        else
                                nextdest = makeref(R_COMPILER_TEMP, 0, 0, 0,
                                  allocTemp(1), 0);

                        compileExpr(p->left->left, nextdest);

                        addCode(CodeSegment,
                          codeMethodReturn(nextdest, p->line));

                        if ( !temp )
                                freeTemp(1);
                }
                else if ( p->right == NULL && inline )
                {
                        /*
                        ** last line of inline block ... calling routine
                        ** will place jmp statement after this compilation.
                        */

                        compileExpr(p->left, dest);
                }
                else if ( p->right == NULL && CodeSegment->code.seg.id != -1 )
                {
                        /*
                        ** last line of normal block
                        */
```

```
			if ( temp = istemp(p->left) )
				nextdest = findSymbol(p->left->str);
			else
				nextdest = makeref(R_COMPILER_TEMP, 0, 0, 0,
				  allocTemp(1), 0);

			compileExpr(p->left, nextdest);

			addCode(CodeSegment,
			  codeBlockReturn(nextdest, p->line));

			if ( itemp )
				freeTemp(1);
		}
		else if ( p->right == NULL && CodeSegment->code.seg.id == -1 )
		{
			/*
			** last line of method
			*/

			compileExpr(p->left, makeref(R_NONE, 0, 0, 0, 0, 0));

			addCode(CodeSegment,
			  codeMethodReturn(findSymbol("self"), p->line));
		}
		else
		{
			compileExpr(p->left, makeref(R_NONE, 0, 0, 0, 0, 0));
		}
	}

	return;
}

compileExpr(n, dest)
	struct pnode *n;
	struct ref dest;
{
	struct ref nextdest;

	switch ( n->type )
	{
	case N_ASSIGN:
		nextdest = findSymbol(n->str);

		switch ( nextdest.type )
		{
		case R_METHOD_PARAM:
		case R_BLOCK_PARAM:
		case R_XREF:
			fatal("%s: line %d: illegal lhs of assign\n",
			  filename, n->line);
			break;
		}

		compileExpr(n->left, nextdest);

		addCode(CodeSegment, codeAssign(dest, nextdest, n->line));

		break;

	case N_PRIMITIVE:
		genExecPrim(n, dest);

		break;

	case N_CASCADE:
		genCascade(n, dest);

		break;

	case N_UNARY_EXPR:
	case N_BINARY_EXPR:
	case N_KEYWORD_EXPR:

		/*
		** see if optimizer can handle ...
		*/

		if ( genOptiSend(n, dest) )
			break;

		genSend(n, dest, C_SEND);

		break;

	case N_BLOCK:
		genBlock(n, dest);

		break;

	case N_IDENT:
		addCode(CodeSegment,
		  codeAssign(dest, findSymbol(n->str), n->line));

		break;

	case N_SYMBOL:
	case N_STRING:
	case N_NUMBER:
	case N_CHAR:
	case N_ARRAY:
		addCode(CodeSegment, codeAssign(dest,
		  makeref(R_CONSTANT, 0, 0, n, 0, 0), n->line));

		break;
	}

	return;
}

genBlock(n, dest)
	struct pnode *n;
	struct ref dest;
{
	struct pnode *p;
	struct mark blockSymbolsMark;
	struct tusage saveTempUse;
	struct code *prevCodeSegment;
	int blockId;
	int blockStartLabel;
	int args;

	if (BlockNest == 0)
		SetUpCode = Code->code.seg.tail;

	BlockNest++;
```

```
/*
** start a new code segment for this block
*/

blockId = BlockCount++;

prevCodeSegment = CodeSegment;

CodeSegment = allocCodeSegment(blockId);

addCodeSegment(Code, CodeSegment);

/*
** compile the block
*/

blockStartLabel = makeLabel();

addCode(CodeSegment, codeLabel(blockStartLabel));

blockSymbolsMark = markSymbols();

saveTempUse = getTempUse();

clearTempUse();          /* new context, self + args first */

allocTemp(1);            /* self goes into the first temp */

for ( p = n->left, args = 0; p; p = p->right, args++ )
        addSymbol(p->str, R_BLOCK_PARAM, allocTemp(1),
          blockId);

compileStatementList(n->right, makeref(R_NONE, 0, 0, 0, 0, 0), 0);

freeTemp(1+args);

/*
** set up block context instructions for each block in
** a nested group are placed in the method code segment
** such that they are only executed when it is known that
** the blocks may be invoked, (i.e., when they come into
** scope).
*/

spliceCode(Code, SetUpCode, codeSetUpBlock(blockStartLabel, blockId,
  maxTempUse(), n->line));

releaseSymbols(blockSymbolsMark);

setTempUse(saveTempUse);

/*
** all done ...
**
** restore previous code segment and assign to destination.
*/

CodeSegment = prevCodeSegment;

addCode(CodeSegment, codeAssign(dest,
  makeref(R_BLOCK_CNTX, 0, 0, 0, 0, blockId), n->line));

BlockNest--;

        return;
}

genExecPrim(n, dest)
        struct pnode *n;
        struct ref dest;
{
        struct pnode *p;
        struct ref nextdest;
        struct ref primdest;
        int tempdest;
        int aligned;
        int args;
        int i;

        /*
        ** primitive executions must always have a temporary as a destination.
        */

        if ( tempdest = istempref(dest) )
                primdest = dest;
        else
                primdest = makeref(R_COMPILER_TEMP, 0, 0, 0, allocTemp(1), 0);

        for ( p = n->right, args = 0; p; p = p->right, args++ );

        if ( aligned = lineup(0, n->right) )
                nextdest = findSymbol(n->right->str);
        else
                nextdest = makeref(R_COMPILER_TEMP, 0, 0, 0,
                  allocTemp(args), 0);

        for ( p = n->right, i = nextdest.slot; p; p = p->right, i++ )
                compileExpr(p, makeref(R_COMPILER_TEMP, 0, 0, 0, i, 0));

        addCode(CodeSegment, codeExecPrim(primdest, n->str, nextdest, args,
          n->line));

        if ( !aligned )
                freeTemp(args);

        if ( !tempdest )
        {
                addCode(CodeSegment, codeAssign(dest, primdest, n->line));
                freeTemp(1);
        }

        return;
}

genSend(n, dest, type)
        struct pnode *n;
        struct ref dest;
        int type;
{
        struct pnode *p;
        struct ref nextdest;
        struct ref senddest;
        int tempdest;
        int aligned;
        int args;
        int i;
```

```
/*
** message sends must always have a temporary as a destination.
*/

if ( tempdest = istempref(dest) )
	senddest = dest;
else
	senddest = makeref(R_COMPILER_TEMP, 0, 0, 0, allocTemp(1), 0);

/*
** generate normal message send, (i.e., not part of cascade)
*/

switch ( n->type )
{
case N_UNARY_EXPR:
	if ( aligned = lineup(n->left, 0) )
		nextdest = findSymbol(n->left->str);
	else
		nextdest = makeref(R_COMPILER_TEMP, 0, 0, 0,
		  allocTemp(1), 0);

	compileExpr(n->left, nextdest);

	addCode(CodeSegment, codeSend(type, senddest, issuper(n->left),
	  n->str, nextdest, 1, n->line));

	if ( !aligned )
		freeTemp(1);

	break;

case N_BINARY_EXPR:
	if ( aligned = lineup(n->left, n->right) )
		nextdest = findSymbol(n->left->str);
	else
		nextdest = makeref(R_COMPILER_TEMP, 0, 0, 0,
		  allocTemp(2), 0);

	compileExpr(n->left, nextdest);

	compileExpr(n->right,
	  makeref(R_COMPILER_TEMP, 0, 0, 0, nextdest.slot+1, 0));

	addCode(CodeSegment, codeSend(type, senddest, issuper(n->left),
	  n->str, nextdest, 2, n->line));

	if ( !aligned )
		freeTemp(2);

	break;

case N_KEYWORD_EXPR:
	for ( p = n->right, args = 0; p; p = p->right, args++ );

	if ( aligned = lineup(n->left, n->right) )
		nextdest = findSymbol(n->left->str);
	else
		nextdest = makeref(R_COMPILER_TEMP, 0, 0, 0,
		  allocTemp(1+args), 0);

	compileExpr(n->left, nextdest);

	for ( p = n->right, i = nextdest.slot+1; p; p = p->right, i++ )
		compileExpr(p->left,
		  makeref(R_COMPILER_TEMP, 0, 0, 0, i, 0));

	addCode(CodeSegment, codeSend(type, senddest, issuper(n->left),
	  n->str, nextdest, 1+args, n->line));

	if ( !aligned )
		freeTemp(1+args);

	break;

default:
	fatal("genSend: not a message expression (type %d)\n",
	  n->type);

	break;
}

if ( !tempdest )
{
	addCode(CodeSegment, codeAssign(dest, senddest, n->line));
	freeTemp(1);
}

return;
}

genCascade(n, dest)
	struct pnode *n;
	struct ref dest;
{
	struct ref rcvr;
	struct pnode *p;
	struct ref senddest;
	int tempdest;

	/*
	** message sends must always have a temporary as a destination.
	*/

	if ( tempdest = istempref(dest) )
		senddest = dest;
	else
		senddest = makeref(R_COMPILER_TEMP, 0, 0, 0, allocTemp(1), 0);

	/*
	** allocate space for receiver and compile lhs's "receiver"
	*/

	rcvr = makeref(R_COMPILER_TEMP, 0, 0, 0, allocTemp(1), 0);

	compileExpr(n->left->left, rcvr);

	/*
	** compile cascade elements
	*/

	for ( p = n; p; p = p->right )
		genCascadeSend(p->left, rcvr, senddest);

	freeTemp(1);

	if ( !tempdest )
	{
```

```
                addCode(CodeSegment, codeAssign(dest, senddest, n->line));
                freeTemp(1);
        }

        return;
}

genCascadeSend(n, rcvr, dest)
        struct pnode *n;
        struct ref rcvr;
        struct ref dest;
{
        struct pnode *p;
        int args;
        int i;

        /*
        ** generate cascaded message send, (receiver already in a temp).
        */

        switch ( n->type )
        {
        case N_UNARY_EXPR:
                addCode(CodeSegment, codeSend(C_SEND, dest, 0, n->str, rcvr, 1,
                  n->line));

                break;

        case N_BINARY_EXPR:
                compileExpr(n->right,
                  makeref(R_COMPILER_TEMP, 0, 0, 0, allocTemp(1), 0));

                addCode(CodeSegment, codeSend(C_SEND, dest, 0, n->str, rcvr, 2,
                  n->line));

                freeTemp(1);

                break;

        case N_KEYWORD_EXPR:
                for ( p = n->right, args = 0; p; p = p->right, args++ );

                for ( p = n->right, i = allocTemp(args); p; p = p->right, i++ )
                        compileExpr(p->left,
                          makeref(R_COMPILER_TEMP, 0, 0, 0, i, 0));

                addCode(CodeSegment, codeSend(C_SEND, dest, 0, n->str, rcvr,
                  1+args, n->line));

                freeTemp(args);

                break;

        default:
                fatal("genCascadeSend: not a message expression (type %d)\n",
                  n->type);
                break;
        }

        return;
}

genEvalBlock(n, dest, opt)
        struct pnode *n;
        struct ref dest;
        int opt;
{
        struct pnode *p;
        struct ref nextdest;
        struct ref evaldest;
        int tempdest;
        int aligned;
        int args;
        int i;

        /*
        ** eval blocks must always have a temporary as a destination.
        */

        if ( tempdest = istempref(dest) )
                evaldest = dest;
        else
                evaldest = makeref(R_COMPILER_TEMP, 0, 0, 0, allocTemp(1), 0);

        switch ( n->type )
        {
        case N_UNARY_EXPR:
                /*
                ** note that if the receiver (lhs) will be in a
                ** temporary, we need not move it to another
                ** temporary in order to execute evaluate block.
                ** this is only true for block evaluations without
                ** arguments, (i.e., "value" message).
                */

                if ( aligned = lineup(n->left, 0) )
                        nextdest = findSymbol(n->left->str);
                else
                        nextdest = makeref(R_COMPILER_TEMP, 0, 0, 0,
                          allocTemp(1), 0);

                compileExpr(n->left, nextdest);

                addCode(CodeSegment, codeEvalBlock(evaldest, nextdest, 1, opt,
                  n->line));

                if ( opt )
                        addCode(CodeSegment, codeSend(C_SEND, evaldest,
                          issuper(n->left), n->str, nextdest, 1, n->line));

                if ( !aligned )
                        freeTemp(1);

                break;

        case N_KEYWORD_EXPR:
                for ( p = n->right, args = 0; p; p = p->right, args++ );

                if ( aligned = lineup(n->left, n->right) )
                        nextdest = findSymbol(n->left->str);
                else
                        nextdest = makeref(R_COMPILER_TEMP, 0, 0, 0,
                          allocTemp(1+args), 0);

                compileExpr(n->left, nextdest);

                for ( p = n->right, i = nextdest.slot+1; p; p = p->right, i++ )
                        compileExpr(p->left,
```

```
                makeref(R_COMPILER_TEMP, 0, 0, 0, 1, 0));

        addCode(CodeSegment, codeEvalBlock(evaldest, nextdest,
          1+args, opt, n->line));

        if ( opt )
                addCode(CodeSegment, codeSend(C_SEND, evaldest,
                  issuper(n->left), n->str, nextdest, 1+args, n->line));

        if ( !aligned )
                freeTemp(1+args);

        break;

default:
        fatal("genEvalBlock: not a unary or keyword message expression (type %d)\
          n->type);

        break;
}

if ( !tempdest )
{
        addCode(CodeSegment, codeAssign(dest, evaldest, n->line));
        freeTemp(1);
}

return;
```

```
/*Copyright 1988 Eastman Kodak Company.  All rights reserved.*/
#include <stdio.h>

extern char *optarg;
extern int optind;

int Tokens = 0;
int Optimize = 1;

#ifdef YYDEBUG
extern int yydebug;
#endif

int linenum;
char *progname;
char *filename;
FILE *fp;

main(ac, av)
        int ac;
        char **av;
{
        char **files;
        int optchar;
        int badopt;

        progname = *av;

        /*
        ** process command line arguments
        */

        badopt = 0;

        while ( ( optchar = getopt(ac, av, "tyo") ) != EOF )
        {
                switch ( optchar )
                {
                case 't': Tokens++;     break;
#ifdef YYDEBUG
                case 'y': yydebug++;    break;
#endif
                case 'o': Optimize = 0; break;
                case '?': badopt++;     break;
                }
        }

        if ( badopt || av[optind] == NULL )
        {
                fatal("usage: %s [ filename ... ]\n", av[0]);
                exit(1);
        }

        for ( files = &av[optind]; *files; files++ )
        {
                filename = *files;

                fp = fopen(filename, "r");

                if (fp == NULL)
                        fatal("cannot open input file\n");

                linenum = 1;

                sayFileName(filename);

                yyparse();

                fclose(fp);
        }

        exit(0);
}
```

```
/*Copyright 1988 Eastman Kodak Company.  All rights reserved.*/
/*
** miscellaneous support routines
*/

#include <stdio.h>
#include <string.h>
#include "kcmisc.h"
#include "kcparse.h"
#include "kccode.h"

/*
** parse node support
*/

extern int linenum;

struct pnode *
makenode(type, op, left, right)
        int type;
        char *op;
        struct pnode *left;
        struct pnode *right;
{
        struct pnode *pn;

        pn = (struct pnode *) malloc(sizeof(struct pnode));

        if (pn == NULL)
                fatal("makenode: Out of memory\n");

        pn->type = type;
        pn->str = op;
        pn->line = linenum;
        pn->right = right;
        pn->left = left;

        return(pn);
}

struct pnode *
changetype(pn, newtype)
        struct pnode *pn;
        int newtype;
{
        pn->type = newtype;

        return(pn);
}

/*
** variable/constant reference <-> string conversions
*/

extern char Classname[];
extern struct code *CodeSegment;
extern int Meta;

char *
arraystr(s, n)
        char *s;
        struct pnode *n;
{
        struct pnode *p;

        sprintf(s, "( ");
        s += strlen(s);

        for ( p = n; p; p = p->right )
        {
                if ( p->left )
                {
                        switch ( p->left->type )
                        {
                        case N_IDENT:
                        case N_SYMBOL:
                                sprintf(s, "#%s ", p->left->str);
                                s += strlen(s);
                                break;
                        case N_STRING:
                        case N_NUMBER:
                        case N_CHAR:
                                sprintf(s, "%s ", p->left->str);
                                s += strlen(s);
                                break;
                        case N_ARRAY:
                                s = arraystr(s, p->left);
                                break;
                        default:
                                fatal("arraystr: invalid constant (type = %d)\n",
                                  p->left->type);
                                break;
                        }
                }
        }

        sprintf(s, ") ");
        s += strlen(s);

        return ( s );
}


char *
refstr(buf, cr)
        char *buf;
        struct ref cr;
{

        switch ( cr.type )
        {
        case R_XREF:
                sprintf(buf, "'%s", cr.name);
                break;
        case R_CONSTANT:
                switch ( cr.node->type )
                {
                case N_SYMBOL:
                        sprintf(buf, "#%s", cr.node->str);
                        break;
                case N_STRING:
                case N_NUMBER:
                case N_CHAR:
                        sprintf(buf, "%s", cr.node->str);
                        break;
                case N_ARRAY:
                        arraystr(buf, cr.node);
```

```
                break;
            default:
                fatal("refstr: invalid constant (type = %d)\n",
                  cr.node->type);
                break;
            }
            break;
        case R_INSTANCE_VAR:
            sprintf(buf, "i%d(%s)", cr.slot, cr.name);
            break;
        case R_CLASS_VAR:
            sprintf(buf, "'%s@i%d(%s)", cr.cname, cr.slot, cr.name);
            break;
        case R_METHOD_PARAM:
        case R_METHOD_TEMP:
            if ( CodeSegment->code.seg.id != -1 )
                sprintf(buf, "mt%d(%s)", cr.slot, cr.name);
            else
                sprintf(buf, "t%d(%s)", cr.slot, cr.name);
            break;
        case R_COMPILER_TEMP:
            sprintf(buf, "t%d", cr.slot);
            break;
        case R_BLOCK_CNTX:
            sprintf(buf, "b%d", cr.block);
            break;
        case R_BLOCK_PARAM:
            if ( CodeSegment->code.seg.id == cr.block )
                sprintf(buf, "t%d(%s)", cr.slot, cr.name);
            else
                sprintf(buf, "b%d@t%d(%s)", cr.block, cr.slot, cr.name);
            break;
        case R_NONE:
            fatal("refstr: null reference\n");
            break;
        default:
            fatal("refstr: invalid reference (type = %d)\n", cr.type);
            break;
        }

        return ( buf );
}

/*
** test to determine if rcvr and args, (or args only), are in
** consecutive order in context temporaries.
*/

lineup(rcvr, args)
        struct pnode *rcvr;
        struct pnode *args;
{
        struct pnode *p;
        int slot;

        /*
        ** note that we depend on istemp() implementation here ...
        */

        if ( rcvr )
        {
            if ( !istemp(rcvr) )
                return ( 0 );
            slot = Tref.slot;
        }
        else if ( args )
        {
            if ( !istemp(args) )
                return ( 0 );
            slot = Tref.slot - 1;
        }
        else
        {
            return ( 0 );
        }

        for ( p = args; p; p = p->right )
        {
            if ( !istemp(p) || Tref.slot != slot + 1 )
                return ( 0 );
            slot = Tref.slot;
        }

        return ( 1 );
```

```
/*Copyright 1988 Eastman Kodak Company.  All rights reserved.*/
#include <stdio.h>
#include "types.h"
#include "constants.h"
#include "kcmisc.h"
#include "kcparse.h"
#include "kccode.h"

extern struct ref findSymbol();
extern struct pnode *makenode();

extern int Optimize;
extern struct code *Code;
extern struct code *CodeSegment;
extern struct code *SetUpCode;

extern int BlockNest;

genOptiSend(n, dest)
        struct pnode *n;
        struct ref dest;
{
        /*
        ** note that we don't optimize within cascaded message
        ** expressions yet ...
        */

        if ( !Optimize )
                return ( 0 );

        if ( !strcmp(n->str, "=") )
                return ( optEq(n, dest) );

        if ( !strcmp(n->str, "+") )
                return ( optAdd(n, dest) );

        if ( !strcmp(n->str, "-") )
                return ( optSub(n, dest) );

        if ( !strcmp(n->str, "value")
          || !strcmp(n->str, "value:")
          || !strcmp(n->str, "value:value:")
          || !strcmp(n->str, "value:value:value:")
          || !strcmp(n->str, "value:value:value:value:")
          || !strcmp(n->str, "value:value:value:value:value:") )
                return ( optValue(n, dest) );

        if ( !strcmp(n->str, "whileTrue:")
          || !strcmp(n->str, "whileFalse:")
          || !strcmp(n->str, "whileTrue")
          || !strcmp(n->str, "whileFalse") )
                return ( optWhile(n, dest) );

        if ( !strcmp(n->str, "ifTrue:")
          || !strcmp(n->str, "ifFalse:") )
                return ( optIf(n, dest) );

        if ( !strcmp(n->str, "ifTrue:ifFalse:")
          || !strcmp(n->str, "ifFalse:ifTrue:") )
                return ( optIfElse(n, dest) );

        if ( !strcmp(n->str, "perform:")
          || !strcmp(n->str, "perform:with:")
          || !strcmp(n->str, "perform:with:with:")
          || !strcmp(n->str, "perform:with:with:with:") )
                return ( optPerform(n, dest) );

        if ( !strcmp(n->str, "and:") )
                return ( optAndBlock(n, dest) );

        if ( !strcmp(n->str, "or:") )
                return ( optOrBlock(n, dest) );

        if ( !strcmp(n->str, "&") )
                return ( optAnd(n, dest) );

        if ( !strcmp(n->str, "|") )
                return ( optOr(n, dest) );

        if ( !strcmp(n->str, "not") )
                return ( optNot(n, dest) );

        if ( !strcmp(n->str, "isNil") )
                return ( optIsNil(n, dest) );

        if ( !strcmp(n->str, "notNil") )
                return ( optNotNil(n, dest) );

        return ( 0 );
}

optEq(n, dest)
        struct pnode *n;
        struct ref dest;
{
        genSend(n, dest, C_SEND_EQ);

        return ( 1 );
}

optAdd(n, dest)
        struct pnode *n;
        struct ref dest;
{

        if ( n->right->type == N_NUMBER && !strcmp(n->right->str, "1") )
                genSend(n, dest, C_SEND_ADD1);
        else
                genSend(n, dest, C_SEND_ADD);

        return ( 1 );
}

optSub(n, dest)
        struct pnode *n;
        struct ref dest;
{
        if ( n->right->type == N_NUMBER && !strcmp(n->right->str, "1") )
                genSend(n, dest, C_SEND_SUB1);
        else
                genSend(n, dest, C_SEND_SUB);

        return ( 1 );
}

optValue(n, dest)
        struct pnode *n;
```

```
        struct ref dest;
{
        genEvalBlock(n, dest, 1);       /* generates 'evalbo' bytecode */

        return ( 1 );
}

optBlock(n, dest)
        struct pnode *n;
        struct ref dest;
{
        struct ref nextdest;
        struct pnode *p;

        /*
        ** generate optimized block evaluation, (i.e., if literal
        ** block, emit inline else emit evaluate block bytecode).
        **
        ** used by control/boolean message optimizations.
        */

        if ( n->type == N_BLOCK )
        {
                compileStatementList(n->right, dest, 1);
        }
        else
        {
                p = makenode(N_UNARY_EXPR, "value", n, 0);

                genEvalBlock(p, dest, 1);

                free(p);
        }

        return;
}

optWhile(n, dest)
        struct pnode *n;
        struct ref dest;
{
        struct ref nextdest;
        int whileCondLabel;
        int whileEndLabel;

        if (BlockNest == 0)
                SetUpCode = Code->code.seg.tail;

        BlockNest++;

        whileCondLabel = makeLabel();
        whileEndLabel = makeLabel();

        nextdest = makeref(R_COMPILER_TEMP, 0, 0, 0, allocTemp(1), 0);

        addCode(CodeSegment, codeLabel(whileCondLabel));

        optBlock(n->left, nextdest);

        if (!strcmp(n->str, "whileTrue:") || !strcmp(n->str, "whileTrue"))
                addCode(CodeSegment, codeBranchNE(whileEndLabel, nextdest,
                  findSymbol("true"), n->line));
        else
                addCode(CodeSegment, codeBranchNE(whileEndLabel, nextdest,
                  findSymbol("false"), n->line));

        if (n->right)
                optBlock(n->right->left, makeref(R_NONE, 0, 0, 0, 0, 0));

        addCode(CodeSegment, codeBranch(whileCondLabel, n->line));

        addCode(CodeSegment, codeLabel(whileEndLabel));

        addCode(CodeSegment, codeAssign(dest, findSymbol("nil"), n->line));

        freeTemp(1);

        BlockNest--;

        return ( 1 );
}

optIf(n, dest)
        struct pnode *n;
        struct ref dest;
{
        struct ref nextdest;
        int temp;
        int ifEndLabel;
        int ifElseLabel;

        ifElseLabel = makeLabel();
        ifEndLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        if ( !strcmp(n->right->str, "ifTrue:") )
                addCode(CodeSegment, codeBranchNE(ifElseLabel, nextdest,
                  findSymbol("true"), n->line));
        else
                addCode(CodeSegment, codeBranchNE(ifElseLabel, nextdest,
                  findSymbol("false"), n->line));

        optBlock(n->right->left, dest);

        if ( dest.type == R_NONE )
        {
                addCode(CodeSegment, codeLabel(ifElseLabel));
        }
        else
        {
                addCode(CodeSegment, codeBranch(ifEndLabel, n->line));

                addCode(CodeSegment, codeLabel(ifElseLabel));

                addCode(CodeSegment, codeAssign(dest, findSymbol("nil"),
                  n->line));

                addCode(CodeSegment, codeLabel(ifEndLabel));
        }

        if ( !temp )
                freeTemp(1);
```

```
        return ( 1 );
}

optIfElse(n, dest)
        struct pnode *n;
        struct ref dest;
{
        struct ref nextdest;
        int temp;
        int ifEndLabel;
        int ifElseLabel;

        ifElseLabel = makeLabel();
        ifEndLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        if ( !strcmp(n->str, "ifTrue:ifFalse:") )
                addCode(CodeSegment, codeBranchNE(ifElseLabel, nextdest,
                  findSymbol("true"), n->line));
        else
                addCode(CodeSegment, codeBranchNE(ifElseLabel, nextdest,
                  findSymbol("false"), n->line));

        optBlock(n->right->left, dest);

        addCode(CodeSegment, codeBranch(ifEndLabel, n->line));

        addCode(CodeSegment, codeLabel(ifElseLabel));

        optBlock(n->right->right->left, dest);

        addCode(CodeSegment, codeLabel(ifEndLabel));

        if ( !temp )
                freeTemp(1);

        return ( 1 );
}

optPerform(n, dest)
        struct pnode *n;
        struct ref dest;
{
        struct pnode *p;
        struct ref nextdes ;
        struct ref senddes ;
        struct ref selarg;
        int tempdest;
        int seltemp;
        int args;
        int i;

        /*
        ** we generate a different kind of send bytecode, a paramaterized
        ** send, which gets its selector from a temporary, rather than
        ** having it burned in.
        **
        ** the first argument is expected to contain the selector to be used.
        */

        /*
        ** message sends must always have a temporary as a destination.
        */

        if ( tempdest = istempref(dest) )
                senddest = dest;
        else
                senddest = makeref(R_COMPILER_TEMP, 0, 0, 0, allocTemp(1), 0);

        /*
        ** compile the real arguments, that is, those other than the
        ** selector argument.
        */

        for ( p = n->right->right, args = 0; p; p = p->right, args++ );

        nextdest = makeref(R_COMPILER_TEMP, 0, 0, 0, allocTemp(1+args), 0);

        compileExpr(n->left, nextdest);

        for ( p = n->right->right, i = nextdest.slot+1; p; p = p->right, i++ )
                compileExpr(p->left, makeref(R_COMPILER_TEMP, 0, 0, 0, i, 0));

        /*
        ** the selector argument must be in a temporary at runtime
        */

        if ( seltemp = istemp(n->right->left) )
                selarg = findSymbol(n->right->left->str);
        else
                selarg = makeref(R_COMPILER_TEMP, 0, 0, 0, allocTemp(1), 0);

        /*
        ** now compile the selector argument
        */

        compileExpr(n->right->left, selarg);

        addCode(CodeSegment, codeParamSend(senddest, issuper(n->left),
          selarg, nextdest, 1+args, n->line));

        if ( !seltemp )
                freeTemp(1);

        freeTemp(1+args);

        if ( !tempdest )
        {
                addCode(CodeSegment, codeAssign(dest, senddest, n->line));
                freeTemp(1);
        }

        return ( 1 );
}

optAndBlock(n, dest)
        struct pnode *n;
        struct ref dest;
{
        struct ref nextdest;
        int falseLabel;
```

```
        int endLabel;
        int temp;

        falseLabel = makeLabel();
        endLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        addCode(CodeSegment, codeBranchEQ(falseLabel, nextdest,
          findSymbol("false"), n->line));

        optBlock(n->right->left, dest);

        addCode(CodeSegment, codeBranch(endLabel, n->line));

        addCode(CodeSegment, codeLabel(falseLabel));

        addCode(CodeSegment, codeAssign(dest, findSymbol("false"), n->line));

        addCode(CodeSegment, codeLabel(endLabel));

        if ( !temp )
                freeTemp(1);

        return ( 1 );
}

optOrBlock(n, dest)
        struct pnode *n;
        struct ref dest;
{
        struct ref nextdest;
        int trueLabel;
        int endLabel;
        int temp;

        trueLabel = makeLabel();
        endLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        addCode(CodeSegment, codeBranchEQ(trueLabel, nextdest,
          findSymbol("true"), n->line));

        optBlock(n->right->left, dest);

        addCode(CodeSegment, codeBranch(endLabel, n->line));

        addCode(CodeSegment, codeLabel(trueLabel));

        addCode(CodeSegment, codeAssign(dest, findSymbol("true"), n->line));

        addCode(CodeSegment, codeLabel(endLabel));

        if ( !temp )
                freeTemp(1);

        return ( 1 );
}

optAnd(n, dest)
        struct pnode *n;
        struct ref dest;
{
        struct ref nextdest;
        int falseLabel;
        int endLabel;
        int temp;

        falseLabel = makeLabel();
        endLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        addCode(CodeSegment, codeBranchEQ(falseLabel, nextdest,
          findSymbol("false"), n->line));

        compileExpr(n->right, dest);

        addCode(CodeSegment, codeBranch(endLabel, n->line));

        addCode(CodeSegment, codeLabel(falseLabel));

        addCode(CodeSegment, codeAssign(dest, findSymbol("false"), n->line));

        addCode(CodeSegment, codeLabel(endLabel));

        if ( !temp )
                freeTemp(1);

        return ( 1 );
}

optOr(n, dest)
        struct pnode *n;
        struct ref dest;
{
        struct ref nextdest;
        int trueLabel;
        int endLabel;
        int temp;

        trueLabel = makeLabel();
        endLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        addCode(CodeSegment, codeBranchEQ(trueLabel, nextdest,
```

```
    findSymbol("true"), n->line));

        compileExpr(n->right, dest);

        addCode(CodeSegment, codeBranch(endLabel, n->line));

        addCode(CodeSegment, codeLabel(trueLabel));

        addCode(CodeSegment, codeAssign(dest, findSymbol("true"), n->line));

        addCode(CodeSegment, codeLabel(endLabel));

        if ( !temp )
                freeTemp(1);

        return ( 1 );
}

optNot(n, dest)
        struct pnode *n;
        struct ref dest;
{
        struct ref nextdest;
        int trueLabel;
        int falseLabel;
        int endLabel;
        int temp;

        trueLabel = makeLabel();
        falseLabel = makeLabel();
        endLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        addCode(CodeSegment, codeBranchEQ(trueLabel, nextdest,
          findSymbol("true"), n->line));

        addCode(CodeSegment, codeBranchEQ(falseLabel, nextdest,
          findSymbol("false"), n->line));

        addCode(CodeSegment, codeAssign(dest, findSymbol("nil"), n->line));

        addCode(CodeSegment, codeBranch(endLabel, n->line));

        addCode(CodeSegment, codeLabel(falseLabel));

        addCode(CodeSegment, codeAssign(dest, findSymbol("true"), n->line));

        addCode(CodeSegment, codeBranch(endLabel, n->line));

        addCode(CodeSegment, codeLabel(trueLabel));

        addCode(CodeSegment, codeAssign(dest, findSymbol("false"), n->line));

        addCode(CodeSegment, codeLabel(endLabel));

        if ( !temp )
                freeTemp(1);

        return ( 1 );
}

optIsNil(n, dest)
        struct pnode *n;
        struct ref dest;
{
        struct ref nextdest;
        int trueLabel;
        int endLabel;
        int temp;

        trueLabel = makeLabel();
        endLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        addCode(CodeSegment, codeBranchEQ(trueLabel, nextdest,
          findSymbol("nil"), n->line));

        addCode(CodeSegment, codeAssign(dest, findSymbol("false"), n->line));

        addCode(CodeSegment, codeBranch(endLabel, n->line));

        addCode(CodeSegment, codeLabel(trueLabel));

        addCode(CodeSegment, codeAssign(dest, findSymbol("true"), n->line));

        addCode(CodeSegment, codeLabel(endLabel));

        if ( !temp )
                freeTemp(1);

        return ( 1 );
}

optNotNil(n, dest)
        struct pnode *n;
        struct ref dest;
{
        struct ref nextdest;
        int trueLabel;
        int endLabel;
        int temp;

        trueLabel = makeLabel();
        endLabel = makeLabel();

        if ( temp = istemp(n->left) )
                nextdest = findSymbol(n->left->str);
        else
                nextdest = makeref(R_COMPILER_TEMP, 0, 0, 0, allocTemp(1), 0);

        compileExpr(n->left, nextdest);

        addCode(CodeSegment, codeBranchEQ(trueLabel, nextdest,
          findSymbol("nil"), n->line));

        addCode(CodeSegment, codeAssign(dest, findSymbol("true"), n->line));
```

```
addCode(CodeSegment, codeBranch(endLabel, n->line));

addCode(CodeSegment, codeLabel(trueLabel));

addCode(CodeSegment, codeAssign(dest, findSymbol("false"), n->line));

addCode(CodeSegment, codeLabel(endLabel));

if ( ltemp )
        freeTemp(l);

return ( 1 );
```

```
/*Copyright 1988 Eastman Kodak Company.  All rights reserved.*/
/*
** code output routines
*/

#include <stdio.h>
#include "kcmisc.h"
#include "kcparse.h"
#include "kccode.h"

extern char *refstr();

extern struct code *Code;
extern struct code *CodeSegment;

static char s1[2048];
static char s2[2048];
static char s3[2048];

say(s, a, b, c, d, e, f, g, h)
        char *s;
{
        printf(s, a, b, c, d, e, f, g, h);
}

sayAbort(s, a, b, c, d, e, f, g, h)
        char *s;
{
        say("\n");
        say(".abort     ; ");
        say(s, a, b, c, d, e, f, g, h);
        say("\n");
}

sayFileName(f)
{
        say(".file %s\n", f);

        return;
}

static int LastLine;

sayLine(line)
        int line;
{
        if ( line <= 0 || line == LastLine )
                return;

        say(".line %d\n", line);
        LastLine = line;

        return;
}

sayCode(cn)
        struct code *cn;
{
        sayLine(cn->line);

        switch (cn->type)
        {
        case C_LABEL:
                say("L%d\n",
                  cn->code.label.label);
                break;

        case C_SEND:
                say("    send     %s,%d,%s,%d,#%s\n",
                  refstr(s1, cn->code.send.rcvr),
                  cn->code.send.super,
                  refstr(s2, cn->code.send.dest),
                  cn->code.send.args,
                  cn->code.send.selector);
                break;

        case C_SEND_EQ:
                say("    seq      %s,%d,%s,%d,#%s\n",
                  refstr(s1, cn->code.send.rcvr),
                  cn->code.send.super,
                  refstr(s2, cn->code.send.dest),
                  cn->code.send.args,
                  cn->code.send.selector);
                break;

        case C_SEND_ADD:
                say("    sadd     %s,%d,%s,%d,#%s\n",
                  refstr(s1, cn->code.send.rcvr),
                  cn->code.send.super,
                  refstr(s2, cn->code.send.dest),
                  cn->code.send.args,
                  cn->code.send.selector);
                break;

        case C_SEND_ADD1:
                say("    sadd1    %s,%d,%s,%d,#%s\n",
                  refstr(s1, cn->code.send.rcvr),
                  cn->code.send.super,
                  refstr(s2, cn->code.send.dest),
                  cn->code.send.args,
                  cn->code.send.selector);
                break;

        case C_SEND_SUB:
                say("    ssub     %s,%d,%s,%d,#%s\n",
                  refstr(s1, cn->code.send.rcvr),
                  cn->code.send.super,
                  refstr(s2, cn->code.send.dest),
                  cn->code.send.args,
                  cn->code.send.selector);
                break;

        case C_SEND_SUB1:
                say("    ssub1    %s,%d,%s,%d,#%s\n",
                  refstr(s1, cn->code.send.rcvr),
                  cn->code.send.super,
                  refstr(s2, cn->code.send.dest),
                  cn->code.send.args,
                  cn->code.send.selector);
                break;

        case C_SENDP:
                say("    sendp    %s,%d,%s,%d,%s\n",
                  refstr(s1, cn->code.sendp.rcvr),
                  cn->code.sendp.super,
                  refstr(s2, cn->code.sendp.dest),
                  cn->code.sendp.args,
```

```
                refstr(s3, cn->code.sendp.selector));
            break;

        case C_MRET:
            say("    mret     %s\n",
                refstr(s1, cn->code.ret.dest));
            break;

        case C_BRET:
            say("    bret     %s\n",
                refstr(s1, cn->code.ret.dest));
            break;

        case C_EVALB:
            say("    evalb    %s,%s,%d\n",
                refstr(s1, cn->code.evalb.rcvr),
                refstr(s2, cn->code.evalb.dest),
                cn->code.evalb.args);
            break;

        case C_EVALBO:
            say("    evalbo   %s,%s,%d\n",
                refstr(s1, cn->code.evalb.rcvr),
                refstr(s2, cn->code.evalb.dest),
                cn->code.evalb.args);
            break;

        case C_SUBC:
            say("    setb     b%d,L%d,%d\n",
                cn->code.subc.block,
                cn->code.subc.label,
                cn->code.subc.temps);
            break;

        case C_JMP:
            say("    jmp      L%d\n",
                cn->code.jmp.label);
            break;

        case C_JEQ:
            say("    jeq      L%d,%s,%s\n",
                cn->code.jc.label,
                refstr(s1, cn->code.jc.ref1),
                refstr(s2, cn->code.jc.ref2));
            break;

        case C_JNE:
            say("    jne      L%d,%s,%s\n",
                cn->code.jc.label,
                refstr(s1, cn->code.jc.ref1),
                refstr(s2, cn->code.jc.ref2));
            break;

        case C_MOV:
            say("    mov      %s,%s\n",
                refstr(s1, cn->code.mov.dest),
                refstr(s2, cn->code.mov.src));
            break;

        case C_PRIM:
            say("    prim     %s,%s,%s,%d\n",
                refstr(s1, cn->code.prim.dest),
                cn->code.prim.num,
                refstr(s2, cn->code.prim.argstart),
                cn->code.prim.args);
            break;

        default:
            fatal("sayCode: unrecognized assembly code (type = %d)\n",
                cn->type);
            break;
        }
}

sayCodeSegment(seg)
        struct code *seg;
{
        struct code *c;

        if (seg == NULL)
                fatal("sayCodeSegment: no segment specified\n");

        if (seg->type != C_SEG)
                fatal("sayCodeSegment: argument not a segment\n");

        CodeSegment = seg;      /* sets the context for refstr() */

        for (c = seg->next; c; c = c->next)
                sayCode(c);

        return;
}

sayClassHeader(c)
        struct pclass *c;
{
        struct pnode *n;

        say("\n");
        say(".class %s %s\n", c->name, c->superclass);

        say(".supervar %d\n", superInstVarCount());

        if ( c->instVarList )
        {
                say(".ivar ");
                for ( n = c->instVarList; n; n = n->right )
                        say("%s ", n->str);
                say("\n");
        }

        if ( c->classVarList )
        {
                say(".cvar ");
                for ( n = c->classVarList; n; n = n->right )
                        say("%s ", n->str);
                say("\n");
        }

        say("\n");

        return;
}

sayMethod(m)
        struct pmethod *m;
{
        struct pnode *n;
```

```
struct code *seg;

if ( m->meta )
        say(".cmethod ");
else
        say(".imethod ");
say("%s\n", m->selector);

if ( m->msgPattern->left )
{
        say(".mparam ");
        for ( n = m->msgPattern; n && n->left; n = n->right )
                say("%s ", n->left->str);
        say("\n");
}

if ( m->tempVarList )
{
        say(".mtemp ");
        for ( n = m->tempVarList; n; n = n->right )
                say("%s ", n->str);
        say("\n");
}

switch ( m->opttype )
{
case INST_METH:
        say(".mattr %d\n", m->optdata);
        break;
case PRIM_METH:
        say(".mprim %d\n", m->optdata);
        break;
}

say("\n");

/*
** emit the code segments ...
*/

for (seg = Code; seg; seg = seg->code.seg.nextseg)
        sayCodeSegment(seg);

say("\n");

say(".mend %d %d\n", m->temps, m->blocks);

say("\n");

return;
```

```
/*Copyright 1988 Eastman Kodak Company.  All rights reserved.*/
/*
** compiler symbol table routines
*/

#include <stdio.h>
#include <ctype.h>
#include "types.h"
#include "constants.h"
#include "symbol_db.h"
#include "kcparse.h"
#include "kcmisc.h"

extern datum fetch();
extern char *cp();

extern char Classname[];
extern char SuperClass[];

static struct ref ClassVar[MAX_SYMBOLS];
static struct ref InstVar[MAX_SYMBOLS];
static struct ref TempVar[MAX_SYMBOLS];
static int ClassVarCount;
static int InstVarCount;
static int TempVarCount;
static int SuperInstVarCount;
static int SuperClassVarCount;
static char SuperChain[MAX_CHAIN_LENGTH][MAX_NAME_LENGTH];
static int SuperChainCount;

static keytype SymbolKey;
static datum DbmKey;
static datum DbmData;
static struct symdb_rec SymbolRec;
static int SymbolDBOpen = 0;

struct ref findSymbol();

initSymbols()
{
        register struct symdb_rec *symbolRec;
        register char *nextclass;
        register char *symbol;
        register int cv;
        register int i;
        register int j;
        struct ref ref;

        /*
        ** build up the symbol table to contain all the symbols in the
        ** superclass chain starting at the specified class and set context
        ** for new symbols to be added.
        **
        ** the symbol data for a class contains both class and instance
        ** variable names in object slot order.
        **
        ** we keep separate tables for class, instance, and named temporary
        ** variables for ease of symbol addition and implementation of
        ** scoping.
        **
        ** references to class variables defined in a superclass are
        ** resolved in the superclass which defined them.
        **
        ** the SymbolKey stuff is a bit of ancient history.
        */

        if ( !SymbolDBOpen )
        {
                if ( dbminit(SYMBOL_DB) != 0 )
                        fatal("initSymbols: could not open symbol database\n");
                SymbolDBOpen = 1;
        }

        SuperChainCount = 0;
        InstVarCount = 0;
        ClassVarCount = 0;
        TempVarCount = 0;

        /*
        ** if the desired class is Object, there is nothing to inherit ...
        */

        if ( !strcmp(Classname, "Object") )
                return;

        /*
        ** make a quick pass backward through the superclass hierarchy
        ** to record the chain, then forward to add the symbols to the
        ** symbol table ... it is a LOT easier to determine slot values
        ** for instance and class variables while going forward rather
        ** than backward!
        */

        nextclass = SuperClass;

        do
        {
                if ( SuperChainCount >= MAX_CHAIN_LENGTH )
                        fatal("initSymbols: superclass chain too long (%d)\n",
                          SuperChainCount);

                SymbolKey.keyclass = 'C';
                strncpy(SymbolKey.classname, nextclass, MAX_NAME_LENGTH);

                DbmKey.dptr = (char *) &SymbolKey;
                DbmKey.dsize = sizeof(SymbolKey);

                DbmData = fetch(DbmKey);

                if ( DbmData.dptr == NULL )
                        fatal("initSymbols: could not find symbols for class %s\n", Symbo

                symbolRec = (struct symdb_rec *) DbmData.dptr;

                SuperChainCount++;

                strcpy(SuperChain[MAX_CHAIN_LENGTH - SuperChainCount],
                  symbolRec->fpt.classname);

                nextclass = symbolRec->fpt.superclass_name;
        }
        while ( strcmp(SymbolKey.classname, "Object") );

        /*
        ** slide the SuperChain entries back to the top positions in
        ** the table now that we've determined the superclass chain.
        */
```

```
for ( i = 0; i < SuperChainCount; i++ )
        strcpy(SuperChain[i],
          SuperChain[MAX_CHAIN_LENGTH - SuperChainCount + i]);

/*
** now for the forward pass ...
*/

for ( i = 0; i < SuperChainCount; i++ )
{
        SymbolKey.keyclass = 'C';
        strncpy(SymbolKey.classname, SuperChain[i], MAX_NAME_LENGTH);

        DbmKey.dptr = (char *) &SymbolKey;
        DbmKey.dsize = sizeof(SymbolKey);

        DbmData = fetch(DbmKey);

        if ( DbmData.dptr == NULL )
                fatal("initSymbols: could not find symbols for class %s\n", Symbo

        symbolRec = (struct symdb_rec *) DbmData.dptr;

        /*
        ** add instance variables first
        */

        symbol = &(symbolRec->symbol_strings[0]);

        for ( j = 0; j < symbolRec->fpt.no_named_vars; j++ )
        {
                if ( islower(*symbol) )
                {
                        ref = findSymbol(symbol);
                        if ( ref.type != R_XREF )
                                fatal("class %s: '%s' already declared in class %
                        InstVar[InstVarCount] =
                          makeref(R_INSTANCE_VAR, cp(symbol),
                          cp(SymbolKey.classname), 0, InstVarCount, 0);
                        InstVarCount++;
                }
                symbol += strlen(symbol) + 1;
        }

        /*
        ** then add class variables
        */

        cv = 0;
        symbol = &(symbolRec->symbol_strings[0]);

        for ( j = 0; j < symbolRec->fpt.no_named_vars; j++ )
        {
                if ( isupper(*symbol) )
                {
                        ref = findSymbol(symbol);
                        if ( ref.type != R_XREF )
                                fatal("class %s: '%s' already declared in class %
                        Classvar[ClassVarCount] =
                          makeref(R_CLASS_VAR, cp(symbol),
                          cp(SymbolKey.classname), 0,
                          InstVarCount + cv, 0);
                        ClassVarCount++;
                        cv++;
                }
                symbol += strlen(symbol) + 1;
        }
}

/*
** note instance variable count at this point ...
** this value represents the number of inherited instance variables.
*/

SuperInstVarCount = InstVarCount;

/*
** also note the class variable count at this point ...
**
** this value is used in calculating the slot values for any
** additional class variable symbols defined in the current class
** (see addSymbol()).
*/

SuperClassVarCount = ClassVarCount;

return;
}

writeSymbols()
{
        register int i;
        register int s;
        register int t;
        register int varCount;

        /*
        ** write out class and instance variable symbols for the
        ** class which was specified in initSymbols().
        */

        if ( !SymbolDBOpen )
        {
                if ( dbminit(SYMBOL_DB) != 0 )
                        fatal("writeSymbols: could not open symbol database\n");
                SymbolDBOpen = 1;
        }

        if ( strlen(Classname) >= MAX_NAME_LENGTH )
                fatal("writeSymbols: '%s' class name too long\n", Classname);

        /*
        ** note that we make sure to pad out the classname part
        ** of the symbol key ... this insures a consistent key
        ** since the key size is sizeof(SymbolKey), which includes
        ** the complete classname array.
        */

        SymbolKey.keyclass = 'C';
        strncpy(SymbolKey.classname, Classname, MAX_NAME_LENGTH);

        DbmKey.dptr = (char *) &SymbolKey;
        DbmKey.dsize = sizeof(SymbolKey);

        DbmData.dptr = (char *) &SymbolRec;

        strcpy(SymbolRec.fpt.classname, Classname);
```

```
	strcpy(SymbolRec.fpt.superclass_name, SuperClass);

	varCount = 0;
	s = 0;

	/*
	** we write out only the names of the variables defined in the class,
	** (i.e., excluding inherited variables).
	*/

	for ( i = 0; i < InstVarCount; i++ )
	{
		if ( !strcmp(InstVar[i].cname, Classname) )
		{
			t = s + strlen(InstVar[i].name) + 1;
			if ( t >= MAX_SYM_DB_STRINGS )
				fatal("writeSymbols: not enough room in symbol db record\
			strcpy(&SymbolRec.symbol_strings[s], InstVar[i].name);
			s = t;
			varCount++;
		}
	}

	for ( i = 0; i < ClassVarCount; i++ )
	{
		if ( !strcmp(ClassVar[i].cname, Classname) )
		{
			t = s + strlen(ClassVar[i].name) + 1;
			if ( t >= MAX_SYM_DB_STRINGS )
				fatal("writeSymbols: not enough room in symbol db record\
			strcpy(&SymbolRec.symbol_strings[s], ClassVar[i].name);
			s = t;
			varCount++;
		}
	}

	SymbolRec.fpt.no_named_vars = varCount;
	SymbolRec.fpt.size_strings = s;

	/*
	** must insure that size of dbm record is multiple of 4
	** (due to alignment problems ).
	*/

	DbmData.dsize = CEIL4(sizeof(SymbolRec.fpt) +
	  SymbolRec.fpt.size_strings);

	/*
	** write the record
	*/

	if ( store(DbmKey, DbmData) )
		fatal("writeSymbols: could not write to symbol database\n");

	return;
}

struct mark
markSymbols()
{
	struct mark mark;

	mark.classVarCount = ClassVarCount;
	mark.instVarCount = InstVarCount;
	mark.tempVarCount = TempVarCount;

	return ( mark );
}

releaseSymbols(mark)
	struct mark mark;
{
	ClassVarCount = mark.classVarCount;
	InstVarCount = mark.instVarCount;
	TempVarCount = mark.tempVarCount;

	return;
}

addSymbol(symbol, type, slot, block)
	register char *symbol;
	register int type;
	register int slot;
	register int block;
{
	struct ref ref;

	/*
	** according to specifications, names must be unique in the
	** superclass hierarchy for a particular class, hence, we check this.
	*/

	switch ( type )
	{
	case R_INSTANCE_VAR:
		ref = findSymbol(symbol);
		if ( ref.type != R_XREF )
			fatal("class %s: '%s' already declared in class %s\n",
			  Classname, symbol, ref.cname);
		InstVar[InstVarCount] = makeref(type, symbol, Classname, 0,
		  InstVarCount, 0);
		InstVarCount++;
		break;
	case R_CLASS_VAR:
		ref = findSymbol(symbol);
		if ( ref.type != R_XREF )
			fatal("class %s: '%s' already declared in class %s\n",
			  Classname, symbol, ref.cname);
		ClassVar[ClassVarCount] = makeref(type, symbol, Classname, 0,
		  InstVarCount + ClassVarCount - SuperClassVarCount, 0);
		ClassVarCount++;
		break;
	case R_METHOD_PARAM:
	case R_METHOD_TEMP:
		TempVar[TempVarCount] = makeref(type, symbol, 0, 0, slot, 0);
		TempVarCount++;
		break;
	case R_BLOCK_PARAM:
		TempVar[TempVarCount] = makeref(type, symbol, 0, 0, slot,
		  block);
		TempVarCount++;
		break;
	default:
		fatal("addSymbol: illegal symbol type (symbol='%s', type=%d)\n",
			symbol, type);
		break;
	}
```

```
	return;
}

struct ref
findSymbol(symbol)
	char *symbol;
{
	register int i;

	/*
	** scoping is as follows:
	**	1. temporary variables (block params, method temps & params)
	**	2. instance & class variables
	**	3. other global symbols (resolved by second phase)
	*/

	for ( i = TempVarCount - 1; i >= 0; i-- )
		if ( !strcmp(TempVar[i].name, symbol) )
			return ( TempVar[i] );

	for ( i = InstVarCount - 1; i >= 0; i-- )
		if ( !strcmp(InstVar[i].name, symbol) )
			return ( InstVar[i] );

	for ( i = ClassVarCount - 1; i >= 0; i-- )
		if ( !strcmp(ClassVar[i].name, symbol) )
			return ( ClassVar[i] );

	/*
	** unknown symbol ... assume will be resolved by second phase
	*/

	return ( makeref(R_XREF, symbol, 0, 0, 0, 0) );
}

superInstVarCount()
{
	return ( SuperInstVarCount );
}
```

```
/*Copyright 1988 Eastman Kodak Company.  All rights reserved.*/
#include <stdio.h>
#include "types.h"
#include "constants.h"
#include "oops_values.h"
#include "interp_const.h"
#include "interp_types.h"
#include "bytecodes.h"
#include "assign.h"
#include "obj_mgr.h"
#include "kaparse.h"
#include "kamisc.h"

#define MAX_BYTES               27500  /*be sure bytecode object does
                                        not exceed max object size,
                                        in constants.h*/
#define MAX_METHS               150     /*max methods, any class*/

#define reftype(p)       ( (p)->type )
#define refindex(p)      \
        (  ( (p)->type == N_TVAR || (p)->type == N_IVAR                    \
          || (p)->type == N_BVAR )  ? asciiToInt(&(p)->str[1]) :           \
           ( (p)->type == N_MTVAR ) ? asciiToInt(&(p)->str[2]) : -1 )

#define ittype(p)        \
        ( ( (p)->type == N_TVAR )                       ? 0x5   \
        : ( (p)->type == N_IVAR )                       ? 0x3   \
        : ( (p)->type == N_MTVAR )                      ? 0x2   \
        : ( (p)->type == N_XREF && (p)->right )         ? 0x4   \
        : ( (p)->type == N_BVAR && (p)->right )         ? 0x6   \
        : ( (p)->type == N_BVAR && !(p)->right )        ? 0x2   \
        :                                                 0x1 )

extern int isFloat();
extern int asciiToInt();
extern double asciiToFloat();
extern object *obj_mgr();
extern object *force_obj();
extern object *reserve_obj();
extern object *referenced();
extern dict_xref *getdictionary();
extern dict_xref *putdictionary();
extern struct labelref *nextLabelRef();
extern char *findLabel();
extern short *nextBlockRef();
extern oop buildConstant();
extern object *get_obj();

extern unsigned short CMNoTemps;
extern unsigned short CMNoParms;
extern unsigned short CMClassOop;
extern unsigned short CMSelectorSymbolOop;
extern unsigned short CMClassifier;
extern unsigned short CMMethType;
extern unsigned short CMOptData;

oop SuperOop;
oop ClassOop;
oop ClassSymbolOop;
char *SuperName;
char *ClassName;

int SourceLine = 1;

char SourceFile[1024];

int MethodCount;
int MethodType;
char MethodBytes[MAX_BYTES];
char *MethodBcp;
char *MethodSelector;
oop MethodSelectorOop;
struct pnode *MethodOptInfo;
struct pnode *MethodParamList;
struct pnode *MethodTempVarList;

struct dictionary Methods[MAX_METHS];
struct pnode *InstVarList;
struct pnode *ClassVarList;
int SuperInstVar;

beginClass(name, super, superInstVar, instVarList, classVarList)
        char *name;
        char *super;
        char *superInstVar;
        struct pnode *instVarList;
        struct pnode *classVarList;
{
        dict_xref *xref;

        /*
        ** check whether the class already exists ...
        ** create it if not already present.
        */

        xref = getdictionary(name, 0, 0);

        if ( xref == NULL )
        {
                ClassOop = oop_gen();
                xref = putdictionary(name, ClassOop, 0, 0);
                say("dictionary entry for global '%s' tied to oop %d\n",
                  name, xref->fp.object_oop);
        }
        else
        {
                ClassOop = xref->fp.object_oop;
        }

        ClassSymbolOop = xref->fp.symbol_oop;

        /*
        ** get superclass info ...
        */

        xref = getdictionary(super, 0, 0);

        if ( xref == NULL )
                fatal("superclass '%s' not found", super);

        SuperOop = xref->fp.object_oop;

        /*
        ** set per-class compilation info ...
        */

        MethodCount = 0;
        ClassName = name;
```

```
        SuperName = super;
        InstVarList = instVarList;
        ClassVarList = classVarList;
        SuperInstVar = asciiToInt(superInstVar);

        return;
}

endClass()
{
        struct pnode *p;
        object *classObj;
        object *prevClassObj;
        object *superClassObj;
        class_cntrl *classControl;
        struct dictionary *dict;
        long firstInst;
        int instVars;
        int classVars;
        int dictSize;
        int classObjSize;
        int bucket;
        int i;

        /*
        ** replace/install the class
        */

        /*
        ** get head of chain of instances from previous version of class,
        ** (if present), in order to transfer to new class.
        */

        prevClassObj = reserve_obj(ClassOop, 0, 0);

        if ( prevClassObj )
                firstInst = CLASS_CONTROL(prevClassObj)->cfp.first_inst;
        else
                firstInst = -1;

        /*
        ** determine size of class object, (in bytes).
        **
        ** class object size =
        **         size of class object header
        **       + size of instance variables
        **       + size of class variables
        **       + size of class dictionary, (power of 2)
        **
        ** for historical reasons, the size of the class object header
        ** includes two dictionary entries, and one index variable, which
        ** we subtract out in the actual size calculation.
        */

        for ( p = InstVarList, instVars = 0; p; p = p->right, instVars++ );
        instVars += SuperInstVar;

        for ( p = ClassVarList, classVars = 0; p; p = p->right, classVars++ );

        for ( dictSize = 1; dictSize < MethodCount; dictSize <<= 1 );

        classObjSize =
            sizeof(class_object) - 2 * sizeof(struct dictionary) - sizeof(oop)
          + instVars * sizeof(oop)
          + classVars * sizeof(oop)
          + dictSize * sizeof(struct dictionary);

        /*
        ** get space from the object manager in which to build the new class.
        */

        classObj =
                force_obj(ClassOop, ClassOop, SLOTS_FOR_BYTES(classObjSize),
          1, 0, 0);

        /*
        ** fill in the blanks ...
        */

        classObj->fp.length             = classObjSize;

        SET_NO_INDEX_VARS(ClassOop, classObj->fp.flags);

        /*The NO_INDEX_VARS flag is set either from testing for a
                specific class (the above code), or inherited from the
                super class;  the latter so that new subclasses of
                things like String, Symbol, while inherit this property */

        superClassObj = get_obj(SuperOop, 0, 0);
        if (superClassObj == NULL)
                fatal("superclass object  '%d' not found", SuperOop);
        classObj -> fp.flags |= superClassObj -> fp.flags & NO_INDEX_VARS;

        classObj->fp.flags              &= ~GARBAGE;

        classObj->fp.no_named_vars      = instVars;
        classObj->fp.no_indx_vars       = classVars;
        classObj->fp.class              = ClassOop;
        classObj->fp.id                 = ClassOop;
        classObj->fp.class_chain        = -1;

        for ( i = 0; i < instVars + classVars; i++ )
                INSTANCE_VARS(classObj)[i] = nIL;

        classControl = CLASS_CONTROL(classObj);

        classControl->cfp.no_nmed_inst  = instVars;
        classControl->cfp.no_dict       = dictSize;
        classControl->cfp.super_class   = SuperOop;
        classControl->cfp.first_inst    = firstInst;
        classControl->cfp.symbol_oop    = ClassSymbolOop;

        /*
        ** initialize the dictionary ...
        */

        dict = &(classControl->dictionary[0]);

        for ( i = 0; i < dictSize; i++ )
                dict[i].opers = dict[i].method_oop = -1;

        /*
        ** populate the dictionary (closed hashing) ...
        */

        for ( i = 0; i < MethodCount; i++ )
        {
                bucket = Methods[i].opers & ( dictSize - 1 );
```

```
        while ( dict[bucket].method_oop >= 0 )
                bucket = ( bucket + 1 ) % dictSize;
        dict[bucket] = Methods[i];
    }

    /*
    ** flush class to database
    */

    collector(0, 0);

    /*
    ** all done!
    */

    say("Class object %s (size %d) established at oop %d\n\n\n",
      ClassName, classObjSize, ClassOop);

    return;
}

static int firstMethod = 1;

beginMethod(type, selector, paramList, tempVarList, optInfo)
    int type;
    char *selector;
    struct pnode *paramList;
    struct pnode *tempVarList;
    struct pnode *optInfo;
{
    MethodBcp            = MethodBytes;
    MethodType           = type;
    MethodSelector       = selector;
    MethodParamList      = paramList;
    MethodTempVarList    = tempVarList;
    MethodOptInfo        = optInfo;

    clearLabel();
    clearLabelRef();
    clearBlockRef();

    return;
}

endMethod(sTemps, sBlocks)
    char *sTemps;
    char *sBlocks;
{
    object *methodObj;
    struct pnode *p;
    struct labelref *labelRef;
    int paramCount;
    int temps;
    int blocks;
    char *offset;
    short *block;
    short index;

    temps = asciiToInt(sTemps);
    blocks = asciiToInt(sBlocks);

    /*
    ** install selector
    */

    if ( ( MethodSelectorOop = getsymbol(MethodSelector, 0, 0) ) < 0 )
        MethodSelectorOop = putsymbol(MethodSelector, 0, 0);

    /*
    ** resolve label references (branches)
    */

    rewindLabelRef();

    while ( labelRef = nextLabelRef() )
    {
        if ( ( offset = findLabel(*labelRef->location) ) == NULL )
            fatal("could not find label for branch %d",
              (int) *labelRef->location);

        *labelRef->location = offset - labelRef->reladdr;
    }

    /*
    ** resolve block references, (we place slots for holding block
    ** stub ids in the method context temps after the area used for
    ** compiler scratch temporaries).
    */

    rewindBlockRef();

    while ( block = nextBlockRef() )
        *block += temps;

    /*
    ** create the compiled method, copy the bytecodes, and create
    ** a dictionary entry for it
    */

    if ( firstMethod )
    {
        initIndicies();
        firstMethod = 0;
    }

    methodObj = obj_mgr(CompiledMethod, NEW,
      SLOTS_FOR_BYTES(MethodBcp - MethodBytes), -1, 0, 0);

    for ( p = MethodParamList, paramCount = 1; p;
      p = p->right, paramCount++ );

    INSTANCE_VARS(methodObj)[CMNoTemps]            = temps + blocks;
    INSTANCE_VARS(methodObj)[CMNoParms]            = paramCount;
    INSTANCE_VARS(methodObj)[CMClassOop]           = ClassOop;
    INSTANCE_VARS(methodObj)[CMSelectorSymbolOop]  = MethodSelectorOop;
    INSTANCE_VARS(methodObj)[CMClassifier]         = nIL;
    INSTANCE_VARS(methodObj)[CMMethType]           =
      ( MethodOptInfo ) ? ( MethodOptInfo->type == N_MPRIM ) ?
      PRIM_METH : INST_METH : REG_METH ;
    INSTANCE_VARS(methodObj)[CMOptData]            =
      ( MethodOptInfo ) ? asciiToInt(MethodOptInfo->right->str) : 0 ;

    bcopy(MethodBytes, INDEXED_VARS(methodObj), MethodBcp - MethodBytes);

    Methods[MethodCount].msg_type   =
      ( MethodType == N_CMETH ) ? CLASS_MSG : INST_MSG ;
    Methods[MethodCount].opers      = MethodSelectorOop;
    Methods[MethodCount].method_oop = methodObj->fp.id;
```

```
	MethodCount++;

	/*
	** make sure the method gets flushed to the database when
	** the class is installed
	*/

	referenced(NULL, methodObj->fp.id, 0, 0, 0);

	/*
	** all done!
	*/

	say("Method obj (size %d)  for selctr %s estab at oop %d\n\n",
	  methodObj->fp.length, MethodSelector, methodObj->fp.id);

	return;
}

label(l)
	char *l;
{
	/*
	** record label
	*/

	saveLabel(asciiToInt(&l[1]), MethodBcp);
}

line(s)
	char *s;
{
	/*
	** set the current source line
	*/

	sscanf(s, "%*s %d", &SourceLine);
}

file(s)
	char *s;
{
	/*
	** set the current file name
	*/

	sscanf(s, "%*s %s", SourceFile);
}

genSend(rcvr, super, dest, args, selector, type)
	struct pnode *rcvr;
	char *super;
	struct pnode *dest;
	char *args;
	char *selector;
	int type;
{
	oop selectorOop;

	if ( reftype(rcvr) != N_TVAR || reftype(dest) != N_TVAR )
		fatal("genSend: receiver or destination not a temporary");

	if ( MethodBcp + SM_SIZE - MethodBytes >= MAX_BYTES )
		fatal("out of space for bytecodes");

	SM(MethodBcp)->bytecode                 = type;
	SM(MethodBcp)->super_flag               =
	  ( asciiToInt(super) != 0 ) ? ClassOop : 0 ;
	SM(MethodBcp)->hashed_selector          =
	  ( ( selectorOop = getsymbol(selector, 0, 0) ) >= 0 ) ?
	  selectorOop : putsymbol(selector, 0, 0) ;
	SM(MethodBcp)->likely_class             = -1;
	SM(MethodBcp)->likely_prim_or_bcode     = -1;
	SM(MethodBcp)->likely_meth_or_lslot     = -1;
	SM(MethodBcp)->num_args                 = asciiToInt(args);
	SM(MethodBcp)->arg_start_slot           = refindex(rcvr);
	SM(MethodBcp)->put_answ_slot            = refindex(dest);
	SM(MethodBcp)->linenum                  = SourceLine;

	MethodBcp += SM_SIZE;

	return;
}

genParamSend(rcvr, super, dest, args, selarg)
	struct pnode *rcvr;
	char *super;
	struct pnode *dest;
	char *args;
	struct pnode *selarg;
{
	oop selectorOop;

	if ( reftype(rcvr) != N_TVAR || reftype(dest) != N_TVAR
	  || reftype(selarg) != N_TVAR )
		fatal("genParamSend: receiver, destination, or selector argument not a te

	if ( MethodBcp + SPM_SIZE - MethodBytes >= MAX_BYTES )
		fatal("out of space for bytecodes");

	SPM(MethodBcp)->bytecode                = SEND_PARAM_MESSAGE;
	SPM(MethodBcp)->super_flag              =
	  ( asciiToInt(super) != 0 ) ? ClassOop : 0 ;
	SPM(MethodBcp)->selector_slot           = refindex(selarg);
	SPM(MethodBcp)->num_args                = asciiToInt(args);
	SPM(MethodBcp)->arg_start_slot          = refindex(rcvr);
	SPM(MethodBcp)->put_answ_slot           = refindex(dest);
	SPM(MethodBcp)->linenum                 = SourceLine;
	SPM(MethodBcp)->likely_class            = -1;
	SPM(MethodBcp)->likely_method           = -1;
	SPM(MethodBcp)->likely_selector         = -1;

	MethodBcp += SPM_SIZE;

	return;
}

genEvalBlock(rcvr, dest, args, opt)
	struct pnode *rcvr;
	struct pnode *dest;
	char *args;
	int opt;
{
	if ( reftype(rcvr) != N_TVAR || reftype(dest) != N_TVAR )
		fatal("genEvalBlock: receiver or destination not a temporary");

	if ( MethodBcp + EB_SIZE - MethodBytes >= MAX_BYTES )
```

```
        fatal("out of space for bytecodes");

    EB(MethodBcp)->bytecode            =
        ( opt ) ? EVALUATE_BLOCK_2 : EVALUATE_BLOCK ;
    EB(MethodBcp)->num_args            = asciiToInt(args);
    EB(MethodBcp)->arg_start_slot      = refIndex(rcvr);
    EB(MethodBcp)->put_answ_slot       = refIndex(dest);

    MethodBcp += EB_SIZE;

    return;
}

genMethodReturn(ref)
    struct pnode *ref;
{
    if ( reftype(ref) != N_TVAR )
        fatal("genMethodReturn: return value not a temporary");

    if ( MethodBcp + RET_SIZE - MethodBytes >= MAX_BYTES )
        fatal("out of space for bytecodes");

    RET(MethodBcp)->bytecode           = LONG_RETURN;
    RET(MethodBcp)->msg_ret_slot       = refIndex(ref);

    MethodBcp += RET_SIZE;

    return;
}

genBlockReturn(ref)
    struct pnode *ref;
{
    if ( reftype(ref) != N_TVAR )
        fatal("genBlockReturn: return value not a temporary");

    if ( MethodBcp + RET_SIZE - MethodBytes >= MAX_BYTES )
        fatal("out of space for bytecodes");

    RET(MethodBcp)->bytecode           = SHORT_RETURN;
    RET(MethodBcp)->msg_ret_slot       = refIndex(ref);

    MethodBcp += RET_SIZE;

    return;
}

genBranch(label)
    char *label;
{
    if ( MethodBcp + BR_SIZE - MethodBytes >= MAX_BYTES )
        fatal("out of space for bytecodes");

    BR(MethodBcp)->bytecode = BRANCH;
    BR(MethodBcp)->offset   = asciiToInt(&label[1]);

    /*
    ** record branch
    */

    saveLabelRef(&BR(MethodBcp)->offset, MethodBcp + BR_SIZE);

    MethodBcp += BR_SIZE;

    return;
}

genBranchNE(label, ref, val)
    char *label;
    struct pnode *ref;
    struct pnode *val;
{
    oop symbolOop;

    if ( reftype(ref) != N_TVAR || reftype(val) != N_XREF )
        fatal("genBranchNE: invalid operand(s)");

    if ( MethodBcp + CBR_SIZE - MethodBytes >= MAX_BYTES )
        fatal("out of space for bytecodes");

    CBR(MethodBcp)->bytecode           = BRANCH_ON_NOT_EQUAL;
    CBR(MethodBcp)->slot               = refIndex(ref);
    CBR(MethodBcp)->actual             = xrefOop(val);
    CBR(MethodBcp)->offset             = asciiToInt(&label[1]);

    /*
    ** record branch
    */

    saveLabelRef(&CBR(MethodBcp)->offset, MethodBcp + CBR_SIZE);

    MethodBcp += CBR_SIZE;

    return;
}

genBranchEQ(label, ref, val)
    char *label;
    struct pnode *ref;
    struct pnode *val;
{
    oop symbolOop;

    if ( reftype(ref) != N_TVAR || reftype(val) != N_XREF )
        fatal("genBranchEQ: invalid operand(s)");

    if ( MethodBcp + CBR_SIZE - MethodBytes >= MAX_BYTES )
        fatal("out of space for bytecodes");

    CBR(MethodBcp)->bytecode           = BRANCH_ON_EQUAL;
    CBR(MethodBcp)->slot               = refIndex(ref);
    CBR(MethodBcp)->actual             = xrefOop(val);
    CBR(MethodBcp)->offset             = asciiToInt(&label[1]);

    /*
    ** record branch
    */

    saveLabelRef(&CBR(MethodBcp)->offset, MethodBcp + CBR_SIZE);

    MethodBcp += CBR_SIZE;

    return;
}

genSetUpBlock(block, label, temps)
    struct pnode *block;
    char *label;
```

```
	char *temps;
{
	if ( MethodBcp + SUBC_SIZE - MethodBytes >= MAX_BYTES )
		fatal("out of space for bytecodes");

	SUBC(MethodBcp)->bytecode		= SET_UP_BLOCK_CONTEXT;
	SUBC(MethodBcp)->bytecode_offset	= asciiToInt(&label[1]);
	SUBC(MethodBcp)->blk_cntx_as_slot	= refIndex(block);
	SUBC(MethodBcp)->num_temps		= asciiToInt(temps);

	/*
	** record block reference and its label reference
	*/

	saveBlockRef(&SUBC(MethodBcp)->blk_cntx_as_slot);
	saveLabelRef(&SUBC(MethodBcp)->bytecode_offset, MethodBcp + SUBC_SIZE);

	MethodBcp += SUBC_SIZE;

	return;
}

genExecPrim(dest, num, argstart, args)
	struct pnode *dest;
	char *num;
	struct pnode *argstart;
	char *args;
{
	if ( reftype(dest) != N_TVAR || reftype(argstart) != N_TVAR )
		fatal("genExecPrim: destination or args not temporaries");

	if ( MethodBcp + EP_SIZE - MethodBytes >= MAX_BYTES )
		fatal("out of space for bytecodes");

	EP(MethodBcp)->bytecode		= asciiToInt(num);
	EP(MethodBcp)->num_args		= asciiToInt(args);
	EP(MethodBcp)->arg_start_slot	= refIndex(argstart);
	EP(MethodBcp)->put_answ_slot	= refIndex(dest);

	MethodBcp += EP_SIZE;

	return;
}

genAssign(dest, src)
	struct pnode *dest;
	struct pnode *src;
{
	oop srcOop;
	int assignSize;

	if ( MethodBcp + MAX_ASSIGN_SIZE - MethodBytes >= MAX_BYTES )
		fatal("out of space for bytecodes");

	A_GENERIC(MethodBcp)->bytecode =
	  ASSIGN_BCODE(ittype(dest), ittype(src));

	if ( ittype(src) == 0x01 )
		srcOop = buildConstant(src);

	/*
	** record block context references for block temporary
	** references, (type 0x6)
	*/

	switch ( A_GENERIC(MethodBcp)->bytecode & 0x00ff )
	{
	case 0x21:
		A21(MethodBcp)->d.methTempSlot	= refIndex(dest);
		A21(MethodBcp)->s.obj		= srcOop;
		assignSize = A21_SIZE;
		break;
	case 0x22:
		A22(MethodBcp)->d.methTempSlot	= refIndex(dest);
		A22(MethodBcp)->s.methTempSlot	= refIndex(src);
		if ( src->type == N_BVAR )
			saveBlockRef(&A22(MethodBcp)->s.methTempSlot);
		assignSize = A22_SIZE;
		break;
	case 0x23:
		A23(MethodBcp)->d.methTempSlot	= refIndex(dest);
		A23(MethodBcp)->s.objSlot	= refIndex(src);
		assignSize = A23_SIZE;
		break;
	case 0x24:
		A24(MethodBcp)->d.methTempSlot	= refIndex(dest);
		A24(MethodBcp)->s.obj		= xrefOop(src);
		A24(MethodBcp)->s.objSlot	= refIndex(src->right);
		assignSize = A24_SIZE;
		break;
	case 0x25:
		A25(MethodBcp)->d.methTempSlot	= refIndex(dest);
		A25(MethodBcp)->s.blkTempSlot	= refIndex(src);
		assignSize = A25_SIZE;
		break;
	case 0x26:
		A26(MethodBcp)->d.methTempSlot	= refIndex(dest);
		A26(MethodBcp)->s.blkContextSlot = refIndex(src);
		A26(MethodBcp)->s.blkTempSlot	= refIndex(src->right);
		assignSize = A26_SIZE;
		saveBlockRef(&A26(MethodBcp)->s.blkContextSlot);
		break;
	case 0x31:
		A31(MethodBcp)->d.objSlot	= refIndex(dest);
		A31(MethodBcp)->s.obj		= srcOop;
		assignSize = A31_SIZE;
		break;
	case 0x32:
		A32(MethodBcp)->d.objSlot	= refIndex(dest);
		A32(MethodBcp)->s.methTempSlot	= refIndex(src);
		if ( src->type == N_BVAR )
			saveBlockRef(&A32(MethodBcp)->s.methTempSlot);
		assignSize = A32_SIZE;
		break;
	case 0x33:
		A33(MethodBcp)->d.objSlot	= refIndex(dest);
		A33(MethodBcp)->s.objSlot	= refIndex(src);
		assignSize = A33_SIZE;
		break;
	case 0x34:
		A34(MethodBcp)->d.objSlot	= refIndex(dest);
		A34(MethodBcp)->s.obj		= xrefOop(src);
		A34(MethodBcp)->s.objSlot	= refIndex(src->right);
		assignSize = A34_SIZE;
		break;
	case 0x35:
		A35(MethodBcp)->d.objSlot	= refIndex(dest);
		A35(MethodBcp)->s.blkTempSlot	= refIndex(src);
```

```
        assignSize = A35_SIZE;
        break;
case 0x36:
        A36(MethodBcp)->d.objSlot          = refIndex(dest);
        A36(MethodBcp)->s.blkContextSlot  = refIndex(src);
        A36(MethodBcp)->s.blkTempSlot     = refIndex(src->right);
        assignSize = A36_SIZE;
        saveBlockRef(&A36(MethodBcp)->s.blkContextSlot);
        break;
case 0x41:
        A41(MethodBcp)->d.obj              = xrefOop(dest);
        A41(MethodBcp)->d.objSlot          = refIndex(dest->right);
        A41(MethodBcp)->s.obj              = srcOop;
        assignSize = A41_SIZE;
        break;
case 0x42:
        A42(MethodBcp)->d.obj              = xrefOop(dest);
        A42(MethodBcp)->d.objSlot          = refIndex(dest->right);
        A42(MethodBcp)->s.methTempSlot     = refIndex(src);
        if ( src->type == N_BVAR )
                saveBlockRef(&A42(MethodBcp)->s.methTempSlot);
        assignSize = A42_SIZE;
        break;
case 0x43:
        A43(MethodBcp)->d.obj              = xrefOop(dest);
        A43(MethodBcp)->d.objSlot          = refIndex(dest->right);
        A43(MethodBcp)->s.objSlot          = refIndex(src);
        assignSize = A43_SIZE;
        break;
case 0x44:
        A44(MethodBcp)->d.obj              = xrefOop(dest);
        A44(MethodBcp)->d.objSlot          = refIndex(dest->right);
        A44(MethodBcp)->s.obj              = xrefOop(src);
        A44(MethodBcp)->s.objSlot          = refIndex(src->right);
        assignSize = A44_SIZE;
        break;
case 0x45:
        A45(MethodBcp)->d.obj              = xrefOop(dest);
        A45(MethodBcp)->d.objSlot          = refIndex(dest->right);
        A45(MethodBcp)->s.blkTempSlot      = refIndex(src);
        assignSize = A45_SIZE;
        break;
case 0x46:
        A46(MethodBcp)->d.obj              = xrefOop(dest);
        A46(MethodBcp)->d.objSlot          = refIndex(dest->right);
        A46(MethodBcp)->s.blkContextSlot  = refIndex(src);
        A46(MethodBcp)->s.blkTempSlot = refIndex(src->right);
        assignSize = A46_SIZE;
        saveBlockRef(&A46(MethodBcp)->s.blkContextSlot);
        break;
case 0x51:
        A51(MethodBcp)->d.blkTempSlot      = refIndex(dest);
        A51(MethodBcp)->s.obj              = srcOop;
        assignSize = A51_SIZE;
        break;
case 0x52:
        A52(MethodBcp)->d.blkTempSlot      = refIndex(dest);
        A52(MethodBcp)->s.methTempSlot     = refIndex(src);
        if ( src->type == N_BVAR )
                saveBlockRef(&A52(MethodBcp)->s.methTempSlot);
        assignSize = A52_SIZE;
        break;
case 0x53:
        A53(MethodBcp)->d.blkTempSlot      = refIndex(dest);
        A53(MethodBcp)->s.objSlot          = refIndex(src);
        assignSize = A53_SIZE;
        break;
case 0x54:
        A54(MethodBcp)->d.blkTempSlot      = refIndex(dest);
        A54(MethodBcp)->s.obj              = xrefOop(src);
        A54(MethodBcp)->s.objSlot          = refIndex(src->right);
        assignSize = A54_SIZE;
        break;
case 0x55:
        A55(MethodBcp)->d.blkTempSlot      = refIndex(dest);
        A55(MethodBcp)->s.blkTempSlot      = refIndex(src);
        assignSize = A55_SIZE;
        break;
case 0x56:
        A56(MethodBcp)->d.blkTempSlot      = refIndex(dest);
        A56(MethodBcp)->s.blkContextSlot  = refIndex(src);
        A56(MethodBcp)->s.blkTempSlot      = refIndex(src->right);
        assignSize = A56_SIZE;
        saveBlockRef(&A56(MethodBcp)->s.blkContextSlot);
        break;
default:
        fatal("genAssign: invalid assign bytecode (%#x)",
          A_GENERIC(MethodBcp)->bytecode);
}

MethodBcp += assignSize;

return;
```

```
/*Copyright 1988 Eastman Kodak Company.  All rights reserved.*/
/*
** constant instantiation
*/

#include <stdio.h>
#include "types.h"
#include "constants.h"
#include "oops_values.h"
#include "kaparse.h"

extern object *obj_mgr();
extern double asciiToFloat();

extern unsigned short StringSizeIndex;

oop
buildConstant(n)
        struct pnode *n;
{
        struct pnode *p;
        object *obj;
        oop constOop;
        int size;
        int value;
        int i;

        switch ( n->type )
        {
        case N_SYMBOL:
                constOop = getsymbol(n->str, 0, 0);

                if ( constOop < 0 )
                {
                        constOop = putsymbol(n->str, 0, 0);
                        say("Symbol constant '%s' established at oop %d\n",
                          n->str, constOop);
                }

                break;

        case N_XREF:
                constOop = xrefOop(n);

                break;

        case N_STRING:
                size = strlen(n->str);

                obj = obj_mgr(String, NEW, SLOTS_FOR_BYTES(size+1), -1, 0, 0);

                bcopy(n->str, BYTEARRAY_DATA(obj), size);
                INSTANCE_VARS(obj)[StringSizeIndex] = INTEGER_OBJECT(size);
                BYTEARRAY_DATA(obj)[size] = '\0';       /* c-string compat */

                obj->fp.flags = ( obj->fp.flags | PERM_OBJ ) & ~GARBAGE;

                constOop = obj->fp.id;

                say("String constant '%s' established at oop %d\n",
                  n->str, constOop);

                break;

        case N_NUMBER:
                if ( isFloat(n->str) )
                {
                        obj = obj_mgr(Float, NEW, sizeof(double)/sizeof(oop),
                          -1, 0, 0);

                        *((double *) INDEXED_VARS(obj)) = asciiToFloat(n->str);

                        obj->fp.flags = ( obj->fp.flags | PERM_OBJ ) & ~GARBAGE;

                        constOop = obj->fp.id;

                        say("Float constant %e established at oop %d\n",
                          *((double *) INDEXED_VARS(obj)), constOop);
                }
                else if ( ( value = asciiToInt(n->str) ) < 0 )
                {
                        obj = obj_mgr(Integer, NEW, sizeof(int)/sizeof(oop),
                          -1, 0, 0);

                        *((int *) INDEXED_VARS(obj)) = value;

                        obj->fp.flags = ( obj->fp.flags | PERM_OBJ ) & ~GARBAGE;

                        constOop = obj->fp.id;

                        say("Integer constant %d established at oop %d\n",
                          *((int *) INDEXED_VARS(obj)), constOop);
                }
                else
                {

                        constOop = INTEGER_OBJECT(value);
                }

                break;

        case N_CHAR:
                constOop = n->str[0];

                say("Char constant $%c established at oop %d\n",
                  (char) constOop, constOop);

                break;

        case N_ARRAY:
                /*
                ** count up the number of elements at this level, allocate an
                ** instance to hold them, and recursively build the elements.
                */

                for ( p = n, size = 0; p && p->left; p = p->right, size++ );

                obj = obj_mgr(Array, NEW, size, -1, 0, 0);

                for ( p = n, i = 0; p && p->left; p = p->right, i++ )
                        INDEXED_VARS(obj)[i] = buildConstant(p->left);

                obj->fp.flags = ( obj->fp.flags | PERM_OBJ ) & ~GARBAGE;

                constOop = obj->fp.id;

                say("Array constant with %d elements established at oop %d\n",
                  size, constOop);
```

```
        break;

    default:
        fatal("buildConstant: expected constant node, (got %d)",
          n->type);

        break;
    }

    return ( constOop );
}
```

```
 /*Copyright 1988 Eastman Kodak Company.  All rights reserved.*/
 /*Copyright 1988 Eastman Kodak Company.  All rights reserved.*/
#include <stdio.h>
#include "types.h"
#include "constants.h"
#include "interp_const.h"
#include "interp_types.h"

extern char *optarg;
extern int optind;

/*
** someone in the object manager needs the Cur_process reference satisfied ...
*/

struct process *Cur_process = NULL;

int Tokens = 0;

#ifdef YYDEBUG
extern int yydebug;
#endif

int linenum;
char *progname;
char *filename;
FILE *fp;

main(ac, av)
        int ac;
        char **av;
{
        char **files;
        int optchar;
        int badopt;

        progname = *av;

        /*
        ** process command line arguments
        */

        badopt = 0;

        while ( ( optchar = getopt(ac, av, "ty") ) != EOF )
        {
                switch ( optchar )
                {
                case 't': Tokens++;     break;
#ifdef YYDEBUG
                case 'y': yydebug++;    break;
#endif
                case '?': badopt++;     break;
                }
        }

        if ( badopt )
        {
                fatal("usage: %s [ filename ... ]", av[0]);
                exit(1);
        }

        /*
        ** initialize
        */

        init_om();

        /*
        ** assemble the files
        */

        if ( av[optind] == NULL )
        {
                filename = "stdin";

                fp = stdin;

                linenum = 1;

                yyparse();
        }
        else
        {
                for ( files = &av[optind]; *files; files++ )
                {
                        filename = *files;

                        fp = fopen(filename, "r");

                        if (fp == NULL)
                                fatal("cannot open '%s'", filename);

                        linenum = 1;

                        yyparse();

                        fclose(fp);
                }
        }

        exit(0);
}
```

```
/*Copyright 1988 Eastman Kodak Company.  All rights reserved.*/
/*
** miscellaneous support routines
*/

#include <stdio.h>
#include <string.h>
#include <ctype.h>
#include "types.h"
#include "constants.h"
#include "oops_values.h"
#include "obj_mgr.h"
#include "kaparse.h"
#include "kamisc.h"

/*
** parse node support
*/

struct pnode *
makenode(type, op, left, right)
	int type;
	char *op;
	struct pnode *left;
	struct pnode *right;
{
	struct pnode *pn;

	pn = (struct pnode *) malloc(sizeof(struct pnode));

	if (pn == NULL)
		fatal("makenode: out of memory");

	pn->type = type;
	pn->str = op;
	pn->right = right;
	pn->left = left;

	return(pn);
}

struct pnode *
changetype(pn, newtype)
	struct pnode *pn;
	int newtype;
{
	pn->type = newtype;

	return(pn);
}

/*
** support routines for label and label reference resolution
*/

static struct label Label[MAX_LABELS];
static int LabelCount;

saveLabel(label, offset)
	int label;
	char *offset;
{
	if ( LabelCount >= MAX_LABELS )
		fatal("too many labels ... goodbye!");

	Label[LabelCount].label = label;
	Label[LabelCount].offset = offset;

	LabelCount++;

	return ( LabelCount );
}

char *
findLabel(label)
	int label;
{
	int i;

	for ( i = 0; i < LabelCount; i++ )
		if ( Label[i].label == label )
			return ( Label[i].offset );

	return ( NULL );
}

clearLabel()
{
	LabelCount = 0;
}

static struct labelref LabelRef[MAX_BRANCHES];
static int LabelRefCount;
static int LabelRefIndex;

saveLabelRef(location, reladdr)
	short *location;
	char *reladdr;
{
	if ( LabelRefCount >= MAX_BRANCHES )
		fatal("too many branches ... goodbye!");

	LabelRef[LabelRefCount].location = location;
	LabelRef[LabelRefCount].reladdr = reladdr;

	LabelRefCount++;

	return ( LabelRefCount );
}

struct labelref *
nextLabelRef()
{
	if ( LabelRefIndex >= LabelRefCount )
		return ( NULL );

	return ( &LabelRef[LabelRefIndex++] );
}

rewindLabelRef()
{
	LabelRefIndex = 0;
}

clearLabelRef()
{
	LabelRefCount = 0;
```

```
}

/*
** support routines for block reference resolution
*/

#define MAX_BLOCKREF            300

static short *BlockRef[MAX_BLOCKREF];
static int BlockRefCount;
static int BlockRefIndex;

saveBlockRef(location)
        short *location;
{
        if ( BlockRefCount >= MAX_BLOCKREF )
                fatal("too many block references ... goodbye!");

        BlockRef[BlockRefCount] = location;

        BlockRefCount++;

        return ( BlockRefCount );
}

short *
nextBlockRef()
{
        if ( BlockRefIndex >= BlockRefCount )
                return ( NULL );

        return ( BlockRef[BlockRefIndex++] );
}

rewindBlockRef()
{
        BlockRefIndex = 0;
}

clearBlockRef()
{
        BlockRefCount = 0;
}


/*
** we make compiled methods ... so we need to know what they look like!
*/

unsigned short CMNoTemps;
unsigned short CMNoParms;
unsigned short CMClassOop;
unsigned short CMSelectorSymbolOop;
unsigned short CMClassifier;
unsigned short CMMethType;
unsigned short CMOptData;

unsigned short StringSizeIndex;

initIndicies()
{
        CMNoTemps               = name_to_slot_err(CompiledMethod, "noTemps");
        CMNoParms               = name_to_slot_err(CompiledMethod, "noParms");
        CMClassOop              = name_to_slot_err(CompiledMethod, "classOop");
        CMSelectorSymbolOop     = name_to_slot_err(CompiledMethod, "selectorSymbolOop");
        CMClassifier            = name_to_slot_err(CompiledMethod, "classifier");
        CMMethType              = name_to_slot_err(CompiledMethod, "methType");
        CMOptData               = name_to_slot_err(CompiledMethod, "optData");

        StringSizeIndex         = name_to_slot_err(String, "size");

        return;
}

/*
** we occasionally need to find the cross reference oop of a symbol
** given its name.
**
** if the symbol is not found and the symbol starts with an upper case
** letter, we create a new entry for it in the dictionary.
**
** if the symbol is not found and the symbol starts with an lower case
** letter, we flag it as an error.
*/

extern dict_xref *getdictionary();
extern dict_xref *putdictionary();

oop
xrefOop(p)
        struct pnode *p;
{
        dict_xref *xref;

        if ( p->type != N_XREF )
                fatal("xrefOop: expected xref node, (got %d)", p->type);

        xref = getdictionary(p->str, 0, 0);

        if ( xref == NULL )
                if ( isupper(p->str[0]) )
                        xref = putdictionary(p->str, oop_gen(), 0, 0);
                else
                        fatal("xrefOop: '%s' not a valid shared variable name",
                          p->str);

        return ( xref->fp.object_oop );
}


/*
** a single place for output ...
*/

say(s, a, b, c, d, e, f, g, h)
        char *s;
{
        printf(s, a, b, c, d, e, f, g, h);
}
```

================================================================ assign_bcode.c
bld_dummy_bcode.c
bld_dummy_cntx.c
blk_obj_to_cntx.c
blk_value_prim.c
branch_bcode.c
branch_eq_bcode.c
branch_neq_bcode.c
createProcess.c
destroyProcess.c
eval_blk_bcode.c
exec_bcodes.c
exec_prim_bcode.c
find_blk_cntx.c
find_process.c
get_init_vals.c
get_proc_id.c
init_blk_stub_stack.c
init_cntx.c
init_cntx_stack.c
initializeIndicies.c
initializeOops.c
interp.c
meas.c
meas2.c
next_blk_stub.c
no_such_prim.c
objectify.c
primTable.c
proc_copy_cntx1.c
proc_copy_cntx2.c
process.c
ret_bcode.c
sampler.c
send_msg_bcode.c
send_opt_bcode.c
send_param_msg_bcode.c
setup_blk_bcode.c
stub_to_cntx.c
syserr.c

```
/*Copyright 1988 Eastman Kodak Company.  All rights reserved.*/
/*
** assign bytecodes
*/

case 0x121:
{
#if SAMPLER
/****************/
Sampler_vals[0].cur_value = 0x121;
/****************/
#endif

        METHOD_TEMPS(cur_cntx)[A21(bcp)->d.methTempSlot] = A21(bcp)->s.obj;
        /* TCOV-BCODE * ASSIGN F21 */

        bcp += A21_SIZE;

#if SAMPLER
/****************/
Sampler_vals[0].cur_value = 0;
/****************/
#endif
}

break;

case 0x122:
{
#if SAMPLER
/****************/
Sampler_vals[0].cur_value = 0x122;
/****************/
#endif

        METHOD_TEMPS(cur_cntx)[A22(bcp)->d.methTempSlot] =
          METHOD_TEMPS(cur_cntx)[A22(bcp)->s.methTempSlot];
        /* TCOV-BCODE * ASSIGN F22 */

        bcp += A22_SIZE;

#if SAMPLER
/****************/
Sampler_vals[0].cur_value = 0;
/****************/
#endif
}

break;

case 0x123:
{
        register oop srcOop;
#if SAMPLER
/****************/
Sampler_vals[0].cur_value = 0x123;
/****************/
#endif

        srcOop = INSTANCE_VARS(RECEIVER)[A23(bcp)->s.objSlot];
        /* TCOV-BCODE * ASSIGN F23 */
        METHOD_TEMPS(cur_cntx)[A23(bcp)->d.methTempSlot] = srcOop;

        if (srcOop >= First_new_obj)
                change_region(srcOop, CUR_PID, OWN_GC_REGION);

        bcp += A23_SIZE;

#if SAMPLER
/****************/
Sampler_vals[0].cur_value = 0;
/****************/
#endif
}

break;

case 0x124:
{
        register oop srcOop;
        register object *srcObj;

#if SAMPLER
/****************/
Sampler_vals[0].cur_value = 0x124;
/****************/
#endif

        srcObj = get_obj(A24(bcp)->s.obj, CUR_GC_REGION, CUR_PID);
        /* TCOV-BCODE * ASSIGN F24 */

        srcOop = INSTANCE_VARS(srcObj)[A24(bcp)->s.objSlot];
        METHOD_TEMPS(cur_cntx)[A24(bcp)->d.methTempSlot] = srcOop;

        if (srcOop >= First_new_obj)
                change_region(srcOop, CUR_PID, OWN_GC_REGION);

        bcp += A24_SIZE;

#if SAMPLER
/****************/
Sampler_vals[0].cur_value = 0;
/****************/
#endif
}

break;

case 0x125:
{
        register oop srcOop;

#if SAMPLER
/****************/
Sampler_vals[0].cur_value = 0x125;
/****************/
#endif

        srcOop = CONTEXT_TEMPS(cur_cntx)[A25(bcp)->s.blkTempSlot];
        /* TCOV-BCODE * ASSIGN F25 */
        METHOD TEMPS(cur_cntx)[A25(bcp)->d.methTempSlot] = srcOop;

        if (srcOop >= First_new_obj)
                change_region(srcOop, CUR_PID, OWN_GC_REGION);

        bcp += A25_SIZE;
```

```
#if SAMPLER
/****************/
Sampler_vals[0].cur_value = 0;
/****************/
#endif
}

break;

case 0x126:
{
        register oop srcOop;
        register cntx   *srcCntx;
        register oop    blk_id;

#if SAMPLER
/****************/
Sampler_vals[0].cur_value = 0x126;
/****************/
#endif

        blk_id = METHOD_TEMPS(cur_cntx)[A26(bcp)->s.blkContextSlot];
        /* TCOV-BCODE * ASSIGN F26 */

        if ( IS_STUB (blk_id) )
        {
                srcCntx =
                    ( FIND_BLK_STUB(blk_id, Cur_process) )->vp.active_cntx;
        }
        else
        {
                srcCntx = find_blk_cntx ( blk_id, cur_cntx->prev );
                if ( srcCntx == NULL )
                        syserr ( "assign_bcode:01--Can't find outer block context for typ
        }
        /* end if */

        srcOop = CONTEXT_TEMPS(srcCntx)[A26(bcp)->s.blkTempSlot];
        METHOD_TEMPS(cur_cntx)[A26(bcp)->d.methTempSlot] = srcOop;

        if (srcOop >= First_new_obj)
                change_region(srcOop, CUR_PID, OWN_GC_REGION);

        bcp += A26_SIZE;

#if SAMPLER
/****************/
Sampler_vals[0].cur_value = 0;
/****************/
#endif
}

break;

case 0x131:
{
#if SAMPLER
/****************/
Sampler_vals[0].cur_value = 0x131;
/****************/
#endif

        INSTANCE_VARS(RECEIVER)[A31(bcp)->d.objSlot] = A31(bcp)->s.obj;
        /* TCOV-BCODE * ASSIGN F31 */

        UPDATE(RECEIVER);

        bcp += A31_SIZE;

#if SAMPLER
/****************/
Sampler_vals[0].cur_value = 0;
/****************/
#endif
}

break;

case 0x132:
{
        register oop oldOop;
        register oop srcOop;

#if SAMPLER
/****************/
Sampler_vals[0].cur_value = 0x132;
/****************/
#endif

        srcOop = METHOD_TEMPS(cur_cntx)[A32(bcp)->s.methTempSlot];
        /* TCOV-BCODE * ASSIGN F32 */

        if ( IS_STUB (srcOop) )
                srcOop = ( objectify_block(srcOop) )->fp.id;

        oldOop = INSTANCE_VARS(RECEIVER)[A32(bcp)->d.objSlot];

        INSTANCE_VARS(RECEIVER)[A32(bcp)->d.objSlot] = srcOop;

        UPDATE(RECEIVER);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(RECEIVER, srcOop, oldOop, CUR_GC_REGION, CUR_PID);

        bcp += A32_SIZE;

#if SAMPLER
/****************/
Sampler_vals[0].cur_value = 0;
/****************/
#endif
}

break;

case 0x133:
{
        register oop oldOop;
        register oop srcOop;
```

```
#if SAMPLER
/****************/
Sampler_vals[0].cur_value = 0x133;
/****************/
#endif

        srcOop = INSTANCE_VARS(RECEIVER)[A33(bcp)->s.objSlot];
        /* TCOV-BCODE * ASSIGN F33 */

        oldOop = INSTANCE_VARS(RECEIVER)[A33(bcp)->d.objSlot];

        INSTANCE_VARS(RECEIVER)[A33(bcp)->d.objSlot] = srcOop;

        UPDATE(RECEIVER);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(RECEIVER, srcOop, oldOop, CUR_GC_REGION, CUR_PID);

        bcp += A33_SIZE;

#if SAMPLER
/****************/
Sampler_vals[0].cur_value = 0;
/****************/
#endif
}

break;

case 0x134:
{
        register object *srcObj;
        register oop oldOop;
        register oop srcOop;


#if SAMPLER
/****************/
Sampler_vals[0].cur_value = 0x134;
/****************/
#endif

        srcObj = get_obj(A34(bcp)->s.obj,   CUR_GC_REGION, CUR_PID);
        /* TCOV-BCODE * ASSIGN F34 */

        srcOop = INSTANCE_VARS(srcObj)[A34(bcp)->s.objSlot];

        oldOop = INSTANCE_VARS(RECEIVER)[A34(bcp)->d.objSlot];

        INSTANCE_VARS(RECEIVER)[A34(bcp)->d.objSlot] = srcOop;

        UPDATE(RECEIVER);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(RECEIVER, srcOop, oldOop, CUR_GC_REGION, CUR_PID);

        bcp += A34_SIZE;

#if SAMPLER
/****************/
Sampler_vals[0].cur_value = 0;
/****************/
#endif
}

break;

case 0x135:
{
        register oop oldOop;
        register oop srcOop;

#if SAMPLER
/****************/
Sampler_vals[0].cur_value = 0x135;
/****************/
#endif

        srcOop = CONTEXT_TEMPS(cur_cntx)[A35(bcp)->s.blkTempSlot];
        /* TCOV-BCODE * ASSIGN F35 */

        if ( IS_STUB (srcOop) )
                srcOop = ( objectify_block(srcOop) )->fp.id;

        oldOop = INSTANCE_VARS(RECEIVER)[A35(bcp)->d.objSlot];

        INSTANCE_VARS(RECEIVER)[A35(bcp)->d.objSlot] = srcOop;

        UPDATE(RECEIVER);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(RECEIVER, srcOop, oldOop, CUR_GC_REGION, CUR_PID);

        bcp += A35_SIZE;

#if SAMPLER
/****************/
Sampler_vals[0].cur_value = 0;
/****************/
#endif
}

break;
```

```
case 0x136:
{
        register oop    oldOop;
        register oop    srcOop;
        register cntx   *srcCntx;
        register oop    blk_id;

#if SAMPLER
/****************/
Sampler_vals[0].cur_value = 0x136;
/****************/
#endif

        blk_id = METHOD_TEMPS(cur_cntx)[A36(bcp)->s.blkContextSlot];
        /* TCOV-BCODE * ASSIGN F36 */

        if ( IS_STUB (blk_id) )
        {
                srcCntx =
                    ( FIND_BLK_STUB(blk_id, Cur_process) )->vp.active_cntx;
        }
        else
        {
                srcCntx = find_blk_cntx ( blk_id, cur_cntx->prev );
                if ( srcCntx == NULL )
                        syserr ( "assign_bcode:01--Can't find outer block context for typ
        }
        /* end if */

        srcOop = CONTEXT_TEMPS(srcCntx)[A36(bcp)->s.blkTempSlot];

        if ( IS_STUB (srcOop) )
                srcOop = ( objectify_block(srcOop) )->fp.id;

        oldOop = INSTANCE_VARS(RECEIVER)[A36(bcp)->d.objSlot];

        INSTANCE_VARS(RECEIVER)[A36(bcp)->d.objSlot] =
          CONTEXT_TEMPS(srcCntx)[A36(bcp)->s.blkTempSlot];

        UPDATE(RECEIVER);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(RECEIVER, srcOop, oldOop, CUR_GC_REGION, CUR_PID);

        bcp += A36_SIZE;
#if SAMPLER
/****************/
Sampler_vals[0].cur_value = 0;
/****************/
#endif
}

break;

case 0x141:
{
        register oop oldOop;
        register oop srcOop;
        register object *destObj;

#if SAMPLER
/****************/
Sampler_vals[0].cur_value = 0x141;
/****************/
#endif

        destObj = reserve_obj(A41(bcp)->d.obj, CUR_GC_REGION, CUR_PID);
        /* TCOV-BCODE * ASSIGN F41 */

        srcOop = A41(bcp)->s.obj;
        oldOop = INSTANCE_VARS(destObj)[A41(bcp)->d.objSlot];

        INSTANCE_VARS(destObj)[A41(bcp)->d.objSlot] = srcOop;

        UPDATE(destObj);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(destObj, srcOop, oldOop, CUR_GC_REGION, CUR_PID);

        bcp += A41_SIZE;
#if SAMPLER
/****************/
Sampler_vals[0].cur_value = 0;
/****************/
#endif
}

break;

case 0x142:
{
        register oop oldOop;
        register oop srcOop;
        register object *destObj;

#if SAMPLER
/****************/
Sampler_vals[0].cur_value = 0x142;
/****************/
#endif

        destObj = reserve_obj(A42(bcp)->d.obj, CUR_GC_REGION, CUR_PID);
        /* TCOV-BCODE * ASSIGN F42 */

        srcOop = METHOD_TEMPS(cur_cntx)[A42(bcp)->s.methTempSlot];

        if ( IS_STUB (srcOop) )
                srcOop = ( objectify_block(srcOop) )->fp.id;

        oldOop = INSTANCE_VARS(destObj)[A42(bcp)->d.objSlot];
```

```
        INSTANCE_VARS(destObj)[A42(bcp)->d.objSlot] = srcOop;

        UPDATE(destObj);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(destObj, srcOop, oldOop, CUR_GC_REGION, CUR_PID);

        bcp += A42_SIZE;

#if SAMPLER
/****************/
Sampler_vals[0].cur_value = 0;
/****************/
#endif
}

break;

case 0x143:
{
        register oop oldOop;
        register oop srcOop;
        register object *destObj;

#if SAMPLER
/****************/
Sampler_vals[0].cur_value = 0x143;
/****************/
#endif

        destObj = reserve_obj(A43(bcp)->d.obj, CUR_GC_REGION, CUR_PID);
        /* TCOV-BCODE * ASSIGN F43 */

        srcOop = INSTANCE_VARS(RECEIVER)[A43(bcp)->s.objSlot];
        oldOop = INSTANCE_VARS(destObj)[A43(bcp)->d.objSlot];

        INSTANCE_VARS(destObj)[A43(bcp)->d.objSlot] = srcOop;

        UPDATE(destObj);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(destObj, srcOop, oldOop, CUR_GC_REGION, CUR_PID);

        bcp += A43_SIZE;

#if SAMPLER
/****************/
Sampler_vals[0].cur_value = 0;
/****************/
#endif
}

break;

case 0x144:
{
        register oop oldOop;
        register oop srcOop;
        register object *destObj;
        register object *srcObj;

#if SAMPLER
/****************/
Sampler_vals[0].cur_value = 0x144;
/****************/
#endif

        destObj = reserve_obj(A44(bcp)->d.obj, CUR_GC_REGION, CUR_PID);
        /* TCOV-BCODE * ASSIGN F44 */

        srcObj = get_obj(A44(bcp)->s.obj, CUR_GC_REGION, CUR_PID);

        srcOop = INSTANCE_VARS(srcObj)[A44(bcp)->s.objSlot];
        oldOop = INSTANCE_VARS(destObj)[A44(bcp)->d.objSlot];

        INSTANCE_VARS(destObj)[A44(bcp)->d.objSlot] = srcOop;

        UPDATE(destObj);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(destObj, srcOop, oldOop, CUR_GC_REGION, CUR_PID);

        bcp += A44_SIZE;

#if SAMPLER
/****************/
Sampler_vals[0].cur_value = 0;
/****************/
#endif
}

break;

case 0x145:
{
        register oop oldOop;
        register oop srcOop;
        register object *destObj;

#if SAMPLER
/****************/
Sampler_vals[0].cur_value = 0x145;
/****************/
```

```
#endif

        destObj = reserve_obj(A45(bcp)->d.obj, CUR_GC_REGION, CUR_PID);
        /* TCOV-BCODE * ASSIGN F45 */

        srcOop = CONTEXT_TEMPS(cur_cntx)[A45(bcp)->s.blkTempSlot];

        if ( IS_STUB (srcOop) )
                srcOop = ( objectify_block(srcOop) )->fp.id;

        oldOop = INSTANCE_VARS(destObj)[A45(bcp)->d.objSlot];

        INSTANCE_VARS(destObj)[A45(bcp)->d.objSlot] = srcOop;

        UPDATE(destObj);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(destObj, srcOop, oldOop, CUR_GC_REGION, CUR_PID);

        bcp += A45_SIZE;

#if SAMPLER
/****************/
Sampler_vals[0].cur_value = 0;
/****************/
#endif
}

break;

case 0x146:
{
        register oop    oldOop;
        register oop    srcOop;
        register object *destObj;
        register cntx   *srcCntx;
        register oop    blk_id;

#if SAMPLER
/****************/
Sampler_vals[0].cur_value = 0x146;
/****************/
#endif

        destObj = reserve_obj(A46(bcp)->d.obj, CUR_GC_REGION, CUR_PID);
        /* TCOV-BCODE * ASSIGN F46 */

        blk_id = METHOD_TEMPS(cur_cntx)[A46(bcp)->s.blkContextSlot];

        if ( IS_STUB (blk_id) )
        {
                srcCntx =
                    ( FIND_BLK_STUB(blk_id, Cur_process) )->vp.active_cntx;
        }
        else
        {
                srcCntx = find_blk_cntx ( blk_id, cur_cntx->prev );
                if ( srcCntx == NULL )
                        syserr ( "assign_bcode:01--Can't find outer block context for typ
        }
        /* end if */

        srcOop = CONTEXT_TEMPS(srcCntx)[A46(bcp)->s.blkTempSlot];

        if ( IS_STUB (srcOop) )
                srcOop = ( objectify_block(srcOop) )->fp.id;

        oldOop = INSTANCE_VARS(destObj)[A46(bcp)->d.objSlot];

        INSTANCE_VARS(destObj)[A46(bcp)->d.objSlot] = srcOop;

        UPDATE(destObj);

        /*
        ** if the source of the assignment is a new object, it should
        ** be considered referenced so the object manager can check to
        ** see if it should be written to the database.  the previous
        ** oop in the destination may also need to be 'counted down',
        ** which referenced() will handle.
        */

        if ( srcOop >= First_new_obj || oldOop >= First_new_obj )
                referenced(destObj, srcOop, oldOop, CUR_GC_REGION, CUR_PID);

        bcp += A46_SIZE;

#if SAMPLER
/****************/
Sampler_vals[0].cur_value = 0;
/****************/
#endif
}

break;

case 0x151:
{
#if SAMPLER
/****************/
Sampler_vals[0].cur_value = 0x151;
/****************/
#endif

        CONTEXT_TEMPS(cur_cntx)[A51(bcp)->d.blkTempSlot] = A51(bcp)->s.obj;
        /* TCOV-BCODE * ASSIGN F51 */

        bcp += A51_SIZE;
#if SAMPLER
/****************/
Sampler_vals[0].cur_value = 0;
/****************/
#endif

}

break;

case 0x152:
{
#if SAMPLER
```

```
/****************/
Sampler_vals[0].cur_value = 0x152;
/****************/
#endif

        CONTEXT_TEMPS(cur_cntx)[A52(bcp)->d.blkTempSlot] =
          METHOD_TEMPS(cur_cntx)[A52(bcp)->s.methTempSlot];
        /* TCOV-BCODE * ASSIGN F52 */

        bcp += A52_SIZE;

#if SAMPLER
/****************/
Sampler_vals[0].cur_value = 0;
/****************/
#endif
}

break;

case 0x153:
{
#if SAMPLER
/****************/
Sampler_vals[0].cur_value = 0x153;
/****************/
#endif

        CONTEXT_TEMPS(cur_cntx)[A53(bcp)->d.blkTempSlot] =
          INSTANCE_VARS(RECEIVER)[A53(bcp)->s.objSlot];
        /* TCOV-BCODE * ASSIGN F53 */

        bcp += A53_SIZE;
#if SAMPLER
/****************/
Sampler_vals[0].cur_value = 0;
/****************/
#endif

}

break;

case 0x154:

a54:

{
        register object *srcObj;

#if SAMPLER
/****************/
Sampler_vals[0].cur_value = 0x154;
/****************/
#endif

        srcObj = get_obj(A54(bcp)->s.obj, CUR_GC_REGION, CUR_PID);
        /* TCOV-BCODE * ASSIGN F54 */

        CONTEXT_TEMPS(cur_cntx)[A54(bcp)->d.blkTempSlot] =
          INSTANCE_VARS(srcObj)[A54(bcp)->s.objSlot];

        bcp += A54_SIZE;

#if SAMPLER
/****************/
Sampler_vals[0].cur_value = 0;
/****************/
#endif
}

break;

case 0x155:
{
#if SAMPLER
/****************/
Sampler_vals[0].cur_value = 0x155;
/****************/
#endif

        CONTEXT_TEMPS(cur_cntx)[A55(bcp)->d.blkTempSlot] =
          CONTEXT_TEMPS(cur_cntx)[A55(bcp)->s.blkTempSlot];
        /* TCOV-BCODE * ASSIGN F55 */

        bcp += A55_SIZE;
#if SAMPLER
/****************/
Sampler_vals[0].cur_value = 0;
/****************/
#endif

}

break;

case 0x156:
{
        register cntx   *srcCntx;
        register oop    blk_id;

#if SAMPLER
/****************/
Sampler_vals[0].cur_value = 0x156;
/****************/
#endif
        blk_id = METHOD_TEMPS(cur_cntx)[A56(bcp)->s.blkContextSlot];
        /* TCOV-BCODE * ASSIGN F56 */

        if ( IS_STUB (blk_id) )
        {
                srcCntx =
                    ( FIND_BLK_STUB(blk_id, Cur_process) )->vp.active_cntx;
        }
        else
        {
                srcCntx = find_blk_cntx ( blk_id, cur_cntx->prev );
                if ( srcCntx == NULL )
                        syserr ( "assign bcode:0]--Can't find outer block context for typ
        }
        /* end if */

        CONTEXT_TEMPS(cur_cntx)[A56(bcp)->d.blkTempSlot] =
                CONTEXT_TEMPS(srcCntx)[A56(bcp)->s.blkTempSlot];

        bcp += A56_SIZE;

#if SAMPLER
```

```
/****************/
Sampler_vals[0].cur_value = 0;
/****************/
#endif
}

break;
```

```
/*
** builds a set of bytecodes to send the first message ... essentially
** an initial bytecode object.
*/

#include <stdio.h>
#include "types.h"
#include "constants.h"
#include "interp_const.h"
#include "interp_types.h"
#include "bytecodes.h"

extern oop getsymbol();

static oop symbol;

static char initBytecodes[SM_SIZE + SM_SIZE + RET_SIZE];

/*------------------------------------------------------------------*/

char *
bld_dummy_bcode(init_vals)
        struct init_vals *init_vals;
{
        char *bcp;

/*--------------------- START OF EXECUTABLE CODE ------------------*/

        bcp = initBytecodes;

        /*
        ** build startUp message to SystemBoot
        */

        if ( ( symbol = getsymbol("startUp", 0, 0) ) == -1 )
        {
                fprintf(stderr, "\n*** ERROR *** Could not find symbol 'startUp'\n");
                die(0);
        }

        SM(bcp)->bytecode               = SEND_MESSAGE;
        SM(bcp)->super_flag             = 0;
        SM(bcp)->hashed_selector        = symbol;
        SM(bcp)->likely_meth_or_islot   = -1;
        SM(bcp)->likely_class           = -1;
        SM(bcp)->likely_prim_or_bcode   = -1;
        SM(bcp)->num_args               = 1;
        SM(bcp)->arg_start_slot         = 0;
        SM(bcp)->put_answ_slot          = 0;
#if DEBUGGER
/*************/
        SM(bcp)->linenum                = 1;
/*************/
#endif

        bcp += SM_SIZE;

        /*
        ** build user's message
        */

        SM(bcp)->bytecode               = SEND_MESSAGE;
        SM(bcp)->hashed_selector        = init_vals->hashed_selector;
        SM(bcp)->likely_meth_or_islot   = -1;
        SM(bcp)->likely_class           = -1;
        SM(bcp)->likely_prim_or_bcode   = -1;
        SM(bcp)->num_args               = init_vals->num_args + 1;
        SM(bcp)->arg_start_slot         = 1;
        SM(bcp)->put_answ_slot          = 1;
#if DEBUGGER
/*************/
        SM(bcp)->linenum                = 1;
/*************/
#endif

        bcp += SM_SIZE;

        /*
        ** put the final return in ...
        */

        RET(bcp)->bytecode              = LONG_RETURN;
        RET(bcp)->msg_ret_slot          = 0;

        return ( initBytecodes );
}
```

```
/*Copyright 1988 Eastman Kodak Company.  All rights reserved.*/
#include <stdio.h>
#include "types.h"
#include "constants.h"
#include "macros.h"
#include "interp_const.h"
#include "interp_types.h"
#include "bytecodes.h"
#include "oops_values.h"

extern oop SystemBoot;

extern  struct  process         Processes[MAX_PROCESSES];

/*-----------------------------------------------------------------*/

cntx *
bld_dummy_cntx ( init_vals, dummy_bcodes )

        struct init_vals        *init_vals;
        char                    *dummy_bcodes;
{
        cntx                    *dummy_cntx;

/*---------------------- START OF EXECUTABLE CODE -------------------*/

        dummy_cntx = &Processes[CUR_PID].cntx_stack[0];

        dummy_cntx->obj_hdr.no_indx_vars        = 2 + init_vals->num_args;
        dummy_cntx->obj_hdr.class               = RTMethodContext;

#if DEBUGGER
/***************/
        dummy_cntx->ctrl_vars.msg_id          = -1;
        dummy_cntx->ctrl_vars.linenum         = -1;
        dummy_cntx->ctrl_vars.msg_type        = CLASS_MSG;
        dummy_cntx->ctrl_vars.my_blk_stub      = NULL;
/***************/
#endif
        dummy_cntx->ctrl_vars.next_bcode      = (bcode *)dummy_bcodes;
        dummy_cntx->ctrl_vars.first_block     = &Processes[0].blk_stub_stack[0];
        dummy_cntx->ctrl_vars.region          = 0;
        dummy_cntx->ctrl_vars.code_ptr        = NULL;
        dummy_cntx->ctrl_vars.rcvr_oop        = 0;
        dummy_cntx->ctrl_vars.rcvr_ptr        = NULL;
        dummy_cntx->ctrl_vars.home_cntx       = dummy_cntx;

        dummy_cntx->ctrl_vars.temp_array[0] = SystemBoot;
        dummy_cntx->ctrl_vars.temp_array[1] = init_vals->rcvr_id;

        bcopy(&init_vals->msg_args[0], &dummy_cntx->ctrl_vars.temp_array[2],
          init_vals->num_args * sizeof(oop));

        return ( dummy_cntx );
}
```

```
** blk_obj_to_cntx ( )
**
** This routine is called when we send "value" to an objectified block
** whose stub is not still on the stack.
**
** We do the following:
**
**      1) Retrieve the block's 'home', 'startpc', and 'nargs'
**         instance variables.  Note that 'nargs' and 'startpc' are
**         integers.  We also retrieve the home's 'method' and
**         'receiver' instance variables.
**
**      2) Build a new block context on the stack using these retrieved objs.
**
*******************************************************************/
#include <stdio.h>
#include "types.h"
#include "constants.h"
#include "macros.h"
#include "oops_values.h"
#include "interp_const.h"
#include "interp_types.h"

extern  unsigned short  MCMethodIndex;
extern  unsigned short  MCReceiverIndex;

extern  unsigned short  BlockNargsIndex;
extern  unsigned short  BlockHomeIndex;
extern  unsigned short  BlockStartpcIndex;
/*******************************************************************/

cntx *
blk_obj_to_cntx ( block_obj, prev_cntx, a_process )

        object          *block_obj;     /* Block object to be matl'd. */
        cntx            *prev_cntx;     /* Context on stack previous to one
                                           we are about to create. */
        struct process  *a_process;     /* Process under which new context
                                           should be created. */

/*----------------*/
{
        int             nargs;          /* # temps needed for this cntx. */
        int             startpc;        /* # bytes from start of home
                                           method's bcodes to start of
                                           block's bcodes. */
        object          *method;        /* Block's home's method object. */
        object          *receiver;      /* 'self' to block. */
        object          *home_obj;      /* Block's home context object. */
        cntx            *new_blk_cntx;  /* Cntx matl'd from the block obj. */

        object          *reserve_obj ( );
        blk_stub        *next_blk_stub ( );

/***************** START OF EXECUTABLE CODE ************************/

        /*
        ** Retrieve the block's 'nargs', 'startpc', and
        ** 'home' instance variables.
        */
        nargs    = INTEGER_VALUE(INSTANCE_VARS(block_obj) [BlockNargsIndex]);
        startpc  = INTEGER_VALUE(INSTANCE_VARS(block_obj) [BlockStartpcIndex]);
```

```
                        INSTANCE_VARS(block_obj) [BlockHomeIndex],
                        CUR_REGION,
                        CUR_PID );
if ( home_obj == NULL )
        syserr
  ( "blk_obj_to_cntx:01--Couldn't retrieve block's home context" );

/*
** Now, retrieve the home's 'method' and 'receiver' instance
** variables.
*/
method   = reserve_obj ( INSTANCE_VARS(home_obj) [MCMethodIndex],
                         CUR_REGION, CUR_PID );
receiver = reserve_obj ( INSTANCE_VARS(home_obj) [MCReceiverIndex],
                         CUR_REGION, CUR_PID );
if ( (method == NULL) || (receiver == NULL) )
        syserr ( "blk_obj_to_cntx:02--Couldn't retrieve method or receiver object

/*
** Get the next available context from the stack for this process.
*/
new_blk_cntx = prev_cntx->next;

/*
** Now set up the new context.
*/
new_blk_cntx->obj_hdr.no_indx_vars      = nargs;

/*
** We save a back-pointer from the active context to its stub.
** Don't really need this except for debugging.  This field is used
** for block contexts made from stubs in the following situation:
**      - multiple contexts are activated for the same stub,
**      - one of these (not the only one) does a short return,
**      - one of these that is left makes reference to a type 6 var.
** The type six variable references require us to have a pointer from
** a stub to its active context.  Allowing multiple activations of
** the same stub requires us to have this back pointer and the
** prev_active_cntx field so we can
** reset the active_cntx pointer of the stub.  Since we are not
** allowing ** type 6 variable refs from objectified blocks (at
** least, not yet), we don't need this field.
*/
new_blk_cntx->ctrl_vars.my_blk_stub     = (blk_stub *)block_obj;
new_blk_cntx->ctrl_vars.prev_active_cntx= NULL;

/*
** Use the block's bytecode offset and the home's
** method to set the bytecode pointer of the new context so it
** point to the block's first bytecode.
*/
new_blk_cntx->ctrl_vars.next_bcode      = (bcode *)
  ((char *)&(method->value[method->fp.no_named_vars]) + startpc);

/*
** First-block-stub is set to point to the next available stub
** on the stack.
*/
new_blk_cntx->ctrl_vars.first_block     = a_process->next_blk_stub;

/*
** Answer slot is set by messages sent from this context.
*/
```

```
        new_blk_cntx->ctrl_vars.answ_slot       = 0;

        /*
        ** The region value for the block context should be that of the
        ** context which activated it.
        */
        new_blk_cntx->ctrl_vars.region          = prev_cntx->ctrl_vars.region;

        /*
        ** Use objects retrieved above to set method, receiver, and home
        ** context fields.
        */
        new_blk_cntx->ctrl_vars.code_ptr        = method;
        new_blk_cntx->ctrl_vars.rcvr_oop        = receiver->fp.id;
        new_blk_cntx->ctrl_vars.rcvr_ptr        = receiver;
        new_blk_cntx->ctrl_vars.home_cntx       = (cntx *)home_obj;

        new_blk_cntx->ctrl_vars.to_be_objd      = 0;

#if DEBUGGER
/**************/
        new_blk_cntx->obj_hdr.class             = BlockContext;

        /**
        ** Copy the "msg_id" field from the cntx which activated this block.
        */
        new_blk_cntx->ctrl_vars.msg_id = prev_cntx->ctrl_vars.msg_id;

        /*
        ** The "linenum" and "msg_type" fields are set to negative one and
        ** zero, respectively, for blocks.
        */
        new_blk_cntx->ctrl_vars.linenum         = -1;
        new_blk_cntx->ctrl_vars.msg_type        = 0;
/**************/
#endif

        return ( new_blk_cntx );
}
```

/*Copyright 1988 Eastman Kodak Company.  All rights reserved.*/

```
/*****************************************************************
** Primitive for Block 'value' messages.
**
** Handle the following:
**
**      Evaluating a block which HAS been objectified.
**      In this case, we have two sub-cases:
**
**              a) Stub for this object is still on stack (and we're in
**                 the correct process).  In this case, the id of that
**                 stub is cached in the receiver.  We simply get that
**                 stub id, and process similar to eval_blk bytecode.
**
**              b) Stub for this object is still on stack, but of
**                 wrong process, or it's not on any stack.
**                 In this case, we have to use the block object to create
**                 the context, and we do NOT create a stub for it first.
**
*****************************************************************/

case BLOCK_VALUE_PRIM:
{
        object          *block_obj;     /* receiver (a block object) */
        oop             stub_id;        /* id of receiver's stub on stack */
        blk_stub        *stub_ptr;      /* pointer to receiver's stub */
        cntx            *new_blk_cntx;  /* context created from this stub */
        int             i;              /* loop index */

        cntx            *blk_obj_to_cntx ( );
        cntx            *stub_to_cntx ( );

extern unsigned short   BlockProcessIndex;
extern unsigned short   BlockStubIdIndex;

/*-------------------- START OF EXECUTABLE CODE --------------------*/

#if SAMPLER
/****************/
Sampler_vals[0].cur_value = 0x0ff;
/****************/
#endif

#if DEBUGGER
/****************/
        epp = bcp;
/****************/
#endif
        /*
        ** Save the current context pointer register value so that
        ** subroutines which this primitive calls can get at it.
        ** This primitive changes these, so we have to reset the
        ** register after the execution of this primitive.  See below.
        */
        CUR_CNTX_MEM = cur_cntx;
        BCP_MEM = (unsigned short *) bcp;

        /* TCOV-BCODE ' BLOCK_VALUE_PRIM */

        /*
        ** Set answer slot in calling context.  Block to be evaluated will
        ** put its returned value here.
        */
Cur_process->cur_cntx->ctrl_vars.answ_slot = EP(bcp)->put_answ_slot;

/*
** Get a pointer to the block object from the current context.
*/
block_obj = reserve_obj ( PRIMARG(0), CUR_REGION, CUR_PID );

/*
** If the receiver has a corresponding stub already on the stack...
*/
if ( INSTANCE_VARS(block_obj)[BlockProcessIndex] ==
                                        Cur_process->proc_oop )
{
        /*
        ** CASE (a) ... double check that the block object and the
        ** stub on the stack refer to the same thing ...
        */
        stub_id = INSTANCE_VARS(block_obj)[BlockStubIdIndex];

        stub_ptr = FIND_BLK_STUB(stub_id, Cur_process);

        if ( stub_ptr->vp.oop != block_obj->fp.id )
                syserr
  ( "blk_value_prim:01--Block object/block stub cross-check failed" );

        /*
        ** ... and create an active context from the stub.
        */
        new_blk_cntx = stub_to_cntx ( stub_ptr,
                                Cur_process->cur_cntx, Cur_process );
}
else
{
        /*
        ** CASE (b) ... otherwise, create the block context from
        ** the block object and its home context (a MethodContext
        ** object).
        */
        new_blk_cntx = blk_obj_to_cntx ( block_obj,
                                Cur_process->cur_cntx, Cur_process );
}
/* end if */

/*
** Store the arguments for this block in its context temporaries.
**
** Note that temp[0] is NOT the same as the calling context's
** temp[0] (which would be the block itself), but rather the
** receiver of the block's home.
*/
CONTEXT_TEMPS(new_blk_cntx)[0] = new_blk_cntx->ctrl_vars.rcvr_oop;

for ( i = 1; i < EP(bcp)->num_args; i++ )
{
        CONTEXT_TEMPS(new_blk_cntx)[i] = PRIMARG(i);
}
/* end for */

/*
** nil out rest of temps for the new context.
*/
for ( i = EP(bcp)->num_args;
      i < new_blk_cntx->obj_hdr.no_indx_vars;
      i++ )
```

```
	{
		CONTEXT_TEMPS(new_blk_cntx)[i] = nIL;
	}
	/* end for */

	/*
	** Update next_bcode of calling context.  After block to be
	** evaluated returns, we will continue execution in the calling
	** context.
	*/
	(char *)Cur_process->cur_cntx->ctrl_vars.next_bcode += EP_SIZE;

	/*
	** Finally, set both the memory and register pointers for
	** the current context to be this new block context.
	**
	** Also, set the register bytecode pointer so we will next
	** execute the first bytecode of the block.
	*/
	cur_cntx = Cur_process->cur_cntx = new_blk_cntx;
	bcp = (char *) cur_cntx->ctrl_vars.next_bcode;

#if DEBUGGER
/************ LET EXECUTE_PRIMITIVE BYTECODE HANDLE DEBUGGER STUFF ********/
	D_cur_cntx = cur_cntx;
	D_cur_bcode = (bcode *)bcp;

	goto prim_debug;
/************/
#endif

#if SAMPLER
/*****************/
Sampler_vals[0].cur_value = 0;
/*****************/
#endif
}
break;
```

```
/*Copyright 1988 Eastman Kodak Company.  All rights reserved.*/
/*
** branch bytecode
*/

case BRANCH:
{
#if SAMPLER
/****************/
Sampler_vals[0].cur_value = 0x105;
/****************/
#endif

        bcp += BR(bcp)->offset;
        /* TCOV-BCODE * BRANCH_BCODE */

        bcp += BR_SIZE;

#if SAMPLER
/****************/
Sampler_vals[0].cur_value = 0;
/****************/
#endif
}

break;
```

```
/*Copyright 1988 Eastman Kodak Company.  All rights reserved.*/
/*
** branch on equal bytecode
*/

case BRANCH_ON_EQUAL:
{
#if SAMPLER
/****************/
Sampler_vals[0].cur_value = 0x107;
/****************/
#endif

        if ( CONTEXT_TEMPS(cur_cntx)[CBR(bcp)->slot] == CBR(bcp)->actual )
                bcp += CBR(bcp)->offset;
        /* TCOV-BCODE * BRANCH_ON_EQUAL_BCODE */

        bcp += CBR_SIZE;

#if SAMPLER
/****************/
Sampler_vals[0].cur_value = 0;
/****************/
#endif
}

break;
```

```
/*Copyright 1988 Eastman Kodak Company.  All rights reserved.*/
/*
** branch on not equal bytecode
*/

case BRANCH_ON_NOT_EQUAL:
{
#if SAMPLER
/****************/
Sampler_vals[0].cur_value = 0x108;
/****************/
#endif

        if ( CONTEXT_TEMPS(cur_cntx)[CBR(bcp)->slot] != CBR(bcp)->actual )
                bcp += CBR(bcp)->offset;
        /* TCOV-BCODE * BRANCH_ON_NOT_EQUAL_BCODE */

        bcp += CBR_SIZE;

#if SAMPLER
/****************/
Sampler_vals[0].cur_value = 0;
/****************/
#endif
}

break;
```

```
/*Copyright 1988 Eastman Kodak Company.  All rights reserved.*/
#include <stdio.h>
#include "types.h"
#include "constants.h"
#include "macros.h"
#include "oops_values.h"
#include "interp_const.h"
#include "interp_types.h"

#if DEBUGGER
/**************/
#include "debug_const.h"
#include "debug_types.h"
#include "debug_externs.h"
/**************/
#endif

extern  unsigned short  PriorityIndex;
extern  unsigned short  SuspendedContextIndex;
extern  unsigned short  BlockProcessIndex;
extern  unsigned short  BlockStubIdIndex;

extern  struct  process         Processes[MAX_PROCESSES];

/*-----------------------------------------------------------*/

oop
createProcess ( stub_id, priority )
        oop             stub_id;
        oop             priority;
{
        PID             proc_id;
        object          *proc_obj_ptr;
struct  process         *p;
        blk_stub        *fixed_blk;
        blk_stub        *users_blk;
        object          *users_blk_obj;
        oop             users_blk_id;
        oop             blk_proc_oop;
        int             i;

        PID             get_proc_id( );
        object          *obj_mgr( );
        object          *reserve_obj( );
        cntx            *stub_to_cntx( );
        blk_stub        *proc_copy_cntx1( );
        blk_stub        *proc_copy_cntx2( );
/*-------------------- START OF EXECUTABLE CODE ------------------*/

        /*
        ** First, find the first unused process id.  If one is not
        ** available, get_proc_id will call syserr.
        */
        proc_id = get_proc_id ( );

        /*
        ** Have the object manager create a new instance of Class
        ** Process.  Note that it is associated with its own process id,
        ** not the process id of the process that causes it to be created.
        ** Also, it is associated with a checkpoint id of zero since no
        ** objects have been created or messages sent yet.
        */
        proc_obj_ptr = obj_mgr ( Process, NEW, 0, -1, 0, proc_id );

        /*
        ** Establish the process's instance variables: suspendedContext
        ** and priority.  These were passed in as parameters.
        */
        proc_obj_ptr->value[PriorityIndex] = priority;
/*      proc_obj_ptr->value[SuspendedContextIndex] = stub_id; */

        /*
        ** Now that the object has been created, we are ready to build
        ** the interpreter data structure associated with that process.
        */
        p = &Processes[proc_id];        /* Temporary pointer */

        p->proc_oop             = proc_obj_ptr->[p.id;
        p->next_blk_stub        = &Processes[proc_id].blk_stub_stack[0];
        p->cur_cntx             = &Processes[proc_id].cntx_stack[0];
        p->latest_objd_cntx     = NULL;
        p->region_cntr          = 0;
        p->flags                |= PROC_IN_USE;
        p->proc_id              = proc_id;
        p->obj_counter          = 0;

        if ( !(p->flags & CNTXS_ALLOCD) )
        {
                init_cntx_stack ( proc_id );
                init_blk_stub_stack ( proc_id );

                p->flags |= CNTXS_ALLOCD;
        }
        /* end if */

        /*
        ** Copy 'necessary' contexts from the old process to the new and
        ** set the the first context to be executed in the new process.
        **
        ** The code that follows assumes some knowledge of the newProcess
        ** method in Class Block.  For reference this method is:
        **
        ** newProcess
        **          ^Process
        **                  forContext: [self value. Processor terminateActive]
        **                  priority: Processor activePriority
        **
        ** The receiver of the newProcess message (self) is a block which
        ** the user wishes to have executed as the new process.  The
        ** newProcess method essentially adds a 'safety net' block of code
        ** (i.e., [self value. Processor terminateActive])
        ** around the user's block which causes the user's block to be
        ** evaluated, and then terminates the process.
        **
        ** As a minimum, we must copy the user's block stub and the
        ** 'safety net' block stub into the new process.  Since, in
        ** general, a block can reference its home method's temporaries,
        ** we also copy these home contexts into the new process also.
        **
        ** In the following code, the 'safety net' block is referred to
        ** as fixed_blk, while the user's block is users_blk.
        **
        ** If stub_id == 0, then we are establishing the first process
        ** in the interpreter run.  The contexts for this process are
        ** built from scratch.
        */
```

```
if ( stub_id != 0 )
{
        /*
        ** First, find the safety net block stub, and get the id of
        ** the user's block.
        */
        fixed_blk    = FIND_BLK_STUB ( stub_id, Cur_process );
        users_blk_id = fixed_blk->vp.home_cntx->ctrl_vars.rcvr_oop;

        /*
        ** If the user's block is a stub...
        */
        if ( IS_STUB(users_blk_id) )
        {
                /*
                ** ... find the user's block on the stub stack, and
                ** copy it to the new process.
                */
                users_blk = FIND_BLK_STUB (users_blk_id, Cur_process);
                users_blk = proc_copy_cntx1 ( users_blk, p );
        }
        else
        {
                /*
                ** ...otherwise, the user's block is an object.
                **
                ** Retrieve the block object, and get its process
                ** instance var.
                */
                users_blk_obj =
                        reserve_obj ( users_blk_id, 0, p->proc_id );
                blk_proc_oop =
                    INSTANCE_VARS(users_blk_obj)[BlockProcessIndex];

                /*
                ** We must first check to see if the block object
                ** has a stub on the stack.  If it does, we must
                ** use the stub rather than the object, because the
                ** object doesn't have all the right info in it
                ** until its stub goes away, and update_blk_obj()
                ** gets called.
                */
                if ( blk_proc_oop == Cur_process->proc_oop )
                {
                        users_blk_id =
                    INSTANCE_VARS(users_blk_obj)[BlockStubIdIndex];

                        users_blk =
                          FIND_BLK_STUB (users_blk_id, Cur_process);

                        users_blk = proc_copy_cntx1 ( users_blk, p );
                }
                else
                {
                        users_blk = (blk_stub *) users_blk_obj;
                }
                /* end if */
        }
        /* end if */

        /*
        ** Next, copy over the 'safety net' block.
        **
        ** Note that we must change the receiver for the 'safety
        ** net' block and its home context to be the copy of
        ** the user's block in the new process.
        */
        fixed_blk = proc_copy_cntx2 (fixed_blk, p, users_blk->fp.id);

        /*
        ** Evaluate the 'safety net' block as the first
        ** context to be executed in the new process.
        */
        p->cur_cntx = stub_to_cntx ( fixed_blk, p->cur_cntx, p );
#if DEBUGGER
/****************/
        d_stat_stack_init ( p );
/*****************/
#endif
    }
    else                                /* Creating very first process. */
    {
        p->cur_cntx = NULL;
    }
    /* end if */


#if DEBUGGER
/****************/
    p->msg_id = 0;

    if ( D_ISDSET (D_PROCESSES) )
    {
        printf ( "\n*** PROCESS CREATED: %2u (oop = %d)\n",
                                        p->proc_id, p->proc_oop);
    }
    /* end if */
/*****************/
#endif

    return ( p->proc_oop );
}
```

```
/*Copyright 1988 Eastman Kodak Company.  All rights reserved.*/
#include <stdio.h>

#include "types.h"
#include "constants.h"
#include "interp_const.h"
#include "interp_types.h"

#if DEBUGGER
/***************/
#include "debug_const.h"
#include "debug_types.h"
#include "debug_externs.h"
/***************/
#endif

extern struct process NilProcess;

extern  struct  process         Processes[MAX_PROCESSES];

/*------------------------------------------------------------*/

oop     destroyProcess ( proc_oop )

        oop             proc_oop;       /* oop of process to be
                                           destroyed */

        {
struct  process         *proc_ptr;      /* pointer to process to be
                                           destroyed */
struct  process         *find_process();/* returns pointer to a process
                                           given its oop */

/*--------------- START OF EXECUTABLE CODE -----------------------*/

        /*
        ** find the process to be destroyed.  silently allow non-existent
        ** processes to be destroyed as well, (InputState occasionally
        ** does this when InputSensor is sent the boot message).
        */

        if ( ( proc_ptr = find_process(proc_oop) ) == &NilProcess )
                return;

#if DEBUGGER
/*****************/
        if ( D_ISDSET (D_PROCESSES) )
        {
                printf ( "\n*** PROCESS DESTROYED: %2u\n", proc_ptr->proc_id );
        }
        /* end if */
/*****************/
#endif DEBUGGER

        /* mark the process as not in use */

        proc_ptr->flags &= ~PROC_IN_USE;


        /* let the object manager clean up after this process */

        collector ( 0,  proc_ptr->proc_id );

        return;
        }
```

```
/*Copyright 1988 Eastman Kodak Company.  All rights reserved.*/
/*
** evaluate block bytecode
*/

#define EBP             ( (struct evaluate_block *) regp )

#define USE_BLK_CNTX_CACHE      1

case EVALUATE_BLOCK:
case EVALUATE_BLOCK_2:
{
        register struct evaluate_block          *ebp;
        register blk_stub                       *this_stub;
        register cntx_id                        this_stub_id;
                 int                            i;

                 cntx                           *stub_to_cntx( );
#if DEBUGGER
/****************/
                cntx                            *old_cntx;
/****************/
#endif DEBUGGER

/*--------------------- START OF EXECUTABLE CODE ---------------------------*/

#if SAMPLER
/****************/
        if ( ((struct evaluate_block *)bcp)->bytecode == EVALUATE_BLOCK_2 )
        {
                Sampler_vals[0].cur_value = 0x10a;
        }
        else
        {
                Sampler_vals[0].cur_value = 0x109;
        }
        /* end if */

        Sampler_vals[3].cur_value = 1;
/****************/
#endif

#if DEBUGGER
/****************/
        old_cntx = cur_cntx;
/****************/
#endif DEBUGGER

        ebp = (struct evaluate_block *) bcp;
        /* TCOV-BCODE * EVAL_BLK_BCODE */

        /*
        ** move the bytecode pointer ahead before switching contexts
        */
        bcp += EB_SIZE;

        this_stub_id = CONTEXT_TEMPS(cur_cntx)[ebp->arg_start_slot];

        if ( ebp->bytecode == EVALUATE_BLOCK_2 )
        {
                /*
                **.NOTE: EVAL_BLK is used to evaluate a literal block.
                ** EVAL_BLK_2 is used to handle 'value' messages.  These
                ** 'value' messages might be to block stubs, to block objects,
                ** or to non-block objects.  In the case of block stubs, this
                ** bytecode handles evaluation.  In the case of objects
                ** (whether block objects or non-block objects) we fall
                ** through and let the send_msg bytecode that follows this
                ** one handle it.  For block objects, this will result in a
                ** primitive being executed that does some similar things
                ** to the code here.
                **
                */
                if ( ! IS_STUB (this_stub_id) )
                {
#if SAMPLER
/****************/

                        Sampler_vals[3].cur_value = 0;
                        Sampler_vals[0].cur_value = 0;

/****************/
#endif

                        break;
                }
                /*
                ** Otherwise, the receiver of a 'value' message IS a
                ** stub; we should do the stuff below, and skip over the
                ** next bytecode (a send_msg with selector 'value').
                */

                bcp += SM_SIZE;
        }

        cur_cntx->ctrl_vars.next_bcode = (unsigned short *) bcp;

        /*
        ** Set the value of answ_slot for context which invokes
        ** this bytecode.  This is needed in case the block to be
        ** evaluated uses a short return -x04- (to its caller), rather than a
        ** long return -x01- (to its home's caller).
        */

        cur_cntx->ctrl_vars.answ_slot = ebp->put_answ_slot;

        /*
        ** Find the block stub of interest.
        */

        this_stub = FIND_BLK_STUB ( this_stub_id, Cur_process );

#if SAMPLER
/****************/
Sampler_vals[3].cur_value = 2;
/****************/
#endif
        cur_cntx = Cur_process->cur_cntx =
                        stub_to_cntx ( this_stub, cur_cntx, Cur_process );
#if SAMPLER
/****************/
Sampler_vals[3].cur_value = 1;
/****************/
#endif

#if DEBUGGER
/****************/
        D_cur_cntx = cur_cntx;
/****************/
#endif
```

```
        /*
        ** get the parameters (if any) for this block and load these
        ** arguments from the context which is having the block evaluated,
        ** into the context of block to be evaluated.
        **
        ** Also, nIL out other temps that will be used by this block.
        */
#if SAMPLER
/****************/
Sampler_vals[3].cur_value = 4;
/****************/
#endif
        bcopy ( CONTEXT_TEMPS(cur_cntx->prev) + ebp->arg_start_slot,
                CONTEXT_TEMPS(cur_cntx),
                ebp->num_args << 2 );           /* times 4 */

        for ( i = ebp->num_args; i < cur_cntx->obj_hdr.no_indx_vars; i++ )
        {
                CONTEXT_TEMPS(cur_cntx)[i] = nIL;
        }
        /* end for */

#if SAMPLER
/****************/
Sampler_vals[3].cur_value = 1;
/****************/
#endif

        bcp = (char *) cur_cntx->ctrl_vars.next_bcode;

#if DEBUGGER
/***********************/
        /*
        ** Handle block trace, that is, 'set block' command.
        **
        ** Note that we do NOT print block trace info if we are processing a
        ** 'next_msg' command, and this block is not at the appropriate level.
        */

        if ( ( D_ISDSET (D_BLOCKS) )
        &&   ( (old_cntx == D_base_cntx) || (D_base_cntx == NULL) ) )
        {
                /* PRINT CURRENT PROCESS */

                printf ( "\n%2u-%@BLOCK@ ", CUR_PID );


                /* INDENT TO INDICATE NESTING OF MESSAGE SENDS AND BLOCKS */

                for ( i = 0; i < cur_cntx->obj_hdr.id; i++ )
                        {
                        printf ( "  " );
                        }
                /* end for */


                /* PRINT BLOCK ABOUT TO BE EVALUATED */

                d_print_msg ( cur_cntx );
                printf ( "\n" );
                printf ( "                              BEING EVAL'D\n" );

                /* PRINT BLOCK PARAMETERS */

                printf ( "                      ARGS: " );
                if ( ebp->num_args <= 1 )
                {
                        printf ( "NONE" );
                }
                else
                {
                        for ( i = 1; i < ebp->num_args; ++i )
                        {
                                printf ( "%d ", CONTEXT_TEMPS(cur_cntx)[i] );
                        }
                        /* end for */
                }
                /* end if */
                printf ( "\n" );


                /* PRINT WHO IS CAUSING BLOCK TO BE EVALUATED */

                printf ( "                      FROM: " );
                d_print_msg ( cur_cntx->prev );
                printf ( "\n" );
        }
        /* end if */

        /*
        ** Handle 'next_msg' and 'msg_step' commands.
        */

        if ( (old_cntx == D_base_cntx)
        ||   (D_ISCSET (D_MSG_STEP)) )
        {
                debugger ( );
        }
        /* end if */
/***********************/
#endif

#if SAMPLER
/****************/
Sampler_vals[3].cur_value = 0;
Sampler_vals[0].cur_value = 0;
/****************/
#endif
}

break;
```

```
/*Copyright 1988 Eastman Kodak Company.  All rights reserved.*/
#include <stdio.h>
#include <setjmp.h>
#include <signal.h>
#include "types.h"
#include "constants.h"
#include "macros.h"
#include "oops_values.h"
#include "interp_const.h"
#include "interp_types.h"
#include "bytecodes.h"
#include "assign.h"
#include "obj_mgr.h"


#if SAMPLER
/****************/
#include "sampler_const.h"
#include "sampler_types.h"
#include "sampler_externs.h"
/****************/
#endif

#if DEBUGGER
/**************/
#include "debug_const.h"
#include "debug_types.h"
#include "debug_externs.h"
extern  d_msg_struct    cntx_to_msg ( );
/**************/
#endif

extern int Batch;

int Divert = 0;
int ExitToDebugger = 0;

extern struct process   Processes[];
extern int              setjmp();
extern oop              processSwitch();
struct process          *find_process();
extern oop              First_new_obj;
extern object           *obj_mgr();
extern object           *get_obj();
extern object           *reserve_obj();
extern object           *fetch_method();
extern object           *objectify_block();
extern cntx             *find_blk_cntx();

extern oop (*primitive_function[]) ();

extern jmp_buf  Leave;

void leave_loop();

static char err_msgs[100];
static char *msg01 = "exec_bcodes:01--no such bcode";


void
exec_bcodes(initial_cntx)
        cntx *initial_cntx;
{
        register cntx *cur_cntx;
        register char *bcp;

#if DEBUGGER
/**************/
        char            *epp;   /* ptr needed for exec_prim and
                                        blk_value_prim bcodes */
/**************/
#endif

/*--------------------- START OF EXECUTABLE CODE ----------------*/

        cur_cntx = initial_cntx;
        bcp = (char *) cur_cntx->ctrl_vars.next_bcode;
        Divert = 0;

#if DEBUGGER
/**************/
        printf ( "\n*** Interpreter initialized\n" );
        D_cur_cntx = cur_cntx;

        /*
        ** Give user a RAID prompt unless they got here via a 'rerun' command
        */
        if ( D_ISCSET ( D_RERUN ) )
        {
                D_CRESET ( D_RERUN );
        }
        else
        {
                D_CRESET ( D_RUN );
                D_CRESET ( D_RESTART );

                debugger ( );
        }
        /* end if */

        D_CRESET ( D_NOT_STARTED );
/**************/
#endif


#if SAMPLER
/****************/
Sampler_vals[0].cur_value = 0;
/****************/
#endif


        /*
        ** execute bytecodes ...
        */

        for (;;)
        {
                /*
                ** switch processes if appropriate
                */

                while ( Divert )
                {
#if DEBUGGER
/****************/
                        if ( D_ISDSET (D_PROCESSES) )
                        {
```

```
                printf ( "\n*** PROCESS SWITCHED FROM: %2u ",
                                        CUR_PID );
        }
        /* end if */
/******************/
#endif DEBUGGER

        Divert = 0;

        /*
        ** process any pending input events
        */

        inputEvents();

        /*
        ** process any pending timer events
        */

        timerEvents();

        /*
        ** enter debugger or exit if indicated ...
        */

        if ( ExitToDebugger )
        {
#if DEBUGGER
                ExitToDebugger = 0;

#else
                debugger();

#endif
                leave_loop();

        }

        /*
        ** switch processes
        */

        /*
        ** save current context and bytecode pointer
        ** register values
        */

        Cur_process->cur_cntx = cur_cntx;

        if ( cur_cntx != NULL )
                cur_cntx->ctrl_vars.next_bcode = (unsigned short *) bcp;

        Cur_process = find_process(processSwitch());

        /*
        ** if the last surviving process falls through
        ** (i.e., tries to return from its first context),
        ** we have no bytecodes to execute.  when it
        ** returned from its first context, it was
        ** destroyed, leaving no processes to run.  that
        ** means it's time to quit.  normally, we expect
        ** to quit as the result of executing the QUIT
        ** primitive.
        */

        if ( CUR_PID < 0 )
        {
                if ( Batch )
                {
                        int     i;

                        /*
                         * batch mode ... shut down.
                         */

#if DEBUGGER
/***************/
printf ( "\n" );
/***************/
#endif
/*
                        for ( i = MAX_PROCESSES - 1; i >= 0; i-- )
                                if ( Processes[i].flags & PROC_IN_USE )
                                destroyProcess( Processes[i].proc_oop);

                        leave_loop();
*/

/*
                        return; */
                }
                else
                {
                        int mask;

                        /*
                         * interactive mode ... pause.
                         */

                        mask = sigblock(sigmask(SIGIO));

                        if (!Divert)
                                sigpause(mask);

                        sigsetmask(mask);

                        continue;
                }
        }

        /*
        ** restore current context and bytecode pointer
        ** register values
        */

        cur_cntx = Cur_process->cur_cntx;
        bcp = (char *) cur_cntx->ctrl_vars.next_bcode;

#if DEBUGGER
/******************/

        D_cur_cntx = cur_cntx;

        if ( D_ISDSET (D_PROCESSES) )
        {
                printf ( "TO: %2u \n", CUR_PID );
        }
        /* end if */

/******************/
#endif DEBUGGER
                }
                /* end if (Divert) */

#if DEBUGGER
/*******************/
```

```
                /*
                ** Handle 'bcode_step' and 'set bcode' commands.
                */
                D_cur_bcode = (unsigned short *) bcp;

                if ( D_ISDSET ( D_BCODES )
                || ( D_stop_at_bcode == *D_cur_bcode ) )
                {
                        printf ( "\nNEXT BCODE: " );
                        print_bcode ( D_cur_bcode, 1, CUR_GC_REGION, CUR_PID );
                }
                /* end if */

                if ( D_ISCSET ( D_BCODE_STEP )
                || ( D_stop_at_bcode == *D_cur_bcode ) )
                {
                        D_CRESET ( D_BCODE_STEP );
                        debugger ( );
                }
                /* end if */
/********************/
#endif

                /*
                ** some notes on bytecodes:
                **
                **   1. the bytecode pointer is moved by the bytecode
                **      routines
                **   2. return bytecodes always cause a context switch
                **   3.  evaluation of a block  and
                **      send-message bytecodes will cause a context
                **      switch if they result in a "method" return
                **      bytecode being executed.
                **   4. while the bytecode pointer is of type (char *),
                **      our bytecodes are actually of type short.
                */

                switch( *((unsigned short *) bcp) )
                {

#include "../it/send_msg_bcode.c"
#include "../it/send_param_msg_bcode.c"
#include "../it/send_opt_bcode.c"
#include "../it/ret_bcode.c"
#include "../it/branch_bcode.c"
#include "../it/branch_eq_bcode.c"
#include "../it/branch_neq_bcode.c"
#include "../it/setup_blk_bcode.c"
#include "../it/eval_blk_bcode.c"
#include "../it/assign_bcode.c"

#include "../it/blk_value_prim.c"
#include "../it/exec_prim_bcode.c"

                }

#if DEBUGGER
/*********************/
                if ( cur_cntx != NULL )
                {
                /*
                ** Handle 'set contexts' and 'set receiver' commands.
                */
                if ( D_display_switches & D_CONTEXTS )
                {
                        printf ( "\nPROC_ID : %u", CUR_PID );
                        d_print_cntx ( cur_cntx );
                }
                /* end if */

                if ( D_display_switches & D_RECEIVERS )
                {
                        d_print_receiver ( );
                }
                /* end if */

                }
                /* end if */
/*********************/
#endif

        }
}

/*****************************************************************
leave_loop:  execute longjmp.  This routine removed from exec_bcodes
             so that optimizer compiler can produce better code in
             exec_bcodes.
*****************************************************************/
void leave_loop()
{
longjmp ( Leave, 1 );
}
```

/*Copyright 1988 Eastman Kodak Company. All rights reserved.*/

```
/*
** execute primitive
*/

default:

        if (*((unsigned short *) bcp) < 1 || *((unsigned short *) bcp) > MAX_PRIM)
        {
                printf("\nCurrent Bytecode: %#x\n", *((unsigned short *) bcp));
                printf ( "\n*** ERROR *** No such bytecode (%#x)\n",
                        *((unsigned short *) bcp));
                syserr(msg01);
                break;
        }

prim:

{
#if DEBUGGER
/****************/
        int             i;
/****************/
#endif

#if SAMPLER
/****************/
Sampler_vals[0].cur_value = 0x102;
/****************/
#endif

        /*
         * Save the current context pointer and bytecode pointer
         * register values so that the primitive can get at them.
         *
         * Only the primitive for Block.value messages changes these,
         * and this primitive is caught above as a separate bytecode.
         * Therefore, we don't have to reset the registers after
         * the execution of other primitives.
         */

        cur_cntx->ctrl_vars.next_bcode = (unsigned short *) bcp;
        Cur_process->cur_cntx = cur_cntx;

        /* TCOV-BCODE * EXEC_PRIM_BCODE */

        CONTEXT_TEMPS(cur_cntx)[EP(bcp)->put_answ_slot] =
                                (*(primitive_function[EP(bcp)->bytecode]))();
#if DEBUGGER
/************/
        epp = bcp;      /* save pointer to this bytecode for use in debugger
                           code below. We can't use bcp in the debugger code
                           because it gets updated before we get into the
                           debugger code. We update it then because we enter
                           the debugger code (via goto prim_rest) from
                           elsewhere, i.e., blk_value_prim where bcp has
                           already been updated. */
/************/
#endif

        bcp += EP_SIZE;

#if DEBUGGER
/*********** HANDLE SIMULATED ANSWER IF THIS PRIM REPLACED A MSG *********/
prim_debug:

        if ( ( D_ISCSET (D_MSG_REPLACED) )
        &&   ( D_ISDSET (D_MESSAGES)     )
        &&   ( (cur_cntx == D_base_cntx) || (D_base_cntx == NULL) ) )
        {
                printf ( "\n%2u-%6d# ", CUR_PID,
                                        Processes[CUR_PID].msg_id);

                for ( i = 0; i <= cur_cntx->obj_hdr.id; i++ )
                        {
                        printf ( "  " );
                        }
                /* end for */

                printf ( "ANSWER: %d\n",
                                CONTEXT_TEMPS(cur_cntx)[EP(epp)->put_answ_slot] );
        }
        /* end if */

        D_CRESET ( D_MSG_REPLACED );

/************** HANDLE RAID 'return' IF THIS PRIM REPLACED A MSG **********/

        if ( D_ISCSET (D_RET_FROM_REPLACED_MSG) )
        {
                printf ( "\n*** Returned from message replaced by PRIMITIVE" );
                D_CRESET ( D_RET_FROM_REPLACED_MSG );
                debugger ( );
        }
        /* end if */

/**************/
#endif DEBUGGER

#if SAMPLER
/****************/
Sampler_vals[0].cur_value = 0;
/****************/
#endif

}
break;
```

```
/*Copyright 1988 Eastman Kodak Company.  All rights reserved.*/

#include <stdio.h>
#include "types.h"
#include "constants.h"
#include "macros.h"
#include "oops_values.h"
#include "interp_const.h"
#include "interp_types.h"
#include "sampler_const.h"
#include "sampler_types.h"
#include "sampler_externs.h"

extern  struct  process         Processes[];

/*------------------------*/
/*
** This routine is used by type 6 assignments when the outer block
** is an object rather than a stub.  Using the outer block object's
** oop, we must find its corresponding active context.  Though a given
** block may have more than one active context, the type 6 reference
** must be to a temp of that outer block context closest up the stack
** to the current context.  (The current context is the block context
** for the inner block.)  Therefore, we start at the current context,
** and search backward.
*/

cntx *
find_blk_cntx ( blk_oop, a_cntx )

        oop             blk_oop;        /* Oop of block object whose active
                                                context is desired. */
        cntx            *a_cntx;        /* Cntx at which to start search.  */
{
/*------------------------*/

        while ( a_cntx != NULL )
        {
                if ( a_cntx->ctrl_vars.my_blk_stub != NULL )
                {
                        if (a_cntx->ctrl_vars.my_blk_stub->fp.id == blk_oop)
                        {
                                return ( a_cntx );
                        }
                        /* end if */
                }
                /* end if */

                a_cntx = a_cntx->prev;
        }
        /* end while */

        return ( a_cntx );
}
```

```
/*Copyright 1988 Eastman Kodak Company.  All rights reserved.*/
#include <stdio.h>
#include "types.h"
#include "constants.h"
#include "interp_const.h"
#include "interp_types.h"
#include "bytecodes.h"

extern struct process NilProcess;

extern  struct  process Processes[];

/*-----------------------------------------------------------------*/

struct  process *find_process ( proc_oop )

        oop             proc_oop;

/*------------------ declarations -----------------------------------*/

        {
        PID             proc_id;
        short           found;

/*----------------- executable code -------------------------------*/

        /* At first, process not found.  Start looking in the array of
        processes at the zero slot. */

        proc_id = 0;
        found = 0;


        /* Keep looking until the process is found, or we run out of
        processes to look at. */

        while ( ( proc_id < MAX_PROCESSES ) && ( found == 0 ) )
                {
                if ( (Processes[proc_id].flags & PROC_IN_USE)
                &&   (Processes[proc_id].proc_oop == proc_oop) )
                        {
                        found = 1;
                        }
                else
                        {
                        proc_id++;
                        }
                /* endif */
                }
        /* end while */


        /* If found, return a pointer to the process of interest. */
        if ( found == 1 )
                {
                return ( &Processes[proc_id] );
                }
        /* If not found, we are probably done with the interpreter.
        return pointer to NilProcess so calling routine can detect this. */
        else
                {
                return ( &NilProcess );
                }
        /* end if */
        }
```

```
/*Copyright 1988 Eastman Kodak Company.  All rights reserved.*/
#include <stdio.h>
#include "types.h"
#include "constants.h"
#include "macros.h"
#include "interp_const.h"
#include "interp_types.h"

/*----------------------------------------------------------------*/

struct  init_vals       *get_init_vals ( init_vals_fname )

                char            *init_vals_fname;

        {
                FILE            *init_vals_file;
static  struct  init_vals       *i;
                dict_xref       *dict_ptr = NULL;
                char            class_name[MAX_TEXT_SIZE];
                char            selector_sym[MAX_SEL_SIZE];
                char            temp_str[MAX_TEXT_SIZE];
                int             class_msg = -1;
                oop             sel_sym_oop = -1;
                int             j;
                int             temp_int;

                char            *fgets();
                FILE            *fopen();
                object          *obj_mgr();
                object          *reserve_obj();
                dict_xref       *getdictionary();
                oop             getsymbol();

/*------------------- START OF EXECUTABLE CODE ------------------*/

        i = (struct init_vals *) malloc ( sizeof ( struct init_vals ) );

        /* determine initial values for first message send; these may
        either be typed in by the user, or taken from a file whose name
        is specified by the user. */

        if ( init_vals_fname != NULL )
        /**************** INPUT FROM A FILE ***********************/
        {
                init_vals_file = fopen ( init_vals_fname, "r+" );

                if ( init_vals_file == NULL )
                {
                        printf ( "\n*** ERROR *** Cannot open file '%s' to get values of
                        return ( NULL );
                }
/********************** CLASS */

                if ( fgets ( class_name, MAX_TEXT_SIZE, init_vals_file)
                                                        == NULL )
                {
                        printf ( "*** ERROR *** End of file when trying to read class nam
                        fclose ( init_vals_file );
                        return ( NULL );
                }
                sscanf ( class_name, "%s\n", class_name );

                dict_ptr = getdictionary ( class_name );

                if ( dict_ptr == NULL )
                {
                        printf ( "*** ERROR *** %s is not in global dictionary.",
                                                class_name );

                        fclose ( init_vals_file );
                        return ( NULL );
                } /* end if */

                i->class_oop = dict_ptr->{p.object_oop;

/******************* SELECTOR */
                if ( fgets (selector_sym, MAX_SEL_SIZE, init_vals_file)
                                                        == NULL )
                {
                        printf ( "*** ERROR *** End of file when trying to read selector.
                        fclose ( init_vals_file );
                        return ( NULL );
                }
                sscanf ( selector_sym, "%s\n", selector_sym );

                sel_sym_oop = getsymbol ( selector_sym, 0, 0 );

                if ( sel_sym_oop <= 0 )
                {
                        printf ( "*** ERROR *** %s is not in symbol dictionary.",
                                                selector_sym );
                        fclose ( init_vals_file );
                        return ( NULL );
                } /* end if */

                strcpy ( i->str_selector, selector_sym );

                i->hashed_selector = sel_sym_oop;

/********************* CLASS or INSTANCE method */
                if ( fgets (temp_str, MAX_TEXT_SIZE, init_vals_file)
                                                        == NULL )
                {
                        printf ( "*** ERROR *** End of file when trying to read message t
                        fclose ( init_vals_file );
                        return ( NULL );
                }
                /* end if */

                i->msg_type = temp_str[0];

/********************* RECEIVER */
                i->rcvr_id = get_first_rcvr ( i->msg_type, i->class_oop );

/********************* ARGUMENTS */
                if ( fscanf (init_vals_file, "%d\n", &(temp_int) ) ==
                                                        EOF )
                {
                        printf ( "*** ERROR *** End of file when trying to read number of
                        fclose ( init_vals_file );
                        return ( NULL );
                }

                i->num_args = temp_int;
```

```
		for ( j = 0; j < i->num_args; j++ )
			{
			if ( fscanf  ( init_vals_file, "%ld\n",
					&(i->msg_args[j]) ) == EOF )
				{
				printf ( "*** ERROR *** End of file when trying to read a
				fclose ( init_vals_file );
				return ( NULL );
				}
			}
/********************** SUPER FLAG */

		i->super_flag = 0;

		fclose ( init_vals_file );
	}

	else
	/*********** INPUT FROM STDIN - PROMPT USER ****************/
	{
/*********************** INTRO */
		printf ( "\n      ******** ALLTALK-86 ********\n" );
		printf ( "\nFor initial message, enter the following:\n" );

/*********************** CLASS */

		while ( dict_ptr == NULL )
		{
			printf ( "\nClass name          : " );
			scanf  ( "%s", class_name );

			dict_ptr = getdictionary ( class_name );

			if ( dict_ptr == NULL )
			{
			    printf ( "*** %s is not in global dictionary.\n ",
							class_name );
			} /* end if */
		} /* end while */

		i->class_oop = dict_ptr->fp.object_oop;


/*********************** SELECTOR */
		while ( sel_sym_oop <= 0 )
		{
			printf ( "\nSelector            : " );
			scanf  ( "%s", selector_sym );

			sel_sym_oop = getsymbol ( selector_sym, 0, 0 );

			if ( sel_sym_oop <= 0 )
			{
			    printf ( "*** %s is not in symbol dictionary.\n ",
							selector_sym );
			} /* end if */
		} /* end while */

		strcpy ( i->str_selector, selector_sym );

		i->hashed_selector = sel_sym_oop;

/********************** CLASS or INSTANCE method */
			printf ( "\nMessage Type        : " );
			scanf  ( "%s", temp_str );

			i->msg_type = temp_str[0];

/********************** RECEIVER */
			i->rcvr_id = get_first_rcvr ( i->msg_type, i->class_oop );

/********************** ARGUMENTS */
			printf ( "\nNumber of arguments : " );
			scanf  ( "%d", &(temp_int) );
			i->num_args = temp_int;

			for ( j = 0; j < i->num_args; j++ )
				{
				printf ( "\n    msg_args[%d] : ", j );
				scanf  ( "%ld", &(i->msg_args[j]) );
				}
			printf ( "\n" );

/********************** SUPER FLAG */

			i->super_flag = 0;
		}

		return ( i );
}

/*************************************************************************/

oop	get_first_rcvr ( msg_type, class_oop )

	char		msg_type;
	oop		class_oop;

{
	object		*first_rcvr;

/*--------------------*/

		if ( msg_type == 'c' )
		{
			first_rcvr = reserve_obj ( class_oop, 0, 0 );
		}
		else
		{
			first_rcvr = obj_mgr ( class_oop, NEW, 0, -1, 0, 0 );
		}
		/* end if */

		return ( first_rcvr->fp.id );
}
```

```
#include "interp_const.h"
#include "interp_types.h"

extern  struct  process Processes[];

/*------------------------------------------------------------------*/

PID     get_proc_id ( )

/*------------------ declarations ------------------------------------*/

        {
        PID             proc_id;
        short           found;

/*------------------ executable code --------------------------------*/

        /* Start looking in the array of processes at the zero slot. */

        proc_id = 0;
        found = 0;


        /* Keep looking until an unused process is found, or we run
        out of processes to look at. */

        while ( ( proc_id < MAX_PROCESSES ) && ( found == 0 ) )
                {
                if ( Processes[proc_id].flags & PROC_IN_USE )
                        {
                        proc_id++;
                        }
                else
                        {
                        found = 1;
                        Processes[proc_id].flags |= PROC_IN_USE;
                        }
                /* endif */
                }
        /* end while */

        if ( !found )
                {
                syserr ( "get_proc_id01--MAX_PROCESSES exceeded" );
                }
        else
                {
                return ( proc_id );
                }
        /* end if */
        }
```

```
/*Copyright 1988 Eastman Kodak Company.  All rights reserved.*/
#include <stdio.h>
#include "types.h"
#include "constants.h"
#include "interp_const.h"
#include "interp_types.h"
#include "bytecodes.h"

extern  struct  process         Processes[];

        init_blk_stub_stack ( proc_id )

        PID             proc_id;
{
        short           index;

/*------------------- START OF EXECUTABLE CODE --------------------------*/

        for ( index = 0; index < MAX_BLK_STUBS-1; index++ )
        {
                Processes[proc_id].blk_stub_stack[index].vp.next =
                        &Processes[proc_id].blk_stub_stack[index+1];

                Processes[proc_id].blk_stub_stack[index].fp.id =
                        INIT_CNTX_ID + proc_id + index*MAX_PROCESSES;
        }
        /* HANDLE LAST CONTEXT SPECIALLY */

        Processes[proc_id].blk_stub_stack[MAX_BLK_STUBS-1].vp.next = NULL;

        Processes[proc_id].blk_stub_stack[index].fp.id =
                INIT_CNTX_ID + proc_id + index*MAX_PROCESSES;

        return;
}
```

```
/*Copyright 1988 Eastman Kodak Company.  All rights reserved.*/
#include <stdio.h>
#include "types.h"
#include "constants.h"
#include "interp_const.h"
#include "interp_types.h"
#include "bytecodes.h"
#include "oops_values.h"


        init_cntx ( a_cntx, prev, next, index )

        cntx            *a_cntx;
        cntx            *prev;
        cntx            *next;
        short           index;

{

/*------------------- START OF EXECUTABLE CODE --------------------------*/

        a_cntx->prev                    = prev;
        a_cntx->next                    = next;
        a_cntx->obj_hdr.id              = index;

        return;
}
```

```
/*Copyright 1988 Eastman Kodak Company.  All rights reserved.*/
#include <stdio.h>
#include "types.h"
#include "constants.h"
#include "interp_const.h"
#include "interp_types.h"
#include "bytecodes.h"

extern  struct  process         Processes[];

        init_cntx_stack ( proc_id )

        PID             proc_id;
{
        cntx            *prev;
        cntx            *next;
        short           index;

/*------------------- START OF EXECUTABLE CODE --------------------------*/

        /* HANDLE FIRST CONTEXT SPECIALLY */

        prev = NULL;
        next = &Processes[proc_id].cntx_stack[1];
        init_cntx ( &Processes[proc_id].cntx_stack[0], prev, next, 0 );

        for ( index = 1; index < MAX_CNTXS-1; index++ )
        {
                prev = &Processes[proc_id].cntx_stack[index-1];
                next = &Processes[proc_id].cntx_stack[index+1];
                init_cntx ( &Processes[proc_id].cntx_stack[index],
                                        prev, next, index );
        }
        /* HANDLE LAST CONTEXT SPECIALLY */

        prev = &Processes[proc_id].cntx_stack[MAX_CNTXS-2];
        next = NULL;
        init_cntx ( &Processes[proc_id].cntx_stack[MAX_CNTXS-1],
                                prev, next, MAX_CNTXS-1 );

        return;
}
```

```
/*Copyright 1988 Eastman Kodak Company.  All rights reserved.*/
/*
** intialize indicies for named variables of various objects
** accessed by interpreter/primitive routines.
*/

#include <stdio.h>
#include "types.h"
#include "constants.h"
#include "interp_const.h"
#include "interp_types.h"
#include "oops_values.h"

extern  object  *get_obj();

extern  oop     BitBlt;
extern  oop     Form;
extern  oop     StrikeFont;
extern  oop     CharacterScanner;
extern  oop     UNIXTextStream;

/*
** indicies used in accessing Processe, ProcessorScheduler, and
** Semaphore ...
*/

unsigned short  ProcessListsIndex;
unsigned short  ActiveProcessIndex;
unsigned short  FirstLinkIndex;
unsigned short  LastLinkIndex;
unsigned short  ExcessSignalsIndex;
unsigned short  NextLinkIndex;
unsigned short  SuspendedContextIndex;
unsigned short  PriorityIndex;
unsigned short  MyListIndex;

/*
** indicies used in accessing Form ...
*/

unsigned short  FormWidthI:dex;
unsigned short  FormHeight.ndex;
unsigned short  FormDepthI:dex;
unsigned short  FormBitsIndex;
unsigned short  FormOffsetIndex;

/*
** indicies used in accessing BitBlt ...
*/

unsigned short  DestFormIndex;
unsigned short  SourceFormIndex;
unsigned short  HalftoneFormIndex;
unsigned short  CombinationRuleIndex;
unsigned short  DestXIndex;
unsigned short  DestYIndex;
unsigned short  WidthIndex;
unsigned short  HeightIndex;
unsigned short  SourceXIndex;
unsigned short  SourceYIndex;
unsigned short  ClipXIndex;
unsigned short  ClipYIndex;
unsigned short  ClipWidthIndex;
unsigned short  ClipHeightIndex;

/*
** indicies used in accessing Point ...
*/

unsigned short  PointXIndex;
unsigned short  PointYIndex;

/*
** indicies used in accessing StrikeFont ...
*/

unsigned short  SFXTableIndex;
unsigned short  SFGlyphsIndex;
unsigned short  SFNameIndex;
unsigned short  SFStopConditionsIndex;
unsigned short  SFTypeIndex;
unsigned short  SFMinAsciiIndex;
unsigned short  SFMaxAsciiIndex;
unsigned short  SFMaxWidthIndex;
unsigned short  SFStrikeLengthIndex;
unsigned short  SFAscentIndex;
unsigned short  SFDescentIndex;
unsigned short  SFXOffsetIndex;
unsigned short  SFRasterIndex;
unsigned short  SFSubscriptIndex;
unsigned short  SFSuperscriptIndex;
unsigned short  SFEmphasisIndex;

/*
** indicies used in accessing CharacterScanner ...
*/

unsigned short  CSXTableIndex;
unsigned short  CSLastIndexIndex;

/*
** indicies used in accessing CompiledMethod ...
*/

unsigned short  CMNoParmsIndex;
unsigned short  CMNoTempsIndex;
unsigned short  CMMethTypeIndex;
unsigned short  CMOptDataIndex;

/*
** indicies used in accessing UNIXTextStream ...
*/

unsigned short  UTSCollectionIndex;
unsigned short  UTSPositionIndex;
unsigned short  UTSReadLimitIndex;

/*
** indicies used in accessing String, ByteArray and WordArray ...
*/

unsigned short  StringSizeIndex;
unsigned short  ByteArraySizeIndex;
unsigned short  WordArraySizeIndex;
unsigned short  WordArrayVersionIndex;

/*
```

```
** indicies used in accessing MethodContext ...
*/

unsigned short  MCMethodIndex;
unsigned short  MCReceiverIndex;
unsigned short  MCFirstDummyIndex;
unsigned short  MCLastDummyIndex;

/*
** indicies used in accessing Block ...
*/

unsigned short  BlockHomeIndex;
unsigned short  BlockStartpcIndex;
unsigned short  BlockStubIdIndex;
unsigned short  BlockProcessIndex;
unsigned short  BlockNargsIndex;

initializeIndicies()
{

        ProcessListsIndex       = name_to_slot_err(ProcessorScheduler, "quiescentProcessL
        ActiveProcessIndex      = name_to_slot_err(ProcessorScheduler, "activeProcess");
        FirstLinkIndex          = name_to_slot_err(LinkedList, "firstLink");
        LastLinkIndex           = name_to_slot_err(LinkedList, "lastLink");
        ExcessSignalsIndex      = name_to_slot_err(Semaphore, "excessSignals");
        NextLinkIndex           = name_to_slot_err(Link, "nextLink");
        SuspendedContextIndex   = name_to_slot_err(Process, "suspendedContext");
        PriorityIndex           = name_to_slot_err(Process, "priority");
        MyListIndex             = name_to_slot_err(Process, "myList");

        FormWidthIndex          = name_to_slot_err(Form, "width");
        FormHeightIndex         = name_to_slot_err(Form, "height");
        FormDepthIndex          = name_to_slot_err(Form, "depth");
        FormBitsIndex           = name_to_slot_err(Form, "bits");
        FormOffsetIndex         = name_to_slot_err(Form, "offset");

        DestFormIndex           = name_to_slot_err(BitBlt, "destForm");
        SourceFormIndex         = name_to_slot_err(BitBlt, "sourceForm");
        HalftoneFormIndex       = name_to_slot_err(BitBlt, "halftoneForm");
        CombinationRuleIndex    = name_to_slot_err(BitBlt, "combinationRule");
        DestXIndex              = name_to_slot_err(BitBlt, "destX");
        DestYIndex              = name_to_slot_err(BitBlt, "destY");
        WidthIndex              = name_to_slot_err(BitBlt, "width");
        HeightIndex             = name_to_slot_err(BitBlt, "height");
        SourceXIndex            = name_to_slot_err(BitBlt, "sourceX");
        SourceYIndex            = name_to_slot_err(BitBlt, "sourceY");
        ClipXIndex              = name_to_slot_err(BitBlt, "clipX");
        ClipYIndex              = name_to_slot_err(BitBlt, "clipY");
        ClipWidthIndex          = name_to_slot_err(BitBlt, "clipWidth");
        ClipHeightIndex         = name_to_slot_err(BitBlt, "clipHeight");

        PointXIndex             = name_to_slot_err(Point, "x");
        PointYIndex             = name_to_slot_err(Point, "y");

        SFXTableIndex           = name_to_slot_err(StrikeFont, "xTable");
        SFGlyphsIndex           = name_to_slot_err(StrikeFont, "glyphs");
        SFNameIndex             = name_to_slot_err(StrikeFont, "name");
        SFStopConditionsIndex   = name_to_slot_err(StrikeFont, "stopConditions");
        SFTypeIndex             = name_to_slot_err(StrikeFont, "type");
        SFMinAsciiIndex         = name_to_slot_err(StrikeFont, "minAscii");
        SFMaxAsciiIndex         = name_to_slot_err(StrikeFont, "maxAscii");
        SFMaxWidthIndex         = name_to_slot_err(StrikeFont, "maxWidth");
        SFStrikeLengthIndex     = name_to_slot_err(StrikeFont, "strikeLength");
        SFAscentIndex           = name_to_slot_err(StrikeFont, "ascent");
        SFDescentIndex          = name_to_slot_err(StrikeFont, "descent");
        SFXOffsetIndex          = name_to_slot_err(StrikeFont, "xOffset");
        SFRasterIndex           = name_to_slot_err(StrikeFont, "raster");
        SFSubscriptIndex        = name_to_slot_err(StrikeFont, "subscript");
        SFSuperscriptIndex      = name_to_slot_err(StrikeFont, "superscript");
        SFEmphasisIndex         = name_to_slot_err(StrikeFont, "emphasis");

        CSXTableIndex           = name_to_slot_err(CharacterScanner, "xTable");
        CSLastIndexIndex        = name_to_slot_err(CharacterScanner, "lastIndex");

        CMNoParmsIndex          = name_to_slot_err(CompiledMethod, "noParms");
        CMNoTempsIndex          = name_to_slot_err(CompiledMethod, "noTemps");
        CMMethTypeIndex         = name_to_slot_err(CompiledMethod, "methType");
        CMOptDataIndex          = name_to_slot_err(CompiledMethod, "optData");

        UTSCollectionIndex      = name_to_slot_err(UNIXTextStream, "collection");
        UTSPositionIndex        = name_to_slot_err(UNIXTextStream, "position");
        UTSReadLimitIndex       = name_to_slot_err(UNIXTextStream, "readLimit");

        StringSizeIndex         = name_to_slot_err(String, "size");
        ByteArraySizeIndex      = name_to_slot_err(ByteArray, "size");

        if (StringSizeIndex != ByteArraySizeIndex)
                syserr("%s, line %d: index of 'size' must be same for String and ByteArra

        WordArraySizeIndex      = name_to_slot_err(WordArray, "size");
        WordArrayVersionIndex   = name_to_slot_err(WordArray, "version");

        MCMethodIndex           = name_to_slot_err(MethodContext, "method");
        MCReceiverIndex         = name_to_slot_err(MethodContext, "receiver");
        MCFirstDummyIndex       = name_to_slot_err(MethodContext, "firstDummy");
        MCLastDummyIndex        = name_to_slot_err(MethodContext, "lastDummy");

        BlockHomeIndex          = name_to_slot_err(Block, "home");
        BlockStartpcIndex       = name_to_slot_err(Block, "startpc");
        BlockStubIdIndex        = name_to_slot_err(Block, "stubId");
        BlockProcessIndex       = name_to_slot_err(Block, "process");
        BlockNargsIndex         = name_to_slot_err(Block, "nargs");

        return;
```

```
/*Copyright 1988 Eastman Kodak Company.  All rights reserved.*/
/*
** get oops of various objects accessed by interpreter/primitive routines
** from the system dictionary.
**
** (hopefully this will eliminate a lot of dependencies on oops_values.h)
*/

#include <stdio.h>
#include "types.h"
#include "constants.h"
#include "interp_const.h"
#include "interp_types.h"

extern object *get_obj();

/*
** classes
*/

oop     SystemBoot;
oop     BitBlt;
oop     Form;
oop     StrikeFont;
oop     CharacterScanner;
oop     DisplayScreen;
oop     Cursor;
oop     UNIXTextStream;

/*
** miscellaneous constants
*/

oop     EndOfRun;
oop     CrossedX;

/*
** the "BlackMask" oop for copyBits() use ... see comment below
*/

oop     FormBlackMask;

initializeOops()
{
        object *obj;

        SystemBoot              = getDictionaryValue("SystemBoot");
        BitBlt                  = getDictionaryValue("BitBlt");
        Form                    = getDictionaryValue("Form");
        StrikeFont              = getDictionaryValue("StrikeFont");
        CharacterScanner        = getDictionaryValue("CharacterScanner");
        DisplayScreen           = getDictionaryValue("DisplayScreen");
        Cursor                  = getDictionaryValue("Cursor");
        UNIXTextStream          = getDictionaryValue("UNIXTextStream");

        EndOfRun                = getDictionaryValue("_EndOfRun");
        CrossedX                = getDictionaryValue("_CrossedX");

        /*
         * copyBits() takes advantage of knowing when the halftone form
         * is all black ... i.e., it can avoid the source AND halftone rop
         * operation in this particular case.  so we get that oop at this
         * time.
         */

        if ((obj = get_obj(Form, 0, 0)) == NULL)
                syserr("initializeIndicies: could not fetch class Form (oop = %d)\n", For

        FormBlackMask = INSTANCE_VARS(obj)[name_to_slot_err(Form, "BlackMask")];
}
```

```
/*Copyright 1988 Eastman Kodak Company.  All rights reserved.*/
#include <stdio.h>
#include <setjmp.h>
#include <signal.h>
#include <string.h>
#include "types.h"
#include "constants.h"
#include "macros.h"
#include "oops_values.h"
#include "interp_const.h"
#include "interp_types.h"
#include "bytecodes.h"

extern int optind;
extern char *optarg;

extern int ioTrap();
extern int timerTrap();

#if SAMPLER
/**************/
#include <sys/time.h>

#include "sampler_const.h"
#include "sampler_types.h"
#include "sampler_init.h"

#define SAMPLER_INTERVAL_SEC     0
#define SAMPLER_INTERVAL_USEC    20000

extern          int             sampler();
extern          int             sampler_print();
        struct  itimerval       s_value;
/**************/
#endif

int     NoMouse;
int     NoKeyboard;
int     NoBoot;
int     Batch;
char    *ProgramName;
char    *LogFile;
unsigned short  proc_id;

struct process NilProcess =
        {-1, nIL, NULL, NULL, NULL, -1, 0, -1, -1, NULL, NULL};

struct sigvec Oldvec, Newvec;

jmp_buf                         Leave;

#if DEBUGGER
/**************/
#include "debug_const.h"
#include "debug_types.h"
#include "debug_externs.h"

extern  jmp_buf                 D_leave;
/****************/
#endif

struct process Processes[MAX_PROCESSES];
cntx ContextStacks[MAX_PROCESSES * MAX_CNTXS];

blk_stub BlockStubs[MAX_PROCESSES * MAX_BLK_STUBS];

struct process *Cur_process;
oop First_new_obj;

/*--------------------------------------------------------------*/

die(sig, code, scp)
        int sig;
        int code;
        struct sigcontext *scp;
{
        char    response[MAX_TEXT_SIZE];

        /*
         * don't exit if shutdown_db indicates busy ...
         */

        if (shutdown_db())
                return;

        /*
         * return mouse and keyboard to normal
         */

        closeDisplay();
        closeKeyboard();
        closeMouse();

        /*
         * for the received signal, reset the handling to default (SIG_DFL),
         * unmask the signal, and zap ourselves again.  this will cause
         * some sort of appropriate action to occur for the signal (such
         * as core dump, or simple termination).
         *
         * In the case of core dumps, we ask the user whether he/she really
         * wants one.  If so, they will have to look back up the stack one
         * level to see what the real problem was when they examine the dump.
         *
         * In all cases where this routine is the handling routine, the mouse
         * and keyboard should be returned to normal.
         */

        if (sig < 1 || sig > 32)
                exit(1);                /* not due to signal */

        printf("*** signal received.  signal: %d code: %d.\n", sig, code);

        Newvec.sv_handler = SIG_DFL;

        sigvec(sig, &Newvec, 0);

        switch (sig)
        {
        case SIGQUIT:
        case SIGILL:
        case SIGTRAP:
        case SIGIOT:
        case SIGEMT:
        case SIGFPE:
        case SIGBUS:
        case SIGSEGV:
        case SIGSYS:
        case SIGLOST:
```

```
		printf("*** dump core (y/n)? ");

		fflush(stdin);

		scanf("%s", response);

		if ( response[0] != 'y' )
			exit(1);

		break;
	}

	sigsetmask(0);

	kill(getpid(), sig);

	/*
	 * shouldn't get here ...
	 */

	exit(1);
}

main ( argc, argv )
	int	argc;
	char	*argv[];

	{
		oop		first_proc_oop;

	struct	init_vals	*init_vals;
/*	struct	init_vals	*i; */

		cntx		*dummy_cntx;
		char		*dummy_bcodes;
		oop		next_oop( );
		void		init_processor( );
		oop		createProcess( );
	struct	process		*find_process( );
	struct	init_vals	*get_init_vals( );
		void		exec_bcodes( );
		long		collector( );
		cntx		*bld_dummy_cntx();
		char		*bld_dummy_bcode();

		long		meas ( );
		long		meas2 ( );
		long		b_time;
		int		optchar;
		int		badopt;
		oop		get_first_rcvr ( );
		int		j;

/*------------------ START OF EXECUTABLE CODE ------------------*/

	/*
	** process command line arguments
	*/

	ProgramName = argv[0];
	LogFile = strcat(strcpy(malloc(strlen(ProgramName)+strlen(".log")+1),
	  ProgramName), ".log");

	NoBoot = Batch = 0;

	badopt = 0;

	while ( ( optchar = getopt(argc, argv, "KMkmnb") ) != EOF )
	{
		switch ( optchar )
		{
		case 'K': NoKeyboard++;	break;
		case 'M': NoMouse++;	break;
		case 'k': break;
		case 'm': break;
		case 'n': NoBoot++;	break;
		case 'b': Batch++;	break;
		case '?': badopt++;	break;
		}
	}

	if ( badopt )
	{
		fprintf(stderr, "usage: %s [ -KMkmnb ] [ filename ... ]\n",
		  ProgramName);
		exit(1);
	}

	/*
	** install signal catching functions.
	**
	** note that we preserve previous SIGHUP and SIGINT handling.
	** this keeps us in the background if we are already there.
	**
	** note also that we must install these catching functions
	** before any calls to the object manager, since it will install
	** it's own handling if none exists already.
	**
	** we try to catch all signals so that the mouse and keyboard will
	** be properly restored.  of course, this cannot be done for SIGKILL.
	*/

	sigsetmask(-1);

	Newvec.sv_handler = die;

	sigvec(SIGHUP, 0, &Oldvec);
	if ( Oldvec.sv_handler == SIG_DFL)
		sigvec(SIGHUP, &Newvec, 0);

	sigvec(SIGINT, 0, &Oldvec);
	if ( Oldvec.sv_handler == SIG_DFL)
		sigvec(SIGINT, &Newvec, 0);

	sigvec(SIGQUIT, &Newvec, 0);
	sigvec(SIGILL,  &Newvec, 0);
	sigvec(SIGTRAP, &Newvec, 0);
	sigvec(SIGIOT,  &Newvec, 0);
	sigvec(SIGEMT,  &Newvec, 0);
	sigvec(SIGFPE,  &Newvec, 0);
	sigvec(SIGBUS,  &Newvec, 0);
	sigvec(SIGSEGV, &Newvec, 0);
	sigvec(SIGSYS,  &Newvec, 0);
	sigvec(SIGPIPE, &Newvec, 0);
	sigvec(SIGTERM, &Newvec, 0);
	sigvec(SIGXCPU, &Newvec, 0);
	sigvec(SIGXFSZ, &Newvec, 0);
	sigvec(SIGVTALRM, &Newvec, 0);
	sigvec(SIGUSR1, &Newvec, 0);
```

```
        sigvec(SIGUSR2, &Newvec, 0);
        sigvec(SIGLOST, &Newvec, 0);

        Newvec.sv_handler = ioTrap;

        sigvec(SIGIO, &Newvec, 0);

        Newvec.sv_handler = timerTrap;

        sigvec(SIGALRM, &Newvec, 0);

#if SAMPLER
/**************/
        Newvec.sv_handler = sampler;
        sigvec ( SIGPROF, &Newvec, 0 );

        s_value.it_interval.tv_sec  = SAMPLER_INTERVAL_SEC;
        s_value.it_interval.tv_usec = SAMPLER_INTERVAL_USEC;
        s_value.it_value.tv_sec     = SAMPLER_INTERVAL_SEC;
        s_value.it_value.tv_usec    = SAMPLER_INTERVAL_USEC;
/**************/
#endif

        /*
        ** enable signals
        */

        sigsetmask(0);

#if DEBUGGER
/**************/
        D_CRESET ( D_INITIALIZED );
/**************/
#endif

        /*initialize the object manager*/

        init_om();

        /* Determine initial values for first message send; these are
        needed in order to call rcv_msg which sets up the first context
        of the first process. */

        /* First command line argument, (after options), is either a
        filename or NULL.  If it's a filename, get_init_vals will get
        its values from that file; errors will cause it to return
        NULL.  If it's NULL, get_init_vals will get its values from
        stdin (will prompt the user); errors cause it to re-prompt.

        Therefore, it is recommended to NOT use redirected input, since
        an error in such input will reprompt indefinitely, unbeknownst
        to the user.  Instead, use a command line argument. */

        init_vals = get_init_vals ( argv[optind] );

        if ( init_vals == NULL )
        {
                printf ( "\n*** ERROR *** Could not get valid values for initial message
                die(0);
        }

        /* Establish the global which holds the oop of the first object
        to be created by this invocation of the interpreter.  This
        value is used to help determine which objects are garbage,
        which are already in the database, and which are new objects
        that should be written to the database. */

        first_new_obj = next_oop ( );

#if DEBUGGER
/**************/
D_init_vals = *init_vals;

do
{
        setjmp ( D_leave );

        D_CSET ( D_NOT_STARTED );

        D_CSET ( D_INITIALIZED );
/**************/
#endif

#if SAMPLER
/**************/
        setitimer ( ITIMER_PROF, &s_value, 0 );
        Sampler_vals[0].cur_value = 0x200;
/**************/
#endif

        b_time = meas ( 0 );

        /*
        ** initialize oops for various objects accessed by
        ** interpreter/primitive routines.
        */

        initializeOops();

        /*
        ** initialize indicies for named variables of various objects
        ** accessed by interpreter/primitive routines.
        */

        initializeIndicies();

        /*
         * build process structures.
         */

        for (j = 0; j < MAX_PROCESSES; j++)
        {
                Processes[j].cntx_stack = &ContextStacks[j * MAX_CNTXS];
                Processes[j].blk_stub_stack = &BlockStubs[j * MAX_BLK_STUBS];
        }

        /* Create the first process.  At this time, we do not know what
        the process's context should look like, so its id
        will be zero.  The context will be established by the call to
        bld_dummy_cntx below. */

        first_proc_oop = createProcess ( 0, INTEGER_OBJECT(INIT_PRIORITY) );

        if ( first_proc_oop == eRROR )
                {
                /* couldn't create the first process */
                }
```

```
/* end if */

/* Make the process just created the current process. */

Cur_process = find_process ( first_proc_oop );

/* Call routine which establishes the Processor object in
Smalltalk with activeProcess set to the first process */

init_processor ( first_proc_oop );

/* Call routine which establishes the Display object in
Smalltalk for the sun screen */

openDisplay();

/*
** open i/o devices
*/

openMouse();
openKeyboard();

dummy_bcodes = bld_dummy_bcode ( init_vals );
dummy_cntx = bld_dummy_cntx ( init_vals, dummy_bcodes );

/*
 * skip system boot startUp message if indicated ...
 */

if ( NoBoot )
        dummy_cntx->ctrl_vars.next_bcode = (bcode *)
          ((char *) dummy_cntx->ctrl_vars.next_bcode + SM_SIZE);

Cur_process->cur_cntx = dummy_cntx;

#if DEBUGGER
/****************/
        /*
        ** Initialize table and stack for message stats collection.
        */
        d_stat_stack_init ( Cur_process );
        D_STAT_TAB_INIT;
/****************/
#endif

/* Execute bytecodes until we encounter the Quit primitive */

/* Execute bytecodes until we encounter the Quit primitive */

/*
** save the current execution state: when we are ready to quit.
** the 'quit' primitive will longjmp() to here.
*/

if ( setjmp(Leave) )
{
        int i;

                /*
                ** destroy all existing processes.  this takes care of
                ** check-pointing objects.
                */

#if SAMPLER
/****************/
Sampler_vals[0].cur_value = 0x200;
/****************/
#endif

                for ( i = MAX_PROCESSES - 1; i >= 0; i-- )
                        if ( Processes[i].flags & PROC_IN_USE )
                                destroyProcess(Processes[i].proc_oop);

        }

        else exec_bcodes(dummy_cntx);

#if DEBUGGER
/****************/
        if ( D_ISCSET ( D_RERUN ) || D_ISCSET ( D_QUIT )
                                        || D_ISCSET ( D_RESTART ) )
        {
                printf ( "\n*** Interpreter execution aborted\n" );
        }
        else if ( D_ISCSET ( D_RUN ) )
        {
                ;
        }
        else /* normal completion */
        {
                D_CSET ( D_DONE );

                printf ( "\n*** Interpreter execution complete\n" );
                printf ( "\n*** Total time: %.2f secs\n",
                        (float) meas ( b_time )/1000 );

                debugger ( );

                D_CRESET ( D_DONE );
        }
        /* end if */

        if ( D_ISCSET ( D_RERUN ) || D_ISCSET ( D_RESTART ) )
        {
                /*
                ** Reset the stop_msg_id that may have been set by 'goto' or
                ** 'next'.
                */
                D_goto_skip.msg_id = -1;

                /*
                ** Reset the values for the first message, and get a new
                ** first receiver.
                */
                init_vals = D_init_vals;
                init_vals->rcvr_id = get_first_rcvr ( init_vals->msg_type,
                                                init_vals->class_oop );
```

```
	}
	else if ( D_ISCSET ( D_RUN ) )
	{
		*init_vals = D_init_vals;
	}
	/* end if */
}
while ( !( D_ISCSET ( D_QUIT ) ) );
/**************/
#endif DEBUGGER

	printf("\n*** Total time: %.2f secs\n", (float) meas(b_time)/1000);

#if SAMPLER
/****************/
sampler_print ( );
/****************/
#endif

	closeDisplay();
	closeKeyboard();
	closeMouse();

	exit(0);
}
```

```
/*Copyright 1988 Eastman Kodak Company.  All rights reserved.*/
/*meas.c: return milliseconds of cpu time*/
#include <sys/time.h>
#include <sys/resource.h>

long meas(oper)
long oper;
{
static struct rusage rr;
if (oper == 0)
	{
	getrusage(0,&rr);
	return((rr.ru_utime.tv_sec + rr.ru_stime.tv_sec)*1000 +
		(rr.ru_utime.tv_usec + rr.ru_stime.tv_usec) / 1000);
	}

getrusage(0,&rr);
return((rr.ru_utime.tv_sec + rr.ru_stime.tv_sec)*1000 +
		(rr.ru_utime.tv_usec + rr.ru_stime.tv_usec) / 1000 -oper);
}
```

```
/*Copyright 1988 Eastman Kodak Company.  All rights reserved.*/
/*meas.c: return milliseconds of cpu time*/
#include <sys/time.h>
#include <sys/resource.h>

long meas2(oper)
        long            oper;
{
static  struct  rusage  rr;

        getrusage ( 0, &rr );
        return ( rr.ru_utime.tv_sec*1000 + rr.ru_utime.tv_usec/1000 - oper);
}
```

```
/*Copyright 1988 Eastman Kodak Company.  All rights reserved.*/

#include <stdio.h>
#include "types.h"
#include "constants.h"
#include "interp_const.h"
#include "interp_types.h"

/*
** Get a new block stub from the stack.
*/

blk_stub *
next_blk_stub ( a_process )

        struct  process         *a_process;
{
        register blk_stub       *new_blk_stub;

        /*
        ** Get the next available stub.
        */
        new_blk_stub = a_process->next_blk_stub;

        /*
        ** Next, update the pointer to the next available stub for this
        ** process.
        */
        if ( (a_process->next_blk_stub = new_blk_stub->vp.next) == NULL )
                syserr( "next_blk_stub:01--no more block stubs available" );

        return ( new_blk_stub );
}
```

```
/*Copyright 1988 Eastman Kodak Company.  All rights reserved.*/
#include "types.h"
#include "constants.h"
#include "interp_const.h"
#include "interp_types.h"
#include "bytecodes.h"

/*-------------------------------------------------------------------*/

oop     no_such_prim ( cur_cntx, num_args, arg_start_slot )

        cntx    *cur_cntx;
        unsigned short  num_args;
        unsigned short  arg_start_slot;

        {
static  char    err_msgs[100];
static  char    *msg01 = "no_such_prim:01--no such primitive";

        sprintf ( err_msgs, msg01 );
        syserr ( err_msgs );

        return;
        }
```

```
/*
**      This file contains the following routines:
**
**              objectify_cntx ( )
**              objectify_minus_temps ( )
**              objectify_block ( )
**              update_blk_obj ( )
**              replace_oop ( )
*/
#include <stdio.h>
#include "types.h"
#include "constants.h"
#include "macros.h"
#include "oops_values.h"
#include "interp_const.h"
#include "interp_types.h"
#include "obj_mgr.h"

extern  object                  *reserve_obj ( );

extern  struct  process         Processes[MAX_PROCESSES];

extern  unsigned short          MCMethodIndex;
extern  unsigned short          MCReceiverIndex;
extern  unsigned short          MCFirstDummyIndex;
extern  unsigned short          MCLastDummyIndex;

extern  unsigned short          BlockNargsIndex;
extern  unsigned short          BlockStartpcIndex;
extern  unsigned short          BlockHomeIndex;
extern  unsigned short          BlockProcessIndex;
extern  unsigned short          BlockStubIdIndex;

/************************************************************************
**
**      objectify_cntx ( )
**
**      Turn a context into an object.  This also entails making sure
**      we objectify temps of this context which are blocks
**      and that we mark the homes of these blocks (if this isn't their
**      home) for objectification as well.
*/
object *
objectify_cntx ( a_cntx, current_cntx )
        cntx            *a_cntx;        /* context to be objectified */
        cntx            *current_cntx;  /* current context */
{
        object          *a_cntx_as_obj; /* objectified context */
        int             i;              /* loop variable */
        oop             this_temp;      /* a temp in a_cntx */
        object          *stub_as_obj;   /* an objectified block */
        blk_stub        *stub_ptr;      /* pointer to a block stub */

        object          *objectify_minus_temps ( );
        object          *objectify_block ( );
        void            update_blk_obj ( );
        void            replace_oop ( );
        object          *referenced ( );

/******************** START OF EXECUTABLE CODE *********************/

/*
** Get a MethodContext object with empty temps
*/
a_cntx_as_obj = objectify_minus_temps ( a_cntx );

/*
** Go through the context's temps looking for blocks.
*/
for ( i = 0; i < a_cntx->obj_hdr.no_indx_vars; i++ )
{
        /*
        ** If temp is a stub id (i.e., a block)...
        */
        if ( IS_STUB ( this_temp = CONTEXT_TEMPS(a_cntx)[i] ) )
        {
                /*
                ** ... objectify the block, if it's not already.
                */
                stub_as_obj = objectify_block ( this_temp );

                /*
                ** If we're collecting the home and its stubs
                ** (i.e., we're returning past them), rather than just
                ** doing a 'fixTemps'...
                */
                if ( a_cntx > current_cntx )
                {
                        /*
                        ** ...and if the context we're objectifying is the
                        ** home of this stub, update that stub with the
                        ** home's ** oop, etc.
                        */
                        stub_ptr = FIND_BLK_STUB( this_temp, Cur_process );
                        if ( stub_ptr->vp.home_cntx == a_cntx )
                        {
                             update_blk_obj ( stub_ptr, stub_as_obj,
                                                    a_cntx_as_obj );
                        }
                        /* end if */
                }
                /* end if */

                /*
                ** Then replace stub id with oop of block object.
                */
                this_temp = stub_as_obj->fp.id;
        }
        /* end if */

        /*
        ** Copy the temp from the context to the object.
        */
        INDEXED_VARS(a_cntx_as_obj)[i] = this_temp;

        /*
        ** If the object isn't an encoded positive integer, must let
        ** garbage collector know of the reference between these two
        ** objects.
        */
        if ( this_temp >= 0 )
        {
        referenced ( a_cntx_as_obj, this_temp, nil, CUR_REGION, CUR_PID );
        }
        /* end if */
}
/* end for */
```

```
return ( a_cntx_as_obj );
}


/*****************************************************************************
**
**      objectify_minus_temps ( )
**
**      Turn a context into an object, except for the temps.
*/
object  *
objectify_minus_temps ( a_cntx )

        cntx            *a_cntx;        /* context to be objectified */
{
        object          *a_cntx_as_obj; /* objectified context */
        int             i;              /* loop variable */

        object          *obj_mgr ( );
        object          *referenced ( );

/******************* START OF EXECUTABLE CODE *********************/

/*
**      Get a new, empty MethodContext object.
*/
        a_cntx_as_obj = obj_mgr ( MethodContext, NEW,
                a_cntx->obj_hdr.no_indx_vars, -1, CUR_REGION, CUR_PID );
/*
**      Fill in its instance variables.
**
**      First, the method object.
*/
        INSTANCE_VARS(a_cntx_as_obj)[MCMethodIndex] =
                                        a_cntx->ctrl_vars.code_ptr->fp.id;
        referenced ( a_cntx_as_obj, a_cntx->ctrl_vars.code_ptr->fp.id, nIL,
                                                CUR_REGION, CUR_PID );
/*
**      Next, the receiver.
*/
        INSTANCE_VARS(a_cntx_as_obj)[MCReceiverIndex] =
                                        a_cntx->ctrl_vars.rcvr_oop;
        referenced ( a_cntx_as_obj, a_cntx->ctrl_vars.rcvr_oop, nIL,
                                                CUR_REGION, CUR_PID );
/*
**      Also, we have to set a bunch of dummy instance vars to nIL.  These
**      take the space of the prev, next, and ctrl_vars fields when this
**      context gets materialized.
*/
        for ( i = MCFirstDummyIndex; i <= MCLastDummyIndex; i++ )
        {
                INSTANCE_VARS(a_cntx_as_obj)[i] = nIL;
        }
        /* end for */

        return ( a_cntx_as_obj );
}


/*****************************************************************************
**
**      objectify_block ( )
**
**      Turn a block stub into an object.
**
**      Note that this is called from two places.
**
**      The first case is when we detect that a block is being assigned
**      or returned.
**
**      The second case is when we are objectifying a method context, and
**      find block stubs in its temps.
*/

object *
objectify_block ( stub_id )

        oop             stub_id;
{
        blk_stub        *stub_ptr;
        object          *block_obj;

/******************* START OF EXECUTABLE CODE *********************/

        /*
        ** Establish pointer to block stub on stub stack.
        */
        stub_ptr = FIND_BLK_STUB(stub_id,Cur_process);

        /*
        ** If stub has already been objectified, and that object has not
        ** been garbage-collected, we simply return
        ** the oop of that object - it is cached in the stub.
        ** Otherwise, we...
        */
        if ( ((block_obj) = reserve_obj(stub_ptr->vp.oop, CUR_REGION, CUR_PID))
                                == NULL)
        ||   (stub_ptr->vp.oop == 0) )
        {
                /*
                ** ... get a new block object.
                */
                block_obj =
                        obj_mgr ( Block, NEW, 0, -1, CUR_REGION, CUR_PID );

                /*
                ** Cache the oop of the new object in the stub.
                */
                stub_ptr->vp.oop = block_obj->fp.id;

                /*
                ** Cache the id of the stub in the new object.
                */
                INSTANCE_VARS(block_obj)[BlockStubIdIndex] = stub_id;

                /*
                ** Store the current process in the new object.
                */
                INSTANCE_VARS(block_obj)[BlockProcessIndex] =
                                        Cur_process->proc_oop;

                /*
                ** Set the block object's other instance variables to nIL.
                ** These fields aren't needed as long as the block has a
                ** stub on the stack.  When the stub is about to be collected
```

```
        ** these fields will be set via update_blk_obj() which
        ** is called from objectify_cntx() which is called from
        ** ret_bcode.
        */
        INSTANCE_VARS(block_obj)[BlockNargsIndex] =
        INSTANCE_VARS(block_obj)[BlockStartpcIndex] =
        INSTANCE_VARS(block_obj)[BlockHomeIndex] = nIL;

        /*
        ** Finally, mark the stub's home so that it will get
        ** objectified, and update the pointer to the youhgest
        ** such home, if appropriate.
        */
        stub_ptr->vp.home_cntx->ctrl_vars.to_be_objd = 1;

        if ( Cur_process->latest_objd_cntx < stub_ptr->vp.home_cntx )
            Cur_process->latest_objd_cntx = stub_ptr->vp.home_cntx;
    }
    /* end if */

    return ( block_obj );
}


/************************************************************************
**
**      update_blk_obj ( )
**
**      After a stub object's home has been objectified, we can update the
**      stub object's instance variables.
*/
void
update_blk_obj ( stub_ptr, stub_as_obj, home_as_obj )

        blk_stub        *stub_ptr;
        object          *stub_as_obj;
        object          *home_as_obj;
{

/****************** START OF EXECUTABLE CODE ***************************/

        /*
        ** We assume that the stub object wasn't garbage collected.
        **
        ** Update its instance variables.
        **
        ** First, the block's home context.
        */
        INSTANCE_VARS(stub_as_obj)[BlockHomeIndex] = home_as_obj->fp.id;
        referenced ( stub_as_obj, home_as_obj->fp.id, nIL, CUR_REGION,
                                                            CUR_PID );
        /*
        ** Next, the byte offset within the compiled method at which
        ** the block's code starts.
        */
        INSTANCE_VARS(stub_as_obj)[BlockStartpcIndex] =
                                INTEGER_OBJECT(stub_ptr->vp.bcode_offset);

        /*
        ** Next, the number of temps the block uses.
        */
        INSTANCE_VARS(stub_as_obj)[BlockNargsIndex] =
                                INTEGER_OBJECT(stub_ptr->vp.num_temps);

        /*
        ** Finally, we null out the field which used to identify
        ** the block stub on the stack which is associated with
        ** this block object.  We are about to collect that stub on
        ** the stack, so this id will no longer be valid.
        */
        INSTANCE_VARS(stub_as_obj)[BlockStubIdIndex] =
        INSTANCE_VARS(stub_as_obj)[BlockProcessIndex] = nIL;

        return;
}
/************************************************************************
**
**      replace_oop ( )
**
**      For a range of contexts, replace one oop with another.
*/
void
replace_oop ( old_oop, new_oop, start_cntx, end_cntx )

        oop             old_oop;        /* oop to be replaced */
        oop             new_oop;        /* replacement oop */
        cntx          * *start_cntx;    /* cntx at which to start replacing*/
        cntx            *end_cntx;      /* cntx at which to stop replacing*/
{
        cntx            *a_cntx;        /* context we're looking at now */
        int             i;

/*-------------------------------*/

        a_cntx = start_cntx;

        do
        {
                if ( a_cntx->ctrl_vars.rcvr_oop == old_oop )
                {
                        a_cntx->ctrl_vars.rcvr_oop = new_oop;
                }
                /* end if */

                for ( i = 0; i < a_cntx->obj_hdr.no_indx_vars; i++ )
                {
                        if ( CONTEXT_TEMPS(a_cntx)[i] == old_oop )
                        {
                                CONTEXT_TEMPS(a_cntx)[i] = new_oop;
                        }
                        /* end if */
                }
                /* end for */

                a_cntx = a_cntx->next;
        }
        while ( a_cntx <= end_cntx );

        return;
}
```

```
/*Copyright 1988 Eastman Kodak Company.  All rights reserved.*/
#include "types.h"
#include "constants.h"

extern  oop     prim_0();
extern  oop     prim_1();
extern  oop     prim_2();
extern  oop     prim_3();
extern  oop     prim_4();
extern  oop     prim_5();
extern  oop     prim_6();
extern  oop     prim_7();
extern  oop     prim_8();
extern  oop     prim_9();
extern  oop     prim_10();
extern  oop     prim_11();
extern  oop     prim_12();
extern  oop     prim_13();
extern  oop     prim_14();
extern  oop     prim_15();
extern  oop     prim_16();
extern  oop     prim_17();
extern  oop     prim_18();
extern  oop     prim_19();
extern  oop     prim_20();
extern  oop     prim_21();
extern  oop     prim_22();
extern  oop     prim_23();
extern  oop     prim_24();
extern  oop     prim_25();
extern  oop     prim_26();
extern  oop     prim_27();
extern  oop     prim_28();
extern  oop     prim_29();
extern  oop     prim_30();
extern  oop     prim_31();
extern  oop     prim_32();
extern  oop     prim_33();
extern  oop     prim_34();
extern  oop     prim_35();
extern  oop     prim_36();
extern  oop     prim_37();
extern  oop     prim_38();
extern  oop     prim_39();
extern  oop     prim_40();
extern  oop     prim_41();
extern  oop     prim_42();
extern  oop     prim_43();
extern  oop     prim_44();
extern  oop     prim_45();
extern  oop     prim_46();
extern  oop     prim_47();
extern  oop     prim_48();
extern  oop     prim_49();
extern  oop     prim_50();
extern  oop     prim_51();
extern  oop     prim_52();
extern  oop     prim_53();
extern  oop     prim_54();
extern  oop     prim_55();
extern  oop     prim_56();
extern  oop     prim_57();
extern  oop     prim_58();
extern  oop     prim_59();
extern  oop     prim_60();
extern  oop     prim_61();
extern  oop     prim_62();
extern  oop     prim_63();
extern  oop     prim_64();
extern  oop     prim_65();
extern  oop     prim_66();
extern  oop     prim_67();
extern  oop     prim_68();
extern  oop     prim_69();
extern  oop     prim_70();
extern  oop     prim_71();
extern  oop     prim_72();
extern  oop     prim_73();
extern  oop     prim_74();
extern  oop     prim_75();
extern  oop     prim_76();
extern  oop     prim_77();
extern  oop     prim_78();
extern  oop     prim_79();
extern  oop     prim_80();
extern  oop     prim_81();
extern  oop     prim_82();
extern  oop     prim_83();
extern  oop     prim_84();
extern  oop     prim_85();
extern  oop     prim_86();
extern  oop     prim_87();
extern  oop     prim_88();
extern  oop     prim_89();
extern  oop     prim_90();
extern  oop     prim_91();
extern  oop     prim_92();
extern  oop     prim_93();
extern  oop     prim_94();
extern  oop     prim_95();
extern  oop     prim_96();
extern  oop     prim_97();
extern  oop     prim_98();
extern  oop     prim_99();
extern  oop     prim_100();
extern  oop     prim_101();
extern  oop     prim_102();
extern  oop     prim_103();
extern  oop     prim_104();
extern  oop     prim_105();
extern  oop     prim_106();
extern  oop     prim_107();
extern  oop     prim_108();
extern  oop     prim_109();
extern  oop     prim_110();
extern  oop     prim_111();
extern  oop     prim_112();
extern  oop     prim_113();
extern  oop     prim_114();
extern  oop     prim_115();
extern  oop     prim_116();
extern  oop     prim_117();
extern  oop     prim_118();
extern  oop     prim_119();
extern  oop     prim_120();
extern  oop     prim_121();
extern  oop     prim_122();
```

```
extern  oop     prim_123();
extern  oop     prim_124();
extern  oop     prim_125();
extern  oop     prim_126();
extern  oop     prim_127();
extern  oop     prim_128();
extern  oop     prim_129();
extern  oop     prim_130();
extern  oop     prim_131();
extern  oop     prim_132();
extern  oop     prim_133();
extern  oop     prim_134();
extern  oop     prim_135();
extern  oop     prim_136();
extern  oop     prim_137();
extern  oop     prim_138();
extern  oop     prim_139();
extern  oop     prim_140();
extern  oop     prim_141();
extern  oop     prim_142();
extern  oop     prim_143();
extern  oop     prim_144();
extern  oop     prim_145();
extern  oop     prim_146();
extern  oop     prim_147();
extern  oop     prim_148();
extern  oop     prim_149();
extern  oop     prim_150();
extern  oop     prim_151();
extern  oop     prim_152();
extern  oop     prim_153();
extern  oop     prim_154();
extern  oop     prim_155();
extern  oop     prim_156();
extern  oop     prim_157();
extern  oop     prim_158();
extern  oop     prim_159();
extern  oop     prim_160();
extern  oop     prim_161();
extern  oop     prim_162();
extern  oop     prim_163();
extern  oop     prim_164();
extern  oop     prim_165();
extern  oop     prim_166();
extern  oop     prim_167();
extern  oop     prim_168();
extern  oop     prim_169();
extern  oop     prim_170();
extern  oop     prim_171();
extern  oop     prim_172();
extern  oop     prim_173();
extern  oop     prim_174();
extern  oop     prim_175();
extern  oop     prim_176();
extern  oop     prim_177();
extern  oop     prim_178();
extern  oop     prim_179();
extern  oop     prim_180();
extern  oop     prim_181();
extern  oop     prim_182();
extern  oop     prim_183();
extern  oop     prim_184();
extern  oop     prim_185();
extern  oop     prim_186();
extern  oop     prim_187();
extern  oop     prim_188();
extern  oop     prim_189();
extern  oop     prim_190();
extern  oop     prim_191();
extern  oop     prim_192();
extern  oop     prim_193();
extern  oop     prim_194();
extern  oop     prim_195();
extern  oop     prim_196();
extern  oop     prim_197();
extern  oop     prim_198();
extern  oop     prim_199();
extern  oop     no_such_prim();

oop (*primitive_function[]) () =
{
        prim_0,   prim_1,   prim_2,   prim_3,   prim_4,
        prim_5,   prim_6,   prim_7,   prim_8,   prim_9,
        prim_10,  prim_11,  prim_12,  prim_13,  prim_14,
        prim_15,  prim_16,  prim_17,  prim_18,  prim_19,
        prim_20,  prim_21,  prim_22,  prim_23,  prim_24,
        prim_25,  prim_26,  prim_27,  prim_28,  prim_29,
        prim_30,  prim_31,  prim_32,  prim_33,  prim_34,
        prim_35,  prim_36,  prim_37,  prim_38,  prim_39,
        prim_40,  prim_41,  prim_42,  prim_43,  prim_44,
        prim_45,  prim_46,  prim_47,  prim_48,  prim_49,
        prim_50,  prim_51,  prim_52,  prim_53,  prim_54,
        prim_55,  prim_56,  prim_57,  prim_58,  prim_59,
        prim_60,  prim_61,  prim_62,  prim_63,  prim_64,
        prim_65,  prim_66,  prim_67,  prim_68,  prim_69,
        prim_70,  prim_71,  prim_72,  prim_73,  prim_74,
        prim_75,  prim_76,  prim_77,  prim_78,  prim_79,
        prim_80,  prim_81,  prim_82,  prim_83,  prim_84,
        prim_85,  prim_86,  prim_87,  prim_88,  prim_89,
        prim_90,  prim_91,  prim_92,  prim_93,  prim_94,
        prim_95,  prim_96,  prim_97,  prim_98,  prim_99,
        prim_100, prim_101, prim_102, prim_103, prim_104,
        prim_105, prim_106, prim_107, prim_108, prim_109,
        prim_110, prim_111, prim_112, prim_113, prim_114,
        prim_115, prim_116, prim_117, prim_118, prim_119,
        prim_120, prim_121, prim_122, prim_123, prim_124,
        prim_125, prim_126, prim_127, prim_128, prim_129,
        prim_130, prim_131, prim_132, prim_133, prim_134,
        prim_135, prim_136, prim_137, prim_138, prim_139,
        prim_140, prim_141, prim_142, prim_143, prim_144,
        prim_145, prim_146, prim_147, prim_148, prim_149,
        prim_150, prim_151, prim_152, prim_153, prim_154,
        prim_155, prim_156, prim_157, prim_158, prim_159,
        prim_160, prim_161, prim_162, prim_163, prim_164,
        prim_165, prim_166, prim_167, prim_168, prim_169,
        prim_170, prim_171, prim_172, prim_173, prim_174,
        prim_175, prim_176, prim_177, prim_178, prim_179,
        prim_180, prim_181, prim_182, prim_183, prim_184,
        prim_185, prim_186, prim_187, prim_188, prim_189,
        prim_190, prim_191, prim_192, prim_193, prim_194,
        prim_195, prim_196, prim_197, prim_198, prim_199
};
```

```
/*Copyright 1988 Eastman Kodak Company.  All rights reserved.*/
#include <stdio.h>
#include "types.h"
#include "constants.h"
#include "oops_values.h"
#include "interp_const.h"
#include "interp_types.h"

extern  struct  process         Processes[];

/*-------------------------*/

blk_stub *
proc_copy_cntxl (old_blk_stub, to_process)

        blk_stub        *old_blk_stub;  /* The user's block in the current
                                           process. */
        struct process  *to_process;    /* The new process. */
{
        int             i;
        cntx            *old_meth_cntx; /* The user's block's home in the
                                           current process. */
        cntx            *new_meth_cntx; /* The user's block's home in the
                                           new process. */
        blk_stub        *new_blk_stub;  /* The user's block in the new
                                           process. */

        blk_stub        *next_blk_stub();

/*-------------------------*/
        /*
        ** This routine copies the user's block and its home context from
        ** the current process to a new process (the to_process).
        ** The user's block is NOT an object.
        */
        old_meth_cntx = old_blk_stub->vp.home_cntx;
        new_meth_cntx = to_process->cur_cntx;
        new_blk_stub  = next_blk_stub ( to_process );

        /*
        ** Now copy the values from the old context to the new.
        **
        ** When copying the temporaries, we do different things depending on
        ** what type of oop the temporary holds:
        **
        **      1) Oops < 0 are integers, and are copied as is.
        **      2) Oops >= 0 and < INIT_CNTX_ID are real objects.  They are
        **              copied, and then the object is re-fetched under the
        **              new process.  This insures that the object manager
        **              will consider the objects to be 'in use' by the new
        **              process, preventing them from possibly being
        **              'released', (in terms of memory address), when the
        **              old process checkpoints.
        **      3) Oops >= INIT_CNTX_ID are contexts.  Contexts are changed to
        **              nil, except if the context happens to be for the
        **              copied block; in this case, the id of the copy is
        **              substitued.
        */
        new_meth_cntx->obj_hdr          = old_meth_cntx->obj_hdr;
        new_meth_cntx->obj_hdr.id       = 0;
        new_meth_cntx->ctrl_vars        = old_meth_cntx->ctrl_vars;

        for ( i = 0; i < new_meth_cntx->obj_hdr.no_indx_vars; i++ )
        {
                if ( new_meth_cntx->ctrl_vars.temp_array[i] >= INIT_CNTX_ID )
                {
                        if ( new_meth_cntx->ctrl_vars.temp_array[i] ==
                                                        old_blk_stub->fp.id )
                        {
                                new_meth_cntx->ctrl_vars.temp_array[i] =
                                                        new_blk_stub->fp.id;
                        }
                        else
                        {
                                new_meth_cntx->ctrl_vars.temp_array[i] = nIL;
                        }
                        /* end if */
                }
                else if ( new_meth_cntx->ctrl_vars.temp_array[i] >= 0)
                {
                        add_to_proc ( new_meth_cntx->ctrl_vars.temp_array[i],
                                        to_process->region_cntr,
                                        to_process->proc_id );
                }
                /* end if */
        }
        /* end for */

        /*
        ** Build the new copy of the old block stub.  Note that the
        ** "next" and ** "id" fields have already been initialized
        ** (by init_blk_stub_stack).
        */
        new_blk_stub->vp.num_temps   = old_blk_stub->vp.num_temps;
        new_blk_stub->vp.first_bcode = old_blk_stub->vp.first_bcode;
        new_blk_stub->vp.home_cntx   = new_meth_cntx;

        /*
        ** adjust other context linkages/values
        */
#if DEBUGGER
/***************/
        new_meth_cntx->ctrl_vars.msg_id         = 0;
/***************/
#endif
        new_meth_cntx->ctrl_vars.region = 0;
        new_meth_cntx->ctrl_vars.home_cntx      = new_meth_cntx;
        new_meth_cntx->ctrl_vars.first_block    = new_blk_stub;

        /*
        ** We must re-fetch receiver and code objects under the
        ** new process id so they don't go away!!
        */
        if ( new_meth_cntx->ctrl_vars.rcvr_oop >= 0
          && new_meth_cntx->ctrl_vars.rcvr_oop < INIT_CNTX_ID )
        {
                add_to_proc ( new_meth_cntx->ctrl_vars.rcvr_oop,
                        to_process->region_cntr, to_process->proc_id);
        }
        /* end if */

        add_to_proc ( new_meth_cntx->ctrl_vars.code_ptr->fp.id,
                        to_process->region_cntr, to_process->proc_id);

        to_process->cur_cntx = new_meth_cntx;

        return ( new_blk_stub );
```

```
/*Copyright 1988 Eastman Kodak Company.  All rights reserved.*/

#include <stdio.h>
#include "types.h"
#include "constants.h"
#include "oops_values.h"
#include "macros.h"
#include "interp_const.h"
#include "interp_types.h"

extern  struct  process          Processes[];

/*--------------------------*/

blk_stub *
proc_copy_cntx2 ( old_blk_stub, to_process, rcvr_oop )

        blk_stub        *old_blk_stub;  /* The fixed block. */
        struct process  *to_process;    /* The new process. */
        oop             rcvr_oop;       /* 'self' object for this block
                                           ('self' is user's block). */
{
        int             i;
        cntx            *old_meth_cntx; /* The fixed block's home in the
                                           current process. */
        cntx            *new_meth_cntx; /* The fixed block's home in the
                                           new process. */
        blk_stub        *new_blk_stub;  /* The fixed block in the new
                                           process. */

        blk_stub        *next_blk_stub();

/*-------------------------*/
        /*
        ** This routine sets up one of the two block stub/home context
        ** pairs needed to create a new Process.  The block stub set up
        ** will be the first executable context in the new process, and
        ** corresponds to the block:
        **
        **      [self value. Processor terminateActive.]
        **
        ** This is found in the ** "newProcess" method of Class Block.
        ** The method context set up ** corresponds to that method,
        ** that is, the block's home context.  The block's home is
        ** needed so when the block executes, and references temporaries
        ** in its home, they can be resolved.  (As can be seen by
        ** looking at the above Smalltalk code, no such references occur
        ** in this block, but we copy the home anyway for completeness.)
        **
        ** The routine "proc_copy_cntx1" is similar to this one, but copies
        ** the user's block ("self" above) and its home context.
        */
        old_meth_cntx = old_blk_stub->vp.home_cntx;
        new_meth_cntx = to_process->cur_cntx->next;
        new_blk_stub  = next_blk_stub ( to_process );

        /*
        ** Now copy the values from the old context to the new.
        **
        ** Note that we nIL the temporaries of the block's home blindly,
        ** in contrast to what we do in proc_copy_cntx1().  We do this
        ** because we know what the Smalltalk code of this block is
        **
        **      [self value. Processor terminateActive.]
        **
        ** and that code contains no references to the home's temporaries,
        ** except for 'self' which is in slot 0.  We set this appropriately
        ** further down in this routine.
        */
        new_meth_cntx->obj_hdr          = old_meth_cntx->obj_hdr;
        new_meth_cntx->obj_hdr.id       = 1;
        new_meth_cntx->ctrl_vars        = old_meth_cntx->ctrl_vars;

        /*
        ** Build the new copy of the old block stub.  Note that the
        ** "next" and ** "id" fields have already been initialized
        ** (by init_blk_stub_stack).
        */
        new_blk_stub->vp.num_temps   = old_blk_stub->vp.num_temps;
        new_blk_stub->vp.first_bcode = old_blk_stub->vp.first_bcode;
        new_blk_stub->vp.home_cntx   = new_meth_cntx;

        /*
        ** adjust context linkages/values
        */
#if DEBUGGER
/***************/
        new_meth_cntx->ctrl_vars.msg_id         = 0;
/***************/
#endif
        new_meth_cntx->ctrl_vars.region = 0;
        new_meth_cntx->ctrl_vars.home_cntx      = new_meth_cntx;
        new_meth_cntx->ctrl_vars.first_block    = new_blk_stub;

        /*
        ** Note that the receiver of this method is the user's block.
        */
        new_meth_cntx->ctrl_vars.rcvr_oop =
          CONTEXT_TEMPS(new_meth_cntx)[0] = rcvr_oop;

        for ( i = 1; i < new_meth_cntx->obj_hdr.no_indx_vars; i++ )
        {
                CONTEXT_TEMPS(new_meth_cntx)[i] = nIL;
        }
        /* end for */

        /*
        ** We must re-fetch code object under the
        ** new process id so it doesn't go away!!
        */
        add_to_proc ( new_meth_cntx->ctrl_vars.code_ptr->fp.id,
                                to_process->region_cntr, to_process->proc_id);

        to_process->cur_cntx = new_meth_cntx;

        return ( new_blk_stub );
}
```

```
/*Copyright 1988 Eastman Kodak Company.  All rights reserved.*/
#include <stdio.h>
#include "types.h"
#include "constants.h"
#include "macros.h"
#include "oops_values.h"
#include "interp_const.h"
#include "interp_types.h"

extern  object  *obj_mgr();
extern  object  *reserve_obj();
extern  oop     createProcess();
extern  int     destroyProcess();

extern  unsigned short  ProcessListsIndex;
extern  unsigned short  ActiveProcessIndex;
extern  unsigned short  FirstLinkIndex;
extern  unsigned short  LastLinkIndex;
extern  unsigned short  ExcessSignalsIndex;
extern  unsigned short  NextLinkIndex;
extern  unsigned short  SuspendedContextIndex;
extern  unsigned short  PriorityIndex;
extern  unsigned short  MyListIndex;

/*
** interpreter routines for implementation of processes
*/

/*
** flag to the interpreter used to indicate possible process switch
*/

extern int Divert;

/*
** process to switch to ...
*/

int     NewProcessWaiting;
oop     NewProcess;

/*
** semaphore buffer ...
**
** needs to be big enough to handle the maximum number of asynchronously
** signaled semaphore events we ever ever expect to get at any time ...
** (remember, if a semaphore is asynchronously signaled more than once, it's
** oop will appear in this buffer more than once ... the buffer is in
** chronological order).
*/

oop     semaphoreList[SEMAPHORE_BUFFER_SIZE];
int     semaphoreIndex = 0;

/*
** "below the water line" linked list manipulation routines for
** process lists. (i.e., these routines actually manipulate the
** Smalltalk LinkedList structures) ...
*/

isEmptyList(aLinkedList)
        oop     aLinkedList;
{
        object  *aLinkedList_optr;

        if ( ( aLinkedList_optr = reserve_obj(aLinkedList, 0, 0) ) == NULL )
                syserr("isEmptyList: couldn't fetch aLinkedList (oop = %d)", aLinkedList)

        if ( aLinkedList_optr->value[FirstLinkIndex] == nIL )
                return ( 1 );
        else
                return ( 0 );
}

oop
removeFirstLinkOfList(aLinkedList)
        oop     aLinkedList;
{
        oop     firstLink;
        oop     lastLink;
        oop     nextLink;
        object  *aLinkedList_optr;
        object  *firstLink_optr;
        object  *lastLink_optr;

        if ( ( aLinkedList_optr = reserve_obj(aLinkedList, 0, 0) ) == NULL )
                syserr("removeFirstLinkOfList: couldn't fetch aLinkedList (oop = %d)", aL

        firstLink = aLinkedList_optr->value[FirstLinkIndex];
        lastLink  = aLinkedList_optr->value[LastLinkIndex];

        if ( ( firstLink_optr = reserve_obj(firstLink, 0, 0) ) == NULL )
                syserr("removeFirstLinkOfList: couldn't fetch firstLink (oop = %d)", firs

        if ( lastLink == firstLink )
        {
                aLinkedList_optr->value[FirstLinkIndex] = nIL;
                aLinkedList_optr->value[LastLinkIndex]  = nIL;
        }
        else
        {
                nextLink = firstLink_optr->value[NextLinkIndex];
                aLinkedList_optr->value[FirstLinkIndex] = nextLink;
        }

        firstLink_optr->value[NextLinkIndex] = nIL;

        /*
        ** here's where we clear the process' myList instance variable ...
        */

        firstLink_optr->value[MyListIndex] = nIL;

        aLinkedList_optr->fp.flags |= UPDATED;
        firstLink_optr->fp.flags |= UPDATED;

        return ( firstLink );
}

addLastLinkToList(aLink, aLinkedList)
        oop     aLink;
        oop     aLinkedList;
{
        oop     lastLink;
        object  *aLink_optr;
        object  *aLinkedList_optr;
        object  *lastLink_optr;
```

```
        if ( ( aLink_optr = reserve_obj(aLink, 0, 0) ) == NULL )
                syserr("addLastLinkToList: couldn't fetch aLink (oop = %d)", aLink);
        if ( ( aLinkedList_optr = reserve_obj(aLinkedList, 0, 0) ) == NULL )
                syserr("addLastLinkToList: couldn't fetch aLinkedList (oop = %d)", aLinke

        lastLink = aLinkedList_optr->value[LastLinkIndex];

        if ( isEmptyList(aLinkedList) )
        {
                aLinkedList_optr->value[FirstLinkIndex] = aLink;
        }
        else
        {
                if ( ( lastLink_optr = reserve_obj(lastLink, 0, 0) ) == NULL )
                        syserr("addLastLinkToList: couldn't fetch lastLink (oop = %d)", l

                lastLink_optr->value[NextLinkIndex] = aLink;

                lastLink_optr->fp.flags |= UPDATED;
        }

        aLinkedList_optr->value[LastLinkIndex] = aLink;

        /*
        ** here's where we set the process' myList instance variable ...
        */

        aLink_optr->value[MyListIndex] = aLinkedList;

        aLinkedList_optr->fp.flags |= UPDATED;
        aLink_optr->fp.flags |= UPDATED;
}

/*
** init_processor sets up the single instance of ProcessScheduler known
** as Processor with first_process_oop as the activeProcess.
*/

init_processor(firstProcess_oop)
        oop     firstProcess_oop;
{
        object  *Processor_optr;
        object  *processLists_optr;
        object  *linkedList_optr;
        oop dummy_old_oop = 0;
        int     i;

        /*
        ** get Processor and initialize ...
        **
        ** notes for garbage collectors ...
        **
        ** (fred is pretty highly paid for a garbage collector ... oh,
        ** he's a "sanitation engineer", EXCUUUUUUUUUSE ME!) ...
        **
        ** of the objects we deal with here, Processor, the processLists
        ** Array, and each LinkedList will be non-garbage, while Processor, and
        ** the processLists Array are updated.
        */

        if ( ( Processor_optr = reserve_obj(PROCESSOR, 0, 0) ) == NULL )
                syserr("init_processor: couldn't find Processor");

        if ( ( processLists_optr = obj_mgr(Array, NEW, PRIORITY_LEVELS, -1, 0, 0) ) == NU
                syserr("init_processor: couldn't create an Array");

        for ( i = 1; i <= PRIORITY_LEVELS; i++ )
        {
                if ( ( linkedList_optr = obj_mgr(LinkedList, NEW, 0, -1, 0, 0) ) == NULL
                        syserr("init_processor: couldn't create a LinkedList");

                ARRAY_DATA(processLists_optr)[i-1] = linkedList_optr->fp.id;
                referenced(processLists_optr, linkedList_optr->fp.id,
                  dummy_old_oop, 0, 0);
        }

        Processor_optr->value[ProcessListsIndex] = processLists_optr->fp.id;
        referenced(Processor_optr, processLists_optr->fp.id, dummy_old_oop,
          0, 0);

        Processor_optr->value[ActiveProcessIndex] = firstProcess_oop;
        referenced(Processor_optr, firstProcess_oop, dummy_old_oop, 0, 0);

        Processor_optr->fp.flags |= UPDATED;
        processLists_optr->fp.flags |= UPDATED;

        /*
        ** clear all process switching info ... (rerun cases ...)
        */

        Divert = 0;
        NewProcessWaiting = 0;

        return;
}

/*
** semaphore signaling ...
*/

asynchronousSignal(aSemaphore)
        oop     aSemaphore;
{
        semaphoreIndex++;

        if ( semaphoreIndex >= SEMAPHORE_BUFFER_SIZE )
        {
                semaphoreIndex--;

                /*
                ** lost signal ... (should we continue?  probably not ...)
                */

                fprintf(stderr,
                  "asynchronousSignal: lost signal for semaphore (oop = %d)\n",
                  aSemaphore);

                return;
        }

        semaphoreList[semaphoreIndex] = aSemaphore;

        /*
        ** interpreter may have to switch processes ...
        */

        Divert = 1;
```

```
        return;
}

synchronousSignal(aSemaphore)
        oop     aSemaphore;
{
        object  *aSemaphore_optr;

        if ( ( aSemaphore_optr = reserve_obj(aSemaphore, 0, 0) ) == NULL )
                syserr("synchronousSignal: couldn't fetch semaphore (oop = %d)", aSemapho

        if ( isEmptyList(aSemaphore) )
        {
                aSemaphore_optr->value[ExcessSignalsIndex] = INTEGER_OBJECT(
                  INTEGER_VALUE(aSemaphore_optr->value[ExcessSignalsIndex])
                   + 1);

                aSemaphore_optr->fp.flags |= UPDATED;
        }
        else
        {
                resume(removeFirstLinkOfList(aSemaphore));
        }

        return;
}

/*
** transfer notification ...
*/

transferTo(aProcess)
{
        /*
        ** interpreter will have to switch processes ...
        */

        Divert = 1;
        NewProcessWaiting = 1;
        NewProcess = aProcess;
}

/*
** processSwitch() is called by the interpreter when the Divert
** flag is detected.  it returns the oop of the process to be switched to.
*/

oop
processSwitch()
{
        object  *Processor_optr;
        oop     dummy_old_oop;

        /*
        ** deliver any asynchronously signaled semaphores events synchronously ...
        ** (i.e., finish the delivery).
        */

        while ( semaphoreIndex > 0 )
        {
                synchronousSignal(semaphoreList[semaphoreIndex]);

                semaphoreIndex--;
        }

        /*
        ** if necessary, set Processor's activeProcess to the NewProcess,
        ** and return the oop of the next process the intepreter should
        ** switch to ...
        **
        ** the only case for which the current process will not change is when
        ** we have recieved an asynchronous signal on a semaphore for which
        ** no process was waiting or for which a process at lower priority
        ** than the current process was waiting.
        */

        if ( NewProcessWaiting )
        {
                NewProcessWaiting = 0;

                if ( ( Processor_optr = reserve_obj(pROCESSOR, 0, 0) ) == NULL )
                        syserr("processSwitch: couldn't fetch Processor %d",
                                  pROCESSOR);
                Processor_optr->value[ActiveProcessIndex] = NewProcess;

                referenced(Processor_optr, NewProcess, dummy_old_oop, 0, 0);

                Processor_optr->fp.flags |= UPDATED;

                return ( NewProcess );
        }
        else
        {
                return ( (CUR_PID < 0) ? nIL : Cur_process->proc_oop );
        }
}

/*
** sleep_() and wakeHighestPriority() add and remove processes from
** Processor's process lists ... (we use sleep_() since there is already
** a unix system call sleep()).
*/

oop
wakeHighestPriority()
{
        object  *Processor_optr;
        object  *processLists_optr;
        int     priority;

        if ( ( Processor_optr = reserve_obj(pROCESSOR, 0, 0) ) == NULL )
                syserr("wakeHighestPriority: couldn't fetch Processor %d",
                          pROCESSOR);
        if ( ( processLists_optr = reserve_obj(Processor_optr->value[ProcessListsIndex],
                syserr("wakeHighestPriority: couldn't fetch Processor's processLists, %d"
                Processor_optr->value[ProcessListsIndex]);

        for (   priority = ARRAY_SIZE(processLists_optr);
                priority > 0 &&
                isEmptyList(ARRAY_DATA(processLists_optr)[priority-1]);
                priority-- );

        if ( priority <= 0 )
                return ( nIL );         /* no one to rouse */

        return ( removeFirstLinkOfList(ARRAY_DATA(processLists_optr)[priority-1]) );
}
```

```
sleep_(aProcess)
        oop     aProcess;
{
        oop     processList;
        object  *aProcess_optr;
        object  *Processor_optr;
        object  *processLists_optr;
        int     priority;

        if ( ( aProcess_optr = reserve_obj(aProcess, 0, 0) ) == NULL )
                syserr("sleep_: couldn't fetch aProcess (oop = %d)", aProcess);
        if ( ( Processor_optr = reserve_obj(pROCESSOR, 0, 0) ) == NULL )
                syserr("sleep_: couldn't fetch Processor");
        if ( ( processLists_optr = reserve_obj(Processor_optr->value[ProcessListsIndex],
                syserr("sleep_: couldn't fetch Processor's processLists %d",
                        Processor_optr->value[ProcessListsIndex]);
        priority = INTEGER_VALUE(aProcess_optr->value[PriorityIndex]);
        processList = ARRAY_DATA(processLists_optr)[priority-1];

        addLastLinkToList(aProcess, processList);

        return;
}

/*
** suspendActive(), yieldActive(), and resume() actually do the process
** switching ...
*/

yieldActive()
{
        oop     activeProcess;

        activeProcess = CURRENT_ACTIVE_PROCESS();

        sleep_(activeProcess);

        transferTo(wakeHighestPriority());

        return;
}

suspendActive()
{
        transferTo(wakeHighestPriority());

        return;
}

resume(aProcess)
        oop     aProcess;
{
        oop     activeProcess;
        object  *aProcess_optr;
        object  *activeProcess_optr;
        int     activePriority;
        int     aProcessPriority;

        activeProcess = CURRENT_ACTIVE_PROCESS();

        if ( activeProcess == nIL )
        {
                transferTo(aProcess);   /* no one else was running */
                return;
        }

        if ( ( activeProcess_optr = reserve_obj(activeProcess, 0, 0) ) == NULL )
                syserr("resume: couldn't fetch activeProcess (oop = %d)", activeProcess);
        if ( ( aProcess_optr = reserve_obj(aProcess, 0, 0) ) == NULL )
                syserr("resume: couldn't fetch aProcess %d", aProcess);

        activePriority = INTEGER_VALUE(activeProcess_optr->value[PriorityIndex]) - 1;
        aProcessPriority = INTEGER_VALUE(aProcess_optr->value[PriorityIndex]) - 1;

        if ( aProcessPriority > activePriority )
        {
                sleep_(activeProcess);
                transferTo(aProcess);
        }
        else
        {
                sleep_(aProcess);
        }

        return;
```

```
/*Copyright 1988 Eastman Kodak Company.  All rights reserved.*/
/*
** return bytecodes
*/

case SHORT_RETURN:
case LONG_RETURN:
{

        register struct returnx          *rp;
        register oop                     ret_value;
        cntx                             *a_cntx;

#if DEBUGGER
/********************/
        d_stat_stack_struct     *stats;
        long                    a_time;
        int                     i;
        cntx                    *old_cntx;
        short                   done_following_chain;
        short   .               passed_cntx;

extern  long                    meas();
/********************/
#endif DEBUGGER

/*------------------------ START OF EXECUTABLE CODE --------------------*/

#if DEBUGGER
/*********************/
        stats = &D_stat_stack(CUR_PID);         /* short-hand */
/*********************/
#endif DEBUGGER

#if SAMPLER
/*****************/
Sampler_vals[0].cur_value = 0x101;
Sampler_vals[2].cur_value = 1;
/*****************/
#endif

        rp = (struct returnx *) bcp;
        /* TCOV-BCODE * RETURN_BCODES */

        /*
        ** Get value to be returned from the array of temporaries for
        ** the current context.  If it's a block stub, objectify it first.
        */

        ret_value = CONTEXT_TEMPS(cur_cntx)[rp->msg_ret_slot];

        if ( IS_STUB (ret_value) )
                ret_value = ( objectify_block(ret_value) )->fp.id;

        /*
        ** There are three cases for a return:
        **      1) Return from a method.  We do a LONG return.  A LONG
        ** return returns to the previous logical context (caller) of the
        ** owning context (definer) of the current context.  For a method
        ** context, the owning context is itself, so a LONG return is the
        ** same as a short return.  The compiler generates a LONG return
        ** bytecode for both default returns (no '^'), and explicit
        ** returns (with '^').  The method context from which we return
        ** should be removed.
        **      2) LONG return from a block.  This happens when there is
        ** an explicit return (with a '^') in the block's source code.
        ** This should be treated the same as returning from the block's
        ** owning context.  We should remove this context.
        **      3) SHORT return from a block.  This happens when there
        ** is no explicit return (no '^') in the block's source code.
        ** This should simply return to the block's previous logical
        ** context (caller).  We should NOT remove this context because it
        ** is a block which may be re-used (as happens with a 'do:'
        ** message).
        */

#if DEBUGGER
/****************/
        old_cntx = cur_cntx;
/****************/
#endif DEBUGGER

        /*
        ** Now, perform the appropriate context switch.  Which context
        ** we switch to depends on what type of return bytecode we are
        ** handling.
        */

        if ( rp->bytecode == LONG_RETURN )
        {
                if ( cur_cntx->ctrl_vars.home_cntx->obj_hdr.class !=
                                                        RTMethodContext )
                        syserr (
        "ret_bcode:01--Can't do a long return from an objectified block" );

                Cur_process->next_blk_stub =
                        cur_cntx->ctrl_vars.home_cntx->ctrl_vars.first_block;
                cur_cntx = Cur_process->cur_cntx =
                                cur_cntx->ctrl_vars.home_cntx->prev;
        }
        else
        {
                if ( cur_cntx->ctrl_vars.my_blk_stub->fp.class == RTBlock )
                        cur_cntx->ctrl_vars.my_blk_stub->vp.active_cntx =
                                cur_cntx->ctrl_vars.prev_active_cntx;
                Cur_process->next_blk_stub = cur_cntx->ctrl_vars.first_block;
                cur_cntx = Cur_process->cur_cntx = cur_cntx->prev;
        }
        /* end if */

        /*
        **      If we are returning past contexts that need to be
        **      objectified, objectify them.
        */
        if ( cur_cntx < Cur_process->latest_objd_cntx )
        {
                /*
                ** Step back through contexts from latest to be objectified,
                ** to one to which we are returning.
                */
                a_cntx = Cur_process->latest_objd_cntx;

                do
                {
                        /*
                        ** If context is to be objectified ...
                        */
```

```
			if ( a_cntx->ctrl_vars.to_be_objd )
			{
				/*
				** ... objectify it.
				*/
				objectify_cntx ( a_cntx, cur_cntx );
			}
			/* end if */

			a_cntx = a_cntx->prev;
		}
		while ( a_cntx != cur_cntx );

		/*
		** Now, we have to update the 'latest_objd_cntx', by following
		** the context stack from the new current context back until
		** we either hit a context that needs to be objectified,
		** or we reach the bottom of the stack.
		**
		** Note that when we start this loop, a_cntx is the new
		** current context.
		*/

		while ( (a_cntx != NULL) && (!a_cntx->ctrl_vars.to_be_objd) )
		{
			a_cntx = a_cntx->prev;
		}
		/* end while */

		Cur_process->latest_objd_cntx = a_cntx;
	}
	/* end if */

	/*
	** If the context we are returning to exists, then we
	** do not do a process switch, but must do other things.  If the
	** context to which we are returning does not exist, we must be
	** done with the messages for this process; the process should be
	** destroyed.
	*/

	if ( cur_cntx != NULL )
	{
		bcp = (char *) cur_cntx->ctrl_vars.next_bcode;

		/*
		** Store away the returned value in the appropriate
		** slot in the array of temporaries for the new current
		** context.  We do this before we do any garbage
		** collection to be sure that the returned object is not
		** discarded.
		*/

		CONTEXT_TEMPS(cur_cntx)[cur_cntx->ctrl_vars.answ_slot] =
		  ret_value;

		/* We must be sure that the garbage collector does not
		   scavange objects that are returned to a calling method,
		   before that method is done with them.
		   We assure this by changing the checkpoint associated
		   with any potentially garbage object to that of the
		   'returned to' method.*/

		if ( ret_value >= First_new_obj )
				if ( Cur_process->region_cntr > CUR_GC_REGION )
				{
#if SAMPLER
/****************/
Sampler_vals[2].cur_value = 2;
/****************/
#endif

				change_region ( ret_value, CUR_PID, CUR_GC_REGION );
#if SAMPLER
/****************/
Sampler_vals[2].cur_value = 1;
/****************/
#endif

				}
		/* end if */

		/*
		** Do garbage collection if appropriate.
		**
		** "Cur_process->region_cntr" holds the current region, before
		** the return is done.  It is greater than or equal to the
		** region id of the context from which we are returning.  It
		** could be greater if the context from which we are returning
		** caused more than XXX objects to be created.
		**
		** "CUR_GC_REGION" is  "cur_cntx->ctrl_vars.region_id",
		** where "cur_cntx" is the context to which we are returning;
		** therefore, "CUR_GC_REGION" is the
		** region of the context to which we are returning.
		**
		** When deciding whether or not to do garbage collection,
		** we use "Cur_process->region_cntr - 1" rather than simply
		** "Cur_process->region_cntr" because we don't want to collect
		** garbage until at least XXX objects have been created.
		**
		** If we do garbage collection, we collect for "CUR_GC_REGION
		** + 1" rather than "CUR_GC_REGION" because we can't yet
		** collect objects for the context
		** to which we are returning - it isn't done yet!.
		**
		** Also, if we do garbage collection, we set the current
		** region (which is used for the next context created)
		** to "CUR_GC_REGION + 1" rather than simply "CUR_GC_REGION"
		** because we want to avoid "CUR_GC_REGION" getting very filled
		** with objects; this could happen if the context to which we
		** are returning is executing a loop.
		*/

		if ( Cur_process->region_cntr - 1 > CUR_GC_REGION )
		{
			/*
			** Checkpoint regular objects.
			*/

#if SAMPLER
/****************/
Sampler_vals[2].cur_value = 3;
/****************/
#endif

			collector ( CUR_GC_REGION + 1,  CUR_PID);
```

```
#if SAMPLER
/****************/
Sampler_vals[2].cur_value = 1;
/****************/
#endif
                        /*
                        ** Update checkpoint id and message count for
                        ** this process.
                        */

                        Cur_process->region_cntr = CUR_GC_REGION + 1;

                        Cur_process->obj_counter = 0;
                }

        }
        /* end if */

#if DEBUGGER
/******************/

D_cur_cntx = cur_cntx;

/*
** The following must hold for message trace to be printed out:
**
**      First, if we are in lower level methods of execution of a 'next'
**      command, DO NOT print anything.
**
**      If this is not the case, then print out message trace info in the
**      following cases:
**
**              1) message trace is on, and we're doing a long return
**              2) block trace is on, and we're returning from a block.
*/
if ( ( (cur_cntx == D_base_cntx) || (D_base_cntx == NULL) )
&&   ( ((D_ISDSET (D_MESSAGES)) && (rp->bytecode == LONG_RETURN))
     ||((D_ISDSET (D_BLOCKS)) && (old_cntx->ctrl_vars.home_cntx != old_cntx))
     ) )
{
        if ( rp->bytecode == LONG_RETURN )
        {
                printf ( "\n%2u-%6d#", CUR_PID,
                  (old_cntx->ctrl_vars.home_cntx)->ctrl_vars.msg_id );

                if ( old_cntx->ctrl_vars.home_cntx == old_cntx )
                {
                        /* long return from a method */
                        printf ( " " );
                }
                else
                {
                        /* long return from a block */
                        printf ( "L" );
                }
                /* end if */
        }
        else /* short return */
        {
                printf ( "\n%2u-SBLOCK# ",
                           CUR_PID );
        }
        /* end if */

        /* Indentation level indicates nesting of message sends */
        for ( i = 0; i < old_cntx->obj_hdr.id; i++ )
        {
                printf ( "  " );
        }
        /* end for */

        printf ( "ANSWER: %d\n", ret_value );
}
/* end if */
/**************** HANDLE MESSAGE STATISTICS ****************/

if ( (rp->bytecode == LONG_RETURN) && (D_ISCSET (D_STAT)) )
{
        /* RECORD THE TIME NOW */
        a_time = meas ( 0 );

        if ( cur_cntx != NULL )         /* INTERP NOT DONE */
        {
                if ( (stats->top_msg != NULL) )
/*                && (stats->top_msg->id != cur_cntx->ctrl_vars.msg_id) ) */
                {
                        /* ALWAYS POP TOP MESSAGE (IF THERE IS ONE),
                           AND CHARGE CUM_TIME TO IT */

                        stats->top_msg->cum_time +=
                                ( a_time - stats->top_msg->time_stamp );
                        stats->top_msg->elap_time +=
                                ( a_time - stats->top_msg->start_time );

                        d_stat_tab_insert ( stats->top_msg );
                        d_stat_stack_pop ( stats );


                        /* ON LONG RETURNS, ALSO POP UNTIL CURRENTLY EXECUTING
                           MESSAGE IS ON TOP, BUT DON'T CHARGE CUM_TIME TO THESE
                           POPPEES */

                        while ( (stats->top_msg != NULL)
                             && (stats->top_msg->id !=
                                          cur_cntx->ctrl_vars.msg_id) )
                        {
                                stats->top_msg->elap_time +=
                                        ( a_time - stats->top_msg->start_time );

                                d_stat_tab_insert ( stats->top_msg );
                                d_stat_stack_pop ( stats );
                        }
                        /* end while */


                        /* IF THERE'S STILL A TOP MESSAGE, RE-START ITS CLOCK */

                        if ( stats->top_msg != NULL )
                        {
                                stats->top_msg->time_stamp = a_time;
                        }
                        /* end if */
                }
                /* end if */
        }
        else                            /* INTERP IS DONE: ADJUST AND POP
                                           TOP MESSAGE ONLY, IF THERE IS ONE */
```

```
        {
                if ( stats->top_msg != NULL)
                {
                        stats->top_msg->cum_time +=
                                ( a_time - stats->top_msg->time_stamp );
                        stats->top_msg->elap_time +=
                                ( a_time - stats->top_msg->start_time );

                        d_stat_tab_insert ( stats->top_msg );
                        d_stat_stack_pop ( stats );
                }
                /* end if */
        }
        /* end if */
}
/* end if */

/**************** HANDLE DEBUGGER RETURN COMMAND ****************/

if ( (D_ISCSET (D_RETURN))
&&   (D_ret_from.proc_id == CUR_PID) )
{
        if ( old_cntx == D_ret_from.cntx )
        /* Simple check */
        {
                printf ( "\n*** Returned from context %d to context %d",
                                        D_ret_from.cntx->obj_hdr.id,
                                        D_cur_cntx->obj_hdr.id );

                D_CRESET ( D_RETURN );
                debugger ( );
        }

        else if ( (rp->bytecode == LONG_RETURN)
              &&   (D_cur_cntx < D_ret_from.cntx) )
        /* Must check for long returns which go past the context
           from which we want to return. */
        {
printf ( "\n*** Returned from context %d PAST context %d to context %d",
                                        old_cntx->obj_hdr.id,
                                        D_ret_from.cntx->obj_hdr.id,
                                        D_cur_cntx->obj_hdr.id );

                D_CRESET ( D_RETURN );
                debugger ( );
        }
        /* end if */
}
/* end if (D_RETURN set) */

/**************** HANDLE DEBUGGER NEXT_MSG COMMAND ****************/

if ( cur_cntx < D_base_cntx )
{
        printf ("\n*** Returned from scope of NEXT command - scope adjusted\n");
        D_base_cntx = cur_cntx;
}
/* end if */

/******************/
#endif

        /*
        ** Now we can destroy the current process, if it has completed.
        */

        if ( cur_cntx == NULL )
        {

#if DEBUGGER
/*****************/
                if ( D_ISDSET (D_PROCESSES) )
                {
                        printf ( "\n*** PROCESS FINISHED: %2u\n", CUR_PID);
                }
                /* end if */
/*****************/
#endif

                suspendActive();
                destroyProcess(Cur_process->proc_oop);
        }

#if SAMPLER
/*****************/
Sampler_vals[0].cur_value = 0;
Sampler_vals[2].cur_value = 0;
/*****************/
#endif
}

break;
```

```
/*Copyright 1988 Eastman Kodak Company.  All rights reserved.*/
#include "sampler_const.h"
#include "sampler_types.h"
#include "sampler_externs.h"

void    sampler ( )

{
        short   test_num;

/*------------------*/

        for ( test_num = 0; test_num < S_MAX_TESTS; test_num++ )
        {
                sampler_tally ( test_num );
        }

        return;
}

/**************************************************************************/


        sampler_tally ( test_num )

                short           test_num;
{
                short           entry_num;
                short           not_found;

*/*------------------*/

        /* SEE IF THE KEY FOR THE RECORD TO BE INSERTED IS ALREADY THERE */

        for ( entry_num = 0;
          Sampler_data[test_num][entry_num].descr[0]; entry_num++ )
        {
                if ( Sampler_data[test_num][entry_num].key ==
                  Sampler_vals[test_num].cur_value )
                {
                        /* IF KEY THERE, UPDATE ASSOCIATED TALLY */

                        Sampler_data[test_num][entry_num].tally++;

                        break;
                }
                /* endif */
        }
        /* endfor */

        Sampler_vals[test_num].total_tallies++;

        if ( !Sampler_data[test_num][entry_num].descr[0] )
        {
                if ( &Sampler_data[test_num][entry_num]
                  - &Sampler_data[test_num][0] >= S_MAX_ENTRIES )
                {
                        /* IF KEY NOT THERE, AND TABLE FULL, IT'S AN ERROR */

                        printf ( "** Sampler table #%d is full **\n", test_num );
                        sampler_print ();
                        exit(0);
                }
                /* end if */

                /* OTHERWISE, ADD A NEW ENTRY FOR THIS NEW KEY */

                Sampler_data[test_num][entry_num].key =
                  Sampler_vals[test_num].cur_value;
                Sampler_data[test_num][entry_num].tally = 1;
                sprintf(Sampler_data[test_num][entry_num].descr,
                  "unknown item %d", Sampler_vals[test_num].cur_value);

        }
        /* endif */


        return;
}

/**************************************************************************/

        sampler_print ( )

{
        short           entry_num;
        short           test_num;

/*------------------*/

        for ( test_num = 0; test_num < S_MAX_TESTS; test_num++ )
        {
                printf ( "\n\n%s\n\n", Sampler_vals[test_num].descr );

                for ( entry_num = 0;
                  Sampler_data[test_num][entry_num].descr[0]; entry_num++ )
                {
                        printf ( "\t%s\t%d\t%2.2f %%\n",
                                Sampler_data[test_num][entry_num].descr,
                                Sampler_data[test_num][entry_num].tally,
                                Sampler_data[test_num][entry_num].tally * 100.0
                                   / Sampler_vals[test_num].total_tallies );
                }
                /* end for */
        }
        /* end for */

        printf ( "\n" );

        return;
}
```

```
/*Copyright 1988 Eastman Kodak Company.  All rights reserved.*/
/*
** send message bytecode
*/

extern unsigned short CMNoParmsIndex;
extern unsigned short CMNoTempsIndex;
extern unsigned short CMMethTypeIndex;
extern unsigned short CMOptDataIndex;

#define PORB            (SM(bcp)->likely_prim_or_bcode)

/*
** isprim(x) checks whether x is a valid primitive number, where x
** MUST be a c-language short!!!
**
** the gyrations we go through with MAX_PRIM are to insure that the
** compiler generates a short quantity for the mask, (rhs of the '&').
*/

#define isprim(x)       \
        ( !( (x) & (~(MAX_PRIM - 1) & 0x0000ffff) ) )

/*
** SEND_PRIM converts the current send_msg bytecode into an
** execute_primitive bytecode, and transfers control directly
** to the EXECUTE_PRIMITIVE case to invoke it (except when compiled
** with RAID on).
*/

#if DEBUGGER
/****************/
#define SEND_PRIM       \
{                                                        \
        bcp = (char *) &SM(bcp)->likely_prim_or_bcode;   \
        replace_send = 1;                                \
        goto send_end;                                   \
}
/****************/
#else
/****************/
#define SEND_PRIM       \
{                                                               \
        bcp = (char *) &SM(bcp)->likely_prim_or_bcode;          \
        goto prim;                                              \
}
/****************/
#endif DEBUGGER


/*
** SEND_A54 converts the current send_msg bytecode into an
** assign54 bytecode, and executes it.
*/

#if DEBUGGER
/****************/
#define SEND_A54        \
{                       \
        CONTEXT_TEMPS(cur_cntx)[SM(bcp)->put_answ_slot] =        \
          INSTANCE_VARS(rcvr)[SM(bcp)->likely_meth_or_islot];    \
        bcp += SM_SIZE;                                          \
        replace_send = 1;                                        \
        goto send_end;                                           \
}
/****************/
#else
/****************/
#define SEND_A54        \
{                       \
        CONTEXT_TEMPS(cur_cntx)[SM(bcp)->put_answ_slot] =        \
          INSTANCE_VARS(rcvr)[SM(bcp)->likely_meth_or_islot];    \
        bcp += SM_SIZE;                                          \
        break;                                                   \
}
/****************/
#endif DEBUGGER


/*
** SEND_HIT performs cache hit processing, which involves locking down
** the method object via reserve_obj(), (versus searching for the method
** object via fetch_method()), before the rest of the normal send message
** processing.
*/

#define SEND_HIT        \
{                       \
        meth_obj = reserve_obj(SM(bcp)->likely_meth_or_islot,            \
          Cur_process->region_cntr, CUR_PID );                           \
        if ( meth_obj == NULL )                                          \
                syserr("send_msg:01--likely method not found: %d %s %d",\
                  rcvr_id, get_symbol_string(SM(bcp)->hashed_selector,  \
                  Cur_process->region_cntr, CUR_PID), SM(bcp)->super_flag);\
        goto send_normal;                                                \
}



case SEND_MESSAGE:

send_message:

{
        register object                 *rcvr;
        register object                 *meth_obj;
        /* register struct      cntx_ctrl       *c; */
        register oop                    rcvr_id;
        register oop                    rcvr_class;
        register int                    bcode_index;
        int                             i;

#if DEBUGGER
/*******************/
        int     replace_send = 0;
        long    debug_msg_id;   /* msg_id for this process */
        short   d_stop_num;     /* array index to D_stop_in_data */
struct  msg_rec *msg_rec_ptr;   /* pointer to a statistics record for
                                   this message */
        d_stat_stack_struct
                *stats;         /* pointer to statistics info for this
                                   process */
        long    a_time;         /* a point in time in the execution of
                                   the interpreter */
        cntx    *old_cntx;      /* the sender of this message */
```

```
        long    meas ( );       /* routine which calculates how much cpu
                                   time has elapsed since a given time */
        char    *malloc ( );    /* allocates space for the statistic
                                   record for this message. */
struct  send_message
                *smp;           /* pointer to this bytecode BEFORE updating */
        oop     meth_class;

        char    *get_class_name ();
/*******************/
#endif

/*-------------------------------------------------------------------------*/

#if SAMPLER
/****************/
        Sampler_vals[0].cur_value = 0x100;
        Sampler_vals[1].cur_value = 1;
/****************/
#endif

#if DEBUGGER
/****************/
        /* Save pointer to current bytecode - needed later in this routine */
        smp = SM(bcp);

        /* Increment msg_id for this process */
        debug_msg_id = ++Processes[CUR_PID].msg_id;     /* short-hand */

        /* Save pointer to sending context */
        old_cntx = cur_cntx;

        /* Update line number in sending context */
        old_cntx->ctrl_vars.linenum = smp->linenum;
/****************/
#endif

        rcvr_id = CONTEXT_TEMPS(cur_cntx)[SM(bcp)->arg_start_slot];

        /* TCOV-BCODE * SEND_MSG_BCODE a */

        if ( rcvr_id < 0 )
        {
                /*
                ** positive integer instance ...
                **
                ** if cache is valid and flattened primitive is present,
                ** get to it!
                */

                if ( SM(bcp)->likely_class == Integer )
                {
                        if ( isprim(PORB) )
                        {
#if SAMPLER
/****************/

                                Sampler_vals[1].cur_value = 0;
                                Sampler_vals[0].cur_value = 0;

/****************/
#endif

                                SEND_PRIM
                                /* TCOV-REPLACE-SEND * PRIM b */
                        }
                        else if ( PORB == -1 )
                        {
#if SAMPLER
/****************/

                                Sampler_vals[1].cur_value = 4;

/****************/
#endif

                                SEND_HIT
                                /* TCOV-CACHE * RESERVED METHOD c */
                        }
                        else
                        {
                                syserr (
    "send_msg:04a--Tried to send and 'inst-var-return' method to an Integer" );
                        }
                }
                else
                {
                        rcvr_class = Integer;
                        goto send_miss;
                }
        }
        else if ( rcvr_id >= INIT_CNTX_ID )
        {
                /*
                ** block instance ...
                **
                ** if cache is valid and flattened primitive is present,
                ** get to it!
                */

                if ( SM(bcp)->likely_class == RTBlock )
                {
                        if ( isprim(PORB) )
                        {
#if SAMPLER
/****************/

                                Sampler_vals[1].cur_value = 0;
                                Sampler_vals[0].cur_value = 0;

/****************/
#endif

                                SEND_PRIM
                                /* TCOV-REPLACE-SEND * PRIM d */
                        }
                        else if ( PORB == -1 )
                        {
#if SAMPLER
/****************/

                                Sampler_vals[1].cur_value = 4;

/****************/
#endif

                                SEND_HIT
                                /* TCOV-CACHE * RESERVED METHOD e */
                        }
                        else
                        {
                                syserr (
    "send_msg:04b--Tried to send and 'inst-var-return' method to a Block" );
                        }
                }
                else
                {
                        rcvr_class = RTBlock;
                        goto send_miss;
                }
```

```
	}

	/*
	** normal receiver object ...
	**
	** see if we already have it, check the cache, and send
	*/

	if ( rcvr_id == cur_cntx->ctrl_vars.rcvr_oop )
	{
		rcvr = cur_cntx->ctrl_vars.rcvr_ptr;
		/* TCOV-RCVR * RE-USED RECEIVER f */
	}
	else
	{
#if SAMPLER
/****************/
		Sampler_vals[1].cur_value = 2;
/****************/
#endif
		rcvr = reserve_obj(rcvr_id, Cur_process->region_cntr, CUR_PID);
		/* TCOV-RCVR * RESERVED RECEIVER g */
#if SAMPLER
/****************/
		Sampler_vals[1].cur_value = 1;
/****************/
#endif

		if ( rcvr == NULL )
			syserr("send_msg:03--Rcvr of msg not found: %d %s %d",
			  rcvr_id, get_symbol_string(SM(bcp)->hashed_selector,
			  Cur_process->region_cntr, CUR_PID),
			  SM(bcp)->super_flag);
	}

	rcvr_class = rcvr->fp.class;

	if ( SM(bcp)->likely_class ==  rcvr_class && rcvr_class != rcvr_id
	  || SM(bcp)->likely_class == -rcvr_class && rcvr_class == rcvr_id )
	{
		if ( isprim(PORB) )
		{
#if SAMPLER
/****************/
			Sampler_vals[1].cur_value = 0;
			Sampler_vals[0].cur_value = 0;
/****************/
#endif

			SEND_PRIM
			/* TCOV-REPLACE-SEND * PRIM h */
		}
		else if ( PORB == -1 )
		{
#if SAMPLER
/****************/
				Sampler_vals[1].cur_value = 4;
/****************/
#endif

				SEND_HIT
				/* TCOV-CACHE * RESERVED METHOD i */
		}
		else
		{
			SEND_A54
					/* TCOV-REPLACE-SEND * ASSIGN54 k */
			}
	}
	/* endif */

send_miss:

	/*
	** SEND_MISS performs cache miss processing, which involves fetching
	** the method object via fetch_method(), filling in the cache fields,
	** and re-checking for primitive/instance variable method flattening
	** before the rest of the normal send message processing.
	*/
#if SAMPLER
/****************/
	Sampler_vals[1].cur_value = 5;
/****************/
#endif
	meth_obj = fetch_method ( SM(bcp)->hashed_selector, rcvr_class,
				SM(bcp)->super_flag,
				(rcvr_class != rcvr_id) ? INST_MSG : CLASS_MSG,
				Cur_process->region_cntr, CUR_PID );
#if SAMPLER
/****************/
	Sampler_vals[1].cur_value = 1;
/****************/
#endif

	if ( meth_obj == NULL )
		syserr("send_msg:02--method not found: %d %s %d",
		  rcvr_id, get_symbol_string(SM(bcp)->hashed_selector,
		  Cur_process->region_cntr, CUR_PID), SM(bcp)->super_flag );

	SM(bcp)->likely_class =
			(rcvr_class != rcvr_id) ? rcvr_class : -rcvr_class ;
	SM(bcp)->likely_meth_or_islot = meth_obj->fp.id;

	if ( INSTANCE_VARS(meth_obj)[CMMethTypeIndex] == INST_METH )
	{
		SM(bcp)->likely_prim_or_bcode = ASSIGN5FROM4;
		SM(bcp)->likely_meth_or_islot =
		  INSTANCE_VARS(meth_obj)[CMOptDataIndex];

		/* TCOV-CACHE * FETCHED METHOD, THEN REPLACED * ASSIGN54 l */
		/* TCOV-REPLACE-SEND * ASSIGN54 m */

		SEND_A54;
	}
	else if ( INSTANCE_VARS(meth_obj)[CMMethTypeIndex] == PRIM_METH )
	{
		SM(bcp)->likely_prim_or_bcode =
		  INSTANCE_VARS(meth_obj)[CMOptDataIndex];

		/* TCOV-CACHE * FETCHED METHOD, THEN REPLACED * PRIMITIVE n */
		/* TCOV-REPLACE-SEND * PRIM o */

#if SAMPLER
/****************/
		Sampler_vals[1].cur_value = 0;
		Sampler_vals[0].cur_value = 0;
/****************/
#endif
		SEND_PRIM;
	}
```

```
        else
        {
                SM(bcp)->likely_prim_or_bcode = -1;

                /* TCOV-CACHE * FETCHED METHOD, NO REPLACE p */
        }
        /* end if */


send_normal:
        /*
        ** normal send message machinery ...
        **
        ** this section of code is duplicated in send_param_msg_bcode.c.
        ** perhaps it will be wise to make it a macro, but for now,
        ** debugging is easier if it is not!
        */

        /*
        ** Save the value which is a slot in the temporaries of the
        ** current context.  This value is saved as a field in the cntx
        ** itself.  When a "return" bytecode is encountered for this
        ** message, the routine that handles it will then put the oop to
        ** be returned into the slot identified by this value.
        */

#if SAMPLER
/****************/
        Sampler_vals[1].cur_value = 3;
/****************/
#endif
        cur_cntx->ctrl_vars.answ_slot = SM(bcp)->put_answ_slot;

        /*
        ** update the bytecode pointer for the current context before
        ** switching to the new one.
        */

        cur_cntx->ctrl_vars.next_bcode = (unsigned short *) (bcp + SM_SIZE);

        /*
        ** switch contexts ...
        */

        if ( ( Cur_process->cur_cntx = cur_cntx = cur_cntx->next ) == NULL )
                syserr("send_msg:05--No more contexts available");

        /*
        ** Build a method context for this message, and make it the
        ** current context.  THIS IS THE IN-LINE VERSION OF
        ** bld_meth_cntx AND fill_meth_cntx.
        */

        /* build fixed part of context as if it were an object */

        cur_cntx->obj_hdr.no_indx_vars  = meth_obj->value[CMNoTempsIndex];
        cur_cntx->obj_hdr.class         = RTMethodContext;

        /* build part of context which contains info specific to
           context objects */

        /* c = &(cur_cntx->ctrl_vars);  /* shorthand */

        /* c->answ_slot is set when this new context sends a message  */

        /* c->region is set below in the check-pointing logic */

        bcode_index      = meth_obj->fp.no_named_vars;
        cur_cntx->ctrl_vars.next_bcode   = (bcode *) &(meth_obj->value[bcode_index]);
        cur_cntx->ctrl_vars.region       = Cur_process->region_cntr;
        cur_cntx->ctrl_vars.first_block  = Cur_process->next_blk_stub;
        cur_cntx->ctrl_vars.code_ptr     = meth_obj;
        cur_cntx->ctrl_vars.rcvr_oop     = rcvr_id;
        cur_cntx->ctrl_vars.rcvr_ptr     = rcvr;
        cur_cntx->ctrl_vars.home_cntx    = cur_cntx;
        cur_cntx->ctrl_vars.to_be_objd   = NULL;

#if DEBUGGER
/***************/
        cur_cntx->ctrl_vars.msg_id      = debug_msg_id;
        cur_cntx->ctrl_vars.linenum     = 0;
        cur_cntx->ctrl_vars.msg_type    = (rcvr_class != rcvr_id) ? INST_MSG : CLASS_MSG;
/***************/
#endif
        /*
        ** Check that number of temps passed in is same as number
        ** expected by the bytecode object.  THIS IS THE IN-LINE
        ** VERSION OF load_cntx_temps.
        */

        if ( meth_obj->value[CMNoParmsIndex] != SM(bcp)->num_args )
                syserr("send_msg:06--Number of temps passed in (%d) not number expected (
                  SM(bcp)->num_args, meth_obj->value[CMNoParmsIndex]);

        /*
        ** Load the temporaries and set the active bytecode pointer.
        */

        bcopy(&cur_cntx->prev->ctrl_vars.temp_array[SM(bcp)->arg_start_slot],
                                &cur_cntx->ctrl_vars.temp_array[0],
                                SM(bcp)->num_args * sizeof(oop));

        for ( i = SM(bcp)->num_args; i < cur_cntx->obj_hdr.no_indx_vars; i++ )
        {
                CONTEXT_TEMPS(cur_cntx)[i] = nil;
        }
        /* end for */

        bcp = (char *) cur_cntx->ctrl_vars.next_bcode;

send_end:


#if DEBUGGER
/*************************/
if ( !replace_send )
{
        /* Message stats not done for replaced messages */

        D cur cntx = cur_cntx;

        /***************** HANDLE MESSAGE STATS ************************/

        if ( D ISSET ( D_STAT ) )
        {
                a_time = meas ( 0 );
                stats = &D_stat_stack[CUR_PID];         /* temp pointer */

                /*
```

```
        ** Build record for this new message
        */
        msg_rec_ptr =
                (struct msg_rec *) malloc ( sizeof ( struct msg_rec ) );

        msg_rec_ptr->id              = debug_msg_id;
        msg_rec_ptr->self_selector = smp->hashed_selector;
        msg_rec_ptr->self_class    =
                meth_obj->value(name_to_slot(meth_obj->[p.class,
                                                "classOop"]);
        msg_rec_ptr->start_time = a_time;
        msg_rec_ptr->elap_time  = 0;
        msg_rec_ptr->time_stamp = a_time;
        msg_rec_ptr->cum_time   = 0;

        if ( stats->top_msg != NULL )
        {
                msg_rec_ptr->par_selector  =
                        (stats->top_msg)->self_selector;
                msg_rec_ptr->par_class     =
                        (stats->top_msg)->self_class;
                (stats->top_msg)->cum_time +=
                        ( a_time - (stats->top_msg)->time_stamp );
        }
        else
        {
                msg_rec_ptr->par_selector  = 0;
                msg_rec_ptr->par_class     = 0;
        }
        /* end if */

        /*
        ** Push the new record onto the msg stats stack.
        */
        d_stat_stack_push ( msg_rec_ptr, stats );
    }
    /* endif */

}
/* end if */

/****************** HANDLE MESSAGE TRACE *********************/

/*
** Don't print message trace if we're currently processing a 'next_msg' and
** this message is a lower-level message.
*/

if ( ( D_ISDSET (D_MESSAGES) )
&&   ( (old_cntx == D_base_cntx) || (D_base_cntx == NULL) ) )
{
    /* PRINT CURRENT PROCESS AND MESSAGE ID'S */

    printf ( "\n%2u-%6d@ ", CUR_PID, debug_msg_id );


    /* INDENT TO INDICATE NESTING OF MESSAGE SENDS */

    for ( i = 0; i < cur_cntx->obj_hdr.id; i++ )
        {
        printf ( "  " );
        }
    /* end for */

    if ( replace_send )
    {
        printf ( "  " );
    }
    /* end if */


    /* PRINT MESSAGE ABOUT TO BE SENT, AND RECEIVER'S OOP */

    if ( replace_send )
    {
        printf ( "%s ( ) >> %s   (CNTX#NONE  MSG#%d  LINE#%d)",
                    get_class_name ( smp->likely_class ),
                    get_symbol_string ( smp->hashed_selector ),
                    debug_msg_id,
                    smp->linenum );
    }
    else
    {
        d_print_msg ( cur_cntx );
    }
    /* end if */

    printf ( "\n" );
    printf ( "                SENT TO: %d\n", rcvr_id );


    /* PRINT MESSAGE ARGUMENTS */

    printf ( "                ARGS: " );
    if ( smp->num_args <= 1 )
    {
        printf ( "NONE" );
    }
    else
    {
        for ( i = 1; i < smp->num_args; ++i )
        {
            printf ( "%d ",
                CONTEXT_TEMPS(old_cntx)[smp->arg_start_slot+i] );
        }
        /* end for */
    }
    /* end if */
    printf ( "\n" );


    /* PRINT WHERE MESSAGE IS BEING SENT FROM */

    printf ( "                FROM: " );
    if  ( replace_send )
    {
        d_print_msg ( cur_cntx );
    }
    else
    {
        d_print_msg ( cur_cntx->prev );
    }
    /* end if */
    printf ( "\n" );


    /*
    ** Indicate if message is being replaced, and if so, by what.
```

```
*/
if ( replace_send )
{
        printf ( "              CONVERTED TO: " );

        if ( smp->likely_prim_or_bcode == ASSIGN5FROM4 )
        {
                printf ( "ASSIGN54 answ: %d / rcvr: %d  var#: %d\n",
                                smp->put_answ_slot,
                                smp->arg_start_slot,
                                smp->likely_meth_or_islot );
        }
        else
        {
                printf ( "PRIMITIVE %d\n", smp->likely_prim_or_bcode );
        }
        /* end if */

    }
    /* end if */
}
/* end if */

/**************** HANDLE STOP_IN, GOTO, AND NEXT ****************/

    /*
    ** Get oop of receiver's class.
    */
    if ( rcvr_id < 0 )
    {
            rcvr_class = Integer;
    }
    else if ( rcvr_id >= INIT_CNTX_ID )
    {
            rcvr_class = RTBlock;
    }
    /* endif */


    if ( D_stop_in_data.num_stops > 0 )
    {
            /*
            ** Get oop of class in which message was (or would have been)
            ** resolved.
            */
            if ( replace_send )
            {
                    D_CSET ( D_MSG_REPLACED );

                    if ( smp->likely_prim_or_bcode == ASSIGN5FROM4 )
                    {
                        meth_obj = fetch_method (smp->hashed_selector,
                            rcvr_class,
                            smp->super_flag,
                            (rcvr_class != rcvr_id) ? INST_MSG : CLASS_MSG,
                            Cur_process->region_cntr, CUR_PID );
                    }
                    else
                    {
                        meth_obj = get_obj ( smp->likely_meth_or_islot,
                                        Cur_process->region_cntr,
                                        CUR_PID );
                    }
                            /* end if */

                            if (meth_obj == NULL)
                                    syserr (
                            "bad meth_obj while checking stop_in in send_msg" );
                    }
                    /* end if */

                    meth_class =
                    meth_obj->value[ name_to_slot( CompiledMethod, "classOop" ) ];

                    /*
                    ** Determine which of user's stops we are at, if any.
                    */
                    d_stop_num = d_find_stop ( meth_class, rcvr_class,
                                                smp->hashed_selector );
            }
            else
            {
                    d_stop_num = -1;
            }
            /* end if */

            if ( d_stop_num > 0 )                               /* STOP_IN */
            {
                    d_print_stop ( d_stop_num );
            }
            /* end if */

            if ( ( d_stop_num > 0 )                             /* STOP_IN */
            ||   ( (D_goto_skip.msg_id == debug_msg_id)
                 &&(D_goto_skip.proc_id == CUR_PID) )           /* GOTO and SKIP */
            ||   ( D_ISCSET (D_MSG_STEP) )                      /* MSG_STEP */
            ||   ( old_cntx == D_base_cntx ) )                  /* NEXT_MSG */
            {
                    D_CRESET ( D_MSG_STEP );
                    debugger ( );
            }
            /* end if */

            if ( smp->likely_prim_or_bcode == ASSIGN5FROM4 )
            {
                    D_CRESET ( D_MSG_REPLACED );
            }
            /* end if */

/*************** HANDLE SIMULATED ANSWER FOR ASSIGN54 CASE ***************/

            if ( ( smp->likely_prim_or_bcode == ASSIGN5FROM4 )
            &&   ( D_ISDSET (D_MESSAGES) )
            &&   ( (cur_cntx == D_base_cntx) || (D_base_cntx == NULL) ) )
            {
                    printf ( "\n%2u-%6d# ", CUR_PID, debug_msg_id);

                    for ( i = 0; i <= cur_cntx->obj_hdr.id; i++ )
                            {
                            printf ( "  " );
                            }
                    /* end for */

                    printf ( "ANSWER: %d\n",
                CONTEXT_TEMPS(cur_cntx)[smp->put_answ_slot] );
            }
            /* end if */
```

```
/*************** HANDLE RAID 'return' COMMAND FOR ASSIGN54 CASE ************/

        if ( ( D_ISCSET (D_RET_FROM_REPLACED_MSG) )
        &&   ( smp->likely_prim_or_bcode == ASSIGN5FROM4 ) )
        {
                printf ( "\n*** Returned from message replaced by ASSIGN54" );
                D_CRESET ( D_RET_FROM_REPLACED_MSG );
                debugger ( );
        }
        /* end if */

/***************/
#endif

#if SAMPLER
/*****************/
Sampler_vals[1].cur_value = 0;
Sampler_vals[0].cur_value = 0;
/*****************/
#endif

break;
}
```

```
/*Copyright 1988 Eastman Kodak Company.  All rights reserved.*/
/*
** send optimisitic message bytecodes
*/

case SEND_MESSAGE_ADD:
{
        register int integer1;
        register int integer2;

#if SAMPLER
/****************/
Sampler_vals[0].cur_value = 0x10c;
/****************/
#endif

        integer1 = CONTEXT_TEMPS(cur_cntx)[SM(bcp)->arg_start_slot];
        integer2 = CONTEXT_TEMPS(cur_cntx)[SM(bcp)->arg_start_slot+1];

        /* TCOV-BCODE * SEND_ADD_BCODE */

        /*
         * we optimize for positive integers, (represented as negative oops).
         */

        if (integer1 >= 0 || integer2 >= 0)
                goto send_message;

        integer1 += integer2;

        if (integer1 < 0)
                CONTEXT_TEMPS(cur_cntx)[SM(bcp)->put_answ_slot] = integer1;
        else if (integer1 == 0)
                CONTEXT_TEMPS(cur_cntx)[SM(bcp)->put_answ_slot] = zERO;
        else
                goto send_message;      /* restart ... */

        bcp += SM_SIZE;

#if SAMPLER
/****************/
Sampler_vals[0].cur_value = 0;
/****************/
#endif
}

break;

case SEND_MESSAGE_ADD1:
{
        register int integer1;

#if SAMPLER
/****************/
Sampler_vals[0].cur_value = 0x10f;
/****************/
#endif

        integer1 = CONTEXT_TEMPS(cur_cntx)[SM(bcp)->arg_start_slot];

        /* TCOV-BCODE * SEND_ADD1_BCODE */

        /*
         * we optimize for positive integers, (represented as negative oops).
         */

        if (integer1 < 0)
                CONTEXT_TEMPS(cur_cntx)[SM(bcp)->put_answ_slot] = integer1 - 1;
        else if (integer1 == zERO)
                CONTEXT_TEMPS(cur_cntx)[SM(bcp)->put_answ_slot] = -1;
        else
                goto send_message;      /* restart ... */

        bcp += SM_SIZE;

#if SAMPLER
/****************/
Sampler_vals[0].cur_value = 0;
/****************/
#endif
}

break;

case SEND_MESSAGE_SUB:
{
        register int integer1;
        register int integer2;

#if SAMPLER
/****************/
Sampler_vals[0].cur_value = 0x10d;
/****************/
#endif

        integer1 = CONTEXT_TEMPS(cur_cntx)[SM(bcp)->arg_start_slot];
        integer2 = CONTEXT_TEMPS(cur_cntx)[SM(bcp)->arg_start_slot+1];

        /* TCOV-BCODE * SEND_SUB_BCODE */

        /*
         * we optimize for positive integers, (represented as negative oops).
         */

        if (integer1 >= 0 || integer2 >= 0)
                goto send_message;

        integer1 -= integer2;

        if (integer1 < 0)
                CONTEXT_TEMPS(cur_cntx)[SM(bcp)->put_answ_slot] = integer1;
        else if (integer1 == 0)
                CONTEXT_TEMPS(cur_cntx)[SM(bcp)->put_answ_slot] = zERO;
        else
                goto send_message;      /* restart ... */

        bcp += SM_SIZE;

#if SAMPLER
/****************/
Sampler_vals[0].cur_value = 0;
/****************/
#endif
}

break;
```

```
case SEND_MESSAGE_SUB1:
{
        register int integer1;

#if SAMPLER
/****************/
Sampler_vals[0].cur_value = 0x110;
/****************/
#endif

        integer1 = CONTEXT_TEMPS(cur_cntx)[SM(bcp)->arg_start_slot];

        /* TCOV-BCODE * SEND_SUB1_BCODE */

        /*
         * we optimize for positive integers, (represented as negative oops).
         */

        if (integer1 < -1)
                CONTEXT_TEMPS(cur_cntx)[SM(bcp)->put_answ_slot] = integer1 + 1;
        else if (integer1 == -1)
                CONTEXT_TEMPS(cur_cntx)[SM(bcp)->put_answ_slot] = zERO;
        else
                goto send_message;      /* restart ... */

        bcp += SM_SIZE;

#if SAMPLER
/****************/
Sampler_vals[0].cur_value = 3;
/****************/
#endif
}

break;

case SEND_MESSAGE_EQ:
{
        register int integer1;
        register int integer2;

#if SAMPLER
/****************/
Sampler_vals[0].cur_value = 0x10e;
/****************/
#endif

        integer1 = CONTEXT_TEMPS(cur_cntx)[SM(bcp)->arg_start_slot];
        integer2 = CONTEXT_TEMPS(cur_cntx)[SM(bcp)->arg_start_slot+1];

        /* TCOV-BCODE * SEND_EQ_BCODE */

        /*
         * we optimize for positive integers, (represented as negative oops).
         */

        if (integer1 < 0 || integer1 == zERO)
                if (integer1 == integer2)
                        CONTEXT_TEMPS(cur_cntx)[SM(bcp)->put_answ_slot] = tRUE;
                else
                        CONTEXT_TEMPS(cur_cntx)[SM(bcp)->put_answ_slot] = fALSE;
        else
                goto send_message;      /* restart ... */

        bcp += SM_SIZE;

#if SAMPLER
/****************/
Sampler_vals[0].cur_value = 0;
/****************/
#endif
}

break;
```

```
/*Copyright 1988 Eastman Kodak Company.  All rights reserved.*/
/*
** send parameterized message bytecode
*/

/*
** SENDP_HIT performs cache hit processing, which involves locking down
** the method object via reserve_obj(), (versus searching for the method
** object via fetch_method()), before the rest of the normal send message
** processing.
*/

#define SENDP_HIT           \
{                           \
        meth_obj = reserve_obj(SPM(bcp)->likely_method,                    \
                               Cur_process->region_cntr, CUR_PID );        \
        if ( meth_obj == NULL )                                            \
                sysErr("send_param_msg:01--likely method not found: %d %s %d",\
                  rcvr_id,                                                 \
                  get_symbol_string(selector,Cur_process->region_cntr,CUR_PID),\
                  SPM(bcp)->super_flag);                                   \
        goto sendp_normal;                                                 \
}.


case SEND_PARAM_MESSAGE:
{
        register struct cntx_ctrl       *c;
        register object                 *meth_obj;
        register object                 *rcvr;
        register oop                    rcvr_id;
        register oop                    rcvr_class;
        register oop                    selector;
        register int                    bcode_index;
        int                             i;

#if DEBUGGER
/*******************/
        long    debug_msg_id;   /* msg_id for this process */
        short   d_stop_num;     /* array index to D_stop_in_data */
struct  msg_rec *msg_rec_ptr;   /* pointer to a statistics record for
                                   this message */
        d_stat_stack_struct
                *state;         /* pointer to statistics info for this
                                   process */
        long    a_time;         /* a point in time in the execution of
                                   the interpreter */
        cntx    *old_cntx;      /* the sender of this message */
        long    meas ( );       /* routine which calculates how much cpu
                                   time has elapsed since a given time */
        char    *malloc ( );    /* allocates space for the statistic
                                   record for this message. */
struct  send_param_message
                *spmp;          /* pointer to this bytecode BEFORE updating */
        oop     meth_class;
/*******************/
#endif

/*--------------------------------------------------------------------------*/

#if SAMPLER
/****************/
        Sampler_vals[0].cur_value = 0x10b;
        Sampler_vals[1].cur_value = 1;
/****************/
#endif

#if DEBUGGER
/****************/
        /* Save pointer to current bytecode - needed later in this routine */
        spmp = SPM(bcp);

        /* Increment msg sequence number for this process */
        debug_msg_id = ++Processes[CUR_PID].msg_id;     /* short-hand */

        /* Save pointer to sending context */
        old_cntx = cur_cntx;

        /* Update line number of sending context */
        old_cntx->ctrl_vars.linenum = spmp->linenum;
/****************/
#endif

        rcvr_id  = CONTEXT_TEMPS(cur_cntx)[SPM(bcp)->arg_start_slot];

        /* TCOV-BCODE * SEND_PARAM_MSG_BCODE */

        selector = CONTEXT_TEMPS(cur_cntx)[SPM(bcp)->selector_slot];

        if ( rcvr_id < 0 )
        {
                /*
                ** positive integer instance ...
                */

                if ( SPM(bcp)->likely_selector == selector
                  && SPM(bcp)->likely_class == Integer )
                {
#if SAMPLER
/****************/
                        Sampler_vals[1].cur_value = 4;
/****************/
#endif

                        SENDP_HIT
                        /* TCOV-CACHE * RESERVED METHOD */
                }
                else
                {
                        rcvr_class = Integer;
                        goto sendp_miss;
                }
        }
        else if ( rcvr_id >= INIT_CNTX_ID )
        {
                /*
                ** block instance ...
                */

                if ( SPM(bcp)->likely_selector == selector
                  && SPM(bcp)->likely_class == RTBlock )
                {
#if SAMPLER
/****************/
                        Sampler_vals[1].cur_value = 4;
```

```
/****************/
#endif
                        SENDP_HIT
                        /* TCOV-CACHE * RESERVED METHOD */
                }
                else
                {
                        rcvr_class = RTBlock;
                        goto sendp_miss;
                }
        }

        /*
        ** normal receiver object ...
        **
        ** see if we already have it, check the cache, and send
        */

        if ( rcvr_id == cur_cntx->ctrl_vars.rcvr_oop )
        {
                rcvr = cur_cntx->ctrl_vars.rcvr_ptr;
                /* TCOV-RCVR * RE-USED RECEIVER */
        }
        else
        {
#if SAMPLER
/****************/
                Sampler_vals[1].cur_value = 2;
/****************/
#endif
                rcvr = reserve_obj(rcvr_id, Cur_process->region_cntr, CUR_PID);
                /* TCOV-RCVR * RESERVED RECEIVER */
#if SAMPLER
/****************/
                Sampler_vals[1].cur_value = 1;
/****************/
#endif

                if ( rcvr == NULL )
                        syserr("send_param_msg:03--Rcvr of msg not found: %d %s %d",
                          rcvr_id, get_symbol_string(selector,
                          Cur_process->region_cntr, CUR_PID),
                          SPM(bcp)->super_flag);
        }

        rcvr_class = rcvr->fp.class;

        if ( SPM(bcp)->likely_selector == selector &&
          (  SPM(bcp)->likely_class ==  rcvr_class && rcvr_class != rcvr_id
          || SPM(bcp)->likely_class == -rcvr_class && rcvr_class == rcvr_id ) )
        {
#if SAMPLER
/****************/
                Sampler_vals[1].cur_value = 4;
/****************/
#endif
                SENDP_HIT
                /* TCOV-CACHE * RESERVED METHOD */
        }
        /* end if */

sendp_miss:
        /*
        ** SENDP_MISS performs cache miss processing, which involves fetching
        ** the method object via fetch_method() and filling in the cache fields
        ** before the rest of the normal send message processing.
        */
#if SAMPLER
/****************/
                Sampler_vals[1].cur_value = 5;
/****************/
#endif
        meth_obj = fetch_method ( selector, rcvr_class, SPM(bcp)->super_flag,
                                  (rcvr_class != rcvr_id) ? INST_MSG : CLASS_MSG,
                                  Cur_process->region_cntr, CUR_PID );
#if SAMPLER
/****************/
                Sampler_vals[1].cur_value = 1;
/****************/
#endif

        /* TCOV-CACHE * FETCHED METHOD, NO REPLACE */

        if ( meth_obj == NULL )
                syserr("send_param_msg:02--method not found: %d %s %d",
                        rcvr_id,
                        get_symbol_string(selector,Cur_process->region_cntr,
                                                                CUR_PID),
                        SPM(bcp)->super_flag );

        SPM(bcp)->likely_class    = rcvr_class;
        SPM(bcp)->likely_method   = meth_obj->fp.id;
        SPM(bcp)->likely_selector = selector;

sendp_normal:
        /*
        ** normal send message machinery ...
        **
        ** this section of code is duplicated in send_msg_bcode.c.
        ** perhaps it will be wise to make it a macro, but for now,
        ** debugging is easier if it is not!
        */

        /*
        ** Save the value which is a slot in the temporaries of the
        ** current context.  This value is saved as a field in the cntx
        ** itself.  When a "return" bytecode is encountered for this
        ** message, the routine that handles it will then put the oop to
        ** be returned into the slot identified by this value.
        */

#if SAMPLER
/****************/
        Sampler_vals[1].cur_value = 3;
/****************/
#endif
        cur_cntx->ctrl_vars.answ_slot = SPM(bcp)->put_answ_slot;

        /*
        ** update the bytecode pointer for the current context before
        ** switching to the new one.
        */

        cur_cntx->ctrl_vars.next_bcode = (unsigned short *) (bcp + SPM_SIZE);

        /*
        ** switch contexts ...
```

```
        */

        if ( ( Cur_process->cur_cntx = cur_cntx = cur_cntx->next ) == NULL )
                syserr("send_msg:05--No more contexts available");

        /*
        ** Build a method context for this message, and make it the
        ** current context.  THIS IS THE IN-LINE VERSION OF
        ** bld_meth_cntx AND fill_meth_cntx.
        */

        /* build fixed part of context as if it were an object */

        cur_cntx->obj_hdr.no_indx_vars  = meth_obj->value[CMNoTempsIndex];
        cur_cntx->obj_hdr.class         = RTMethodContext;

        /* build part of context which contains info specific to
           context objects */

        c = &(cur_cntx->ctrl_vars);     /* shorthand */

        /* c->answ_slot is set when this new context sends a message  */
        /* c->region is set below in the check-pointing logic */

        bcode_index     = meth_obj->fp.no_named_vars;
        c->next_bcode   = (bcode *) &(meth_obj->value[bcode_index]);
        c->region       = Cur_process->region_cntr;
        c->first_block  = Cur_process->next_blk_stub;
        c->code_ptr     = meth_obj;
        c->rcvr_oop     = rcvr_id;
        c->rcvr_ptr     = rcvr;
        c->home_cntx    = cur_cntx;
        c->to_be_objd   = NULL;

#if DEBUGGER
/****************/
        c->msg_id       = debug_msg_id;
        c->linenum      = 0;
        c->msg_type     = (rcvr_class != rcvr_id) ? INST_MSG : CLASS_MSG;
/****************/
#endif
        /*
        ** Check that number of temps passed in is same as number
        ** expected by the bytecode object.  THIS IS THE IN-LINE
        ** VERSION OF load_cntx_temps.
        */

        if ( meth_obj->value[CMNoParmsIndex] != SPM(bcp)->num_args )
                syserr("send_msg:06--Number of temps passed in (%d) not number expected (
                  SPM(bcp)->num_args, meth_obj->value[CMNoParmsIndex]);

        /*
        ** Load the temporaries and set the active bytecode pointer.
        */

        bcopy(&cur_cntx->prev->ctrl_vars.temp_array[SPM(bcp)->arg_start_slot],
          &c->temp_array[0], SPM(bcp)->num_args * sizeof(oop));

        for (i = SPM(bcp)->num_args; i < cur_cntx->obj_hdr.no_indx_vars; i++)
        {
                CONTEXT_TEMPS(cur_cntx)[i] = nil;
        }
        /* end for */

        bcp = (char *) c->next_bcode;

sendp_end:

#if DEBUGGER
/**************************/
        D_cur_cntx = cur_cntx;

        /**************** HANDLE MESSAGE STATS ***********************/

        if ( D_ISCSET ( D_STAT ) )
        {
                a_time = meas ( 0 );
                stats = &D_stat_stack[CUR_PID];         /* temp pointer */

                /*
                ** Build record for this message.
                */
                msg_rec_ptr =
                        (struct msg_rec *) malloc ( sizeof ( struct msg_rec ) );

                msg_rec_ptr->id            = debug_msg_id;
                msg_rec_ptr->self_selector = selector;
                msg_rec_ptr->self_class    =
                        meth_obj->value[name_to_slot(meth_obj->fp.class,
                                                                "classOop")];
                msg_rec_ptr->start_time = a_time;
                msg_rec_ptr->elap_time  = 0;
                msg_rec_ptr->time_stamp = a_time;
                msg_rec_ptr->cum_time   = 0;

                if ( stats->top_msg != NULL )
                {
                        msg_rec_ptr->par_selector  =
                                        (stats->top_msg)->self_selector;
                        msg_rec_ptr->par_class     =
                                        (stats->top_msg)->self_class;
                        (stats->top_msg)->cum_time +=
                                ( a_time - (stats->top_msg)->time_stamp );
                }
                else
                {
                        msg_rec_ptr->par_selector  = 0;
                        msg_rec_ptr->par_class     = 0;
                }
                /* end if */

                /*
                ** Push the new record onto the stack.
                */
                d_stat_stack_push ( msg_rec_ptr, stats );
        }
        /* endif */

/****************** HANDLE MESSAGE TRACE ********************/

if ( ( D_ISDSET (D_MESSAGES) )
&&   ( (old_cntx == D_base_cntx) || (D_base_cntx == NULL) ) )
{
        /* PRINT CURRENT PROCESS AND MESSAGE ID'S */

        printf ( "\n%2u-%6d@", CUR_PID, debug_msg_id );
```

```
/* INDENT TO INDICATE NESTING OF MESSAGE SENDS */

for ( i = 1; i < cur_cntx->obj_hdr.id; i++ )
        {
        printf ( "  " );
        }
/* end for */


/* PRINT MESSAGE ABOUT TO BE SENT, AND RECEIVER'S OOP */

printf ( "**(perform)** " );
d_print_msg ( cur_cntx );
printf ( "\n" );
printf ( "                    SENT TO: %d\n", rcvr_id );


/* PRINT MESSAGE ARGUMENTS */

printf ( "                    ARGS: " );
if ( spmp->num_args <= 1 )
{
        printf ( "NONE" );
}
else
{
        for ( i = 1; i < spmp->num_args; ++i )
        {
                printf ( "%d ",
                     CONTEXT_TEMPS(old_cntx)[spmp->arg_start_slot+i] );
        }
        /* end for */
}
/* end if */
printf ( "\n" );


/* PRINT WHERE MESSAGE IS BEING SENT FROM */

printf ( "                    FROM: " );
d_print_msg ( cur_cntx->prev );
printf ( "\n" );

}

/**************** HANDLE STOP_IN, GOTO, AND NEXT ****************/

/*
** Get oop of receiver's class.
*/
if ( rcvr_id < 0 )
{
        rcvr_class = Integer;
}
else if ( rcvr_id >= INIT_CNTX_ID )
{
        rcvr_class = RTBlock;
}
/* endif */


if ( D_stop_in_data.num_stops > 0 )
{
        /*
        ** Get oop of class in which message was resolved.
        */
        meth_class = meth_obj->
                value[ name_to_slot( CompiledMethod, "classOop" ) ];

        /*
        ** Determine which of user's stops we are at, if any.
        */
        d_stop_num = d_find_stop ( meth_class, rcvr_class, selector );
}
else
{
        d_stop_num = -1;
}
/* end if */


if ( d_stop_num > 0 )                          /* STOP_IN */
{
        d_print_stop ( d_stop_num );
}
/* end if */

if ( ( d_stop_num > 0 )                        /* STOP_IN */
||   ( (D_goto_skip.msg_id == debug_msg_id)
     &&(D_goto_skip.proc_id == CUR_PID     ) )  /* GOTO and SKIP */
||   ( D_ISCSET (D_MSG_STEP) )                 /* MSG_STEP */
||   ( old_cntx == D_base_cntx ) )             /* NEXT_MSG */
{
        D_CRESET ( D_MSG_STEP );
        debugger ( );
}
/* end if */
/**************/
#endif

#if SAMPLER
/***************/
Sampler_vals[1].cur_value = 0;
Sampler_vals[0].cur_value = 0;
/***************/
#endif

break;
}
```

```
/*Copyright 1988 Eastman Kodak Company.  All rights reserved.*/
/*
** set up block context bytecode
*/

case SET_UP_BLOCK_CONTEXT:
{
        register blk_stub       *new_blk_stub;
        register object         *method_obj;
        register char           *method_code_start;

        blk_stub                *next_blk_stub();

#if SAMPLER
/****************/
Sampler_vals[0].cur_value = 0x106;
/****************/
#endif
        /*
        ** Get the next available stub from the stack for this process.
        */
        new_blk_stub = next_blk_stub ( Cur_process );

        /* TCOV-BCODE * SET_UP_BLK_CNTX_BCODE */

        /*
        ** One of the arguments for this bytecode is the number of a
        ** slot in the array of temporaries of the base method context;
        ** into that slot is put the id of the stub we are setting up.
        */
        METHOD_TEMPS(cur_cntx)[SUBC(bcp)->blk_cntx_as_slot] =
                                                new_blk_stub->fp.id;

        /*
        ** Fill in the fields of stub we are setting up.
        */
        new_blk_stub->vp.oop            = NULL;
        new_blk_stub->vp.num_temps      = SUBC(bcp)->num_temps;
        new_blk_stub->vp.first_bcode    = (bcode *)
                        ( bcp + SUBC_SIZE + SUBC(bcp)->bytecode_offset );

        method_obj = cur_cntx->ctrl_vars.code_ptr;
        method_code_start =
                (char *)&(method_obj->value[method_obj->fp.no_named_vars]);
        new_blk_stub->vp.bcode_offset =
                (char *)new_blk_stub->vp.first_bcode - method_code_start;

        new_blk_stub->vp.home_cntx      = cur_cntx->ctrl_vars.home_cntx;
        new_blk_stub->vp.active_cntx    = NULL;

        /*
        ** before returning, update the bytecode pointer to point to
        ** the next bytecode
        */
        bcp += SUBC_SIZE;

#if SAMPLER
/****************/
Sampler_vals[0].cur_value = 0;
/****************/
#endif

}
break;
```

stub_to_cntx.c          Tue May 10 13:16:37 1988          1

/*Copyright 1988 Eastman Kodak Company.  All rights reserved.*/

```
#include <stdio.h>
#include "types.h"
#include "constants.h"
#include "macros.h"
#include "oops_values.h"
#include "interp_const.h"
#include "interp_types.h"
#include "sampler_const.h"
#include "sampler_types.h"
#include "sampler_externs.h"

extern  struct  process         Processes[];
extern  unsigned short          MCMethodIndex;
extern  unsigned short          MCReceiverIndex;

/*-------------------------*/
/*
** This routine is used by createProcess, eval_blk_bcode, and the
** Block 'value' primitive to convert a particular block stub into
** an active context.  Some of the processing depends on whether the
** block's home is a run-time context on the stack or an Smalltalk object in
** memory.
*/

cntx *
stub_to_cntx ( stub_ptr, prev_cntx, a_process )

        register blk_stub       *stub_ptr;      /* Stub which is to be turned
                                                   into a context. */
        cntx                    *prev_cntx;     /* Context on stack previous
                                                   to one we are about to
                                                   create. */
        struct  process         *a_process;     /* Proc. under which new cntx
                                                   should be created. */

        register cntx           *new_blk_cntx;  /* The newly created cntx.  */
        object                  *home_obj;      /* Obj'd home of this stub
                                                   if stub is obj'd.  */
        object                  *method;        /* Home's method object. */
        object                  *receiver;      /* Home's receiver object.  */

        object                  *reserve_obj();

/*-------------------------*/

        /*
        ** Get the next available context on the stack.
        */
        new_blk_cntx = prev_cntx->next;

        /*
        ** Save a pointer in the new context to the previous active cntx of
        ** the block stub.  This is
        ** needed so we can reset the active_cntx field of this stub in the
        ** following situation:
        **
        **      - more than one active context exists for a given stub;
        **      - one of these active contexts (other than the first one) does
        **              a short return.
        */
        new_blk_cntx->ctrl_vars.prev_active_cntx = stub_ptr->vp.active_cntx;

        /*
        ** Save a pointer to the new context back in the block stub so we can
        ** find the active context from the stub.
        */
        stub_ptr->vp.active_cntx                        = new_blk_cntx;

        /*
        ** Use the data stored in the stub to fill in some of the fields.
        */
#if DEBUGGER
/***************/
        new_blk_cntx->obj_hdr.class             = BlockContext;
/***************/
#endif
        new_blk_cntx->obj_hdr.no_indx_vars      = stub_ptr->vp.num_temps;
        new_blk_cntx->ctrl_vars.home_cntx       = stub_ptr->vp.home_cntx;
        new_blk_cntx->ctrl_vars.next_bcode      = stub_ptr->vp.first_bcode;

        /*
        ** ... then we can copy some of the home's fields directly
        ** into the new block context.
        */
        new_blk_cntx->ctrl_vars.code_ptr =
                        stub_ptr->vp.home_cntx->ctrl_vars.code_ptr;
        new_blk_cntx->ctrl_vars.rcvr_ptr =
                        stub_ptr->vp.home_cntx->ctrl_vars.rcvr_ptr;
        new_blk_cntx->ctrl_vars.rcvr_oop =
                        stub_ptr->vp.home_cntx->ctrl_vars.rcvr_oop;

        /*
        ** The region value for the block context should be that of the
        ** context which activated it.
        */
        new_blk_cntx->ctrl_vars.region          = prev_cntx->ctrl_vars.region;

        /*
        ** First-block-stub is set to point to the next available stub
        ** on the stack.
        */
        new_blk_cntx->ctrl_vars.first_block     = a_process->next_blk_stub;

        /*
        ** We save a back-pointer from the active context to its stub.
        ** Need this in so we can reset the active_cntx field of the stub
        ** when the active_cntx does a short return, and there are still other
        ** active contexts around that are based on this stub.
        */
        new_blk_cntx->ctrl_vars.my_blk_stub     = stub_ptr;

#if DEBUGGER
/*************/
        /*
        ** If debugging, also copy the "msg_id" field from the context
        ** which activated this block.
        */
        new_blk_cntx->ctrl_vars.msg_id          = prev_cntx->ctrl_vars.msg_id;

        /*
        ** The "linenum" and "msg_type" fields are set to negative one and
        ** zero, respectively, for blocks.
        */
        new_blk_cntx->ctrl_vars.linenum         = -1;
        new_blk_cntx->ctrl_vars.msg_type        = 0;
/*************/
```

```
#endif

        return ( new_blk_cntx );
}
```

```
/*Copyright 1988 Eastman Kodak Company.  All rights reserved.*/
/*syserr.c -- print error and terminate*/
/*print system call err msg and terminate*/

#include <stdio.h>
#include <signal.h>
#include "types.h"
#include "constants.h"
#include "macros.h"
#include "interp_const.h"
#include "interp_types.h"

#if DEBUGGER
/**************/
#include "debug_const.h"
#include "debug_types.h"
#include "debug_externs.h"

extern FILE *Tracer;
/**************/
#endif

extern  int     errno;
extern  int     sys_nerr;
extern  char    *sys_errlist[];
extern print_error_data();

extern struct sigvec Oldvec, Newvec;

static int no_recursion = 0;

void
syserr(msg, a1, a2, a3, a4, a5, a6)
        char    *msg;
        int     *a1, *a2, *a3, *a4, *a5, *a6;
{
        char    msgbuf[256];

        /*
         * close up shop ...
         */

        closeDisplay();
        closeKeyboard();
        closeMouse();

        /*
         * print error message ...
         */

        fprintf(stderr, msg, a1, a2, a3, a4, a5, a6);

        fprintf(stderr,"\n");
        if (!no_recursion)
                {
                no_recursion = 1;
                if (Cur_process != NULL)
                        print_err_data(Cur_process);
                }

#if DEBUGGER
/**************/
        D_CSET ( D_SYSERR );

        fclose (Tracer);

        if ( D_ISCSET ( D_INITIALIZED ) )
        {
                debugger ( );
                return;
        }
        else
        {
                die(0);
        }
        /* end if */
#else
        die(0);
/**************/
#endif DEBUGGER

}
```

Appendix E: Raid Source Code debug_cmds.c
debug_gram.y
debug_help.c
debug_parse.l
debug_print.c
debug_stat.c
debug_stop.c
debugger.c

```
/*Copyright 1988 Eastman Kodak Company.  All rights reserved.*/
/*
debug_cmds.c

This module contains the following routines:

        d_blank_cmd ( )
        d_blank_line ( )
        d_backup ( )
        d_bcode_step ( )
        d_continue
        d_delete ( )
        d_goto ( )
        d_list_method ( )
        d_list_statement ( )
        d_mark ( )
        d_msg_step ( )
        d_next_msg ( )
        d_print_active_cntx ( )
        d_print_all ( )
        d_print_bcode ( )
        d_print_block_stub ( )
        d_print_cntx_of_stub ( )
        d_print_global ( )
        d_print_message ( )
        d_print_oop ( )
        d_print_process ( )
        d_print_receiver ( )
        d_print_temp_name ( )
        d_print_temp_num ( )
        d_quit ( )
        d_rerun ( )
        d_restart ( )
        d_return ( )
        d_run ( )
        d_set ( )
        d_skip_msg ( )
        d_statement_step ( )
        d_status ( )
        d_stop_at ( )
        d_stop_in ( )
        d_unset ( )
        d_where ( )

        chk_stub_id ( )

Other RAID commands can be found in the following files:

        ./debug_help.c
        ./debug_stat.c
/***********************************************************************/

#include <stdio.h>
#include <setjmp.h>

#include "y.tab.h"

#include "types.h"
#include "constants.h"
#include "macros.h"
#include "symbol_db.h"
#include "oops_values.h"
#include "interp_const.h"
#include "interp_types.h"
#include "bytecodes.h"

#include "debug_const.h"
#include "debug_types.h"
#include "debug_externs.h"

extern  struct  process         Processes[];
extern  struct  process         *Cur_process;
extern          jmp_buf         Leave;
extern          jmp_buf         D_leave;

extern          d_msg_struct    cntx_to_msg ( );

/*-----------------------------------------------------------------*/

void    d_blank_cmd ( )

{
        printf ( "\n*** BLANK commands ignored ***");

        D_in_debugger = 1;

        return;
}

/*-----------------------------------------------------------------*/

void    d_blank_line ( )

{
        if ( D_syntax_error )
        {
                ;
        }
        else
        {
                printf ( "\n*** REPEAT LAST command not implemented yet ***");
                D_reprompt_flag = 1;
        }
        /* end if */

        D_in_debugger = 1;

        return;
}

/*-----------------------------------------------------------------*/

void    d_backup ( label )

        char            *label;

{
        if ( label != NULL )
        {
                printf ( "\n*** BACKUP command not implemented yet * * %s",
                                label );
        }
        else
        {
                printf ("\n*** BACKUP command not implemented yet ***");
        }
```

```
        /* end if */

        D_in_debugger = 1;

        return;
}

/*---------------------------------------------------------------*/

void    d_bcode_step ( )

{
        if ( D_ISCSET ( D_DONE ) )
        {
                d_done_err ( );
        }
        else
        {
                D_CSET ( D_BCODE_STEP );

                D_in_debugger = 0;
        }
        /* end if */

        return;
}

/*---------------------------------------------------------------*/

void    d_continue ( )

{
        if ( D_ISCSET ( D_DONE ) )
        {
                d_done_err ( );
        }
        else
        {
                D_in_debugger = 0;
        }
        /* end if */

        return;
}

/*---------------------------------------------------------------*/

void    d_delete ( stop_num )

        long            stop_num;

{
        if ( (stop_num > D_MAX_STOPS) || (stop_num < 0) )
        {
                printf ( "\n*** ERROR *** No such stop: %d", stop_num );
        }
        else
        {
                D_stop_in_data.stops[stop_num-1].deleted_flag = 1;
        }
        /* end if */

        D_in_debugger = 1;

        return;
}

/*---------------------------------------------------------------*/

void    d_goto ( msg_id, proc_id )

        long            msg_id;
        int             proc_id;

{
        if ( D_ISCSET ( D_DONE ) )
        {
                d_done_err ( );
        }
        else
        {
                D_goto_skip.msg_id = msg_id;

                if ( proc_id >= 0 )
                        {
                        D_goto_skip.proc_id = proc_id;
                        }
                else
                        {
                        D_goto_skip.proc_id = Cur_process->proc_id;
                        }
                /* end if */

                D_in_debugger = 0;
        }
        /* end if */

        return;
}

/*---------------------------------------------------------------*/

void    d_list_method ( )

{
        if ( D_ISCSET ( D_DONE ) )
        {
                d_done_err ( );
        }
        else
        {
                printf ( "\n*** LIST_METHOD command not implemented yet ***");
                D_in_debugger = 1;
        }
        /* end if */

        return;
}

/*---------------------------------------------------------------*/

void    d_list_statement ( )

{
        if ( D_ISCSET ( D_DONE ) )
```

```
	{
		d_done_err ( );
	}
	else
	{
		printf ( "\n*** LIST_STATEMENT command not implemented yet ***");
		D_in_debugger = 1;
	}
	/* end if */

	return;
}

/*----------------------------------------------------------------*/

void	d_mark ( label )

	char		*label;

	{
	if ( label != NULL )
		{
		printf ("\n*** MARK command not implemented yet *** %s",
				label );
		}
	else
		{
		printf ( "\n*** SHOW MARKS command not implemented yet ***");
		}

	D_in_debugger = 1;

	return;
	}

/*----------------------------------------------------------------*/

void	d_msg_step ( )

{
	if ( D_ISCSET ( D_DONE ) )
	{
		d_done_err ( );
	}
	else
	{
		D_CSET ( D_MSG_STEP );

		D_in_debugger = 0;
	}
	/* end if */

	return;
}

/*----------------------------------------------------------------*/

void	d_next_msg ( )

{
	if ( D_ISCSET ( D_DONE ) )
	{
		d_done_err ( );
	}
	else
	{
		if ( D_ISCSET (D_MSG_REPLACED) )
		{
			D_base_cntx = D_cur_cntx;
		}
		else
		{
			D_base_cntx = D_cur_cntx->prev;
		}
		/* end if */

		D_in_debugger = 0;
	}
	/* end if */

	return;
}

/*----------------------------------------------------------------*/

	d_print_active_cntx ( a_cntx_id )

	cntx_id		a_cntx_id;

{
	cntx		*a_cntx;

/*------------*/

if ( D_ISCSET ( D_DONE ) )
{
	d_done_err ( );
}
else
{
	if ( a_cntx_id >= 0 )
	/* user supplied an id for the context he wants printed */
	{
		if ( a_cntx_id > MAX_CNTXS )
		{
			printf ( "\n*** NOT THAT MANY CONTEXTS ***" );
		}
		else if ( a_cntx_id > Cur_process->cur_cntx->obj_hdr.id )
		{
			printf ( "\n*** CONTEXT %d IS NOT ACTIVE IN PROCESS %d",
					a_cntx_id, Cur_process->proc_id );
		}
		else
		{
			a_cntx = &Cur_process->cntx_stack[a_cntx_id];
			d_print_cntx ( a_cntx );
		}
		/* end if */
	}
	else
	/* user did NOT supply an id; print the current context */
	{
		d_print_cntx ( D_cur_cntx );
	}
	/* end if */
```

```
        D_in_debugger = 1;
}
/* end if */

return;
}
/*--------------------------------------------------------------*/

void    d_print_all ( )

{
        if ( D_ISCSET ( D_DONE ) )
        {
                d_done_err ( );
        }
        else
        {
                d_print_bcode ( );
                d_print_active_cntx ( -1 );
                d_print_message ( );
                d_print_process ( -1 );
                d_print_receiver ( );

                D_in_debugger = 1;
        }
        /* end if */

        return;
}

/*--------------------------------------------------------------*/

        d_print_bcode ( )

{
        int     long_version = 1;

        if ( D_ISCSET ( D_DONE ) )
        {
                d_done_err ( );
        }
        else
        {
                printf ( "\n*** CURRENT BCODE: " );
                print_bcode ( D_cur_bcode, long_version, CUR_REGION, CUR_PID );

                D_in_debugger = 1;
        }
        /* end if */

        return;
}
/*--------------------------------------------------------------*/

cntx_id chk_stub_id ( a_stub_id )

        cntx_id         a_stub_id;

{
        if ( a_stub_id < 0 )
        {
                printf ( "\n*** ERROR: STUB ID MUST BE POSITIVE\n" );
                return ( -1 );
        }
        if ( a_stub_id < 100000 )
        {
                /* Allow user to use just the last few digits of
                   context id. */
                a_stub_id = a_stub_id + INIT_CNTX_ID;
        }
        /* end if */

        if ( a_stub_id >= Cur_process->next_blk_stub->fp.id )
        {
                printf ( "\n*** COULD NOT FIND STUB WITH ID %d IN PROCESS %d\n",
                                    a_stub_id, Cur_process->proc_id );
                return ( -1);
        }
        else
        {
                return ( a_stub_id );
        }
        /* end if */
}

/*--------------------------------------------------------------*/

        d_print_block_stub ( a_stub_id )

        cntx_id         a_stub_id;

{
        blk_stub        *a_blk_stub;
        cntx_id         new_stub_id;
        cntx_id         chk_stub_id( );

/*------------*/

if ( D_ISCSET ( D_DONE ) )
{
        d_done_err ( );
}
else
{
        if ( (new_stub_id = chk_stub_id ( a_stub_id )) > 0 )
        {
                a_blk_stub = FIND_BLK_STUB ( new_stub_id, Cur_process );

                printf ( "\n*** BLOCK STUB ***" );
                printf ( "\n ID                    %d", a_blk_stub->fp.id );

                if ( a_blk_stub->vp.oop )
                {
                        printf ( "\n OOP                        %d",
                                                    a_blk_stub->vp.oop );
                }
                else
                {
                        printf ( "\n OOP                        NONE" );
                }
                /* end if */

                if ( a blk stub->vp.active_cntx != NULL )
                {
                        printf ( "\n ACTIVE_CNTX            %d",
                                  a_blk_stub->vp.active_cntx->obj_hdr.id );
                }
```

```
            else
            {
                    printf  ( "\n ACTIVE_CNTX                 NONE" );
            }
            /* end if */

            printf ( "\n NUM_TEMPS          %d",
                                            a_blk_stub->vp.num_temps );

            printf ( "\n BCODE_OFFSET               %d",
                                            a_blk_stub->vp.bcode_offset );

            printf ( "\n FIRST_BCODE                %x",
                                   *(a_blk_stub->vp.first_bcode) );
            if ( a_blk_stub->vp.home_cntx->obj_hdr.class
                                                == RTMethodContext )
            {
                    printf ( "\n HOME_CNTX          #%d (on stack)",
                            a_blk_stub->vp.home_cntx->obj_hdr.id );
            }
            else
            {
                    printf ( "\n HOME_CNTX          oop %d (object)",
                            a_blk_stub->vp.home_cntx->obj_hdr.id );
            }
            /* end if */

            printf ( "\n NEXT                       %d",
                                            a_blk_stub->vp.next->fp.id );

            printf ( "\n" );
        }
        /* end if */

        D_in_debugger = 1;
}
/* end if */

return;
}

/*----------------------------------------------------------------*/

        d_print_cntx_of_stub ( a_stub_id )

        cntx_id         a_stub_id;

{
        blk_stub        *a_blk_stub;
        cntx_id         new_stub_id;
        cntx_id         chk_stub_id( );

/*------------*/

if ( D_ISCSET ( D_DONE ) )
{
        d_done_err ( );
}
else
{
        if ( (new_stub_id = chk_stub_id ( a_stub_id )) > 0 )
        {
                a_blk_stub = FIND_BLK_STUB ( new_stub_id, Cur_process );

                if ( a_blk_stub->vp.active_cntx == NULL )
                {
                        printf ( "\n*** BLK_STUB %d IS NOT ACTIVE", new_stub_id );
                }
                else
                {
                        d_print_cntx ( a_blk_stub->vp.active_cntx );
                }
                /* end if */
        }
        /* end if */

        D_in_debugger = 1;
}
/* end if */

return;
}

/*------------------------------------------------------------------------*/

void    d_print_global ( global_name )

        char            *global_name;

/*-----------------*/

{
        if ( D_ISCSET ( D_DONE ) )
        {
                d_done_err ( );
        }
        else
        {
                printf ( "\n" );

                startreorg();  /*bypass db checks*/

                bypassdblocks();  /*bypass single user only*/

                listdb2(global_name, CUR_REGION,
                  CUR_PID);

                D_in_debugger = 1;
        }
        /* end if */

        return;
}

/*--------------------------------------------------------------*/

        d_print_message ( )

{
        if ( D_ISCSET ( D_DONE ) )
        {
                d_done_err ( );
        }
        else
        {
                printf ( "\n" );

                d_print_msg ( D_cur_cntx );
```

```
        D_in_debugger = 1;
    }
    /* end if */

    return;
}

/*---------------------------------------------------------------*/

void    d_print_oop ( an_oop )

    oop             an_oop;

{
    char            oop_as_string[12];

/*-------------*/

    if ( D_ISCSET ( D_DONE ) )
    {
        d_done_err ( );
    }
    else
    {
        sprintf ( oop_as_string, "%d", an_oop );

        printf ( "\n" );

        startreorg();  /*bypass db checks*/

        bypassdblocks();  /*bypass single user only*/

        listdb2(oop_as_string, CUR_REGION,
          CUR_PID);

        D_in_debugger = 1;
    }
    /* end if */

    return;
}

/*---------------------------------------------------------------*/

    d_print_process ( proc_id )

    int             proc_id;

{
struct  process         *a_proc;

/*-------------*/

if ( D_ISCSET ( D_DONE ) )
{
    d_done_err ( );
}
else
{
    if ( proc_id >= 0 )
    /* find and then print the process whose id the user gave us */
        {
        a_proc = &Processes[proc_id];

            if ( a_proc->flags & PROC_IN_USE )
                {
                d_print_proc ( a_proc );
                }
            else
                {
                printf ( "\n*** Process %d does not exist",
                                proc_id );
                }
        }
    else
    /* print the current process if user specified no process id */
        {
        d_print_proc ( Cur_process );
        }

    D_in_debugger = 1;
}
/* end if */

return;
}
/*---------------------------------------------------------------*/

    d_print_receiver ( )

{
    char            oop_as_string[12];

/*----------*/

    if ( D_ISCSET ( D_DONE ) )
    {
        d_done_err ( );
    }
    else
    {
        sprintf ( oop_as_string, "%d",
                Cur_process->cur_cntx->ctrl_vars.rcvr_oop );

        printf ( "\n*** CONTENTS OF RECEIVER (self):\n\n" );

        listdb2(oop_as_string, CUR_REGION,
          CUR_PID);

        D_in_debugger = 1;
    }
    /* end if */

    return;
}

/*---------------------------------------------------------------*/

void    d_print_temp_name ( temp_name )

    char            *temp_name;

{
    if ( D_ISCSET ( D_DONE ) )
    {
        d_done_err ( );
    }
    else
    {
```

```
        printf ( "\n*** PRINT_TEMP_NAME command not implemented yet *** %s",
                                                temp_name );

        D_in_debugger = 1;
    }
    /* end if */

    return;
}

/*--------------------------------------------------------------*/

void    d_print_temp_num ( temp_num )

    int             temp_num;
{
    object          *meth_blk_obj;
    int             num_params;
    int             num_temps;

/*-----*/

if ( D_ISCSET ( D_DONE ) )
{
    d_done_err ( );
}
else
{
    /*Get pointer to the compiled method for the current context. */

    meth_blk_obj = D_cur_cntx->ctrl_vars.code_ptr;


    /* From that object, determine how many parameters it requires,
    and how many temps the context needs. */

    num_temps = meth_blk_obj->value[name_to_slot (
                        meth_blk_obj->fp.class, "noTemps" )];

    num_params = meth_blk_obj->value[name_to_slot (
                        meth_blk_obj->fp.class, "noParms" )];

    if ( temp_num > 0 )
    /* temp number must be a positive integer */
        {
        if ( temp_num <= (num_temps - num_params) )
        /* temp number must not be too large */
          {
          if ( D_cur_cntx->ctrl_vars.home_cntx ==
                                        D_cur_cntx )
          /* current context is a method */
              {
              printf ( "\n*** In CURRENT method, t%d is : %d",
                      temp_num,
                      D_cur_cntx->ctrl_vars.home_cntx->
              ctrl_vars.temp_array[temp_num + num_params -1]);
              }
          else
          /* current context is a block */
              {
              printf ( "\n***In OWNING method of current BLOCK, t%d is : %d",
                      temp_num,
                      D_cur_cntx->ctrl_vars.home_cntx->
              ctrl_vars.temp_array[temp_num + num_params -1]);
              }
          /* end if */
          }
        else
          {
          printf ( "\n***Not that many temps for current method");
          }
        /* end if */
        }
    else
        {
        printf ( "\n***Temp number must be positive" );
        }
    /* end if */

    D_in_debugger = 1;
}
/* end if */

    return;
}

/*--------------------------------------------------------------*/

void    d_quit ( )

{

    if ( D_ISCSET ( D_NOT_STARTED ) )
    {
        if ( D_ISCSET ( D_SYSERR ) )
        {
            exit ( 1 );
        }
        else
        {
            d_not_started_err ( );
        }
        /* end if */
    }
    else
    {
        D_CSET ( D_QUIT );

        D_in_debugger = 0;

        if ( D_ISCSET ( D_DONE ) )
        {
            return;
        }
        else
        {
            longjmp ( Leave, 1 );
        }
        /* end if */
    }
    /* end if */

    return;
}


/*--------------------------------------------------------------*/
```

```
void    d_rerun ( )

{
        if ( D_ISCSET ( D_NOT_STARTED ) )
        {
                if ( D_ISCSET ( D_SYSERR ) )
                {
                        d_not_valid_err ( );
                }
                else
                {
                        d_not_started_err ( );
                }
                /* end if */
        }
        else
        {
                D_CSET ( D_RERUN );

                D_in_debugger = 0;

                if ( D_ISCSET ( D_DONE ) )
                {
                        return;
                }
                else
                {
                        longjmp ( Leave, 1 );
                }
        }

        return;
}

/*--------------------------------------------------------------*/

void    d_restart ( )

{
        if ( D_ISCSET ( D_NOT_STARTED ) )
        {
                if ( D_ISCSET ( D_SYSERR ) )
                {
                        d_not_valid_err ( );
                }
                else
                {
                        d_not_started_err ( );
                }
                /* end if */
        }
        else
        {
                D_CSET ( D_RESTART );

                D_in_debugger = 0;

                if ( D_ISCSET ( D_DONE ) )
                {
                        return;
                }
                else
                {
                        longjmp ( Leave, 1 );
                }
        }

        return;
}

/*--------------------------------------------------------------*/

void    d_return ( )

{
        if ( D_ISCSET ( D_DONE ) )
        {
                d_done_err ( );
        }
        else
        {
                if ( D_ISCSET (D_MSG_REPLACED) )
                {
                        D_CSET ( D_RET_FROM_REPLACED_MSG );
                }
                else
                {
                        D_CSET ( D_RETURN );

                        D_ret_from.cntx = D_cur_cntx;
                        D_ret_from.proc_id = CUR_PID;
                }
                /* end if */

                D_in_debugger = 0;
        }
        /* end if */

        return;
}

/*--------------------------------------------------------------*/

void    d_run ( init_vals_fname )

        char                    *init_vals_fname;

{
        struct  init_vals       *temp;
extern  struct  init_vals       *get_init_vals ( );
                int             i;

/*------------*/

        if ( ! D_ISCSET ( D_DONE ) )
        {
                printf ( "\n*** Interpreter execution aborted\n" );
        }
        /* end if */

        /*
        ** Delete all stops.
        */
```

```
D_stop_at_bcode = 0;

D_stop_in_data.num_stops = 0;

for ( i = 0; i < D_MAX_STOPS; i++ )
{
        D_stop_in_data.stops[i].deleted_flag = 0;
}
/* end for */

/*
** Get new values for initial message send.
*/
temp = get_init_vals ( init_vals_fname );

if ( temp == NULL )
{
        printf ( "\n*** ERROR *** Could not get valid values for initial message

        D_in_debugger = 1;
}
else
{
        D_in_debugger = 0;

        D_init_vals = *temp;

        D_CSET ( D_RUN );

        if ( D_ISCSET ( D_SYSERR )
                        && D_ISCSET ( D_NOT_STARTED) )
        {
                longjmp ( D_leave, 1 );
        }
        else if ( D_ISCSET ( D_DONE ) )
        {
                return;
        }
        else
        {
                longjmp ( Leave, 1 );
        }
        /* end if */
}
/* end if */

return;
}

/*--------------------------------------------------------------*/

void    d_set ( set_switch_num )

        int     set_switch_num;

{
        switch ( set_switch_num )
        {
                case ALL:
                        D_DSET ( D_BCODES );
                        D_DSET ( D_BLOCKS );
                        D_DSET ( D_CONTEXTS );
                        D_DSET ( D_MESSAGES );
                        D_DSET ( D_PROCESSES );
                        D_DSET ( D_RECEIVERS );
                        break;

                case BCODES:
                        D_DSET ( D_BCODES );
                        break;

                case BLOCKS:
                        D_DSET ( D_BLOCKS );
                        break;

                case CONTEXTS:
                        D_DSET ( D_CONTEXTS );
                        break;

                case MESSAGES:
                        D_DSET ( D_MESSAGES );
                        break;

                case PROCESSES:
                        D_DSET ( D_PROCESSES );
                        break;

                case RECEIVERS:
                        D_DSET ( D_RECEIVERS );
                        break;

                case 0:
                /* SHOW SETTINGS */
                   if ( D_display_switches )
                        {
                        printf ( "\n*** FOLLOWING DISPLAY SWITCHES ARE SET:" );
                        if ( D_ISDSET ( D_BCODES ) )
                                {
                                printf ( "\n    BCODES" );
                                }
                        if ( D_ISDSET ( D_BLOCKS ) )
                                {
                                printf ( "\n    BLOCKS" );
                                }
                        if ( D_ISDSET ( D_CONTEXTS ) )
                                {
                                printf ( "\n    CONTEXTS" );
                                }
                        if ( D_ISDSET ( D_MESSAGES ) )
                                {
                                printf ( "\n    MESSAGES" );
                                }
                        if ( D_ISDSET ( D_PROCESSES ) )
                                {
                                printf ( "\n    PROCESSES" );
                                }
                        if ( D_ISDSET ( D_RECEIVERS ) )
                                {
                                printf ( "\n    RECEIVERS" );
                                }
                        printf ( "\n" );
                        }
                   else
                        {
                        printf ( "\n*** NO DISPLAY SWITCHES SET ***\n" );
                        }
                   /* end if */
```

```
            break;

        default:
            printf ( "\n*** This parameter not understood by SET command." );
    } /* end switch */

    D_in_debugger = 1;

    return;
}

/*-----------------------------------------------------------------*/

void    d_skip_msg ( skip_count )

    int             skip_count;

{
    if ( D_ISCSET ( D_DONE ) )
    {
        d_done_err ( );
    }
    else
    {
        D_goto_skip.msg_id = Processes[Cur_process->proc_id].msg_id
                                            + skip_count;

        D_goto_skip.proc_id = Cur_process->proc_id;

        D_in_debugger = 0;
    }
    /* end if */

    return;
}

/*-----------------------------------------------------------------*/

void    d_statement_step ( )

{
    if ( D_ISCSET ( D_DONE ) )
    {
        d_done_err ( );
    }
    else
    {
        printf ( "\n*** STATEMENT_STEP command not implemented yet ***");

        D_in_debugger = 0;
    }
    /* end if */

    return;
}

/*-----------------------------------------------------------------*/

void    d_status ( )

    {
    d_stop_in ( NULL, NULL );
    d_stop_at ( -1 );
    d_stat_status ( );
    d_set ( 0 );

    D_in_debugger = 1;

    return;
    }

/*-----------------------------------------------------------------*/

    d_stop_at ( input )

    int             input;

{
    if ( input < 0 )

    /* If user typed the STOP_AT command without a param, just
    display the current setting of the STOP_AT bytecode. */
    {
        if ( D_stop_at_bcode >= 0x100 )
        {
            printf ( "\n*** STOP_AT bytecode is: 0x%x ***\n",
                                        D_stop_at_bcode);

        }
        else if ( D_stop_at_bcode > 0 )
        {
            printf ( "\n*** STOP_AT bytecode is: PRIM %d ***\n",
                                        D_stop_at_bcode);

        }
        else
        {
            printf ( "\n*** NO STOP_AT bytecode set ***\n" );

        }
        /* end if */
    }
    else
    {
        D_stop_at_bcode = (bcode) input;
    }
    D_in_debugger = 1;

    return;
}

/*-----------------------------------------------------------------*/

    d_stop_in ( class_name, sel_name )

    char            *class_name;
    char            *sel_name;

{
    short           stop_num;
    int             i;
    int             are_some_stops;

/*------------*/

    if ( (class_name != NULL) || (sel_name != NULL) )
```

```
{
        stop_num = d_add_stop ( class_name, sel_name );

        switch ( stop_num )
        {
        case -1:
                {
                printf ( "\n*** ERROR *** No more stops allowed." );
                break;
                }
        case -2:
                {
                printf ( "\n*** ERROR *** Cannot find method with selector '%s' );
                break;
                }
        case -3:
                {
                printf ( "\n*** ERROR *** Cannot find Class '%s'.", class_name );
                break;
                }
        case -4:
                {
                printf ( "\n*** ERROR *** Cannot find selector '%s'.", sel_name )
                break;
                }
        default:
                {
                d_print_stop ( stop_num );
                printf ( "\n" );
                break;
                }
        }
        /* end switch */
}
else
{
        are_some_stops = 0;

        for ( i = 0; i < D_stop_in_data.num_stops; i++ )
        {
                if ( ! D_stop_in_data.stops[i].deleted_flag )
                {
                        d_print_stop ( i+1 );
                        are_some_stops = 1;
                }
                /* end if */
        }
        /* end for */

        if ( are_some_stops )
        {
                printf ( "\n" );
        }
        else
        {
                printf ( "\n*** NO STOP_IN class or method set ***\n" );
        }
        /* end if */
}
/* end if */

D_in_debugger = 1;

return;
}

/*---------------------------------------------------------------*/

void    d_unset ( set_switch_num )

        int     set_switch_num;

{
        switch ( set_switch_num )
        {
                case ALL:
                        D_DRESET ( D_BCODES );
                        D_DRESET ( D_BLOCKS );
                        D_DRESET ( D_CONTEXTS );
                        D_DRESET ( D_MESSAGES );
                        D_DRESET ( D_PROCESSES );
                        D_DRESET ( D_RECEIVERS );
                        break;

                case BCODES:
                        D_DRESET ( D_BCODES );
                        break;

                case BLOCKS:
                        D_DRESET ( D_BLOCKS );
                        break;

                case CONTEXTS:
                        D_DRESET ( D_CONTEXTS );
                        break;

                case MESSAGES:
                        D_DRESET ( D_MESSAGES );
                        break;

                case PROCESSES:
                        D_DRESET ( D_PROCESSES );
                        break;

                case RECEIVERS:
                        D_DRESET ( D_RECEIVERS );
                        break;

                default:
                        printf ( "\n*** This parameter not understood by UNSET command."
        } /* end switch */

        D_in_debugger = 1;

        return;
}

/*---------------------------------------------------------------*/

void
d_where ( proc_id )
        int     proc_id;
{
        struct process  *a_proc;
        cntx            *a_cntx;
        d_msg_struct    a_msg;
        int             i;
```

```
/*---*/
        if ( D_ISCSET ( D_DONE ) )
        {
                d_done_err ( );
                return;
        }
        /* end if */

        if ( D_ISCSET ( D_NOT_STARTED ) )
        {
                if ( D_ISCSET ( D_SYSERR ) )
                {
                        d_not_valid_err ( );
                        return;
                }
                else
                {
                        d_not_started_err ( );
                        return;
                }
                /* end if */
        }
        /* end if */

        /*
         * print the stack of the requested process (if valid)
         */

        a_proc = (proc_id < 0) ? Cur_process : &Processes[proc_id];

        if (a_proc->flags & PROC_IN_USE)
        {
                a_cntx = &a_proc->cntx_stack[0];

                printf ("\n*** PROCESS %d ***\n", a_proc->proc_id);

                do
                {
                        printf ( "\n" );

                        for (i = 0; i < a_cntx->obj_hdr.id; i++)
                                printf ( "  " );

                        d_print_msg ( a_cntx );

                        a_cntx = a_cntx->next;
                }
                while (a_cntx <= a_proc->cur_cntx);

                /*
                ** Handle case where we're about to execute a replaced
                ** message.
                */
                if ( D_ISCSET (D_MSG_REPLACED) )
                {
                        printf ( "\n" );
                        for (i = 0; i <= a_cntx->obj_hdr.id; i++)
                                printf ( "  " );

                        print_bcode ( D_cur_bcode, 1, CUR_REGION, CUR_PID );
                }
                /* end if */
        }
        else
        {
                printf ("\n*** Process %d does not exist", a_proc->proc_id);
        }

        D_in_debugger = 1;

        return;
}
```

```
/*Copyright 1988 Eastman Kodak Company.  All rights reserved.*/
/****************************************************************

       This module contains the following routines:

              d_help ( )
              d_short_help ( )
              d_print_help ( )

****************************************************************/

#include <stdio.h>

#include "y.tab.h"

#include "types.h"
#include "constants.h"
#include "oops_values.h"
#include "interp_const.h"
#include "interp_types.h"

#include "debug_const.h"
#include "debug_types.h"
#include "debug_externs.h"

/*--------------------------------------------------------------*/

void    d_help ( cmd_name_as_int, cmd_name_as_str )

        int             cmd_name_as_int;
        char            *cmd_name_as_str;

{
        switch ( cmd_name_as_int )
        {
                case -1:
                {
                printf ( "\n*** no HELP available for this topic: %s",
                                                cmd_name_as_str );
                break;
                }

                case 0:
                {
                d_print_help ( D_HELP_BASIC );
                break;
                }

                case BCODE_STEP:
                {
                d_print_help ( D_HELP_BCODE_STEP );
                break;
                }

                case CONTINUE:
                {
                d_print_help ( D_HELP_CONTINUE );
                break;
                }

                case dELETE:
                {
                d_print_help ( D_HELP_DELETE );
                break;
                }

                case GOTO:
                {
                d_print_help ( D_HELP_GOTO );
                break;
                }

                case HELP:
                {
                d_print_help ( D_HELP_HELP );
                break;
                }

                case MSG_STEP:
                {
                d_print_help ( D_HELP_MSG_STEP );
                break;
                }

                case NEXT_MSG:
                {
                d_print_help ( D_HELP_NEXT_MSG );
                break;
                }

                case OSTAT_OFF:
                {
                d_print_help ( D_HELP_OSTAT_OFF );
                break;
                }

                case OSTAT_ON:
                {
                d_print_help ( D_HELP_OSTAT_ON );
                break;
                }

                case OSTAT_PRINT:
                {
                d_print_help ( D_HELP_OSTAT_PRINT );
                break;
                }

                case OSTAT_RESET:
                {
                d_print_help ( D_HELP_OSTAT_RESET );
                break;
                }

                case PRINT_ACTIVE_CNTX:
                {
                d_print_help ( D_HELP_PRINT_ACTIVE_CNTX );
                break;
                }

                case PRINT_ALL:
                {
                d_print_help ( D_HELP_PRINT_ALL );
                break;
                }

                case PRINT_BCODE:
```

```
{
d_print_help ( D_HELP_PRINT_BCODE );
break;
}

case PRINT_BLOCK_STUB:
{
d_print_help ( D_HELP_PRINT_BLOCK_STUB );
break;
}

case PRINT_CNTX_OF_STUB:
{
d_print_help ( D_HELP_PRINT_CNTX_OF_STUB );
break;
}

case PRINT_GLOBAL:
{
d_print_help ( D_HELP_PRINT_GLOBAL );
break;
}

case PRINT_MESSAGE:
{
d_print_help ( D_HELP_PRINT_MESSAGE );
break;
}

case PRINT_OOP:
{
d_print_help ( D_HELP_PRINT_OOP );
break;
}

case PRINT_PROCESS:
{
d_print_help ( D_HELP_PRINT_PROCESS );
break;
}

case PRINT_RECEIVER:
{
d_print_help ( D_HELP_PRINT_RECEIVER );
break;
}

case PRINT_TEMP:
{
d_print_help ( D_HELP_PRINT_TEMP );
break;
}

case QUIT:
{
d_print_help ( D_HELP_QUIT );
break;
}

case RERUN:
{
d_print_help ( D_HELP_RERUN );
break;
}

case RETURN:
{
d_print_help ( D_HELP_RETURN );
break;
}

case RESTART:
{
d_print_help ( D_HELP_RESTART );
break;
}

case RUN:
{
d_print_help ( D_HELP_RUN );
break;
}

case SET:
{
d_print_help ( D_HELP_SET );
break;
}

case SHORT_HELP:
{
d_print_help ( D_HELP_SHORT_HELP );
break;
}

case SKIP_MSG:
{
d_print_help ( D_HELP_SKIP_MSG );
break;
}
case STAT_OFF:
{
d_print_help ( D_HELP_STAT_OFF );
break;
}

case STAT_ON:
{
d_print_help ( D_HELP_STAT_ON );
break;
}

case STAT_PRINT:
{
d_print_help ( D_HELP_STAT_PRINT );
break;
}

case STAT_RESET:
{
d_print_help ( D_HELP_STAT_RESET );
break;
}

case STAT_STATUS:
{
d_print_help ( D_HELP_STAT_STATUS );
break;
```

```
        }

        case STATUS:
        {
        d_print_help ( D_HELP_STATUS );
        break;
        }

        case STOP_AT:
        {
        d_print_help ( D_HELP_STOP_AT );
        break;
        }

        case STOP_IN:
        {
        d_print_help ( D_HELP_STOP_IN );
        break;
        }

        case UNSET:
        {
        d_print_help ( D_HELP_UNSET );
        break;
        }

        case WHERE:
        {
        d_print_help ( D_HELP_WHERE );
        break;
        }

        default:
        {
        printf ( "\n*** HELP for this command not implemented yet: %d", cmd_name_
        break;
        }

    }
    /* end switch */

    D_in_debugger = 1;

    return;
}

/*--------------------------------------------------------------*/

d_short_help ( )

/*----------------*/

{
    d_print_help ( D_HELP_SHORT );
    return;
}

/*--------------------------------------------------------------*/

d_print_help ( help_file_name )

char    *help_file_name;

{
char    help_print_cmd[50];

/*----------------- START OF EXECUTABLE CODE -------------------*/

    /* Build the command string which will print the help file. */

    strcpy ( help_print_cmd, D_HELP_PRINT_CMD );
    strcat ( help_print_cmd, help_file_name );

    /* Execute the shell command that prints the help file. */

    system ( help_print_cmd );

    return;
}
```

```
/*Copyright 1988 Eastman Kodak Company.  All rights reserved.*/
/****************************
debug_print.c

This module contains:

        d_print_cntx ( )
        d_print_msg ( )
        d_print_proc ( )

******************************************************************************/

#include <stdio.h>
#include "types.h"
#include "constants.h"
#include "macros.h"
#include "interp_const.h"
#include "interp_types.h"
#include "bytecodes.h"
#include "oops_values.h"
#include "debug_const.h"
#include "debug_types.h"
#include "debug_externs.h"

/*********************************************************************/

d_print_cntx ( a_cntx )

                cntx            *a_cntx;

        {
        struct  fp              *t;
        struct  cntx_ctrl       *c;
                int             i;
                bcode           bcode_num;
                bcode           *a_bcode;

/*------------------ START OF EXECUTABLE CODE --------------------------*/

        t = &(a_cntx->obj_hdr);         /* temporary variable */
        c = &(a_cntx->ctrl_vars);       /* temporary variable */

        /****** print fixed part of context as if it were an object */

        printf ( "\n**** CONTEXT ****" );

        if ( t->class == RTMethodContext )
        {
                printf ( "\n ID                 %d", t->id );
                printf ( "\n CLASS                      RTMethodContext" );
        }
        else
        {
                printf ( "\n ID                 %d (STUB: %d)", t->id,
                                        c->my_blk_stub->fp.id );
                printf ( "\n CLASS                      BlockContext" );
        }
        /* end if */

        printf ( "\n NUM_TEMPS          %d", t->no_indx_vars );

        /****** print part of context which contains info specific to
                context objects */

printf ( "\n*****" );

printf ( "\n MESSAGE                    " );
d_print_msg ( a_cntx );

if ( c->msg_type == INST_MSG )
{
        printf ( "\n MSG_TYPE           INST_MSG" );
}
else if ( c->msg_type == CLASS_MSG )
{
        printf ( "\n MSG_TYPE           CLASS_MSG" );
}
else
{
        printf ( "\n MSG_TYPE           BLOCK" );
}
/* end if */

printf ( "\n*****" );

printf ( "\n ANSW_SLOT          %d", c->answ_slot );

if ( c->to_be_objd )
{
        printf ( "\n TO BE OBJD?                YES" );
}
else
{
        printf ( "\n TO BE OBJD?                NO" );
}
/* end if */

a_bcode = c->next_bcode;
bcode_num = *a_bcode;
printf ( "\n NEXT_BCODE (hex)   %x", bcode_num );

if (( (a_cntx == D_cur_cntx) && (c->first_block ==
                                Cur_process->next_blk_stub) )
||  ( (a_cntx != D_cur_cntx) && (c->first_block ==
                                a_cntx->next->ctrl_vars.first_block) ))
{
        printf ( "\n FIRST_BLOCK                (%d)",
                        c->first_block->fp.id );
}
else if ( c->first_block->vp.active_cntx == NULL )
{
        printf ( "\n FIRST_BLOCK                %d",
                        c->first_block->fp.id );
}
else
{
        printf ( "\n FIRST_BLOCK                %d (%d)",
                        c->first_block->fp.id,
                        c->first_block->vp.active_cntx->obj_hdr.id );
}
/* endif */

printf ( "\n REGION_ID          %d", c->region );

if ( c->code_ptr == NULL )
{
```

```
        printf ( "\n CODE_OOP           NONE" );
    }
    else
    {
        printf ( "\n CODE_OOP           %d", c->code_ptr->fp.id );
    }
    /* end if */

    printf ( "\n RCVR_OOP          %d", c->rcvr_oop );

    if ( c->home_cntx->obj_hdr.class == RTMethodContext )
    {
        printf ( "\n HOME_CNTX          #%d (on stack)",
                                        c->home_cntx->obj_hdr.id );
    }
    else
    {
        printf ( "\n HOME_CNTX          oop %d (object)",
                                        (c->home_cntx)->obj_hdr.id );
    }
    /* end if */

    printf ( "\n****\n" );

    for ( i = 0; i < t->no_indx_vars; i++ )
    {
        printf ( " TEMP_ARRAY[%d]               %d\n",
                                        i, c->temp_array[i] );
    }

    return;
}
/*******************************************************************/
d_print_msg(a_cntx)

/*
 * Print the message/block evaluation associated with a given context.
 * The message is formatted as in the Smalltalk debugger,
 * but no leading or trailing blanks, tabs, or carriage control is included
 * (this must be added by the calling routine).
 *
****************************************************************
 */

    cntx            *a_cntx;

{
    d_msg_struct    a_msg;
    d_msg_struct    cntx_to_msg();

/*----------------- START OF EXECUTABLE CODE ----------------------*/

    /*
     * convert context into message data structure.
     */

    a_msg = cntx_to_msg(a_cntx);

    /*
     * Print format is slightly different for messages than for blocks.
     */

    if (a_msg.cntx_type == RTMethodContext)
    {
        printf("%s (%s) >> %s   (CNTX#%d  MSG#%d  LINE#%d)",
          a_msg.rcvr_class,
          a_msg.meth_class,
          a_msg.selector,
          a_cntx->obj_hdr.id,
          a_cntx->ctrl_vars.msg_id,
          a_msg.linenum);

        /****** Example:
                Integer (Number) >> to:do:   (CNTX#2  MSG#301  LINE#13)
        ******/
    }
    else
    {
        printf("[ ] in %s >> %s   (CNTX#%d  LINE#%d)",
          a_msg.meth_class,
          a_msg.selector,
          a_cntx->obj_hdr.id,
          a_msg.linenum);

        /****** Example:
                [ ] in Set >> do:   (CNTX#3  LINE#21)
        ******/
    }
    /* end if */

    return;
}

/*******************************************************************/

d_print_proc ( a_proc )

    struct  process         *a_proc;

    {
    short                   i;

    if ( a_proc->proc_id < 0 )
    {
        printf ("\n*** NO ACTIVE PROCESS ***\n");
        return;
    }

    printf ( "\n*** PROCESS ****" );
    printf ( "\n ID                 %d", a_proc->proc_id );
    printf ( "\n PROCESS OOP                %d", a_proc->proc_oop );
    printf ( "\n NEXT_BLK_STUB              %d",
                                a_proc->next_blk_stub->fp.id);
    printf ( "\n CURRENT CONTEXT    %d", a_proc->cur_cntx->obj_hdr.id );

    if ( a_proc->latest_objd_cntx )
    {
        printf ( "\n LATEST_OBJD_CNTX   %d",
                        a_proc->latest_objd_cntx->obj_hdr.id );
    }
    else
    {
        printf ( "\n LATEST_OBJD_CNTX   NONE" );
    }
    /* end if */
```

```
    printf ( "\n CURRENT REGION              %d", a_proc->region_cntr );
    printf ( "\n OBJECT COUNT                %d", a_proc->obj_counter );
    printf ( "\n FLAGS                       %d", a_proc->flags );
    printf ( "\n" );

    return;
}
```

```
/*Copyright 1988 Eastman Kodak Company.  All rights reserved.*/
/*
debug_stat.c

This module contains the following:

        d_stat_print ( )
        d_stat_reset  ( )
        d_stat_on ( )
        d_stat_off ( )
        d_stat_status ( )

        d_stat_tab_add ( )
        d_stat_tab_insert ( )
        d_stat_tab_overflow ( )
        d_stat_tab_update ( )

        d_stat_stack_init ( )
        d_stat_stack_pop ( )
        d_stat_stack_push ( )

**********************************************************************/

#include <stdio.h>
#include <setjmp.h>

#include "y.tab.h"

#include "types.h"
#include "constants.h"
#include "macros.h"
#include "symbol_db.h"
#include "oops_values.h"
#include "interp_const.h"
#include "interp_types.h"
#include "bytecodes.h"

#include "debug_const.h"
#include "debug_types.h"
#include "debug_externs.h"

/*----------------------------------------------------------------*/
extern  struct  process                   *Cur_process;
extern  int                               errno;

/*--------------------------------------------------------------*/
/*********************************************************************
******
******  ROUTINE FOR THE RAID COMMAND 'stat_print'.  PRINTS THE CURRENT
******  MESSAGE STATISTICS TABLE
******
*********************************************************************/

d_stat_print ( output_file_name )

        char    *output_file_name;

        {
        char            *get_class_name ( );
        char            *get_symbol_string ( );

        int             i;
        regionId        region;
        PID             apid;
        FILE            *file_stream = stdout;
        FILE            *fopen ( );

/*-------------------*/

        /* OUTPUT FILE IS OPTIONAL; IF GIVEN, OPEN IT; IF NOT GIVEN, USE
           STDOUT */

        if ( output_file_name != NULL )
        {
                errno = 0;
                if ( (file_stream = fopen ( output_file_name, "a+" )) == NULL )
                {
                        printf ( "*** ERROR *** Couldn't open file '%s' (errno = %d)\n",
                        return;
                }
        }
        /* endif */


        if ( Cur_process == NULL )
                {
                region = 0;
                apid = 0;
                }
        else
                {
                region = CUR_REGION;
                apid = CUR_PID;
                }
        /* endif */


        /* PRINT HEADER */

        fprintf ( file_stream, "    CLASS                SELECTOR              #SENDS     SEL
        fprintf ( file_stream, "    -----------------------------------------------------------
/*      fprintf ( file_stream, "CLASS          SELECTOR       CALLER CLASS  CALLER SEL.
/*      fprintf ( file_stream, "-----------------------------------------------------------


        /* PRINT TABLE ENTRIES, TRANSLATING OOPS TO STRINGS FOR CLASS NAMES
           AND SELECTORS */

        for ( i = 0; i < D_stat_tab.num_entries; i++ )
                {
                fprintf ( file_stream,
/*                      "%-13.13s %-13.13s  %-13.13s %-13.13s %7d %7d %7d\n", */
                        "    %-16.16s   %-16.16s  %8d %8d %8d\n",
                        get_class_name ( D_stat_tab.stats[i].self_class ),
                        get_symbol_string (
                                D_stat_tab.stats[i].self_selector,
                                                    region, apid),
/*                      get_class_name ( D_stat_tab.stats[i].par_class ), */
/*                      get_symbol_string (
                                D_stat_tab.stats[i].par_selector, region, apid),*/
                        D_stat_tab.stats[i].num_calls,
                        D_stat_tab.stats[i].cum_self_time,
                        D_stat_tab.stats[i].cum_selfplus_time );
                }
        /* endfor */
```

```
        /* PRINT SUMMARY COUNTS */

        fprintf ( file_stream,
                  "\n\n** %d DIFFERENT MESSAGES", D_stat_tab.num_entries);
        fprintf ( file_stream,
                  "\n\n** %ld TOTAL MESSAGES\n", D_stat_tab.tot_msgs );

        /* CLOSE FILE IF ONE WAS OPENED (BUT DON'T CLOSE STDOUT!) */

        if ( file_stream != stdout )
        {
                fclose ( file_stream );
        }
        /* end if */

        D_in_debugger = 1;

        return;
        }

/*-----------------------------------------------------------------*/

/******************************************************************
******
******  ROUTINE FOR THE RAID COMMAND 'stat_reset'.  EMPTIES THE CURRENT
******  MESSAGE STATISTICS TABLE, AND THE ACTIVE MESSAGE STAT STACK.
******  IF MESSAGE COLLECTION WAS ON, IT STAYS ON; IF IT WAS OFF, IT STAYS
******  OFF.
******
******************************************************************/

d_stat_reset ( )

{
        if ( D_ISCSET ( D_DONE ) )
        {
                d_done_err ( );
        }
        else
        {
                D_STAT_TAB_INIT;
                d_stat_stack_init ( Cur_process );

                D_in_debugger = 1;
        }
        /* end if */

        return;
}

/*-----------------------------------------------------------------*/

/******************************************************************
******
******  ROUTINE FOR THE RAID COMMAND 'stat_on'.  EMPTIES
******  THE ACTIVE MESSAGE STAT STACK, AND TURNS ON MESSAGE
******  STATISTICS COLLECTION.  DOES NOT DESTROY CONTENTS OF MESSAGE
******  STATISTICS TABLE, BUT RATHER ADDS TO IT.
******
******************************************************************/

d_stat_on ( )

{
        if ( D_ISCSET ( D_DONE ) )
        {
                d_done_err ( );
        }
        else
        {
                D_CSET ( D_STAT );
                d_stat_stack_init ( Cur_process );

                D_in_debugger = 1;
        }
        /* end if */

        return;
}

/*-----------------------------------------------------------------*/

/******************************************************************
******
******  ROUTINE FOR THE RAID COMMAND 'stat_off'.  EMPTIES
******  THE ACTIVE MESSAGE STAT STACK, AND STOPS MESSAGE
******  STATISTICS COLLECTION.  DOES NOT DESTROY CONTENTS OF MESSAGE
******  STATISTICS TABLE.
******
******************************************************************/

d_stat_off ( )

{
        if ( D_ISCSET ( D_DONE ) )
        {
                d_done_err ( );
        }
        else
        {
                D_CRESET ( D_STAT );
                d_stat_stack_init ( Cur_process );

                D_in_debugger = 1;
        }
        /* end if */

        return;
}

/*-----------------------------------------------------------------*/

/******************************************************************
******
******  ROUTINE FOR THE RAID COMMAND 'stat_status'.
******  TELLS WHETHER MESSAGE STATS COLLECTION AND OBJECT STATS
******  COLLECTION ARE ON OR OFF.
******
******************************************************************/

d_stat_status ( )

{
        if ( D_ISCSET ( D_STAT ) )
        {
```

```
        printf ( "\n*** MSG STATS COLLECTION ON ***\n" );
    }
    else
    {
        printf ( "\n*** MSG STATS COLLECTION OFF ***\n" );
    }
    /* end if */

    if ( D_ISCSET ( D_OSTAT ) )
    {
        printf ( "\r*** OBJ STATS COLLECTION ON ***\n" );
    }
    else
    {
        printf ( "\n*** OBJ STATS COLLECTION OFF ***\n" );
    }
    /* end if */

    D_in_debugger = 1;

    return;
}

/*-------------------------------------------------------------*/

/*****************************************************************
******
******  ROUTINE FOR ADDING A NEW ENTRY TO THE MESSAGE STATISTICS TABLE.
******
*****************************************************************/

d_stat_tab_add ( a_msg_rec )

    struct  msg_rec         *a_msg_rec;
    {
    struct  method_rec      *new_rec;

/*-----------------*/

    D_stat_tab.tot_msgs++;

    new_rec = &D_stat_tab.stats[D_stat_tab.num_entries++];

    new_rec->self_class             = a_msg_rec->self_class;
    new_rec->self_selector          = a_msg_rec->self_selector;
    new_rec->par_class              = a_msg_rec->par_class;
    new_rec->par_selector           = a_msg_rec->par_selector;
    new_rec->num_calls              = 1;
    new_rec->cum_self_time          = a_msg_rec->cum_time;
    new_rec->cum_selfplus_time      = a_msg_rec->elap_time;

    return;
    }

/*-------------------------------------------------------------*/

/*****************************************************************
******
******  ROUTINE FOR INSERTING A MESSAGE STATISTIC INTO THE MESSAGE STATISTICS
******  TABLE.  IF AN ENTRY FOR THIS MESSAGE ALREADY EXISTS, ITS TIMES AND COUNT
******  ARE UPDATED PER THIS STAT.  IF NO ENTRY EXISTS, AN NEW ONE IS ADDED.
******
*****************************************************************/

d_stat_tab_insert ( a_msg_rec )

    struct  msg_rec         *a_msg_rec;
    {
        int             entry_num;
        short           not_found;

/*-----------------*/

    entry_num = 0;
    not_found = 1;

    /* SEE IF THE CLASS/SELECTOR FOR THE RECORD TO BE INSERTED IS ALREADY
       THERE */

    while ( ( entry_num < D_stat_tab.num_entries )
          && ( not_found ) )
        {
        if ( (D_stat_tab.stats[entry_num].self_class ==
                                        a_msg_rec->self_class)
          && (D_stat_tab.stats[entry_num].self_selector ==
                                        a_msg_rec->self_selector) )
            {
            not_found = 0;
            d_stat_tab_update ( &D_stat_tab.stats[entry_num],
                                                        a_msg_rec);
/* printf ( "mstat: record %d updated** self: %d     self+ %d\n",
        entry_num, a_msg_rec->cum_time, a_msg_rec->elap_time ); */
            }
        else
            {
            entry_num++;
            }
        /* endif */
        }
    /* endwhile */

    if ( not_found )
    {
        if ( D_STAT_TAB_FULL )
        {
            d_stat_tab_overflow ( a_msg_rec );
        }
        /* end if */

        d_stat_tab_add ( a_msg_rec );

/*      printf ( "mstat: record %d added** self: %d     self+ %d\n",
                    D_stat_tab.num_entries,
                    a_msg_rec->cum_time,
                    a_msg_rec->elap_time ); */
    }
    /* endif */

    return;
    }

/*-------------------------------------------------------------*/
```

```
/*******************************************************************
******
******  ROUTINE FOR HANDLING THE CASE WHERE THE MESSAGE STATISTICS TABLE
******  OVERFLOWS.  CURRENT STACK IS NOT CLEARED, BUT CURRENT TABLE IS
******  DUMPED TO A FILE.
*******************************************************************/

d_stat_tab_overflow ( a_msg_rec )

        struct  msg_rec         *a_msg_rec;
        {

/*------------------*/

        d_stat_print ( "d_stat_tab" );
        D_STAT_TAB_INIT;

        printf ( "\n** MSG STAT TABLE IS FULL\n** CURRENT TABLE BEING DUMPED TO FILE 'd_s

        debugger ();

        return;
        }

/*-------------------------------------------------------------*/

/*******************************************************************
******
******  ROUTINE FOR UPDATING AN EXISTING ENTRY IN THE MESSAGE STATISTICS TABLE.
******
*******************************************************************/

d_stat_tab_update ( a_method_rec, a_msg_rec )

        struct  method_rec      *a_method_rec;
        struct  msg_rec         *a_msg_rec;
        {

/*------------------*/

        D_stat_tab.tot_msgs++;

        a_method_rec->num_calls++;
        a_method_rec->cum_self_time += a_msg_rec->cum_time;
        a_method_rec->cum_selfplus_time += a_msg_rec->elap_time;

        return;
        }

/*-----------------------------------------------------------------*/

/*******************************************************************
******
******  ROUTINE FOR INITIALIZING THE MESSAGE STATISTICS STACK FOR A
******  GIVEN PROCESS.
******
*******************************************************************/

d_stat_stack_init ( proc_ptr )

        struct  process         *proc_ptr;
{
struct  msg_rec         *null_msg;
long                    a_time;
char                    *malloc();
object                  *compiled_obj;
cntx                    *this_cntx;
PID                     this_pid;

/*-----------------*/

        this_cntx = proc_ptr->cur_cntx;
        this_pid = proc_ptr->proc_id;

        /* POP OFF ANY EXISTING RECORDS; THIS FREES THE MALLOC'ED SPACE. */

        while ( D_stat_stack[this_pid].top_msg != NULL )
        {
                d_stat_stack_pop ( &D_stat_stack[this_pid] );
        }
        /* end while */

        /* PUSH THE INITIAL RECORD ONTO THE STACK - FIRST THIS RECORD MUST
           BE CREATED */

        a_time = meas ( 0 );

        null_msg = (struct msg_rec *) malloc ( sizeof ( struct msg_rec ) );

        null_msg->next = NULL;

        if ( this_cntx->ctrl_vars.code_ptr != NULL )
        {
                /* NORMALLY, WE USD THE CURRENTLY EXECUTING MESSAGE AS THE
                   FIRST MESSAGE ON THE STACK. */

                null_msg->id = this_cntx->ctrl_vars.msg_id;

                /* Get pointer to compiled method associated with the context
                of interest. */

                compiled_obj = this_cntx->ctrl_vars.code_ptr;

                /* From the compiled method, get the oops of its class and its
                selector symbol. */

                null_msg->self_class = compiled_obj->
                   value( name_to_slot( CompiledMethod, "classOop" ) );

                null_msg->self_selector = compiled_obj->
                   value( name_to_slot( CompiledMethod, "selectorSymbolOop" ) );
        }
        else
        {
                /* BUT IF WE DON'T YET HAVE A CURRENTLY EXECUTING MESSAGE -AS
                   AT STARTUP - WE HAVE TO DO SOMETHING ELSE. */

                null_msg->id = -1;
                null_msg->self_class = 0;
                null_msg->self_selector = 0;
        }
        /* end if */
```

```
        /*
        ** IN EITHER CASE, OTHER FIELDS MUST BE INITIALIZED.
        */

        null_msg->par_class = 0;
        null_msg->par_selector = 0;
        null_msg->start_time = a_time;
        null_msg->elap_time = 0;
        null_msg->time_stamp = a_time;
        null_msg->cum_time = 0;

        d_stat_stack_push ( null_msg, &D_stat_stack[this_pid] );

        D_stat_stack[this_pid].tot_msgs = 0;

        return;
        }

/*------------------------------------------------------------*/

/*******************************************************************
******
******  ROUTINE FOR POPPING A RECORD OFF THE MESSAGE STATISTICS STACK.
******
*******************************************************************/

d_stat_stack_pop ( stats_ptr )

        d_stat_stack_struct             *stats_ptr;
        {

        struct  msg_rec                 *old_top;
                char                    *free();

/*------------------*/
/* printf ( "mstat**: POPPING %d\n", stats_ptr->top_msg->id ); */

        old_top = stats_ptr->top_msg;

        stats_ptr->top_msg = old_top->next;

        free ( (char *) old_top );

        stats_ptr->tot_msgs--;

        return;
        }

/*------------------------------------------------------------*/

/*******************************************************************
******
******  ROUTINE FOR PUSHING A RECORD ONTO THE MESSAGE STATISTICS STACK.
******
*******************************************************************/

d_stat_stack_push ( msg_rec_ptr, stats_ptr )

        struct  msg_rec                 *msg_rec_ptr;
        d_stat_stack_struct             *stats_ptr;

        {
                char            *free();

/*------------------*/

/* printf ( "mstat**: PUSHING %d\n", msg_rec_ptr->id ); */

        msg_rec_ptr->next = stats_ptr->top_msg;

        stats_ptr->top_msg = msg_rec_ptr;

        stats_ptr->tot_msgs++;

        return;
        }
```

```
/*Copyright 1988 Eastman Kodak Company.  All rights reserved.*/
/*****************************************************************

        THIS MODULE CONTAINS:

                d_add_stop ( )
                d_find_stop ( )
                d_print_stop ( )
                get_meth_oop ( )

*****************************************************************/

#include <stdio.h>

#include "types.h"
#include "constants.h"
#include "symbol_db.h"
#include "oops_values.h"
#include "interp_const.h"
#include "interp_types.h"

#include "debug_const.h"
#include "debug_types.h"
#include "debug_externs.h"


/*****************************************************************/
short           d_add_stop ( class_name, selector_name )

        char            *class_name;
        char            *selector_name;

{
        oop             method_oop;
        d_stop_struct   *this_stop;

        dict_xref       *getdictionary( );
        oop             getsymbol( );
        oop             get_meth_oop( );

/*-------------- START OF EXECUTABLE CODE -----------------------*/

        /* Error if we have reached the limit of stops that can be in
        affect at one time. */

        if ( D_stop_in_data.num_stops >= D_MAX_STOPS )
        {
                return ( -1 );
        }


        /* THREE CASES */

        if ( ( class_name != NULL ) && ( selector_name == NULL ) )
        /* CASE 1 - CLASS WITHOUT SELECTOR */
        {
                if ( getdictionary ( class_name ) == NULL )
                {
                        return ( -3 );
                }
                else
                {
                        method_oop = 0;
                }
                /* end if */
        }
        else if ( ( class_name == NULL ) && ( selector_name != NULL ) )
        /* CASE 2 - SELECTOR WITHOUT CLASS */
        {
                if ( getsymbol ( selector_name ) < 0 )
                {
                        return ( -4 );
                }
                else
                {
                        method_oop = 0;
                }
                /* end if */
        }
        else
        /* CASE 3 - CLASS AND METHOD SUPPLIED */
        {
                /* Find the oop of the method object corresponding to
                the class and selector passed in.  If not found, it's
                an error. */

                method_oop = get_meth_oop ( class_name, selector_name );

                if ( method_oop <= 0 )
                {
                        return ( -2 );
                }
                /* end if */
        }
        /* end if */


        /* Establish a temporary pointer to the new 'stop' we are
        building. */

        this_stop = &D_stop_in_data.stops[D_stop_in_data.num_stops++];


        /* Build the 'stop'. */

        this_stop->class_name           = class_name;
        this_stop->selector_name        = selector_name;
        this_stop->method_oop           = method_oop;
        this_stop->deleted_flag         = 0;

        /* Return the number of the 'stop'.  Note that the stop number
        is one more than the slot number of the stop because the stops
        array index starts at 0, while the stop numbers start at 1. */

        return ( D_stop_in_data.num_stops );
}

/*****************************************************************/

short           d_find_stop ( meth_class, rcvr_class, selector )

        oop             meth_class;
        oop             rcvr_class;
        oop             selector;

{
        char            *meth_class_str;
```

```
	char		*rcvr_class_str;
	char		*selector_str;
	d_stop_struct	a_stop;
	short		stop_num = 0;
	short		not_found = 1;

	char		*get_class_name();
	char		*get_symbol_string();

/*-------------- START OF EXECUTABLE CODE -----------------------*/

	meth_class_str = get_class_name ( meth_class );
	rcvr_class_str = get_class_name ( rcvr_class );
	selector_str   = get_symbol_string ( selector );

	/*
	** Loop until stop found, or all stops checked without finding
	** the stop
	*/
	while ( (stop_num < D_stop_in_data.num_stops) && not_found )
	{
	    a_stop = D_stop_in_data.stops[stop_num];

	    /*
	    ** Don't check deleted stops.
	    */
	    if ( ! a_stop.deleted_flag )
	    {
		/*
		** If stop has no selector specified, just need to
		** match class name
		*/
		if ( a_stop.selector_name == NULL )
		{
			if (! strcmp (a_stop.class_name,
					meth_class_str) )
			{
				not_found = 0;
			}
			/* end if */
		}
		/*
		** If selector specified, check selector.  If match...
		*/
		else if ( ! strcmp (a_stop.selector_name, selector_str))
		{
			/*
			** ...check class for match against method's
			** class OR receiver's class.
			*/
			if ( (a_stop.class_name == NULL)
			||   ! strcmp ( a_stop.class_name,
					meth_class_str )
			||   ! strcmp ( a_stop.class_name,
					rcvr_class_str ) )
			{
				not_found = 0;
			}
			/* end if */
		}
		/* end if */
	    }
	    /* end if */

	    stop_num++;

	}
	/* end while */


	if ( not_found )
	{
	    return ( -1 );
	}
	else
	{
	    return ( stop_num );
	}
	/* end if */
}
/*****************************************************************/
void	d_print_stop ( stop_num )

short	stop_num;

{
d_stop_struct	*this_stop;

/*-------------- START OF EXECUTABLE CODE -----------------------*/
	this_stop = &D_stop_in_data.stops[stop_num-1];

	if ( this_stop->class_name == NULL )
	{
		printf ( "\n[%d] stop_in <any class> %s",
			stop_num,
			this_stop->selector_name );
	}
	else if ( this_stop->selector_name == NULL )
	{
		printf ( "\n[%d] stop_in %s <any method>",
			stop_num,
			this_stop->class_name );
	}
	else
	{
		printf ( "\n[%d] stop_in %s %s   (method oop: %d)",
			stop_num,
			this_stop->class_name,
			this_stop->selector_name,
			this_stop->method_oop );
	}
	/* end if */

	return;
}
/*****************************************************************/
oop	get_meth_oop ( class_name, selector_name )

char		*class_name;
char		*selector_name;

{
int		i;
oop		class_oop;
oop		sel_sym_oop;
dict_xref	*dict_ptr;
object		*class_obj;
class_cntrl	*class_ctrl_ptr;
```

```
oop             getsymbol( );
dict_xref       *getdictionary( );
object          *get_obj( );

/*-------------- START OF EXECUTABLE CODE -----------------------*/

        /* First, get the oop of the class. */

        dict_ptr = getdictionary ( class_name );

        if ( dict_ptr == NULL )
        {
                /* Class supplied by user does not exist. */
                return ( -1 );
        }

        class_oop = dict_ptr->fp.object_oop;


        /* Next, get the oop of selector symbol. */

        sel_sym_oop = getsymbol ( selector_name, 0, 0 );

        if ( sel_sym_oop < 0 )
        {
                /* Selector not found. */
                return ( -2 );
        }


        /* Next, fetch the class so we can look in its dictionary. */

        class_obj = get_obj ( class_oop, 0, 0 );

        if ( class_obj->fp.class != class_obj->fp.id )
        {
                /* User supplied a global name that's not a class. */
                return ( -3 );
        }


        /* Now, go at the class dictionary. */

        class_ctrl_ptr = CLASS_CONTROL ( class_obj );

        for ( i = 0; i < class_ctrl_ptr->cfp.no_dict; i++ )
        {
                if ( class_ctrl_ptr->dictionary[i].opers ==
                                                sel_sym_oop )
                {
                   return ( class_ctrl_ptr->dictionary[i].method_oop );
                }
        }
        /* end for */

        /* If we got this far, we did not find the selector supplied by
        the user. */
        return ( -4 );
}
```

```
/*Copyright 1988 Eastman Kodak Company.  All rights reserved.*/
#include <stdio.h>
#include <setjmp.h>

#include "types.h"
#include "constants.h"
#include "oops_values.h"
#include "interp_const.h"
#include "interp_types.h"

#include "debug_const.h"
#include "debug_types.h"
#include "debug_externs.h"

        jmp_buf          D_leave;

/*--------------------------------------------------------------*/

void    debugger ( )

        {

/*---------------- START OF EXECUTABLE CODE ----------------------*/

        /*
        ** regain control of keyboard and/or mouse while in the debugger ...
        */

        closeDisplay();
        closeMouse();
        closeKeyboard();

        /*
        ** Stay in debugger, and prompt user.
        */
        D_reprompt_flag = 1;
        D_in_debugger = 1;

        /*
        ** Clear all stops.
        */
        D_base_cntx = NULL;
        D_goto_skip.msg_id = -1;
        D_goto_skip.proc_id = -1;

        D_CRESET ( D_BCODE_STEP );
        D_CRESET ( D_MSG_STEP );
        D_CRESET ( D_RETURN );
        D_CRESET ( D_NEXT_MSG );

        /* Keep parsing input until this flag is unset.  That means the
        interpreter should be allowed to continue */

        while ( D_in_debugger )
                {

                /* don't reprompt between multiple commands on the same
                    input line */
                if ( D_reprompt_flag )
                        {
                        printf ( "\n%s", D_PROMPT_SYMBOL );
                        }

                yyparse ( );

                /* Clear the syntax error flag. */
                D_syntax_error = 0;

                }

        /* end while */

        /*
        ** return keyboard and/or mouse control to alltalk ...
        */

        openMouse();
        openKeyboard();
        openDisplay();

        return;
        }
```

```
%{
#include <math.h>
#include <stdio.h>

#include "y.tab.h"
%}

digit           [0-9]

hex_digit       [0-9a-fA-F]

neg_sign        [-]

uc_letter       [A-Z]

lc_letter       [a-z]

alpha           [A-Za-z0-9_\.\:]

special         [\+\/\\\*\-\<\>\=\@\$\|\&\?\!\,]

space           [ \t]

%p' 4000
%a 5000
%o 5000

%%

all                     |
a                       { return ( lexsave ( ALL ) ); }

ba{alpha}*              { return ( lexsave ( BACKUP ) ); }

bcode_s{alpha}*         |
bs{alpha}*              { return ( lexsave ( BCODE_STEP ) ); }

bytec{alpha}*           |
bc{alpha}*              { return ( lexsave ( BCODES ) ); }

bl{alpha}*              { return ( lexsave ( BLOCKS ) ); }

context                 |
cntx                    |
cx                      { return ( lexsave ( CONTEXTS ) ); }

cont{alpha}*            |
cu                      { return ( lexsave ( CONTINUE ) ); }

d{alpha}*               { return ( lexsave ( dELETE ) ); }

g{alpha}*               { return ( lexsave ( GOTO ) ); }

h{alpha}*               { return ( lexsave ( HELP ) ); }

list_m{alpha}*          |
met{alpha}*             |
lm                      { return ( lexsave ( LIST_METHOD ) ); }

list_s{alpha}*          |
statem{alpha}*          |
ls                      { return ( lexsave ( LIST_STATEMENT ) ); }

mark                    { return ( lexsave ( MARK ) ); }

mes{alpha}*             |
msg                     { return ( lexsave ( MESSAGES ) ); }

ste{alpha}*             |
s                       { return ( lexsave ( MSG_STEP ) ); }

n{alpha}*               { return ( lexsave ( NEXT_MSG ) ); }

ostat_off               |
ostoff                  { return ( lexsave ( OSTAT_OFF ) ); }

ostat_on                |
oston                   { return ( lexsave ( OSTAT_ON ) ); }

ostat_p{alpha}*         |
ostp{alpha}*            { return ( lexsave ( OSTAT_PRINT ) ); }

ostat_r{alpha}*         |
ostr{alpha}*            { return ( lexsave ( OSTAT_RESET ) ); }

print_ac{alpha}*        |
pac                     |
pc                      { return ( lexsave ( PRINT_ACTIVE_CNTX ) ); }

print_all               |
pa                      { return ( lexsave ( PRINT_ALL ) ); }

print_bc{alpha}*        |
pb                      { return ( lexsave ( PRINT_BCODE ) ); }

print_bl{alpha}*        |
print_s{alpha}*         |
pbs                     |
ps                      { return ( lexsave ( PRINT_BLOCK_STUB ) ); }

print_c{alpha}*         |
pcs                     { return ( lexsave ( PRINT_CNTX_OF_STUB ) ); }

print_g{alpha}*         |
pg                      { return ( lexsave ( PRINT_GLOBAL ) ); }

print_m{alpha}*         |
pm                      { return ( lexsave ( PRINT_MESSAGE ) ); }

print_o{alpha}*         |
po                      { return ( lexsave ( PRINT_OOP ) ); }

print_p{alpha}*         |
pp                      { return ( lexsave ( PRINT_PROCESS ) ); }

print_r{alpha}*         |
pr                      { return ( lexsave ( PRINT_RECEIVER ) ); }

print_t{alpha}*         |
pt                      { return ( lexsave ( PRINT_TEMP ) ); }

proc{alpha}*            { return ( lexsave ( PROCESSES ) ); }

q{alpha}*               { return ( lexsave ( QUIT ) ); }

rec{alpha}*             |
rcvr                    { return ( lexsave ( RECEIVERS ) ); }
```

```
rer{alpha}*             { return ( lexsave ( RERUN ) ); }

res{alpha}*             { return ( lexsave ( RESTART ) ); }

ret{alpha}*             { return ( lexsave ( RETURN ) ); }

run                     { return ( lexsave ( RUN ) ); }

set                     { return ( lexsave ( SET ) ); }

sh{alpha}*              { return ( lexsave ( SHORT_HELP ) ); }

sk{alpha}*              { return ( lexsave ( SKIP_MSG ) ); }

stat_off                |
stoff                   { return ( lexsave ( STAT_OFF ) ); }

stat_on                 |
ston                    { return ( lexsave ( STAT_ON ) ); }

stat_p{alpha}*          |
stp{alpha}*             { return ( lexsave ( STAT_PRINT ) ); }

stat_r{alpha}*          |
str{alpha}*             { return ( lexsave ( STAT_RESET ) ); }

stat_s{alpha}*          |
stst{alpha}*            { return ( lexsave ( STAT_STATUS ) ); }

statement_s{alpha}*     |
ss{alpha}*              { return ( lexsave ( STATEMENT_STEP ) ); }

stat{alpha}*            { return ( lexsave ( STATUS ) ); }

stop_at                 |
sa                      { return ( lexsave ( STOP_AT ) ); }

stop_in                 |
si                      { return ( lexsave ( STOP_IN ) ); }

u{alpha}*               { return ( lexsave ( UNSET ) ); }

w{alpha}*               { return ( lexsave ( WHERE ) ); }

";"                     { return ( CMD_SEPARATOR ); }


{digit}+                { yylval.i = atol ( yytext ); return ( Pos_numeric ); }

{neg_sign}{digit}+      { yylval.i = atol ( yytext ); return ( Neg_numeric ); }

0[xX]{hex_digit}+       { yylval.i = strtol ( yytext, (char **)NULL, 0 );
                              return ( Hex_numeric); }

{uc_letter}{alpha}*          { return ( lexsave (Uc_identifier ) ); }

{lc_letter}{alpha}*          { return ( lexsave (Lc_identifier ) ); }

{digit}{alpha}+              { return ( lexsave (No_identifier ) ); }

{special}{special}           { return ( lexsave ( Selector ) ); }

{special}                    { return ( lexsave ( Selector ) ); }

{space}                      { ; }

"\n"                         { return ( LINE TERMINATOR ); }

%%

/*------------------------------------------------------------
        Allocates space for a string; new_str is a pointer to the
        new string.  Copies the string pointed to by org_str into the
        new string.  Returns a pointer to the new string.
------------------------------------------------------------*/
char    *walloc ( org_str )

        char    *org_str;

        {
        char    *new_str;
        char    *malloc ( );

        new_str = malloc ( (unsigned) (strlen ( org_str ) + 1) );

        strcpy ( new_str, org_str );

        return ( new_str );
        }

/*------------------------------------------------------------
        Saves the current token as a character string.
------------------------------------------------------------*/
static  int     lexsave ( token_type )

        int     token_type;

        {
        yylval.c = walloc ( yytext );

        return ( token_type );
        }
```

```
%{
int     d_cmd_name;
%}

/*** TOKENS ***/

%token  ALL
%token  BCODES
%token  CONTEXTS
%token  BLOCKS
%token  MESSAGES
%token  PROCESSES
%token  RECEIVERS

%token  BACKUP
%token  BCODE_STEP
%token  CONTINUE
%token  dELETE
%token  GOTO
%token  HELP
%token  LIST_METHOD
%token  LIST_STATEMENT
%token  MARK
%token  MSG_STEP
%token  NEXT_MSG
%token  OSTAT_OFF
%token  OSTAT_ON
%token  OSTAT_PRINT
%token  OSTAT_RESET
%token  PRINT_ACTIVE_CNTX
%token  PRINT_ALL
%token  PRINT_BCODE
%token  PRINT_BLOCK_STUB
%token  PRINT_CNTX_OF_STUB
%token  PRINT_GLOBAL
%token  PRINT_MESSAGE
%token  PRINT_OOP
%token  PRINT_PROCESS
%token  PRINT_RECEIVER
%token  PRINT_TEMP
%token  QUIT
%token  RERUN
%token  RESTART
%token  RETURN
%token  RUN
%token  SET
%token  SHORT_HELP
%token  SKIP_MSG
%token  STAT_OFF
%token  STAT_ON
%token  STAT_PRINT
%token  STAT_RESET
%token  STAT_STATUS
%token  STATEMENT_STEP
%token  STATUS
%token  STOP_AT
%token  STOP_IN
%token  UNSET
%token  WHERE

%token  LINE_TERMINATOR
%token  CMD_SEPARATOR
%token  ERROR

%token  Pos_numeric
%token  Neg_numeric
%token  Hex_numeric
%token  Uc_identifier
%token  Lc_identifier
%token  No_identifier
%token  Selector

%union  {
        char    *c;
        int     i;
        }

%type   <i>     Pos_numeric
%type   <i>     Neg_numeric
%type   <i>     Hex_numeric
%type   <c>     Uc_identifier
%type   <c>     Lc_identifier
%type   <c>     No_identifier
%type   <c>     Selector

%type   <c>     class_name
%type   <i>     cntx_id
%type   <c>     command_name
%type   <c>     file_name
%type   <c>     global_name
%type   <c>     help_param
%type   <c>     help_topic
%type   <c>     mark_label
%type   <c>     mark_param
%type   <i>     oop
%type   <i>     proc_id
%type   <c>     selector
%type   <i>     set_option
%type   <i>     set_param
%type   <i>     stop_at_param
%type   <i>     stub_id
%type   <c>     temp_name

/*** GRAMMAR ***/

%start  command

%%

command
        :  /* blank line */     LINE_TERMINATOR
                { d_blank_line ( ); return;     }
        |  /* blank cmd */      CMD_SEPARATOR
                { d_blank_cmd ( ); return;      }
        | BACKUP mark_label     command_terminator
                { d_backup ( $2 ); return;      }
        | BCODE_STEP            command_terminator
                { d_bcode_step ( ); return;     }
        | CONTINUE              command_terminator
                { d_continue ( ); return;       }
        | dELETE Pos_numeric    command_terminator
                { d_delete ( $2 ); return;      }
        | GOTO Pos_numeric proc_id command_terminator
                { d_goto ( $2, $3 ); return;    }
        | HELP help_param       command_terminator
                { d_help ( d_cmd_name, $2 ); return;     }
        | LIST_METHOD           command_terminator
                { d_list_method ( ); return;    }
```

```
| LIST_STATEMENT          command_terminator
        { d_list_statement ( ); return; }
| MARK mark_param         command_terminator
        { d_mark ( $2 ); return;          }
| MSG_STEP                command_terminator
        { d_msg_step ( ); return;         }
| NEXT_MSG                command_terminator
        { d_next_msg ( 1 ); return;       }
| OSTAT_OFF               command_terminator
        { d_ostat_off ( ); return;        }
| OSTAT_ON                command_terminator
        { d_ostat_on ( ); return;         }
| OSTAT_PRINT file_name command_terminator
        { d_ostat_print ( $2 ); return; }
| OSTAT_RESET             command_terminator
        { d_ostat_reset ( ); return;      }
| PRINT_ACTIVE_CNTX cntx_id      command_terminator
        { d_print_active_cntx ( $2 ); return;   }
| PRINT_ALL               command_terminator
        { d_print_all ( ); return;        }
| PRINT_BCODE             command_terminator
        { d_print_bcode ( ); return;      }
| PRINT_BLOCK_STUB stub_id       command_terminator
        { d_print_block_stub ( $2 ); return;    }
| PRINT_CNTX_OF_STUB stub_id     command_terminator
        { d_print_cntx_of_stub ( $2 ); return;  }
| PRINT_GLOBAL global_name command_terminator
        { d_print_global( $2 ); return; }
| PRINT_MESSAGE           command_terminator
        { d_print_message ( ); return;  }
| PRINT_OOP oop command_terminator
        { d_print_oop ( $2 ); return;   }
| PRINT_PROCESS proc_id command_terminator
        { d_print_process ( $2 ); return;}
| PRINT_RECEIVER          command_terminator
        { d_print_receiver ( ); return; }
| PRINT_TEMP temp_name  command_terminator
        { d_print_temp_name ( $2 ); return;}
| PRINT_TEMP Pos_numeric command_terminator
        { d_print_temp_num ( $2 ); return;}
| QUIT                    command_terminator
        { d_quit ( ); return;             }
| RERUN                   command_terminator
        { d_rerun ( ); return;            }
| RESTART                 command_terminator
        { d_restart ( ); return;          }
| RETURN                  command_terminator
        { d_return ( ); return; }
| RUN file_name           command_terminator
        { d_run ( $2 ); return;           }
| SET set_param           command_terminator
        { d_set ( $2 ); return;           }
| SHORT_HELP              command_terminator
        { d_short_help ( ); return;       }
| SKIP_MSG                command_terminator
        { d_skip_msg ( 1 ); return;       }
| SKIP_MSG Pos_numeric command_terminator
        { d_skip_msg ( $2 ); return;      }
| STAT_OFF                command_terminator
        { d_stat_off ( ); return;         }
| STAT_ON                 command_terminator
        { d_stat_on ( ); return;          }
| STAT_PRINT file_name  command_terminator
        { d_stat_print ( $2 ); return;    }
| STAT_RESET              command_terminator
        { d_stat_reset ( ); return;       }
| STAT_STATUS             command_terminator
        { d_stat_status ( ); return;      }
| STATEMENT_STEP          command_terminator
        { d_statement_step ( ); return; }
| STATUS                  command_terminator
        { d_status ( ); return;           }
| STOP_AT stop_at_param command_terminator
        { d_stop_at ( $2 ); return;       }
| STOP_IN                 command_terminator
        { d_stop_in ( NULL, NULL ); return;}
| STOP_IN class_name selector command_terminator
        { d_stop_in ( $2, $3 ); return;}
| UNSET set_option        command_terminator
        { d_unset ( $2 ); return;         }
| WHERE proc_id           command_terminator
        { d_where ( $2 ); return;                   }
| error                   command_terminator
        { return;                         }
;


class_name
        :
                { $$ = NULL; }
        | Uc_identifier
        ;


cntx_id
        : /* current context */
                { $$ = -1; }
        | Pos_numeric
        ;


command_terminator
        : CMD_SEPARATOR
                { d_reprompt_flag ( 0 ); }
        | LINE_TERMINATOR
                { d_reprompt_flag ( 1 ); }


file_name
        : /* user did not give an input file name; prompt him
             for needed info. */
                { $$ = NULL; }
        | Uc_identifier
        | Lc_identifier
        | No_identifier
        | command_name
        ;


global_name
        : Uc_identifier
        | command_name
        ;


help_param
        : /* no param means print list of commands */
                { d_cmd_name = 0; }
```

```
        | help_topic
        ;

help_topic
        : command_name
        | Uc_identifier
                { d_cmd_name = -1; }
        | Lc_identifier
                { d_cmd_name = -1; }
        | No_identifier
                { d_cmd_name = -1; }
        ;

mark_param
        : /* don't mark anything; print current mark labels */
                { $$ = NULL; }
        | mark_label
        ;

mark_label
        : Uc_identifier
        | Lc_identifier
        | No_identifier
        | command_name
        ;

oop
        : Pos_numeric
        | Neg_numeric
        ;

proc_id
        : /* current process */
                { $$ = -1; }
        | Pos_numeric
        ;

selector
        :
                { $$ = NULL; }
        | Lc_identifier
        | command_name
        | Selector
        ;

set_param
        : /* don't set anything; just print current settings */
                { $$ = 0; }
        | set_option
        ;

set_option
        : ALL                   { $$ = ALL;                 }
        | BCODES                { $$ = BCODES;              }
        | BLOCKS                { $$ = BLOCKS;              }
        | CONTEXTS              { $$ = CONTEXTS;            }
        | MESSAGES              { $$ = MESSAGES;            }
        | PROCESSES             { $$ = PROCESSES;           }
        | RECEIVERS             { $$ = RECEIVERS;           }
        ;

stop_at_param
        : /* no param means show stop_at value */
                { $$ = -1; }
        | Hex_numeric
        | Pos_numeric
        ;

stub_id
        : Pos_numeric
        ;

temp_name
        : Lc_identifier
        | command_name
        ;

command_name
        : BACKUP                { d_cmd_name = BACKUP; }
        | BCODE_STEP            { d_cmd_name = BCODE_STEP; }
        | CONTINUE              { d_cmd_name = CONTINUE; }
        | dELETE                { d_cmd_name = dELETE; }
        | GOTO                  { d_cmd_name = GOTO; }
        | HELP                  { d_cmd_name = HELP; }
        | LIST_METHOD           { d_cmd_name = LIST_METHOD; }
        | LIST_STATEMENT        { d_cmd_name = LIST_STATEMENT; }
        | MARK                  { d_cmd_name = MARK; }
        | MSG_STEP              { d_cmd_name = MSG_STEP; }
        | NEXT_MSG              { d_cmd_name = NEXT_MSG; }
        | OSTAT_OFF             { d_cmd_name = OSTAT_OFF; }
        | OSTAT_ON              { d_cmd_name = OSTAT_ON; }
        | OSTAT_PRINT           { d_cmd_name = OSTAT_PRINT; }
        | OSTAT_RESET           { d_cmd_name = OSTAT_RESET; }
        | PRINT_ACTIVE_CNTX     { d_cmd_name = PRINT_ACTIVE_CNTX; }
        | PRINT_ALL             { d_cmd_name = PRINT_ALL; }
        | PRINT_BCODE           { d_cmd_name = PRINT_BCODE; }
        | PRINT_BLOCK_STUB      { d_cmd_name = PRINT_BLOCK_STUB; }
        | PRINT_CNTX_OF_STUB    { d_cmd_name = PRINT_CNTX_OF_STUB; }
        | PRINT_GLOBAL          { d_cmd_name = PRINT_GLOBAL; }
        | PRINT_MESSAGE         { d_cmd_name = PRINT_MESSAGE; }
        | PRINT_OOP             { d_cmd_name = PRINT_OOP; }
        | PRINT_PROCESS         { d_cmd_name = PRINT_PROCESS; }
        | PRINT_RECEIVER        { d_cmd_name = PRINT_RECEIVER; }
        | PRINT_TEMP            { d_cmd_name = PRINT_TEMP; }
        | QUIT                  { d_cmd_name = QUIT; }
        | RERUN                 { d_cmd_name = RERUN; }
        | RESTART               { d_cmd_name = RESTART; }
        | RETURN                { d_cmd_name = RETURN; }
        | RUN                   { d_cmd_name = RUN; }
        | SET                   { d_cmd_name = SET; }
        | SHORT_HELP            { d_cmd_name = SHORT_HELP; }
        | SKIP_MSG              { d_cmd_name = SKIP_MSG; }
        | STATEMENT_STEP        { d_cmd_name = STATEMENT_STEP; }
        | STAT_OFF              { d_cmd_name = STAT_OFF; }
        | STAT_ON               { d_cmd_name = STAT_ON; }
        | STAT_PRINT            { d_cmd_name = STAT_PRINT; }
```

```
        | STAT_RESET            { d_cmd_name = STAT_RESET; }
        | STAT_STATUS           { d_cmd_name = STAT_STATUS; }
        | STATUS                { d_cmd_name = STATUS; }
        | STOP_AT               { d_cmd_name = STOP_AT; }
        | STOP_IN               { d_cmd_name = STOP_IN; }
        | UNSET                 { d_cmd_name = UNSET; }
        | WHERE                 { d_cmd_name = WHERE; }
        ;

%%

#include <stdio.h>

extern  unsigned short  D_reprompt_flag;
extern  unsigned short  D_syntax_error;
extern  unsigned short  D_in_debugger;

extern  char    yytext[];

/*----------------------------------------------------------------*/
yyerror ( str )

char    *str;

{

        fprintf ( stderr, "\nRAID syntax error: %s\n", yytext );

        D_syntax_error = 1;

        D_reprompt_flag = 1;

        return;
}

/*----------------------------------------------------------------*/
int     yywrap()

{
        return(1);
}


/*----------------------------------------------------------------*/
void    d_reprompt_flag ( new_val )

short   new_val;

        {
        D_reprompt_flag = new_val;

        return;
        }
```

Appendix F: Primitive Source Code

================================================================ change_rcvr_ref.c
check_garbage.c
keytrans.c
prim000_025.c
prim026_030.c
prim031_050.c
prim051_075.c
prim076_100.c
prim101_125.c
prim126_136.c
prim137_150.c
prim151_175.c
prim176_180.c
prim181_199.c
prim_err.c
prim_stack.c

```c
/*Copyright 1988 Eastman Kodak Company.  All rights reserved.*/
#include <stdio.h>
#include "types.h"
#include "constants.h"
#include "macros.h"
#include "interp_const.h"
#include "interp_types.h"

extern  struct  process Processes[];

/*-----------------------------------------------------------------*/

void    change_rcvr_ref ( rcvr_oop, new_rcvr_ptr )

        oop             rcvr_oop;
        object          *new_rcvr_ptr;

/*----------------- declarations ----------------------------------*/

        {
        cntx                    *cntx_ptr;
        struct process  *proc_ptr;
        long i;

/*----------------- executable code -------------------------------*/

        /* The intent of this program is to change all receiver pointers
           in all contexts of the process specified to point to a new version
           of the receiver.  This is necessary when the object manager
           moves the receiver elsewhere in the buffer, which happens on
           a FORCE command.  Note that we only adjust the current and
           previous contexts.  If we ever leave contexts around after
           we have exited from them, we will need to adjust their
           receivers too (we will need fwd ptr chains in the contexts).

           Also note that we assume the only place the receiver pointer is
           imbedded is in the context structures.

           This routine is called mainly from the primitives.
           All processes are updated.
           */

        for (i = 0; i< MAX_PROCESSES; i++)
                {
                proc_ptr = &Processes[i];
                if (proc_ptr != NULL)
                        {
                        for (cntx_ptr = proc_ptr ->cur_cntx;
                             cntx_ptr != NULL;
                             cntx_ptr = cntx_ptr -> prev )

                                {
                                if (cntx_ptr -> ctrl_vars.rcvr_oop == rcvr_oop)
                                   if (cntx_ptr -> ctrl_vars.rcvr_oop >= 0)
                                        cntx_ptr -> ctrl_vars.rcvr_ptr =
                                                        new_rcvr_ptr;
                                }

                        }
                }

        }
```

```
/*Copyright 1988 Eastman Kodak Company.  All rights reserved.*/
/* check_garbage.c:  call clean_region for the next process/pid to
                        be checked*/

/***************************************************************************
        This source code contains:
        check_garbage
***************************************************************************/

#include <stdio.h>
#include <signal.h>
#include "types.h"
#include "constants.h"
#include "oops_values.h"
#include "macros.h"
#include "object_rec.h"
#include "interp_const.h"
#include "interp_types.h"
#include "obj_mgr.h"

#if DEBUGGER
/****************/
#include "debug_const.h"
#include "debug_types.h"
#include "debug_externs.h"
/****************/
#endif

extern   struct  process Processes[];
extern struct process_data proc_data[MAX_PROCESSES];

check_garbage(retain_oop)
oop retain_oop;
{
PID apid;
unsigned short aregion;
static object_count = 0;


/*check to see if the next context created should start a new region*/
if (CUR_REGION == Cur_process -> region_cntr)
{

        /*current contex region is the same as the next context's
        region, unless we determine that the current region is full.
        Adjust object counter to that counted in the object manager*/

        Cur_process -> obj_counter =
                proc_data[CUR_PID].true_obj_count[CUR_REGION];

        if (Cur_process->obj_counter >= OBJ_REGION_CNT)
        {
                Cur_process->region_cntr++;
                Cur_process -> obj_counter = 0;
        }
}

/*now we check all regions to see if any need to be cleaned.  We do this
only if we have created "enough" objects since the last time that we
checked*/

object_count ++;
if (object_count > DIRTY_REGION)
{
        object_count = 0;
        for (apid = 0; apid < MAX_PROCESSES; apid++)
                if ( Processes[apid].flags & PROC_IN_USE )
                        for (aregion = 0; aregion < MAX_REGIONS; aregion++)
                        {
                                if (proc_data[apid].gc_obj_count[aregion] >
                                        DIRTY_REGION)
                                {
                                        clean_region(retain_oop, apid,
                                          aregion, Processes[apid].cur_cntx);
                                        /*cleaning a region cleans those above
                                        it too*/
                                        break;
                                }
                        }
}
}
```

```
/*Copyright 1988 Eastman Kodak Company.  All rights reserved.*/
#include "keycodes.h"

/*
** sun <-> smalltalk keyboard translation tables
**
** the sun2 & sun3 keyboards each have 128 stations which are nearly
** identical in terms of the keycap <-> keystation relationships in which
** we are interested, (some of the function keys are rearranged), so we
** hope we can get by with the one here.  if not, it should be a simple
** matter to have openKeyboard() choose the table to install as STKeyTrans
** based upon the detected system/keyboard.
*/

unsigned char Sun3STKeyTrans[] =
{
        NOKEY, NOKEY, NOKEY, NOKEY, NOKEY, NOKEY, NOKEY, NOKEY,
        NOKEY, NOKEY, NOKEY, NOKEY, NOKEY, NOKEY, NOKEY, NOKEY,
        NOKEY, NOKEY, NOKEY, NOKEY, NOKEY, NOKEY, NOKEY, NOKEY,
        NOKEY, NOKEY, NOKEY, NOKEY, NOKEY, ESC  , '1'  , '2'  ,

        '3'  , '4'  , '5'  , '6'  , '7'  , '8'  , '9'  , '0'  ,
        '-'  , '='  , '`'  , BS   , NOKEY, NOKEY, NOKEY, NOKEY,
        NOKEY, NOKEY, NOKEY, NOKEY, NOKEY, HT   , 'q'  , 'w'  ,
        'e'  , 'r'  , 't'  , 'y'  , 'u'  , 'i'  , 'o'  , 'p'  ,

        '['  , ']'  , DEL  , NOKEY, NOKEY, K1   , NOKEY, NOKEY,
        NOKEY, NOKEY, NOKEY, NOKEY, CNTRL, 'a'  , 's'  , 'd'  ,
        'f'  , 'g'  , 'h'  , 'j'  , 'k'  , 'l'  , ';'  , '\''  ,
        '\\' , CR   , NOKEY, K2   , K3   , K4   , NOKEY, NOKEY,

        NOKEY, NOKEY, NOKEY, LSHFT, 'z'  , 'x'  , 'c'  , 'v'  ,
        'b'  , 'n'  , 'm'  , ','  , '.'  , '/'  , RSHFT, NL   ,
        NOKEY, K5   , NOKEY, NOKEY, NOKEY, NOKEY, NOKEY, ALOCK,
        NOKEY, SP   , NOKEY, NOKEY, NOKEY, NOKEY, NOKEY, NOKEY,
};
```

```
/* ... Eastman Kodak Company.  All rights reserved.*/
#include <stdio.h>
#include <math.h>
#include <strings.h>
#include <signal.h>
#include "types.h"
#include "constants.h"
#include "bytecodes.h"
#include "macros.h"
#include "oops_values.h"
#include "interp_const.h"
#include "interp_types.h"

static char *msg01 = "prim_%d:01--Primitive not implemented";
static char *msg02 = "prim_1:02--Class not found for object: %d";
static char *msg03 = "prim_%d:03--Object not found: %d";
static char *msg04 = "prim_3:04--In_use table integrity check failed";
static char *msg05 = "prim_%d:05--Division by 0: %d";
static char *msg06 = "prim_3:06--Buffer integrity check failed";
static char *msg09 = "prim_%d:09--Object not class Integer: %d";
static char *msg29 = "prim_%d:09--GCD with a parm of 0";
static char *msg32 = "prim_21:32--Object not positive Integer: %d";
static char *msg33 = "prim_21:33--Attempt to index past bit 15: %d";
static char *msg34 = "prim_8:34--Parm is of class integer, not string: %d";
static char *msg35 = "prim_%d:35--Object not class String: %d";

extern struct process *Cur_process;
extern object *obj_mgr();
extern long getsymbol();
extern dict_xref *getdictionary();
extern dict_xref *ditdictionary();
extern object *fetch_method();
extern object *get_obj();
extern object *reserve_obj();

extern struct process *Cur_process;

/*
 * <primitive 0 arg> -- dummy primitive ... used for debugging
 */

oop
prim_0()
{
        syserr("Unwritten primitive %d was called\n", PRIMARG(0));
}

/*
 * <primitive 1 self> -- Object class & Object species
 */

oop
prim_1()
{
        object *obj_ptr;
        int in_oop;

        in_oop = PRIMARG(0);

        if (in_oop < 0)
                return (Integer);
        if (in_oop >= INIT_CNTX_ID)
                return (Block);

        obj_ptr = GET_RCVR(in_oop);

        if (obj_ptr == NULL)
                syserr(msg02, PRIMARG(0));

        return (obj_ptr->fp.class);
}

/*
 * <primitive 2> -- PauseController startUp
 */

extern int Divert;

oop
prim_2()
{
        int mask;

        /*
         * allow our host os process to sleep if there is no
         * pending input.
         */

        mask = sigblock(sigmask(SIGIO));

        if (!Divert)
                sigpause(mask);

        sigsetmask(mask);

        return (nIL);
}

/*
 * <primitive 3 self> -- do internal integrity checks
 */

oop
prim_3()
{
        if (check_iu())
                syserr(msg04);
        if (check_buffers())
                syserr(msg06);
        return (nIL);
}

/*
 * <primitive 4 self> -- Object size, Object basicSize, & Array size
 */

oop
prim_4()
{
        object *obj_ptr;

        if (PRIMARG(0) < 0)
                return (zERO);

        obj_ptr = GET_RCVR(PRIMARG(0));

        if (obj_ptr == NULL)
```

```
            syserr(msg03, PRIMARG(0));

        return (INTEGER_OBJECT(obj_ptr->fp.no_indx_vars));
}

/*
 * <primitive 5 self> -- Object hash, Symbol hash, String hash & Integer hash
 */

oop
prim_5()
{
        object *self;

        if (PRIMARG(0) < 256)
                return (PRIMARG(0));

        self = GET_RCVR(PRIMARG(0));

        if (self == NULL)
                syserr("prim_5: couldn't fetch self (oop = %d)", PRIMARG(0));

        if (self->fp.class == String || self->fp.class == Symbol
          || in_super_chain(self->fp.class, String, CUR_REGION, CUR_PID)
          || in_super_chain(self->fp.class, Symbol, CUR_REGION, CUR_PID))
                return (INTEGER_OBJECT(hash_string(BYTEARRAY_DATA(self))));

        return (INTEGER_OBJECT(self->fp.id));
}

/*
 * <primitive 6 self aNumber> -- Integer /
 */

oop
prim_6()
{
        register object *obj;
        register int integer1;
        register int integer2;
        double float1;
        double float2;

        integer1 = PRIMARG(0);
        integer2 = PRIMARG(1);

        /*
        ** we optimize for positive integers, (represented as negative oops).
        */

        if (integer1 < 0)
        {
                if (integer2 < 0)
                {
                        if (integer1 % integer2 == 0)
                                OP_INT(integer1, integer2, /);
                        float1 = (double) -integer1;
                        float2 = (double) -integer2;
                        OP_FLOAT(float1, float2, /);
                }
                if (integer2 == zERO)
                        syserr(msg05, 6, integer2);
                goto int2obj;
        }

        if (integer1 == zERO)
        {
                if (integer2 < 0)
                        return (zERO);
                if (integer2 == zERO)
                        syserr(msg05, 6, integer2);
                integer1 = 0;
                goto int2obj;
        }

int1obj:
        obj = get_obj(integer1, CUR_REGION, CUR_PID);

        if (obj == NULL)
                syserr("prim_6: couldn't fetch self (oop = %d)", integer1);

        /*
        ** we assume the receiver is of class integer and skip the type
        ** check, (check was made by send message logic).
        */

        integer1 = - *((int *) INDEXED_VARS(obj));

        if (integer2 < 0)
        {
                if (integer1 % integer2 == 0)
                        OP_INT(integer1, integer2, /);
                float1 = (double) -integer1;
                float2 = (double) -integer2;
                OP_FLOAT(float1, float2, /);
        }
        if (integer2 == zERO)
                syserr(msg05, 6, integer2);

int2obj:
        obj = get_obj(integer2, CUR_REGION, CUR_PID);

        if (obj == NULL)
                syserr("prim_6: couldn't fetch parameter (oop = %d)",
                  integer2);

        if (obj->fp.class == Integer)
        {
                integer2 = - *((int *) INDEXED_VARS(obj));

                if (integer1 % integer2 == 0)
                        OP_INT(integer1, integer2, /);
                float1 = (double) -integer1;
                float2 = (double) -integer2;
                OP_FLOAT(float1, float2, /);
        }
        if (obj->fp.class == Float)
        {
                /*
                 * convert self to float, do the operation, and return a float.
                 */

                float1 = (double) -integer1;
                float2 = *((double *) INDEXED_VARS(obj));
                if (float2 == 0)
                        syserr(msg05, 6, integer2);
                OP_FLOAT(float1, float2, /);
        }
```

```
        integer2); "... not a kind of integer or Float (oop = %d)",
}

/*
 * <primitive 7 self anObject> -- Object ==
 */

oop
prim_7()
{
        if (PRIMARG(0) == PRIMARG(1))
                return (tRUE);
        return (fALSE);
}

/*
 * <primitive 8 aKey> -- SystemDictionary at:
 */

oop
prim_8()
{
        object *aKey;
        dict_xref *dict_ptr;

        aKey = GET_RCVR(PRIMARG(0));

        if (aKey == NULL)
                syserr(msg03, 8, PRIMARG(0));

        if (!(aKey->fp.class == String || in_super_chain(aKey->fp.class,
          String, CUR_REGION, CUR_PID)))
                syserr(msg35, 8, PRIMARG(0));

        dict_ptr = getdictionary(BYTEARRAY_DATA(aKey), CUR_REGION, CUR_PID);

        if (dict_ptr == NULL)
                return (nIL);

        return (dict_ptr->fp.object_oop);
}

/*
 * <primitive 9 aKey> -- SystemDictionary removeKey:
 */

oop
prim_9()
{
        object *aKey;
        dict_xref *dict_ptr;

        aKey = GET_RCVR(PRIMARG(0));

        if (aKey == NULL)
                syserr(msg03, 9, PRIMARG(0));

        if (!(aKey->fp.class == String || in_super_chain(aKey->fp.class,
          String, CUR_REGION, CUR_PID)))
                syserr(msg35, 9, PRIMARG(0));

        dict_ptr = getdictionary(BYTEARRAY_DATA(aKey), CUR_REGION, CUR_PID);

        if (dict_ptr == NULL)
                return (nIL);

        dict_ptr = ditdictionary(BYTEARRAY_DATA(aKey), CUR_REGION, CUR_PID);

        return (nIL);
}

/*
 * <primitive 10 self aNumber> -- Integer +
 */

oop
prim_10()
{
        register object *obj;
        register int integer1;
        register int integer2;
        double float1;
        double float2;

        integer1 = PRIMARG(0);
        integer2 = PRIMARG(1);

        /*
         * we optimize for positive integers, (represented as negative oops).
         */

        if (integer1 < 0)
        {
                if (integer2 < 0)
                        ADD_INT(integer1, integer2);
                if (integer2 == zERO)
                        return (integer1);
                goto int2obj;
        }
        if (integer1 == zERO)
        {
                if (integer2 < 0)
                        return (integer2);
                if (integer2 == zERO)
                        return (zERO);
                integer1 = 0;
                goto int2obj;
        }

int1obj:
        obj = get_obj(integer1, CUR_REGION, CUR_PID);

        if (obj == NULL)
                syserr("prim_10: couldn't fetch self (oop = %d)", integer1);

        /*
         * we assume the receiver is of class integer and skip the type
         * check, (check was made by send message logic).
         */

        integer1 = - *((int *) INDEXED_VARS(obj));

        if (integer2 < 0)
                ADD_INT(integer1, integer2);
        if (integer2 == zERO)
                ADD_INT(integer1, 0);
```

```
	obj = get_obj(integer2, CUR_REGION, CUR_PID);

	if (obj == NULL)
		syserr("prim_10: couldn't fetch parameter (oop = %d)",
		  integer2);

	if (obj->fp.class == Integer)
	{
		integer2 = - *((int *) INDEXED_VARS(obj));
		ADD_INT(integer1, integer2);
	}
	if (obj->fp.class == Float)
	{

		/*
		 * convert self to float, do the operation, and return a float.
		 */

		float1 = (double) -integer1;
		float2 = *((double *) INDEXED_VARS(obj));
		OP_FLOAT(float1, float2, +);
	}

	syserr("prim_10: parameter not a kind of Integer or Float (oop = %d)",
	  integer2);

}

/*
 * <primitive 11 self aNumber> -- Integer -
 */

oop
prim_11()
{
	register object *obj;
	register int integer1;
	register int integer2;
	double float1;
	double float2;

	integer1 = PRIMARG(0);
	integer2 = PRIMARG(1);

	/*
	 * we optimize for positive integers, (represented as negative oops).
	 */

	if (integer1 < 0)
	{
		if (integer2 < 0)
			SUB_INT(integer1, integer2);
		if (integer2 == zERO)
			return (integer1);
		goto int2obj;
	}
	if (integer1 == zERO)
	{
		if (integer2 < 0)
			SUB_INT(0, integer2);
		if (integer2 == zERO)
			return (zERO);
		integer1 = 0;
			goto int2obj;
	}

int1obj:
	obj = get_obj(integer1, CUR_REGION, CUR_PID);

	if (obj == NULL)
		syserr("prim_11: couldn't fetch self (oop = %d)", integer1);

	/*
	 * we assume the receiver is of class Integer and skip the type
	 * check, (check was made by send message logic).
	 */

	integer1 = - *((int *) INDEXED_VARS(obj));

	if (integer2 < 0)
		SUB_INT(integer1, integer2);
	if (integer2 == zERO)
		SUB_INT(integer1, 0);

int2obj:
	obj = get_obj(integer2, CUR_REGION, CUR_PID);

	if (obj == NULL)
		syserr("prim_11: couldn't fetch parameter (oop = %d)",
		  integer2);

	if (obj->fp.class == Integer)
	{
		integer2 = - *((int *) INDEXED_VARS(obj));
		SUB_INT(integer1, integer2);
	}
	if (obj->fp.class == Float)
	{

		/*
		 * convert self to float, do the operation, and return a float.
		 */

		float1 = (double) -integer1;
		float2 = *((double *) INDEXED_VARS(obj));
		OP_FLOAT(float1, float2, -);
	}

	syserr("prim_11: parameter not a kind of Integer or Float (oop = %d)",
	  integer2);

}

/*
 * <primitive 12 self aNumber> -- Integer <
 */

oop
prim_12()
{
	register object *obj;
	register int integer1;
	register int integer2;
	double float1;
	double float2;

	integer1 = PRIMARG(0);
```

```
	/*
	 * we optimize for positive integers, (represented as negative oops).
	 */

	if (integer1 < 0)
	{
		if (integer2 < 0)
			CMP(integer1, integer2, >);
		if (integer2 == zERO)
			CMP(integer1, 0, >);
		goto int2obj;
	}
	if (integer1 == zERO)
	{
		if (integer2 < 0)
			CMP(0, integer2, >);
		if (integer2 == zERO)
			CMP(0, 0, >);
		integer1 = 0;
		goto int2obj;
	}
int1obj:
	obj = get_obj(integer1, CUR_REGION, CUR_PID);

	if (obj == NULL)
		syserr("prim_12: couldn't fetch self (oop = %d)", integer1);

	/*
	 * we assume the receiver is of class integer and skip the type
	 * check, (check was made by send message logic).
	 */

	integer1 = - *((int *) INDEXED_VARS(obj));

	if (integer2 < 0)
		CMP(integer1, integer2, >);
	if (integer2 == zERO)
		CMP(integer1, 0, >);
int2obj:
	obj = get_obj(integer2, CUR_REGION, CUR_PID);

	if (obj == NULL)
		syserr("prim_12: couldn't fetch parameter (oop = %d)",
		  integer2);

	if (obj->fp.class == Integer)
	{
		integer2 = - *((int *) INDEXED_VARS(obj));
		CMP(integer1, integer2, >);
	}
	if (obj->fp.class == Float)
	{

		/*
		 * convert self to float
		 */

		float1 = (double) -integer1;
		float2 = *((double *) INDEXED_VARS(obj));
		CMP(float1, float2, <);
	}

	syserr("prim_12: parameter not a kind of Integer or Float (oop = %d)",
	  integer2);

}

/*
 * <primitive 13 self aNumber> -- Integer >
 */

oop
prim_13()
{
	register object *obj;
	register int integer1;
	register int integer2;
	double float1;
	double float2;

	integer1 = PRIMARG(0);
	integer2 = PRIMARG(1);

	/*
	 * we optimize for positive integers, (represented as negative oops).
	 */

	if (integer1 < 0)
	{
		if (integer2 < 0)
			CMP(integer1, integer2, <);
		if (integer2 == zERO)
			CMP(integer1, 0, <);
		goto int2obj;
	}
	if (integer1 == zERO)
	{
		if (integer2 < 0)
			CMP(0, integer2, <);
		if (integer2 == zERO)
			CMP(0, 0, <);
		integer1 = 0;
		goto int2obj;
	}
int1obj:
	obj = get_obj(integer1, CUR_REGION, CUR_PID);

	if (obj == NULL)
		syserr("prim_13: couldn't fetch self (oop = %d)", integer1);

	/*
	 * we assume the receiver is of class integer and skip the type
	 * check, (check was made by send message logic).
	 */

	integer1 = - *((int *) INDEXED_VARS(obj));

	if (integer2 < 0)
		CMP(integer1, integer2, <);
	if (integer2 == zERO)
		CMP(integer1, 0, <);
int2obj:
```

```
        obj = get_obj(integer2, CUR_REGION, CUR_PID);

        if (obj == NULL)
                syserr("prim_13: couldn't fetch parameter (oop = %d)",
                  integer2);

        if (obj->fp.class == Integer)
        {
                integer2 = - *((int *) INDEXED_VARS(obj));
                CMP(integer1, integer2, <);
        }
        if (obj->fp.class == Float)
        {

                /*
                 * convert self to float
                 */

                float1 = (double) -integer1;
                float2 = *((double *) INDEXED_VARS(obj));
                CMP(float1, float2, >);
        }

        syserr("prim_13: parameter not a kind of Integer or Float (oop = %d)",
          integer2);

}

/*
 * <primitive 14 self aNumber> -- Integer <=
 */

oop
prim_14()
{
        register object *obj;
        register int integer1;
        register int integer2;
        double float1;
        double float2;

        integer1 = PRIMARG(0);
        integer2 = PRIMARG(1);

        /*
         * we optimize for positive integers, (represented as negative oops).
         */

        if (integer1 < 0)
        {
                if (integer2 < 0)
                        CMP(integer1, integer2, >=);
                if (integer2 == zERO)
                        CMP(integer1, 0, >=);
                goto int2obj;
        }
        if (integer1 == zERO)
        {
                if (integer2 < 0)
                        CMP(0, integer2, >=);
                if (integer2 == zERO)
                        CMP(0, 0, >=);
                integer1 = 0;
                goto int2obj;
        }

int1obj:
        obj = get_obj(integer1, CUR_REGION, CUR_PID);

        if (obj == NULL)
                syserr("prim_14: couldn't fetch self (oop = %d)", integer1);

        /*
         * we assume the receiver is of class Integer and skip the type
         * check, (check was made by send message logic).
         */

        integer1 = - *((int *) INDEXED_VARS(obj));

        if (integer2 < 0)
                CMP(integer1, integer2, >=);
        if (integer2 == zERO)
                CMP(integer1, 0, >=);
int2obj:
        obj = get_obj(integer2, CUR_REGION, CUR_PID);

        if (obj == NULL)
                syserr("prim_14: couldn't fetch parameter (oop = %d)",
                  integer2);

        if (obj->fp.class == Integer)
        {
                integer2 = - *((int *) INDEXED_VARS(obj));
                CMP(integer1, integer2, >=);
        }
        if (obj->fp.class == Float)
        {

                /*
                 * convert self to float
                 */

                float1 = (double) -integer1;
                float2 = *((double *) INDEXED_VARS(obj));
                CMP(float1, float2, <=);
        }

        syserr("prim_14: parameter not a kind of Integer or Float (oop = %d)",
          integer2);

}

/*
 * <primitive 15 self aNumber> -- Integer >=
 */

oop
prim_15()
{
        register object *obj;
        register int integer1;
        register int integer2;
        double float1;
        double float2;

        integer1 = PRIMARG(0);
        integer2 = PRIMARG(1);
```

```
	 * we optimize for positive integers. (represented as negative oops).
	 */

	if (integer1 < 0)
	{
		if (integer2 < 0)
			CMP(integer1, integer2, <=);
		if (integer2 == zERO)
			CMP(integer1, 0, <=);
		goto int2obj;
	}
	if (integer1 == zERO)
	{
		if (integer2 < 0)
			CMP(0, integer2, <=);
		if (integer2 == zERO)
			CMP(0, 0, <=);
		integer1 = 0;
		goto int2obj;
	}

int1obj:
	obj = get_obj(integer1, CUR_REGION, CUR_PID);

	if (obj == NULL)
		syserr("prim_15: couldn't fetch self (oop = %d)", integer1);

	/*
	 * we assume the receiver is of class integer and skip the type
	 * check, (check was made by send message logic).
	 */

	integer1 = - *((int *) INDEXED_VARS(obj));

	if (integer2 < 0)
		CMP(integer1, integer2, <=);
	if (integer2 == zERO)
		CMP(integer1, 0, <=);

int2obj:
	obj = get_obj(integer2, CUR_REGION, CUR_PID);

	if (obj == NULL)
		syserr("prim_15: couldn't fetch parameter (oop = %d)",
		  integer2);

	if (obj->fp.class == Integer)
	{
		integer2 = - *((int *) INDEXED_VARS(obj));
		CMP(integer1, integer2, <=);
	}
	if (obj->fp.class == Float)
	{

		/*
		 * convert self to float
		 */

		float1 = (double) -integer1;
		float2 = *((double *) INDEXED_VARS(obj));
		CMP(float1, float2, >=);
	}
		syserr("prim_15: parameter not a kind of Integer or Float (oop = %d)",
		  integer2);

}

/*
 * <primitive 16 self aNumber> -- Integer =
 */

oop
prim_16()
{
	register object *obj;
	register int integer1;
	register int integer2;
	double float1;
	double float2;

	integer1 = PRIMARG(0);
	integer2 = PRIMARG(1);

	/*
	 * we optimize for positive integers, (represented as negative oops).
	 */

	if (integer1 < 0)
	{
		if (integer2 < 0)
			CMP(integer1, integer2, ==);
		if (integer2 == zERO)
			CMP(integer1, 0, ==);
		goto int2obj;
	}
	if (integer1 == zERO)
	{
		if (integer2 < 0)
			CMP(0, integer2, ==);
		if (integer2 == zERO)
			CMP(0, 0, ==);
		integer1 = 0;
		goto int2obj;
	}

int1obj:
	obj = get_obj(integer1, CUR_REGION, CUR_PID);

	if (obj == NULL)
		syserr("prim_16: couldn't fetch self (oop = %d)", integer1);

	/*
	 * we assume the receiver is of class integer and skip the type
	 * check, (check was made by send message logic).
	 */

	integer1 = - *((int *) INDEXED_VARS(obj));

	if (integer2 < 0)
		CMP(integer1, integer2, ==);
	if (integer2 == zERO)
		CMP(integer1, 0, ==);

int2obj:
	obj = get_obj(integer2, CUR_REGION, CUR_PID);
```

```
	if (obj == NULL)
		syserr("prim_16: couldn't fetch parameter (oop = %d)",
		  integer2);

	if (obj->fp.class == Integer)
	{
		integer2 = - *((int *) INDEXED_VARS(obj));
		CMP(integer1, integer2, ==);
	}
	if (obj->fp.class == Float)
	{

		/*
		 * convert self to float
		 */

		float1 = (double) -integer1;
		float2 = *((double *) INDEXED_VARS(obj));
		CMP(float1, float2, ==);
	}

	return (fALSE);
}

/*
 * <primitive 17 self aNumber> -- Integer ~=
 */

oop
prim_17()
{
	register object *obj;
	register int integer1;
	register int integer2;
	double float1;
	double float2;

	integer1 = PRIMARG(0);
	integer2 = PRIMARG(1);

	/*
	 * we optimize for positive integers, (represented as negative oops).
	 */

	if (integer1 < 0)
	{
		if (integer2 < 0)
			CMP(integer1, integer2, !=);
		if (integer2 == zERO)
			CMP(integer1, 0, !=);
		goto int2obj;
	}
	if (integer1 == zERO)
	{
		if (integer2 < 0)
			CMP(0, integer2, !=);
		if (integer2 == zERO)
			CMP(0, 0, !=);
		integer1 = 0;
		goto int2obj;
	}

int1obj:
	obj = get_obj(integer1, CUR REGION, CUR PID);

	if (obj == NULL)
		syserr("prim_17: couldn't fetch self (oop = %d)", integer1);

	/*
	 * we assume the receiver is of class Integer and skip the type
	 * check, (check was made by send message logic).
	 */

	integer1 = - *((int *) INDEXED_VARS(obj));

	if (integer2 < 0)
		CMP(integer1, integer2, !=);
	if (integer2 == zERO)
		CMP(integer1, 0, !=);

int2obj:
	obj = get_obj(integer2, CUR_REGION, CUR_PID);

	if (obj == NULL)
		syserr("prim_17: couldn't fetch parameter (oop = %d)",
		  integer2);

	if (obj->fp.class == Integer)
	{
		integer2 = - *((int *) INDEXED_VARS(obj));
		CMP(integer1, integer2, !=);
	}
	if (obj->fp.class == Float)
	{

		/*
		 * convert self to float
		 */

		float1 = (double) -integer1;
		float2 = *((double *) INDEXED_VARS(obj));
		CMP(float1, float2, !=);
	}

	return (tRUE);
}

/*
 * <primitive 18 self aNumber> -- Integer *
 */

oop
prim_18()
{
	register object *obj;
	register int integer1;
	register int integer2;
	double float1;
	double float2;

	integer1 = PRIMARG(0);
	integer2 = PRIMARG(1);

	/*
	 * we optimize for positive integers, (represented as negative oops).
	 */
```

```
		if (integer2 < 0)
			OP_INT(integer1, integer2, *);
		if (integer2 == zERO)
			return(zERO);
		goto int2obj;
	}

	if (integer1 == zERO)
		return(zERO);
int1obj:
	obj = get_obj(integer1, CUR_REGION, CUR_PID);

	if (obj == NULL)
		syserr("prim_18: couldn't fetch self (oop = %d)", integer1);

	/*
	 * we assume the receiver is of class Integer and skip the type
	 * check, (check was made by send message logic).
	 */

	integer1 = - *((int *) INDEXED_VARS(obj));

	if (integer2 < 0)
		OP_INT(integer1, integer2, *);
	if (integer2 == zERO)
		return (zERO);
int2obj:
	obj = get_obj(integer2, CUR_REGION, CUR_PID);

	if (obj == NULL)
		syserr("prim_18: couldn't fetch parameter (oop = %d)",
		  integer2);

	if (obj->fp.class == Integer)
	{
		integer2 = - *((int *) INDEXED_VARS(obj));
		OP_INT(integer1, integer2, *);
	}
	if (obj->fp.class == Float)
	{

		/*
		 * convert self to float, do the operation, and return a float.
		 */

		float1 = (double) -integer1;
		float2 = *((double *) INDEXED_VARS(obj));
		OP_FLOAT(float1, float2, *);
	}

	syserr("prim_18: parameter not a kind of Integer or Float (oop = %d)",
	  integer2);

}

/*
 * <primitive 19 self aNumber> -- Integer //  (round towards negative infinity)
 */

oop
prim_19()
{
	register object *obj;
	register int integer1;
	register int integer2;
	double float1;
	double float2;

	integer1 = PRIMARG(0);
	integer2 = PRIMARG(1);

	/*
	** we optimize for positive integers, (represented as negative oops).
	*/

	if (integer1 < 0)
	{
		if (integer2 < 0)
			DIV_INT_NEGINF(integer1, integer2);
		if (integer2 == zERO)
			syserr(msg05, 19, integer2);
		goto int2obj;
	}
	if (integer1 == zERO)
		return (zERO);
int1obj:
	obj = get_obj(integer1, CUR_REGION, CUR_PID);

	if (obj == NULL)
		syserr("prim_19: couldn't fetch self (oop = %d)", integer1);

	/*
	** we assume the receiver is of class Integer and skip the type
	** check, (check was made by send message logic).
	*/

	integer1 = - *((int *) INDEXED_VARS(obj));

	if (integer2 < 0)
		DIV_INT_NEGINF(integer1, integer2);
	if (integer2 == zERO)
		syserr(msg05, 19, integer2);
int2obj:
	obj = get_obj(integer2, CUR_REGION, CUR_PID);

	if (obj == NULL)
		syserr("prim_19: couldn't fetch parameter (oop = %d)",
		  integer2);

	if (obj->fp.class == Integer)
	{
		integer2 = - *((int *) INDEXED_VARS(obj));
		DIV_INT_NEGINF(integer1, integer2);
	}
	if (obj->fp.class == Float)
	{
		/*
		 * convert self to float, do the operation, and return a float.
		 */

		float1 = (double) -integer1;
		float2 = *((double *) INDEXED_VARS(obj));
```

```c
		if (float2 == 0)
			syserr(msg05, 19, integer2);
		DIV_FLOAT_NEGINF(float1, float2);
	}

	syserr("prim_19: parameter not a kind of Integer or Float (oop = %d)",
	  integer2);
}

/*
 * <primitive 20 self aNumber> -- Integer gcd:
 */

oop
prim_20()
{
	register object *obj;
	register int integer1;
	register int integer2;

	integer1 = PRIMARG(0);
	integer2 = PRIMARG(1);

	/*
	 * we optimize for positive integers, (represented as negative oops).
	 */

	if (integer1 < 0)
	{
		if (integer2 < 0)
			GCD_INT(integer1, integer2);
		if (integer2 == zERO)
			syserr(msg29, 20);
		goto int2obj;
	}
	if (integer1 == zERO)
	{
		if (integer2 < 0)
			return (integer2);
		if (integer2 == zERO)
			syserr(msg29, 20);
		integer1 = 0;
		goto int2obj;
	}
int1obj:
	obj = get_obj(integer1, CUR_REGION, CUR_PID);

	if (obj == NULL)
		syserr("prim_20: couldn't fetch self (oop = %d)", integer1);

	/*
	 * we assume the receiver is of class Integer and skip the type
	 * check, (check was made by send message logic).
	 */

	integer1 = - *((int *) INDEXED_VARS(obj));

	if (integer2 < 0)
		GCD_INT(integer1, integer2);
	if (integer2 == zERO)
		syserr(msg29, 20);

int2obj:
	obj = get_obj(integer2, CUR_REGION, CUR_PID);

	if (obj == NULL)
		syserr("prim_20: couldn't fetch parameter (oop = %d)",
		  integer2);

	if (obj)->fp.class == Integer)
	{
		integer2 = - *((int *) INDEXED_VARS(obj));
		GCD_INT(integer1, integer2);
	}
	if (obj)->fp.class == Float)
	{

		/*
		 * truncate argument to an integer and perform the operation
		 */

		integer2 = (int) *((double *) INDEXED_VARS(obj));
		if (integer2 == 0)
			syserr(msg29, 20);
		GCD_INT(integer1, integer2);
	}

	syserr("prim_20: parameter not a kind of Integer or Float (oop = %d)",
	  integer2);

}

/*
 * <primitive 21 self aNumber> -- Integer bitAt
 */

oop
prim_21()
{
	register object *obj;
	register int integer1;
	register int integer2;

	integer2 = INTEGER_VALUE(PRIMARG(1));

	if (integer2 <= 0)
		syserr(msg32, PRIMARG(1));

	integer1 = INTEGER_VALUE(PRIMARG(0));

	if (integer1 >= 0)
		if (integer1 & (1 << (integer2-1)))
			return (-1);
		else
			return (zERO);

	obj = get_obj(PRIMARG(0), CUR_REGION, CUR_PID);

	if (obj == NULL)
		syserr("prim_21: couldn't fetch self (oop = %d)", PRIMARG(0));

	/*
	 * we assume the receiver is of class Integer and skip the type
	 * check, (check was made by send message logic).
	 */

	integer1 = *((int *) INDEXED_VARS(obj));
```

```
	if (integer1 & (1 << (integer2-1)))
		return (-1);
	else
		return (ZERO);
}

/*
 * <primitive 22 self aNumber> -- Integer bitOr
 */

oop
prim_22()
{
	register object *obj;
	register int integer1;
	register int integer2;

	integer1 = INTEGER_VALUE(PRIMARG(0));

	if ( integer1 < 0 )
	{
		obj = get_obj(PRIMARG(0), CUR_REGION, CUR_PID);

		if (obj == NULL)
			syserr("prim_22: couldn't fetch self (oop = %d)",
			  PRIMARG(1));

		/*
		 * we assume the receiver is of class Integer and skip the type
		 * check, (check was made by send message logic).
		 */

		integer1 = *((int *) INDEXED_VARS(obj));
	}

	integer2 = INTEGER_VALUE(PRIMARG(1));

	if ( integer2 < 0 )
	{
		obj = get_obj(PRIMARG(1), CUR_REGION, CUR_PID);

		if (obj == NULL)
			syserr("prim_22: couldn't fetch aNumber (oop = %d)",
			  PRIMARG(1));

		if (obj->fp.class != Integer)
			syserr(msg09, 22, PRIMARG(1));

		integer2 = *((int *) INDEXED_VARS(obj));
	}

	OP_INT(integer1,  nteger2, |);
}

/*
 * <primitive 23 self aNumber> -- Integer bitAnd
 */

oop
prim_23()
{
	register object *obj;
	register int integer1;
	register int integer2;

	integer1 = INTEGER_VALUE(PRIMARG(0));

	if ( integer1 < 0 )
	{
		obj = get_obj(PRIMARG(0), CUR_REGION, CUR_PID);

		if (obj == NULL)
			syserr("prim_23: couldn't fetch self (oop = %d)",
			  PRIMARG(1));

		/*
		 * we assume the receiver is of class Integer and skip the type
		 * check, (check was made by send message logic).
		 */

		integer1 = *((int *) INDEXED_VARS(obj));
	}

	integer2 = INTEGER_VALUE(PRIMARG(1));

	if ( integer2 < 0 )
	{
		obj = get_obj(PRIMARG(1), CUR_REGION, CUR_PID);

		if (obj == NULL)
			syserr("prim_23: couldn't fetch aNumber (oop = %d)",
			  PRIMARG(1));

		if (obj->fp.class != Integer)
			syserr(msg09, 23, PRIMARG(1));

		integer2 = *((int *) INDEXED_VARS(obj));
	}

	OP_INT(integer1, integer2, &);
}

/*
 * <primitive 24 self aNumber> -- Integer bitXor
 */

oop
prim_24()
{
	register object *obj;
	register int integer1;
	register int integer2;

	integer1 = INTEGER_VALUE(PRIMARG(0));

	if ( integer1 < 0 )
	{
		obj = get_obj(PRIMARG(0), CUR_REGION, CUR_PID);

		if (obj == NULL)
			syserr("prim_24: couldn't fetch self (oop = %d)",
			  PRIMARG(1));

		/*
		 * we assume the receiver is of class Integer and skip the type
		 * check, (check was made by send message logic).
```

```
		 */

		integer1 = *((int *) INDEXED_VARS(obj));
	}

	integer2 = INTEGER_VALUE(PRIMARG(1));

	if ( integer2 < 0 )
	{
		obj = get_obj(PRIMARG(1), CUR_REGION, CUR_PID);

		if (obj == NULL)
			syserr("prim_24: couldn't fetch aNumber (oop = %d)",
			  PRIMARG(1));

		if (obj->fp.class != Integer)
			syserr(msg09, 24, PRIMARG(1));

		integer2 = *((int *) INDEXED_VARS(obj));
	}

	OP_INT(integer1, integer2, ^);
}

/*
 * <primitive 25 self aNumber> -- Integer bitShift
 */

oop
prim_25()
{
	register object *obj;
	register int integer1;
	register int integer2;

	integer1 = INTEGER_VALUE(PRIMARG(0));

	if ( integer1 < 0 )
	{
		obj = get_obj(PRIMARG(0), CUR_REGION, CUR_PID);

		if (obj == NULL)
			syserr("prim_25: couldn't fetch self (oop = %d)",
			  PRIMARG(1));

		/*
		 * we assume the receiver is of class Integer and skip the type
		 * check, (check was made by send message logic).
		 */

		integer1 = *((int *) INDEXED_VARS(obj));
	}

	integer2 = INTEGER_VALUE(PRIMARG(1));

	if ( integer2 < 0 )
	{
		obj = get_obj(PRIMARG(1), CUR_REGION, CUR_PID);

		if (obj == NULL)
			syserr("prim_25: couldn't fetch aNumber (oop = %d)",
			  PRIMARG(1));

		if (obj->fp.class != Integer)
			syserr(msg09, 25, PRIMARG(1));

		integer2 = *((int *) INDEXED_VARS(obj));
	}

	if (integer2 < 0)
		OP_INT(integer1, -integer2, >>);

	OP_INT(integer1, integer2, <<);
}
```

```
/*Copyright 1988 Eastman Kodak Company.  All rights reserved.*/
#include <stdio.h>
#include <math.h>
#include <strings.h>
#include "types.h"
#include "constants.h"
#include "bytecodes.h"
#include "macros.h"
#include "oops_values.h"
#include "interp_const.h"
#include "interp_types.h"

static char *msg01 = "prim_%d:01--Primitive not implemented";
static char *msg02 = "prim_28:02--Object not found: %d";
static char *msg03 = "prim_%d:03--Object not class Integer: %d";
static char *msg04 = "prim_29:04--Object not found: %d";
static char *msg05 = "prim_29:05--Object not class Integer: %d";
static char *msg11 = "prim_30:11--No send_msg bcode for perform:with:";
static char *msg12 = "prim_28:12--Division by 0: %d";
static char *msg13 = "prim_29:13--Division by 0: %d";
static char *msg14 = "prim_%d:14--Object not found: %d";
static char *msg15 = "prim_%d:15--Object of invalid class for prim %d";
static char *msg16 = "prim_%d:16--Parm exceeds no named vars %d";

extern object *obj_mgr();
extern object *get_obj();
extern object *reserve_obj();

extern struct process *Cur_process;

/*
 * <primitive 26 self> -- Behavior instSize
 */

oop
prim_26()
{
        object *self;

        self = GET_RCVR(PRIMARG(0));

        if (self == NULL)
                syserr("prim_26: couldn't fetch self (oop = %d)", PRIMARG(0));

        return (INTEGER_OBJECT(self->fp.no_named_vars));
}

/*
 * <primitive 27 self index> -- Object instVarAt:
 */

oop
prim_27()
{
        object *obj_ptr;
        int where;
        register int in_oop;

        in_oop = PRIMARG(0);

        if (in_oop < 0)         /* an integer */
                syserr(msg15, 27, in_oop);

        obj_ptr = GET_RCVR(in_oop);

        if (obj_ptr == NULL)
                syserr(msg14, 27, in_oop);

        in_oop = PRIMARG(1);
        where = -in_oop - 1;

        if (in_oop >= 0)
                syserr(msg03, 27, in_oop);

        if (where >= obj_ptr->fp.no_named_vars)
                syserr(msg15, 27, in_oop);

        return (INSTANCE_VARS(obj_ptr)[where]);
}

/*
 * <primitive 28 self aNumber> -- Integer quo: (truncation toward 0)
 */

oop
prim_28()
{
        register object *obj;
        register int integer1;
        register int integer2;
        double float1;
        double float2;

        integer1 = PRIMARG(0);
        integer2 = PRIMARG(1);

        /*
        ** we optimize for positive integers, (represented as negative oops).
        */

        if (integer1 < 0)
        {
                if (integer2 < 0)
                        OP_INT(integer1, integer2, /);
                if (integer2 == zERO)
                        syserr(msg12, integer2);
                goto int2obj;
        }
        if (integer1 == zERO)
        {
                if (integer2 < 0)
                        return (zERO);
                if (integer2 == zERO)
                        syserr(msg12, integer2);
                integer1 = 0;
                goto int2obj;
        }

int2obj:
        obj = get_obj(integer1, CUR_REGION, CUR_PID);

        if (obj == NULL)
                syserr("prim_28: couldn't fetch self (oop = %d)", integer1);

        /*
        ** we assume the receiver is of class integer and skip the type
        ** check, (check was made by send message logic).
```

```
	*/

	integer1 = - *((int *) INDEXED_VARS(obj));

	if (integer2 < 0)
		OP_INT(integer1, integer2, /);
	if (integer2 == zERO)
		syserr(msgl2, integer2);

int2obj:
	obj = get_obj(integer2, CUR_REGION, CUR_PID);

	if (obj == NULL)
		syserr("prim_28: couldn't fetch parameter (oop = %d)",
		  integer2);

	if (obj->fp.class == Integer)
	{
		integer2 = - *((int *) INDEXED_VARS(obj));
		OP_INT(integer1, integer2, /);
	}
	if (obj->fp.class == Float)
	{
		/*
		** convert self to float, do the operation, and return a float.
		*/

		float1 = (double) -integer1;
		float2 = *((double *) INDEXED_VARS(obj));
		if (float2 == 0)
			syserr(msgl2, integer2);
		OP_FLOAT(float1, float2, /);
	}

	syserr("prim_28: parameter not a kind of Integer or Float (oop = %d)",
	  integer2);
}

/*
 * <primitive 29 self aNumber> -- Integer rem: (truncation toward 0)
 */

oop
prim_29()
{
	register object *obj;
	register int integer1;
	register int integer2;

	integer1 = PRIMARG(0);
	integer2 = PRIMARG(1);

	/*
	** we optimize for positive integers, (represented as negative oops).
	*/

	if (integer1 < 0)
	{
		if (integer2 < 0)
			OP_INT(integer1, integer2, %);
		if (integer2 == zERO)
			syserr(msgl3, integer2);
		goto int2obj;
	}
	if (integer1 == zERO)
	{
		if (integer2 < 0)
			return (zERO);
		if (integer2 == zERO)
			syserr(msgl3, integer2);
		integer1 = 0;
		goto int2obj;
	}

int1obj:
	obj = get_obj(integer1, CUR_REGION, CUR_PID);

	if (obj == NULL)
		syserr("prim_29: couldn't fetch self (oop = %d)", integer1);

	/*
	** we assume the receiver is of class integer and skip the type
	** check, (check was made by send message logic).
	*/

	integer1 = - *((int *) INDEXED_VARS(obj));

	if (integer2 < 0)
		OP_INT(integer1, integer2, %);
	if (integer2 == zERO)
		syserr(msgl3, integer2);

int2obj:
	obj = get_obj(integer2, CUR_REGION, CUR_PID);

	if (obj == NULL)
		syserr("prim_29: couldn't fetch parameter (oop = %d)",
		  integer2);

	if (obj->fp.class == Integer)
	{
		integer2 = - *((int *) INDEXED_VARS(obj));
		OP_INT(integer1, integer2, %);
	}
	if (obj->fp.class == Float)
	{
		/*
		 * truncate argument to an integer and perform the operation
		 */

		integer2 = - (int) *((double *) INDEXED_VARS(obj));
		OP_INT(integer1, integer2, %);
	}

	syserr("prim_29: parameter not a kind of Integer or Float (oop = %d)",
	  integer2);
}

/*
 * <primitive 30 self aSymbol> -- Object perform:
 */

oop
prim_30()
{
	struct execute_primitive *exec_prim_bcode;
	struct send_message *send_msg_bcode;
	int arg_start_slot;
```

```
int new_selector;

/*
 * Establish pointer to the execute primitive bytecode, and overlay
 * the appropriate data structure.  This bytecode is the one
 * currently beind executed.
 */

exec_prim_bcode = EP(BCP_MEM);

/*
 * Establish pointer to the send_message bytecode, and overlay the
 * appropriate data structure.  This bytecode is the one to be
 * executed next.
 */

send_msg_bcode = SM(((char *) exec_prim_bcode + EP_SIZE));

/*
 * If the bytecode to be executed next is not a send_message
 * bytecode, it's an error.
 */

if (send_msg_bcode->bytecode != SEND_MESSAGE)
        syserr(msg11);

/*
 * Establish the starting slot for the parameters of this primitive.
 * The first parameter is the receiver, the second is the selector,
 * and the next ones are the arguments for the message send.
 */

arg_start_slot = exec_prim_bcode->arg_start_slot;

/*
 * This is the guts of this primitive.  The send_message bytecode
 * which will be executed next is modified now (at runtime) to match
 * the 'perform:with' which is desired. Note that we assume
 * super_flag to be 0.  Note also that num_args, arg_start_slot, and
 * put_answ_slot were set when the compiler built the send_message
 * bytecode.
 */

new_selector = PRIMARG(1);

if (new_selector != send_msg_bcode->hashed_selector)
{
        /*
         * If selector changes from last time, we must NULL the
         * cache, since it no longer pertains
         */

        send_msg_bcode->hashed_selector = new_selector;
        send_msg_bcode->likely_class = -1;
        send_msg_bcode->likely_meth_or_islot = -1;
        send_msg_bcode->likely_prim_or_bcode = -1;
}

/*
 * the send msg processing demands that the reciever start the list
 * of parms.  The parms are already in the temps starting with
 * arg_start_slot +2.  We put the receiver of the message in
 * arg_start_slot +1, overwriting the selector, which has already
 * been copied to the send_msg bcode
 */

PRIMARG(1) = PRIMARG(0);

/*
 * We will return the nil object to exec_prim_bcode, and this value
 * will be stored in a temporary of the current context.  This value
 * will then be overwritten by the value returned by the send_msg
 * bytecode we just modified.  That is, the answer_slot for this
 * primitive, and the answer_slot for the send_message bytecode we
 * are about to execute, are the same.
 */

return (nIL);
```

```
/*Copyright 1988 Eastman Kodak Company.  All rights reserved.*/
#include <stdio.h>
#include <math.h>
#include <string.h>
#include <strings.h>
#include <ctype.h>
#include "types.h"
#include "constants.h"
#include "bytecodes.h"
#include "macros.h"
#include "oops_values.h"
#include "interp_const.h"
#include "interp_types.h"

static char *msg01 = "prim_%d:01--Primitive not implemented";
static char *msg02 = "prim_%d:02--Parameter not positive integer:%d";
static char *msg03 = "prim_%d:03--Object not found:%d";
static char *msg04 = "prim_33:04--Object not of class Integer:%d";
static char *msg05 = "prim_35:05--Object not positive Integer:%d";
static char *msg06 = "prim_34:06--Object not found:%d";
static char *msg07 = "prim_34:07--Object not of class Integer:%d";
static char *msg08 = "prim_36:08--Object not positive integer:%d";
static char *msg09 = "prim_37:09--Object not found:%d";
static char *msg10 = "prim_37:10--Object not of class Integer:%d";
static char *msg11 = "prim_36:11--Object integer >  255:%d";
static char *msg12 = "prim_38:12--Factorial parm not >= 0:%d";
static char *msg13 = "prim_38:13--Factorial parm too big:%d";
static char *msg14 = "prim_%d:14--Object not found:%d";
static char *msg15 = "prim_%d:15--Object not class Integer:%d";
static char *msg16 = "prim_%d:16--Object not class Character:%d";
static char *msg17 = "prim_%d:17--Object is of class Integer:%d";
static char *msg18 = "prim_48:18--Objects are not of the same class:%d %d";
static char *msg19 = "prim_%d:19--Parm exceeds no. of instance vars: %d";
static char *msg20 = "prim_%d:20--System object eRROR not found: %d";
static char *msg21 = "prim_%d:21--Invalid to copy a class : %d";
static char *msg22 = "prim_%d:22--Object is not of class String:%d";

static char buffer[MAX_OBJ_SIZE];

extern struct process   *Cur_process;

extern object           *force_obj();
extern object           *obj_mgr();
extern object           *get_obj();
extern object           *reserve_obj();
extern object *stringObject();
extern char *slot_to_name();
extern dict_xref        *getdictionary();
extern dict_xref        *putdictionary();
extern void             change_rcvr_ref();
extern oop              First_new_obj;

extern  unsigned short  UTSCollectionIndex;
extern  unsigned short  UTSPositionIndex;
extern  unsigned short  UTSReadLimitIndex;

extern  unsigned short  ByteArraySizeIndex;

/*
 * <primitive 31> -- Object myError:
 */

oop
prim_31()
{
        object *obj_ptr;
        int process_id;

        obj_ptr = get_obj(eRROR, CUR_REGION, CUR_PID);

        if (obj_ptr == NULL)
                syserr(msg20, 31, eRROR);

        /*
         * eRROR is an array of error messages, one per running process.
         */

        return (INDEXED_VARS(obj_ptr)[CUR_PID]);

}

/*
 * <primitive 32 > -- UNIXFileStream restOfLine
 *
 * <primitive 32 self collection position readLimit>
 *            0       1          2          3
 *
 *      Note that this primitive is for optimization.  There is Smalltalk code
 *      in this
 *      method which can do this work, but it takes a lot of Smalltalk to do
 *      it.  This primitive handles only the common, simple case; if we
 *      have to buffer another page, we let the Smalltalk code do it.
 *      Likewise, if we run into anything not normal, we let the Smalltalk code
 *      do it.
 */

oop
prim_32()
{
        object  *collection;
        int     position;
        int     readLimit;
        int     restOfLine;
        char    *cur_string;
        char    *new_line;
        object  *new_string;


        /*
        ** If can't get 'collection', let the Smalltalk code do it.
        */
        if ((collection = get_obj(INSTANCE_VARS(RCVR_MEM)[UTSCollectionIndex],
                                  CUR_REGION, CUR_PID)) == NULL)
        {
                return (nIL);
        }
        /* end if */

        /*
        ** If 'collection' not a String (or subclass), let the Smalltalk code
        ** do it.
        */
        if ( !( (collection->fp.class == String) ||
                (in_super_chain (collection->fp.class, String, CUR_REGION,
                                 CUR_PID) )))
```

```
        return (nIL);
    }
    /* end if */

    /*
    ** 'position' and 'readLimit' must be positive integers (negative oops).
    */
    position  = INTEGER_VALUE(INSTANCE_VARS( RCVR_MEM )[UTSPositionIndex]);
    readLimit = INTEGER_VALUE(INSTANCE_VARS( RCVR_MEM )[UTSReadLimitIndex]);

    if ( (position  < 0) || (readLimit  < 0) )
    {
        return (nIL);
    }
    /* endif */

    /*
    ** String we're interested in starts at 'position' in 'collection'.
    */
    cur_string = (char *) &BYTEARRAY_DATA(collection)[position];

    /*
    ** If there is no 'newline' character in the string we're looking at,
    ** then we can't handle.
    */

    if ( (new_line = strchr (cur_string, '\n')) == NULL )
    {
        return (nIL);
    }
    /* end if */

    restOfLine = new_line - cur_string;     /* Size of string of interest */

    if ( restOfLine > readLimit - position )
    {
        return (nIL);
    }
    /* end if */

    /*
    ** Create new String object, of correct size.
    */
    new_string = OM_NEW(String, SLOTS_FOR_BYTES(restOfLine+1));

    /*
     * Copy the portion of interest of the old string to the new object.
     * Don't forget to include the null to terminate the new string.
     */

    bcopy ( BYTEARRAY_DATA(collection) + position,
            BYTEARRAY_DATA(new_string), restOfLine );

    BYTEARRAY_DATA(new_string)[restOfLine] = '\0';
    INSTANCE_VARS(new_string)[ByteArraySizeIndex] =
      INTEGER_OBJECT(restOfLine);

    /*
    ** We also have to update the 'position' instance variable of the
    ** receiver (UNIXTextStream)
    */
    INSTANCE_VARS( RCVR_MEM )[UTSPositionIndex] =
                            INTEGER_OBJECT ( position + restOfLine + 1 );

        /*
        ** Per FredM.
        */
        check_garbage(new_string->fp.id);

        return (new_string->fp.id);
}

/*
 * <primitive 33 self> -- Integer bitInvert
 */

oop
prim_33()
{
        object *obj;
        int integer;

        integer = INTEGER_VALUE(PRIMARG(0));

        if (integer < 0)
                OP_INT(-integer, -1, ^);

        if (integer == ZERO)
                OP_INT(0, -1, ^);

        obj = GET_RCVR(integer);

        if (obj == NULL)
                syserr(msg03, 33,  PRIMARG(0));

        integer = *((int *) INDEXED_VARS(obj));

        OP_INT(integer, -1, ^);
}

/*
 * <primitive 34> -- object inSuperChain: aClass
 */

oop
prim_34()
{
        object *obj;
        oop aClass, myClass;

        if (PRIMARG(0) < 0)
                myClass = Integer;
        else
        {
                obj = get_obj(PRIMARG(0), CUR_REGION, CUR_PID);
                if (obj == NULL)
                        syserr(msg03, 34,  PRIMARG(0));
                myClass = obj ->fp.class;
        }

        if (in_super_chain(myClass, PRIMARG(1), CUR REGION, CUR PID))
                return(tRUE);
        return(fALSE);
}

/*
```

```
 * <primitive 35> -- obj instVarName:anIndex
 * given an object and the slot index (grounded at 1), return the name of
 * the instance variable at the slot.
 */

oop
prim_35()
{
        object *obj;
        char *varname;
        oop myClass;
        int slot;

        if (PRIMARG(0) < 0)
                myClass = Integer;
        else
        {
                obj = get_obj(PRIMARG(0), CUR_REGION, CUR_PID);
                if (obj == NULL)
                        syserr(msg03, 35,  PRIMARG(0));
                myClass = obj ->fp.class;
        }
        if (PRIMARG(1) >= 0)
                syserr(msg05, 35,  PRIMARG(1));
        slot = -PRIMARG(1) - 1;

        varname = slot_to_name(myClass, slot);
        if (varname == NULL)
                varname = "name not found";

        return ((stringObject(varname))->fp.id);
}

/*
 * <primitive 36 anInteger> -- Character value:
 */

oop
prim_36()
{
        register int integer;

        integer = INTEGER_VALUE(PRIMARG(0));

        if (integer < 0 || integer > 255)
                syserr(msg16, 36, PRIMARG(0));

        return (integer);
}

/*
 * <primitive 37 self> -- Integer asString
 */

oop
prim_37()
{
        object *self;
        object *aString;
        int value;
        int size;
        int no_index_vars;
        char buf[64];

        value = INTEGER_VALUE(PRIMARG(0));

        if (value < 0)
        {
                self = GET_RCVR(PRIMARG(0));

                if (self == NULL)
                        syserr("prim_37: couldn't fetch self (oop = %d)",
                          PRIMARG(0));

                if (!(self->fp.class == Integer ||
                  in_super_chain(self->fp.class, Integer, CUR_REGION, CUR_PID)))
                        syserr("prim_37: self is not a kind of Integer (oop = %d)", self-

                value = *((int *) INDEXED_VARS(self));
        }

        sprintf(buf, "%d", value);

        aString = stringObject(buf);

        check_garbage(aString->fp.id);

        return (aString->fp.id);
}

/*
 * <primitive 38 self> -- Integer factorial
 */

extern double gamma();
extern double exp();

oop
prim_38()
{
        object *obj_ptr;
        register int temp;
        register int ans;
        double lngamma;

        if (PRIMARG(0) < 0)
                temp = -PRIMARG(0);
        else
                syserr(msg12, PRIMARG(0));

        if (temp <= 12)
        {
                ans = 1;
                for (temp = temp; temp > 0; temp--)
                        ans = ans * temp;
                return (-ans);
        }

        lngamma = gamma((double) (temp + 1));

        if (lngamma > 87.0)
                syserr(msg13, PRIMARG(0));

        obj_ptr = OM_NEW(Float, sizeof(double) / sizeof(oop));
        *((double *) INDEXED_VARS(obj_ptr)) = exp(lngamma);
        check_garbage(obj_ptr -> fp.id);
        return (obj_ptr->fp.id);
}
```

```
/*
 * <primitive 39 self> -- Integer asFloat
 */

oop
prim_39()
{
        object *obj_ptr;
        int integer;

        integer = INTEGER_VALUE(PRIMARG(0));

        if (integer < 0)
        {
                obj_ptr = GET_RCVR(PRIMARG(0));

                if (obj_ptr == NULL)
                        syserr(msg14, 39, PRIMARG(0));

                integer = *((int *) INDEXED_VARS(obj_ptr));
        }

        obj_ptr = OM_NEW(Float, sizeof(double) / sizeof(oop));
        *((double *) INDEXED_VARS(obj_ptr)) = (double) integer;
        check_garbage(obj_ptr -> fp.id);
        return (obj_ptr->fp.id);
}

/*
 * <primitive 40 self> -- Object shallowCopy
 */

oop
prim_40()
{
        object *obj, *copy;
        long copy_id;
        unsigned short copy_flags;
        oop in_oop;

        in_oop = PRIMARG(0);

        if (in_oop < 256)        /* positive integers and characters */
                return (in_oop);

        obj = GET_RCVR(in_oop);

        if (obj == NULL)
                syserr(msg14, 40, in_oop);

        if (obj->fp.id == obj->fp.class)
                return (prim_err(Cur_process, msg14, 21, in_oop));

        copy = OM_NEW(obj->fp.class, obj->fp.no_indx_vars);
        copy_id = copy->fp.id;
        copy_flags = copy->fp.flags;

        bcopy((char *) obj, (char *) copy, obj->fp.length);

        copy->fp.id = copy_id;
        copy->fp.flags = copy_flags | UPDATED;
        copy->fp.ovfl_chain = NULL;

        check_garbage(copy -> fp.id);
        return (copy->fp.id);
}

/*
 * <primitive 41 aKey anObject> -- SystemDictionary at:put:
 */

oop
prim_41()
{
        object *aKey;
        dict_xref *dict_ptr;
        oop new_oop;
        oop old_oop;

        aKey = GET_RCVR(PRIMARG(0));

        if (aKey == NULL)
                syserr(msg14, 41, PRIMARG(0));

        if (!(aKey->fp.class != String || in_super_chain(aKey->fp.class,
               String, CUR_REGION, CUR_PID)))
                syserr(msg22, 41, PRIMARG(0));

        new_oop = PRIMARG(1);

        dict_ptr = getdictionary(BYTEARRAY_DATA(aKey), CUR_REGION, CUR_PID);

        old_oop = (dict_ptr == NULL) ? nIL : dict_ptr->fp.object_oop;

        putdictionary(BYTEARRAY_DATA(aKey), new_oop, CUR_REGION, CUR_PID);

        /*
         * If the object to be placed in the dictionary is a new object,
         * it should be considered referenced so the object manager can
         * check to see if it should be written to the database.
         *
         * the object previously at this position in the dictionary may be
         * need to be 'counted down' if we implement fancier garbage
         * collection.
         */

        if ((new_oop >= First_new_obj) || (old_oop >= First_new_obj))
                referenced(NULL, new_oop, old_oop, CUR_REGION, CUR_PID);

        /*
         * NULL passed as first arg to force object to be non-garbage
         */

        return (new_oop);
}

/*
 * <primitive 42 self aChar> -- Character <
 */

oop
prim_42()
{
        register object *obj;
        register int self;
        register int aChar;
```

```
        self = PRIMARG(0);

        if (self < 0 || self > 255)
                syserr(msg16, 42, self);

        aChar = PRIMARG(1);

        if (aChar < 0 || aChar > 255)
                syserr(msg16, 42, aChar);

        CMP(self, aChar, <);
}

/*
 * <primitive 43 self aChar> -- Character >
 */

oop
prim_43()
{
        register object *obj;
        register int self;
        register int aChar;

        self = PRIMARG(0);

        if (self < 0 || self > 255)
                syserr(msg16, 43, self);

        aChar = PRIMARG(1);

        if (aChar < 0 || aChar > 255)
                syserr(msg16, 43, aChar);

        CMP(self, aChar, >);
}

/*
 * <primitive 44 self aChar> -- Character <=
 */

oop
prim_44()
{
        register object *obj;
        register int self;
        register int aChar;

        self = PRIMARG(0);

        if (self < 0 || self > 255)
                syserr(msg16, 44, self);

        aChar = PRIMARG(1);

        if (aChar < 0 || aChar > 255)
                syserr(msg16, 44, aChar);

        CMP(self, aChar, <=);
}

/*
 * <primitive 45 self aChar> -- Character >=
 */

oop
prim_45()
{
        register object *obj;
        register int self;
        register int aChar;

        self = PRIMARG(0);

        if (self < 0 || self > 255)
                syserr(msg16, 45, self);

        aChar = PRIMARG(1);

        if (aChar < 0 || aChar > 255)
                syserr(msg16, 45, aChar);

        CMP(self, aChar, >=);
}

/*
 * <primitive 46 self aChar> -- Character =
 */

oop
prim_46()
{
        register object *obj;
        register int self;
        register int aChar;

        self = PRIMARG(0);

        if (self < 0 || self > 255)
                syserr(msg16, 46, self);

        aChar = PRIMARG(1);

        if (aChar < 0 || aChar > 255)
                syserr(msg16, 46, aChar);

        CMP(self, aChar, ==);
}

/*
 * <primitive 47 self aChar> -- Character ~=
 */

oop
prim_47()
{
        register object *obj;
        register int self;
        register int aChar;

        self = PRIMARG(0);

        if (self < 0 || self > 255)
                syserr(msg16, 47, self);

        aChar = PRIMARG(1);

        if (aChar < 0 || aChar > 255)
```

```
        CMP(self, aChar, !=);
}

/*
 * <primitive 48 self otherObject> -- Object become:
 */

object *
become(obj_ptr1, obj_ptr2, copyIndexVars)
        register object *obj_ptr1;
        register object *obj_ptr2;
        register int copyIndexVars;
{
        register object *copy;
        register object *ret;
        register int copyLength1;
        register int copyLength2;
        register int no_vars;
        register int i;

        /*
         * swap pointers:  essentially change the id of an object. We do
         * not support this unless objects are of same class, since we
         * do not want to fix the instance chain.
         */

        if (obj_ptr1->fp.class != obj_ptr2->fp.class)
                syserr("become: objects are not of same class (obj1=%d cls1=%d, obj2=%d c
                  obj_ptr1->fp.id, obj_ptr1->fp.class,
                  obj_ptr2->fp.id, obj_ptr2->fp.class);

        /*
         * determine extent of each object to be copied into respective
         * new object buffers.  copyBits() invokes us with copyIndexVars
         * = 0 under certain conditions which do not require the indexable
         * variables to be retained.
         */

        if (copyIndexVars == 0)
        {
                copyLength1 = sizeof(obj_ptr1->fp)
                  + (obj_ptr1->fp.no_named_vars - 1) * sizeof(oop);
                copyLength2 = sizeof(obj_ptr2->fp)
                  + (obj_ptr2->fp.no_named_vars - 1) * sizeof(oop);
        }
        else
        {
                copyLength1 = obj_ptr1->fp.length;
                copyLength2 = obj_ptr2->fp.length;
        }

        /*
         * put 1's head on 2's body
         */

        /*space pointed to by obj_ptr1 is not guaranteed to contain old
          obj1 after the call to OM_FORCE, so we save a copy. */

        bcopy((char *) obj_ptr1, (char *) buffer, copyLength1);
        obj_ptr1 = (object *) buffer;

        /*get new space and object manager table entry for a new
          (maybe longer) version of obj1*/

        copy = ret = OM_FORCE(obj_ptr1->fp.id, obj_ptr1->fp.class,
                        obj_ptr2->fp.length / sizeof(oop));

        /*copy obj2 onto space with id of obj1*/
        bcopy((char *) obj_ptr2, (char *) copy, copyLength2);

        /*restore obj1 id data*/
        copy->fp.id = obj_ptr1->fp.id;
        copy->fp.ovfl_chain = obj_ptr1->fp.ovfl_chain;
        copy->fp.size_ovfl_rec = obj_ptr1->fp.size_ovfl_rec;
        copy->fp.class_chain = obj_ptr1->fp.class_chain;
        copy->fp.flags = obj_ptr1->fp.flags | UPDATED;  /* flags go with id */

        /*
         * adjust obj ptr for anybody who is using obj1 object as receiver
         */

        change_rcvr_ref(copy->fp.id, copy);

        /*
         * parent (copy.fp.id) has a new set of children.  We need to let
         * garbage collector move children to parent's region, if required.
         */

        if (copy->fp.flags & NO_INDEX_VARS || copyIndexVars == 0)
                no_vars = copy->fp.no_named_vars;
        else
                no_vars = copy->fp.no_named_vars + copy->fp.no_indx_vars;

        for (i = 0; i < no_vars; i++)
                referenced(copy, copy->value[i], nIL, CUR_REGION, CUR_PID);

        /*
         * put 2's head on 1's body
         */

        copy = OM_FORCE(obj_ptr2->fp.id,  obj_ptr2 -> fp.class,
                        obj_ptr1->fp.length / sizeof(oop));
        bcopy((char *) obj_ptr1, (char *) copy, copyLength1);
        copy->fp.id = obj_ptr2->fp.id;
        copy->fp.ovfl_chain = obj_ptr2->fp.ovfl_chain;
        copy->fp.size_ovfl_rec = obj_ptr2->fp.size_ovfl_rec;
        copy->fp.class_chain = obj_ptr2->fp.class_chain;
        copy->fp.flags = obj_ptr2->fp.flags | UPDATED;  /* flags go with id */

        /*
         * adjust anybody who is using former object as receiver
         */

        change_rcvr_ref(copy->fp.id, copy);

        /*
         * parent (copy.fp.id) has a new set of children.  We need to let
         * garbage collector move children to parent's region, if required.
         */

        if (copy->fp.flags & NO_INDEX_VARS || copyIndexVars == 0)
                no_vars = copy->fp.no_named_vars;
        else
                no_vars = copy->fp.no_named_vars + copy->fp.no_indx_vars;

        for (i = 0; i < no_vars; i++)
```

```
		referencec(copy, copy->value[1], nIL, CUR_REGION, CUR_PID);

	return (ret);
}

oop
prim_48()
{
	register object *obj_ptr1;
	register object *obj_ptr2;
	register int in_oop;

	in_oop = PRIMARG(0);

	if (in_oop < 0)
		syserr(msg17, 48, in_oop);

	obj_ptr1 = GET_RCVR(in_oop);

	if (obj_ptr1 == NULL)
		syserr(msg14, 48, in_oop);

	in_oop = PRIMARG(1);

	if (in_oop < 0)
		syserr(msg17, 48, in_oop);

	obj_ptr2 = reserve_obj(in_oop, CUR_REGION, CUR_PID);

	if (obj_ptr2 == NULL)
		syserr(msg14, 48, in_oop);

	obj_ptr1 = become(obj_ptr1, obj_ptr2, 1);

	return(obj_ptr1->fp.id);
}

/*
 * <primitive 49 self anInteger anObject> -- Object instVarAt:put:
 */

oop
prim_49()
{
	object *obj_ptr;
	int where;
	oop old_oop;
	oop new_oop;
	register int in_oop;

	in_oop = PRIMARG(0);

	if (in_oop < 0)		/* an integer */
		syserr(msg17, 49, in_oop);

	obj_ptr = GET_RCVR(in_oop);

	if (obj_ptr == NULL)
		syserr(msg14, 49, in_oop);

	in_oop = PRIMARG(1);
	if (in_oop < 0)
		where = -in_oop - 1;
	else
		syserr(msg02, 49, in_oop);

	if (where >= obj_ptr->fp.no_named_vars)
		syserr(msg19, 49, in_oop);

	old_oop = INSTANCE_VARS(obj_ptr)[where];
	new_oop = PRIMARG(2);
	INSTANCE_VARS(obj_ptr)[where] = new_oop;

	UPDATE(obj_ptr);

	/* do garbage collection */
	referenced(obj_ptr, new_oop, old_oop, CUR_REGION, CUR_PID);

	return (new_oop);
}

/*
 * <primitive 50 self> -- Character digitValue
 */

oop
prim_50()
{
	oop new_oop;
	int self;

	self = PRIMARG(0);

	if (self < 0 || self > 255)
		syserr(msg16, 47, self);

	if (isdigit(self))
		return (INTEGER_OBJECT(self - '0'));

	if (isupper(self))
		return (INTEGER_OBJECT(self - 'A' + 10));

	new_oop = IntegerObject(-1);
	check_garbage(new_oop);
	return(new_oop);
}
```

```c
/*Copyright 1988 Eastman Kodak Company.  All rights reserved.*/
#include <stdio.h>
#include <math.h>
#include <errno.h>
#include <strings.h>
#include <ctype.h>
#include "types.h"
#include "constants.h"
#include "bytecodes.h"
#include "macros.h"
#include "oops_values.h"
#include "interp_const.h"
#include "interp_types.h"

int errno;

static char *msg01 = "prim_%d:01--Primitive not implemented";
static char *msg02 = "prim_%d:02--Parm is not type Character: %d";
static char *msg11 = "prim_%d:11--Parm/rcvr is not type Float: %d";
static char *msg12 = "prim_%d:12--Division by 0: %d";
static char *msg26 = "prim_%d:26--Object not found: %d";
static char *msg30 = "prim_%d:30--Float math error. errno: %d";

extern object *obj_mgr();
extern object *get_obj();
extern object *reserve_obj();

extern struct process *Cur_process;

/*
 * <primitive 51 self> -- Character isVowel
 */

oop
prim_51()
{
        int temp;

        temp = PRIMARG(0);

        if (temp < 0 || temp > 255)
                syserr(msg02, 51, PRIMARG(0));

        if (isupper(temp))
                temp = tolower(temp);

        switch (temp)
        {
        case 'a': case 'e': case 'i': case 'o': case 'u':
                return (tRUE);
        }

        return (fALSE);
}

/*
 * <primitive 52 self> -- Character asLowerCase
 */

oop
prim_52()
{
        int temp;

        temp = PRIMARG(0);

        if (temp < 0 || temp > 255)
                syserr(msg02, 52, PRIMARG(0));

        if (isupper(temp))
                return (tolower(temp));

        return (temp);
}

/*
 * <primitive 53 self> -- Character isLowerCase
 */

oop
prim_53()
{
        int temp;

        temp = PRIMARG(0);

        if (temp < 0 || temp > 255)
                syserr(msg02, 53, PRIMARG(0));

        if (islower(temp))
                return (tRUE);

        return (fALSE);
}

/*
 * <primitive 54 self> -- Character isUpperCase
 */

oop
prim_54()
{
        int temp;

        temp = PRIMARG(0);

        if (temp < 0 || temp > 255)
                syserr(msg02, 54, PRIMARG(0));

        if (isupper(temp))
                return (tRUE);

        return (fALSE);
}

/*
 * <primitive 55 self> -- Character isSeparator
 */

oop
prim_55()
{
        int temp;

        temp = PRIMARG(0);

        if (temp < 0 || temp > 255)
```

```
		sysErr(msg02, 55, PRIMARG(0));

	if (isspace(temp))
		return (tRUE);

	return (fALSE);
}

/*
 * <primitive 56 self> -- Character isAlphaNumeric
 */

oop
prim_56()
{
	int temp;

	temp = PRIMARG(0);

	if (temp < 0 || temp > 255)
		syserr(msg02, 56, PRIMARG(0));

	if (isalnum(temp))
		return (tRUE);

	return (fALSE);
}

/*
 * <primitive 57 self> -- Character asUpperCase
 */

oop
prim_57()
{
	int temp;

	temp = PRIMARG(0);

	if (temp < 0 || temp > 255)
		syserr(msg02, 57, PRIMARG(0));

	if (islower(temp))
		return (toupper(temp));

	return (temp);
}

/*
 * <primitive 58> -- oopId
 */

oop
prim_58()
{
	/*Return the oop of the parameter, converted
	to an instance of class Integer.  Helpful in debugging*/

	oop new_oop;

	new_oop = PRIMARG(0);

	if (new_oop > 0)
		return (-new_oop);
	if (new_oop == 0)
		return (zERO);
	new_oop = IntegerObject(new_oop);
	check_garbage(new_oop);
	return(new_oop);
}

/*
 * <primitive 59> -- not implemented
 */

oop
prim_59()
{
	syserr(msg01, 59);
}

/*
 * <primitive 60 self aNumber> -- Float +
 */

oop
prim_60()
{
	register object *obj;
	register int aNumber;
	double float1;
	double float2;

	obj = GET_RCVR(PRIMARG(0));

	if (obj == NULL)
		syserr(msg26, 60, PRIMARG(0));

	/*
	 * we assume the reciever is of class Float and skip the type
	 * check, (check was made by send message logic).
	 */

	float1 = *((double *) INDEXED_VARS(obj));

	aNumber = PRIMARG(1);

	if (aNumber < 0)
	{
		float2 = (double) -aNumber;
		OP_FLOAT(float1, float2, +);
	}

	if (aNumber == zERO)
	{
		float2 = (double) 0;
		OP_FLOAT(float1, float2, +);
	}

	obj = get_obj(aNumber, CUR_REGION, CUR_PID);

	if (obj == NULL)
		syserr(msg26, 60, aNumber);

	if (obj->fp.class == Float)
	{
		float2 = *((double *) INDEXED_VARS(obj));
```

```
        }

        if (obj->fp.class == Integer)
        {
                float2 = (double) *((int *) INDEXED_VARS(obj));
                OP_FLOAT(float1, float2, +);
        }

        syserr("prim_60: aNumber not a kind of Float or Integer (oop = %d)",
          aNumber);
}

/*
 * <primitive 61 self aNumber> -- Float -
 */

oop
prim_61()
{
        register object *obj;
        register int aNumber;
        double float1;
        double float2;

        obj = GET_RCVR(PRIMARG(0));

        if (obj == NULL)
                syserr(msg26, 61, PRIMARG(0));

        /*
         * we assume the reciever is of class Float and skip the type
         * check, (check was made by send message logic).
         */

        float1 = *((double *) INDEXED_VARS(obj));

        aNumber = PRIMARG(1);

        if (aNumber < 0)
        {
                float2 = (double) -aNumber;
                OP_FLOAT(float1, float2, -);
        }

        if (aNumber == zERO)
        {
                float2 = (double) 0;
                OP_FLOAT(float1, float2, -);
        }

        obj = get_obj(aNumber, CUR_REGION, CUR_PID);

        if (obj == NULL)
                syserr(msg26, 61, aNumber);

        if (obj->fp.class == Float)
        {
                float2 = *((double *) INDEXED VARS(obj));
                OP_FLOAT(float1, float2, -);
        }

        if (obj->fp.class == Integer)
        {
                float2 = (double) *((int *) INDEXED_VARS(obj));
                OP_FLOAT(float1, float2, -);
        }

        syserr("prim_61: aNumber not a kind of Float or Integer (oop = %d)",
          aNumber);
}

/*
 * <primitive 62 self aNumber> -- Float <
 */

oop
prim_62()
{
        register object *obj;
        register int aNumber;
        double float1;
        double float2;

        obj = GET_RCVR(PRIMARG(0));

        if (obj == NULL)
                syserr(msg26, 62, PRIMARG(0));

        /*
         * we assume the reciever is of class Float and skip the type
         * check, (check was made by send message logic).
         */

        float1 = *((double *) INDEXED_VARS(obj));

        aNumber = PRIMARG(1);

        if (aNumber < 0)
        {
                float2 = (double) -aNumber;
                CMP(float1, float2, <);
        }

        if (aNumber == zERO)
        {
                float2 = (double) 0;
                CMP(float1, float2, <);
        }

        obj = get_obj(aNumber, CUR_REGION, CUR_PID);

        if (obj == NULL)
                syserr(msg26, 62, aNumber);

        if (obj->fp.class == Float)
        {
                float2 = *((double *) INDEXED_VARS(obj));
                CMP(float1, float2, <);
        }

        if (obj->fp.class == Integer)
        {
                float2 = (double) *((int *) INDEXED_VARS(obj));
                CMP(float1, float2, <);
        }

        syserr("prim 62: aNumber not a kind of Float or Integer (oop = %d)",
```

```
}

/*
 * <primitive 63 self aNumber> -- Float >
 */

oop
prim_63()
{
        register object *obj;
        register int aNumber;
        double float1;
        double float2;

        obj = GET_RCVR(PRIMARG(0));

        if (obj == NULL)
                syserr(msg26, 63, PRIMARG(0));

        /*
         * we assume the reciever is of class Float and skip the type
         * check, (check was made by send message logic).
         */

        float1 = *((double *) INDEXED_VARS(obj));

        aNumber = PRIMARG(1);

        if (aNumber < 0)
        {
                float2 = (double) -aNumber;
                CMP(float1, float2, >);
        }

        if (aNumber == zERO)
        {
                float2 = (double) 0;
                CMP(float1, float2, >);
        }

        obj = get_obj(aNumber, CUR_REGION, CUR_PID);

        if (obj == NULL)
                syserr(msg26, 63, aNumber);

        if (obj->fp.class == Float)
        {
                float2 = *((double *) INDEXED_VARS(obj));
                CMP(float1, float2, >);
        }

        if (obj->fp.class == Integer)
        {
                float2 = (double) *((int *) INDEXED_VARS(obj));
                CMP(float1, float2, >);
        }

        syserr("prim_63: aNumber not a kind of Float or Integer (oop = %d)",
          aNumber);
}

/*
 * <primitive 64 self aNumber> -- Float <=
 */

oop
prim_64()
{
        register object *obj;
        register int aNumber;
        double float1;
        double float2;

        obj = GET_RCVR(PRIMARG(0));

        if (obj == NULL)
                syserr(msg26, 64, PRIMARG(0));

        /*
         * we assume the reciever is of class Float and skip the type
         * check, (check was made by send message logic).
         */

        float1 = *((double *) INDEXED_VARS(obj));

        aNumber = PRIMARG(1);

        if (aNumber < 0)
        {
                float2 = (double) -aNumber;
                CMP(float1, float2, <=);
        }

        if (aNumber == zERO)
        {
                float2 = (double) 0;
                CMP(float1, float2, <=);
        }

        obj = get_obj(aNumber, CUR_REGION, CUR_PID);

        if (obj == NULL)
                syserr(msg26, 64, aNumber);

        if (obj->fp.class == Float)
        {
                float2 = *((double *) INDEXED_VARS(obj));
                CMP(float1, float2, <=);
        }

        if (obj->fp.class == Integer)
        {
                float2 = (double) *((int *) INDEXED_VARS(obj));
                CMP(float1, float2, <=);
        }

        syserr("prim_64: aNumber not a kind of Float or Integer (oop = %d)",
          aNumber);
}

/*
 * <primitive 65 self aNumber> -- Float >=
 */

oop
prim_65()
{
```

```
register int aNumber;
        double float1;
        double float2;

        obj = GET_RCVR(PRIMARG(0));

        if (obj == NULL)
                syserr(msg26, 65, PRIMARG(0));

        /*
         * we assume the reciever is of class Float and skip the type
         * check, (check was made by send message logic).
         */

        float1 = *((double *) INDEXED_VARS(obj));

        aNumber = PRIMARG(1);

        if (aNumber < 0)
        {
                float2 = (double) -aNumber;
                CMP(float1, float2, >=);
        }

        if (aNumber == zERO)
        {
                float2 = (double) 0;
                CMP(float1, float2, >=);
        }

        obj = get_obj(aNumber, CUR_REGION, CUR_PID);

        if (obj == NULL)
                syserr(msg26, 65, aNumber);

        if (obj->fp.class == Float)
        {
                float2 = *((double *) INDEXED_VARS(obj));
                CMP(float1, float2, >=);
        }

        if (obj->fp.class == Integer)
        {
                float2 = (double) *((int *) INDEXED_VARS(obj));
                CMP(float1, float2, >=);
        }

        syserr("prim_65: aNumber not a kind of Float or Integer (oop = %d)",
          aNumber);
}

/*
 * <primitive 66 self aNumber> -- Float -
 */

oop
prim_66()
{
        register object *obj;
        register int aNumber;
        double float1;
        double float2;

        obj = GET_RCVR(PRIMARG(0));

        if (obj == NULL)
                syserr(msg26, 66, PRIMARG(0));

        /*
         * we assume the reciever is of class Float and skip the type
         * check, (check was made by send message logic).
         */

        float1 = *((double *) INDEXED_VARS(obj));

        aNumber = PRIMARG(1);

        if (aNumber < 0)
        {
                float2 = (double) -aNumber;
                CMP(float1, float2, ==);
        }

        if (aNumber == zERO)
        {
                float2 = (double) 0;
                CMP(float1, float2, ==);
        }

        obj = get_obj(aNumber, CUR_REGION, CUR_PID);

        if (obj == NULL)
                syserr(msg26, 66, aNumber);

        if (obj->fp.class == Float)
        {
                float2 = *((double *) INDEXED_VARS(obj));
                CMP(float1, float2, ==);
        }

        if (obj->fp.class == Integer)
        {
                float2 = (double) *((int *) INDEXED_VARS(obj));
                CMP(float1, float2, ==);
        }

        return(FALSE);
}

/*
 * <primitive 67 self aNumber> -- Float --
 */

oop
prim_67()
{
        register object *obj;
        register int aNumber;
        double float1;
        double float2;

        obj = GET_RCVR(PRIMARG(0));

        if (obj == NULL)
                syserr(msg26, 67, PRIMARG(0));

        /*
```

```
 * we assume the reciever is of class Float and skip the type
 * check, (check was made by send message logic).
 */

float1 = *((double *) INDEXED_VARS(obj));

aNumber = PRIMARG(1);

if (aNumber < 0)
{
        float2 = (double) -aNumber;
        CMP(float1, float2, !=);
}

if (aNumber == zERO)
{
        float2 = (double) 0;
        CMP(float1, float2, !=);
}

obj = get_obj(aNumber, CUR_REGION, CUR_PID);

if (obj == NULL)
        syserr(msg26, 67, aNumber);

if (obj->fp.class == Float)
{
        float2 = *((double *) INDEXED_VARS(obj));
        CMP(float1, float2, !=);
}

if (obj->fp.class == Integer)
{
        float2 = (double) *((int *) INDEXED_VARS(obj));
        CMP(float1, float2, !=);
}

syserr("prim_67: aNumber not a kind of Float or Integer (oop = %d)",
  aNumber);
}

/*
 * <primitive 68 self aNumber> -- Float *
 */

oop
prim_68()
{
        register object *obj;
        register int aNumber;
        double float1;
        double float2;

        obj = GET_RCVR(PRIMARG(0));

        if (obj == NULL)
                syserr(msg26, 68, PRIMARG(0));

        /*
         * we assume the reciever is of class Float and skip the type
         * check, (check was made by send message logic).
         */

        float1 = *((double *) INDEXED_VARS(obj));

        aNumber = PRIMARG(1);

        if (aNumber < 0)
        {
                float2 = (double) -aNumber;
                OP_FLOAT(float1, float2, *);
        }

        if (aNumber == zERO)
        {
                float2 = (double) 0;
                OP_FLOAT(float1, float2, *);
        }

        obj = get_obj(aNumber, CUR_REGION, CUR_PID);

        if (obj == NULL)
                syserr(msg26, 68, aNumber);

        if (obj->fp.class == Float)
        {
                float2 = *((double *) INDEXED_VARS(obj));
                OP_FLOAT(float1, float2, *);
        }

        if (obj->fp.class == Integer)
        {
                float2 = (double) *((int *) INDEXED_VARS(obj));
                OP_FLOAT(float1, float2, *);
        }

        syserr("prim_68: aNumber not a kind of Float or Integer (oop = %d)",
          aNumber);
}

/*
 * <primitive 69 self aNumber> -- Float /
 */

oop
prim_69()
{
        register object *obj;
        register int aNumber;
        double float1;
        double float2;

        obj = GET_RCVR(PRIMARG(0));

        if (obj == NULL)
                syserr(msg26, 69, PRIMARG(0));

        /*
         * we assume the reciever is of class Float and skip the type
         * check, (check was made by send message logic).
         */

        float1 = *((double *) INDEXED_VARS(obj));

        aNumber = PRIMARG(1);

        if (aNumber < 0)
        {
```

```
        OP_FLOAT(float1, float2, /);
    }

    if (aNumber == zERO)
    {
        float2 = (double) 0;
        OP_FLOAT(float1, float2, /);
    }

    obj = get_obj(aNumber, CUR_REGION, CUR_PID);

    if (obj == NULL)
        syserr(msg26, 69, aNumber);

    if (obj->fp.class == Float)
    {
        float2 = *((double *) INDEXED_VARS(obj));
        OP_FLOAT(float1, float2, /);
    }

    if (obj->fp.class == Integer)
    {
        float2 = (double) *((int *) INDEXED_VARS(obj));
        OP_FLOAT(float1, float2, /);
    }

    syserr("prim_69: aNumber not a kind of Float or Integer (oop = %d)",
      aNumber);
}

/*
 * <primitive 70 self> -- Float ln
 */

extern double log();

oop
prim_70()
{
    object *obj_ptr;
    object *new_ptr;
    double first;
    int in_oop;

    in_oop = PRIMARG(0);

    if (in_oop < 0)
        syserr(msg11, 70, PRIMARG(0));

    obj_ptr = GET_RCVR(in_oop);

    if (obj_ptr == NULL)
        syserr(msg26, 70, PRIMARG(0));

    if (obj_ptr->fp.class != Float)
        syserr(msg11, 70, PRIMARG(0));

    first = *((double *) INDEXED_VARS(obj_ptr));

    first = log(first);

    if (errno == ERANGE || errno == EDOM)
        syserr(msg30, 70, errno);

    new_ptr = OM_NEW(Float, sizeof(double) / sizeof(oop));

    *((double *) INDEXED_VARS(new_ptr)) = first;

    check_garbage(new_ptr->fp.id);
    return (new_ptr->fp.id);
}

/*
 * <primitive 71 self> -- Float sqrt
 */

extern double sqrt();

oop
prim_71()
{
    object *obj_ptr;
    object *new_ptr;
    double first;
    int in_oop;

    in_oop = PRIMARG(0);

    if (in_oop < 0)
        syserr(msg11, 71, PRIMARG(0));

    obj_ptr = GET_RCVR(in_oop);

    if (obj_ptr == NULL)
        syserr(msg26, 71, PRIMARG(0));

    if (obj_ptr->fp.class != Float)
        syserr(msg11, 71, PRIMARG(0));

    first = *((double *) INDEXED_VARS(obj_ptr));

    first = sqrt(first);

    if (errno == ERANGE || errno == EDOM)
        syserr(msg30, 71, errno);

    new_ptr = OM_NEW(Float, sizeof(double) / sizeof(oop));

    *((double *) INDEXED_VARS(new_ptr)) = first;

    check_garbage(new_ptr->fp.id);
    return (new_ptr->fp.id);
}

/*
 * <primitive 72 self> -- Float floor
 */

extern double floor();

oop
prim_72()
{
    object *obj_ptr;
    double first;
    int new_oop, in_oop;
```

```
        if (in_oop < 0)
                syserr(msg11, 72, PRIMARG(0));

        obj_ptr = GET_RCVR(in_oop);

        if (obj_ptr == NULL)
                syserr(msg26, 72, PRIMARG(0));

        if (obj_ptr->fp.class != Float)
                syserr(msg11, 72, PRIMARG(0));

        first = *((double *) INDEXED_VARS(obj_ptr));

        first = floor(first);

        new_oop = integerObject((int) first);
        check_garbage(new_oop);
        return(new_oop);
}

/*
 * <primitive 73 self> -- Float ceil
 */

extern double ceil();

oop
prim_73()
{
        object *obj_ptr;
        object *new_ptr;
        double first;
        int in_oop, new_oop;

        in_oop = PRIMARG(0);

        if (in_oop < 0)
                syserr(msg11, 79, PRIMARG(0));

        obj_ptr = GET_RCVR(in_oop);

        if (obj_ptr == NULL)
                syserr(msg26, 79, PRIMARG(0));

        if (obj_ptr->fp.class != Float)
                syserr(msg11, 79, PRIMARG(0));

        first = *((double *) INDEXED_VARS(obj_ptr));

        first = ceil(first);

        new_oop = integerObject((int) first);
        check_garbage(new_oop);
        return(new_oop);
}

/*
 * <primitive 74 self> -- Object nextInstance & Behavior someInstance
 */

oop
prim_74()
{
        object *obj_ptr;
        int in_oop;
        int the_inst;
        extern oop first_obj();
        extern oop next_obj();

        in_oop = PRIMARG(0);

        if (in_oop < 0)
                return (in_oop - 1);

        obj_ptr = GET_RCVR(in_oop);

        if (obj_ptr == NULL)
                syserr(msg26, 74, PRIMARG(0));

        if (obj_ptr->fp.id == obj_ptr->fp.class)
        {
                /*
                 * receiver is a class ... return the first instance
                 */

                the_inst = first_obj(obj_ptr -> fp.id, CUR_REGION, CUR_PID);

                if (the_inst >= 0)
                        return (the_inst);

                return (nIL);
        }

        the_inst = next_obj(obj_ptr->fp.id, CUR_REGION, CUR_PID);
        if (the_inst >= 0)
                return (the_inst);

        return (nIL);
}

/*
 * <primitive 75 self> -- Float integerPart
 */

extern double modf();

oop
prim_75()
{
        object *obj_ptr;
        object *new_ptr;
        double first, int_part;
        int in_oop;

        in_oop = PRIMARG(0);

        if (in_oop < 0)
                syserr(msg11, 76, PRIMARG(0));

        obj_ptr = GET_RCVR(in_oop);

        if (obj_ptr == NULL)
                syserr(msg26, 76, PRIMARG(0));

        if (obj_ptr->fp.class != Float)
```

```
first = *((double *) INDEXED_VARS(obj_ptr));

first - modf(first, &int_part);

new_ptr - OM_NEW(Float, sizeof(double) / sizeof(oop));

*((double *) INDEXED_VARS(new_ptr)) - int_part;

check_garbage(new_ptr->fp.id);
return (new_ptr->fp.id);
}
```

```c
#include <math.h>
#include <errno.h>
#include <strings.h>
#include <signal.h>
#include <ctype.h>
#include <sys/time.h>
#include <sys/resource.h>
#include "types.h"
#include "constants.h"
#include "bytecodes.h"
#include "macros.h"
#include "oops_values.h"
#include "interp_const.h"
#include "interp_types.h"

int errno;
struct timeval tp;
struct timezone tzp;

static char *msg01 = "prim_%d:01--Primitive not implemented";
static char *msg02 = "prim_%d:02--Parm is not type Symbol: %d";
static char *msg03 = "prim_%d:03--Symbol length too long: %d";
static char *msg04 = "prim_%d:04--Parm is not type Integer: %d";
static char *msg05 = "prim_%d:04--Parm is not type String: %d";
static char *msg11 = "prim_%d:11--Parm is not type Float: %d";
static char *msg12 = "prim_%d:12--Parm too big for gamma: %d";
static char *msg26 = "prim_%d:26--Object not found: %d";
static char *msg30 = "prim_%d:30--Float math error. errno: %d";
static char *msg87 = "prim_%d:87--Parm is not a class: %d";
static char *msg83a = "*** exiting to raid  (not really an error) ...";
static char *msg83b = "*** ST code tried to exit to raid when debugger not turned on";

extern struct process *Cur_process;

extern object *obj_mgr();
extern object *get_obj();
extern object *reserve_obj();
extern object *stringObject();

extern unsigned short ByteArraySizeIndex;

/*
 * <primitive 76 self> -- Float fractionPart
 */

extern double modf();

oop
prim_76()
{
        object *obj_ptr;
        object *new_ptr;
        double first, int_part;
        int in_oop;

        in_oop = PRIMARG(0);

        if (in_oop < 0)
                syserr(msg11, 76, PRIMARG(0));

        obj_ptr = GET_RCVR(in_oop);

        if (obj_ptr == NULL)
                syserr(msg26, 76, PRIMARG(0));

        if (obj_ptr->fp.class != Float)
                syserr(msg11, 76, PRIMARG(0));

        first = *((double *) INDEXED_VARS(obj_ptr));

        first = modf(first, &int_part);

        new_ptr = OM_NEW(Float, sizeof(double) / sizeof(oop));

        *((double *) INDEXED_VARS(new_ptr)) = first;

        check_garbage(new_ptr->fp.id);
        return (new_ptr->fp.id);
}

/*
 * <primitive 77 self> -- Float gamma
 */

extern double exp();
extern double gamma();
extern int signgam;

oop
prim_77()
{
        object *obj_ptr;
        object *new_ptr;
        double first;
        int in_oop;

        in_oop = PRIMARG(0);

        if (in_oop < 0)
                syserr(msg11, 77, PRIMARG(0));

        obj_ptr = GET_RCVR(in_oop);

        if (obj_ptr == NULL)
                syserr(msg26, 77, PRIMARG(0));

        if (obj_ptr->fp.class != Float)
                syserr(msg11, 77, PRIMARG(0));

        first = *((double *) INDEXED_VARS(obj_ptr));

        first = gamma(first);

        if (errno == ERANGE || errno == EDOM)
                syserr(msg30, 77, errno);

        if (first > 88.0)
                syserr(msg12, 77, PRIMARG(0));

        first = exp(first);

        if (errno == ERANGE || errno == EDOM)
                syserr(msg30, 77, errno);
```

```
        first = -first;

    new_ptr = OM_NEW(Float, sizeof(double) / sizeof(oop));

    *((double *) INDEXED_VARS(new_ptr)) = first;

    check_garbage(new_ptr->fp.id);
    return (new_ptr->fp.id);
}

/*
 * <primitive 78 self> -- Float asString
 */

oop
prim_78()
{
        object *self;
        object *aString;
        double value;
        int size;
        int no_index_vars;
        char buf[64];

        self = GET_RCVR(PRIMARG(0));

        if (self == NULL)
                syserr("prim_178: couldn't fetch self (oop = %d)", PRIMARG(0));

        if (!(self->fp.class == Float || in_super_chain(self->fp.class, Float, CUR_REGION /*
                syserr("prim_178: self is not a kind of Float (oop = %d)", self->fp.id);

        value = *((double *) INDEXED_VARS(self));

        sprintf(buf, "%g", value);

        aString = stringObject(buf);

        check_garbage(aString->fp.id);

        return (aString->fp.id);
}

/*
 * <primitive 79 self> -- Float exp
 */

oop
prim_79()
{
        object *obj_ptr;
        object *new_ptr;
        double first;
        int in_oop;

        in_oop = PRIMARG(0);

        if (in_oop < 0)
                syserr(msg11, 79, PRIMARG(0));

        obj_ptr = GET_RCVR(in_oop);

        if (obj_ptr == NULL)
                syserr(msg26, 79, PRIMARG(0));

        if (obj_ptr->fp.class != Float)
                syserr(msg11, 79, PRIMARG(0));

        first = *((double *) INDEXED_VARS(obj_ptr));

        first = exp(first);

        if (errno == ERANGE || errno == EDOM)
                syserr(msg30, 79, errno);

        new_ptr = OM_NEW(Float, sizeof(double) / sizeof(oop));

        *((double *) INDEXED_VARS(new_ptr)) = first;

        check_garbage(new_ptr->fp.id);
        return (new_ptr->fp.id);
}

/*
 * <primitive 80> -- not implemented
 */

oop
prim_80()
{
        syserr(msg01, 80);
}

/*
 * <primitive 81 self> -- Float sin
 */

extern double sin();

oop
prim_81()
{
        object *obj_ptr;
        object *new_ptr;
        double first;
        int in_oop;

        in_oop = PRIMARG(0);

        if (in_oop < 0)
                syserr(msg11, 81, PRIMARG(0));

        obj_ptr = GET_RCVR(in_oop);

        if (obj_ptr == NULL)
                syserr(msg26, 81, PRIMARG(0));

        if (obj_ptr->fp.class != Float)
                syserr(msg11, 81, PRIMARG(0));

        first = *((double *) INDEXED_VARS(obj_ptr));

        first = sin(first);

        if (errno == ERANGE || errno == EDOM)
                syserr(msg30, 81, errno);

        new_ptr = OM_NEW(Float, sizeof(double) / sizeof(oop));
```

```
	*((double *) INDEXED_VARS(new_ptr)) = first;

	check_garbage(new_ptr->fp.id);
	return (new_ptr->fp.id);
}

/*
 * <primitive 82 self> -- Float cos
 */

extern double cos();

oop
prim_82()
{
	object *obj_ptr;
	object *new_ptr;
	double first;
	int in_oop;

	in_oop = PRIMARG(0);

	if (in_oop < 0)
		syserr(msg11, 82, PRIMARG(0));

	obj_ptr = GET_RCVR(in_oop);

	if (obj_ptr == NULL)
		syserr(msg26, 82, PRIMARG(0));

	if (obj_ptr->fp.class != Float)
		syserr(msg11, 82, PRIMARG(0));

	first = *((double *) INDEXED_VARS(obj_ptr));

	first = cos(first);

	if (errno == ERANGE || errno == EDOM)
		syserr(msg30, 82, errno);

	new_ptr = OM_NEW(Float, sizeof(double) / sizeof(oop));

	*((double *) INDEXED_VARS(new_ptr)) = first;

	check_garbage(new_ptr->fp.id);
	return (new_ptr->fp.id);
}

/*
 * <primitive 83> -- Object raid
 */

oop
prim_83()
{
#if DEBUGGER
	syserr(msg83a);
#else
	syserr(msg83b);
#endif
	return (nIL);
}

/*
 * <primitive 84 self> -- Float arcSin
 */

extern double asin();

oop
prim_84()
{
	object *obj_ptr;
	object *new_ptr;
	double first;
	int in_oop;

	in_oop = PRIMARG(0);

	if (in_oop < 0)
		syserr(msg11, 84, PRIMARG(0));

	obj_ptr = GET_RCVR(in_oop);

	if (obj_ptr == NULL)
		syserr(msg26, 84, PRIMARG(0));

	if (obj_ptr->fp.class != Float)
		syserr(msg11, 84, PRIMARG(0));

	first = *((double *) INDEXED_VARS(obj_ptr));

	first = asin(first);

	if (errno == ERANGE || errno == EDOM)
		syserr(msg30, 84, errno);

	new_ptr = OM_NEW(Float, sizeof(double) / sizeof(oop));

	*((double *) INDEXED_VARS(new_ptr)) = first;

	check_garbage(new_ptr->fp.id);
	return (new_ptr->fp.id);
}

/*
 * <primitive 85 self> -- Float arcCos
 */

extern double acos();

oop
prim_85()
{
	object *obj_ptr;
	object *new_ptr;
	double first;
	int in_oop;

	in_oop = PRIMARG(0);

	if (in_oop < 0)
		syserr(msg11, 85, PRIMARG(0));

	obj_ptr = GET_RCVR(in_oop);

	if (obj_ptr == NULL)
```

```
        if (obj_ptr->fp.class != Float)
                syserr(msg11, 85, PRIMARG(0));

        first = *((double *) INDEXED_VARS(obj_ptr));

        first = acos(first);

        if (errno == ERANGE || errno == EDOM)
                syserr(msg30, 85, errno);

        new_ptr = OM_NEW(Float, sizeof(double) / sizeof(oop));

        *((double *) INDEXED_VARS(new_ptr)) = first;

        check_garbage(new_ptr->fp.id);
        return (new_ptr->fp.id);
}

/*
 * <primitive 86 self> -- Float arcTan
 */

extern double atan();

oop
prim_86()
{
        object *obj_ptr;
        object *new_ptr;
        double first;
        int in_oop;

        in_oop = PRIMARG(0);

        if (in_oop < 0)
                syserr(msg11, 85, PRIMARG(0));

        obj_ptr = GET_RCVR(in_oop);

        if (obj_ptr == NULL)
                syserr(msg26, 85, PRIMARG(0));

        if (obj_ptr->fp.class != Float)
                syserr(msg11, 85, PRIMARG(0));

        first = *((double *) INDEXED_VARS(obj_ptr));

        first = atan(first);

        if (errno == ERANGE || errno == EDOM)
                syserr(msg30, 86, errno);

        new_ptr = OM_NEW(Float, sizeof(double) / sizeof(oop));

        *((double *) INDEXED_VARS(new_ptr)) = first;

        check_garbage(new_ptr->fp.id);
        return (new_ptr->fp.id);
}

/*
 * ...
 */

oop
prim_87()
{
        object *obj_ptr;

        obj_ptr = GET_RCVR(PRIMARG(0));

        if (obj_ptr == NULL)
                syserr(msg26, 87, PRIMARG(0));

        if (obj_ptr->fp.class != obj_ptr->fp.id)
                syserr(msg87, 87, PRIMARG(0));

        return (CLASS_CONTROL(obj_ptr)->cfp.symbol_oop);
}

/*
 * <primitive 88 self aNumber> -- Float raisedTo:
 */

extern double pow();

oop
prim_88()
{
        object *obj_ptr1, *obj_ptr2;
        object *new_ptr;
        double first, second;
        int in_oop;

        in_oop = PRIMARG(0);

        if (in_oop < 0)
                syserr(msg11, 88, in_oop);

        obj_ptr1 = GET_RCVR(in_oop);

        if (obj_ptr1 == NULL)
                syserr(msg26, 88, in_oop);

        if (obj_ptr1->fp.class != Float)
                syserr(msg11, 88, in_oop);

        first = *((double *) INDEXED_VARS(obj_ptr1));

        in_oop = PRIMARG(1);

        second = (double) INTEGER_VALUE(in_oop);

        if (second < 0)
        {
                /*
                 * wasn't a positive integer!
                 */

                obj_ptr2 = get_obj(in_oop, CUR_REGION, CUR_PID);

                if (obj_ptr2 == NULL)
                        syserr(msg26, 88, in_oop);

                if (obj_ptr2->fp.class == Float)
```

```
		else if (obj_ptr2->fp.class == Integer)
			second = (double) *((int *) INDEXED_VARS(obj_ptr2));
		else
			syserr(msg11, 88, in_oop);
	}

	first = pow(first, second);

	if (errno == ERANGE || errno == EDOM)
		syserr(msg30, 88, errno);

	new_ptr = OM_NEW(Float, sizeof(double) / sizeof(oop));

	*((double *) INDEXED_VARS(new_ptr)) = first;

	check_garbage(new_ptr->fp.id);
	return (new_ptr->fp.id);
}

/*
 * <primitive 89 self> -- Integer random (range 0 to (2**31)-1)
 */

oop
prim_89()
{
	return (INTEGER_OBJECT(random()));
}

/*
 * <primitive 90> -- Time currentTime:
 */

oop
prim_90()
{
	struct tm *tm_ptr;
	object *array_ptr;
	long *clock;
	int i;

	if (gettimeofday(&tp, &tzp))
		syserr("prim_90: couldn't get time of day");

	clock = &tp.tv_sec;

	tm_ptr = localtime(clock);
	array_ptr = OM_NEW(Array, 9);

	ARRAY_DATA(array_ptr)[0] = -tm_ptr->tm_sec;
	ARRAY_DATA(array_ptr)[1] = -tm_ptr->tm_min;
	ARRAY_DATA(array_ptr)[2] = -tm_ptr->tm_hour;
	ARRAY_DATA(array_ptr)[3] = -tm_ptr->tm_mday;
	ARRAY_DATA(array_ptr)[4] = -(tm_ptr->tm_mon + 1);
	ARRAY_DATA(array_ptr)[5] = -tm_ptr->tm_year;
	ARRAY_DATA(array_ptr)[6] = -tm_ptr->tm_wday;
	ARRAY_DATA(array_ptr)[7] = -(tm_ptr->tm_yday + 1);

	for (i = 0; i < 8; i++)
		if (ARRAY_DATA(array_ptr)[i] == 0)
			ARRAY_DATA(array_ptr)[i] = ZERO;

	if (tm_ptr->tm_isdst == 0)
		ARRAY DATA(array ptr)[8] = ZERO;
	else
		ARRAY_DATA(array_ptr)[8] = -1;

	check_garbage(array_ptr->fp.id);
	return (array_ptr->fp.id);
}

/*
 * <primitive 91> -- not implemented
 */

oop
prim_91()
{
	syserr(msg01, 91);
}

/*
 * <primitive 92> -- not implemented
 */

oop
prim_92()
{
	syserr(msg01, 92);
}

/*
 * <primitive 93> -- not implemented
 */

oop
prim_93()
{
	syserr(msg01, 93);
}

/*
 * our version of the millisecond clock.  note that we 'normalize' the unix
 * time of day clock on the first call to this routine.  this is because the
 * number of msec from the start of the unix time of day clock (jan 1, 1970)
 * is too large for our positive Integer representation ((2^31)-1).
 */

millisecondClockValue()
{
	static int start_timer = 0;
	int milli;

	if (gettimeofday(&tp, &tzp))
		syserr("millisecondClockValue: couldn't get time of day");

	if (start_timer == 0)
		start_timer = tp.tv_sec;		/* secs since Jan 1 1970 */

	milli = (tp.tv_sec - start_timer) * 1000 + tp.tv_usec / 1000;

	return (milli);
}


/*
 * <primitive 94 self aSem msec> -- ProcessorScheduler signal:atMilliseconds:
 */
```

```
extern int Divert;
static int TimerEvents = 0;
static oop TimingSemaphore = nIL;
static struct itimerval TimeInterval;
static struct itimerval ZeroInterval;

oop
prim_94()
{
        object *self;
        object *aSemaphore;
        int msec;

        aSemaphore = reserve_obj(PRIMARG(1), CUR_REGION, CUR_PID);

        if (aSemaphore == NULL)
                syserr("prim_94: couldn't fetch aSemaphore (oop = %d)", PRIMARG(1));

        if (!(aSemaphore->fp.class == Semaphore || in_super_chain(aSemaphore->fp.class, S
        {
                TimingSemaphore = nIL;          /* cancel the request */
                setitimer(ITIMER_REAL, &ZeroInterval, NULL);
                return(PRIMARG(0));
        }

        if (!(PRIMARG(2) < 0))
                syserr("prim_94: milliseconds not an Integer > 0 (oop = %d)", PRIMARG(2))

        TimingSemaphore = aSemaphore->fp.id;

        msec = INTEGER_VALUE(PRIMARG(2)) - millisecondClockValue();

        if (msec <= 0)
        {
                kill(getpid(), SIGALRM);        /* already passed alarm time */
        }
        else
        {
                TimeInterval.it_value.tv_sec  = msec / 1000;
                TimeInterval.it_value.tv_usec = (msec % 1000) * 1000;
                setitimer(ITIMER_REAL, &TimeInterval, NULL);
        }

        return(PRIMARG(0));
}

/*
 * timerTrap - SIGALRM catcher
 */

timerTrap()
{
        /*
         * increment timer event count and flag interpreter diversion.
         * this will result in syncronous delivery of events via timerEvents().
         */

        TimerEvents++;

        Divert = 1;

        return;
}

/*
 * timerEvents - signal timer events on TimingSemaphore.
 */

timerEvents()
{
        int mask;

        /*
         * critical region ... prevent timerEvents until all pending ones
         * are delivered.
         */

        mask = sigblock(sigmask(SIGALRM));

        if (TimingSemaphore != nIL)
                for (; TimerEvents > 0; TimerEvents--)
                                synchronousSignal(TimingSemaphore);

        sigsetmask(mask);

        return;
}

/*
 * <primitive 95 self aString> -- String = (case dependent)
 */

oop
prim_95()
{
        object *self;
        object *aString;

        self = GET_RCVR(PRIMARG(0));

        if (self == NULL)
                syserr("prim_95: couldn't fetch self (oop = %d)", PRIMARG(0));

        aString = get_obj(PRIMARG(1), CUR_REGION, CUR_PID);

        if (aString == NULL)
                syserr("prim_95: couldn't fetch aString (oop = %d)", PRIMARG(1));

        if (!(self->fp.class == String || in_super_chain(self->fp.class, String, CUR_REGI
                return(FALSE);

        if (!(aString->fp.class == String || in_super_chain(aString->fp.class, String, CU
                return(FALSE);

        if ( INSTANCE_VARS(self)[ByteArraySizeIndex] !=
            INSTANCE_VARS(aString)[ByteArraySizeIndex]
          || bcmp(BYTEARRAY_DATA(self), BYTEARRAY_DATA(aString),
            INTEGER_VALUE(INSTANCE_VARS(self)[ByteArraySizeIndex])) != 0)
                return (FALSE);

        return (TRUE);
}

/*
 * <primitive 96 self aString> -- String compare: (case independent)
 */
```

```
oop
prim_96()
{
        register unsigned char *s1;
        register unsigned char *s2;
        register int c1;
        register int c2;
        register int minlen;
        register int result;
        object *self;
        object *aString;

        self = GET_RCVR(PRIMARG(0));

        if (self == NULL)
                syserr("prim_96: couldn't fetch self (oop = %d)", PRIMARG(0));

        aString = get_obj(PRIMARG(1), CUR_REGION, CUR_PID);

        if (aString == NULL)
                syserr("prim_96: couldn't fetch aString (oop = %d)", PRIMARG(1));

        if (!(self->fp.class == String || in_super_chain(self->fp.class, String, CUR_REGI
                syserr("prim_96: self is not a kind of String (oop = %d)", self->fp.id);

        if (!(aString->fp.class == String || in_super_chain(aString->fp.class, String, CU
                syserr("prim_96: aString is not a kind of String (oop = %d)", aString->fp

        result = (INTEGER_VALUE(INSTANCE_VARS(self)[ByteArraySizeIndex]) <
            INTEGER_VALUE(INSTANCE_VARS(aString)[ByteArraySizeIndex])) ? 1
          : (INSTANCE_VARS(self)[ByteArraySizeIndex] ==
            INSTANCE_VARS(aString)[ByteArraySizeIndex]) ? 2 : 3;

        minlen = MIN(INTEGER_VALUE(INSTANCE_VARS(self)[ByteArraySizeIndex]),
          INTEGER_VALUE(INSTANCE_VARS(aString)[ByteArraySizeIndex]));

        s1 = BYTEARRAY_DATA(self);
        s2 = BYTEARRAY_DATA(aString);

        while (minlen > 0)
        {
                if ((c1 = *s1) != (c2 = *s2))
                {
                        if ((c1 = AS_UPPERCASE(c1)) != (c2 = AS_UPPERCASE(c2)))
                        {
                                result = (c1 < c2) ? 1 : 3;
                                break;
                        }
                }
                s1++;
                s2++;
                minlen--;
        }

        return (INTEGER_OBJECT(result));
}

/*
 * <primitive 97> -- Time millisecondClockValue (real time).
 */

oop
prim_97()
{
        return (INTEGER_OBJECT(millisecondClockValue()));
}

/*
 * <primitive 98> -- Time currentTime: (seconds since 00:00 Jan 1, 1970)
 */

oop
prim_98()
{
        object *obj_ptr;

        if (gettimeofday(&tp, &tzp))
                syserr("prim_98: couldn't get time of day");

        return (- tp.tv_sec);
}

/*
 * <primitive 99> -- Time cpuMillisecondClockValue (user process time)
 */
oop
prim_99()
{
        object *obj_ptr;
        int milli;
        struct rusage rr;

        getrusage(RUSAGE_SELF, &rr);
        milli =
          (rr.ru_utime.tv_sec + rr.ru_stime.tv_sec) * 1000 +
          (rr.ru_utime.tv_usec + rr.ru_stime.tv_usec) / 1000;

        return (- milli);
}

/*
 * <primitive 100 self> -- Behavior, Object isBits
 */

oop
prim_100()
{
        object *self;
        oop in_oop;

        in_oop = PRIMARG(0);

        if (in_oop < 0)
                return(tRUE);

        self = GET_RCVR(PRIMARG(0));

        if (self == NULL)
                syserr("prim_100:: couldn't fetch self (oop = %d)", PRIMARG(0));

        /*
         * the exact semantics of isBits are described on pages 280-281
         * of ST-80 The Language and its Implementation.
         *
         * note that our implementation has a few fixed-length classes with
```

```
 * non-oop contents, (i.e., Integer, Double, Float, ...), which,
 * according to ST-80 semantics, cannot be classified as having
 * non-oop contents, (variables of fixed-length classes are always
 * oops in ST-80).  hence, the logic below may seem incorrect, but
 * actually preserves ST-80 semantics.
 */

if (self->fp.no_indx_vars > 0 && self->fp.flags & NO_INDEX_VARS)
        return (TRUE);
else
        return (FALSE);
```

```
/*Copyright 1988 Eastman Kodak Company.  All rights reserved.*/
#include <stdio.h>
#include <math.h>
#include <strings.h>
#include <ctype.h>
#include "types.h"
#include "constants.h"
#include "bytecodes.h"
#include "macros.h"
#include "oops_values.h"
#include "interp_const.h"
#include "interp_types.h"


static char *msg01 = "prim_%d:01--Primitive not implemented";
static char *msg02 = "prim_%d:02--Parm is not type String: %d";
static char *msg03 = "prim_%d:03--Concat strng would exceed max str len: %d";
static char *msg04 = "prim_%d:04--Parm is not type Integer: %d";
static char *msg05 = "prim_%d:05--Parm is not integer >=0: %d";
static char *msg06 = "prim_%d:06--Parm is out of string: %d";
static char *msg07 = "prim_%d:07--Parm is not type Character: %d";
static char *msg08 = "prim_%d:08--Parm is not type Integer > 0: %d";
static char *msg09 = "prim_%d:09--Parm exceeds array bound: %d";
static char *msg10 = "prim_%d:10--Object is not indexed: %d";
static char *msg11 = "prim_%d:11--Parm is not type ByteArray: %d";
static char *msg12 = "prim_%d:12--Parm is not integer >0: %d";
static char *msg13 = "prim_%d:13--Parm is integer (wrong class): %d";
static char *msg14 = "prim_%d:14--start position > stop position %d";
static char *msg15 = "prim_%d:15--start position > length target %d";
static char *msg16 = "prim_%d:16--start pos in source > length source %d";
static char *msg17 = "prim_%d:17--parm not of class String: %d";
static char *msg18 = "prim_%d:18--parm not of class ByteArray: %d";
static char *msg26 = "prim_%d:26--Object not found: %d";
static char *msg27 = "prim_%d:27--Parm exceeds length of string: %d";

extern object *obj_mgr();
extern object *get_obj();
extern object *stringObject();
extern object *reserve_obj();
extern object *referenced();
extern long getsymbol();
extern struct process *Cur_process;

extern unsigned short WordArrayVersionIndex;

/*
 * <primitive 101 self> -- Object, Behavior isVariable
 */

oop
prim_101()
{
        object *self;
        oop in_oop;
        in_oop = PRIMARG(0);
        if (in_oop < 0)
                return(FALSE);

        self = GET_RCVR(PRIMARG(0));

        if (self == NULL)
                syserr("prim_101: couldn't fetch self (oop = %d)", PRIMARG(0));

        /*
         * the exact semantics of isVariable are described on pages 280-281
         * of ST-80 The Language and its Implementation.
         */

        if (self->fp.no_indx_vars > 0)
                if (!(self->fp.flags & MG_INDEX_VARS))
                        return (TRUE);

        return (FALSE);
}

/*
 * <primitive 102 self> -- Behavior isBytes
 */

oop
prim_102()
{
        object *self;
        oop in_oop;

        in_oop = PRIMARG(0);
        if (in_oop < 0)
                return(FALSE);

        self = GET_RCVR(PRIMARG(0));

        if (self == NULL)
                syserr("prim_102: couldn't fetch self (oop = %d)", PRIMARG(0));

        /*
         * the exact semantics of isBytes are described on pages 280-281 of
         * ST-80 The Language and its Implementation.
         */

        if (self->fp.no_indx_vars > 0 && self->fp.class == ByteArray)
                return (TRUE);
        else
                return (FALSE);
}

/*
 * <primitive 103 self size> -- WordArray new:
 */

oop
prim_103()
{
        object *new;
        int size;
        int no_index_vars;

        if (!(PRIMARG(1) < 0 || PRIMARG(1) == ZERO))
                syserr("prim_103: size not an Integer >= 0 (oop = %d)", PRIMARG(1));

        no_index_vars = SLOTS_FOR_WORDS(INTEGER_VALUE(PRIMARG(1)));

        new = OM_NEW(PRIMARG(0), no_index_vars);
        INSTANCE_VARS(new)[WordArraySizeIndex] = PRIMARG(1);

        /*
         * we need to set the version for the halftone cacheing mechanism
         * in copyBits.  this version is updated whenever the wordarray is
```

```
 * altered, (see wordarray at:put: below).
 */

	INSTANCE_VARS(new)[WordArrayVersionIndex] = -1;

	check_garbage(new->fp.id);
	return (new->fp.id);
}

/*
 * <primitive 104 self> -- not implemented
 */

oop
prim_104()
{
	syserr(msg01, 104);
}

/*
 * <primitive 105 self aNumber> -- WordArray at:
 */

oop
prim_105()
{
	object *self;
	int aNumber;

	self = GET_RCVR(PRIMARG(0));

	if (self == NULL)
		syserr("prim_105: couldn't fetch self (oop = %d)", PRIMARG(0));

	if (!(self->fp.class == WordArray || in_super_chain(self->fp.class,
	    WordArray, CUR_REGION, CUR_PID)))
		syserr("prim_105: self is not a kind of WordArray (oop = %d)", self->fp.i

	if (!(PRIMARG(1) < 0))
		syserr("prim_105: aNumber not an Integer > 0 (oop = %d)", PRIMARG(1));

	aNumber = INTEGER_VALUE(PRIMARG(1)) - 1;

	if (aNumber >= WORDARRAY_SIZE(self))
		syserr("prim_105: aNumber out of range (self = %d, aNumber = %d)", PRIMAR

	return (INTEGER_OBJECT(WORDARRAY_DATA(self)[aNumber]));
}

/*
 * <primitive 106 self aNumber aWord> -- WordArray at:put:
 */

prim_106()
{
	object *self;
	int aNumber;

	self = GET_RCVR(PRIMARG(0));

	if (self == NULL)
		syserr("prim_106: couldn't fetch self (oop = %d)", PRIMARG(0));

	if (!(self->fp.class == WordArray || in_super_chain(self->fp.class,
	    WordArray, CUR_REGION, CUR_PID)))
		syserr("prim_106: self is not a kind of WordArray (oop = %d)", self->fp.i

	if (!(PRIMARG(1) < 0))
		syserr("prim_106: aNumber not an Integer > 0 (oop = %d)", PRIMARG(1));

	aNumber = INTEGER_VALUE(PRIMARG(1)) - 1;

	if (aNumber >= WORDARRAY_SIZE(self))
		syserr("prim_106: aNumber out of range (self = %d, aNumber = %d)", PRIMAR

	if (!(PRIMARG(2) < 0 || PRIMARG(2) == zERO))
		syserr("prim_106: aWord not an Integer >= 0 (oop = %d)", PRIMARG(2));

	WORDARRAY_DATA(self)[aNumber] = INTEGER_VALUE(PRIMARG(2));

	/*
	 * update the wordarray id for the halftone cacheing mechanism in
	 * copyBits.
	 */

	INSTANCE_VARS(self)[WordArrayVersionIndex]--;

	UPDATE(self);

	return (PRIMARG(2));
}

/*
 * <primitive 107 self aString> -- String copy
 */

oop
prim_107()
{
	object *copy;
	object *aString;

	if ((aString = get_obj(PRIMARG(1), CUR_REGION, CUR_PID)) == NULL)
		syserr("prim_107: couldn't fetch aString (oop = %d)", PRIMARG(1));

	if (!(aString->fp.class == String || in_super_chain(aString->fp.class, String, CU
		syserr("prim_107: aString is not a kind of String (oop = %d)", aString->f

	copy = stringObject(BYTEARRAY_DATA(aString));

	check_garbage(copy->fp.id);

	return (copy->fp.id);
}

/*
 * <primitive 108 aString> -- string as symbol
 */

oop
prim_108()
{
	object *aString;
	oop symbol_oop;

	aString = GET_RCVR(PRIMARG(0));

	if (aString == NULL)
```

```
		sysErr("prim_108: couldn't fetch aString (oop = %d)", PRIMARG(0));

	if (!(aString->fp.class == String || in_super_chain(aString->fp.class, String, CU
		sysErr("prim_108: aString is not a kind of String (oop = %d)", aString->f

	/*
	 * if we've got it, great ... otherwise, create it.
	 */

	if ((symbol_oop = getsymbol(BYTEARRAY_DATA(aString), CUR_REGION, CUR_PID)) < 0)
		symbol_oop = putsymbol(BYTEARRAY_DATA(aString), CUR_REGION, CUR_PID);

	return (symbol_oop);
}


/*
 * <primitive 109 self aString> -- Symbol hasInterned:ifTrue:
 *
 * This primitive is used in Symbol hasInterned:ifTrue:.  It takes a String
 * as an argument, and returns the Symbol which has that String as its value,
 * if such a Symbol exists; it returns nIL if no such Symbol exists.
 */

oop
prim_109()
{
	object *aString;
	oop symbol_oop;

	aString = get_obj ( PRIMARG(1), CUR_REGION, CUR_PID );

	if (!(aString->fp.class == String || in_super_chain(aString->fp.class, String, CU
		sysErr( "prim_109: aString is not a kind of String (oop = %d)",
						aString->fp.id);

	/*
	 * if we've got it, return it, otherwise, return nIL.
	 */

	if ((symbol_oop =
		getsymbol(BYTEARRAY_DATA(aString), CUR_REGION, CUR_PID)) < 0)
		symbol_oop = nIL;

	return (symbol_oop);
}

/*
 * <primitive 110 self aString> -- replace interior of string or byteArray
 * with another string or byteArray.
 */

oop
prim_110()
{
	object *self;
	object *replacement;
	int start;
	int stop;
	int repStart;

	self = GET_RCVR(PRIMARG(0));

	if (self == NULL)
		sysErr("prim_110: couldn't fetch self (oop = %d)", PRIMARG(0));

	if (!(PRIMARG(1) < 0))
		sysErr("prim_110: start not an Integer > 0 (oop = %d)", PRIMARG(1));

	start = INTEGER_VALUE(PRIMARG(1)) - 1;

	if (!(PRIMARG(2) < 0 || PRIMARG(2) == zERO))
		sysErr("prim_110: stop not an Integer >= 0 (oop = %d)", PRIMARG(2));

	stop = INTEGER_VALUE(PRIMARG(2)) - 1;

	if ((replacement = get_obj(PRIMARG(3), CUR_REGION, CUR_PID)) == NULL)
		sysErr("prim_110: couldn't fetch replacement (oop = %d)", PRIMARG(3));

	if (!(PRIMARG(4) < 0 || PRIMARG(4) == zERO))
		sysErr("prim_110: repStart not an Integer > 0 (oop = %d)", PRIMARG(4));

	repStart = INTEGER_VALUE(PRIMARG(4)) - 1;

	if (!(self->fp.class == String || self->fp.class == ByteArray
	    || in_super_chain(self->fp.class, String, CUR_REGION, CUR_PID)
	    || in_super_chain(self->fp.class, ByteArray, CUR_REGION, CUR_PID)))
		sysErr("prim_110: self is not a kind of String or ByteArray (oop = %d)",

	if (!(replacement->fp.class == String || replacement->fp.class == ByteArray
	    || in_super_chain(replacement->fp.class, String, CUR_REGION, CUR_PID)
	    || in_super_chain(replacement->fp.class, ByteArray, CUR_REGION, CUR_PID)))
		sysErr("prim_110: replacement is not a kind of String or ByteArray (oop =

	/*
	 * note that we are occasionally invoked with start = size - 1, hence
	 * we check for the no-replacement case before doing the bounds
	 * checks below ...
	 */

	if (stop < start)
		return (self->fp.id);

	if (start >= BYTEARRAY_SIZE(self) || stop >= BYTEARRAY_SIZE(self))
		sysErr("prim_110: start or stop out of range (self = %d, start = %d, stop

	if (repStart >= BYTEARRAY_SIZE(replacement))
		sysErr("prim_110: repStart out of range (replacement = %d, repStart = %d)

	if (repStart + stop - start >= BYTEARRAY_SIZE(replacement))
		sysErr("prim_110: not enough bytes in replacement (replacement = %d, repS

	if (stop >= start)
	{
		bcopy(&BYTEARRAY_DATA(replacement)[repStart],
		  &BYTEARRAY_DATA(self)[start], stop - start + 1);
		UPDATE(self);
	}

	return (self->fp.id);
}

/*
 * <primitive 111 self aNumber> -- Object at:
 */

oop
prim_111()
```

```
{
        object *obj_ptr;
        int where;
        register int in_oop;

        in_oop = PRIMARG(0);

        if (in_oop < 0)         /* an integer */
                syserr(msg10, 111, in_oop);

        obj_ptr = GET_RCVR(in_oop);

        if (obj_ptr == NULL)
                syserr(msg26, 111, in_oop);

        where = INTEGER_VALUE(PRIMARG(1)) - 1;

        if (where < 0)
                syserr(msg08, 111, PRIMARG(1));

        if (where >= obj_ptr->fp.no_indx_vars)
                syserr(msg09, 111, PRIMARG(1));

        return (INDEXED_VARS(obj_ptr)[where]);
}

/*
 * <primitive 112 self aNumber aValue> -- Object at:put
 */

oop
prim_112()
{
        object *obj_ptr;
        int where;
        oop old_oop;
        oop new_oop;
        register int in_oop;

        in_oop = PRIMARG(0);

        if (in_oop < 0)         /* an integer */
                syserr(msg10, 112, in_oop);

        obj_ptr = GET_RCVR(in_oop);

        if (obj_ptr == NULL)
                syserr(msg26, 112, in_oop);

        in_oop = PRIMARG(1);
        if (in_oop < 0)
                where = -in_oop - 1;
        else
                syserr(msg08, 112, in_oop);

        if (where >= obj_ptr->fp.no_indx_vars)
                syserr(msg09, 112, in_oop);

        old_oop = INDEXED_VARS(obj_ptr)[where];
        new_oop = PRIMARG(2);
        INDEXED_VARS(obj_ptr)[where] = new_oop;

        UPDATE(obj_ptr);

        /* do garbage collection */
        referenced(obj_ptr, new_oop, old_oop, CUR_REGION, CUR_PID);

        return (new_oop);
}

/*
 * <primitive 113> -- not implemented
 */

oop
prim_113()
{
        syserr(msg01, 113);
}

/*
 * <primitive 114 --  new array
 */

oop
prim_114()
{
        object *obj_ptr;

        if (PRIMARG(1) > 0 && PRIMARG(1) != ZERO)
                syserr(msg04, 114, PRIMARG(1));

        obj_ptr = OM_NEW(PRIMARG(0), INTEGER_VALUE(PRIMARG(1)));

        check_garbage(obj_ptr->fp.id);
        return (obj_ptr->fp.id);
}

/*
 * <primitive 115 self> -- string concatenate
 */

oop
prim_115()
{
        object *self;
        object *aString;
        object *newString;
        int size;
        int no_index_vars;

        self = GET_RCVR(PRIMARG(0));

        if (self == NULL)
                syserr("prim_115: couldn't fetch self (oop = %i)", PRIMARG(0));

        if (!(self->fp.class == String || in_super_chain(self->fp.class, String, CUR_REGI
                syserr("prim_115: self is not a kind of String (oop = %d)", self->fp.id);

        if ((aString = get_obj(PRIMARG(1), CUR_REGION, CUR_PID)) == NULL)
                syserr("prim_115: couldn't fetch aString (oop = %d)", PRIMARG(1));

        if (!(aString->fp.class == String || in_super_chain(aString->fp.class, String, CU
                syserr("prim_115: aString is not a kind of String (oop = %d)", aString->f

        size = BYTEARRAY_SIZE(self) + BYTEARRAY_SIZE(aString);

        no_index_vars = SLOTS_FOR_BYTES(size+1);  /* +1 for null terminator */
```

```
        newString = OM_NEW(String, no_index_vars);

        bcopy(BYTEARRAY_DATA(self), BYTEARRAY_DATA(newString),
          BYTEARRAY_SIZE(self));
        bcopy(BYTEARRAY_DATA(aString),
          &BYTEARRAY_DATA(newString)[BYTEARRAY_SIZE(self)],
          BYTEARRAY_SIZE(aString));
        INSTANCE_VARS(newString)[ByteArraySizeIndex] = INTEGER_OBJECT(size);
        BYTEARRAY_DATA(newString)[size] = '\0'; /* c-string compatibility */

        check_garbage(newString->fp.id);

        return (newString->fp.id);
}

/*
 * <primitive 116 self size> -- String or ByteArray new:
 */

oop
prim_116()
{
        object *new;
        int size;
        int no_index_vars;

        if (!(PRIMARG(1) < 0 || PRIMARG(1) == zERO))
                syserr("prim_116: size not an Integer >= 0 (oop = %d)", PRIMARG(1));

        size = INTEGER_VALUE(PRIMARG(1));

        /*
         * note that we add an extra byte to the storage area and fill it
         * with a null byte.  this gives us c-language string compatibility
         * which can be used when the need arises.  see primitive 108 (string
         * as symbol) for an example of a case when this is handy.
         */

        no_index_vars = SLOTS_FOR_BYTES(size+1);  /* +1 for null terminator */

        new = OM_NEW(PRIMARG(0), no_index_vars);
        INSTANCE_VARS(new)[ByteArraySizeIndex] = INTEGER_OBJECT(size);
        BYTEARRAY_DATA(new)[size] = '\0';        /* c-string compatibility */

        check_garbage(new->fp.id);

        return (new->fp.id);
}

/*
 * <primitive 117 self> -- not implemented
 */

oop
prim_117()
{
        syserr(msg01, 117);
}

/*
 * <primitive 118 self aNumber> -- ByteArray at:
 */

oop
prim_118()
{
        object *self;
        int aNumber;

        self = GET_RCVR(PRIMARG(0));

        if (self == NULL)
                syserr("prim_118: couldn't fetch self (oop = %d)", PRIMARG(0));

        if (!(self->fp.class == ByteArray || in_super_chain(self->fp.class,
              ByteArray, CUR_REGION, CUR_PID)))
                syserr("prim_118: self is not a kind of ByteArray (oop = %d)", self->fp.i

        if (!(PRIMARG(1) < 0))
                syserr("prim_118: aNumber not an Integer > 0 (oop = %d)", PRIMARG(1));

        aNumber = INTEGER_VALUE(PRIMARG(1)) - 1;

        if (aNumber >= BYTEARRAY_SIZE(self))
                syserr("prim_118: aNumber out of range (self = %d, aNumber = %d)", PRIMAR

        return (INTEGER_OBJECT(BYTEARRAY_DATA(self)[aNumber]));
}

/*
 * <primitive 119 self aNumber aByte> -- ByteArray at:put:
 */

oop
prim_119()
{
        object *self;
        int aNumber;

        self = GET_RCVR(PRIMARG(0));

        if (self == NULL)
                syserr("prim_119: couldn't fetch self (oop = %d)", PRIMARG(0));

        if (!(self->fp.class == ByteArray || in_super_chain(self->fp.class,
              ByteArray, CUR_REGION, CUR_PID)))
                syserr("prim_119: self is not a kind of String or ByteArray (oop = %d)",

        if (!(PRIMARG(1) < 0))
                syserr("prim_119: aNumber not an Integer > 0 (oop = %d)", PRIMARG(1));

        aNumber = INTEGER_VALUE(PRIMARG(1)) - 1;

        if (aNumber >= BYTEARRAY_SIZE(self))
                syserr("prim_119: aNumber out of range (self = %d, aNumber = %d)", PRIMAR

        if (!(PRIMARG(2) < 0 || PRIMARG(2) == zERO))
                syserr("prim_119: aByte not an Integer >= 0 (oop = %d)", PRIMARG(2));

        BYTEARRAY_DATA(self)[aNumber] = INTEGER_VALUE(PRIMARG(2));

        UPDATE(self);

        return (PRIMARG(2));
}
```

```
 * <primitive 120> -- not implemented
 */

oop
prim_120()
{
	syserr(msg01, 120);
}

/*
 * <primitive 121 self> -- String print (with newline)
 */

oop
prim_121()
{
	object *self;
	object *aString;

	self = GET_RCVR(PRIMARG(0));

	if (self == NULL)
		syserr("prim_121: couldn't fetch self (oop = %d)", PRIMARG(0));

	if (!(self->fp.class == String || in_super_chain(self->fp.class, String, CUR_REGI
		syserr("prim_121: self is not a kind of String (oop = %d)", self->fp.id);

	fwrite(BYTEARRAY_DATA(self), sizeof(char), BYTEARRAY_SIZE(self),
	  stdout);
	putc('\n', stdout);

	return (nIL);
}

/*
 * <primitive 122> -- not implemented
 */

oop
prim_122()
{
	syserr(msg01, 122);
}

/*
 * <primitive 123> -- not implemented
 */

oop
prim_123()
{
	syserr(msg01, 123);
}

/*
 * <primitive 124 self aNumber> -- String at:
 */

oop
prim_124()
{
	object *self;
	int aNumber;

	self = GET_RCVR(PRIMARG(0));

	if (self == NULL)
		syserr("prim_124: couldn't fetch self (oop = %d)", PRIMARG(0));

	if (!(self->fp.class == String || in_super_chain(self->fp.class,
	       String, CUR_REGION, CUR_PID)))
		syserr("prim_124: self is not a kind of String (oop = %d)", self->fp.id);

	if (!(PRIMARG(1) < 0))
		syserr("prim_124: aNumber not an Integer > 0 (oop = %d)", PRIMARG(1));

	aNumber = INTEGER_VALUE(PRIMARG(1)) - 1;

	if (aNumber >= BYTEARRAY_SIZE(self))
		syserr("prim_124: aNumber out of range (self = %d, aNumber = %d)", PRIMAR

	return (BYTEARRAY_DATA(self)[aNumber]);
}

/*
 * <primitive 125 self aNumber aByte> -- String at:put:
 */

oop
prim_125()
{
	object *self;
	int aNumber;

	self = GET_RCVR(PRIMARG(0));

	if (self == NULL)
		syserr("prim_125: couldn't fetch self (oop = %d)", PRIMARG(0));

	if (!(self->fp.class == String || in_super_chain(self->fp.class,
	       String, CUR_REGION, CUR_PID)))
		syserr("prim_125: self is not a kind of String (oop = %d)", self->fp.id);

	if (!(PRIMARG(1) < 0))
		syserr("prim_125: aNumber not an Integer > 0 (oop = %d)", PRIMARG(1));

	aNumber = INTEGER_VALUE(PRIMARG(1)) - 1;

	if (aNumber >= BYTEARRAY_SIZE(self))
		syserr("prim_125: aNumber out of range (self = %d, aNumber = %d)", PRIMAR

	if (!(PRIMARG(2) >= 0 && PRIMARG(2) <= 255))
		syserr("prim_125: aChar not a Character (oop = %d)", PRIMARG(2));

	BYTEARRAY DATA(self)[aNumber] = PRIMARG(2);

	UPDATE(self);

	return (PRIMARG(2));
}
```

```
/*Copyright 1988 Eastman Kodak Company.  All rights reserved.*/
#include <errno.h>
#include <stdio.h>
#include <signal.h>
#include <vfont.h>
#include <fcntl.h>
#include <sys/types.h>
#include <sys/ioctl.h>
#include <sys/time.h>
#include <sundev/kbio.h>
#include <sundev/kbd.h>
#include <pixrect/pixrect_hs.h>
#include <sunwindow/rect.h>
#include <sunwindow/rectlist.h>
#include <sunwindow/pixwin.h>
#include <sunwindow/pw_util.h>
#include <sunwindow/win_struct.h>
#include <sunwindow/win_environ.h>
#include <sunwindow/cms.h>
#include <sunwindow/win_screen.h>
#include <sunwindow/win_input.h>
#include "types.h"
#include "constants.h"
#include "bytecodes.h"
#include "macros.h"
#include "oops_values.h"
#include "interp_const.h"
#include "interp_types.h"
#include "keycodes.h"

/*
 * primitives 126-136 are the graphics/mouse/keyboard primitives & i/o
 * routines for alltalk.
 */

extern object *obj_mgr();
extern object *reserve_obj();
extern object *get_obj();
extern object *become();
extern char *getenv();

extern struct process *Cur_process;

extern char *LogFile;

extern int ExitToDebugger;

extern oop BitBlt;
extern oop Form;
extern oop StrikeFont;
extern oop CharacterScanner;
extern oop DisplayScreen;
extern oop Cursor;

extern oop EndOfRun;
extern oop CrossedX;

extern oop FormBlackMask;

extern unsigned short FormWidthIndex;
extern unsigned short FormHeightIndex;
extern unsigned short FormDepthIndex;
extern unsigned short FormBitsIndex;
extern unsigned short FormOffsetIndex;

extern unsigned short DestFormIndex;
extern unsigned short SourceFormIndex;
extern unsigned short HalftoneFormIndex;
extern unsigned short CombinationRuleIndex;
extern unsigned short DestXIndex;
extern unsigned short DestYIndex;
extern unsigned short WidthIndex;
extern unsigned short HeightIndex;
extern unsigned short SourceXIndex;
extern unsigned short SourceYIndex;
extern unsigned short ClipXIndex;
extern unsigned short ClipYIndex;
extern unsigned short ClipWidthIndex;
extern unsigned short ClipHeightIndex;

extern unsigned short PointXIndex;
extern unsigned short PointYIndex;

extern unsigned short SFXTableIndex;
extern unsigned short SFGlyphsIndex;
extern unsigned short SFNameIndex;
extern unsigned short SFStopConditionsIndex;
extern unsigned short SFTypeIndex;
extern unsigned short SFMinAsciiIndex;
extern unsigned short SFMaxAsciiIndex;
extern unsigned short SFMaxWidthIndex;
extern unsigned short SFStrikeLengthIndex;
extern unsigned short SFAscentIndex;
extern unsigned short SFDescentIndex;
extern unsigned short SFXOffsetIndex;
extern unsigned short SFRasterIndex;
extern unsigned short SFSubscriptIndex;
extern unsigned short SFSuperscriptIndex;
extern unsigned short SFEmphasisIndex;

extern unsigned short CSXTableIndex;
extern unsigned short CSLastIndexIndex;

extern unsigned short WordArraySizeIndex;
extern unsigned short WordArrayVersionIndex;

/*
 * graphics primitives and support routines
 */

static oop currentDisplay = nIL;
static oop currentCursor = nIL;

static struct pixrect *displayRect;

static object *destForm, *sourceForm, *halftoneForm;
static object *dBits, *sBits, *hBits;
static int rule;                /* pixrect operation */
static int sourceX, sourceY, sourceW, sourceH, sourceD; /* source */
static int destX, destY, destW, destH, destD;   /* destination */
static int clipX, clipY, clipW, clipH;  /* clipping rectangle */
static int halftoneW, halftoneH, halftoneD ;/* halftone */
static int width, height;        /* bitblt area */

static int pixrect rule[] =
{
  PIX DONTCLIP | PIX CLR,
```

```
    PIX_DONTCLIP | PIX_SRC & PIX_DST,
    PIX_DONTCLIP | PIX_SRC & PIX_NOT(PIX_DST),
    PIX_DONTCLIP | PIX_SRC,
    PIX_DONTCLIP | PIX_NOT(PIX_SRC) & PIX_DST,
    PIX_DONTCLIP | PIX_DST,
    PIX_DONTCLIP | PIX_SRC ^ PIX_DST,
    PIX_DONTCLIP | PIX_SRC | PIX_DST,
    PIX_DONTCLIP | PIX_NOT(PIX_SRC) & PIX_NOT(PIX_DST),
    PIX_DONTCLIP | PIX_NOT(PIX_SRC) ^ PIX_DST,
    PIX_DONTCLIP | PIX_NOT(PIX_DST),
    PIX_DONTCLIP | PIX_SRC | PIX_NOT(PIX_DST),
    PIX_DONTCLIP | PIX_NOT(PIX_SRC),
    PIX_DONTCLIP | PIX_NOT(PIX_SRC) | PIX_DST,
    PIX_DONTCLIP | PIX_NOT(PIX_SRC) | PIX_NOT(PIX_DST),
    PIX_DONTCLIP | PIX_SET,
    0
};

/*
 * sun4 memory pixrects pad to 32-bit boundaries instead of the previous
 * 16-bits on sun2 and sun3, unless the pixrect is only 16-bits wide.
 *
 * fortunately, it appears that the rop routines on sun2 and sun3 will
 * properly manipulate memory pixrects with this new padding arrangement.
 *
 * hence we redefine mpr_linebytes() to conform to these new conditions since
 * the software releases don't do this for us.  this calcuation is also done
 * in the smalltalk code which allocates word arrays for bits in forms.
 */

#define mpr_linebytes(x, depth) \
        ( ( (x)*(depth) == 16 ) ? 2 : ( ( ( (x)*(depth) ) + 31 ) >> 3 ) & -3 )

#define FRAME_BUFFER ("/dev/fb")

#define PR_WIDTH(rect)          ( (rect)->pr_size.x )
#define PR_HEIGHT(rect)         ( (rect)->pr_size.y )
#define PR_DEPTH(rect)          ( (rect)->pr_depth )
#define PR_CLEAR(rect)          \
        ( pr_rop(rect, 0, 0, PR_WIDTH(rect), PR_HEIGHT(rect),            \
          PIX_CLR, NULL, 0, 0) )
#define PR_COPY(rect1, rect2)   \
        ( pr_rop(rect1, 0, 0, PR_WIDTH(rect1), PR_HEIGHT(rect1),         \
          PIX_SRC, rect2, 0, 0) )
#define MPR_LINEBYTES(rect)     ( mpr_d(rect)->md_linebytes )
#define MPR_IMAGE(rect)         ( mpr_d(rect)->md_image )
#define MPR_SIZE(rect)          ( PR_HEIGHT(rect) * MPR_LINEBYTES(rect) )

#define IMAGE_SIZE(w, h, d)     ( (h) * mpr_linebytes((w), (d)) )

/*
 * in order to prevent excessive calloc() calls as a result of the
 * mem_point() allocating space for various pixrect related structures,
 * (mem_point() was previously used to get sRect, dRect, and hRect from their
 * respective Forms), we allocate the pixrect structures permanently via
 * mpr_static(), and simply adjust their fields from the Form information,
 * (sort of an under-the-hood operation).
 *
 * MEM_POINT also takes care of resetting sRect or dRect to the proper
 * pixrect structure in case they had been switched to displayRect in
 * the case of bitblt operations involving the display, (see setCopyBits()).
 */

#define MEM_POINT(rect, w, h, d, image) \
        if (&rect == &sRect) rect = &sRect_pr;                         \
        if (&rect == &dRect) rect = &dRect_pr;                         \
        PR_WIDTH(rect)          = (w);                                 \
        PR_HEIGHT(rect)         = (h);                                 \
        PR_DEPTH(rect)          = (d);                                 \
        MPR_LINEBYTES(rect) = mpr_linebytes((w), (d));                 \
        MPR_IMAGE(rect)         = (short *) (image);

mpr_static(sRect_pr, 0, 0, 0, NULL);
mpr_static(dRect_pr, 0, 0, 0, NULL);
mpr_static(hRect_pr, 0, 0, 0, NULL);

static struct pixrect *sRect = &sRect_pr;
static struct pixrect *dRect = &dRect_pr;
static struct pixrect *hRect = &hRect_pr;

/*
 * cursor info
 */

static int CursorX, CursorY;

/*
 * pixrect for storing previous screen contents under the cursor ...
 * allocated in openDisplay() when depth of display device is known.
 */

static struct pixrect *tRect;

/*
 * current cursor pixrect
 */

#define CURSOR_LEN              (16)

static char cImage[IMAGE_SIZE(CURSOR_LEN, CURSOR_LEN, 1)];

mpr_static(cRect_pr, CURSOR_LEN, CURSOR_LEN, 1, cImage);

static struct pixrect *cRect = &cRect_pr;

/*
 * cursor tracking
 */

#define CURSOR_OFF              \
{                                                                      \
        pr_rop(displayRect, CursorX, CursorY,                          \
          CURSOR_LEN, CURSOR_LEN, PIX_SRC, tRect, 0, 0);               \
}

#define CURSOR_ON               \
{                                                                      \
        pr_rop(tRect, 0, 0, CURSOR_LEN, CURSOR_LEN,                    \
          PIX_SRC, displayRect, CursorX, CursorY);                     \
        pr_rop(displayRect, CursorX, CursorY, CURSOR_LEN,              \
          CURSOR_LEN, PIX_SRC | PIX_DST, cRect, 0, 0);                 \
}

#if 0
#define CURSOR_IN_AREA(x, y, w, h)      \
        (  ( CursorX <= (x) && CursorX + CURSOR_LEN > (x)              \
          || CursorX >  (x) && (x) + (w) > CursorX )                   \
```

```
	&& ( CursorY <= (y) && CursorY + CURSOR_LEN > (y)		\
	  || CursorY >  (y) && (y) + (h) > CursorY ) )
#else
#define CURSOR_IN_AREA(x, y, w, h)		\
	( ( CursorX + CURSOR_LEN > (x) && CursorX < (x) + (w) )		\
	  && ( CursorY + CURSOR_LEN > (y) && CursorY < (y) + (h) ) )
#endif

/*
 * pr_replrop() also causes excessive calloc() calls via mem_region() when
 * instructed to align the source pixrect in the destination, (we use
 * pr_replrop for halftones).  hence, we keep a static pixrect which is 4
 * times the halftone source pixrect from which we can do our own alignment
 * with a simple pr_rop.  we also consider this area to be a 'halftone cache'
 * which significantly cuts down our overhead when a series of bitblt
 * operations using the same halftone are being done, (e.g. when drawing over
 * a region containing a halftone).
 *
 * NB: it might be a very wise idea to go to 64x64 halftones, (smalltalk's are
 * 16x16).  sun's pixrect operations have specific optimizations for this
 * case, and the user could create more interesting patterns with the larger
 * area.
 */

#define HT_LEN			(16)
#define HT_LINEBYTES		(mpr_linebytes(HT_LEN, 1))
#define HT_SIZE			(HT_LEN * HT_LINEBYTES)

#define HT_CACHE_LEN		(HT_LEN * 2)
#define HT_CACHE_LINEBYTES	(mpr_linebytes(HT_CACHE_LEN, 1))
#define HT_CACHE_SIZE		(HT_CACHE_LEN * HT_CACHE_LINEBYTES)

int hCacheWId;			/* id of wordarray object in halftone cache */
int hCacheWVer;			/* version of wordarray in halftone cache */

char hAlignImage[HT_SIZE];
char hCacheImage[HT_CACHE_SIZE];

mpr_static(hAlignRect_pr, HT_LEN, HT_LEN, 1, hAlignImage);
mpr_static(hCacheRect_pr, HT_CACHE_LEN, HT_CACHE_LEN, 1, hCacheImage);

static struct pixrect *hAlignRect = &hAlignRect_pr;
static struct pixrect *hCacheRect = &hCacheRect_pr;

#define IN_HT_CACHE(obj)		\
	( (obj)->fp.id == hCacheWId	\
	  && INSTANCE_VARS(obj)[WordArrayVersionIndex] == hCacheWVer )

#define ALIGN_HT(dx, dy)		\
	pr_rop(hAlignRect, 0, 0, HT_LEN, HT_LEN, PIX_SRC,		\
	  hCacheRect, dx % HT_LEN, dy % HT_LEN )

#define SET_HT(dx, dy)		\
	if ( ! IN_HT_CACHE(hBits) )		\
	{		\
		hCacheWId = hBits->fp.id;		\
		hCacheWVer = INSTANCE_VARS(hBits)[WordArrayVersionIndex];\
		pr_replrop(hCacheRect, 0, 0, HT_CACHE_LEN, HT_CACHE_LEN,\
		  PIX_SRC, hRect, 0, 0);		\
	}

/*
 * scratch area for source AND halftone operations (mode 3 bitblt) ...
 *
 * note that this area only grows when necessary, and is never reduced. this
 * could present a problem when an inordinately large area is needed, but,
 * typically, we suspect nothing much larger than the screen is ever needed.
 * we certainly could arrange to have a reduction if the area ever exceeds a
 * threshold, but until such cases become apparent, we will not implement
 * this function.
 */

char *scrImage;

mpr_static(scrRect_pr, 0, 0, 0, NULL);

static struct pixrect *scrRect = &scrRect_pr;

static int scrx, scry, tscrw, tscrh, tscrsize;

#define SET_SCRATCH(dx, dy, dw, dh)	\
	scrx = dx % HT_LEN; scry = dy % HT_LEN;		\
	tscrw = MAX(CEIL(dw + scrx, HT_LEN), HT_CACHE_LEN);		\
	tscrh = MAX(CEIL(dh + scry, HT_LEN), HT_CACHE_LEN);		\
	if ( PR_WIDTH(scrRect)  != tscrw		\
	  || PR_HEIGHT(scrRect) != tscrh )		\
	{		\
		tscrsize = IMAGE_SIZE(tscrw, tscrh, PR_DEPTH(dRect));	\
		if ( tscrsize > MPR_SIZE(scrRect) )		\
		{		\
			if ( scrImage != NULL ) free(scrImage);		\
			scrImage = (char *) malloc(tscrsize);		\
		}		\
		MEM_POINT(scrRect, tscrw, tscrh, PR_DEPTH(dRect), scrImage);\
	}		\
	if ( PR_WIDTH(scrRect) <= HT_CACHE_LEN		\
	  && PR_HEIGHT(scrRect) <= HT_CACHE_LEN )		\
		pr_rop(scrRect, 0, 0, HT_CACHE_LEN, HT_CACHE_LEN,	\
		  PIX_SRC, hCacheRect, 0, 0);		\
	else		\
		pr_replrop(scrRect, 0, 0, PR_WIDTH(scrRect),		\
		  PR_HEIGHT(scrRect), PIX_SRC, hCacheRect, 0, 0);

/*
 * the four copyBits modes ...
 */

#define BLACK(op, dx, dy, dw, dh)		\
	pr_rop(dRect, dx, dy, dw, dh, op | PIX_COLOR(1), NULL, 0, 0);

#define HALFTONE(op, dx, dy, dw, dh)		\
	SET_HT(dx, dy);		\
	ALIGN_HT(dx, dy);		\
	pr_replrop(dRect, dx, dy, dw, dh, op, hAlignRect, 0, 0);

#define SOURCE(op, dx, dy, dw, dh, sx, sy)		\
	pr_rop(dRect, dx, dy, dw, dh, op, sRect, sx, sy);

#define SOURCE_AND_HALFTONE(op, dx, dy, dw, dh, sx, sy)		\
	SET_HT(dx, dy);		\
	SET_SCRATCH(dx, dy, dw, dh);		\
	pr_rop(scrRect, scrx, scry, dw, dh, PIX_SRC & PIX_DST,	\
	  sRect, sx, sy);		\
	pr_rop(dRect, dx, dy, dw, dh, op, scrRect, scrx, scry);

/*
 * mode test and execution of copyBits
 */
```

```
#define COPY_BITS(rule, dx, dy, w, h, sx, sy)     \
        if (sourceForm == NULL)                    \
                if (halftoneForm == NULL)          \
                        { BLACK(rule, dx, dy, w, h); }          \
                else                               \
                        { HALFTONE(rule, dx, dy, w, h); }       \
        else                                       \
                if (halftoneForm == NULL)          \
                        { SOURCE(rule, dx, dy, w, h, sx, sy); } \
                else                               \
                        { SOURCE_AND_HALFTONE(rule, dx, dy, w, h, sx, sy); }

setCopyBits(bb)
        object *bb;
{
        object *bits;
        int combinationRule;
        int words;
        int i;

        /*
         * get bitblt info ... note that we assume that all position, length
         * and width paramters of arguments in the bitblt operation are
         * non-negative.
         *
         * note also that we take advantage of knowing that the halftone
         * form is black in that we do not have to perform the source AND
         * halftone rop operation in this case.
         *
         * likewise, if the source form is black, we can perform the black
         * mode rop operation instead of any source mode operation.
         */

        destForm = (INSTANCE_VARS(bb)[DestFormIndex] != nIL)
          ? reserve_obj(INSTANCE_VARS(bb)[DestFormIndex],
          CUR_REGION, CUR_PID)
          : NULL;

        sourceForm = (!(INSTANCE_VARS(bb)[SourceFormIndex] == nIL
          || INSTANCE_VARS(bb)[SourceFormIndex] == FormBlackMask))
          ? reserve_obj(INSTANCE_VARS(bb)[SourceFormIndex],
          CUR_REGION, CUR_PID)
          : NULL;

        halftoneForm = (!(INSTANCE_VARS(bb)[HalftoneFormIndex] == nIL
          || INSTANCE_VARS(bb)[HalftoneFormIndex] == FormBlackMask))
          ? reserve_obj(INSTANCE_VARS(bb)[HalftoneFormIndex],
          CUR_REGION, CUR_PID)
          : NULL;

        combinationRule = INTEGER_VALUE(INSTANCE_VARS(bb)[CombinationRuleIndex]);

        if (combinationRule > 16)
                syserr("setCopyBits: invalid combination rule, (rule = %d)",
                  combinationRule);

        destX = integerValue(INSTANCE_VARS(bb)[DestXIndex]);
        destY = integerValue(INSTANCE_VARS(bb)[DestYIndex]);
        width = INTEGER_VALUE(INSTANCE_VARS(bb)[WidthIndex]);
        height = INTEGER_VALUE(INSTANCE_VARS(bb)[HeightIndex]);
        sourceX = integerValue(INSTANCE_VARS(bb)[SourceXIndex]);
        sourceY = integerValue(INSTANCE_VARS(bb)[SourceYIndex]);
        clipX = integerValue(INSTANCE_VARS(bb)[ClipXIndex]);
        clipY = integerValue(INSTANCE_VARS(bb)[ClipYIndex]);
        clipW = INTEGER_VALUE(INSTANCE_VARS(bb)[ClipWidthIndex]);
        clipH = INTEGER_VALUE(INSTANCE_VARS(bb)[ClipHeightIndex]);

        /*
         * get remaining parameters of forms ...
         */

        /*
         * destination ...
         *
         * note that we switch the destination pixrect to the sun display if the
         * destination form is the current display.  this results in the
         * destination form's bits never being updated while it is the
         * current display.  this saves us the duplicate rop operation for
         * the display form when updating the sun display.  it may turn out
         * to be a problem depending on assumptions about the display form in
         * various smalltalk classes ... we'll just wait and see.
         *
         * to make this situation more palatable, we could update the current
         * display form's bits when it is requested that a new form be the
         * current display, (via the beDisplay primitive). this amounts to
         * treating the sun display as the display form's bits during the
         * time that the display form is the current display, updating the
         * display form's bits at the point which that form is determined to
         * no longer be the current display.  again, we won't do this until
         * we see that it is a problem.
         */

        if (destForm == NULL)
                syserr("setCopyBits: no destination form!");

        destW = INTEGER_VALUE(INSTANCE_VARS(destForm)[FormWidthIndex]);
        destH = INTEGER_VALUE(INSTANCE_VARS(destForm)[FormHeightIndex]);
        destD = (INSTANCE_VARS(destForm)[FormDepthIndex] != nIL)
          ? INTEGER_VALUE(INSTANCE_VARS(destForm)[FormDepthIndex])
          : 1 ;

        if (!(destD == 1 || destD == 8))
                syserr("setCopyBits: destination depth must be 1 or 8 (depth=%d)", destD)

        dBits = reserve_obj(INSTANCE_VARS(destForm)[FormBitsIndex], CUR_REGION, CUR_PID);

        if (dBits == NULL)
                syserr("setCopyBits: destination form has no bits!");

        if (destForm->fp.id == currentDisplay)
        {
                dRect = displayRect;
        }
        else
        {
                MEM_POINT(dRect, destW, destH, destD, WORDARRAY_DATA(dBits));
        }

        /*
         * source ...
         *
         * note we switch the source pixrect to the sun display if the source
         * form is the current display, (as with the destination form).
         *
         * also, if the source pixrect is > 1-bit deep and the destination
         * pixrect is not large enough to accomodate the greater depth data,
         * we silently grow the destination form's bits (if it isn't the
```

```
 * actual screen device), so it can hold the greater amount of data.
 *
 * typically this case occurs when a menu is being placed on the
 * display, or when a window is being moved around.  in these
 * cases, smalltalk code causes the current display data in the
 * affected area to be copied into a temporary form (see PopUpMenu
 * displayAt:during:), and restored when the menu or window movement
 * action is completed.  unfortunately, the smalltalk code assumes
 * that every form is 1-bit deep, creating the condition of copying
 * from n-bit to 1-bit deep pixrects ... an unsupported operation in
 * sun's rop code.  the temporary form is therefore filled with junk
 * when read from the screen and junk is subsequently displayed on
 * the screen when the affected area is restored.  our silent growing
 * of the destination form's bits avoids this problem.
 */

if (sourceForm != NULL)
{
        sourceW = INTEGER_VALUE(INSTANCE_VARS(sourceForm)[FormWidthIndex]);
        sourceH = INTEGER_VALUE(INSTANCE_VARS(sourceForm)[FormHeightIndex]);
        sourceD = (INSTANCE_VARS(sourceForm)[FormDepthIndex] != nIL)
          ? INTEGER_VALUE(INSTANCE_VARS(sourceForm)[FormDepthIndex])
          : 1 ;

        if (!(sourceD == 1 || sourceD == 8))
                syserr("setCopyBits: source depth must be 1 or 8 (depth=%d)", sou

        sBits = reserve_obj(INSTANCE_VARS(sourceForm)[FormBitsIndex],
          CUR_REGION, CUR_PID);

        if (sBits == NULL)
                syserr("setCopyBits: source form has no bits!");

        if (sourceD > destD && destForm->fp.id != currentDisplay)
        {
                /*
                 * need to grow destination form's bits
                 */

                words = IMAGE_SIZE(destW, destH, sourceD) / 2;

                i = SLOTS_FOR_WORDS(words);

                bits = OM_NEW(WordArray, i);
                INSTANCE_VARS(bits)[WordArraySizeIndex] =
                  INTEGER_OBJECT(words);
                INSTANCE_VARS(bits)[WordArrayVersionIndex] = -1;

                dBits = become(dBits, bits, 0);

                destD = sourceD;
                INSTANCE_VARS(destForm)[FormDepthIndex] =
                  INTEGER_OBJECT(sourceD);

                UPDATE(destForm);

                MEM_POINT(dRect, destW, destH, destD,
                  WORDARRAY_DATA(dBits));
        }

        if (sourceForm->fp.id == currentDisplay)
        {
                sRect = displayRect;
        }
        else
        {
                MEM_POINT(sRect, sourceW, sourceH, sourceD,
                  WORDARRAY_DATA(sBits));
        }
}

/*
 * halftone ...
 */

if (halftoneForm != NULL)
{
        halftoneW = INTEGER_VALUE(INSTANCE_VARS(halftoneForm)[FormWidthIndex]);
        halftoneH = INTEGER_VALUE(INSTANCE_VARS(halftoneForm)[FormHeightIndex]);
        halftoneD = (INSTANCE_VARS(halftoneForm)[FormDepthIndex] != nIL)
          ? INTEGER_VALUE(INSTANCE_VARS(halftoneForm)[FormDepthIndex])
          : 1 ;

        if (!(halftoneD == 1))
                syserr("setCopyBits: halftone depth must be 1 (depth=%d)", halfto

        if (halftoneW != HT_LEN || halftoneH != HT_LEN)
                syserr("setCopyBits: halftone form is not %dx%d (%dx%d)", HT_LEN,

        hBits = reserve_obj(INSTANCE_VARS(halftoneForm)[FormBitsIndex],
          CUR_REGION, CUR_PID);

        if (hBits == NULL)
                syserr("setCopyBits: halftone form has no bits!");

        MEM_POINT(hRect, halftoneW, halftoneH, halftoneD, WORDARRAY_DATA(hBits));
}

/*
 * translate combinationRule to pixrect operation ...
 *
 * handle special cases for 'paint' combination rule (16), since
 * we don't handle it in general yet.
 */

if (combinationRule == 16)
{
        combinationRule = 3;
#if 0
        if (halftoneForm != NULL)
                fprintf(stderr, "setCopyBits: can't do generalized 'paint' combin
#endif
}

rule = pixrect_rule(combinationRule);

return;
}

copyBits()
{
        register int sx, sy, dx, dy, w, h;
        register int restoreCursor;

        /*
         * see Smalltalk-80 The Language and its Implementation, (Goldberg,
         * et. al.), page 356 for a description of the following
         * determination of rop parameters.
```

```
 *
 * it appears that this determination involves a minimal number of
 * operations.
 */

/*
 * x dimension ...
 */

if (destX > clipX)
        sx = sourceX, dx = destX, w = width;
else
        sx = sourceX + (clipX - destX), dx = clipX, w = width - (clipX - destX);

if ((destX + width) > (clipX + clipW))
        w = w - ((destX + w) - (clipX + clipW));

/*
 * y dimension ...
 */

if (destY > clipY)
        sy = sourceY, dy = destY, h = height;
else
        sy = sourceY + (clipY - destY), dy = clipY, h = height - (clipY - destY);

if ((destY + height) > (clipY + clipH))
        h = h - ((destY + h) - (clipY + clipH));

/*
 * account for source form ... (if we have one!)
 */

if (sourceForm != NULL)
{
        /*
         * x dimension ...
         */

        if (sx < 0)
                dx = dx - sx, w = w + sx, sx = 0;

        if ((sx + w) > sourceW)
                w = w - (sx + w - sourceW);

        /*
         * y dimension ...
         */

        if (sy < 0)
                dy = dy - sy, h = h + sy, sy = 0;

        if ((sy + h) > sourceH)
                h = h - (sy + h - sourceH);
}

/*
 * anything left ?!
 */

if (w == 0 || h == 0)
        return;
```

```
        /*
         * if the bitblt operation involves the current display and the
         * cursor is in the affected area, we must turn the cursor off during
         * the operation so the bitblt operation doesn't pick up traces of
         * it, (i.e., conceptually, the cursor isn't really there anyway so
         * we gotta get rid of it!).
         */

        if (restoreCursor =
          ((destForm->fp.id == currentDisplay
            && CURSOR_IN_AREA(dx, dy, w, h))
          || (sourceForm != NULL && sourceForm->fp.id == currentDisplay
            && CURSOR_IN_AREA(sx, sy, w, h))))
        {
                CURSOR_OFF;
        }

        /*
         * now we're ready to do the job ...
         */

        COPY_BITS(rule, dx, dy, w, h, sx, sy);

        /*
         * turn the cursor back on if it was in the bitblt operation area.
         */

        if (restoreCursor)
                CURSOR_ON;

        /*
         * note that we try to avoid writing out the display object ...
         */

        if (destForm->fp.id != currentDisplay)
                UPDATE(dBits);

        /*
         * all done!
         */

        return;
}

/*
 * graphics primitives
 */

/*
 * <primitive 126 self> -- copyBits
 */

oop
prim_126()
{
        object *bb;

        bb = GET_RCVR(PRIMARG(0));

        /*
         * argument checking
         */

        if (bb == NULL)
```

```
		sysErr("prim_126: couldn't fetch bb (oop = %d)",
		  bb->fp.id);

	if (!(bb->fp.class == BitBlt || in_super_chain(bb->fp.class,
	      BitBlt, CUR_REGION, CUR_PID)))
		sysErr("prim_126: bb is not a kind of BitBlt (oop = %d)",
		  bb->fp.id);

	/*
	 * extract remaining parameters from the BitBlt object perform the
	 * operation.
	 */

	setCopyBits(bb);

	copyBits();

	return;
}

/*
 * <primitive 127 self> -- beDisplay
 */

oop
prim_127()
{
	object *self;
	int width, height;

	self = GET_RCVR(PRIMARG(0));

	/*
	 * argument checking
	 */

	if (self == NULL)
		sysErr("prim_127: couldn't fetch self (oop = %d)", PRIMARG(1));

	if (!(self->fp.class == DisplayScreen ||
	    in_super_chain(self->fp.class, DisplayScreen, CUR_REGION, CUR_PID)))
		sysErr("prim_127: self is not a kind of DisplayScreen (oop = %d)",
		  self->fp.id);

	/*
	 * set the current display and bitblt the new stuff to the screen
	 */

	currentDisplay = self->fp.id;

	width = INTEGER_VALUE(INSTANCE_VARS(self)[FormWidthIndex]);
	height = INTEGER_VALUE(INSTANCE_VARS(self)[FormHeightIndex]);

	sBits = get_obj(INSTANCE_VARS(self)[FormBitsIndex],
	  CUR_REGION, CUR_PID);

	if (sBits == NULL)
		sysErr("prim_127: form has no bits!");

	MEM_POINT(sRect, width, height, 1, WORDARRAY_DATA(sBits));

	pr_rop(displayRect, 0, 0, width, height, PIX_SRC, sRect, 0, 0);

	return;
}

/*
 * <primitive 128 self xDelta yDelta> -- drawLoopXY
 */

oop
prim_128()
{
	object *bb;
	int xDelta, yDelta;
	register int i, p, px, py, delx, dely;
	int restoreCursor;
	int color;

	bb = GET_RCVR(PRIMARG(0));

	/*
	 * argument checking
	 */

	if (bb == NULL)
		sysErr("prim_128: couldn't fetch bb (oop = %d)", PRIMARG(0));

	if (!(bb->fp.class == BitBlt || in_super_chain(bb->fp.class,
	      BitBlt, CUR_REGION, CUR_PID)))
		sysErr("prim_128: bb is not a kind of BitBlt (oop = %d)",
		  bb->fp.id);

	xDelta = integerValue(PRIMARG(1));
	yDelta = integerValue(PRIMARG(2));

	setCopyBits(bb);

	/*
	 * if we are drawing a 1x1 line with either black or no halftone,
	 * (detected in setCopyBits()), we can use sun's vector routines
	 * to draw the line, saving up to 50% of the time required if we
	 * were to do the more general operation ourselves using rop's.
	 *
	 * note that this is the one case where we must instruct sun's
	 * routines to do clipping, to the limits of the pixrect itself,
	 * to avoid overwriting memory!
	 */

	if (width == 1 && height == 1 && halftoneForm == NULL)
	{
		/*
		 * single pixel form as source ... use sun's device dependent
		 * vector routine
		 */

		/*
		 * get rid of the cursor if it is in the way ...
		 */

		if (restoreCursor = (destForm->fp.id == currentDisplay
		  && CURSOR_IN_AREA(MIN(destX, destX+xDelta),
		  MIN(destY, destY+yDelta), ABS(xDelta), ABS(yDelta))))
			CURSOR_OFF;

		color = (sourceForm != NULL) ? pr_get(sRect, 1, 1) : 1 ;

		pr_vector(dRect, destX, destY, destX + xDelta, destY + yDelta,
```

```
        (rule & ~PIX_DONTCLIP) | PIX_COLOR(color), 0);

        /*
         * restore the cursor, if indicated ...
         */

        if (restoreCursor)
                CURSOR_ON;
}
else
{
        /*
         * general form as source ... draw using the Bresenham
         * algorithm
         */

        delx = SIGN(xDelta);
        dely = SIGN(yDelta);
        px = ABS(yDelta);
        py = ABS(xDelta);

        copyBits();

        if (py > px)
        {
                p = py >> 1;    /* py / 2 */

                for (i = 0; i < py; i++)
                {
                        destX = destX + delx;
                        p = p - px;

                        if (p < 0)
                        {
                                destY = destY + dely;
                                p = p + py;
                        }

                        copyBits();
                }
        }
        else
        {
                p = px >> 1;    /* px / 2 */

                for (i = 0; i < px; i++)
                {
                        destY = destY + dely;
                        p = p - py;

                        if (p < 0)
                        {
                                destX = destX + delx;
                                p = p + px;
                        }

                        copyBits();
                }
        }
}

/*
 * should we update destX and destY of the object at this point?!
 * (ideally yes, i suppose)
 */

        return;
}

#if 0

/*
 * <primitive 129 self fontFileName> -- initialize font from file
 * (fromStrike)
 *
 * xfont version.
 */

#include "xfontfile.h"

#define MAXPATHLEN              1024

#define XTABLE_SIZE             258

#define FONT_DIR                "/users/ktalk/fonts/"
#define SPACE_CHAR              0x20

static unsigned short xfMagic;
static XFONTFILE_HEADER xfHeader;

static char *xfCharImage;

mpr_static(xfCharRect_pr, 0, 0, 0, NULL);
mpr_static(strikeRect_pr, 0, 0, 0, NULL);

static struct pixrect *xfCharRect = &xfCharRect_pr;
static struct pixrect *strikeRect = &strikeRect_pr;

static char xfFilePath[MAXPATHLEN];
static int xfFile;

oop
prim_129()
{
        object *self, *fontName;
        object *offset, *glyphs, *bits, *sF, *xTable, *stopConditions;
        register int i, w, h, x, y;
        int strikeWidth, strikeHeight;
        int maxWidth, maxHeight, maxAscent, maxDescent;
        int no_index_vars;
        int words;

        self = GET_RCVR(PRIMARG(0));

        fontName = get_obj(PRIMARG(1),
          CUR_REGION, CUR_PID);

        /*
         * argument checking
         */

        if (self == NULL)
                syserr("prim_129: couldn't fetch self (oop = %d)", PRIMARG(0));

        if (fontName == NULL)
                syserr("prim_129: couldn't fetch fontName (oop = %d)", PRIMARG(1));

        if (!(self->fp.class == StrikeFont
```

```
    || in_super_chain(self->fp.class, StrikeFont, CUR_REGION, CUR_PID)))
        syserr("prim_129: self is not a kind of StrikeFont (oop = %d)", self->fp.

if (!(fontName->fp.class == String ||
    in_super_chain(fontName->fp.class, String, CUR_REGION, CUR_PID)))
        syserr("prim_129: fontName is not a kind of String (oop = %d)", fontName-

/*
 * open the xfont file and get the header & glyphs. note that we skip
 * kerning pairs for now.
 */

strcpy(xfFilePath, FONT_DIR);
strcat(xfFilePath, BYTEARRAY_DATA(fontName));

if ((xfFile = open(xfFilePath, O_RDONLY, 0)) == -1)
        syserr("prim_129: couldn't open '%s'", xfFilePath);

read(xfFile, &xfMagic, sizeof(xfMagic));

if (xfMagic != XFONTMAGIC)
        syserr("prim_129: '%s' not an xfont file", BYTEARRAY_DATA(fontName));

read(xfFile, &xfHeader, sizeof(xfHeader));

if (xfHeader.kerning.number_of_pairs > 0)
        lseek(xfFile, xfHeader.kerning.number_of_pairs *
          sizeof(FONT_KERNING_PAIR), 1);

/*
 * make a quick pass through the font characters to find the total
 * width of the strike, (and some other useful info) ...
 *
 * note that the origin of xfont characters is on the baseline, and the
 * x-axis is positive to the right, while the y-axis is positive
 * down.  the home element of an xfont character describes the
 * location of the top left corner of the glyph relative to this
 * imaginary origin, (hence, home.y is usually negative).
 *
 * see the NB: in the comments below for reasons why we are avoiding
 * some font metric information in xfont characters for now.
 *
 * since the xfont metric info is not quite accurate, we are adding our
 * own intercharacter spacing, (right side bearing), of one pixel.
 *
 * finally, note that we handle the space character as a special case
 * since there is no glyph for it in xfonts.  this case should be
 * eliminated when xfont metric information is reliable.
 */

strikeWidth = 0;
maxWidth = 0;
maxAscent = 0;
maxDescent = 0;

for (i = 0; i < MAX_FONT_CHARS; i++)
{
        if (xfHeader.font_char[i].bitmap.nwords != 0)
        {
                strikeWidth +=
                  xfHeader.font_char[i].bitmap.width + 1;
                maxWidth = MAX(maxWidth,
                  xfHeader.font_char[i].bitmap.width + 1);
                maxAscent = MAX(maxAscent,
                  SP_TO_PIXELS(-xfHeader.font_char[i].home.y));
                maxDescent = MAX(maxDescent,
                  SP_TO_PIXELS(PIXELS_TO_SP(
                     xfHeader.font_char[i].bitmap.height) -
                    (-xfHeader.font_char[i].home.y)));
        }
        else if (i == SPACE_CHAR)
        {
                strikeWidth +=
                  SP_TO_PIXELS(xfHeader.font_char[i].width.x) + 1;
                maxWidth = MAX(maxWidth,
                  SP_TO_PIXELS(xfHeader.font_char[i].width.x) + 1);
        }
}

strikeHeight = maxHeight = maxAscent + maxDescent;

/*
 * build the strikeFont (sF) instance ... (labor intensive!)
 */

/*
 * instantiate sub-part objects ...
 */

offset = OM_NEW(Point, 0);

glyphs = OM_NEW(Form, 0);

words = IMAGE_SIZE(strikeWidth, strikeHeight, 1) / 2;

no_index_vars = SLOTS_FOR_WORDS(words);

bits = OM_NEW(WordArray, no_index_vars);
INSTANCE_VARS(bits)[WordArraySizeIndex] = INTEGER_OBJECT(words);
INSTANCE_VARS(bits)[WordArrayVersionIndex] = -1;

sF = OM_NEW(PRIMARG(0), 0);

xTable = OM_NEW(Array, XTABLE_SIZE);

stopConditions = OM_NEW(Array, XTABLE_SIZE);

/*
 * build the aggregate ...
 */

INSTANCE_VARS(offset)[PointXIndex] = INTEGER_OBJECT(0);
INSTANCE_VARS(offset)[PointYIndex] = INTEGER_OBJECT(0);

INSTANCE_VARS(glyphs)[FormWidthIndex] = INTEGER_OBJECT(strikeWidth);
INSTANCE_VARS(glyphs)[FormHeightIndex] = INTEGER_OBJECT(strikeHeight);
INSTANCE_VARS(glyphs)[FormDepthIndex] = INTEGER_OBJECT(1);
INSTANCE_VARS(glyphs)[FormBitsIndex] = bits->fp.id;
INSTANCE_VARS(glyphs)[FormOffsetIndex] = offset->fp.id;

INSTANCE_VARS(sF)[SFXTableIndex] = xTable->fp.id;
INSTANCE_VARS(sF)[SFGlyphsIndex] = glyphs->fp.id;
INSTANCE_VARS(sF)[SFNameIndex] = fontName->fp.id;
INSTANCE_VARS(sF)[SFStopConditionsIndex] = stopConditions->fp.id;
INSTANCE_VARS(sF)[SFTypeIndex] = nil;
INSTANCE_VARS(sF)[SFMinAsciiIndex] = INTEGER_OBJECT(0);
INSTANCE_VARS(sF)[SFMaxAsciiIndex] = INTEGER_OBJECT(255);
INSTANCE_VARS(sF)[SFMaxWidthIndex] = INTEGER_OBJECT(maxWidth);
```

```
INSTANCE_VARS(sF)[SFStrikeLengthIndex] = nIL;
INSTANCE_VARS(sF)[SFAscentIndex] = INTEGER_OBJECT(maxAscent);
INSTANCE_VARS(sF)[SFDescentIndex] = INTEGER_OBJECT(maxDescent);
INSTANCE_VARS(sF)[SFXOffsetIndex] = nIL;
INSTANCE_VARS(sF)[SFRasterIndex] = INTEGER_OBJECT(0);
INSTANCE_VARS(sF)[SFSubscriptIndex] = INTEGER_OBJECT(maxAscent / 2);
INSTANCE_VARS(sF)[SFSuperscriptIndex] = INTEGER_OBJECT(maxDescent / 2);
INSTANCE_VARS(sF)[SFEmphasisIndex] = INTEGER_OBJECT(0);

/*
 * tip off garbage collection ...
 */

referenced(sF, bits->fp.id, nIL, CUR_REGION, CUR_PID);
referenced(sF, offset->fp.id, nIL, CUR_REGION, CUR_PID);
referenced(sF, xTable->fp.id, nIL, CUR_REGION, CUR_PID);
referenced(sF, glyphs->fp.id, nIL, CUR_REGION, CUR_PID);
referenced(sF, fontName->fp.id, nIL, CUR_REGION, CUR_PID);
referenced(sF, stopConditions->fp.id, nIL, CUR_REGION, CUR_PID);

/*
 * set up the character staging area ...
 */

xfCharImage = (char *) malloc(IMAGE_SIZE(maxWidth, maxHeight, 1));

/*
 * set up the strike pixrect and clear it to white ...
 */

MEM_POINT(strikeRect, strikeWidth, strikeHeight, 1,
  WORDARRAY_DATA(bits));
PR_CLEAR(strikeRect);

/*
 * now, read the glyphs and make the strike ...
 *
 * note that we are not guaranteed that all the font glyphs will have
 * the same height or vertical baseline positions. some glyphs may
 * even have a horizontal adjustment to be made, (left side bearing),
 * for the character's origin.
 *
 * we must be careful to place each character in the final strike such
 * that these adjustments are taken into account, i.e., baselines are
 * aligned and left side bearing adjusted. we do this by adjusting
 * the final destination in the strike before performing the rop
 * operation from the staging area to the strike.
 *
 * NB: actually, we're finding number of characters which have a
 * negative left side bearing in a font which also contains
 * characters whose width does not include a right side bearing,
 * (xfonts don't explicitly represent right side bearings, and only
 * implicitly represent left side bearings in the 'home' element of
 * the XFONTFILE_CHAR structure). this is incompatible with the idea
 * of using a strike since it can cause overlap in character bounding
 * boxes. this issue may really be that of fouled up metrics in the
 * xfont files. so, for now, we are getting around the problem by
 * ignoring scaled points width and left side bearing info, and
 * instead are simply adding a one pixel space after each glyph.
 *
 * as mentioned previously, we handle the space character as a special
 * case since there is no glyph for it in xfonts. this case should
 * be eliminated when xfont metric information is reliable.
 */

x = 0;

for (i = 0; i < MAX_FONT_CHARS; i++)
{
        ARRAY_DATA(xTable)[i] = INTEGER_OBJECT(x);

        if (xfHeader.font_char[i].bitmap.nwords != 0)
        {

                /*
                 * got a glyph!
                 */

                w = xfHeader.font_char[i].bitmap.width;
                h = xfHeader.font_char[i].bitmap.height;
                y = SP_TO_PIXELS(PIXELS_TO_SP(maxAscent) -
                  (-xfHeader.font_char[i].home.y));

                /*
                 * read the glyph into the staging area ...
                 */

                MEM_POINT(xfCharRect, w, h, 1, xfCharImage);

                PR_CLEAR(xfCharRect);

                read(xfFile, xfCharImage,
                  xfHeader.font_char[i].bitmap.nwords * sizeof(short));

                /*
                 * and rop it to the strike.
                 */

                pr_rop(strikeRect, x, y, w, h, PIX_SRC,
                  xfCharRect, 0, 0);

                x += xfHeader.font_char[i].bitmap.width + 1;
        }
        else if (i == SPACE_CHAR)
        {
                x += SP_TO_PIXELS(xfHeader.font_char[i].width.x) + 1;
        }
}

/*
 * finish initializing xTable ...
 */

for (i = MAX_FONT_CHARS; i < XTABLE_SIZE; i++)
        ARRAY_DATA(xTable)[i] = INTEGER_OBJECT(x);

/*
 * cleanup ...
 */

free(xfCharImage);

close(xfFile);

check_garbage(sF->fp.id);
return (sF->fp.id);
}
#endif
```

```
#if 1

/*
 * <primitive 129 self fontFileName> -- initialize font from file
 * (fromStrike)
 *
 * vfont version ... unused for now ... may come back some day.
 */

#define VF_DISPATCH_SIZE        ( sizeof(struct dispatch) * NUM_DISPATCH )
#define MAXPATHLEN              1024
#define FONT_DIR                "/users/ktalk/fonts/"

static struct header vfHeader;
static struct dispatch *vfDispatch;
static char *vfGlyphs;

static char *vfCharImage;

mpr_static(vfCharRect_pr, 0, 0, 0, NULL);
mpr_static(strikeRect_pr, 0, 0, 0, NULL);

static struct pixrect *vfCharRect = &vfCharRect_pr;
static struct pixrect *strikeRect = &strikeRect_pr;

static char vfFilePath[MAXPATHLEN];
static int vfFile;

oop
prim_129()
{
        object *self, *fontName;
        object *offset, *glyphs, *bits, *sF, *xTable, *stopConditions;
        register int i, j, k, w, h, x, y;
        register char *p1, *p2;
        int strikeWidth, strikeHeight;
        int maxAscent, maxDescent;
        int maxWidth, maxHeight;
        int ic;
        int no_index_vars;
        int words;

        self = GET_RCVR(PRIMARG(0));

        fontName = get_obj(PRIMARG(1), CUR_REGION, CUR_PID);

        /*
         * argument checking
         */

        if (self == NULL)
                syserr("prim_129: couldn't fetch self (oop = %d)", PRIMARG(0));

        if (fontName == NULL)
                syserr("prim_129: couldn't fetch fontName (oop = %d)", PRIMARG(1));

        if (!(self->fp.class == StrikeFont ||
            in_super_chain(self->fp.class, StrikeFont, CUR_REGION, CUR_PID)))
                syserr("prim_129: self is not a kind of StrikeFont (oop = %d)", self->fp.

        if (!(fontName->fp.class == String ||
            in_super_chain(fontName->fp.class, String, CUR_REGION, CUR_PID)))
                syserr("prim_129: fontName is not a kind of String (oop = %d)", fontName-

        /*
         * open the vfont file and get the header, dispatch structures, and
         * glyphs ...
         */

        strcpy(vfFilePath, FONT_DIR);
        strcat(vfFilePath, BYTEARRAY_DATA(fontName));

        if ((vfFile = open(vfFilePath, O_RDONLY, 0)) == -1)
                syserr("prim_129: couldn't open '%s'", vfFilePath);

        if (read(vfFile, &vfHeader, sizeof(vfHeader)) != sizeof(vfHeader))
                syserr("prim_129: couldn't read vfont header from '%s'", BYTEARRAY_DATA(f

        if (vfHeader.magic != VFONT_MAGIC)
                syserr("prim_129: bad vfont header magic number from '%s'", BYTEARRAY_DAT

        vfDispatch = (struct dispatch *) malloc(VF_DISPATCH_SIZE);

        if (read(vfFile, vfDispatch, VF_DISPATCH_SIZE) != VF_DISPATCH_SIZE)
                syserr("prim_129: couldn't read dispatch structures from '%s'", BYTEARRAY

        vfGlyphs = (char *) malloc(vfHeader.size);

        if (read(vfFile, vfGlyphs, vfHeader.size) != vfHeader.size)
                syserr("prim_129: couldn't read glyphs from '%s'", BYTEARRAY_DATA(fontNam

        close(vfFile);

        /*
         * make a quick pass through the dispatch structures to find the
         * total width of the strike, (and some other useful info) ...
         *
         * we are adding our own intercharacter spacing, (right side bearing),
         * of 1/10 the width of the letter 'M', (minimum 1 pixel), since the
         * vfont information does not indicate this.
         *
         * note that we handle the space character as a special case
         * since there it is only a single pixel wide glyph in the vfonts.
         * traditionally, the size of the space character would be 1/3 of
         * an Em, where an Em is typically equal to the point size of the
         * font, (and usually the width of the letter 'M').
         */

        strikeWidth = 0;
        maxWidth = 0;
        maxAscent = 0;
        maxDescent = 0;

        ic = ( vfDispatch['M'].left + vfDispatch['M'].right ) / 10;
        if ( ic == 0 ) ic = 1;

        for (i = 0; i < NUM_DISPATCH; i++)
        {
                if (i == ' ')
                {
                        w = (vfDispatch['M'].left + vfDispatch['M'].right
                          + ic) / 3;
                        strikeWidth += w;
                        maxWidth = MAX(maxWidth, w);
                }
                else if (vfDispatch[i].nbytes != 0)
```

```
		{
			w = vfDispatch[i].left + vfDispatch[i].right + ic;
			strikeWidth += w;
			maxWidth = MAX(maxWidth, w);
			maxAscent = MAX(maxAscent, vfDispatch[i].up);
			maxDescent = MAX(maxDescent, vfDispatch[i].down);
		}
	}

	strikeHeight = maxHeight = maxAscent + maxDescent;

	/*
	 * build the strikeFont (sF) instance ... (labor intensive!)
	 */

	/*
	 * instantiate sub-part objects ...
	 */

	offset = OM_NEW(Point, 0);

	glyphs = OM_NEW(Form, 0);

	words = IMAGE_SIZE(strikeWidth, strikeHeight, 1) / 2;

	no_index_vars = SLOTS_FOR_WORDS(words);

	bits = OM_NEW(WordArray, no_index_vars);
	INSTANCE_VARS(bits)[WordArraySizeIndex] = INTEGER_OBJECT(words);
	INSTANCE_VARS(bits)[WordArrayVersionIndex] = -1;

	sF = OM_NEW(PRIMARG(0), 0);

	xTable = OM_NEW(Array, 258);

	stopConditions = OM_NEW(Array, 258);

	/*
	 * build the aggregate ...
	 */

	INSTANCE_VARS(offset)[PointXIndex] = INTEGER_OBJECT(0);
	INSTANCE_VARS(offset)[PointYIndex] = INTEGER_OBJECT(0);

	INSTANCE_VARS(glyphs)[FormWidthIndex] = INTEGER_OBJECT(strikeWidth);
	INSTANCE_VARS(glyphs)[FormHeightIndex] = INTEGER_OBJECT(strikeHeight);
	INSTANCE_VARS(glyphs)[FormDepthIndex] = INTEGER_OBJECT(1);
	INSTANCE_VARS(glyphs)[FormBitsIndex] = bits->fp.id;
	INSTANCE_VARS(glyphs)[FormOffsetIndex] = offset->fp.id;

	INSTANCE_VARS(sF)[SFXTableIndex] = xTable->fp.id;
	INSTANCE_VARS(sF)[SFGlyphsIndex] = glyphs->fp.id;
	INSTANCE_VARS(sF)[SFNameIndex] = fontName->fp.id;
	INSTANCE_VARS(sF)[SFStopConditionsIndex] = stopConditions->fp.id;
	INSTANCE_VARS(sF)[SFTypeIndex] = nIL;
	INSTANCE_VARS(sF)[SFMinAsciiIndex] = INTEGER_OBJECT(0);
	INSTANCE_VARS(sF)[SFMaxAsciiIndex] = INTEGER_OBJECT(255);
	INSTANCE_VARS(sF)[SFMaxWidthIndex] = INTEGER_OBJECT(maxWidth);
	INSTANCE_VARS(sF)[SFStrikeLengthIndex] = nIL;
	INSTANCE_VARS(sF)[SFAscentIndex] = INTEGER_OBJECT(maxAscent);
	INSTANCE_VARS(sF)[SFDescentIndex] = INTEGER_OBJECT(maxDescent);
	INSTANCE_VARS(sF)[SFXOffsetIndex] = nIL;
	INSTANCE_VARS(sF)[SFRasterIndex] = INTEGER_OBJECT(0);
	INSTANCE_VARS(sF)[SFSubscriptIndex] = INTEGER_OBJECT(maxAscent / 2);
	INSTANCE_VARS(sF)[SFSuperscriptIndex] = INTEGER_OBJECT(maxDescent / 2);
	INSTANCE_VARS(sF)[SFEmphasisIndex] = INTEGER_OBJECT(0);

	/*
	 * tip off garbage collection ...
	 */

	referenced(sF, bits->fp.id, nIL, CUR_REGION, CUR_PID);
	referenced(sF, offset->fp.id, nIL, CUR_REGION, CUR_PID);
	referenced(sF, xTable->fp.id, nIL, CUR_REGION, CUR_PID);
	referenced(sF, glyphs->fp.id, nIL, CUR_REGION, CUR_PID);
	referenced(sF, fontName->fp.id, nIL, CUR_REGION, CUR_PID);
	referenced(sF, stopConditions->fp.id, nIL, CUR_REGION, CUR_PID);

	/*
	 * set up the character staging area ...
	 */

	vfCharImage = (char *) malloc(IMAGE_SIZE(maxWidth, maxHeight, 1));
	MEM_POINT(vfCharRect, maxWidth, maxHeight, 1, vfCharImage);

	/*
	 * set up the strike pixrect and clear it to white ...
	 */

	MEM_POINT(strikeRect, strikeWidth, strikeHeight, 1,
	  WORDARRAY_DATA(bits));
	PR_CLEAR(strikeRect);

	/*
	 * now, read the glyphs and make the strike ...
	 *
	 * note that vfont glyphs are a touch awkward since they are rounded to
	 * the nearest byte in width, whereas pixrects are rounded to the
	 * nearest word, (see mpr_linebytes).
	 *
	 * note also that we are not guaranteed that all the font glyphs will
	 * have the same height or even vertical baseline positions. we must
	 * be careful to place each character in the final strike such that
	 * the baselines are aligned.  we do this by adjusting the vertical
	 * destination in the strike before performing the rop operation from
	 * the staging area to the strike.
	 */

	x = 0;

	for (i = 0; i < NUM_DISPATCH; i++)
	{
		ARRAY_DATA(xTable)[i] = INTEGER_OBJECT(x);

		if (i == ' ')
		{
			x += (vfDispatch['M'].left + vfDispatch['M'].right
			  + ic) / 3;
		}
		else if (vfDispatch[i].nbytes != 0)
		{

			/*
			 * got a glyph!
			 */

			w = vfDispatch[i].left + vfDispatch[i].right;
			h = vfDispatch[i].up + vfDispatch[i].down;
```

```
                y = (maxAscent - vfDispatch[i].up);

                /*
                 * copy the glyph to the staging area ...
                 */

                PR_CLEAR(vfCharRect);

                p1 = (char *) (vfGlyphs + vfDispatch[i].addr);

                for (j = 0; j < h; j++)
                {

                        /*
                         * set p2 to the start of the next row in the
                         * staging area, (remember, rows in the
                         * staging area begin may be wider than rows
                         * in a particular glyph).
                         */

                        p2 = (char *) MPR_IMAGE(vfCharRect) +
                          j * MPR_LINEBYTES(vfCharRect);

                        /*
                         * copy the row ...
                         */

                        for (k = 0; k <= (w - 1) / 8; k++)
                                *p2++ = *p1++;
                }

                /*
                 * and rop it to the strike.
                 */

                pr_rop(strikeRect, x, y, w, h, PIX_SRC,
                  vfCharRect, 0, 0);

                x += w + ic;
            }
        }

        /*
         * cleanup ...
         */

        free(vfCharImage);
        free(vfGlyphs);
        free(vfDispatch);

        check_garbage(sF->fp.id);
        return (sF->fp.id);
}

#endif

/*
 * <primitive 130 self> -- scanWord
 */

oop
prim_130()
{
        register object *sourceString;
        register object *stops;
        register object *xTable;
        register object *self;
        register int charIndex;
        register int lastIndex;
        register int stopIndex;
        register int nextDestX;
        register int rightX;
        register oop display;
        oop ret;
        int startIndex;

        self = GET_RCVR(PRIMARG(0));

        startIndex = INTEGER_VALUE(PRIMARG(1));

        stopIndex = INTEGER_VALUE(PRIMARG(2));

        sourceString = reserve_obj(PRIMARG(3), CUR_REGION, CUR_PID);

        rightX = INTEGER_VALUE(PRIMARG(4));

        stops = reserve_obj(PRIMARG(5), CUR_REGION, CUR_PID);

        display = PRIMARG(6);

        xTable = reserve_obj(INSTANCE_VARS(self)[CSXTableIndex],
          CUR_REGION, CUR_PID);

        /*
         * we must have destX from the BitBlt portion of ourself since we may
         * have to update it, or use it for copyBits operations.
         *
         * setCopyBits() would extract destX, but we want to avoid the rest of
         * the overhead of extracting all info from the BitBlt necessary for
         * copyBits operations if we are not actually going to do them.
         */

        destX = IntegerValue(INSTANCE_VARS(self)[DestXIndex]);

        /*
         * argument checking
         */

        if (self == NULL)
                syserr("prim_130: couldn't fetch self (oop = %d)", self);

        if (!((self->fp.class == CharacterScanner ||
            in_super_chain(self->fp.class, CharacterScanner,
            CUR_REGION, CUR_PID)))
                syserr("prim_130: self is not a kind of CharacterScanner (oop = %d)",
                  self->fp.id);

        if (!(PRIMARG(1) < 0 || PRIMARG(1) == ZERO))
                syserr("prim_130: startIndex not an integer >= 0 (oop = %d)", PRIMARG(1));

        /*
         * do it ...
         */

        if (display == TRUE)
                setCopyBits(self);

        ret = ARRAY_DATA(stops)[INTEGER_VALUE(EndOfRun) - 1];
```

```
	for (lastIndex = startIndex; lastIndex <= stopIndex; lastIndex++)
	{
		charIndex = BYTEARRAY_DATA(sourceString)[lastIndex - 1];

		if (ARRAY_DATA(stops)[charIndex] != nIL)
		{
			ret = ARRAY_DATA(stops)[charIndex];
			break;
		}

		sourceX = INTEGER_VALUE(ARRAY_DATA(xTable)[charIndex]);

		width = INTEGER_VALUE(ARRAY_DATA(xTable)[charIndex + 1])
		  - sourceX;

		nextDestX = destX + width;

		if (nextDestX > rightX)
		{
			ret = ARRAY_DATA(stops)[INTEGER_VALUE(CrossedX) - 1];
			break;
		}

		if (display == tRUE)
			copyBits();

		destX = nextDestX;
	}

	if (lastIndex > stopIndex)
		lastIndex = stopIndex;

	/*
	 * mark ourself updated only if we changed ...
	 */

	if (INSTANCE_VARS(self)[DestXIndex] != INTEGER_OBJECT(destX)
	  || INSTANCE_VARS(self)[CSLastIndexIndex] != INTEGER_OBJECT(lastIndex))
	{
		INSTANCE_VARS(self)[DestXIndex] = INTEGER_OBJECT(destX);
		INSTANCE_VARS(self)[CSLastIndexIndex] = INTEGER_OBJECT(lastIndex);
		UPDATE(self);
	}

	return (ret);
}

/*
 * mouse & keyboard primitives and support routines
 */

extern int Divert;

extern unsigned char Sun3STKeyTrans[];

static oop InputSemaphore = nIL;

static int MouseFD = -1;
static int KeyboardFD = -1;

static int CursorLink;

static int MouseX, MouseY;

static unsigned char *STKeyTrans;

/*
 * number of keyboard keystations
 */

#define MAX_KEYSTATION  128

/*
 * the "escape key" keystation value.  causes exit to debugger.
 */

#define ESCAPE_KEY      0x72    /* keystation R15 on sun keyboard */

/*
 * mouse and keyboard event input
 *
 * note that the mouse driver emits duplicate events on the middle and right
 * buttons, (apparantly a 3.2 bug), so we have to implement duplicate
 * suppression.
 */

static int ReadReturn;

static Firm_event MouseFE0;
static Firm_event MouseFE1;
static Firm_event *NextMouseFE = &MouseFE0;
static Firm_event *PrevMouseFE = &MouseFE1;

#if 1
#define GET_MOUSE_EVENT(fep)    \
	(fep) = NextMouseFE;                                                    \
	while ( ( ReadReturn = read(MouseFD, NextMouseFE,                       \
	  sizeof(Firm_event)) ) == sizeof(Firm_event)                           \
	  && NextMouseFE->id == PrevMouseFE->id                                 \
	  && NextMouseFE->time.tv_sec == PrevMouseFE->time.tv_sec               \
	  && NextMouseFE->time.tv_usec == PrevMouseFE->time.tv_usec );          \
	if ( ReadReturn == sizeof(Firm_event) )                                 \
		if ( NextMouseFE == &MouseFE0 )                                 \
			NextMouseFE = &MouseFE1,                                \
			PrevMouseFE = &MouseFE0;                                \
		else                                                            \
			NextMouseFE = &MouseFE0,                                \
			PrevMouseFE = &MouseFE1;                                \
	else                                                                    \
		(fep) = NULL;
#else
#define GET_MOUSE_EVENT(fep)    \
	if ( ( ReadReturn = read(MouseFD, &MouseFE0,                            \
	  sizeof(Firm_event)) ) == sizeof(Firm_event) )                         \
		(fep) = &MouseFE0;                                              \
	else                                                                    \
		(fep) = NULL;
#endif

static Firm_event KeyboardFE0;

#define GET_KEYBOARD_EVENT(fep) \
	if ( ( ReadReturn = read(KeyboardFD, &KeyboardFE0,                      \
	  sizeof(Firm_event)) ) == sizeof(Firm_event) )                         \
		(fep) = &KeyboardFE0;                                           \
	else                                                                    \
		(fep) = NULL;
```

```
/*
 * smalltalk event queue
 */

#define STE_QUEUE_SIZE          SEMAPHORE_BUFFER_SIZE

static unsigned short STEQueue[STE_QUEUE_SIZE];
static int STEQueueCount;
static int STEQueueHead, STEQueueTail;

#define ADD_EVENT(ste)  \
        if ( STEQueueCount < STE_QUEUE_SIZE )                   \
        {                                                       \
                STEQueue[STEQueueTail] = (ste);                 \
                STEQueueTail =                                  \
                  ( STEQueueTail == STE_QUEUE_SIZE - 1 ) ?      \
                  0 : STEQueueTail + 1;                         \
                STEQueueCount++;                                \
        }                                                       \
        else                                                    \
        {                                                       \
                fprintf(stderr, "ioTrap: event queue overflow\n");      \
        }

#define REMOVE_EVENT(ste)       \
        if ( STEQueueCount > 0 )                                \
        {                                                       \
                (ste) = STEQueue[STEQueueHead];                 \
                STEQueueHead =                                  \
                  ( STEQueueHead == STE_QUEUE_SIZE - 1 ) ?      \
                  0 : STEQueueHead + 1;                         \
                STEQueueCount--;                                \
        }                                                       \
        else                                                    \
        {                                                       \
                (ste) = 0x6000; /* bad event */                 \
        }

#define FLUSH_EVENTS()          \
        STEQueueCount = STEQueueHead = STEQueueTail = 0;

/*
 * ioTrap - SIGIO catcher
 *
 * only the keyboard and mouse descriptors are set to generate this signal, (see
 * openMouse() and openKeyboard()).
 */

ioTrap()
{

        /*
         * flag interpreter diversion. this will result in syncronous input
         * event processing via inputEvents()
         */

        Divert = 1;
}

/*
 * inputEvents
 *
 * inputEvents simply reads all available mouse and keyboard events, translates
 * them to smalltalk events, and serializes them into a single event queue
 * which is read by the inputWord primitive.
 */

#define ON_OFF_EV(fe)   ( ( (fe)->value != 0 ) ? 0x3000 : 0x4000 )

static struct timeval zeroTime = {0, 0};

static Firm_event *MouseFE;
static Firm_event *KeyboardFE;
static unsigned short MouseSTE;
static unsigned short KeyboardSTE;

inputEvents()
{
        register int mouse;
        register int keyboard;

        /*
         * read initial device events, if we don't already have 'em.
         */

        if (MouseFE == NULL)
                GET_MOUSE_EVENT(MouseFE);

        if (KeyboardFE == NULL)
                GET_KEYBOARD_EVENT(KeyboardFE);

        /*
         * read & queue 'em till there ain't no more or until the event
         * buffer is full.  if the buffer fills, primInputWord will let us
         * know when we can start reading again.
         */

        while (STEQueueCount < STE_QUEUE_SIZE
          && (MouseFE != NULL || KeyboardFE != NULL))
        {
                keyboard = mouse = 0;

                /*
                 * serialize ...
                 */

                if (KeyboardFE != NULL && MouseFE != NULL)
                {
                        if (KeyboardFE->time.tv_sec < MouseFE->time.tv_sec ||
                          (KeyboardFE->time.tv_sec == MouseFE->time.tv_usec &&
                            KeyboardFE->time.tv_usec < MouseFE->time.tv_usec))
                                keyboard++;
                        else
                                mouse++;
                }
                else if (KeyboardFE != NULL)
                        keyboard++;
                else if (MouseFE != NULL)
                        mouse++;

                /*
                 * flag exit to debugger if "escape key" is pressed ...
                 */

                if (keyboard && KeyboardFE->id == ESCAPE_KEY)
                {
                        Divert = 1;
```

```
                exitToDebugger = 1;
                GET_KEYBOARD_EVENT(KeyboardFE);
                break;
        }

        /*
         * convert the event
         */

        if (mouse)
        {
                if (MouseFE->id == LOC_X_DELTA)
                {
                        MouseX += MouseFE->value;
                        if (MouseX < 0)
                                MouseX = 0;
                        if (MouseX > PR_WIDTH(displayRect))
                                MouseX = PR_WIDTH(displayRect);
                        MouseSTE = 0x1000 | (MouseX & 0x0fff);
                        if (CursorLink == tRUE)
                        {
                                CURSOR_OFF;
                                CursorX = MouseX;
                                CURSOR_ON;
                        }
                }
                else if (MouseFE->id == LOC_Y_DELTA)
                {
                        MouseY -= MouseFE->value;
                        if (MouseY < 0)
                                MouseY = 0;
                        if (MouseY > PR_HEIGHT(displayRect))
                                MouseY = PR_HEIGHT(displayRect);
                        MouseSTE = 0x2000 | (MouseY & 0x0fff);
                        if (CursorLink == tRUE)
                        {
                                CURSOR_OFF;
                                CursorY = MouseY;
                                CURSOR_ON;
                        }
                }
                else if (MouseFE->id == MS_RIGHT)
                        MouseSTE = ON_OFF_EV(MouseFE) | RIGHT;
                else if (MouseFE->id == MS_MIDDLE)
                        MouseSTE = ON_OFF_EV(MouseFE) | MID;
                else if (MouseFE->id == MS_LEFT)
                        MouseSTE = ON_OFF_EV(MouseFE) | LEFT;
                else
                        MouseSTE = 0x6000;      /* bad event */

                if (InputSemaphore != nIL)
                {
                        ADD_EVENT(MouseSTE);
                        synchronousSignal(InputSemaphore);
                }

                GET_MOUSE_EVENT(MouseFE);
        }
        else if (keyboard)
        {
                if (KeyboardFE->id <= MAX_KEYSTATION)
                        KeyboardSTE = ON_OFF_EV(KeyboardFE)
                          | STKeyTrans[KeyboardFE->id];
                else
                        KeyboardSTE = 0x6000;   /* bad event */

                if (InputSemaphore != nIL)
                {
                        ADD_EVENT(KeyboardSTE);
                        synchronousSignal(InputSemaphore);
                }

                GET_KEYBOARD_EVENT(KeyboardFE);
        }
    }

    return;
}

/*
 * mouse & keyboard open/close routines
 */

#define MOUSE           "/dev/mouse"
#define KEYBOARD        "/dev/kbd"

extern int NoMouse;
extern int NoKeyboard;

static int On = 1;
static int Off = 0;

static int AsyncNoBlock = FASYNC | FNDELAY;

static int MouseFormat = VUID_FIRM_EVENT;
static int KeyboardFormat = TR_UNTRANS_EVENT;
static int PrevMouseFormat;
static int PrevKeyboardFormat;

static struct screen Screen;
static int ParentWinFD = -1;
static char *ParentWinName;

openMouse()
{
        if (NoMouse || MouseFD >= 0)
                return;                 /* already open */

        /*
         * if running under sunwindows, tell it to lay off the mouse!
         */

        if ((ParentWinName = getenv("WINDOW_PARENT")) != NULL)
        {
                if (ParentWinFD < 0)
                        if ((ParentWinFD = open(ParentWinName, O_RDWR)) < 0)
                                syserr("openMouse: couldn't open parent window\n");

                strcpy(Screen.scr_msname, "NONE");

                win_setms(ParentWinFD, &Screen);
        }

        /*
         * open mouse & set for events
         */

        if ((MouseFD = open(MOUSE, O_RDWR)) < 0)
```

```
	syserr("openMouse: couldn't open %s\n", MOUSE);

    if (ioctl(MouseFD, VUIDGFORMAT, &PrevMouseFormat) < 0)
	    syserr("openMouse: couldn't get previous format for %s\n",
	      MOUSE);

    if (ioctl(MouseFD, VUIDSFORMAT, &MouseFormat) < 0)
	    syserr("openMouse: couldn't set %s format\n", MOUSE);

    /*
     * set mouse for async processing, (SIGIO generation), and
     * non-blocking reads.
     */

    if (fcntl(MouseFD, F_SETOWN, getpid()) < 0)
	    syserr("openMouse: couldn't set %s owner to this process\n",
	      MOUSE);

    if (fcntl(MouseFD, F_SETFL, AsyncNoBlock) < 0)
	    syserr("openMouse: couldn't set %s for async/non-block\n",
	      MOUSE);

    return;
}

openKeyboard()
{
    if (NoKeyboard || KeyboardFD >= 0)
	    return;			/* already open */

    /*
     * if running under sunwindows, tell it to lay off the keyboard!
     */

    if ((ParentWinName = getenv("WINDOW_PARENT")) != NULL)
    {
	    if (ParentWinFD < 0)
		    if ((ParentWinFD = open(ParentWinName, O_RDWR)) < 0)
			    syserr("openKeyboard: couldn't open parent window\n");
	    strcpy(Screen.scr_kbdname, "NONE");

	    win_setkbd(ParentWinFD, &Screen);
    }

    /*
     * open keyboard & set for untranslated events
     */

    if ((KeyboardFD = open(KEYBOARD, O_RDWR)) < 0)
	    syserr("openKeyboard: couldn't open %s\n", KEYBOARD);

    if (ioctl(KeyboardFD, KIOCSDIRECT, &On) < 0)
	    syserr("openKeyboard: couldn't set %s for direct input\n",
	      KEYBOARD);

    if (ioctl(KeyboardFD, KIOCGTRANS, &PrevKeyboardFormat) < 0)
	    syserr("openKeyboard: couldn't get previous format for %s\n",
	      KEYBOARD);

    if (ioctl(KeyboardFD, KIOCTRANS, &KeyboardFormat) < 0)
	    syserr("openKeyboard: couldn't set %s format\n", KEYBOARD);

    /*
     * set keyboard for async processing, (SIGIO generation), and
     * non-blocking reads.
     */

    if (fcntl(KeyboardFD, F_SETOWN, getpid()) < 0)
	    syserr("openKeyboard: couldn't set %s owner to this process\n",
	      KEYBOARD);

    if (fcntl(KeyboardFD, F_SETFL, AsyncNoBlock) < 0)
	    syserr("openKeyboard: couldn't set %s for async/non-block\n",
	      KEYBOARD);

    /*
     * install keyboard translation table
     */

    STKeyTrans = Sun3STKeyTrans;

    return;
}

closeMouse()
{
    if (NoMouse || MouseFD < 0)
	    return;			/* already closed */

    /*
     * reset mouse format & close
     */

    if (ioctl(MouseFD, VUIDSFORMAT, &PrevMouseFormat) < 0)
	    fprintf(stderr,
	      "closeMouse: couldn't reset %s format (format=%d)\n",
	      MOUSE, PrevMouseFormat);

    close(MouseFD);

    MouseFD = -1;

    /*
     * if running under sunwindows, restore the mouse
     */

    if (ParentWinName != NULL)
    {
	    if (ParentWinFD < 0)
		    if ((ParentWinFD = open(ParentWinName, O_RDWR)) < 0)
			    syserr("closeMouse: couldn't open parent window\n");

	    strcpy(Screen.scr_msname, MOUSE);

	    win_setms(ParentWinFD, &Screen);
    }

    return;
}

closeKeyboard()
{
    if (NoKeyboard || KeyboardFD < 0)
	    return;			/* already closed */

    /*
     * reset keyboard format and translation & close
     */
```

```
	if (ioctl(KeyboardFD, KIOCTRANS, &PrevKeyboardFormat) < 0)
		fprintf(stderr,
		    "closeKeyboard: couldn't reset %s format (format=%d)\n",
		    KEYBOARD, PrevKeyboardFormat);

	close(KeyboardFD);

	KeyboardFD = -1;

	/*
	 * if running under sunwindows, restore the keyboard
	 */

	if (ParentWinName != NULL)
	{
		if (ParentWinFD < 0)
			if ((ParentWinFD = open(ParentWinName, O_RDWR)) < 0)
				syserr("closeKeyboard: couldn't open parent window\n");

		strcpy(Screen.scr_kbdname, KEYBOARD);

		win_setkbd(ParentWinFD, &Screen);
	}

	return;
}

/*
 * display device open/close routines
 */

extern struct fullscreen *fullscreen_init();
static struct fullscreen *FullScreen;

openDisplay()
{
	object *display;

#if ( ! DEBUGGER )
	/*
	 * if this is non-debug code and if sunwindows is running, notify
	 * it that we will be using full screen access.  this will prevent
	 * other windows from updating the screen while alltalk is running.
	 *
	 * also, if stdout and/or stderr is connected to a pseudo-tty,
	 * redirect them so that such output does not fill up the pseudo-tty's
	 * character buffer, which would cause this program to silently hang
	 * (nasty side-effect!).
	 */

	if ((ParentWinName = getenv("WINDOW_PARENT")) != NULL)
	{
		if (ParentWinFD < 0)
			if ((ParentWinFD = open(ParentWinName, O_RDWR)) < 0)
				syserr("openDisplay: couldn't open parent window\n");

		if (displayRect == NULL)
		{
			/*
			 * first time ... truncate output file
			 */

			if (isatty(fileno(stdout)))
			{
				fprintf(stderr, "*** running under sunwindows.  redirecti
				if (freopen(LogFile, "w", stdout) == NULL)
					syserr("openDisplay: couldn't redirect stdout to
			}

			if (isatty(fileno(stderr)))
			{
				fprintf(stderr, "*** running under sunwindows.  redirecti
				if (freopen(LogFile, "w", stderr) == NULL)
					syserr("openDisplay: couldn't redirect stderr to
			}
		}
		else
		{
			/*
			 * subsequent times ... append to output file
			 */

			if (isatty(fileno(stdout)))
				if (freopen(LogFile, "a", stdout) == NULL)
					syserr("openDisplay: couldn't redirect stdout to

			if (isatty(fileno(stderr)))
				if (freopen(LogFile, "a", stderr) == NULL)
					syserr("openDisplay: couldn't redirect stderr to
		}

		if ((FullScreen = fullscreen_init(ParentWinFD)) == NULL)
			syserr("openDisplay: couldn't set full screen\n");
	}
#endif

	if (displayRect != NULL)
		return;			/* already open */

	/*
	 * set up the display screen ... (we use the frame buffer directly!)
	 */

	displayRect = pr_open(FRAME_BUFFER);

	if (displayRect == NULL)
		syserr("openDisplay: couldn't open %s", FRAME_BUFFER);

	/*
	 * allocate the appropriate depth pixrect for holding screen
	 * contents under the cursor.
	 */

	tRect = mem_create(CURSOR_LEN, CURSOR_LEN, PR_DEPTH(displayRect));

	if (tRect == NULL)
		syserr("openDisplay: couldn't allocate cursor save area");

	/*
	 * get dISPLAY object
	 *
	 * the beDisplay primitive will actually place dISPLAY's contents on
	 * the screen ... we simply prefetch it into the object manager's
	 * buffer and set it's depth to match that of the screen device.
	 */
```

```
        display = get_obj(dISPLAY, 0, 0);

        if (display == NULL)
                syserr("openDisplay: couldn't find Display");

        INSTANCE_VARS(display)[FormDepthIndex] =
          INTEGER_OBJECT(PR_DEPTH(displayRect));

        UPDATE(display);

        return;
}

closeDisplay()
{
        /*
         * note that we never actually close the display device.  this
         * call is actually provided only to handle the sunwindows full
         * screen access situation when executing non-debug code.
         */

#if ( ! DEBUGGER )
        /*
         * if this is non-debug code and if running under sunwindows,
         * release the full screen access.
         *
         * also, reattach stdout and stderr to the control tty.
         */

        if (FullScreen != NULL)
        {
                fullscreen_destroy(FullScreen);
                FullScreen = NULL;
        }

        if (freopen("/dev/tty", "a", stdout) == NULL)
                syserr("openDisplay: couldn't reattach stdout to /dev/tty\n");

        if (freopen("/dev/tty", "a", stderr) == NULL)
                syserr("openDisplay: couldn't reattach stderr to /dev/tty\n");
#endif

        return;
}


/*
 * mouse & keyboard primitives
 */

/*
 * <primitive 131 self> -- inputWord
 */

oop
prim_131()
{
        register int NextSTE;

        /*
         * if the event queue is full, re-assert interpreter diversion since
         * there may be more events waiting to be read from unix.
         */
        if (STEQueueCount == STE_QUEUE_SIZE)
                Divert = 1;

        /*
         * get the next smalltalk event ...
         */

        REMOVE_EVENT(NextSTE);

        return (INTEGER_OBJECT(NextSTE));
}

/*
 * <primitive 132 self aSemaphore> -- inputSemaphore
 */

oop
prim_132()
{
        register object *aSemaphore;

        aSemaphore = get_obj(PRIMARG(1), CUR_REGION, CUR_PID);

        /*
         * argument checking
         */

        if (aSemaphore == NULL)
                syserr("prim_132: couldn't fetch aSemaphore (oop = %d)", PRIMARG(1));

        if (!(aSemaphore->fp.class == Semaphore ||
            in_super_chain(aSemaphore->fp.class, Semaphore,
              CUR_REGION, CUR_PID)))
                syserr("prim_132: aSemaphore is not a kind of Semaphore (oop = %d)",
                  aSemaphore->fp.id);

        /*
         * set the input semaphore and clear the input queue
         */

        InputSemaphore = PRIMARG(1);

        FLUSH_EVENTS();

        return (nil);
}

/*
 * <primitive 133 self> -- beCursor
 */

oop
prim_133()
{
        register object *self;

        self = GET_RCVR(PRIMARG(0));

        /*
         * argument checking
         */

        if (self == NULL)
                syserr("prim_133: couldn't fetch self (oop = %d)", PRIMARG(0));
```

```
	if (!(self->fp.class == Cursor ||
	    in_super_chain(self->fp.class, Cursor, CUR_REGION, CUR_PID)))
		syserr("prim_133: self is not a kind of Cursor (oop = %d)",
		  self->fp.id);

	/*
	 * set the current cursor and bitblt it to the screen ...
	 */

	currentCursor = self->fp.id;

	sBits = get_obj(INSTANCE_VARS(self)[FormBitsIndex], CUR_REGION, CUR_PID);

	if (sBits == NULL)
		syserr("prim_133: form has no bits!");

	MEM_POINT(sRect, CURSOR_LEN, CURSOR_LEN, 1, WORDARRAY_DATA(sBits));

	pr_rop(cRect, 0, 0, CURSOR_LEN, CURSOR_LEN, PIX_SRC, sRect, 0, 0);

	CURSOR_OFF;
	CURSOR_ON;

	return (nIL);
}

/*
 * <primitive 134 self arg> -- cursorLink
 */

oop
prim_134()
{
	register oop arg;

	arg = PRIMARG(1);

	/*
	 * argument checking
	 */

	if (arg != tRUE && arg != fALSE)
		syserr("prim_134: argument not tRUE or fALSE (oop = %d)", arg);

	/*
	 * set the cursor link
	 */

	CursorLink = arg;

	return (nIL);
}

/*
 * <primitive 135 self aPoint> -- cursorLocPut
 */

oop
prim_135()
{
	register object *aPoint;

	aPoint = get_obj(PRIMARG(1), CUR_REGION, CUR_PID);

	/*
	 * argument checking
	 */

	if (aPoint == NULL)
		syserr("prim_135: couldn't fetch aPoint (oop = %d)", PRIMARG(1));

	if (!(aPoint->fp.class == Point ||
	    in_super_chain(aPoint->fp.class, Point, CUR_REGION, CUR_PID)))
		syserr("prim_135: aPoint is not a kind of Point (oop = %d)",
		  aPoint->fp.id);

	/*
	 * set the cursor location, (including mouse, if linked)
	 */

	CURSOR_OFF;

	CursorX = INTEGER_VALUE(INSTANCE_VARS(INSTANCE_VARS(aPoint)[PointXIndex]);
	CursorY = INTEGER_VALUE(INSTANCE_VARS(INSTANCE_VARS(aPoint)[PointYIndex]);

	if (CursorLink == tRUE)
		MouseX = CursorX, MouseY = CursorY;

	CURSOR_ON;

	return (nIL);
}

/*
 * <primitive 136 self> -- mousePoint
 */

oop
prim_136()
{
	register object *aPoint;

	/*
	 * make a new point indicating the mouse position
	 */

	aPoint = OM_NEW(Point, 0);

	INSTANCE_VARS(aPoint)[PointXIndex] = INTEGER_OBJECT(MquseX);
	INSTANCE_VARS(aPoint)[PointYIndex] = INTEGER_OBJECT(MouseY);

	check_garbage(aPoint->fp.id);
	return (aPoint->fp.id);
}
```

```
/*Copyright 1988 Eastman Kodak Company.  All rights reserved.*/
#include <stdio.h>
#include <math.h>
#include <strings.h>
#include <ctype.h>
#include <curses.h>
#include <sys/types.h>
#include <sys/dir.h>
#include <sys/file.h>
#include "types.h"
#include "constants.h"
#include "bytecodes.h"
#include "macros.h"
#include "oops_values.h"
#include "interp_const.h"
#include "interp_types.h"

static char *msg01 = "prim_%d:01--Primitive not implemented";
static char *msg02 = "prim_%d:02--Parm is not type String: %d";
static char *msg04 = "prim_%d:04--Parm is not type Integer: %d";
static char *msg05 = "prim_%d:05--Parm is not integer >=0: %d";
static char *msg07 = "prim_%d:07--Parm is not type Character: %d";
static char *msg08 = "prim_%d:08--Parm is not type Integer > 0: %d";
static char *msg26 = "prim_%d:26--Object not found: %d";

extern object *obj_mgr();
extern object *get_obj();
extern object *reserve_obj();
extern object *stringObject();

extern struct process *Cur_process;

/*
 * primitives 137 and 138 implement actual UNIX directory access.
 *
 * note that we only allow one open directory at a time, this makes it easier to
 * use the DOS classes directly.
 *
 * this appears to be reasonable since most operations on a directory deal with
 * all the file entries during execution, e.g., names matching a pattern,
 * finding a specific file, etc.
 */

static DIR *Directory;
static struct direct *DirectoryEntry;

/*
 * <primitive 137 dirName> -- open directory
 */

oop
prim_137()
{
        object *dirName;
        int new_oop;

        dirName = GET_RCVR(PRIMARG(0));

        if (dirName == NULL)
                syserr("prim_137: couldn't fetch dirName (oop = %d)",
                  PRIMARG(0));

        if (!(dirName->fp.class == String || in_super_chain(String, PRIMARG(0),
                CUR_REGION, CUR_PID)))
                {
                new_oop = integerObject(-1);
                check_garbage(new_oop);
                return(new_oop);
                }

        if (Directory != NULL)
                closedir(Directory);

        if ((Directory = opendir(BYTEARRAY_DATA(dirName))) == NULL)
                {
                new_oop = integerObject(-1);
                check_garbage(new_oop);
                return(new_oop);
                }

        return (nIL);
}

/*
 * <primitive 138> -- get next directory entry
 */

oop
prim_138()
{
        object *new;

        if (Directory == NULL)
                return (nIL);   /* what should i return here?! */

        if ((DirectoryEntry = readdir(Directory)) == NULL)
                return (nIL);

        new = stringObject(DirectoryEntry->d_name);

        check_garbage(new->fp.id);

        return (new->fp.id);
}

/*
 * <primitive 139 fileName aMode> -- create and open file in specified mode
 */

oop
prim_139()
{
        object *fileName;
        int aMode;
        int aHandle, new_oop;

        fileName = GET_RCVR(PRIMARG(0));

        if (fileName == NULL)
                syserr("prim_139: couldn't fetch fileName (oop = %d)",
                  PRIMARG(0));

        if ((aMode = INTEGER_VALUE(PRIMARG(1))) < 0)
                syserr("prim_139: aMode not a positive integer (oop = %d)",
                  PRIMARG(1));

        if (!(fileName->fp.class == String || in_super_chain(String, PRIMARG(0),
```

```
            CUR_REGION, CUR_PID)))
            {
            new_oop = integerObject(-1);
            check_garbage(new_oop);
            return(new_oop);
            }

        aHandle = open(BYTEARRAY_DATA(fileName), O_CREAT | aMode, 0666);

        if (aHandle < 0)
            {
            new_oop = integerObject(-1);
            check_garbage(new_oop);
            return(new_oop);
            }

        return (INTEGER_OBJECT(aHandle));
}

/*
 * <primitive 140> -- not used
 */

oop
prim_140()
{
        syserr(msg01, 140);
}

/*
 * <primitive 141 fileName aMode> -- open file in specified mode
 */

oop
prim_141()
{
        object *fileName;
        int aMode;
        int aHandle, new_oop;

        fileName = GET_RCVR(PRIMARG(0));

        if (fileName == NULL)
                syserr("prim_141: couldn't fetch fileName (oop = %d)",
                  PRIMARG(0));

        if ((aMode = INTEGER_VALUE(PRIMARG(1))) < 0)
                syserr("prim_141: aMode not a positive integer (oop = %d)",
                  PRIMARG(1));

        if (!(fileName->fp.class == String || in_super_chain(String, PRIMARG(0),
            CUR_REGION, CUR_PID)))
            {
            new_oop = integerObject(-1);
            check_garbage(new_oop);
            return(new_oop);
            }

        aHandle = open(BYTEARRAY_DATA(fileName), aMode, 0666);

        if (aHandle < 0)
            {
            new_oop = integerObject(-1);
            check_garbage(new_oop);
            return(new_oop);
            }

        return (INTEGER_OBJECT(aHandle));
}

/*
 * <primitive 142 oldFileName newFileName> -- rename file
 */

oop
prim_142()
{
        object *oldFileName;
        object *newFileName;
        int new_oop;

        oldFileName = GET_RCVR(PRIMARG(0));

        if (oldFileName == NULL)
                syserr("prim_142: couldn't fetch oldFileName (oop = %d)",
                  PRIMARG(0));

        newFileName = get_obj(PRIMARG(1), CUR_REGION, CUR_PID);

        if (newFileName == NULL)
                syserr("prim_142: couldn't fetch newFileName (oop = %d)",
                  PRIMARG(1));

        if (!(oldFileName->fp.class == String || in_super_chain(String,
            PRIMARG(0), CUR_REGION, CUR_PID)))
            {
            new_oop = integerObject(-1);
            check_garbage(new_oop);
            return(new_oop);
            }

        if (!(newFileName->fp.class == String || in_super_chain(String,
            PRIMARG(1), CUR_REGION, CUR_PID)))
            {
            new_oop = integerObject(-1);
            check_garbage(new_oop);
            return(new_oop);
            }

        if (rename(BYTEARRAY_DATA(oldFileName), BYTEARRAY_DATA(newFileName)) < 0)
            {
            new_oop = integerObject(-1);
            check_garbage(new_oop);
            return(new_oop);
            }

        return (nIL);
}

/*
 * <primitive 143 anArray> -- Object perform:withArguments:  not implemented
 */

oop
prim_143()
{
        syserr(msg01, 143);
}
```

```
/*
 * <primitive 144 fileName> -- unlink file
 */

oop
prim_144()
{
        object *fileName;
        int new_oop;

        fileName = GET_RCVR(PRIMARG(0));

        if (fileName == NULL)
                syserr("prim_144: couldn't fetch fileName (oop = %d)",
                  PRIMARG(0));

        if (!(fileName->fp.class == String || in_super_chain(String,
              PRIMARG(0), CUR_REGION, CUR_PID)))
              {
              new_oop = integerObject(-1);
              check_garbage(new_oop);
              return(new_oop);
              }

        if (unlink(BYTEARRAY_DATA(fileName)) < 0)
              {
              new_oop = integerObject(-1);
              check_garbage(new_oop);
              return(new_oop);
              }

        return (nIL);
}

/*
 * <primitive 145 aHandle> -- close file
 */

oop
prim_145()
{
        int aHandle, new_oop;

        if ((aHandle = INTEGER_VALUE(PRIMARG(0))) < 0)
                syserr("prim_145: aHandle not a positive integer (oop = %d)",
                  PRIMARG(0));

        if (close(aHandle) < 0)
              {
              new_oop = integerObject(-1);
              check_garbage(new_oop);
              return(new_oop);
              }

        return (nIL);
}

/*
 * <primitive 146 aHandle buf dataLength> -- read file
 */

oop
prim_146()
{
        object *buf;
        int aHandle, new_oop;
        int dataLength;
        int actualDataLength;

        if ((aHandle = INTEGER_VALUE(PRIMARG(0))) < 0)
                syserr("prim_146: aHandle not a positive integer (oop = %d)",
                  PRIMARG(0));

        buf = get_obj(PRIMARG(1), CUR_REGION, CUR_PID);

        if (buf == NULL)
                syserr("prim_146: couldn't fetch buf (oop = %d)",
                  PRIMARG(1));

        if ((dataLength = INTEGER_VALUE(PRIMARG(2))) < 0)
                syserr("prim_146: dataLength not a positive integer (oop = %d)",
                  PRIMARG(2));

        if (!(buf->fp.class == ByteArray || in_super_chain(ByteArray,
              PRIMARG(1), CUR_REGION, CUR_PID)))
              {
              new_oop = integerObject(-1);
              check_garbage(new_oop);
              return(new_oop);
              }

        actualDataLength = read(aHandle, BYTEARRAY_DATA(buf), dataLength);

        if (actualDataLength < 0)
              {
              new_oop = integerObject(-1);
              check_garbage(new_oop);
              return(new_oop);
              }

        return (INTEGER_OBJECT(actualDataLength));
}

/*
 * <primitive 147 aHandle buf dataLength> -- write file
 */

oop
prim_147()
{
        object *buf;
        int aHandle, new_oop;
        int dataLength;
        int actualDataLength;

        if ((aHandle = INTEGER_VALUE(PRIMARG(0))) < 0)
                syserr("prim_147: aHandle not a positive integer (oop = %d)",
                  PRIMARG(0));

        buf = get_obj(PRIMARG(1), CUR_REGION, CUR_PID);

        if (buf == NULL)
                syserr("prim_147: couldn't fetch buf (oop = %d)",
                  PRIMARG(1));

        if ((dataLength = INTEGER_VALUE(PRIMARG(2))) < 0)
                syserr("prim_147: dataLength not a positive integer (oop = %d)",
```

```
                PRIMARG(2));

        if (!(buf->fp.class == ByteArray || in_super_chain(ByteArray,
                PRIMARG(1), CUR_REGION, CUR_PID)))
                {
                new_oop = integerObject(-1);
                check_garbage(new_oop);
                return(new_oop);
                }

        actualDataLength = write(aHandle, BYTEARRAY_DATA(buf), dataLength);

        if (actualDataLength < 0)
                {
                new_oop = integerObject(-1);
                check_garbage(new_oop);
                return(new_oop);
                }

        return (INTEGER_OBJECT(actualDataLength));
}

/*
 * <primitive 148 aHandle off ptr> -- move file pointer
 */

oop
prim_148()
{
        int aHandle;
        int off;
        int ptr;
        int position, new_oop;

        if ((aHandle = INTEGER_VALUE(PRIMARG(0))) < 0)
                syserr("prim_148: aHandle not a positive integer (oop = %d)",
                  PRIMARG(0));

        if ((off = INTEGER_VALUE(PRIMARG(1))) < 0)
                syserr("prim_148: off not a positive integer (oop = %d)",
                  PRIMARG(1));

        if ((ptr = INTEGER_VALUE(PRIMARG(2))) < 0)
                syserr("prim_148: ptr not a positive integer (oop = %d)",
                  PRIMARG(2));

        position = lseek(aHandle, off, ptr);

        if (position < 0)
                {
                new_oop = integerObject(-1);
                check_garbage(new_oop);
                return(new_oop);
                }

        return (INTEGER_OBJECT(position));
}

/*
 * <primitive 149 aHandle fileLength> -- truncate file
 */

oop
prim_149()
{
        int aHandle, new_oop;
        int fileLength;

        if ((aHandle = INTEGER_VALUE(PRIMARG(0))) < 0)
                syserr("prim_149: aHandle not a positive integer (oop = %d)",
                  PRIMARG(0));

        if ((fileLength = INTEGER_VALUE(PRIMARG(1))) < 0)
                syserr("prim_149: fileLength not a positive integer (oop = %d)",
                  PRIMARG(1));

        if (ftruncate(aHandle, fileLength) < 0)
                {
                new_oop = integerObject(-1);
                check_garbage(new_oop);
                return(new_oop);
                }

        return (nIL);
}

/*
 * <primitive 150 self> -- yield processor
 */

oop
prim_150()
{
        yieldActive();

        return (nIL);
}
```

```
/*Copyright 1988 Eastman Kodak Company.  All rights reserved.*/

#include <stdio.h>
#include <math.h>
#include <strings.h>
#include <ctype.h>
#include <sys/types.h>
#include <sys/timeb.h>
#include <curses.h>
#include "types.h"
#include "constants.h"
#include "bytecodes.h"
#include "macros.h"
#include "oops_values.h"
#include "interp_const.h"
#include "interp_types.h"

static char *msg01 = "prim_%d:01--Primitive not implemented";
static char *msg02 = "prim_%d:02--Parm is not type String: %d";
static char *msg03 = "prim_%d:02--Parm is not type Symbol: %d";
static char *msg04 = "prim_%d:04--Parm is not type Integer: %d";
static char *msg05 = "prim_%d:05--Parm is not integer >=0: %d";
static char *msg07 = "prim_%d:07--Parm is not type Character: %d";
static char *msg08 = "prim_%d:08--Parm is not type Integer > 0: %d";
static char *msg09 = "prim_%d:09--Attempt to set up instance of class Class: %d";
static char *msg26 = "prim_%d:26--Object not found: %d";

extern object *obj_mgr();
extern object *get_obj();
extern object *reserve_obj();
extern object *fetch_method();
extern cntx   *find_blk_cntx();
extern object *objectify_block();
extern object *objectify_cntx();

extern struct process *Cur_process;
extern struct process Processes[];

/*
 * <primitive 151> -- not implemented
 */

oop
prim_151()
{
        syserr(msg01, 151);
}

/*
 * <primitive 152 self > -- Behavior new
 */

oop
prim_152()
{
        object *obj_ptr;

        if (PRIMARG(0) == Class)
                syserr(msg09, 152, PRIMARG(0));

        obj_ptr = OM_NEW(PRIMARG(0), 0);

        check_garbage(obj_ptr->fp.id);
        return (obj_ptr->fp.id);
}

/*
 * <primitive 153 self anInteger> -- Behavior new: anInteger
 */

oop
prim_153()
{
        object *obj_ptr;
        int no_index_vars;

        if (PRIMARG(0) == Class)
                syserr(msg09, 153, PRIMARG(0));

        if (PRIMARG(1) < 0)
                no_index_vars = -PRIMARG(1);
        else if (PRIMARG(1) == zERO)
                no_index_vars = 0;
        else
                syserr(msg05, 153, PRIMARG(1));

        obj_ptr = OM_NEW(PRIMARG(0), no_index_vars);

        check_garbage(obj_ptr->fp.id);
        return (obj_ptr->fp.id);
}

/*
 * <primitive 154 self selector> -- Object respondsTo: & Behavior
 *      canUnderstand: , and Object isResolvedIn.
 */

oop
prim_154()
{
        object *obj_ptr;
        object *meth_ptr;
        int obj_class;
        int msg_type;
        static int owning_class_slot;
        oop owning_class;
        static int first_time = 1;

        if (first_time)
                {
                first_time = 0;
                owning_class_slot = name_to_slot_err(CompiledMethod,
                "classOop");
                }

        if (PRIMARG(0) < 0)
        {
                obj_class = Integer;

                msg_type = INST_MSG;
        }
        else
        {
                obj_ptr = GET_RCVR(PRIMARG(0));

                if (obj_ptr == NULL)
                        syserr(msg26, 154, PRIMARG(0));
```

```
        obj_class = obj_ptr->fp.class;

        msg_type = ( obj_ptr->fp.id == obj_ptr->fp.class )
          ? CLASS_MSG : INST_MSG ;
    }

    meth_ptr = fetch_method(PRIMARG(1), obj_class, 0, msg_type,
      CUR_REGION, CUR_PID);

    if (meth_ptr == NULL)
        return (nil);

    return (meth_ptr ->value[owning_class_slot]);
}

/*
 * <primitive 155> -- RTBlock fixTemps.
 *
 * Handles the case where fixTemps is sent to a block stub (NOT a block
 * object). It doesn't matter whether or not the stub has a corresponding
 * block object.
 */

oop
prim_155()
{
    oop             stub_id;        /* id of receiver of fixTemps msg. */
    blk_stub        *stub_ptr;      /* pointer to same */
    object          *block_obj;     /* pointer to objectified receiver */
    object          *home_obj;      /* objectified home cntx of rcvr. */

    /*
    ** Receiver is a block stub id, not an oop.
    */
    stub_id         = PRIMARG(0);

    /*
    ** Get pointer to receiver stub (on stack).
    */
    stub_ptr        = FIND_BLK_STUB ( stub_id, Cur_process );

    /*
    ** If stub already has Block object associatd with it, get pointer
    ** to it.  If not, create one.  Regardless, get pointer to that
    ** object.
    */
    block_obj       = objectify_block ( stub_id );

    /*
    ** Objectify the stub's home.  This will include
    ** the objectification of any other stubs whose id's
    ** are found in the home's temps.
    */
    home_obj =
      objectify_cntx ( stub_ptr->vp.home_cntx, Cur_process->cur_cntx );

    /*
    ** Update the block object's instance variables, now that we know
    ** them.  Also, replace all references to the stub id with the
    ** block object's oop.
    */
    update_blk_obj ( stub_ptr, block_obj, home_obj );

    replace_oop ( stub_id, block_obj->fp.id, stub_ptr->vp.home_cntx,
                                                Cur_process->cur_cntx );

    /*
    ** Return the oop of the block object.  This object has now replaced
    ** the stub, and its oop has replaced the stub's id, everywhere it
    ** appeared.
    */
    return ( block_obj->fp.id );
}

/*
 * <primitive 156> -- part of Block fixTemps.
 *
 * When we freeze the temps of the home of a Block, we make a copy of the
 * block's home, and make that the new home.  This is handled by Smalltalk
 * code: "home <- home copy."  However, this doesn't take care of active
 * contexts of this block.  We must find them (if there are any - which is
 * not very likely), and update their home_cntx pointers to point to the
 * new home object.
 */

oop
prim_156()
{
    oop             blk_id;
    oop             home_id;
    cntx            *upd_blk_cntx;

/*-------------------------------------*/

    blk_id  = PRIMARG(0);
    home_id = PRIMARG(1);

    upd_blk_cntx = find_blk_cntx ( blk_id, CUR_CNTX_MEM->prev );
    while ( upd_blk_cntx != NULL )
    {
        upd_blk_cntx->ctrl_vars.home_cntx = (cntx *) reserve_obj (
                                    home_id,
                                    upd_blk_cntx->ctrl_vars.region,
                                    CUR_PID );
        upd_blk_cntx = find_blk_cntx ( blk_id, upd_blk_cntx->prev );
    };
    /* end while */
    return ( blk_id );
}

/*
 * <primitive 157> -- not implemented
 */

oop
prim_157()
{
    syserr(msg01, 157);
}

/*
 * <primitive 158> -- not implemented
 */

oop
prim_158()
{
    syserr(msg01, 158);
```

```
}

/*
 * <primitive 159> -- not implemented
 */

oop
prim_159()
{
        syserr(msg01, 159);
}

/*
 * <primitive 160> -- not implemented
 */

oop
prim_160()
{
        syserr(msg01, 160);
}

/*
 * <primitive 161> -- not implemented
 */

oop
prim_161()
{
        syserr(msg01, 161);
}

/*
 * <primitive 162> -- not implemented
 */

oop
prim_162()
{
        syserr(msg01, 162);
}

/*
 * <primitive 163> -- not implemented
 */

oop
prim_163()
{
        syserr(msg01, 163);
}

/*
 * <primitive 164> -- not implemented
 */

oop
prim_164()
{
        syserr(msg01, 164);
}

/*
 * <primitive 165> -- not implemented
 */

oop
prim_165()
{
        syserr(msg01, 165);
}

/*
 * <primitive 166> -- not implemented
 */

oop
prim_166()
{
        syserr(msg01, 166);
}

/*
 * <primitive 167> -- not implemented
 */

oop
prim_167()
{
        syserr(msg01, 167);
}

/*
 * <primitive 168> -- not implemented
 */

oop
prim_168()
{
        syserr(msg01, 168);
}

/*
 * <primitive 169> -- not implemented
 */

oop
prim_169()
{
        syserr(msg01, 169);
}

/*
 * <primitive 170> -- not implemented
 */

oop
prim_170()
{
        syserr(msg01, 170);
}

/*
 * <primitive 171> -- not implemented
 */

oop
prim_171()
```

```
{
        syserr(msg01, 171);
}

/*
 * primitives 150 and 172-178 implement processes and semaphores
 */

/*
 * <primitive 172 aContext priority> -- create process
 *
 * returns the oop of newly created process, or eRROR if interpreter's process
 * table is full.
 */

oop
prim_172()
{
        return (createProcess(PRIMARG(0), PRIMARG(1)));
}

/*
 * <primitive 173 self> -- terminate suspended process
 */

oop
prim_173()
{
        destroyProcess(PRIMARG(0));

        return (nIL);
}

/*
 * <primitive 174 self> -- terminate active process
 */

oop
prim_174()
{
        suspendActive();

        destroyProcess(PRIMARG(0));

        return (nIL);
}

/*
 * <primitive 175 self> -- signal semaphore
 */

oop
prim_175()
{
        synchronousSignal(PRIMARG(0));

        return (PRIMARG(0));
}
```

```
/*Copyright 1988 Eastman Kodak Company.  All rights reserved.*/
#include <stdio.h>
#include <math.h>
#include <strings.h>
#include <ctype.h>
#include <sys/types.h>
#include <sys/timeb.h>
#include <curses.h>
#include <setjmp.h>
#include "types.h"
#include "constants.h"
#include "bytecodes.h"
#include "macros.h"
#include "oops_values.h"
#include "interp_const.h"
#include "interp_types.h"

extern struct process *Cur_process;

extern object *obj_mgr();
extern object *get_obj();
extern object *reserve_obj();

/*
 * <primitive 176 self> -- wait on semaphore
 */

extern int NewProcessWaiting;
extern oop NewProcess;
extern unsigned short ExcessSignalsIndex;

oop
prim_176()
{
        object *aSemaphore;

        aSemaphore = GET_RCVR(PRIMARG(0));

        if (aSemaphore == NULL)
                syserr("prim_176: couldn't fetch aSemaphore (oop = %d)",
                  PRIMARG(0));

        if (INTEGER_VALUE(INSTANCE_VARS(aSemaphore)[ExcessSignalsIndex]) > 0)
        {
                INSTANCE_VARS(aSemaphore)[ExcessSignalsIndex] =
                  INTEGER_OBJECT(INTEGER_VALUE(
                  INSTANCE_VARS(aSemaphore)[ExcessSignalsIndex]) - 1);

                UPDATE(aSemaphore);
        }
        else
        {
                addLastLinkToList(CURRENT_ACTIVE_PROCESS(), PRIMARG(0));

                suspendActive();
        }

        return (nIL);
}

/*
 * <primitive 177 self> -- resume process
 */

oop
prim_177()
{
        resume(PRIMARG(0));

        return (nIL);
}

/*
 * <primitive 178 self> -- suspend active process
 */

oop
prim_178()
{
        suspendActive();

        return (nIL);
}


/*
 * <primitive 179 > -- quit
 */

extern jmp_buf Leave;

oop
prim_179()
{
        /*
         * Do a non-local goto to exec_bcodes.  Once there, we will destroy
         * all existing processes, then return to interp, which will close up
         * and stop.
         */

        longjmp(Leave, 1);

        return (nIL);
}


/*
 * <primitive 180 self> -- get superclass
 */

oop
prim_180()
{
        object *self;
        object *class;

        self = GET_RCVR(PRIMARG(0));

        if (self == NULL)
                syserr("prim_180: couldn't fetch self (oop = %d)", PRIMARG(0));

        if (self->fp.id == self->fp.class)
        {
                class = self;
        }
        else
```

```
        {
                class = get_obj(self->fp.class, CUR_REGION, CUR_PID);

                if (class == NULL)
                        syserr("prim_180: couldn't fetch class (oop = %d)",
                          self->fp.class);
        }

        return (CLASS_CONTROL(class)->cfp.super_class);
}
```

```
/*Copyright 1988 Eastman Kodak Company.  All rights reserved.*/

/*
 * ser 2/18/88 - primitives 181-199 are reserved for cscw group experimentation.
 */

#include <stdio.h>
#include <math.h>
#include <strings.h>
#include <ctype.h>
#include "types.h"
#include "constants.h"
#include "bytecodes.h"
#include "macros.h"
#include "oops_values.h"
#include "interp_const.h"
#include "interp_types.h"

extern struct process *Cur_process;

extern object *obj_mgr();
extern object *get_obj();
extern object *reserve_obj();

static char *msg01 = "prim_%d:01--Primitive not implemented";

/*
 * <primitive 181> -- not implemented
 */

oop
prim_181()
{
        syserr(msg01, 181);
}

/*
 * <primitive 182> -- not implemented
 */

oop
prim_182()
{
        syserr(msg01, 182);
}

/*
 * <primitive 183> -- not implemented
 */

oop
prim_183()
{
        syserr(msg01, 183);
}

/*
 * <primitive 184> -- not implemented
 */

oop
prim_184()
{
        syserr(msg01, 184);
}

/*
 * <primitive 185> -- not implemented
 */

oop
prim 185()
{
        syserr(msg01, 185);
}

/*
 * <primitive 186> -- not implemented
 */

oop
prim_186()
{
        syserr(msg01, 186);
}

/*
 * <primitive 187> -- not implemented
 */

oop
prim_187()
{
        syserr(msg01, 187);
}

/*
 * <primitive 188> -- not implemented
 */

oop
prim_188()
{
        syserr(msg01, 188);
}

/*
 * <primitive 189> -- not implemented
 */

oop
prim_189()
{
        syserr(msg01, 189);
}

/*
 * <primitive 190> -- not implemented
 */

oop
prim_190()
{
        syserr(msg01, 190);
}

/*
```

```
 * <primitive 191> -- not implemented
 */

oop
prim_191()
{
        syserr(msg01, 191);
}

/*
 * <primitive 192> -- not implemented
 */

oop
prim_192()
{
        syserr(msg01, 192);
}

/*
 * <primitive 193> -- not implemented
 */

oop
prim_193()
{
        syserr(msg01, 193);
}

/*
 * <primitive 194> -- not implemented
 */

oop
prim_194()
{
        syserr(msg01, 194);
}

/*
 * <primitive 195> -- not implemented
 */

oop
prim_195()
{
        syserr(msg01, 195);
}

/*
 * <primitive 196> -- not implemented
 */

oop
prim_196()
{
        syserr(msg01, 196);
}

int sizeIndex = 0;      /* would normally be in initializeIndicies() */

/*
 * <primitive 197 self> -- Stack addFirst:
 */

oop
prim_197()
{
        register object *self;
        register int size;

        self = GET_RCVR(PRIMARG(0));

        if (self == NULL)
                syserr("prim_197: couldn't fetch self (oop = %d)", PRIMARG(0));

        size = INSTANCE_VARS(self)[sizeIndex];

        if (size == ARRAY_SIZE(self))
                syserr("prim_197: collection is full");

        ARRAY_DATA(self)[size] = PRIMARG(1);

        INSTANCE_VARS(self)[sizeIndex] = size + 1;

        return (self->{p.id);
}

/*
 * <primitive 198 self> -- Stack removeFirst
 */

oop
prim_198()
{
        register object *self;
        register int size;

        self = GET_RCVR(PRIMARG(0));

        if (self == NULL)
                syserr("prim_198: couldn't fetch self (oop = %d)", PRIMARG(0));

        size = INSTANCE_VARS(self)[sizeIndex];

        if (size == 0)
                syserr("prim_198: collection is empty");

        size = size - 1;

        INSTANCE_VARS(self)[sizeIndex] = size;

        return (ARRAY_DATA(self)[size]);
}

/*
 * <primitive 199 self> -- Stack clear
 */

oop
prim_199()
{
        register object *self;

        self = GET_RCVR(PRIMARG(0));

        if (self == NULL)
                syserr("prim_199: couldn't fetch self (oop = %d)", PRIMARG(0));
```

```
        INSTANCE_VARS(self)[sizeIndex] - 0;

        return (self->fp.id);
}
```

```
/*Copyright 1988 Eastman Kodak Company.  All rights reserved.*/
/*prim_err.c:  Report out a primitive error gracefully*/

#include <stdio.h>
#include <math.h>
#include <strings.h>
#include "types.h"
#include "constants.h"
#include "bytecodes.h"
#include "macros.h"
#include "oops_values.h"
#include "interp_const.h"
#include "interp_types.h"

static char *msg01 = "prim_err:001: system object eRROR not found:%d";

extern object *obj_mgr();
extern object *stringObject();
extern struct process *Cur_process;

/**********************************************************************
                    prim_err
**********************************************************************/
oop
prim_err(Cur_process, msg, a1, a2, a3, a4, a5, a6)
        struct  process *Cur_process;
        char            *msg;
        int             *a1, *a2, *a3, *a4, *a5, *a6;
{
        char    msgbuf[256];
        object  *obj_ptr;
        object  *err_ptr;
        int     process_id;
        char    *errptr;
        int     lencon;
        int     no_index_vars;
        oop     old_oop;

        sprintf(msgbuf, msg, a1, a2, a3, a4, a5, a6);

        err_ptr = stringObject(msgbuf);

        /*
         * eRROR is an array of error messages, one per running process.
         */

        obj_ptr = obj_mgr(eRROR, FETCH, 0, 0, CUR_REGION, CUR_PID);

        if (obj_ptr == NULL)
                syserr(msg01, eRROR);

        old_oop = INDEXED_VARS(obj_ptr)[Cur_process->proc_id];
        INDEXED_VARS(obj_ptr)[Cur_process->proc_id] = err_ptr->fp.id;

        referenced(err_ptr, err_ptr->fp.id, old_oop, CUR_REGION, CUR_PID);

        UPDATE(obj_ptr);

        check_garbage(err_ptr->fp.id);

        return (eRROR);
```

```
/*Copyright 1988 Eastman Kodak Company.  All rights reserved.*/
#include <stdio.h>
#include <math.h>
#include <strings.h>
#include <ctype.h>
#include "types.h"
#include "constants.h"
#include "bytecodes.h"
#include "macros.h"
#include "oops_values.h"
#include "interp_const.h"
#include "interp_types.h"

extern struct process *Cur_process;

extern object *obj_mgr();
extern object *get_obj();
extern object *reserve_obj();

static char *msg01 = "prim_%d:01--Primitive not implemented";

/*
 * <primitive 181> -- not implemented
 */

oop
prim_181()
{
        syserr(msg01, 181);
}

/*
 * <primitive 182> -- not implemented
 */

oop
prim_182()
{
        syserr(msg01, 182);
}

/*
 * <primitive 183> -- not implemented
 */

oop
prim_183()
{
        syserr(msg01, 183);
}

/*
 * <primitive 184> -- not implemented
 */

oop
prim_184()
{
        syserr(msg01, 184);
}

/*
 * <primitive 185> -- not implemented
 */

oop
prim_185()
{
        syserr(msg01, 185);
}

/*
 * <primitive 186> -- not implemented
 */

oop
prim_186()
{
        syserr(msg01, 186);
}

/*
 * <primitive 187> -- not implemented
 */

oop
prim_187()
{
        syserr(msg01, 187);
}

/*
 * <primitive 188> -- not implemented
 */

oop
prim_188()
{
        syserr(msg01, 188);
}

/*
 * <primitive 189> -- not implemented
 */

oop
prim_189()
{
        syserr(msg01, 189);
}

/*
 * <primitive 190> -- not implemented
 */

oop
prim_190()
{
        syserr(msg01, 190);
}

/*
 * <primitive 191> -- not implemented
 */

oop
prim_191()
```

```c
{
        syserr(msg01, 191);
}

/*
 * <primitive 192> -- not implemented
 */

oop
prim_192()
{
        syserr(msg01, 192);
}

/*
 * <primitive 193> -- not implemented
 */

oop
prim_193()
{
        syserr(msg01, 193);
}

/*
 * <primitive 194> -- not implemented
 */

oop
prim_194()
{
        syserr(msg01, 194);
}

/*
 * <primitive 195> -- not implemented
 */

oop
prim_195()
{
        syserr(msg01, 195);
}

/*
 * <primitive 196> -- not implemented
 */

oop
prim_196()
{
        syserr(msg01, 196);
}

int sizeIndex = 0;      /* would normally be in initializeIndicies() */

/*
 * <primitive 197 self> -- Stack addFirst:
 */

oop
prim_197()
{
        register object *self;
        register int size;

        self = GET_RCVR(PRIMARG(0));

        if (self == NULL)
                syserr("prim_197: couldn't fetch self (oop = %d)", PRIMARG(0));

        size = INSTANCE_VARS(self)[sizeIndex];

        if (size == ARRAY_SIZE(self))
                syserr("prim_197: collection is full");

        ARRAY_DATA(self)[size] = PRIMARG(1);

        INSTANCE_VARS(self)[sizeIndex] = size + 1;

        return (self->fp.id);
}

/*
 * <primitive 198 self> -- Stack removeFirst
 */

oop
prim_198()
{
        register object *self;
        register int size;

        self = GET_RCVR(PRIMARG(0));

        if (self == NULL)
                syserr("prim_198: couldn't fetch self (oop = %d)", PRIMARG(0));

        size = INSTANCE_VARS(self)[sizeIndex];

        if (size == 0)
                syserr("prim_198: collection is empty");

        size = size - 1;

        INSTANCE_VARS(self)[sizeIndex] = size;

        return (ARRAY_DATA(self)[size]);
}

/*
 * <primitive 199 self> -- Stack clear
 */

oop
prim_199()
{
        register object *self;

        self = GET_RCVR(PRIMARG(0));

        if (self == NULL)
                syserr("prim_199: couldn't fetch self (oop = %d)", PRIMARG(0));

        INSTANCE_VARS(self)[sizeIndex] = 0;

        return (self->fp.id);
```

Appendix G: Object Manager Souce Code.

=============================================================================== buffer_mgr.c
create_permanent_object.c
dbm.c
debug_misc.c
debug_ostat.c
debugom.c
dictionary.c
fetch_method.c
obj_mgr.c
pool.c
pool_mgr.c
symbol.c
trans_mgr.c

```
/*Copyright 1988 Eastman Kodak Company.  All rights reserved.*/
/* buffer_mgr.c:  manage the buffers */
/****************************************************************
        source code contains:
                buffer_mgr
***************************************************************/

#include "oops_values.h"
#include "types.h"
#include "constants.h"
#include "object_rec.h"
#include "obj_mgr.h"
#include "buffer.h"
#include "pool.h"
#include "dbm.h"
#include <stdio.h>


static char s[100];             /* err msg */
static char *msg01 = "buffer_mgr01: attempt to store obj that already exists:%d";
static char *msg02 = "buffer_mgr02:invalid operation passed: %d";
static char *msg03 = "buffer_mgr03: out of space in obj table %d";
static char *msg04 = "buffer_mgr04: obj table size < qty of objects in buffer";
static char *msg05 =
"buffer_mgr05: logic error: object already in obj table %d";
static char *msg06 =
"buffer_mgr06: logic error: object already in obj table %d";

extern struct in_use_table *set_in_use();
extern int debug_oop;

dbmret fetchit();
char *pool_mgr();
struct in_use_table *change_region();

struct obj_table obj_table[O_TABLE_SIZE];       /* object table, containing
                                                 * pointers to the objects in
                                                 * the buffer, upon which we
                                                 * hash the oop, to get the
                                                 * correct obj_table element
                                                 * index.  This variable is
                                                 * also referenced in the
                                                 * pool manager when space is
                                                 * freed */


/***********************************************************************
                buffer_mgr: maintain buffers
***********************************************************************/

cntrld_object *
buffer_mgr(in_oop, operation, new_obj_ptr, region, pid)

        long in_oop;
        int operation;
        object *new_obj_ptr;    /* points to object to add, when operation is
                                 * STORE, else it is NULL */

        unsigned short region;
        PID pid;


        object *db_obj_ptr, *targ_obj_ptr;
char *char_ptr;
object_control *cntl_ptr;
cntrld_object *cntl_obj_ptr, *old_buf_ptr;
int type, i;
struct in_use_table *in_use;
long *t_ptr, *s_ptr;
struct obj_table *hit, *save;
static int first_time = 1;
dbmret dbmout;

if (first_time == 1)
{
        /* obj_table initialized in obj_mgr */
        if (O_TABLE_SIZE < SO_QTY + MO_QTY + LO_QTY + HUGE_QTY +
          SC_QTY + MC_QTY + LC_QTY)
        {
                /* this check to prevent mis-init of above constants */
                /* see notes in pool.h, buffer.h */
                syserr(msg04);
        }
        first_time = 0;
}

old_buf_ptr = NULL;     /* previous entry in buffer; used in FORCE
                         * logic */


if (operation == FETCH_FROM_DB)
{
        /* determine spot to put object into */

        FIND_OBJ(in_oop, hit)
          if (hit->oop == in_oop)
        {
                syserr(msg05, in_oop);
                syserr(s);
        }
        dbmout = fetchit(OBJ_REC, &in_oop);
        if (dbmout.obj_ptr == NULL /* not found */ )
                return ((cntrld_object *) NULL);
        db_obj_ptr = dbmout.obj_ptr;    /* point to fetched obj */
}                       /* end FETCH_FROM_DB specific logic */

else if (operation == FETCH)
{
        FIND_OBJ(in_oop, hit)
          if (hit->oop == in_oop)
        {
                /* obj table already points to object */
                cntl_obj_ptr = hit->obj_ptr;
                return (cntl_obj_ptr);
        }
        dbmout = fetchit(OBJ_REC, &in_oop);
        if (dbmout.obj_ptr == NULL /* not found */ )
                return ((cntrld object *) NULL);
        db_obj_ptr = dbmout.obj_ptr;    /* point to fetched obj */
}                       /* end FETCH specific logic */

else if (operation == STORE)
{
        FIND_OBJ(in_oop, hit)
          if (hit->oop == in_oop)
        {
                syserr(msg01, in_oop);
```

```
        }
        db_obj_ptr = new_obj_ptr;
}                   /* end STORE specific logic */

else if (operation == FORCE)
{
        FIND_OBJ(in_oop, hit)

        if (hit->oop == in_oop)
        {
                hit->oop = -1;  /* tells logic below to reuse
                                   this slot in  object table */
                cntl_obj_ptr = hit->obj_ptr;
                cntl_obj_ptr->obj.fp.flags =
                  cntl_obj_ptr->obj.fp.flags & ~UPDATED; /* so
                that old copy of obj not put back in db */

                /*
                 * if some other process has  upated, it loses unless
                 * he updates after the current process has FORCED.
                 * In this case, old version of object will be
                 * written.  No concurrency control on processes!
                 */
                IN_USE(cntl_obj_ptr, pid, in_use)
                if (!in_use)
                        {
                        in_use = set_in_use(cntl_obj_ptr, region,
                                pid);
                        in_use -> orig_region = region;
                        }

                /*
                 * This locks down space pointed to by
                 * cntl_obj_ptr so that
                 * application can copy old object to new one.
                 * The in_use table entry pointer will be
                 * adjusted to the new value later.

                 * Backpointer to the now obsolete buffer space
                 * will be cleared in logic below;
                 * NOTE that
                 * old obj_ptr is valid only until next call to
                 * obj_mgr
                 */
                if (in_use->region > region)
                        in_use = change_region(in_oop, pid, region);

                cntl_obj_ptr->cntl.usage_cntr = 0;
                cntl_obj_ptr->cntl.num_new_kids = 0;
                cntl_obj_ptr->cntl.obj_table_ptr = NULL;
                cntl_obj_ptr->cntl.temp_chain_reset = 0;
                        /* invalidate
                        * backpointer from buffer to object_table
                        * slot, so that
                        * pool_mgr does not
                        * attempt to re-free
                        * object table
                        * entry,which could be
                        * re-used as quickly as
                        * the execution of the
                        * logic below, to find
                        * slot in buffers for
                        * new object */
                old_buf_ptr = cntl_obj_ptr;
        }
        db_obj_ptr = new_obj_ptr;
}                   /* end FORCE specific logic */

else
{
        sprintf(s, msg02, operation);
        syserr(s);
}

/*
 * at this point, db_obj_ptr points to an object to add to the
 * buffer, and to add to the object table
 */

/*
 * ask the pool manager for some free space in which to put the newly
 * fetched object
 */
if (db_obj_ptr->fp.class == CompiledMethod)
        type = COMPILE_TYPE;
else
        type = OBJECT_TYPE;
char_ptr = pool_mgr((db_obj_ptr->fp.length), type);  /*note that
        pool_mgr can change object table, by freeing up space and
        NULLing ot pointers, making old value of hit
        invalid.*/

/* find a slot in the object table for the object */
if (old_buf_ptr == NULL)  /*force logic has already determined
        the ot slot: it is the one in use for the old version of the
        obj*/
        for (hit = &obj_table[HASH(in_oop)];
                hit -> oop >= 0 && hit -> fwd_ovfl != NULL;
                                hit = hit -> fwd_ovfl);

if (hit->oop >= 0)
{
        int found = 0;

        /*
         * we cannot use an existing slot in chain for the new
         fetched object.  Get another slot and put it in the
         overflow chain.  */

        for (i = O_TABLE_SIZE -1; i > MAX_OBJECTS; i--)
        {
                if (obj_table[i].oop < 0 /* ok to use */ )
                {
                        obj_table[i].bkwd_ovfl = hit;
                        hit->fwd_ovfl = &obj_table[i];
                        hit = &obj_table[i];
                        found = 1;
                        break;
                }
                else if (obj_table[i].oop == in_oop)
                {
                        sprintf(s, msg06, in_oop);
                        syserr(s);
                }
        }
        if (!found /* no free space in obj_table */ )
        {
                sprintf(s, msg03, O_TABLE_SIZE);
```

```
            syserr(s);
        }
}                           /* end primary slot overflow logic */
hit->oop = in_oop;
hit->obj_ptr = (cntrld_object *) char_ptr;

/* move the fetched object to the buffer space */
targ_obj_ptr = &((hit->obj_ptr)->obj);
bcopy((char *) db_obj_ptr, (char *) targ_obj_ptr,
  db_obj_ptr->fp.length);
cntl_obj_ptr = hit->obj_ptr;
cntl_ptr = &(cntl_obj_ptr->cntl);
cntl_ptr->obj_table_ptr = hit;

/*establish temporary instance chain*/
if (cntl_obj_ptr -> obj.fp.class == cntl_obj_ptr -> obj.fp.id)
        {
        /*a class*/
        cntl_obj_ptr->cntl.temp_inst_chain =
                CLASS_CONTROL(&(cntl_obj_ptr -> obj)) ->
                        cfp.first_inst;
        }
else cntl_obj_ptr -> cntl.temp_inst_chain = cntl_obj_ptr -> obj.fp.
                class_chain;

if (operation == FETCH_FROM_DB)
        cntl_ptr->disk_addr = dbmout.disk_addr;
else if (operation == FETCH)
        cntl_ptr->disk_addr = dbmout.disk_addr;
else if (operation == FORCE)
{
        cntl_ptr->disk_addr = -1;  /*tells trans_mgr to call
                        forceit to put object in db*/
        if (old_buf_ptr == NULL)
                /* old version of object is not in use */
                set_in_use(cntl_obj_ptr, region, pid) ->
                                orig_region = region;
}

if (old_buf_ptr != NULL)
{
        struct in_use_table *in_use_ptr;

        /*
         * If we have FORCEd, update current process's  entry in
         * in_use_table that points to the old buffer slot, to point
         * to the new slot
         */
        cntl_ptr->first_in_use = old_buf_ptr->cntl.
          first_in_use;
        for (in_use_ptr = cntl_ptr->first_in_use;
          in_use_ptr != NULL;
          in_use_ptr = in_use_ptr->obj_fwd_chain)
        {
                in_use_ptr->buffer_ptr = cntl_obj_ptr;
        }

        /* mark old buffer slot as available for reuse */
        old_buf_ptr->cntl.first_in_use = NULL;

        /*
         * set appropriate control data from the old buffer
         */
        cntl_ptr->usage_cntr =
          old_buf_ptr->cnt  usage_cntr;
        cntl_ptr->num_new_  ds =
          old_buf_ptr->cnt  num_new_kids;

        /*temp instance cha   set in force_obj*/

        /*
         * note that if there is another process using the (old)
         * object, a pointer to that old object is in the application
         * space, and we have just invalidated that pointer.  It is
         * important that pgms that use FORCE logic update any
         * pointers that may have pointed to the (old) object. moral:
         * do not use FORCE unless you are sure you are the only
         * user.  Calling pgm should call change_reciever_reference
         * in order to adjust any previous contexts that have this
         * object as a receiver
         */
}

return (cntl_obj_ptr);

}                               /* end proc */
```

```
/*Copyright 1988 Eastman Kodak Company.  All rights reserved.*/
/*************************************************************************
 create_permanent_object: create a permanent object with or without a
                                  specified oop ...
 ************************************************************************/

#include <stdio.h>
#include "types.h"
#include "constants.h"
#include "interp_const.h"
#include "interp_types.h"

extern object *obj_mgr();
extern object *force_obj();
extern object *reserve_obj();

object *
create_permanent_object(operation, class_oop, object_oop, no_index_vars, no_dict_entries,
        int operation;
        oop class_oop;
        oop object_oop;
        int no_index_vars;
        int no_dict_entries;
        unsigned short region;
        PID pid;
{
        object *class_optr;
        object *object_optr;
        class_cntrl *class_control_ptr;
        int dummy_oop = 0;

        if (no_dict_entries >= 0)
        {

                /*
                 * * i don't do classes ... (but probably should!)
                 */

                syserr("create_permanent_object: i don't do classes!");
        }

        switch (operation)
        {
        case NEW:

                if ((object_optr = obj_mgr(class_oop, NEW, no_index_vars, no_dict_entries
                        syserr("create_permanent_object: couldn't create instance of '%s'

                break;

        case FORCE:

                /*
                 * * we force an instance of the desired class by * imitating
                 * the section of NEW logic that sets the * information in
                 * the fixed part of the object header * in the object
                 * manager, (since the object manager doesn't * do any of
                 * these things under the FORCE operation). *
                 *
                 * this duplication of logic is, in my opinion, * rather bad
                 * ... we should really adjust the object manager * interface
                 * to have a combined NEW/FORCE function, or * at least make
                 * this procedure part of the object manager, * factoring out
                 * the common logic into a new procedure.
                 */

                if ((class_optr = reserve_obj(class_oop, 0, 0)) == NULL)
                        syserr("create_permanent_object: couldn't fetch '%s' (oop = %d)",
                if ((object_optr = force_obj(object_oop, class_oop,
                        no_index_vars, 0, 0, 0)) == NULL)
                        syserr("create_permanent_object: couldn't force a new object (oop

                class_control_ptr = CLASS_CONTROL(class_optr);

                object_optr->fp.class = class_optr->fp.id;
                object_optr->fp.ovfl_chain = NULL;
                object_optr->fp.size_ovfl_rec = 0;
                object_optr->fp.rec_type = OBJ_REC;
                object_optr->fp.mark = UNMARKED;
                object_optr->fp.flags = UPDATED | GARBAGE;
                                /*no_indx_vars flag inherited from class*/
                object_optr -> fp.flags |=
                                class_optr -> fp.flags & NO_INDEX_VARS;
                object_optr->fp.no_named_vars = class_control_ptr->cfp.no_nmed_inst;
                object_optr->fp.no_indx_vars = no_index_vars;
                object_optr->fp.id = object_oop;
                object_optr->fp.length = OBJECT_SIZE(object_optr);

                break;

        default:

                return ((object *) NULL);

                break;
        }

        /*
         * * make the object permanent ...
         */

        object_optr->fp.flags |= PERM_OBJ;
        referenced(NULL, object_optr->fp.id, dummy_oop, 0, 0);

        return (object_optr);
```

```
/*Copyright 1988 Eastman Kodak Company.  All rights reserved.*/

/* dbm.c:  database manager access method */

/*************************************************************************
                this source code contains:

                initcall
                storeit
                fetchit
                forceit
                deleteit

                oop_gen
                chckpt_oop
                start_commit
                restartdbm
                startreorg
                next_oop
                bypassdblocks

                audit_obj
                check_store


>Notes:
        1.  Store can be called to add or replace a record, BUT:
            If dbmin.disk_addr is NULL, it is assumed to be an add
            and no checking for old record is done.  AND: if
            disk_addr is provided, it is assumed that the record has
            not grown in length.
        2.  Forceit should be used if the caller is unsure as to whether
            the record already exists, or if it has grown in length.
        3.  Forceit attempts to use the same space for the revised record.
            If the record has shrunk in length, it is possible that the
            size_rec in the key, and size ovfl_rec (in the previous record
            in the overflow chain) will be larger than the true size of
            the new record.  This does not hurt anything, but the true
            size of the record should be obtained from rec.fp.length
            when accuracy is required (e.g. on reorg), and not derived
            from the above fields.

 NB:    These routines go to the database to find overflow chain
        information, even though copies of these records may exist in
        the buffers maintained by obj mgr.  Thus the dbm may not be
        accessing the 'current' info, when it goes to the database.
        The only value that might be a problem is fp.length, since this
        might make fp.size_ovfl_rec out of date in the previous record
        in the overflow chain.  This is ok, since if the length is
        increased, the revised record will not replace the current record
        (and the overflow chain will still be correct in the db), or if
        the length being updated is < the previous length, the only effect
        will be to fetch more bytes that are needed when the previous
        record is accessed next time in the overflow chain.  Note that
        such a case will never read past end of DB, since prime records
        are always after any overflow recs.
*************************************************************************/

#include <sys/file.h>
#include <stdio.h>
#include <strings.h>
#include <errno.h>
#include "types.h"
#include "constants.h"
#include "dbm.h"
#include "obj mgr.h"
#include "oops values.h"

#if DEBUGGER
/**************/
#include "interp_const.h"
#include "interp_types.h"
#include "debug_const.h"
#include "debug types.h"
#include "debug externs.h"
/**************/
#endif

static char s[100];             /* err msg */
static char *msg01 = "initcall01 db open failed in initcall %d ";
static char *msg02 = "storeit02 I/o routine failed %d ";
static char *msg03 = "storeit03 invalid function requested: %d ";
static char *msg04 = "storeit04 invalid record type: %c ";
static char *msg05 = "fetchit05 I/o routine failed: %d ";
static char *msg06 = "storeit06 invalid record type: %c ";
static char *msg07 = "initcall07 no control rec on db %d ";
static char *msg08 = "forceit08 invalid record type: %c ";
static char *msg09 = "chckpt_oop09 I/o routine failed: %d ";
static char *msg10 = "initcall10 DB OUT OF SYNC: execute backup proc";
static char *msg11 = "start_commit11 I/o routine failed %d ";
static char *msg12 = "initcall12 DB reorg in process; system halts";
static char *msg13 = "initcall13 DB in use by another process";
static char *msg14 = "fetchit14 unknown record type in db:%c";
static char *msg15 = "deleteit15 invalid record type: %c ";
static char *msg16 = "deleteit16 attempt to delete non-existing record: %c ";
static char *msg17 = "storeit17 obj %d fails audit %d";
static char *msg18 = "check_store18 invalid record type %d";
static char *msg19 = "check_store19 record to be replaced does not exist %d";
static char *msg20 = "check_store20 new rec length > old rec length %d";
static char *msg21 = "check_store21 old rec id not same as new rec id %d";
static char *msg22 = "storeit22 obj %d fails audit %d";
static char *msg23 = "storeit23 obj %d fails audit %d";

int dbkey, dbprime;
static int first_time = 1;
static int dbreturn, keypos, primepos, auditreturn;
static int single_user_lock = 1;
static key keyrec;
static dbmctl ctl;
static dbmckpt ckpt;
static dbmret dbmout;
static char buffer[MAX_OBJ_SIZE];
static int hashvalue;
static object *obj_ptr;
static dict_xref *dict_ptr;
static symbol_xref *symbol_ptr;
static addr_ctl;
static bypass reorg check = 0;

int ckpt in progress = 0;

reusable oops reuse;
long FirstOop = 0;

/*************************************************************************
                    initcall
*************************************************************************/
```

```
initcall()
{
        dbkey = open(DBKEY, O_RDWR);
        if (dbkey < 0)
        {
                sprintf(s, msg01, 1);
                syserr(s);
        }
        dbprime = open(DBPRIME, O_RDWR);
        if (dbprime < 0)
        {
                sprintf(s, msg01, 2);
                syserr(s);
        }

        if (single_user_lock)
        {
                if (flock(dbkey, LOCK_EX | LOCK_NB) < 0)
                {
                        sprintf(s, msg13);
                        syserr(s);
                }
                if (flock(dbprime, LOCK_EX | LOCK_NB) < 0)
                {
                        sprintf(s, msg13);
                        syserr(s);
                }
        }

        addr_ctl = lseek(dbprime, 0L, L_SET);
        dbreturn = read(dbprime, &ctl, sizeof(ctl));
        if (dbreturn <= 0)
        {
                sprintf(s, msg07, 0);
                syserr(s);
        }

        /* get checkpoint record, which follows control rec */
        dbreturn = read(dbprime, &ckpt, sizeof(ckpt));
        if (dbreturn <= 0)
        {
                sprintf(s, msg07, 0);
                syserr(s);
        }
        if (!bypass_reorg_check)
                if (ctl.last_ckpt != ckpt.last_ckpt)    /* see note in
                                                         * start_commit */
                {
                        sprintf(s, msg10);
                        syserr(s);
                }
        if (!bypass_reorg_check)
                if (ctl.mark == MARKED)
                {
                        sprintf(s, msg12);
                        syserr(s);
                }
        first_time = 0;
        FirstOop = ctl.next_avail_oop;
}

/**********************************************************************
        storeit:  storeit a record away in the db
**********************************************************************/
dbmret
storeit(dbmin)
        dbmret dbmin;
{

#if DEBUGGER
        /****************/
        if (D_ISCSET(D_OSTAT))
        {
                D_ostats.db_store++;
        }
        /****************/
#endif

        if (first_time)
                initcall();

        if (dbmin.disk_addr != NULL || dbmin.obj_ptr->fp.rec_type == CTL_REC)
        {

                /*
                 * place on top of old record: note that the record had
                 * better be <= length of previous record at this address
                 */

#if DEBUGGER
check_store(dbmin);
#endif

                dbreturn = lseek(dbprime, dbmin.disk_addr, L_SET);
                if (dbreturn < 0)
                {
                        sprintf(s, msg02, 0);
                        syserr(s);
                }
#if DEBUGGER
if (auditreturn = audit_obj(dbmin.obj_ptr))
                syserr(msg17,obj_ptr->fp.id, auditreturn);
#endif
                dbreturn = write(dbprime, dbmin.obj_ptr,
                  (int) (dbmin.obj_ptr->fp.length));
                if (dbreturn <= 0)
                {
                        sprintf(s, msg02, 13);
                        syserr(s);
                }
                dbmout.obj_ptr = dbmin.obj_ptr;
                dbmout.disk_addr = dbmin.disk_addr;
                return (dbmout);
        }

        if (dbmin.obj_ptr->fp.rec_type == OBJ_REC)
        {
                hashvalue = OBJHASH(dbmin.obj_ptr->fp.id) * sizeof(keyrec);
                ctl.no_objects++;
        }
        else if (dbmin.obj_ptr->fp.rec_type == SYMBOL_XREF)
        {
                hashvalue = (SYMHASH(((symbol_xref *) dbmin.obj_ptr)->symbol) +
                  OBJKEYSPACE + 1) * sizeof(keyrec);
                ctl.no_symbols++;
        }
        else if (dbmin.obj_ptr->fp.rec_type == DICT_XREF)
        {
```

```
            hashvalue = (SYMHASH(((dict_xref *) dbmin.obj_ptr)->symbol,
              OBJKEYSPACE + 1) * sizeof(keyrec);
            ctl.no_symbols++;
        }

        else
        {
            sprintf(s, msg04, dbmin.obj_ptr->fp.rec_type);
            syserr(s);
        }

        /* get index */
        keypos = lseek(dbkey, hashvalue, L_SET);
        if (keypos < 0)
        {
            sprintf(s, msg02, 2);
            syserr(s);
        }
        dbreturn = read(dbkey, &keyrec, sizeof(keyrec));
        if (dbreturn <= 0)
        {
            sprintf(s, msg02, 1);
            syserr(s);
        }
        if (keyrec.prime_addr == NULL)
        {
            /* no overflow chain, and record does not exist in db */

            primepos = lseek(dbprime, ctl.next_prime_addr, L_SET);
            if (primepos < 0)
            {
                sprintf(s, msg02, 4);
                syserr(s);
            }
#if DEBUGGER
if (auditreturn = audit_obj(dbmin.obj_ptr))
            syserr(msg22,obj_ptr->fp.id, auditreturn);
#endif
            dbreturn = write(dbprime, dbmin.obj_ptr,
              (int) (dbmin.obj_ptr->fp.length));
            if (dbreturn <= 0)
            {
                sprintf(s, msg02, 3);
                syserr(s);
            }
            ctl.next_prime_addr = tell(dbprime, 0L, L_INCR);

            /* update index */
            dbreturn = lseek(dbkey, keypos, L_SET);
            if (dbreturn < 0)
            {
                sprintf(s, msg02, 6);
                syserr(s);
            }
            keyrec.prime_addr = primepos;
            keyrec.size_rec = dbmin.obj_ptr->fp.length;
            keyrec.rec_type = dbmin.obj_ptr->fp.rec_type;
            keyrec.extra = (char) 0;
            dbreturn = write(dbkey, &keyrec, sizeof(keyrec));
            if (dbreturn <= 0)
            {
                sprintf(s, msg04, 2);
                syserr(s);
            }
```

```
            dbmout.obj_ptr = dbmin.obj_ptr;
            dbmout.disk_addr = primepos;
            return (dbmout);
        }

        /* index in use: either record exists, or ovfl chain exists */

        /* get prime record */
        primepos = lseek(dbprime, keyrec.prime_addr, L_SET);
        if (primepos < 0)
        {
            sprintf(s, msg02, 8);
            syserr(s);
        }
        dbreturn = read(dbprime, buffer, (int) keyrec.size_rec);
        if (dbreturn <= 0)
        {
            sprintf(s, msg02, 5);
            syserr(s);
        }
        obj_ptr = (object *) buffer;
        symbol_ptr = (symbol_xref *) buffer;
        dict_ptr = (dict_xref *) buffer;

        /* continue ovfl chain in new record */
#if DEBUGGER
        /***************/
        if (D_ISCSET(D_OSTAT))
        {
            D_ostats.store_ovfl++;
        }
        /* end if */
        /***************/
#endif

        dbmin.obj_ptr->fp.ovfl_chain = primepos;
        dbmin.obj_ptr->fp.size_ovfl_rec = obj_ptr->fp.length;
        primepos = lseek(dbprime, ctl.next_prime_addr, L_SET);
        if (primepos < 0)
        {
            sprintf(s, msg02, 10);
            syserr(s);
        }

#if DEBUGGER
if (auditreturn = audit_obj(dbmin.obj_ptr))
            syserr(msg23,obj_ptr->fp.id, auditreturn);
#endif
        dbreturn = write(dbprime, dbmin.obj_ptr,
                              (int) (dbmin.obj_ptr->fp.length));
        if (dbreturn <= 0)
        {
            sprintf(s, msg02, 7);
            syserr(s);
        }
        ctl.next_prime_addr = tell(dbprime, 0L, L_INCR);

        /* update index */
        dbreturn = lseek(dbkey, keypos, L_SET);
        if (dbreturn < 0)
        {
            sprintf(s, msg02, 12);
            syserr(s);
        }
```

```
	keyrec.prime_addr = primepos;
	keyrec.size_rec = dbmin.obj_ptr->fp.length;
	keyrec.rec_type = dbmin.obj_ptr->fp.rec_type;
	keyrec.extra = (char) 0;
	dbreturn = write(dbkey, &keyrec, sizeof(keyrec));
	if (dbreturn <= 0)
	{
		sprintf(s, msg02, 9);
		syserr(s);
	}
	dbmout.obj_ptr = dbmin.obj_ptr;
	dbmout.disk_addr = primepos;
	return (dbmout);

/**********************************************************************
	fetchit:  fetchit a record from the db
**********************************************************************/
dbmret
fetchit(rec_type, key_ptr)
	char rec_type;
	char *key_ptr;
{
	long oop_key;

#if DEBUGGER
	/*************/
	if (D_ISCSET(D_OSTAT))
	{
		D_ostats.db_fetch++;
	}
	/*************/
#endif

	if (first_time)
		initcall();

	if (rec_type == OBJ_REC)
	{
		oop_key = *((long *) key_ptr);
		hashvalue = OBJHASH(oop_key) * sizeof(keyrec);
	}
	else if (rec_type == SYMBOL_XREF)
		hashvalue = (SYMHASH(key_ptr) + OBJKEYSPACE + 1) *
				sizeof(keyrec);
	else if (rec_type == DICT_XREF)
		hashvalue = (SYMHASH(key_ptr) + OBJKEYSPACE + 1) *
				sizeof(keyrec);
	else if (rec_type == CTL_REC)
	{
		dbmout.obj_ptr = (object *) & ctl;
		dbmout.disk_addr = addr_ctl;
		return (dbmout);
	}
	else
	{
		sprintf(s, msg06, rec_type);
		syserr(s);
	}

	/* get index */
	dbreturn = lseek(dbkey, hashvalue, L_SET);
	if (dbreturn < 0)
	{
		sprintf(s, msg05, 14);
		syserr(s);
	}
	dbreturn = read(dbkey, &keyrec, sizeof(keyrec));
	if (dbreturn <= 0)
	{
		sprintf(s, msg05, 1);
		syserr(s);
	}
	if (keyrec.prime_addr == NULL)
	{
		dbmout.obj_ptr = NULL;
		dbmout.disk_addr = NULL;
		return (dbmout);
	}

	/* get prime record */
	primepos = lseek(dbprime, keyrec.prime_addr, L_SET);
	if (primepos < 0)
	{
		sprintf(s, msg05, 16);
		syserr(s);
	}

	dbreturn = read(dbprime, buffer, (int) keyrec.size_rec);
	obj_ptr = (object *) buffer;
	dict_ptr = (dict_xref *) buffer;
	symbol_ptr = (symbol_xref *) buffer;

	while (1)
	{
		if (dbreturn <= 0)
		{
			sprintf(s, msg05, 11);
			syserr(s);
		}
		if (rec_type == obj_ptr->fp.rec_type)
		{
			if (rec_type == OBJ_REC)
			{
				if (oop_key == obj_ptr->fp.id)
				{
					dbmout.obj_ptr = obj_ptr;
					dbmout.disk_addr = primepos;
					return (dbmout);
				}
			}
			else if (rec_type == SYMBOL_XREF)
			{
				if (strcmp(key_ptr, symbol_ptr->symbol) == 0)
				{
					dbmout.obj_ptr = obj_ptr;
					dbmout.disk_addr = primepos;
					return (dbmout);
				}
			}
			else if (rec_type == DICT_XREF)
			{
				if (strcmp(key_ptr, dict_ptr->symbol) == 0)
				{
					dbmout.obj_ptr = obj_ptr;
					dbmout.disk_addr = primepos;
					return (dbmout);
				}
```

```
		}
		}
		if (obj_ptr->fp.ovfl_chain == NULL)
		{
			dbmout.obj_ptr = NULL;
			dbmout.disk_addr = NULL;
			return (dbmout);
		}
#if DEBUGGER
		/***************/
		if (D_ISCSET(D_OSTAT))
		{
			D_ostats.fetch_ovfl++;
		}
		/* end if */
		/***************/
#endif
		primepos = lseek(dbprime, obj_ptr->fp.ovfl_chain, L_SET);
		if (primepos < 0)
		{
			sprintf(s, msg05, 10);
			syserr(s);
		}
		dbreturn = read(dbprime, buffer,
				(int) (obj_ptr->fp.size_ovfl_rec));
				/* end while(1) */
				/* end fetchit */
	}
}
/**********************************************************************
	forceit:  put a record in the database: replace if already there.
**********************************************************************/

dbmret
forceit(dbmin)
	dbmret dbmin;
{
	dbmret dbmout;
	static char buffer[MAX_OBJ_SIZE];

	if (first_time)
		initcall();

	if (dbmin.obj_ptr->fp.rec_type == OBJ_REC)
		dbmout = fetchit(dbmin.obj_ptr->fp.rec_type, &dbmin.obj_ptr->fp.id);
	else if (dbmin.obj_ptr->fp.rec_type == SYMBOL_XREF)
		dbmout = fetchit(dbmin.obj_ptr->fp.rec_type,
		  ((symbol_xref *) dbmin.obj_ptr)->symbol);
	else if (dbmin.obj_ptr->fp.rec_type == DICT_XREF)
		dbmout = fetchit(dbmin.obj_ptr->fp.rec_type,
		  ((dict_xref *) dbmin.obj_ptr)->symbol);
	else
	{
		sprintf(s, msg08, dbmin.obj_ptr->fp.rec_type);
		syserr(s);
	}

	if (dbmout.obj_ptr == NULL)
	{
	/*record does not exist in db*/
		dbmout = dbmin;
		dbmout.disk_addr = NULL;
		dbmout = storeit(dbmout);
		return (dbmout);
	}

	if (dbmout.obj_ptr->fp.length >= dbmin.obj_ptr->fp.length)
			/* old slot ok */
	{
		dbmin.obj_ptr->fp.ovfl_chain = dbmout.obj_ptr->fp.ovfl_chain;
		dbmin.obj_ptr->fp.size_ovfl_rec =
				dbmout.obj_ptr->fp.size_ovfl_rec;
		/* size not exact, but ok to be longer */

		/*
		 * furthermore, if we replace this record at some future
		 * date, we can make use of all the bytes in the 'hole'
		 */
		dbmout.obj_ptr = dbmin.obj_ptr;
		dbmout = storeit(dbmout);
		return (dbmout);
	}

	/* old record exists in db, but new one will not fit in old space */
	bcopy((char *) dbmout.obj_ptr, (char *) buffer,
			dbmout.obj_ptr->fp.length);
	dbmout.obj_ptr = (object *) buffer;
	dbmout.obj_ptr->fp.rec_type = DELETED_REC;	/* logical delete, so
							 * that overflow chain
							 * is preserved */
	dbmout = storeit(dbmout);	/* replace old record */
	dbmin.disk_addr = NULL;
	dbmout = storeit(dbmin);
	return (dbmout);
}

/**********************************************************************
	deleteit:  logically delete a record in the database
**********************************************************************/

dbmret
deleteit(dbmin)
	dbmret dbmin;
{
	dbmret dbmout;
	static char buffer[MAX_OBJ_SIZE];

	if (first_time)
		initcall();

	if (dbmin.obj_ptr->fp.rec_type == OBJ_REC)
		dbmout = fetchit(dbmin.obj_ptr->fp.rec_type, &dbmin.obj_ptr->fp.id);
	else if (dbmin.obj_ptr->fp.rec_type == SYMBOL_XREF)
		dbmout = fetchit(dbmin.obj_ptr->fp.rec_type,
		  ((symbol_xref *) dbmin.obj_ptr)->symbol);
	else if (dbmin.obj_ptr->fp.rec_type == DICT_XREF)
		dbmout = fetchit(dbmin.obj_ptr->fp.rec_type,
		  ((dict_xref *) dbmin.obj_ptr)->symbol);
	else
	{
		sprintf(s, msg15, dbmin.obj_ptr->fp.rec_type);
		syserr(s);
	}

	if (dbmout.obj_ptr == NULL)
	{
	/*record does not exist in db*/
		sprintf(s, msg16, dbmin.obj_ptr->fp.rec_type);
```

```
                sysert(s);
        }

        dbmout.obj ptr->fp.rec type - DELETED REC;      /* logical delete, so
                                                         * that overflow chain
                                                         * is preserved */
        dbmout = storeit(dbmout);       /* replace old record */
        return (dbmout);
}

/**********************************************************************
        oop gen:  get another oop id
**********************************************************************/

long
oop_gen()
{
        int return_oop;

        if (first_time)
                initcall();

        /*
         * ckpt_mgr returns reusable oop to the system via table reuse.  We
         * check there before generating a new oop
         */

        return_oop = reuse.old_oops[reuse.take];
        /*set return_oop = 0 to defeat oop reuse, which is handy for
        debugging thus:

        return_oop = 0;

        */

        if (return_oop != 0)
        {
                reuse.old_oops[reuse.take] = 0;
                reuse.take++;
                if (reuse.take >= MAX_OLD_OOPS)
                        reuse.take = 0;
                return (return_oop);
        }

        reuse.give = reuse.take;/* put any new reusable oops in next spot
                                 * from which oop gen will take one */

        return (++ctl.next_avail_oop);
}

/**********************************************************************
        next_oop:  report back the next oop that will be generated
**********************************************************************/

long
next_oop()
{
        int return_oop;

        if (first_time)
                initcall();
        return_oop = reuse.old_oops[reuse.take];
        if (return_oop != 0)
                return (return_oop);

        return (ctl.next_avail_oop);
}

/**********************************************************************
        chckpt_oop:  wrap up checkpoint: write control rec, flush buffers.
                     This function is used by other routines to force
                     the control record to the database, when objects
                     have been put to db using low level routines
                     (forceit, storeit).  This protects against invalid
                     db vs control record, if a program abends.
**********************************************************************/

void
chckpt_oop()                    /* checkpoint the database */

{
/*at such a time as we install logging to recover from aborted commits,
we will need to flush the control record at start/end commit time (could
be written to a separate file to minimize flush time.*/

        if (first_time)
                initcall();
        dbreturn = lseek(dbprime, (long) 0, L_SET);
        if (dbreturn < 0)
        {
                sprintf(s, msg02, 20);
                syserr(s);
        }

        dbreturn = write(dbprime, &ctl, sizeof(ctl));
        if (dbreturn <= 0)
        {
                sprintf(s, msg09, 0);
                syserr(s);
        }

        ckpt_in_progress = 0;
}

/**********************************************************************
        start_commit:  start the commit processing: write control rec.
**********************************************************************/

void
start_commit()

{

        /*
         * The ckpt record is compared with the control record (which is put
         * out as the last task in taking a checkpoint), at start-up time.
         * If last_ckpt does not match in the two records, it means that the
         * system failed in the midst of doing a checkpoint.  If they are
         * equal, it means that the ckpt operation completed atomically
         */

        if (first_time)
                initcall();

        ckpt.last_ckpt++;
        ctl.last_ckpt = ckpt.last_ckpt;
```

```
        dbreturn = lseek(dbprime, sizeof(ctl), L_SET);  /* ckpt assumed to
                                                         * follow ctl */
        if (dbreturn < 0)
        {
                sprintf(s, msg02, 22);
                syserr(s);
        }

        dbreturn = write(dbprime, &ckpt, sizeof(ckpt));

        if (dbreturn <= 0)
        {
                sprintf(s, msg11, 0);
                syserr(s);
        }
        ckpt_in_progress = 1;
}
/**************************************************************
        restartdbm:  restart access method
**************************************************************/
restartdbm()
{
        first_time = 1;
}
/**************************************************************
        startreorg:  logic to enable reorg to start
**************************************************************/
startreorg()
{
        bypass_reorg_check = 1; /* reorg takes care of check */
}

/**************************************************************
        bypassdblocks:  bypass single-user lock on db
**************************************************************/
bypassdblocks()
{
        /****only readers-only, like listdb, should call this fuction***/
        single_user_lock = 0;
}

/**************************************************************
        audit_obj:  audit the record about to be written (debug only)
**************************************************************/
int
audit_obj(obj_ptr)
object * obj_ptr;
{
symbol_xref * symbol_ptr;
dict_xref * dict_ptr;

symbol_ptr = (symbol_xref * ) obj_ptr;
dict_ptr = (dict_xref * ) obj_ptr;

        if (obj_ptr -> fp.ovfl_chain < 0)
                return(1);
        if (obj_ptr -> fp.ovfl_chain > 900000000)
                return(2);
        if (obj_ptr -> fp.size_ovfl_rec > 900000)
                return(3);
        if (obj_ptr -> fp.size_ovfl_rec < 0)
                return(4);
        if (obj_ptr -> fp.length <= 0)
                return(23);

        if (obj_ptr->fp.rec_type == OBJ_REC)
        {
                if (obj_ptr -> fp.no_named_vars < 0)
                        return(5);
                if (obj_ptr -> fp.no_named_vars > 100)
                        return(6);
                if (obj_ptr -> fp.no_indx_vars < 0 )
                        return(7);
                if (obj_ptr -> fp.no_indx_vars > 32402 )
                        return(8);
                if (obj_ptr -> fp.class > 900000 )
                        return(9);
                if (obj_ptr -> fp.class < 255)
                        return(10);
                if (obj_ptr -> fp.class == 65536)
                        return(11);
                if (obj_ptr -> fp.id < 0)
                        return(12);
                if (obj_ptr -> fp.id > 900000)
                        return(13);
                if (obj_ptr -> fp.class_chain > 900000)
                        return(14);
                if (obj_ptr -> fp.class_chain < -1)
                        return(15);
        }
        else if (obj_ptr->fp.rec_type == SYMBOL_XREF)
        {
                if (symbol_ptr -> fp.symbol_oop > 900000)
                        return(16);
                if (symbol_ptr -> fp.symbol_oop < 0)
                        return(17);
        }
        else if (obj_ptr->fp.rec_type == DICT_XREF)
        {
#if 0
                if (dict_ptr -> fp.object_oop < 0)
                        return(18);
#endif
                if (dict_ptr -> fp.object_oop > 900000)
                        return(19);
                if (dict_ptr -> fp.symbol_oop > 900000)
                        return(20);
                if (dict_ptr -> fp.symbol_oop < 0)
                        return(21);
        }
        else if (obj_ptr->fp.rec_type == CTL_REC);
        else if (obj_ptr->fp.rec_type == DELETED_REC);
        else return(22);
return(0);
}

/**************************************************************
        check_store:  check to see new record has length <= old record
                        length (debug only)
**************************************************************/
check_store(dbmin)
dbmret dbmin;
{
dbmret dbmout;
        if (dbmin.disk_addr == 65535)
                syserr(msg18,10);
        if (dbmin.obj_ptr->fp.rec_type == CTL_REC)
                return;
```

```
if (dbmin.obj_ptr->fp.rec_type == DELETED_REC)
        return;
if (dbmin.obj_ptr->fp.rec_type == OBJ_REC)
        {
        dbmout =
        fetchit(dbmin.obj_ptr->fp.rec_type, &dbmin.obj_ptr->fp.id);
        if (dbmout.obj_ptr -> fp.id != dbmin.obj_ptr -> fp.id)
                syserr(msg21, dbmin.obj_ptr->fp.id);
        }
else if (dbmin.obj_ptr->fp.rec_type == SYMBOL_XREF)
        dbmout = fetchit(dbmin.obj_ptr->fp.rec_type,
          ((symbol_xref *) dbmin.obj_ptr)->symbol);
else if (dbmin.obj_ptr->fp.rec_type == DICT_XREF)
        dbmout = fetchit(dbmin.obj_ptr->fp.rec_type,
          ((dict_xref *) dbmin.obj_ptr)->symbol);
else
        syserr(msg18, dbmin.obj_ptr->fp.rec_type);

if (dbmout.obj_ptr == NULL)
        syserr(msg19, dbmin.obj_ptr->fp.rec_type);

if (dbmout.obj_ptr->fp.length < dbmin.obj_ptr->fp.length)
        syserr(msg20, dbmin.obj_ptr->fp.rec_type);
```

```
/*Copyright 1988 Eastman Kodak Company.  All rights reserved.*/
#if DEBUGGER
/*****************************************************************
debug_misc.c

        THIS MODULE CONTAINS:

                cntx_to_msg ( )
                d_not_started_err ( )
                d_done_err ( )
                d_not_valid_err ( )

*****************************************************************/

#include <stdio.h>

#include "types.h"
#include "constants.h"
#include "symbol_db.h"
#include "oops_values.h"
#include "interp_const.h"
#include "interp_types.h"

#include "debug_const.h"
#include "debug_types.h"
#include "debug_externs.h"

extern struct process *Cur_process;

extern char *get_class_name();
extern char *get_symbol_string();


/*****************************************************************/
d_msg_struct
cntx_to_msg(a_cntx)

/*
 * For a given context, determine the class of the receiver, class in which
 * the message is resolved, and the selector symbol - all as C-language
 * strings.  Also, save the context type (method or block) and the indent
 * level; these are both used by routines that print out message info for
 * debugging. ( see print_msg, d_print_message, d_stop_in, and d_where. )
 *
*****************************************************************/

        cntx *a_cntx;

{
        oop             rcvr_class_oop;
        object          *compiled_obj;
        oop             meth_class_oop;
        oop             sel_sym_oop;
        d_msg_struct    msg;

        /*------------------ START OF EXECUTABLE CODE ---------------------*/

        /* Get the oop of the receiver's class. */

        if (a_cntx->ctrl_vars.rcvr_oop < 0)
        {
                rcvr_class_oop = Integer;
        }
        else if (a_cntx->ctrl_vars.rcvr_oop >= INIT_CNTX_ID)
        {
                rcvr_class_oop = RTBlock;
        }
        else
        {

                /*
                 * * special case for the initial dummy context ...
                 */

                if (a_cntx->ctrl_vars.rcvr_ptr == NULL)
                {
                        msg.cntx_type = RTMethodContext;
                        msg.rcvr_class = "IguanaLand";
                        msg.meth_class = "IguanaLand";
                        msg.selector = "Iguana";
                        msg.indent = 0;
                        msg.linenum = 0;

                        return (msg);
                }

                rcvr_class_oop = (a_cntx->ctrl_vars.rcvr_ptr)->fp.class;
        }
        /* endif */

        /*
         * Get pointer to compiled method associated with the context of
         * interest.
         */

        compiled_obj = a_cntx->ctrl_vars.code_ptr;


        /*
         * From the compiled method, get the oops of its class and its
         * selector symbol.
         */

        meth_class_oop = compiled_obj->
          value[name_to_slot(CompiledMethod, "classOop")];

        sel_sym_oop = compiled_obj->
          value[name_to_slot(CompiledMethod, "selectorSymbolOop")];


        /*
         * Six values need to be saved in a structure, and then returned: 1)
         * the class of the context (method or block); 2) a pointer to a
         * C-string for the receiver's class; 3) a pointer to a C-string for
         * the method's class (i.e., the class in which the message is
         * resolved); 4) a pointer to a C-string for the selector; 5) the
         * indent level for printing this message. 6) the line number of the
         * sending method in which this message is found.
         */

        msg.cntx_type = a_cntx->obj_hdr.class;

        msg.rcvr_class = get_class_name(rcvr_class_oop);

        msg.meth_class = get_class_name(meth_class_oop);

        msg.selector = get_symbol_string(sel_sym_oop,
```

```
        Cur_process->region_cntr, Cur_process->proc_id);

        msg.indent = a_cntx->obj_hdr.id;

        msg.linenum = a_cntx->ctrl_vars.linenum;


        return (msg);
}


/*****************************************************************/

void
d_not_started_err()

/*
 * Called by those commands which cannot be run until we have started the
 * interpreter.  Examples are RUN, RERUN, RESTART, and QUIT.
 */

/*****************************************************************/
{
        printf("\n*** This command cannot be run until the interpreter has been started.\

        D_in_debugger = 1;

        return;
}


/*****************************************************************/

void
d_done_err()

/*
 * Called by those commands which cannot be run if the interpreter is done
 * executing.  Examples are BCODE_STEP, MSG_STEP, GOTO, SKIP_MSG, CONTINUE,
 * NEXT_MSG, WHERE.
 */

/*****************************************************************/
{
        printf("\n*** Execution complete. Only the following commands are valid:\n\tRESTA

        D_in_debugger = 1;

        return;
}


/*****************************************************************/

void
d_not_valid_err()

/*
 * Called when syserr has detected an error, and the interpreter has not
 * started.  In such a situation, RESTART AND RERUN cannot be used.
 */

/*****************************************************************/
{
        printf("\n*** RERUN and RESTART cannot be used because of the previous error.  Us

        D_in_debugger = 1;

        return;
}
#endif DEBUGGER
```

```
/*Copyright 1988 Eastman Kodak Company.  All rights reserved.*/
#if DEBUGGER
/*******************************************************************
debug_ostat:c  object manager statistics

This module contains:

                d_ostat_print ( )
                d_ostat_reset ( )
                d_ostat_on ( )
                d_ostat_off ( )
                d_obuf_cnt_upd ( )
                d_water_mark ( )
                d_ostat_init ( )

*******************************************************************/

#include <stdio.h>

#include "types.h"
#include "constants.h"
#include "macros.h"
#include "symbol_db.h"
#include "oops_values.h"
#include "interp_const.h"
#include "interp_types.h"
#include "bytecodes.h"

#include <time.h>
#include "obj_mgr.h"
#include "object_rec.h"
#include "pool.h"

#include "debug_const.h"
#include "debug_types.h"

/*
 * Note that this is where all the Debugger variables are allocated and
 * initialized.  All other routines that use these variables use the include
 * file "debug_externs.h" which simply declares all these as 'extern'.  See
 * that file for a description of these variables.
 */

long                    D_display_switches;
long                    D_control_switches;
short                   D_reprompt_flag;
short                   D_syntax_error;
short                   D_in_debugger;

d_stop_in_struct        D_stop_in_data;
d_mark_struct           D_mark_data;
d_stat_tab_struct       D_stat_tab;
d_stat_stack_struct     D_stat_stack[MAX_PROCESSES];
d_ostat_struct          D_ostats;
d_ostat_struct          D_obuffer_cnts; /* used by d water mark routines */

bcode                   *D_cur_bcode;
cntx                    *D_cur_cntx;
d_ret_from_struct       D_ret_from;
struct init_vals        D_init_vals;
bcode                   D_stop_at_bcode = 0;
d_goto_skip_struct      D_goto_skip = {-1, -1};
cntx                    *D_base_cntx = NULL;

/*--------------------------------------------------------------*/
/******************************************************************
******
******  ROUTINE FOR THE RAID COMMAND 'ostat_print'.
******
*****************************************************************/

d_ostat_print(output_file_name)

        char *output_file_name;
{
        int i, j, k, prev;
        static int deciles[10];
        FILE *fopen();
        FILE *statout = stdout;
        long clock;

        /*--------------------------------------------------------------------*/

        if (output_file_name != NULL)
        {
                if ((statout = fopen(output_file_name, "a+")) == NULL)
                {
                        printf("*** ERROR *** Couldn't open file '%s'\n",
                          output_file_name);
                        return;
                }
                /* end if */
        }
        /* end if */

        clock = time(NULL);

        fprintf(statout, "\n
```

```
\n\t\tOBJECT MANAGER STATS %s\n\n", ctime(&clock));
	fprintf(statout, "\nobj_mgr.reserves %d\n", D_ostats.reserves);
	fprintf(statout, "obj_mgr.fetches %d\n", D_ostats.fetches);
	fprintf(statout, "obj_mgr.news %d\n", D_ostats.news);
	fprintf(statout, "obj_mgr.forces %d\n", D_ostats.forces);
	fprintf(statout, "collector.gc_calls %d\n", D_ostats.collector);
	fprintf(statout, "collector.clean_region %d\n", D_ostats.clean_region);
	fprintf(statout, "trans_mgr.commit %d\n", D_ostats.commit);
	fprintf(statout, "trans_mgr.abort %d\n", D_ostats.abort);
	fprintf(statout, "\naccess stats:\n");
	fprintf(statout, "	db_store %d\n", D_ostats.db_store);
	fprintf(statout, "	db_fetch %d\n", D_ostats.db_fetch);
	fprintf(statout, "	db_delete %d\n", D_ostats.db_delete);
	fprintf(statout, "	ovfl recs accessed %d\n", D_ostats.fetch_ovfl);
	fprintf(statout, "	ovfl recs stored %d\n", D_ostats.store_ovfl);
	fprintf(statout, "	method buffer slots reused %d\n",
	  D_ostats.meth_slots_reused);
	fprintf(statout,
		"fetch_method.selector cache %d\n", D_ostats.sel_cache);
	fprintf(statout, "fetch_method.chain=1 %d\n", D_ostats.fetch_meth1);
	fprintf(statout, "fetch_method.chain>1 %d\n", D_ostats.fetch_meth2);

	fprintf(statout, "\npinned object high water marks:\n");
	fprintf(statout, "	oversize methods: %d\n", D_ostats.over_meths);
	fprintf(statout, "	large    methods: %d\n", D_ostats.large_meths);
	fprintf(statout, "	medium   methods: %d\n", D_ostats.medium_meths);
	fprintf(statout, "	small    methods: %d\n", D_ostats.small_meths);
	fprintf(statout, "	oversize objects: %d\n", D_ostats.over_objs);
	fprintf(statout, "	large    objects: %d\n", D_ostats.large_objs);
	fprintf(statout, "	medium   objects: %d\n", D_ostats.medium_objs);
	fprintf(statout, "	small    objects: %d\n", D_ostats.small_objs);

	fprintf(statout, "\noversize object sizes:\n");
	fprintf(statout, "	largest  oversize method: %d\n",
	  D_ostats.largest_over_meth);
	fprintf(statout, "	smallest oversize method: %d\n",
	  D_ostats.smallest_over_meth);
	fprintf(statout, "	avg      oversize method: %d\n",
	  D_ostats.avg_over_meth);
	fprintf(statout, "	largest  oversize obj: %d\n",
	  D_ostats.largest_over_obj);
	fprintf(statout, "	smallest oversize obj: %d\n",
	  D_ostats.smallest_over_obj);
	fprintf(statout, "	avg      oversize obj: %d\n",
	  D_ostats.avg_over_obj);

	fprintf(statout,
	  "\n\nmethod size deciles over %d total methods (#meths<#bytes):\n",
	  D_ostats.qty_meths);
	for (i = 1; i < 11; i++)
	{
		deciles[i - 1] = (i * D_ostats.qty_meths) / 10;
	}

	j = 0;
	prev = k = D_ostats.meth_sizes[0];
	for (i = 1; i < METH_GRAIN; i++)
	{
		k = k + D_ostats.meth_sizes[i];
		if (k >= deciles[j])
		{
			j++;
			fprintf(statout, "%d<%d ", prev, (i - 1) * METH_SCALE);
		}
		if (k == deciles[9])
			break;
		prev = k;
	}

	fprintf(statout,
	  "\n\nobject size deciles over %d total objects (#objs<#bytes):\n",
	  D_ostats.qty_objs);
	for (i = 1; i < 11; i++)
	{
		deciles[i - 1] = (i * D_ostats.qty_objs) / 10;
	}

	j = 0;
	prev = k = D_ostats.obj_sizes[0];
	for (i = 1; i < OBJ_GRAIN; i++)
	{
		k = k + D_ostats.obj_sizes[i];
		if (k >= deciles[j])
		{
			j++;
			fprintf(statout, "%d<%d ", prev, (i - 1) * OBJ_SCALE);
		}
		if (k == deciles[9])
			break;
		prev = k;
	}
	fprintf(statout, "\n");
	fprintf(statout, "End of Report\n");

	if (statout != stdout)
	{
		fclose(statout);
	}
	/* end if */

	D_in_debugger = 1;

	return;
}


/*-------------------------------------------------------------*/

/***************************************************************
******
******	ROUTINE FOR THE RAID COMMAND 'ostat_reset'.
******
***************************************************************/

d_ostat_reset ()

{
	if (D_ISCSET(D_DONE))
	{
		d_done_err();
	}
	else
	{
		d_ostat_init();
	}
	/* end if */
```

```
        D_in_debugger = 1;

        return;
}

/*----------------------------------------------------------------*/
/******************************************************************
******
******  ROUTINE FOR THE RAID COMMAND 'ostat_on'.
******
******************************************************************/

d_ostat_on()

{
        if (D_ISCSET(D_DONE))
        {
                d_done_err();
        }
        else
        {
                D_CSET(D_OSTAT);
        }
        /* end if */

        D_in_debugger = 1;

        return;
}

/*----------------------------------------------------------------*/
/******************************************************************
******
******  ROUTINE FOR THE RAID COMMAND 'ostat_off'.
******
******************************************************************/

d_ostat_off()

{
        if (D_ISCSET(D_DONE))
        {
                d_done_err();
        }
        else
        {
                D_CRESET(D_OSTAT);
        }
        /* end if */

        D_in_debugger = 1;

        return;
}

/******************************************************************
******
******          d_obuf_cnt_upd:  update object buffer counts
******
******************************************************************/

d_obuf_cnt_upd(buffer_ptr, tally)

        short tally;
        cntrld_object *buffer_ptr;
{

        /*----------------------------------------------------------------*/

        if (buffer_ptr->obj.fp.class == CompiledMethod)
        {
                if (buffer_ptr->obj.fp.length <= sizeof(small_c))
                {
                        D_obuffer_cnts.small_meths += tally;
                }               /* end small  compile */

                else if (buffer_ptr->obj.fp.length <= sizeof(medium_c))
                {
                        D_obuffer_cnts.medium_meths += tally;
                }               /* end medium  compile */

                else if (buffer_ptr->obj.fp.length <= sizeof(large_c))
                {
                        D_obuffer_cnts.large_meths += tally;
                }               /* end large  compile */

                else
                {
                        D_obuffer_cnts.over_meths += tally;
                }
                return;
        }

        if (buffer_ptr->obj.fp.length <= sizeof(small_o))
        {
                D_obuffer_cnts.small_objs += tally;
        }               /* end small  object */

        else if (buffer_ptr->obj.fp.length <= sizeof(medium_o))
        {
                D_obuffer_cnts.medium_objs += tally;
        }               /* end medium  object */

        else if (buffer_ptr->obj.fp.length <= sizeof(large_o))
        {
                D_obuffer_cnts.large_objs += tally;
        }               /* end large  object */

        else
        {
                D_obuffer_cnts.over_objs += tally;
        }
        return;
}

/******************************************************************
******
******          d_water_mark:  update high water mark stats
******
******************************************************************/

d_water_mark(buffer_ptr)
```

```
        cntrld object *buffer ptr;
{

        /*-----------------------------------------------------------------------*/

        if (buffer_ptr->obj.fp.class == CompiledMethod)
        {
                if (buffer_ptr->obj.fp.length <= sizeof(small_c))
                {
                        if (D_obuffer_cnts.small_meths > D_ostats.small_meths)
                                D_ostats.small_meths = D_obuffer_cnts.small_meths;
                }               /* end small  compile */

                else if (buffer_ptr->obj.fp.length <= sizeof(medium_c))
                {
                        if (D_obuffer_cnts.medium_meths > D_ostats.medium_meths)
                                D_ostats.medium_meths = D_obuffer_cnts.medium_meths;
                }               /* end medium  compile */

                else if (buffer_ptr->obj.fp.length <= sizeof(large_c))
                {
                        if (D_obuffer_cnts.large_meths > D_ostats.large_meths)
                                D_ostats.large_meths = D_obuffer_cnts.large_meths;
                }               /* end large  compile */

                else
                {
                        if (D_obuffer_cnts.over_meths > D_ostats.over_meths)
                                D_ostats.over_meths = D_obuffer_cnts.over_meths;
                }
                return;
        }

        if (buffer_ptr->obj.fp.length <= sizeof(small_o))
        {
                if (D_obuffer_cnts.small_objs > D_ostats.small_objs)
                        D_ostats.small_objs = D_obuffer_cnts.small_objs;
        }                       /* end small  object */

        else if (buffer_ptr->obj.fp.length <= sizeof(medium_o))
        {
                if (D_obuffer_cnts.medium_objs > D_ostats.medium_objs)
                        D_ostats.medium_objs = D_obuffer_cnts.medium_objs;
        }                       /* end medium  object */

        else if (buffer_ptr->obj.fp.length <= sizeof(large_o))
        {
                if (D_obuffer_cnts.large_objs > D_ostats.large_objs)
                        D_ostats.large_objs = D_obuffer_cnts.large_objs;
        }                       /* end large  object */

        else
        {
                if (D_obuffer_cnts.over_objs > D_ostats.over_objs)
                        D_ostats.over_objs = D_obuffer_cnts.over_objs;
        }
        return;
}

/*********************************************************************
******
******  ROUTINE FOR INITIALIZING OSTATS
```

```
******
*********************************************************************/

d_ostat_init()

{
        char *b;
        int length;

        /*-----------------*/

        b = (char *) &D_ostats;
        length = sizeof(d_ostat_struct);

        bzero(b, length);

        return;
}

/*-----------------------------------------------------------------*/
#endif DEBUGGER
```

```
/*Copyright 1988 Eastman Kodak Company.  All rights reserved.*/
/*
 * debugom.c:  routines to debug obj mgr pgms (call from dbx to look at
 * tables, etc
 */

/*************************************************************************
        This source code contains:
        list_lu
        list_region
        debugit
        where
        check_lu
        check_oop
        check_class_chain
        list_ot
        parent
        check_buffers

*************************************************************************/

#include <stdio.h>
#include "types.h"
#include "constants.h"
#include "object_rec.h"
#include "obj_mgr.h"
#include "buffer.h"

extern struct in_use_table in_use[MAX_HELD_OBJ];
extern struct process_data proc_data[MAX_PROCESSES];
int debug_oop = 7719;           /* debug */
int TraceOn;                    /* turn on before init_om is executed to get
                                 * object manager trace */
FILE *Tracer;

extern struct obj_table obj_table[O_TABLE_SIZE];        /* see buffer mgr for
                                                         * details */
void debugit();
object *get_obj();
int audit_obj();
int listdb2();

/*********************************************************************
                list_region:  use in dbx for listing in_use table, specific
                        region.
*********************************************************************/

int
list_region(region, pid)
        PID pid;
        int region;
{
        object *obj_ptr;
        struct in_use_table *use_ptr;
        cntrld object *cntl_obj_ptr;
        struct obj_table *tbl_ptr;
        int cntr = 0;

        for (use_ptr = proc_data[pid].pid_tail; use_ptr != NULL;
          use_ptr = use_ptr->pid_bkwd_chain)
        {
                cntr++;
                if (use_ptr->region == region)
                {
                        obj_ptr = &(use_ptr->buffer_ptr->obj);
                        printf("%d, oop %d, flags %d, region %d  \n",
                          use_ptr->slot_id,
                          obj_ptr->fp.id,
                          obj_ptr->fp.flags,
                          use_ptr->region);
                }
        }
        printf("%d objects in region %d process % d \n", cntr,
          region, pid);

}                               /* end proc */

/*********************************************************************
                list_lu:  use in dbx for listing in_use table
*********************************************************************/

int
list_lu(pid)
        PID pid;
{
        object *obj_ptr;
        struct in_use_table *use_ptr;
        cntrld object *cntl_obj_ptr;
        struct obj_table *tbl_ptr;
        int cntr = 0;
        int no_non_garb = 0;

        for (use_ptr = proc_data[pid].pid_tail; use_ptr != NULL;
          use_ptr = use_ptr->pid_bkwd_chain)
        {
                cntr++;
                obj_ptr = &(use_ptr->buffer_ptr->obj);
                if (!(obj_ptr->fp.flags & GARBAGE))
                        no_non_garb++;
                printf("%d, oop %d, flags %d, mark %X,  region %d  \n",
                  use_ptr->slot_id,
                  obj_ptr->fp.id,
                  obj_ptr->fp.flags,
                  obj_ptr->fp.mark,
                  use_ptr->region);
        }
        printf("%d objects in process %d, %d are not garbage\n\n", cntr,
          pid, no_non_garb);

}                               /* end proc */

/*********************************************************************
                where:  use in dbx for finding table entries.
*********************************************************************/

int
where(oop)
        int oop;
{
        object *obj_ptr;
        struct in_use_table *use_ptr;
        cntrld object *cntl_obj_ptr;
        struct obj_table *obj_tbl_ptr, *save;
        int cntr = 0;
        PID pid;
```

```
printf("searching object table...\n");

for (cntr = 0; cntr < O_TABLE_SIZE; cntr++)
{
        if (oop == obj_table[cntr].oop)
        {
                obj_ptr = &obj_table[cntr].obj_ptr->obj;
                printf("%d, oop %d, flags %d \n",
                  cntr,
                  obj_ptr->fp.id,
                  obj_ptr->fp.flags);
        }
}

printf("call macro FIND_OBJ ...\n");

/*in order to dbx the macro, we include its code here*/
for ((obj_tbl_ptr) = &obj_table[HASH(oop)];
        (obj_tbl_ptr)->oop != oop && (obj_tbl_ptr) ->
                        fwd_ovfl != NULL ;
        (obj_tbl_ptr) = (obj_tbl_ptr) -> fwd_ovfl);

FIND_OBJ(oop, obj_tbl_ptr)
  printf("FIND_OBJ returned %d\n", obj_tbl_ptr->oop);

printf("searching in_use table via obj chain...\n");
FIND_OBJ(oop, obj_tbl_ptr)
  if (obj_tbl_ptr != NULL && obj_tbl_ptr->oop == oop)
{
        for (use_ptr = obj_tbl_ptr->obj_ptr->cntl.first_in_use;
          use_ptr != NULL;
          use_ptr = use_ptr->obj_fwd_chain)
        {
                printf("%d, oop %d, flags %d, region %d process %d  \n",
                  use_ptr->slot_id,
                  obj_ptr->fp.id,
                  obj_ptr->fp.flags,
                  use_ptr->region,
                  use_ptr->pid);
        }

}

printf("searching in_use table via pid chains...\n");
for (pid = 0; pid < MAX_PROCESSES; pid++)
{
        if (proc_data[pid].pid_tail != NULL)
        {
                printf("\tsearching process %d\n", pid);
                for (use_ptr = proc_data[pid].pid_tail;
                  use_ptr != NULL;
                  use_ptr = use_ptr->pid_bkwd_chain)

                        if (use_ptr->buffer_ptr->obj.fp.id == oop)
                                printf("\t%d, oop %d, flags %d, region %d process
                                  use_ptr->slot_id,
                                  obj_ptr->fp.id,
                                  obj_ptr->fp.flags,
                                  use_ptr->region,
                                  use_ptr->pid);
        }
}
}                       /* end proc */

/***********************************************************************
                check_iu:  in_use integrity checker
***********************************************************************/

int
check_iu()
{
        object *obj_ptr;
        struct in_use_table *use_ptr, *use_ptr2;
        cntrld_object *cntl_obj_ptr;
        struct obj_table *tbl_ptr;
        PID pid;
        int i;
        int cntr, cntr2;
        int ret_cde = 0;

        for (pid = 0; pid < MAX_PROCESSES; pid++)
        {
                for (use_ptr = proc_data[pid].pid_tail; use_ptr != NULL;
                  use_ptr = use_ptr->pid_bkwd_chain)
                {
                        obj_ptr = &(use_ptr->buffer_ptr->obj);
                        cntr = 1;       /* one occurrence of this object in
                                         * pid chain */
                        if (use_ptr->pid_bkwd_chain != NULL)
                                if (use_ptr->pid_bkwd_chain->region >
                                  use_ptr->region)
                                {
                                        printf("in_use table out of seq:\n");
                                        printf(
                                          "%d, oop %d, flags %d, region %d \n",
                                          use_ptr->slot_id,
                                          obj_ptr->fp.id,
                                          obj_ptr->fp.flags,
                                          use_ptr->region);
                                        debugit(obj_ptr->fp.id);
                                        ret_cde = 1;
                                }
                        for (i = 0; i < MAX_HELD_OBJ; i++)
                        {
                                if (in_use[i].slot_id > 0 &&
                                  in_use[i].slot_id != use_ptr->slot_id)
                                {
                                        if (use_ptr->pid == in_use[i].pid &&
                                          obj_ptr->fp.id ==
                                          in_use[i].buffer_ptr->obj.fp.id)
                                        {
                                                printf("2 entries for same pid:\n");
                                                printf(
                                                  "%d, oop %d, flags %d, region %d  & slo
                                                  use_ptr->slot_id,
                                                  obj_ptr->fp.id,
                                                  obj_ptr->fp.flags,
                                                  use_ptr->region,
                                                  i);
                                                debugit(obj_ptr->fp.id);
                                                ret_cde = 1;
                                        }
                                        else if
                                                  (in_use[i].buffer_ptr->obj.fp.id ==
                                          obj_ptr->fp.id)
                                                cntr++;
                                }
```

```
                }
                cntr2 = 0;
                for (use_ptr2 = use_ptr->buffer_ptr->cntl.first_in_use;
                  use_ptr2 != NULL;
                  use_ptr2 = use_ptr2->obj_fwd_chain)
                        cntr2++;
                if (cntr != cntr2)
                {
                        printf("pid chain does not match obj chain:\n");
                        printf(
                          "%d, oop %d, flags %d, region %d  \n",
                          use_ptr->slot_id,
                          obj_ptr->fp.id,
                          obj_ptr->fp.flags,
                          use_ptr->region);
                        debugit(obj_ptr->fp.id);
                        ret_cde = 1;
                }
            }
        }
return(ret_cde);
}                               /* end proc */

/**********************************************************************
                check_oop:  in_use integrity checker
**********************************************************************/

int
check_oop(in_oop)
        int in_oop;
{
        object *obj_ptr;
        struct in_use_table *use_ptr, *use_ptr2;
        cntrld_object *cntl_obj_ptr;
        struct obj_table *tbl_ptr;
        PID pid;
        int i, found;
        int cntr, cntr2;
        int ret_cde = 0;

        cntr = 0;
        for (pid = 0; pid < MAX_PROCESSES; pid++)
        {
                found = 0;
                for (use_ptr = proc_data[pid].pid_tail; use_ptr != NULL;
                  use_ptr = use_ptr->pid_bkwd_chain)
                {
                        obj_ptr = &(use_ptr->buffer_ptr->obj);
                        if (in_oop == obj_ptr->fp.id)
                        {
                                if (found)
                                {
                                        printf("2 entries for same oop/pid:\n");
                                        printf(
                                          "%d, oop %d, flags %d, region %d  & slot %d\n",
                                          use_ptr->slot_id,
                                          obj_ptr->fp.id,
                                          obj_ptr->fp.flags,
                                          use_ptr->region);
                                        debugit(obj_ptr->fp.id);
                                        ret_cde = 1;
                                }
                                else
                                        cntr++;
                                        found = 1;
                        }
                }
        }

        cntr2 = 0;
        FIND_OBJ(in_oop, tbl_ptr)
          if (tbl_ptr != NULL && tbl_ptr->oop == in_oop)
        {
                for (use_ptr = tbl_ptr->obj_ptr->cntl.first_in_use;
                  use_ptr != NULL;
                  use_ptr = use_ptr->obj_fwd_chain)
                        cntr2++;
        }
        if (cntr2 != cntr)
        {
                printf("obj chain does not match pid chain:\n");
                debugit(in_oop);
                ret_cde = 1;
        }
return(ret_cde);
}                               /* end proc */

/**********************************************************************
                check_class_chain:  check the class chain
**********************************************************************/

int
check_class_chain(class)
        int class;
{
        int oop_in_chain;
        class_object *class_ptr;
        class_cntrl *class_cntl_ptr;
        object *prev_obj;
        int ret_cde;

        class_ptr = (class_object *) get_obj(class, 0, 0);
        if (class_ptr == NULL)
        {
                printf("class not found: %d\n", class);
                debugit(class);
                ret_cde = 1;
        }

        /* address the control data in the class */
        class_cntl_ptr = (class_cntrl *)
          & (class_ptr->obj.value[class_ptr->obj.fp.no_named_vars +
            class_ptr->obj.fp.no_indx_vars]);

        for (oop_in_chain = class_cntl_ptr->cfp.first_inst; oop_in_chain > 0;)
        {
                prev_obj = get_obj(oop_in_chain, 0, 0);
                if (prev_obj == NULL)
                {
                        printf("class chain broken at class %d, obj: %d\n",
                          class, oop_in_chain);
                        debugit(oop_in_chain);
                        return(1);
                }
                oop_in_chain = prev_obj->fp.class_chain;
        }
```

```
return(ret_cde);

}

/*****************************************************************
              debugit:  convenient module to call to get dbx to stop
              in.
*****************************************************************/

void
debugit(in_oop)
        int in_oop;
{
        printf("you are in debugit with oop %d\n", in_oop);
}

/*************************************************************
        list_ot:  use in dbx  to list object table
*************************************************************/
void
list_ot()
{
        long i, fwd_oop, bkwd_oop;
        for (i = 0; i < O_TABLE_SIZE; i++)
        {
                if (obj_table[i].fwd_ovfl == NULL)
                        fwd_oop = -1;
                else
                        fwd_oop = obj_table[i].fwd_ovfl->oop;
                if (obj_table[i].bkwd_ovfl == NULL)
                        bkwd_oop = -1;
                else
                        bkwd_oop = obj_table[i].bkwd_ovfl->oop;

                printf("%d   oop:%d buf_ptr:%d fwd oop:%d bkwd_oop:%d\n",
                  i, obj_table[i].oop, obj_table[i].obj_ptr,
                  fwd_oop, bkwd_oop);
        }
}
/*************************************************************
        parent:  find all in-memory parents of an object
*************************************************************/
void
parent(in_oop)
        int in_oop;
{
        int i, j,  qty_indx_vars;
        object *obj_ptr;

        for (i = 0; i < O_TABLE_SIZE; i++)
        {
                if (obj_table[i].oop >= 0)
                {
                        obj_ptr = &(obj_table[i].obj_ptr->obj);
                        if (obj_ptr->fp.id == obj_ptr->fp.class)
                                qty_indx_vars =
                                  obj_ptr->fp.no_indx_vars;

                        /*
                         * all classes can have index vars
                         */

                        else if
                          (obj_ptr->fp.flags & NO_INDEX_VARS)

                                /*
                                 * object has binary data instead of index vars
                                 * (e.g. Float)
                                 */

                                qty_indx_vars = 0;
                        else
                                qty_indx_vars = obj_ptr->fp.no_indx_vars;

                        for (j = 0; j < obj_ptr->fp.no_named_vars +
                                    qty_indx_vars; j++)
                        {
                                if (obj_ptr -> value[j] == in_oop)
                        printf("%d, parent %d, class %d flags %d, mark %X\n",
                                j,
                                obj_ptr->fp.id,
                                obj_ptr->fp.class,
                                obj_ptr->fp.flags,
                                obj_ptr->fp.mark);
                        }
                }
        }
}
/*************************************************************
        check_buffers:  use in dbx or elsewhere to do a comprehensive
                        check of all objects in the buffers.
*************************************************************/
int
check_buffers()
{
        int i;
        int auditreturn;
        int ret_cde = 0;

        for (i = 0; i < O_TABLE_SIZE; i++)
        {
                if (obj_table[i].oop > 0 )
                        {
                        auditreturn = audit_obj(&obj_table[i].obj_ptr->obj);
                        if (auditreturn)
                                {
                                printf("object %d fails audit %d\n",
                                obj_table[i].obj_ptr -> obj.fp.id,
                                        auditreturn);
                                ret_cde = auditreturn;
                                }
                        }
        }
        return(ret_cde);
}

/*****************************************************************
              trace_obj:  use to trace access to an object.
*****************************************************************/

int
trace_obj(oop, msg)
        int oop;
        char *msg;
```

```
{
        object *obj_ptr;
        struct in_use_table *use_ptr;
        cntrld_object *cntl_obj_ptr;
        struct obj_table *obj_tbl_ptr, *save;
        int cntr = 0;
        PID pid;

        printf("trace oop %d %s\n", oop, msg);
        FIND_OBJ(oop, obj_tbl_ptr)
        if (obj_tbl_ptr != NULL && obj_tbl_ptr->oop == oop)
        {
                obj_ptr = &(obj_tbl_ptr->obj_ptr -> obj);
                for (use_ptr = obj_tbl_ptr->obj_ptr->cntl.first_in_use;
                  use_ptr != NULL;
                  use_ptr = use_ptr->obj_fwd_chain)
                {
                        printf("\tflags %d, region %d process %d  \n",
                          obj_ptr->fp.flags,
                          use_ptr->region,
                          use_ptr->pid);
                }

        }
}                         /* end proc */
```

```
/*Copyright 1988 Eastman Kodak Company.  All rights reserved.*/
/* dictionary.c : get/put dictionary entries and oops */

/*************************************************************************
                This source code contains:
                getdictionary
                putdictionary
                ditdictionary
*************************************************************************/

#include <stdio.h>
#include <strings.h>
#include <math.h>
#include "types.h"
#include "constants.h"
#include "oops_values.h"
#include "dbm.h"

extern long getsymbol();
extern long putsymbol();
extern dbmret fetchit(), storeit(), forceit();
extern int ckpt_in_progress;
extern long oop_gen();
static dbmret dbmin, dbmout;


/*************************************************************************
        getdictionary:  given a dictionary entry, return the dictionary rec
*************************************************************************/

dict_xref *
getdictionary(global, region, pid)
        unsigned short region;
        PID pid;
        char *global;

{

        /*
         * note that returned value not guaranteed across calls to
         * getdictionary, of to database mgr:  use it or lose it!
         */
        long oop;

        dbmout = fetchit(DICT_XREF, global);
        if (dbmout.obj_ptr == NULL)
                return (NULL);  /* symbol not found */

        return ((dict_xref *) dbmout.obj ptr);
}

/*************************************************************************
        ditdictionary:  delete a dictionary entry, return Null
*************************************************************************/

dict_xref *
ditdictionary(global, region, pid)
        unsigned short region;
        PID pid;
        char *global;

{
        long oop;

        dbmout = fetchit(DICT XREF, global);
        if (dbmout.obj ptr == NULL)
                return (NULL);  /* symbol not found */
        deleteit(dbmout);

        return (NULL);
}

/*************************************************************************
        putdictionary:  update dictionary with dictionary symbol and oop.
                        set up a symbol object for the global.
*************************************************************************/

dict xref *
putdictionary(global, xref_oop, region, pid)
        char *global;
        int xref oop;
        unsigned short region;
        PID pid;

/* note that returned value not guaranteed across calls to putdictionary */
{
        int no_indx vars;
        static dict xref xref;
        long symbol oop;

        symbol oop = getsymbol(global, region, pid);
        if (symbol oop < 0)
                symbol oop = putsymbol(global, region, pid);


        dbmin.obj_ptr = (object *) & xref;
        dbmin.disk_addr = NULL;
        xref.fp.length = sizeof(xref.fp) + strlen(global) +1;
        xref.fp.rec_type = DICT XREF;
        xref.fp.mark = UNMARKED;
        xref.fp.flags = PERM_OBJ;       /* and ~GARBAGE by default */
        xref.fp.ovfl chain = NULL;
        xref.fp.size ovfl_rec = 0;
        xref.fp.object_oop = xref oop;
        xref.fp.symbol_oop = symbol oop;
        strcpy(xref.symbol, global);

        ckpt in progress = 1;   /* protect against interrupts */
        dbmout = forceit(dbmin);
        chckpt oop();           /* force control record out so that db not
                                 * out of sync if we Abend.  This is required
                                 * since the xref record is not under control
                                 * of the obj mgr (we used forceit) */

        return (&xref);
}

getDictionaryValue(global)
        char *global;
{
        dict xref *xref;

        xref = getdictionary(global, 0, 0);

        if (xref == (dict xref *) NULL)
```

```
                syserr("getDictionaryValue: no dictonary entry for '%s'", global);

        return (xref->fp.object_oop);
}

/*Copyright 1988 Eastman Kodak Company.  All rights reserved.*/
/*
 * fetch_method.c:  fetch the byte codes for a method, given an object to
 * send a message too
 */
#include "types.h"
#include "constants.h"
#include "oops_values.h"
#include "interp_const.h"
#include "interp_types.h"
#include "object_rec.h"
#include "dbm.h"
#include "obj_mgr.h"
#include "bytecodes.h"
#include <stdio.h>
#include <strings.h>

#if DEBUGGER
/**************/
#include "debug_const.h"
#include "debug_types.h"
#include "debug_externs.h"
/**************/
#endif

#if SAMPLER
/**************/
#include "sampler_const.h"
#include "sampler_types.h"
#include "sampler_externs.h"
/**************/
#endif

#define MAX_SUPER_CHAIN 15


static char s[100];                /* err msg */
static char *msg01 = "fetch_method01: superclass chain broke for class:%d";
static char *msg02 = "fetch_method02: start_at class not found:%d";
static char *msg03 = "fetch_method03: class not found :%d";
static char *msg04 =
"fetch_method04: byte cores not found for class/method:%d/%d";
static char *msg05 =
"fetch_method05: loop in superclass chain for class:%d";
static char *msg06 =
"fetch_method06: Object for selector search is not a class:%d";
static char *msg10 = "fetch_method10: Cannot find inst variable name%s";

static int first_time = 1;
static int opt_data_slot, meth_type_slot;


object *obj_mgr();
object *reserve_obj();
object *get_obj();

/*************************************************************************
        fetch_method:  get a method, given an oop and selector
*************************************************************************/

object *
fetch_method(selector, rcvr_class, super, msg_type, region, pid)
        oop selector;
        oop rcvr_class;
        oop super;
        unsigned short msg_type;
        unsigned short region;
        PID pid;
{
        object *obj_ptr;
        class_object *class_ptr;
        object_control *cntl_ptr;
        class_cntrl *class_cntl_ptr;
        int ind, i, j, dict_oop;
        long class_to_use;
        int superclass;
        int test_class;
        int calc_msg_type;

#if SAMPLER
        /***************/
        Sampler_vals[1].cur_value = 6;
        /***************/
#endif

        if (first_time)
        {
                first_time = 0;
                opt_data_slot = name_to_slot(CompiledMethod, "optData");
                if (opt_data_slot < 0)
                        syserr(msg10, "optData");

                meth_type_slot = name_to_slot(CompiledMethod, "methType");
                if (meth_type_slot < 0)
                        syserr(msg10, "methType");

        }

        class_to_use = rcvr_class;
        calc_msg_type = msg_type;

        if (super != CLASS_START)
        {
                /* get class's superclass */
                class_ptr = (class_object *)
                  get_obj(super, region, pid);
                if (class_ptr == NULL)
                        syserr(msg02, super);
                class_cntl_ptr = (class_cntrl *)
                  & (class_ptr->obj.value[class_ptr->obj.fp.no_named_vars +
                    class_ptr->obj.fp.no_indx_vars]);
                class_to_use = class_cntl_ptr->cfp.super_class;
        }

        /* get class to start at */

        if (calc_msg_type == INST_MSG)
                test_class = rcvr_class;
        else
                test_class = -rcvr_class;        /* negative means meta-class */

        class_ptr = (class_object *) get_obj(class_to_use, region, pid);

        if (class_ptr == NULL)
                syserr(msg03, class_to_use);

        if (class_ptr->obj.fp.id != class_ptr->obj.fp.class)
```

```
        syserr(msg06, class_to_use);

    /*
     * * we protect against cycles in the super-class chain by imposing a *
     * max size on any such chain.  Shouldn't be necessary, but a mistake *
     * in the compiler would be disastrous
     */

    for (i = 1; i < MAX_SUPER_CHAIN; i++)
    {
        class_cntl_ptr = (class_cntrl *)
          & (class_ptr->obj.value[class_ptr->obj.fp.no_named_vars +
            class_ptr->obj.fp.no_indx_vars]);
        ind = selector & (int) (class_cntl_ptr->cfp.no_dict - 1);
        /* dictionary size assumed to be a power of 2 */

        j = 0;
        while (j < class_cntl_ptr->cfp.no_dict)
        {
            dict_oop = class_cntl_ptr->dictionary[ind].method_oop;

            /*
             * * dict_oop < 0 means we have a hole in the
             * dictionary * at this point, and there is no use
             * looking for the * selector after this point in
             * this class
             */

            if (dict_oop < 0)
                break;

            if (class_cntl_ptr->dictionary[ind].opers == selector
              && class_cntl_ptr->dictionary[ind].msg_type
              == calc_msg_type)
            {

                /*
                 * * we have found the selector ... now get
                 * the * byte codes
                 */

                obj_ptr = reserve_obj(dict_oop, region, pid);

                if (obj_ptr == NULL)
                    syserr(msg04, rcvr_class,
                      class_cntl_ptr->
                           dictionary[ind].method_oop);

#if DEBUGGER
                /***************/
                if (D_ISCSET(D_OSTAT))
                {
                    if (i == 1)
                    {
                        D_ostats.fetch_meth1++;
                    }
                    else
                    {
                        D_ostats.fetch_meth2++;
                    }
                    /* end if */
                }
                /***************/
#endif

#if SAMPLER
                /***************/
                Sampler_vals[1].cur_value = 5;
                /***************/
#endif

                return (obj_ptr);
            }   /* end found selector logic */

            j++;
            ind++;
            if (ind >= class_cntl_ptr->cfp.no_dict)
                ind = 0;        /* wrap around */

        }       /* end while loop */

    /*
     * * follow super class chain, looking for the selector
     */

    if (class_ptr->obj.fp.id == Object)
    {
        if (calc_msg_type != CLASS_MSG)
        {

#if SAMPLER
            /***************/
            Sampler_vals[1].cur_value = 5;
            /***************/
#endif

            /*
             * * can't find selector, chain ends at
             * Object
             */

            return (NULL);
        }

        if (superclass != Class)
        {

            /*
             * * metaclass chain continues in class Class
             */

            superclass = Class;
        }
        else
        {

#if SAMPLER
            /***************/
            Sampler_vals[1].cur_value = 5;
            /***************/
#endif

            /*
             * * end of metaclass chain ... can't find *
             * selector
             */

            return (NULL);
        }
```

```
                        /*
                         * * note that transition to Class class starts *
                         * searching instance methods (not Class methods), *
                         * since we are in the meta-class chain (whose *
                         * 'instance' methods are for classes anyway. * When
                         * we hit Object (again), logic above will *
                         * terminate loop
                         */

                        calc_msg_type = INST_MSG;
                }
                else
                        superclass = class_cntl_ptr->cfp.super_class;

                class_ptr = (class_object *) get_obj(superclass, region, pid);
                if (class_ptr == NULL)
                        syserr(msg01, rcvr_class);

        }                       /* end i loop */

        syserr(msg05, rcvr_class);      /* loop in superclass chain */

}                               /* end proc */
```

```
/*Copyright 1988 Eastman Kodak Company.  All rights reserved.*/
/* obj_mgr.c:  fetch and create objects */

/**************************************************************************
        This source code contains:
        obj_mgr
        reserve_obj
        force_obj
        get_obj
        init_om
        set_in_use
        rmv_in_use
        shutdown
        in_super_chain
        update_class_chain
        remove_class_chain
        add_to_proc
        first_obj
        next_obj

        ref_debug

        Note:  callers of any object manager routine should make a
        one-time call to init_om, before invoking any other routine.
**************************************************************************/

#include <stdio.h>
#include <signal.h>
#include "types.h"
#include "constants.h"
#include "oops_values.h"
#include "object_rec.h"
#include "obj_mgr.h"
#include "buffer.h"
#include "symbol_db.h"
#include "macros.h"

#if DEBUGGER
/****************/
#include "interp_const.h"
#include "interp_types.h"
#include "debug_const.h"
#include "debug_types.h"
#include "debug_externs.h"

extern FILE * Tracer;                   /* debug*/
extern int debug_oop;           /* debug */
extern int TraceOn;             /* debug*/
/****************/
#endif

#define NO_NILS         90

static struct sigvec oldvec, newvec;

/*****************************************************************
in_use table: very important structure.  It maintains a list of
all objects in use, in the order in which they were requested.  The
collector uses this table to scan objects by 'region', bottom up.

If an object is used by more than one context, it
must be put in the table only upon the first request (otherwise, it would
be released when the second context was done, invalidating the usage by
the first context upon return.
*****************************************************************/

struct in_use_table in_use[MAX_HELD_OBJ];
struct process_data proc_data[MAX_PROCESSES];

cntrld_object *buffer_mgr();
long oop_gen();
void init_om();
object *reserve_obj();
object *force_obj();
object *get_obj();
struct in_use_table *set_in_use();
void update_class_chain();
void add_to_proc();
extern struct in_use_table *change_region();

extern struct obj_table obj_table[O_TABLE_SIZE];        /* see buffer_mgr for
                                                         * details */

static char s[100];             /* err msg */
static char *msg01 = "obj_mgr01: attempt to process negative oop:%d";
static char *msg02 = "obj_mgr02: invalid operation:%d";
static char *msg03 = "set_in_use03: too many objects being held at once:%d";
static char *msg04 = "obj_mgr04: requested class not found:%d";
static char *msg05 = "obj_mgr05: new object exceeds max size. parm: %d";
static char *msg07 =
"update_class_chain07: logic error: object's (%d) class not found: %d";
static char *msg08 = "rmv_in_use08: logic error: fwd ptr not NULL: %d";
static char *msg09 =
"set_in_use09: requested region %d but region 0 not in iu table";
static char *msg10 =
"remove_class_chain10: logic error: object's (%d) class not found: %d";
static char *msg11 =
"remove_class_chain11: class chain broken for (%d) at oop: %d";
static char *msg12 =
"first_obj12: class not found %d";
static char *msg13 =
"next_obj13: object not found %d";

static char new_obj_buffer[MAX_OBJ_SIZE];
static struct in_use_table *free_space;
extern int ckpt_in_progress;
static int om_is_init = 0;

static long nils[NO_NILS] = {   /* to init new objects */
  nIL, nIL, nIL, nIL, nIL, nIL, nIL, nIL, nIL, nIL, nIL, nIL, nIL, nIL, nIL,
  nIL, nIL, nIL, nIL, nIL, nIL, nIL, nIL, nIL, nIL, nIL, nIL, nIL, nIL, nIL,
  nIL, nIL, nIL, nIL, nIL, nIL, nIL, nIL, nIL, nIL, nIL, nIL, nIL, nIL, nIL,
  nIL, nIL, nIL, nIL, nIL, nIL, nIL, nIL, nIL, nIL, nIL, nIL, nIL, nIL, nIL,
  nIL, nIL, nIL, nIL, nIL, nIL, nIL, nIL, nIL, nIL, nIL, nIL, nIL, nIL, nIL,
  nIL, nIL, nIL, nIL, nIL, nIL, nIL, nIL, nIL, nIL, nIL, nIL, nIL, nIL, nIL};


/**********************************************************************
        die:  signal catching (if not already being done)
**********************************************************************/

static int
die()
{
```

```
        /*
         * don't exit if shutdown_db indicates busy ...
         */

        if (shutdown_db())
                return;

        exit(1);
}


/************************************************************************
        obj_mgr:  basic entry point for object manipulation
************************************************************************/

object *
obj_mgr(in_oop, operation, no_index_vars, no_dict_entries, region, pid)
        long in_oop;            /* for operations NEW, this is the
                                 * class oop */
        int operation, no_index_vars, no_dict_entries;

/*
 * for operation NEW, no_dict_entries must be -1, unless object is a class
 */
        unsigned short region;
        PID pid;

{
        object *class_ptr;
        class_cntrl *class_cntl_ptr;
        object_control *cntl_ptr;
        object *obj_ptr;
        register cntrld_object *cntl_obj_ptr;
        struct in_use_table *being_used;
        register struct obj_table *hit, *save;

        if (om_is_init == 0)
                init_om();

        if (in_oop < 0)
        {
                sprintf(s, msg01, in_oop);
                syserr(s);
        }


        if (operation == NEW)
        {


                cntl_obj_ptr = buffer_mgr(in_oop, FETCH, NULL, region,
                  pid);         /* get class */
                if (cntl_obj_ptr == NULL)
                {
                        sprintf(s, msg04, in_oop);
                        syserr(s);
                }
                class_ptr =  & (cntl_obj_ptr->obj);
                obj_ptr = (object *) new_obj_buffer;
                /* address the control data in the class */
                class_cntl_ptr = CLASS_CONTROL(class_ptr);
                obj_ptr->fp.class = in_oop;
                obj_ptr->fp.ovfl_chain = NULL;
                obj_ptr->fp.size_ovfl_rec = 0;
                obj_ptr->fp.rec_type = OBJ_REC;
                obj_ptr->fp.mark = UNMARKED;
                obj_ptr->fp.flags = UPDATED | GARBAGE;
                obj_ptr -> fp.flags |=
                        cntl_obj_ptr -> obj.fp.flags & NO_INDEX_VARS;
                obj_ptr->fp.no_named_vars = class_cntl_ptr->cfp.no_nmed_inst;
                obj_ptr->fp.no_indx_vars = no_index_vars;

                obj_ptr->fp.length = OBJECT_SIZE(obj_ptr);

                if (no_dict_entries >= 0)       /* we are setting up a class,
                                                 * must have been called by
                                                 * the compiler.  Add in size
                                                 * of the class control
                                                 * structure */
                {
                        class_cntl_ptr->cfp.no_dict = no_dict_entries;
                        obj_ptr->fp.length = obj_ptr->fp.length +
                          sizeof(class_cntl_ptr->cfp) +
                          class_cntl_ptr->cfp.no_dict *
                          sizeof(class_cntl_ptr->dictionary[0]);
                }

                if (obj_ptr->fp.length > MAX_OBJ_SIZE)
                {
                        sprintf(s, msg05, in_oop);
                        syserr(s);
                }
                obj_ptr->fp.id = oop_gen();

                cntl_obj_ptr = buffer_mgr(obj_ptr->fp.id, STORE, obj_ptr,
                  region, pid);
                obj_ptr = &(cntl_obj_ptr->obj);

                init_obj(obj_ptr);

#if DEBUGGER
                /***************/
                if (D_ISCSET(D_OSTAT))
                {
                        D_ostats.news++;
                }
                /* end if */
                if (TraceOn)
                        fprintf(Tracer, "create %d \tprocess %d region %d\n",
                                obj_ptr->fp.id, pid, region);
                /***************/
#endif

                IN_USE(cntl_obj_ptr, pid, being_used)
                  if (!being_used)
                        being_used = set_in_use(cntl_obj_ptr, region, pid);

                being_used -> orig_region = region;

                /* put new object in class chain */

                obj_ptr -> fp.class_chain = -1;
                if (obj_ptr->fp.class >= FIRST_CLASS_CHAINED)
                        update_class_chain(obj_ptr->fp.class, obj_ptr,
                          region, pid);
                else cntl_obj_ptr -> cntl.temp_inst_chain = -1;


                return (obj_ptr);
```

```
        }                       /* end NEW specific logic */

        else
        {
                sprintf(s, msg02, operation);
                syserr(s);
        }
}                               /* end proc */

/*********************************************************************
        force_obj:  create an object, given the id of the object
*********************************************************************/

object *
force_obj(in_oop, class, no_index_vars, no_dict_entries, region, pid)
        long in_oop, class;
        int  no_index_vars, no_dict_entries;

/*
 * no_dict_entries must be -1, unless object is a class
 */
        unsigned short region;
        PID pid;

{
        object *class_ptr;
        class_cntrl *class_cntl_ptr;
        object_control *cntl_ptr;
        cntrld_object *old_cntl_ptr;
        object *obj_ptr;
        register cntrld_object *cntl_obj_ptr;
        struct in_use_table *being_used;
        register struct obj_table *hit, *save;
        long old_class_chain = -1;
        short old_flags = -1;

        if (om_is_init == 0)
                init_om();

        if (in_oop < 0)
        {
                sprintf(s, msg01, in_oop);
                syserr(s);
        }


                /* oop is given.
                                        * all variables set by calling pgm.
                                        * This is used to set up objects
                                        * with a set oop, or to change the
                                        * size of an object w/o changing
                                        * it's oop.  Calling pgm must set
                                        * all variables, including length,
                                        * although init of instance
                                        * variables is done here.  Calling
                                        * pgm UPDATES, does not reset, the
                                        * flags */
#if DEBUGGER
                /***************/
                if (D_ISCSET(D_OSTAT))
                {
                        D_ostats.forces++;
                }
                /* end if */
                /***************/
#endif

        obj_ptr = (object *) new_obj_buffer;
        obj_ptr->fp.class = class;
        obj_ptr->fp.ovfl_chain = NULL;
        obj_ptr->fp.size_ovfl_rec = 0;
        obj_ptr->fp.rec_type = OBJ_REC;
        obj_ptr->fp.mark = UNMARKED;
        obj_ptr->fp.id = in_oop;
        obj_ptr->fp.flags = UPDATED | GARBAGE;
        obj_ptr -> fp.class_chain = -1;

        /*
         * length is set below for buffer_mgr:  calling pgm must
         * override with true length
         */
        if (no_index_vars < 0)  /* means get max size object */
        {
                obj_ptr->fp.length = MAX_OBJ_SIZE;
                /* calling pgm overrides */
                obj_ptr->fp.no_indx_vars =
                  (MAX_OBJ_SIZE - sizeof(obj_ptr->fp)) /
                  sizeof(obj_ptr->value[0]);
        }
        else            /* means get obj with max named vars, no. of
                         * index vars as specified */
        {
                obj_ptr->fp.length = sizeof(obj_ptr->fp) +
                  sizeof(obj_ptr->value[0]) *
                  (MAX_SYMBOLS + no_index_vars);
                obj_ptr->fp.no_indx_vars = no_index_vars;
        }

        /*retrieve old object, if in database*/
        old_cntl_ptr = buffer_mgr(obj_ptr->fp.id, FETCH,
          region, pid);
        if (old_cntl_ptr != NULL)
                {
                old_flags = old_cntl_ptr ->obj.fp.flags;
                old_class_chain = old_cntl_ptr ->
                        obj.fp.class_chain;
                }

        cntl_obj_ptr = buffer_mgr(obj_ptr->fp.id, FORCE, obj_ptr,
          region, pid);
        /* buffer_mgr takes care of in_use table adjustment */

        obj_ptr = &(cntl_obj_ptr->obj);

        obj_ptr->fp.no_named_vars = 0;
        init_obj(obj_ptr);
        cntl_obj_ptr -> cntl.temp_inst_chain = -1;


        if (old_cntl_ptr != NULL)
                {
                obj_ptr -> fp.flags = old_flags | UPDATED;
                obj_ptr -> fp.class_chain = old_class_chain;
                cntl_obj_ptr -> cntl.temp_inst_chain =
                        old_class_chain;
                }
```

```
        else if (obj_ptr->fp.class >= FIRST_CLASS_CHAINED)
                update_class_chain(obj_ptr->fp.class, obj_ptr,
                  region, pid);

        return (obj_ptr);

}                               /* end proc */
/*****************************************************************************
        set_in_use:  update the table of 'in use' objects, if necessary
*****************************************************************************/

struct in_use_table *
set_in_use(buffer_ptr, region, inpid)

        cntrld_object *buffer_ptr;
        unsigned short region;
        PID inpid;

{
        int i;
        struct in_use_table *test, *new_slot;

        /*******************************************************************
        Note:  calling program must not call this routine if the object
        is already in use by the pid.  Macro IN_USE has been written to
        test for this.
        *******************************************************************/


#if DEBUGGER
        /***************/
        d_obuf_cnt_upd(buffer_ptr, (short) 1);

        if (D_ISCSET(D_OSTAT))
        {
                d_water_mark(buffer_ptr);
        }
        if (TraceOn)
                fprintf(Tracer, "set_in_use %d \tprocess %d region %d \n",
                                buffer_ptr->obj.fp.id, inpid, region);
        /***************/
#endif

        /* get free space entry for new element */
        if (free_space == NULL)
        {
                sprintf(s, msg03, MAX_HELD_OBJ);
                syserr(s);
        }
        else
        {
                /* free space linked using the free_space_fwd pointers */
                new_slot = free_space;
                free_space = new_slot->free_space_fwd;  /* remove new_slot from
                                                         * free space chain */
        }

        new_slot->buffer_ptr = buffer_ptr;
        new_slot->pid = inpid;
        new_slot->region = region;
        new_slot->slot_id = -(new_slot->slot_id); /* positive means slot is
                                                   * in_use */

/* update obj chain */
if (buffer_ptr->cntl.first_in_use != NULL)
        buffer_ptr->cntl.first_in_use->obj_bkwd_chain = new_slot;
new_slot->obj_bkwd_chain = NULL;
new_slot->obj_fwd_chain = buffer_ptr->cntl.first_in_use;
buffer_ptr->cntl.first_in_use = new_slot;

/*
 * we want to keep the order in the pid chain  by time of access,
 * within region.  The majority of time, the tail of the chain will
 * be for the required region, and the object can just be added at
 * the end.  For this reason, we search the chain tail to head.
 */

/* update pid chain */
if (proc_data[inpid].pid_tail != NULL)  /* pid chain has length */
        if (proc_data[inpid].pid_tail -> region <= region)
        {
                /* new element goes at end: common case */
                proc_data[inpid].pid_tail ->pid_fwd_chain = new_slot;
                new_slot->pid_bkwd_chain =  proc_data[inpid].pid_tail;
                new_slot->pid_fwd_chain = NULL;
                proc_data[inpid].pid_tail = new_slot;
        }
        else
        {
                new_slot->pid_bkwd_chain = NULL;
                for (test = proc_data[inpid].pid_tail ;
                  test->pid_bkwd_chain != NULL;
                  test = test->pid_bkwd_chain)
                {
                        if (test->region <= region)
                        {
                                if (test->pid_fwd_chain != NULL)
                                        test->pid_fwd_chain->
                                          pid_bkwd_chain = new_slot;
                                new_slot->pid_fwd_chain =
                                  test->pid_fwd_chain;
                                test->pid_fwd_chain = new_slot;
                                new_slot->pid_bkwd_chain = test;
                                break;
                        }
                }
                if (new_slot->pid_bkwd_chain == NULL)
                {
                        /*
                         * new element goes at start: unlikely, but
                         * possible
                         */
                        if (region != 0)
                        {
                                sprintf(s, msg09, region);
                                syserr(s);
                        }
                        new_slot->pid_fwd_chain = test;
                        test->pid_bkwd_chain = new_slot;
                }
        }
else
{
        /* we have no elements in the pid list yet */
```

```
        if (region != 0)
        {
                sprintf(s, msg09, region);
                syserr(s);
        }
        proc_data[inpid].pid_tail = new_slot;
        new_slot->pid_bkwd_chain = NULL;
        new_slot->pid_fwd_chain = NULL;
    }

    proc_data[inpid].gc_obj_count[region]++;
    proc_data[inpid].true_obj_count[region]++;

    return (new_slot);

}                               /* end proc */

/****************************************************************************
    rmv_in_use:  remove an element from in_use table.
****************************************************************************/

void rmv_in_use(purge_ptr, inpid)

    struct in_use_table *purge_ptr;
    PID inpid;

{
unsigned short region;

    /*
     * purge pointer assumed to point to only entry for the object and
     * pid
     */

    /*
     * note that under some conditions, collector uses the data in the
     * element being removed, after rmv_in_use() is called.  This means
     * that this routine should not destroy the data pointed to by
     * purg_ptr as a result of unlinking the element from the lists
     */

    region = purge_pt  -> region;

#if DEBUGGER
    /***************/
    d_obuf_cnt_upd(purge_ptr->buffer_ptr, (short) -1);

    if (D_ISCSET(D_OSTAT))
    {
        d_water_mark(purge_ptr->buffer_ptr);
    }
    if (TraceOn)
        fprintf(Tracer, "rmv_in_use %d \tprocess %d region %d \n",
                purge_ptr->buffer_ptr->obj.fp.id, inpid, region);
    /* end if */
    /***************/
#endif

    /* remove from object chain */
    if (purge_ptr->obj_bkwd_chain != NULL)
        purge_ptr->obj_bkwd_chain->obj_fwd_chain =
          purge_ptr->obj_fwd_chain;
    else
        purge_ptr->buffer_ptr->cntl.first_in_use =
                purge_ptr->obj_fwd_chain;

    /*
     * *purge_ptr used to be first in obj chain
     */

    if (purge_ptr->obj_fwd_chain != NULL)
        purge_ptr->obj_fwd_chain->obj_bkwd_chain =
          purge_ptr->obj_bkwd_chain;

    /* remove from pid chain */
    if (purge_ptr->pid_bkwd_chain != NULL)
        purge_ptr->pid_bkwd_chain->pid_fwd_chain =
          purge_ptr->pid_fwd_chain;
    if (purge_ptr->pid_fwd_chain != NULL)
        purge_ptr->pid_fwd_chain->pid_bkwd_chain =
          purge_ptr->pid_bkwd_chain;
    else
        proc_data[inpid].pid_tail = purge_ptr->pid_bkwd_chain;
                /* *purge_ptr used to be
                   *last in pid chain */

    /* recover free space: put in chain . */

    purge_ptr->free_space_fwd = free_space;
    free_space = purge_ptr;
    purge_ptr->slot_id = -(purge_ptr->slot_id);/* negative  means slot
                                                 * is free */
    if (proc_data[inpid].true_obj_count[region] > 0)
        proc_data[inpid].true_obj_count[region]--;
    if (proc_data[inpid].gc_obj_count[region] > 0)
        proc_data[inpid].gc_obj_count[region]--;

    return;

}

/****************************************************************************
    init_obj:  set named and index variables to nIL
****************************************************************************/

init_obj(obj_ptr)
    object *obj_ptr;
{
    int i;
    i = (obj_ptr->fp.no_named_vars + obj_ptr->fp.no_indx_vars) *
      sizeof(obj_ptr->value[0]);
    bcopy((char *) nils, (char *) &obj_ptr->value[0], i);

    for (i = NO_NILS; i < obj_ptr->fp.no_named_vars +
                          obj_ptr->fp.no_indx_vars; i++)
        obj_ptr->value[i] = nIL;

    return;
}

/****************************************************************************
    shutdown_db:  emergency shutdown.  DB files closed via exit
****************************************************************************/

int
shutdown_db()
{
```

```
	if (ckpt_in_progress)	/* shutdown now would cause db corruption */
	{
		fprintf(stderr, "\n\nCkpt in progress: try again\n\n");
		return (1);
	}
	fprintf(stderr, "\n\nEmergency DB shutdown: sync w/o checkpoint\n\n");
	return (0);
}

/*************************************************************************
	update_class_chain:  put new instance object in
		temporary class instance chain
**************************************************************************/
void
update_class_chain(class, obj_ptr, region, pid)
	oop class;
	object *obj_ptr;
	PID pid;
	unsigned short region;

{

	/*
	 * The selector nextInstance is supported via a chain anchored in the
	 * class, and connecting all objects of the same class.  This chain
	 * is updated whenever a new object is created (if the object turns
	 * out to be garbage, 'remove_class_chain' will be called to remove
	 * it from the chain.  We maintain a temporary chain for use
	 * during runtime. that includes transient objects, and update the
	 * permanent one when objects are written to the db.
	 */

	/*we do not mark the instances or the class as updated, since we
	  do not wish to write the class object to the db if this is the
	  only update against it (else we would be writing the class out
	  even if only garbage objects were created).  The collector and
	  trans_mgr are responsible for writing the class to the db if the
	  permanent instance chain is updated*/

	class_object *class_ptr;
	object_control *class_cntl_ptr, *obj_cntl_ptr;


	class_ptr = (class_object *) reserve_obj(class, region, pid);
	if (class_ptr == NULL)
		syserr(msg07, obj_ptr->fp.id, class);

	/*address the control data ahead of the object, in the buffer*/
	class_cntl_ptr = BUF_CONTROL_PTR( class_ptr);
	obj_cntl_ptr = BUF_CONTROL_PTR(obj_ptr);

	/* update class chain */
	obj_cntl_ptr -> temp_inst_chain = class_cntl_ptr -> temp_inst_chain;
	class_cntl_ptr -> temp_inst_chain = obj_ptr -> fp.id;
	class_cntl_ptr -> num_new_kids ++;
}

/*************************************************************************
	remove_class_chain:  delete new instance object from
				temporary class instance chain
**************************************************************************/
void
remove_class_chain(class, obj_ptr, region, pid)
/* obj_ptr points to object to remove from class chain */
	oop class;
	object *obj_ptr;
	PID pid;
	unsigned short region;

{

	/*
	 * This routine is called when a new object is discovered to be
	 * garbage, and is discarded.  We must remove it from the instance
	 * chain that is anchored in the class, and connects all objects of
	 * the same class.  The object itself, being new and now garbage, was
	 * not placed in the database, and hence does not, itself, need to be
	 * deleted.  The purpose of putting this transient object in the
	 * chain at all was to support the nextInstance primitive, allowing
	 * applications to access the objects in the class serially.
	 * We update the permanent object chain when the new objects are
	 * actually written to the database.  We do not mark any object
	 * as updated just because this temporary chain was altered.
	 */

	class_object *class_ptr;
	object_control *class_cntl_ptr, *obj_cntl_ptr, *prev_obj_cntl;
	object *prev_obj;
	int oop_in_chain;
	struct obj_table *obj_table_ptr, *hit;


	/*We must not call reserve_obj on the class if the class is
	already reserved.  The reason is that remove_class_chain is
	called from the collector, after objects have already been
	marked.  See NOTE 11 in the collector program*/

	FIND_OBJ(class,hit)
	if (hit->oop == class)
	{
		if (hit -> obj_ptr ->cntl.first_in_use == NULL)
		{
			/*class is not reserved yet*/
			hit = NULL;
		}
		else class_ptr = (class_object *)&(hit -> obj_ptr -> obj);
	}


	if (hit == NULL)
	{
		class_ptr = (class_object *) reserve_obj(class, region, pid);
		if (class_ptr == NULL)
		{
			sprintf(s, msg10, obj_ptr->fp.id, class);
			syserr(s);
		}
	}

	/*address the control data ahead of the object, in the buffer*/
	class_cntl_ptr = BUF_CONTROL_PTR(class_ptr);
	obj_cntl_ptr = BUF_CONTROL_PTR(obj_ptr);

	/* check if object is first in chain */
	if (class_cntl_ptr -> temp_inst_chain == obj_ptr -> fp.id)
	{
		class_cntl_ptr->temp_inst_chain =
```

```
                obj_cntl_ptr->temp_inst_chain;

        if (class_cntl_ptr -> num_new_kids)
                class_cntl_ptr -> num_new_kids --;
        return;
}

/*
 * Search the class chain until we find the element that points to
 * the object passed in.  Delete this pointer, replacing it with the
 * element that the old object points to. Since new objects are added
 * to head of chain, and since all new objects are still in memory,
 * this search should be reasonably fast.
 */

for (oop_in_chain = class_cntl_ptr->temp_inst_chain; oop_in_chain > 0;)
{
        prev_obj = get_obj(oop_in_chain, region, pid);
        if (prev_obj == NULL)
                syserr(msg11, class, oop_in_chain);

        /*
         * chain broken for some reason--should not happen
         */

        prev_obj_cntl = BUF_CONTROL_PTR(prev_obj);
        if (prev_obj_cntl -> temp_inst_chain == obj_ptr->fp.id)
        {

                /*
                 * next object in chain is the one we are removing:
                 * we must update the previous object in the chain to
                 * leap over the deleted object.
                 */

                if (!(prev_obj->fp.flags & UPDATED))
                {
                        FIND_OBJ(oop_in_chain,hit)
                        if (hit->oop == oop_in_chain)
                        {
                                if (hit -> obj_ptr ->
                                        cntl.first_in_use == NULL)
                                        /*obj is not reserved yet*/
                                        hit = NULL;
                                else prev_obj =
                                        &(hit -> obj_ptr -> obj);
                        }
                        if (hit == NULL)
                                prev_obj = reserve_obj(oop_in_chain,
                                                region, pid);
                        prev_obj_cntl = BUF_CONTROL_PTR(prev_obj);
                }

                /*
                 * if the object is UPDATED, it has been reserved,
                 * and we can save a call to reserve  object.  This
                 * is important in case we are in a different process
                 * than the one that reserved it in the first place,
                 * since it will save a cross-process reference;
                 */

                prev_obj_cntl->temp_inst_chain = obj_cntl_ptr ->
                        temp_inst_chain;
                if (class_cntl_ptr -> num_new_kids)
                                class_cntl_ptr -> num_new_kids --;
                        break;
                }
                oop_in_chain = prev_obj_cntl->temp_inst_chain;
        }

}

/**********************************************************************
        in_super_chain:  given a class, see if a class is in its super
                                chain.
**********************************************************************/

int
in_super_chain(class, super_class, region, pid)
        long class, super_class;
        PID pid;
        unsigned short region;

{
        long next_class;
        object *class_ptr;
        class_cntrl *ctl_ptr;
        /*answer the question: is super_class really a super class of
        class*/

        next_class = class;
        while (1)
        {
                if (next_class == super_class)
                        return (1);

                class_ptr = get_obj(next_class, region, pid);
                if (class_ptr == NULL)
                        return (0);
                if (class_ptr->fp.id == Object)
                        return (0);

                ctl_ptr = CLASS_CONTROL(class_ptr);
                next_class = ctl_ptr->cfp.super_class;
        }
}

/**********************************************************************
        init_om:  initialize the object manager.
**********************************************************************/

void
init_om()
{
        int i;

        om_is_init = 1;

        /*
         * * if not running in background or no signal handling installed, *
         * install our own handler
         */

        newvec.sv_handler = die;

        sigvec(SIGHUP, 0, &oldvec);
        if (oldvec.sv_handler == SIG_DFL)
```

```
        sigvec(SIGHUP, &newvec, 0);

    sigvec(SIGINT, 0, &oldvec);
    if (oldvec.sv_handler == SIG_DFL)
        sigvec(SIGINT, &newvec, 0);

    sigvec(SIGQUIT, 0, &oldvec);
    if (oldvec.sv_handler == SIG_DFL)
        sigvec(SIGQUIT, &newvec, 0);

    sigvec(SIGTERM, 0, &oldvec);
    if (oldvec.sv_handler == SIG_DFL)
        sigvec(SIGTERM, &newvec, 0);

    /* init the in_use table */

    free_space = &in_use[0];

    for (i = 0; i < MAX_PROCESSES; i++)
    {
        proc_data[i].pid_tail = NULL;
    }
    for (i = 0; i < MAX_HELD_OBJ; i++)
    {
        in_use[i].slot_id = -i - 1;     /* negative means slot not in
                                         * use */
        in_use[i].obj_fwd_chain = NULL;
        in_use[i].obj_bkwd_chain = NULL;
        in_use[i].pid_fwd_chain = NULL;
        in_use[i].pid_bkwd_chain = NULL;
        in_use[i].buffer_ptr = NULL;
        /* put all elements in free space chain */
        if (i == MAX_HELD_OBJ - 1)
            in_use[i].free_space_fwd = NULL;
        else
            in_use[i].free_space_fwd = &in_use[i + 1];
    }
    /* init the object table */
    for (i = 0; i < O_TABLE_SIZE; i++)
    {
        obj_table[i].oop = -1;
        obj_table[i].obj_ptr = NULL;
        obj_table[i].fwd_ovfl = NULL;
        obj_table[i].bkwd_ovfl = NULL;
    }

#if DEBUGGER
/****************/
    if (TraceOn)
    {
        Tracer = fopen ("omtrace", "w");
        if (Tracer == NULL)
            syserr("init om can not open Tracer file");
    }
/****************/
#endif
}

/**************************************************************************
    reserve obj:  fetch an object, and put it in the in-use table.
                  call this routine if you intend to update the
                  object, or rely on the returned pointer being
                  valid across calls to the object manager.
**************************************************************************/

object *
reserve obj(in oop, region, pid)
        register long in oop;           /* the object to get */
        unsigned short region;
        PID pid;

{
        register cntrld object *cntl obj ptr;
        register struct in use table *being used;
        register struct obj table *hit;


#if DEBUGGER
        /***************/
        if (D_ISCSET(D_OSTAT))
        {
            D_ostats.reserves++;
        }
        /* end if */
        /***************/
#endif

        /*
         * this routine called very often:  code is expanded to handle most
         * common case most quickly
         */

        if (in oop < 0)
            syserr("object is an integer %d", in_oop);

        FIND OBJ(in_oop, hit)
          if (hit->oop == in_oop)
        {
            cntl_obj_ptr = hit->obj_ptr;
            IN_USE(cntl_obj_ptr, pid, being_used)
            if (!being_used)
            {
                if (cntl_obj_ptr -> cntl.first_in_use != NULL)
                    /*object used in another process.  We
                      must put its kids in this process too*/
                    add_to_proc(in_oop, region, pid);

                else   set_in_use(cntl_obj_ptr, region, pid) ->
                    orig_region = region;
            }

            /* we keep track of the lowest region to use the object */
            else if (being used->region > region)
                change_region(in_oop, pid, region) -> orig_region
                                        = region;   /*now in
                                        use by a lower region*/

            cntl_obj_ptr->cntl.usage_cntr++;
            return (&(cntl_obj_ptr->obj));
        }


        cntl obj ptr = buffer mgr(in oop, FETCH FROM DB,
          region, pid);
        if (cntl_obj_ptr == NULL /* not found */ )
            return ((object *) NULL);
        set in use(cntl obj ptr, region, pid) -> orig region = region;
```

```
        cntl_obj_ptr->cntl.usage_cntr++;
        return (&(cntl_obj_ptr->obj));
}

/*************************************************************************
        add_to_proc:  add an object to a process:  reserve it and all
                      of its children (recursively) to the process.
                      This routine is called from the interpreter when
                      a new process is established, and we share
                      objects with the old process.
*************************************************************************/

void
add_to_proc(in_oop, region, pid)
        long in_oop;            /* the object to get */
        unsigned short region;
        PID pid;

{

        change_region(in_oop, pid, region);

}

/*************************************************************************
        get_obj:  fetch an object, but do not put in the in-use table.
                  The returned pointer is invalidated (possibly) upon
                  the next call to any object manager routine.
                  Furthermore, the object must not be updated since
                  this would not be reflected in the database.
*************************************************************************/

object *
get_obj(in_oop, region, pid)
        long in_oop;            /* the object to get */
        unsigned short region;
        PID pid;

{
        register cntrld_object *cntl_obj_ptr;
        register struct in_use_table *being_used;
        register struct obj_table *hit;

#if DEBUGGER
        /***************/
        if (D_ISCSET(D_OSTAT))
        {
                D_ostats.fetches++;
        }
        /* end if */
        /***************/
#endif

        /*
         * this routine called very often:  code is expanded to handle most
         * common case most quickly
         */

        if (in_oop < 0)
                syserr("object is an integer %d", in_oop);

        FIND_OBJ(in_oop, hit)

        if (hit->oop == in_oop)
                return (&(hit->obj_ptr->obj));

        cntl_obj_ptr = buffer_mgr(in_oop, FETCH_FROM_DB,
          region, pid);
        if (cntl_obj_ptr == NULL /* not found */ )
                return ((object *) NULL);
        cntl_obj_ptr->cntl.usage_cntr++;
        return (&(cntl_obj_ptr->obj));
}

/*************************************************************************
first_obj:  return the oop of the first instance of a class in the
            temporary class chain
*************************************************************************/

oop
first_obj(class, inregion, inpid)
        oop class;
{
        object * class_ptr;
        object_control *class_cntl_ptr;

        class_ptr =  get_obj(class, inregion, inpid);
        if (class_ptr == NULL)
                syserr(msg12,  class);

        /*address the control data ahead of the object, in the buffer*/
        class_cntl_ptr = BUF_CONTROL_PTR( class_ptr);
        return((oop)(class_cntl_ptr -> temp_inst_chain));
}

/*************************************************************************
next_obj:  return the oop of the next instance of a class in the
           temporary class chain
*************************************************************************/

oop
next_obj(inoop, inregion, inpid)
        oop inoop;
{
        object * obj_ptr;
        object_control *obj_cntl_ptr;

        obj_ptr =  get_obj(inoop, inregion, inpid);
        if (obj_ptr == NULL)
                syserr(msg13,  inoop);

        /*address the control data ahead of the object, in the buffer*/
        obj_cntl_ptr = BUF_CONTROL_PTR( obj_ptr);
        return((oop)(obj_cntl_ptr -> temp_inst_chain));
}

/*************************************************************************
        ref_debug:  The only purpose of this routine is to force
                    the debug routines to be included, so that they
                    may be called from dbx
*************************************************************************/
void
ref_debug()
{
        debugit();
}
```

```
/*Copyright 1988 Eastman Kodak Company.  All rights reserved.*/
/* pool_mgr.c:  free space pool manager */
#include "types.h"
#include "constants.h"
#include "oops_values.h"
#include "object_rec.h"
#include "obj_mgr.h"
#include "buffer.h"
#include "pool.h"
#include <stdio.h>

#if DEBUGGER
/****************/
#include "interp_const.h"
#include "interp_types.h"
#include "debug_const.h"
#include "debug_types.h"
#include "debug_externs.h"
#define STAT_INCR if (D_ISCSET(D_OSTAT) &&    \
        (o_ptr -> fp.class == CompiledMethod)) \
                        D_ostats.meth_slots_reused++;
/****************/
#endif DEBUGGER

#if !DEBUGGER
/**************/
#define STAT_INCR ;  /*turn off stat tally in GET_ELEMENT macro*/
/**************/
#endif


#include "get_element.h"

static char s[100];                /* err msg */
static char *msg01 = "pool_mgr01 couldn't get space for a small object";
static char *msg02 = "pool_mgr02 couldn't get space for a medium object";
static char *msg03 = "pool_mgr03 couldn't get space for a large object";
static char *msg04 = "pool_mgr04 couldn't get space for a small compile";
static char *msg05 = "pool_mgr05 couldn't get space for a medium compile";
static char *msg06 = "pool_mgr06 couldn't get space for a large compile";
static char *msg07 = "pool_mgr07 called with bad type parm: %d";
static char *msg08 = "pool_mgr08 called with too much space: %d";
static char *msg09 = "pool_mgr09 couldn't get space for a huge object";
static char *msg10 = "pool_mgr10 calloc fail: out of memory for a huge object";

static pool space;      /* pool of all free space */
extern char *get_huge();

char *
pool_mgr(size, type)               /* return a pointer to free space of the size
                                    * requested, for the type given */

        int size, type;

        static int first_time = 1;

        /* regular object pointers and array index */
        static small_c *so_ptr;
        static so_ind;             /* index to next pool element to examine */

        static medium_o *mo_ptr;
        static mo_ind;             /* index to next pool element to examine */

        static lo_ind;             /* index to next pool element to examine */

        /* compile object pointers and array index */
        static small_c *sc_ptr;
        static sc_ind;             /* index to next pool element to examine */

        static medium_c *mc_ptr;
        static mc_ind;             /* index to next pool element to examine */

        static large_c *lc_ptr;
        static lc_ind;             /* index to next pool element to examine */

        int i, j;

        /* space is initialized by the compiler to 0, which is sufficient */
        object_control *cntl_ptr;
        object *o_ptr;

        if (type == OBJECT_TYPE)
        {
#if DEBUGGER
                /****************/
                if (D_ISCSET(D_OSTAT))
                {
                        i = size / OBJ_SCALE;
                        if (i >= OBJ_GRAIN)
                        {
                                i = OBJ_GRAIN - 1;
                        }
                        D_ostats.qty_objs++;
                        D_ostats.obj_sizes[i]++;
                }
                /* end if */
                /****************/
#endif


                if (size <= sizeof(so_ptr->words))
                {
                        /*
                         * macro GET_ELEMENT will find the element of correct
                         * type and size
                         */

                        GET_ELEMENT(SO_QTY, so_ind, so_ptr, small_obj);

                        /* if we return, we cannot find a small object space */
                        syserr(msg01);
                }               /* end small  object */

                if (size <= sizeof(mo_ptr->words))
                {

                        GET_ELEMENT(MO_QTY, mo_ind, mo_ptr, medium_obj);
                        medium_anal();
                        syserr(msg02);
                }               /* end medium  object */

                if (size <= sizeof(lo_ptr->words))
                {

                        GET_ELEMENT(LO_QTY, lo_ind, lo_ptr, large_obj);
```

```
                syserr(msg03);
        }               /* end large  object */

        return (get_huge(size, type));

    }                   /* end non-compiled object processing */

    else if (type == COMPILE_TYPE)
    {

#if DEBUGGER
        /****************/
        if (D_ISCSET(D_OSTAT))
        {
                i = size / METH_SCALE;
                if (i >= METH_GRAIN)
                {
                        i = METH_GRAIN - 1;
                }
                D_ostats.qty_meths++;
                D_ostats.meth_sizes[i]++;
        }
        /* end if */
        /****************/
#endif

        if (size <= sizeof(sc_ptr->words))
        {

                /*
                 * macro GET_ELEMENT will find the element of correct
                 * type and size
                 */

                GET_ELEMENT(SC_QTY, sc_ind, sc_ptr, small_comp);

                /* if we return, we cannot find a small compile space */
                syserr(msg04);
        }               /* end small  compile */

        if (size <= sizeof(mc_ptr->words))
        {

                GET_ELEMENT(MC_QTY, mc_ind, mc_ptr, medium_comp);

                syserr(msg05);
        }               /* end medium  compile */

        if (size <= sizeof(lc_ptr->words))
        {

                GET_ELEMENT(LC_QTY, lc_ind, lc_ptr, large_comp);

                syserr(msg06);
        }               /* end large  compile */

        return (get_huge(size, type));

    }                   /* end compiled object processing */

    sprintf(s, msg07, type);
    syserr(s);

}                       /* end pool_mgr */

char *
get_huge(size, type)

/*
 * this proc. is very much like the macro used above, and changes should be
 * coordinated between them
 */

        int size, type;
{
        char *calloc();
        static char *space[HUGE_QTY];
        static int first_time = 1;
        static huge_ind;

#if DEBUGGER
        /***************/
        int static tot_meth_sizes, tot_meths, tot_obj_sizes, tot_objs;
        /***************/
#endif

        int i, j;
        char *char_ptr;
        cntrld_object *cntl_obj_ptr;
        object_control *cntl_ptr;
        object *o_ptr;

        if (first_time == 1)
        {
                first_time = 0;
                for (i = 0; i < HUGE_QTY; i++)
                {
                        space[i] = NULL;
                }
        }

        /* get a truly large area */

#if DEBUGGER
        /***************/
        if (D_ISCSET(D_OSTAT))
        {
                if (type == COMPILE_TYPE)
                {
                        tot_meth_sizes += size;
                        tot_meths++;
                        D_ostats.avg_over_meth =
                          tot_meth_sizes / tot_meths;
                        if (D_ostats.smallest_over_meth == 0)
                                D_ostats.smallest_over_meth
                                  = size;
                        if (D_ostats.smallest_over_meth > size)
                                D_ostats.smallest_over_meth
                                  = size;
                        if (D_ostats.largest_over_meth < size)
                                D_ostats.largest_over_meth
                                  = size;
                }
                else
                {
                        tot_obj_sizes += size;
                        tot_objs++;
                        D_ostats.avg_over_obj =
```

```
                if (D ostats.smallest over obj == 0)
                        D ostats.smallest over obj
                          = size;
                if (D ostats.smallest over obj > size)
                        D ostats.smallest over obj
                          = size;
                if (D ostats.largest over obj < size)
                        D ostats.largest over obj
                          = size;
        }
        /* end if */
    }
    /***************/
#endif

    if (size > MAX_OBJ_SIZE)/* let's be reasonable */
    {
        sprintf(s, msg08, size);
        syserr(s);
    }

    j = HUGE QTY + HUGE QTY;
    for (i = 0; i < j; i++)
    {
        if (huge_ind >= HUGE QTY)
            huge ind = 0;   /* wrap around */

        if (space(huge ind) == NULL)
        {
            char_ptr = calloc((unsigned)
                    (size + sizeof(object control)),
              sizeof(char));
            if (char ptr == NULL)
                    syserr(msg10);
            space(huge ind) = char ptr;
            cntl obj ptr = (cntrld object *) (char ptr);
            cntl ptr = &(cntl_obj ptr->cntl);
            o ptr = &(cntl_obj ptr->obj);
            cntl ptr->usage cntr = 0;
            cntl ptr->temp chain reset = 0;
            cntl_ptr->disk addr = NULL;
            huge ind++;
            return (char ptr);
        }

        char ptr = space(huge ind);
        cntl_obj ptr = (cntrld object *) (char ptr);
        cntl_ptr = &(cntl_obj ptr->cntl);
        o ptr = &(cntl_obj ptr->obj);

        if (cntl_ptr->usage cntr > 0)
            cntl_ptr->usage cntr--;
        if (i > HUGE QTY)
            cntl ptr->usage cntr = 0;

        if ((cntl ptr->first in use == NULL) &&
          cntl ptr->usage cntr == 0 &&
          cntl ptr -> num new kids == 0)
        {
            FREE(cntl ptr->obj table ptr)
              free(char ptr);
            char ptr = calloc((unsigned)
                    (size + sizeof(object control)),
```

```
                        space(huge ind) = char ptr;
                        cntl obj ptr = (cntrld object *) (char ptr);
                        cntl ptr = &(cntl obj ptr->cntl);
                        o ptr = &(cntl obj ptr->obj);
                        cntl ptr->usage cntr = 0;
                        cntl ptr->temp chain reset = 0;
                        cntl ptr->disk addr = NULL;
                        cntl ptr->obj table ptr = NULL;
                        huge ind++;
                        return (char ptr);
                }
                huge ind++;
        }
        syserr(msg09);
}                               /* end get huge */
medium anal()
/*If we overflow the medium object buffers, this tells us what classes
are most heavily represented*/
{
int i,j, qty, smallest = 0, other = 0;
long obj class;
cntrld object * cntl ptr;
static struct {
        int class;
        int qty;
        } topFive[5] = {{0,0},{0,0},{0,0},{0,0},{0,0}};

for (i=0; i < MO QTY; i++)
        ((cntrld object *)&space.medium obj[i]) -> cntl.not_used = 0;

for (i=0; i < MO_QTY; i++)
        {
        cntl ptr = (cntrld_object *)&space.medium obj[i];
        if (cntl ptr -> cntl.not used  == 0)
                {
                cntl_ptr -> cntl.not used  = 1;
                qty = 1;
                obj class = cntl ptr -> obj.fp.class;
                for (j = i+1; j < MO QTY; j++)
                        {
                        cntl ptr =
                                (cntrld object *)&space.medium_obj[j];
                        if (cntl ptr -> obj.fp.class == obj_class)
                                {
                                cntl ptr -> cntl.not_used = 1;
                                qty++;
                                }
                        }
                for (j = 0; j< 5; j++)
                        {
                        if (topFive[smallest].qty > topFive[j].qty)
                                smallest = j;
                        }
                if (topFive[smallest].qty < qty)
                        {
                        other = other + topFive[smallest].qty;
                        topFive[smallest].class = obj class;
                        topFive[smallest].qty = qty;
                        }
                else other = other + qty;
                }
        }
printf("Buffer overflow: Top five classes stored in medium buffers.n");
```

```
for (i=0; i < 5; i++)
        printf("class %d qty %d\n", topFive[i].class, topFive[i].qty);
printf("other: %d\n", other);
}

/*Copyright 1988 Eastman Kodak Company.  All rights reserved.*/
/* symbol.c : get/put symbols and oops */

/***************************************************************************
                This source code contains:
                getsymbol
                putsymbol
                get symbol string
                get class name
***************************************************************************/

#include <stdio.h>
#include <strings.h>
#include <math.h>
#include "types.h"
#include "constants.h"
#include "oops_values.h"
#include "dbm.h"
#include "interp_const.h"

extern object *create_permanent_object();
extern object *obj_mgr();
extern object *get_obj();
extern dbmret fetchit(), storeit(), forceit();
extern int ckpt_in_progress;
extern long oop_gen();
static dbmret dbmin, dbmout;

static char s[100];             /* err msg */
static char *not_found = "not found ";

unsigned short StringSizeIndex;

/***************************************************************************
        getsymbol:  given a symbol, return the symbol oop
***************************************************************************/

oop
getsymbol(symbol, region, pid)
        unsigned short region;
        PID pid;
        char *symbol;
{
        oop obj;

        dbmout = fetchit(SYMBOL_XREF, symbol);
        if (dbmout.obj_ptr == NULL)
                return ((oop)-1);       /* symbol not found */

        /* get symbol object */
        obj = ((symbol_xref *) dbmout.obj_ptr)->fp.symbol_oop;
        return (obj);
}

/***************************************************************************
        putsymbol:  update symbol dictionary with symbol and oop.
                    build symbol object
***************************************************************************/

oop
putsymbol(symbol, region, pid)
        char *symbol;
        unsigned short region;
        PID pid;
{
        int size;
        int no_indx_vars;
        object *obj_ptr;
        symbol_xref xref;
        oop obj;
        oop dummy_old_oop = 0;

        size = strlen(symbol);
        no_indx_vars = SLOTS_FOR_BYTES(size+1);

        obj_ptr = obj_mgr(Symbol, NEW, no_indx_vars, -1, region, pid);

        referenced(NULL, obj_ptr->fp.id,
          dummy_old_oop, region, pid);  /* clear the garbage flag */
        obj = obj_ptr->fp.id;

        bcopy(symbol, BYTEARRAY_DATA(obj_ptr), size);
        INSTANCE_VARS(obj_ptr)[StringSizeIndex] = INTEGER_OBJECT(size);
        BYTEARRAY_DATA(obj_ptr)[size] = '\0';   /* c-string compatibility */

        dbmin.obj_ptr = (object *) & xref;
        dbmin.disk_addr = NULL;
        xref.fp.length = sizeof(xref.fp) + strlen(symbol) + 1;
        xref.fp.rec_type = SYMBOL_XREF;
        xref.fp.mark = UNMARKED;
        xref.fp.flags = PERM_OBJ;       /* and ~GARBAGE by default */
        xref.fp.ovfl_chain = NULL;
        xref.fp.size_ovfl_rec = 0;
        xref.fp.symbol_oop = obj;
        strcpy(xref.symbol, symbol);

        ckpt_in_progress = 1;   /* protect from interrupts */

        /*
         * force both symbol and xref to db, atomically.  We use forceit on
         * symbol object rather than waiting for next checkpoint to put it to
         * db, because subsequent ABORT would cause symbol rec not to be
         * written, but xref would be written, leaving dangling xref.  This
         * could happen in compiler, when class fails to compile, backing out
         * all db updates for the class, but we would leave the xref rec
         * dangling
         */

        dbmout = forceit(dbmin);
        dbmin.obj_ptr = obj_ptr;
        obj_ptr->fp.flags &= ~UPDATED;
        dbmout = storeit(dbmin);
        chckpt_oop();                   /* force out control record to protect
                                         * against db out of sync, if we Abend.  This
                                         * is required since xref record is not under
                                         * control of obj mgr:  we use forceit
                                         * instead. */

        return (obj);
}

/***************************************************************************
        get symbol string:  given a symbol oop, get its string
***************************************************************************/

char *
get_symbol_string(obj, region_cntr, pid)
```

```
        unsigned short region cntr;
{
        object *db ptr;

        if ((db ptr = get ot j(ob), region cntr, pid)) != NULL)
                return ((char *) BYTEARRAY DATA(db ptr));

        return (not found);
}
/*****************************************************************************
        get class name:  given a class oop, get its name
*****************************************************************************/

char *
get_class_name(class_oop)
        oop class oop;
{
        object *db ptr;
        class_object *class ptr;
        class_cntrl *class_cntl_ptr;


        if (class_oop < 0)
                return ("Invalid class");
        if (class oop >= INIT_CNTX_ID)  /* block context */
                return ("Invalid class");

        db_ptr = get_obj(class_oop, 0, 0);
        if (db_ptr != NULL)
        {
                class_ptr = (class_object *) db ptr;
                class_cntl_ptr = (class_cntrl *) & (class_ptr->obj.value[
                    class_ptr->obj.fp.no_named_vars +
                    class_ptr->obj.fp.no_indx_vars]);
                return (get_symbol string(class cntl ptr->cfp.symbol oop, 0, 0));
        }
        return (not_found);
}
```

```
/*Copyright 1988 Eastman Kodak Company */
/* trans_mgr.c:  synchronize db */

/**************************************************************************
                    source code for:
                    trans_mgr
**************************************************************************/

/**************************************************************************
Trans_mgr provides for transaction control:  operation COMMIT will
synchronize the database with in-memory objects (that are reachable from
other database objects).  This assures database recoverability at this point.

ABORT will re-sync memory with the database to the last sync point.
ABORT does NOT restore non-database (in-memory only) objects to the last
sync-point.  For example, if a non-permanent object is updated by a
transaction and the transaction is ABORTed, the ST program will have to
restore the object (if necessary).  (This feature could be obtained by
flushing all the transient objects to the database upon a COMMIT,
which will cause their restoration upon an ABORT.  To do this, we
should add a new function to trans_mgr that functions just as COMMIT,
except all objects are written to the database).*/


/************this program has not been tested*********************/

#include "types.h"
#include "constants.h"
#include "oops_values.h"
#include "object_rec.h"
#include "obj_mgr.h"
#include "dbm.h"
#include "buffer.h"
#include "pool.h"
#include <stdio.h>

#if DEBUGGER
/**************/
#include "interp_const.h"
#include "interp_types.h"
#include "debug_const.h"
#include "debug_types.h"
#include "debug_externs.h"
/**************/
#endif

static char *msg02 = "trans_mgr: invalid operation:%d";

extern struct in_use_table in_use[MAX_HELD_OBJ];
extern struct process_data proc_data[MAX_PROCESSES];
extern struct obj_table obj_table[O_TABLE_SIZE];


void chckpt_oop();
dbmret storeit();
dbmret forceit();
dbmret fetchit();
object *obj_mgr();

extern reusable_oops reuse;

int
trans_mgr(operation, pid)
        PID pid;

{
        object *obj_ptr, *parent_ptr;
        struct in_use_table *use_ptr, *next_ptr, *start_ptr = NULL;
        object_control *cntl_ptr, *parent_cntl;
        struct obj_table *tbl_ptr, *dummy;
        dbmret dbmin, dbmout;
        unsigned short any_changes = 0;


        if (operation == COMMIT)
        {

#if DEBUGGER
                /**************/
                if (D_ISCSET(D_OSTAT))
                {
                        D_ostats.commit++;
                }
                /**************/
#endif
                mark_non_garb(0, pid, (long)1,  GMARK);/* recursively mark
                                                non-garbage objects */

                /*if we were able to restart exactly at the commit point
                  (meaning we saved contexts) then we would write
                  all objects reachable from any context to the db, as
                  well as the non-garbage stuff*/

                update_perm_chain(pid,'0, GMARK); /*objects about
                        to be written to db must be present in the permanent
                        chain*/


                for (use_ptr = proc_data[pid].pid_tail; use_ptr != NULL;
                  use_ptr = next_ptr)
                {
                        next_ptr = use_ptr->pid_bkwd_chain;
                        cntl_ptr = &(use_ptr->buffer_ptr->cntl);
                        obj_ptr = &(use_ptr->buffer_ptr->obj);
                        obj_ptr->fp.mark == UNMARKED;


                        if (!((obj_ptr->fp.flags) & UPDATED))
                                continue;       /* old object, not updated
                                                 * since last sync point */

                        if (obj_ptr->fp.mark == GMARK)
                        {
                                /* kid of some non-garbage object */
                                if (obj_ptr -> fp.flags & GARBAGE)
                                {
                                    /*this is a new object: we add it
                                    to the permanent instance chain*/
                                }
                                obj_ptr->fp.flags &= ~GARBAGE;
                        }

                        if (!(obj_ptr->fp.flags & GARBAGE))
                        {
                                /* updated, non-garbage record written to db */
```

```
                if (!any_changes)
                {
                        any_changes = 1;
                        start_commit();
                }
                obj_ptr->fp.flags =
                  (obj_ptr->fp.flags) & ~UPDATED;
                dbmin.obj_ptr = obj_ptr;
                dbmin.disk_addr =
                  use_ptr->buffer_ptr->cntl.disk_addr;
                if (dbmin.disk_addr < 0)
                        dbmout = forceit(dbmin);
                else
                        dbmout = storeit(dbmin);
                use_ptr->buffer_ptr->cntl.disk_addr =
                  dbmout.disk_addr;

                if (use_ptr -> orig_region < 0)
                        rmv_in_use(use_ptr, pid);

                /*object not pinned by any pointer, since
                its orig region has been gc's, so we
                can free the space.  We can only do this
                for objects written to db, since garbage
                objects, even though not pinned, can
                become non-garbage later in the run*/


        }
    }

    if (any_changes)/* the db was updated */
            chckpt_oop();   /* checkpoint the id of the last oop
                             * generated */

    return ((int) 0);
}                   /* end COMMIT specific logic */

if (operation == ABORT)

    /*
     * logic is like COMMIT, except db not updated, and any
     * updated objects are discarded.  A complication is objects
     * in use by more than one process.
     */

{
#if DEBUGGER
    /**************/
    if (D_ISCSET(D_OSTAT))
    {
            D_ostats.abort++;
    }
    /**************/
#endif
    for (use_ptr = proc_data[pid].pid_tail; use_ptr != NULL;
      use_ptr = use_ptr->pid_bkwd_chain)
    {
            obj_ptr = &(use_ptr->buffer_ptr->obj);
            cntl_ptr = &(use_ptr->buffer_ptr->cntl);
            if ((obj_ptr->fp.flags & UPDATED) &&
              !(obj_ptr->fp.flags & GARBAGE))
            {
/*
 * we only restore non-garbage objects that
 * have been updated
 */
if (use_ptr->buffer_ptr->cntl.first_in_use->
        obj_fwd_chain == NULL)
{

        /*
         * nobody else using this
         object, so we  delete it, so
         that any new users  go to db
         to get it (rather than ng
         copy in memory) */

        rmv_in_use(use_ptr, pid);
        use_ptr->buffer_ptr->cntl.usage_cntr
        = 0;

        /*
         * force faster reuse of space by
         * pool manager
         */
        tbl_ptr = use_ptr->buffer_ptr->
          cntl.obj_table_ptr;
        tbl_ptr->oop = -1;

        /*
         * this entry points to nothing;
         * makes object unreachable, except
         * by pool manager
         */

        cntl_ptr->obj_table_ptr = NULL;
        obj_ptr->fp.flags =
          (obj_ptr->fp.flags) & (~UPDATED);
        break;
}

/*
 * refetch object .  Note that object must be
 * put in same spot in buffer because of
 * outstanding references to its address (in
 * obj_table, in_use table, etc).  Also note
 * that if object is in-use in another
 * process, all of its updates have been
 * wiped out.  It is up to the programmer to
 * abort each running process independently,
 * if shared objects (between processes)
 * could cause a problem.
 */

dbmout = fetchit(OBJ_REC, &(obj_ptr->fp.id));
if (dbmout.obj_ptr != NULL &&
  dbmout.obj_ptr->fp.length <=
  obj_ptr->fp.length)
{

        /*
         * not clear what to do if not enough
         * space.  Because the object is
         * pinned, we can not move it
         * elsewhere.  Not clear that this is
```

```
                         * even possible, since 'become'
                         * primitive makes object at least as
                         * large as previous version.
                         */

                        bcopy((char *) dbmout.obj ptr,
                          (char *) obj ptr,
                          dbmout.obj ptr->fp.length);
                        use ptr->buffer ptr->entl.disk addr =
                          dbmout.disk addr;
                    }

                    /*
                     * if object is not found, this means that
                     * the object is new, but non-garbage (and
                     * not in db).  This is a valid condition,
                     * and we just leave the object alone:  It
                     * will be written to db when a sync-point is
                     * done.
                     */
                    break;
                }
            }               /* end for loop */

            /*
             * dictionary records are created outside the object manager,
             * so we must write out the control record, just in case any
             * of these records have been created.  The following
             * statement accomplishes this
             */
            chckpt_oop();
            return ((int) 0);
        }                   /* end ABORT specific logic */

        /* invalid operation */
        syserr(msg07, operation);
}                           /* end proc */
```

Appendix H: Garbage Collector Source Code.

collector.c

```
/*Copyright 1988 Eastman Kodak Company.  All rights reserved.*/
/* collector.c:  new garbage collector */

/*********************************************************************
                source code for:
                collector
                change_region
                referenced
                mark
                mark_non_garb
                fix_temp_chain
                update_perm_chain
                update_buffer
                clean_region
                repair_temp_chain
*********************************************************************/

#include "types.h"
#include "constants.h"
#include "oops_values.h"
#include "object_rec.h"
#include "obj_mgr.h"
#include "dbm.h"
#include "buffer.h"
#include "pool.h"
#include <stdio.h>
#include "interp_const.h"
#include "interp_types.h"

#if DEBUGGER
/**************/
#include "debug_const.h"
#include "debug_types.h"
#include "debug_externs.h"
FILE *Tracer;                   /* debug */
extern int debug_oop;           /* debug */
extern int TraceOn;             /* debug */
/**************/
#endif

#define MAX_KIDS        1000
#define MAX_NON_GARB    500
#define MAX_NEW_REGIONS 25

static int kids[MAX_KIDS];
static int non_garb[MAX_NON_GARB];

static char *msg02 =
"change_region02: not enough room for kids in kid table";
static char *msg03 =
"mark03: not enough room for kids in kid table";
static char *msg04 =
"collector04: not enough room for non-garb objs in non-garb table";
static char *msg05 =
"referenced05: logic error: parent not in object table: %d";
static char *msg06 =
"update_buffer06: logic error: object not in object table: %d";
static char *msg07 =
"clean_region07: not enough room for kids in kid table";
static char *msg08 =
"mark_non_garb08: not enough room for kids in kid table";
static char *msg09 =
"referenced09: not enough room for kid in new_regions table";
static char *msg10 =
"update_perm_chain10: object %d cannot find its class %d";
static char *msg11 =
"repair_temp_chain11: object %d not in memory, but in temp chain";
static char *msg12 =
"repair_temp_chain12: object's (%d) parent not in memory";

extern struct in_use_table in_use[MAX_HELD_OBJ];
extern struct process_data proc_data[MAX_PROCESSES];
extern struct obj_table obj_table[O_TABLE_SIZE];

int first_obj_oop = FIRST_OBJ_OOP;      /* first object that can have
                                         * instance variables.  Image utility
                                         * overrides in order to consider
                                         * oops < 261 too, so that these are
                                         * handled (when set up by image).
                                         * Else, we use FIRST_OBJ_OOP */


void chckpt_oop();
void update_buffer();
void fix_temp_chain();
void update_perm_chain();
void repair_temp_chain();
void mark();
struct in_use_table *change_region();
extern struct in_use_table *set_in_use();
dbmret storeit();
dbmret forceit();
dbmret fetchit();
object *obj_mgr();
object *reserve_obj();

extern reusable_oops reuse;

int
collector(region, inpid)

/*NOTE 1:
 * calling collector means that the objects fetched/created since the region
 * was established are no longer needed, and may be removed from memory;  any
 * changes to the objects involved will be applied to the db at the next
 * commit point (see trans_mgr), or when region 0 is collected. We call
 * collector from the interpreter, and only when a return statement is
 * processed that returns from a higer region number to a lower one. System
 * logic in referenced, change_region, and reserve_obj assure that there can
 * be no references from a low region into a higer one.
 */

        unsigned short region;          /* we collect all regions >= this parm */
        PID inpid;

{

        object *obj_ptr;
        struct in_use_table *use_ptr, *next_ptr;
        object_control *cntl_ptr;
        dbmret dbmin, dbmout;
        unsigned short any_changes = 0;
        int bottom, i;
```

```
#if DEBUGGER
        /**************/
        if (D_ISCSET(D_OSTAT))
        {
                D_ostats.collector++;
        }
        if (TraceOn)
                fprintf(Tracer, "collector process %d region %d \n",
                  inpid, region);
        /**************/
#endif

        if (region == 0)
        {

                /*NOTE 2:
                 * we do a marksweep on the region, making kids of
                 * non-garbage non-garbage.  Then we write out all of the
                 * non-garbage to the database .  Collecting region 0 means
                 * that the process is terminating.  We need not write out
                 * updated objects (nor their children) that are shared
                   by another region provided they are  non-garbage,
                   since we can let termination of the last region to
                   hold the object do the db update.  Garbage objects
                   reachable by updated non-garbage must be written
                   out, even when they are shared, since the objects in
                   the other process that reference the shared garbage
                   object may have the reference changed, leaving us
                   with a dangling reference.  */

                mark_non_garb(region, inpid, (long)0, GMARK);   /* the 0 means
                                                                   that the
                                                                   (non-garb)
                                                                   object is
                                                                   marked only
                                                                   if not
                                                                   shared in
                                                                   another
                                                                   process */

                fix_temp_chain(inpid, region, GMARK);
                update_perm_chain(inpid, region, GMARK);

                for (use_ptr = proc_data[inpid].pid_tail; use_ptr != NULL;
                  use_ptr = next_ptr)
                {

                        /*
                         * the purpose of this loop is to remove objects from
                         * the in-use table that remain in this region. Space
                         * for garbage objects is recovered from the buffer.
                         * Updated objects are written to the database.
                         */

                        next_ptr = use_ptr->pid_bkwd_chain;
                        cntl_ptr = &(use_ptr->buffer_ptr->cntl);
                        obj_ptr = &(use_ptr->buffer_ptr->obj);

                        /* free space in in use for reuse */
                        /*we do this before the following logic so that
                          we can test buffer_ptr->first_in_use to see
                          if object is used in other processes*/

                        rmv_in_use(use_ptr, inpid);

                        if (obj_ptr->fp.mark == GMARK)
                        {
                                if ((obj_ptr->fp.flags) & UPDATED)
                                {

                                        /*
                                         * updated, marked (non-garbage)
                                         * record written to db.
                                         */

                                        if (!any_changes)
                                        {
                                                any_changes = 1;
                                                start_commit();
                                        }


                                        obj_ptr->fp.flags &= ~UPDATED;
                                        obj_ptr->fp.flags &= ~GARBAGE;
                                        obj_ptr->fp.mark = UNMARKED;
                                        dbmin.obj_ptr = obj_ptr;
                                        dbmin.disk_addr =
                                          cntl_ptr->disk_addr;
                                        if (dbmin.disk_addr < 0)
                                                dbmout = forceit(dbmin);
                                        else
                                                dbmout = storeit(dbmin);
                                        cntl_ptr -> disk_addr =
                                          dbmout.disk_addr;
                                }

                        }
                        else
                         /* not marked */ if (cntl_ptr->first_in_use == NULL)
                                if (obj_ptr->fp.flags & GARBAGE)
                                {
                                        /* not in use by any process */
                                        /* allow buffer space to be reused */
                                        update_buffer(cntl_ptr, obj_ptr);


                                }
                        obj_ptr->fp.mark == UNMARKED;   /* remove RMARK/GMARK */
                }       /* end for loop */

                if (any_changes)
                        chckpt_oop();   /* checkpoint the id of the last oop
                                         * generated */
                proc_data[inpid].gc_obj_count[region] = 0;
                proc_data[inpid].true_obj_count[region] = 0;

                return;
        }

        /*
         * we are collecting a region other than 0.  We move all (updated)
         * non-garbage, and their kids (recursively) to a lower region, then
         * delete the in use table entries that are left, and rid ourselves
         * of the objects
         */


        bottom = -1;
```

```
for (use ptr = proc data[inpid].pid tail; use ptr != NULL;
  use ptr = use ptr->pid bkwd chain)
{
        if (use ptr->region >= region)
        {

                ob  ptr = &(use ptr->buffer ptr->obj);
                ob  ptr->fp.mark    UNMARKED;


                if (!(obj ptr->fp.flags & GARBAGE) && (obj ptr->
                fp.flags & UPDATED))
                {

                /*
                 * put the object in the non garb table.  We cannot
                 * call change region directly due to the recursive
                 * manipulation  in that process of the
                 * pid bkwd chain that we are processing.
                 */

                        bottom++;
                        if (bottom >= MAX_NON_GARB)
                                syserr(msg04);
                        non garb[bottom] = obj ptr->fp.id;
                }
        }

        if (use_ptr->orig_region >= region)
                use_ptr -> orig_region = -1;  /* NOTE 3:
                  -1 indicates this object is not pinned in this
                  process, since the region that first accessed
                  it has been gc'd.  Note that even though the
                  object is not pinned by the interp, we can
                  not remove it, since it may have been updated
                  but not yet written to the db.  Also, garbage
                  objects that have been moved to a lower
                  region and whose orig. region has been gc'd
                  can not be discarded even though they are not
                  pinned, since they may be referenced by some
                  object that is (or will be) non-garbage.*/

}

for (i = 0; i <= bottom; i++)
{

        change_region(non_garb[i], inpid, region - 1);

}

fix_temp_chain(inpid, region, GMARK);
/* remove all of the garbage from class chains */

for (use_ptr = proc_data[inpid].pid_tail; use ptr != NULL;
  use ptr = next ptr)
{
        if (use_ptr->region < region)
                break;

        next ptr = use ptr->pid bkwd chain;
        cntl ptr = &(use ptr->buffer ptr->cntl);
        obj ptr = &(use ptr->buffer ptr->obj);

                /* free space in in use for reuse */
                rmv in use(use ptr, inpid);

                if (cntl ptr->first in use == NULL)
                        if (obj ptr->fp.flags & GARBAGE)
                        {
                                /* no other processes holding this object */
                                /* allow buffer space and oop to be re-used */

                                update buffer(cntl ptr, obj ptr);
                        }
        }

        proc data[inpid].gc obj count[region] = 0;
        proc data[inpid].true obj count[region] = 0;
        return;
}                               /* end proc */

/*********************************************************************
        change_region:  change the region associated with an object.,
        and all of its kids, recursively.
                NOTE 4:
                Case 1:
                This is required when an object created at a high
                region is returned to a method associated with a lower
                region.  We want to keep the garbage collector from
                scavaging the object until the 'parent method' collects
                its  region.  The interpreter calls change_region when
                it detects such a return.

                Case 2:
                The collector itself calls change_region when collecting
                a region and discovering an object with garbage flag off:
                we move this and its kids to a lower region.

                Case 3:
                Some program calls the object manager to reserve an
                object.  The object is already in use at a higher region
                id.  We move the object to the new (lower) region, along
                with its kids, to keep it from being collected when the
                higher region ends.  This call is from routine reserve_obj).

                case 3 also needs to handle the condition of cross-process
                references.  For this reason, if the object is not in
                the in_use table at the process, change_region will set
                it up as an entry at the process.  This will force
                entries of all children, recursively, at the process
                too.  Thus when any process ends, the other one
                will still be holding the parent (and all children, etc)
                and none will be garbage collected until all processes
                holding the parents are collected.

                Cross process references are detected in 'referenced',
                and also handled when the interpreter calls
                'add_to_proc', to copy an object to a newly established
                process.  Referenced function also detects cross-process
                references.

                We return a pointer to the in use table element that
                holds the new spot for the object entry.
*********************************************************************/

struct in use table *
```

```
change_region(inoop, inpid, new_region)
	long inoop;
	PID inpid;
	unsigned short new_region;

{

	cntrld_object *buffer_ptr;
	struct in_use_table *being_used, *return_ptr = NULL;
	struct obj_table *hit;
	int top, bottom;
	int qty_indx_vars;
	int stop = 0;
	int i, pos_oop;
	object *obj_ptr;
	int more = 1;
	short orig_region;

#if DEBUGGER
	/****************/
	if (TraceOn)
		fprintf(Tracer, "change_region %d \tprocess %d new_region %d\n",
		  inoop, inpid, new_region);
	/****************/
#endif

	bottom = 0;
	kids[0] = inoop;		/* first object to move */

	for (top = 0;; top++)
	{
		if (top >= MAX_KIDS)
			top = 0;

		FIND_OBJ(kids[top], hit)	/* get the object from the
						 * object table */
		  if (hit->oop != kids[top])
		{

			/*
			 * object not in memory, not associated with any
			 * region yet, so no need to change (non-existent)
			 * region, since it is not involved in g-collector
			 */
			if (top == bottom)
				break;
			continue;
		}

		buffer_ptr = hit->obj_ptr;	/* points to spot in buffer */
		obj_ptr = &(hit->obj_ptr->obj);

		IN_USE(buffer_ptr, inpid, being_used)	/* get spot in in_use
							 * table */

		orig_region = new_region;
			/*default if not in in_use table already*/

		if (being_used != NULL)
		{
			orig_region = being_used -> orig_region;
			if (being_used->region <= new_region)
			{
				if (hit->oop == inoop)
					return_ptr = being_used;
				if (top == bottom)
					break;

				/*
				 * we must not raise region.  The object may
				 * be in use at multiple regions for same
				 * pid. ONLY the lowest is placed in the
				 * in_use table.
				 */
				continue;
			}
			rmv_in_use(being_used, inpid);
		}
		being_used = set_in_use(buffer_ptr, new_region, inpid);

		/*restore the orig_region id*/
		being_used -> orig_region = orig_region;
		if (hit->oop == inoop)
			return_ptr = being_used;

		if (kids[top] < first_obj_oop)
		{
			if (top == bottom)
				break;
			continue;
		}

		/* put kids of this object in the kid table */
		if (obj_ptr->fp.id == obj_ptr->fp.class)
			qty_indx_vars = obj_ptr->fp.no_indx_vars;
		/* all classes can have index vars */
		else if (obj_ptr->fp.flags & NO_INDEX_VARS)

			/*
			 * object has binary data instead of index vars (e.g.
			 * Float)
			 */
			qty_indx_vars = 0;
		else
			qty_indx_vars = obj_ptr->fp.no_indx_vars;
		for (i = 0; i < obj_ptr->fp.no_named_vars + qty_indx_vars; i++)
		{
			pos_oop = obj_ptr->value[i];
			if (pos_oop >= first_obj_oop)
			{
				bottom++;
				if (bottom >= MAX_KIDS)
					bottom = 0;
				if (bottom == top)
					syserr(msg02);
				kids[bottom] = pos_oop;
			}
		}
		if (top == bottom)
			break;
	}
	return (return_ptr);
}

/*********************************************************************
	mark:  change kids of a non-garbage object to non-garbage,
	       and so forth recursively.
```

```
         We assume that the kids table is filled with unmarked
         object oops before we arrive here.
**********************************************************************/

void
mark(bottom, marker)
      int bottom;
      char marker;

{

      struct obj_table *hit;
      int top;
      int qty_indx_vars;
      int more = 1, i;
      object *obj_ptr;
      int pos_oop;
      int orig_qty_left;


      for (top = 0, orig_qty_left = bottom + 1;; top++, orig_qty_left--)
      {
            if (top >= MAX_KIDS)
                  top = 0;

            if (kids[top] < 0)
            {
                  if (top == bottom)
                        break;
                  continue;
            }

            FIND_OBJ(kids[top], hit)        /* get the object from the
                                             * object table */
             if (hit->oop != kids[top])
            {
                  if (top == bottom)
                        break;
                  continue;       /* object not in memory, not
                                   * associated with any region yet, so
                                   * no need to change (non-existent)
                                   * region, since it is not involved
                                   * in g-collector */
            }

            obj_ptr = &(hit->obj_ptr->obj);

            if (orig_qty_left <= 0 && !(obj_ptr->fp.flags & UPDATED))
            {

                  /*NOTE 5:
                   * if object is not initially in the table, and has
                   * not been updated, there is no reason to mark it or
                   * its kids:  not updated means it is non-garbage and
                   * hence always obtainable from the db should it be
                   * re-accessed, and not updated means it has no new
                   * kids so far, and hence all kids are also in the
                   * db, and accessible.  It is important to handle the
                   * orig entries in the table differently, since these
                   * could represent pinned objects (receivers to the
                   * in-process contexts), and we can not remove these
                   * from the in_use table, even though they are not
                   * updated, non-garbage, since we have a pointer to
                   * them in the interpreter.
                   */
                  if (top == bottom)
                        break;
                  continue;
            }

            if (obj_ptr->fp.mark == marker)
            {
                  if (top == bottom)
                        break;
                  continue;       /* kid already marked, do not
                                   * reprocess: circularity avoidance!
                                   * We can assume that all kids (etc)
                                   * are also marked, or in the kids
                                   * table */
            }

            obj_ptr->fp.mark = marker;      /* on the mark */

            if (kids[top] < first_obj_oop)
            {
                  if (top == bottom)
                        break;
                  continue;
            }


            /* put kids of this object in the kid table */
            if (obj_ptr->fp.id == obj_ptr->fp.class)
                  qty_indx_vars = obj_ptr->fp.no_indx_vars;
            /* all classes can have index vars */
            else if (obj_ptr->fp.flags & NO_INDEX_VARS)

                  /*
                   * object has binary data instead of index vars (e.g.
                   * Float)
                   */
                  qty_indx_vars = 0;
            else
                  qty_indx_vars = obj_ptr->fp.no_indx_vars;
            for (i = 0; i < obj_ptr->fp.no_named_vars + qty_indx_vars; i++)
            {
                  pos_oop = obj_ptr->value[i];
                  if (pos_oop >= first_obj_oop)
                  {
                        bottom++;
                        if (bottom >= MAX_KIDS)
                              bottom = 0;
                        if (bottom == top)
                              syserr(msg02);
                        kids[bottom] = pos_oop;
                  }
            }
            if (top == bottom)
                  break;
      }
}
/**********************************************************************
      referenced:  handle cross region references by moving kids to the
                   (lower) region of the parent.
**********************************************************************/

/**************************************************************
```

```
NOTE 6:
This routine is called by the interpreter, and elsewhere, when
some newly created object (new oop) is assigned to some other
object's (ref obj) instance variable. This means that the
object new oop now has a reference in some other object, making
new oop potentially non-garbage. We move the referred-to
object (new_oop) to the region of its new parent, if this
region is less that where it currently is, and recursively for
any children of the child.

If ref_obj_ptr is NULL, this means the new oop is to be made
non-garbage at this time. We clear the garbage flag.
Collector will recursivel make kids not garbage when parent is
written to database.

Cross-process references are handled by putting entries for the
child (and grandchildren...) in the process(es) of the parent.
This assures that no object reachable from a process will be
deleted by g-collecting another process (since the collector
does not delete objects that have entries in the in use table
for more than one process).

*************************************************************/

object *
referenced(ref_obj_ptr, new_oop, old_oop, region, inpid)

/** ref_obj_ptr (the 'parent') points to the object that had an instance
variable updated . new_oop is the new value (the, 'child'),
old_oop the old value of the changed instance variable **/


        object *ref_obj_ptr;
        unsigned short region;
        PID inpid;
        long new_oop, old_oop;
{
        struct obj_table *obj_table_ptr, *parent_ptr, *child_ptr;
        object *obj_ptr;
        long class_chain;
        unsigned short move_to_region, child_region;
        struct in_use_table *parent_use, *child_use;
        struct new_regions
        {
                unsigned short region;
                PID newpid;
        };
        struct new_regions new_regions[MAX_NEW_REGIONS];
        int num_regions = 0;
        int i;

#if DEBUGGER
        /****************/
        if (TraceOn)
        {
                fprintf(Tracer, "referenced %d \tprocess %d region %d old oop %d ",
                  new_oop, inpid, region, old_oop);
                if (ref_obj_ptr == NULL)
                        fprintf(Tracer, "parent is nil\n");
                else
                        fprintf(Tracer, "parent is %d\n", ref_obj_ptr->fp.id);
        }
        /****************/
#endif

        FIND_OBJ(new_oop, child_ptr)
          if (child_ptr->oop == new_oop)
        {
                obj_ptr = &(child_ptr->obj_ptr->obj);
                if (ref_obj_ptr == NULL)
                {
                        /* make new_oop a permanent object */
                        obj_ptr->fp.flags &= ~GARBAGE;

                        /*
                         * when the process is terminated, all of the extant
                         * kids of this object (etc) will be made non-garbage
                         * too
                         */

                        return (obj_ptr);
                }
        }
        else
                return (NULL);  /* child not in memory, must be non-garbage
                                 * already, and thus so are kids... */

        if (new_oop < first_obj_oop)
                return;         /* permanent object with no kids at all (like
                                 * TRUE, FALSE, nIL, we need not process */


        FIND_OBJ(ref_obj_ptr->fp.id, parent_ptr)

          if (parent_ptr->oop != ref_obj_ptr->fp.id)
                syserr(msg05, ref_obj_ptr->fp.id);
        /*
         * check all processes that own the parent.  For any that do not own
         * the child too, recursively put entries for the child into the
         * parent's process, at the parent's region.  For any process that
         * owns both the parent and the child, if the parent region < child
         * region, recursively move child to region of the parent
         */

        for (parent_use = parent_ptr->obj_ptr->cntl.first_in_use;
          parent_use != NULL;
          parent_use = parent_use->obj_fwd_chain)
        {

                move_to_region = 1;
                for (child_use = child_ptr->obj_ptr->cntl.first_in_use;
                  child_use != NULL;
                  child_use = child_use->obj_fwd_chain)
                {
                        if (child_use->pid == parent_use->pid)
                        {
                                /* child and parent in use at same process */
                                if (parent_use->region >= child_use->region)
                                        move_to_region = 0;
                                break;
                        }
                }
                if (move_to_region)
                {
                        /* must move child to new region or pid */
                        if (num_regions >= MAX_NEW_REGIONS)
                                syserr(msg07);
```

```
                        new regions[num regions].region = parent use ->region;
                        new regions[num regions].newpid = parent use ->pid;
                        num regions++;
                }
        }

        /*
         * now call change region to move kid in all processes required.
         * change region can not be called from above loop because it alters
         * the obj fwd chain being processed
         */

        for (i = 0; i < num regions; i++)
        {
                change_region(new oop, new regions[i].newpid,
                  new regions[i].region);
        }

        return (obj ptr);
}

/***********************************************************************
        mark_non garb:  recursively mark all non-garbage objects in
                        the process.

                        This procedure removes all marks in the region
                        being scanned, and then marks the objects.  I.E.
                        callers will have any previous marks destroyed.
************************************************************************/

mark_non_garb(region, inpid, consider_shared_too, marker)
        PID inpid;
        unsigned short region;
        long consider_shared_too;
        char marker;
{

        int bottom;
        object *obj_ptr;
        struct in_use_table *use_ptr, *next_ptr;

        bottom = -1;            /* last element in kids table */


        for (use_ptr = proc_data[inpid].pid_tail; use_ptr != NULL;
          use_ptr = use_ptr->pid_bkwd_chain)
        {
                if (use_ptr->region < region)
                        break;
                obj_ptr = &(use_ptr->buffer_ptr->obj);
                obj_ptr->fp.mark = UNMARKED;    /* marks can be left over
                                                 * from other calls to mark */
                if (!(obj_ptr->fp.flags & GARBAGE))
                {
                        if (obj ptr->fp.flags & UPDATED)

                                /*
                                 * if object is not garbage, but was not
                                 * updated, all kids must be non-garbage, and
                                 * do not have to have their children checked
                                 */
                                use ptr->buffer ptr->cntl.first in use
                                obj fwd chain == NULL)

                                /*NOTE 7:
                                 * if not requested, objects shared
                                 * between processes will not be
                                 * recursively marked.  Unless we are
                                 * doing a commit, we need not
                                 * consider (non-garb) objects that
                                   are shared
                                 * in 2 or more processes.  The
                                 * existence of an extant process
                                 * that holds the parent assures that
                                 * no (garbage) kid can be discarded
                                 * until the last process that holds
                                 * the parent is collected.  Thus it
                                 * is save to remove entries in the
                                 * in use table for a process if a
                                 * remaining process still has in_use
                                 * table entries for the object.  It
                                 * is only when all processes have
                                 * released an object that the
                                 * collector will discard the
                                 * (garbage) object.
                                 * Note that writing out a class
                                 * when its kids are in another
                                 * process could cause the kids
                                 * to not be written out when the
                                 * other process is collected,
                                 * since the update flag may have
                                 * been off'ed at that time.
                                 */
                        {

                                bottom++;
                                if (bottom >= MAX_KIDS)
                                        syserr(msg08);
                                kids[bottom] = obj_ptr->fp.id;

                        }
                }
        }

        if (bottom >= 0)
                mark(bottom, marker);
}

/***********************************************************************
        clean region:  recursively mark all non-garbage objects, and
                       all objects reachable from context temps, for
                       all regions >= to the one requested.  This cleans
                       all regions >= the one requested, since we
                       know that no object at a lower region can
                       point to (a garbage) one at a higher region.
                       We discard all non-marked objects in the regions
                       processed.
************************************************************************/

clean region(retain oop, inpid, region, in cntx ptr)
        PID inpid;
        unsigned short region;
        oop retain oop;
        cntx *in cntx ptr;
```

```
{
        int bottom, i;
        object *obj_ptr;
        object_control *cntl_ptr;
        struct in_use_table *use_ptr, *next_ptr;
        cntx *cntx_ptr;
        struct process *proc_ptr;

#if DEBUGGER
        /****************/
        if (TraceOn)
                fprintf(Tracer, "clean region %d process %d \n",
                  inpid, region);
        if (D_ISCSET(D_OSTAT))
        {
                D_ostats.clean_region++;
        }
        /****************/
#endif

        for (i = region; i <= in_cntx_ptr->ctrl_vars.region; i++)
                proc_data[inpid].gc_obj_count[i] = 0;

        /*NOTE 8:
         * Take care of any new kids of non-garbage, non-shared objects. Even
         * though a non-garbage object can not be reached from the context
         * temps of the region being processed, we must mark it, since it may
         * have a new child in this region that is not reachable from the
         * context temps in the region.  Such a child could be lost when we
         * clean the region, leaving a dangling reference from a non-garbage
         * object.  We prevent this by marking all (updated) kids of
         * (updated) non-shared, non-garbage objects.  Note that shared
         * (between processes) non-garbage objects are guaranteed to have
         * their kids in all processes, so we can delete the in-use entry for
         * this process, knowing that any new kids will be retained in the
         * other process.
         */

        mark_non_garb(region, inpid, (long)0, RMARK);

        bottom = 0;             /* last element in kids table */

        /*
         * take care of any object reachable from a context temp, or the
         * retain_oop
         */
        kids[0] = retain_oop;

        /* take care of all objects reachable from contexts */

        for (cntx_ptr = in_cntx_ptr;
          cntx_ptr != NULL;
          cntx_ptr = cntx_ptr->prev)
        {
                if (cntx_ptr->ctrl_vars.region < region)
                        break;

                /* preserve method object */
                if (cntx_ptr->ctrl_vars.code_ptr != NULL)
                {
                        bottom++;
                        if (bottom >= MAX_KIDS)
                                syserr(msg07);
                        kids[bottom] =
                          cntx_ptr->ctrl_vars.code_ptr->fp.id;
                }

                /* preserve context temporary objects */
                for (i = 0; i < cntx_ptr->obj_hdr.no_indx_vars;
                  i++)
                {
                        if (cntx_ptr->ctrl_vars.temp_array[i] >=
                          first_obj_oop &&
                          cntx_ptr->ctrl_vars.temp_array[i] <
                          INIT_CNTX_ID)
                        {
                                bottom++;
                                if (bottom >= MAX_KIDS)
                                        syserr(msg07);
                                kids[bottom] =
                                  cntx_ptr->ctrl_vars.temp_array[i];
                        }
                }
        }

        mark(bottom, RMARK);

        /*
         * now delete all unmarked objects, and unmark any marked objects
         */
        for (use_ptr = proc_data[inpid].pid_tail; use_ptr != NULL;
          use_ptr = next_ptr)
        {
                if (use_ptr->region < region)
                        break;

                next_ptr = use_ptr->pid_bkwd_chain;
                cntl_ptr = &(use_ptr->buffer_ptr->cntl);
                obj_ptr = &(use_ptr->buffer_ptr->obj);
                if (obj_ptr->fp.mark != RMARK)
                {
                        /* free space in in use for reuse */
                        rmv_in_use(use_ptr, inpid);

                        if (cntl_ptr->first_in_use == NULL)
                                if (obj_ptr->fp.flags & GARBAGE)
                                {

                                        /*
                                         * object is garbage, owned by only
                                         * one process: we can remove it from
                                         * class chain
                                         */

                                        if (obj_ptr->fp.class >=
                                          FIRST_CLASS_CHAINED)
                                                remove_class_chain(obj_ptr->
                                                  fp.class, obj_ptr,
                                                  use_ptr->region, inpid);

                                        /*
                                         * delete the non-shared,
                                         * non-reachable, garbage object from
                                         * memory
                                         */
```

```
                        update buffer(cntl ptr, obj ptr);
                    }
            }
            obj ptr->fp.mark = UNMARKED;

    }
}

/**********************************************************************
        fix temp chain:  delete objects from their temp class chain
**********************************************************************/

void
fix_temp_chain(inpid, region, mark)
        PID inpid;
        unsigned short region;
        char mark;

{
        object *obj_ptr;
        struct in_use_table *use ptr, *next ptr;
        for (use_ptr = proc_data[inpid].pid tail; use ptr != NULL;
          use ptr = next ptr)
        {

                /* NOTE 9:
                 * the purpose of this loop is to remove garbage from the
                 * instance chain anchored in the class. Unfortunately,
                 * remove_class_chain puts objects in in-use table, so we
                 * must be careful about calling this routine from inside a
                 * loop that is also processing an in use table chain. Note
                 * that we can not remove object from the class chain if it
                 * is in use by more than one process . Also, we do not
                   remove it if the object is marked:  this means it is
                   about to be made permanent, and should remain in the
                   temporary chain (and it is also put in the permanent
                   chain, later).
                 */

                if (use ptr->region < region)
                        break;

                next ptr = use ptr->pid bkwd chain;
                obj ptr = &(use ptr->buffer ptr->obj);

                if (obj_ptr -> fp.flags & GARBAGE)
                 if (use_ptr->buffer ptr->cntl.first in use-> obj fwd chain --
                                NULL)
                        if (obj ptr -> fp.mark != mark)
                        {

                                /*
                                 * object is garbage, owned by only one
                                 * process, not marked: we can remove
                                 it from temp class chain, since it
                                 is about to be garbage collected*/

                                if (obj ptr->fp.class >= FIRST CLASS CHAINED
                                        && !(use ptr -> buffer ptr ->
                                                cntl.temp chain reset))
        /*see NOTE 10 in update perm chain as to why we have to
          set temp chain reset*/

                                {
                                        remove class chain(obj ptr->fp.class,
                                          obj ptr, use ptr->region, inpid);
                                        use ptr -> buffer ptr ->
                                                cntl.temp chain reset = 1;
                                }
                        }
        }
}
/**********************************************************************
        update perm chain:  add permanent objects to class chain
**********************************************************************/

void
update perm chain(inpid, region, mark)
        PID inpid;
        unsigned short region;
        char mark;

{
        object *obj ptr, *class ptr;
        struct in use table *use ptr, *next ptr;
        class cntrl *class cntl ptr;
        struct obj table *hit;
        oop first perm obj;  /*first perm object in temp inst chain*/
        oop new perm obj;    /*temp object being made permanent*/

        for (use ptr = proc data[inpid].pid tail; use ptr != NULL;
          use ptr = next ptr)
        {

                /*
                 * the purpose of this loop is to add permanent objects to
                 * their class chains.  This is done when  objects that are
                 * about to be written to the db have been marked, but for
                 * which the garbage flag has not yet been off'ed.
                 * Only objects that are garbage, marked, and in a chained
                   class need be examined.
                 */

                if (use ptr->region < region)
                        break;

                next ptr = use ptr->pid bkwd chain;
                obj ptr = &(use ptr->buffer ptr->obj);
                new perm obj = obj ptr -> fp.id;

                if (obj ptr -> fp.mark == mark && (obj ptr->fp.flags &
                        GARBAGE) &&
                        obj ptr->fp.class >= FIRST CLASS CHAINED &&
                        !(use ptr -> buffer ptr -> cntl.temp chain reset))

        /*NOTE 10:
        temp chain reset is used because we have to be careful not to
        process the same object twice in this loop.  This can happen in
        the following annoying case:  Consider an object X of class C
        in region 1.  Suppose the class C is also in region 1.  Suppose
        that X happens to be the value of an instance variable in C
        too.  Suppose we are processing regions 1 and 0.  Suppose
        another object Y is of class C, and is in region 0.  When we
        process region 0, we need to fetch Y's class C.  This will move
        C to region 0, because of the logic in reserve obj.  Moving
        C to region 0 also moves its transitive closure to region 0,
        in particular, object X.  Thus X is encountered again in the
        processing of region 0.  Hence the switch, temp chain reset*/
```

```
                FIND_OBJ(obj_ptr->fp.class,hit)
                if (hit->oop != obj_ptr->fp.class)
                        /*NOTE 11:
                          logic error:  the class has left
                          memory with new children still
                          outstanding.  Please note that we can
                          not put reserve on class if it is
                          already in_use at some
                          process/region, since this could put
                          it in this region/process for the
                          first time :  since we have gone past
                          the mark/sweep call by this time, any
                          new kids of the class will be
                          unmarked.  When we finish processing
                          this process, we will write out the
                          class object, and reset the update
                          flag.  Thus when we processs the
                          process/region that contains the new
                          kids of the class, because the update
                          flag in the class was turned off, we
                          will not mark the new kids, and these
                          kids will never make it to the
                          database, leaving dangling references
                          int he class object.  */

                        syserr(msg10, obj_ptr->fp.id, obj_ptr ->
                                        fp.class);

                if (hit -> obj_ptr ->cntl.first_in_use == NULL)
                {
                        set_in_use(hit->obj_ptr, region, inpid)
                        -> orig_region = region;
                        /*on the other hand, if the class is not
                        in use by any process, we know their are no
                        kids not yet processed.  We must set it in
                        use to insure that the (now updated) class
                        is processed and written to the db*/
                }
                class_ptr = &(hit -> obj_ptr -> obj);
                class_cntl_ptr = CLASS_CONTROL(class_ptr);
                first_perm_obj = class_cntl_ptr -> cfp.first_inst;

                /*
                * update class chain
                */

                obj_ptr->fp.class_chain =
                        class_cntl_ptr->cfp.first_inst;

                class_cntl_ptr->cfp.first_inst = obj_ptr->fp.id;
                if (!(class_ptr->fp.flags & UPDATED))
                {
                        class_ptr->fp.flags |= UPDATED;
                        class_ptr->fp.mark = mark;  /*if the class was
                        already processed with mark/sweep for
                        this region, it is possible that it
                        was left unmarked, because it had not
                        otherwise been updated*/
                }

                repair_temp_chain(first_perm_obj,
                                        obj_ptr, BUF_CONTROL_PTR(class_ptr),
                                        inpid, region);
                                use_ptr -> buffer_ptr -> cntl.temp_chain_reset = 1;
                        }
                }
}

/*******************************************************************
        repair_temp_chain:
                        update the temporary chain:  remove the new
                        object from the temporary chain, and point the
                        tail of the temporary chain to the new object.
                        This allows the space for the new permanent
                        object to be re-used (which would break the
                        temporary instance chain) and still allow processing
                        of the temporary chain to get at all objects in
                        the class.
*******************************************************************/
void
repair_temp_chain(old_first_perm_obj, new_perm_obj, anchor_ptr,
        inpid, region)

        oop old_first_perm_obj;
        cntrld_object *  anchor_ptr;
        object * new_perm_obj;
        PID inpid;
        unsigned short region;

{
oop next_oop;
cntrld_object *  buffer_ptr;
cntrld_object *  old_parent_of_old_first_perm_obj = NULL;
struct obj_table *hit;

/*first, remove the new object from the temporary chain*/

remove_class_chain(anchor_ptr -> obj.fp.id, new_perm_obj, region, inpid);

/*search for the end of the temporary chain in memory.  This is
identified as the object that points to the old_first_perm_obj*/


for (buffer_ptr  = anchor_ptr;;)
        {
        if (buffer_ptr -> cntl.temp_inst_chain == old_first_perm_obj)
                {
                /*new objects go to head of temporary chain.
                  The last object in the temporary chain will
                  necessarily point to a permanent object.
                  As soon as the temporary chain leads to a permanent
                  object, the temporary chain and the permanent chain
                  become equal; there can be no more temporary objects
                  in the chain, and we should be able to break.
                  Furthermore, the new_obj is the first object
                  in the permanent chain, and is the new value of the
                  class.first_inst field.*/

                old_parent_of_old_first_perm_obj = buffer_ptr;
                break;
                }
        if (buffer_ptr -> cntl.temp_inst_chain < 0)
                syserr(msg12, old_first_perm_obj);

        FIND_OBJ(buffer_ptr -> cntl.temp_inst_chain, hit)
```

```
        if (buffer_ptr -> cntl.temp_inst_chain != hit -> obj_ptr->obj.fp.id)
                /*The temp chain points to a non-memory resident obj*/
                syserr(msg11, hit -> obj_ptr->obj.fp.id);

        buffer_ptr = hit -> obj_ptr;
        }


/*the tail of the temp chain in memory is updated to point to the
  new permanent object*/

old_parent_of_old_first_perm_obj -> cntl.temp_inst_chain =
                new_perm_obj->fp.id;

/*new object's temp inst pointer is updated to point to an object
  in the database, making its permanent (class_ptr) and temp pointers
  the same.*/
BUF_CONTROL_PTR(new_perm_obj) -> temp_inst_chain =
                old_first_perm_obj;
}

*/*********************************************************************
        update_buffer:  update the buffer and  object table for deleted
                        object.  Make the  oop of the deleted object
                        re-useable.
**********************************************************************/

void
update_buffer(cntl_ptr, obj_ptr)
        object_control *cntl_ptr;
        object *obj_ptr;

{

#if DEBUGGER
        /****************/
        if (TraceOn)
                fprintf(Tracer, "deleted %d \n", obj_ptr->fp.id);
        /****************/
#endif

        /* allow buffer space and oop to be re-used */
        if (cntl_ptr->obj_table_ptr->oop > 0)
        {
                reuse.old_oops[reuse.give] =
                  cntl_ptr->obj_table_ptr->oop;
                reuse.give++;
                if (reuse.give >= MAX_OLD_OOPS)
                        reuse.give = 0;
        }
        else
                syserr(msg06, obj_ptr->fp.id);

        cntl_ptr->disk_addr = 0;
        cntl_ptr->usage_cntr = 0;
        FREE(cntl_ptr->obj_table_ptr)
        cntl_ptr->obj_table_ptr = NULL;
}
```

Appendix I: Alf Class Source Code

================================================================

AddTailList.st
AlfAppend.st
AlfBootStrap.st
AlfCompiler.st
AlfCut.st
AlfEmptyList.st
AlfError.st
AlfFail.st
AlfIs.st
AlfIsNot.st
AlfLexer.st
AlfList.st
AlfProgram.st
AlfQuery.st
AlfSend.st
AlfSplitL.st
AlfSplitList.st
AlfSplitR.st
AlfToken.st
AtomLink.st
Binding.st
ChoicePoint.st
ChoicePointLink.st
Clause.st
ClauseLink.st
ClauseList.st
DoListAssign.st
GoalStack.st
GoalStackLink.st
IsAtom.st
IsClause.st
IsFact.st
IsQuery.st
IsRule.st
IsTerm.st
IsTermList.st
LexLogicVariable.st
LogicVariable.st
Predicate.st
Stack.st
Trail.st

```
"Copyright 1988 Eastman Kodak Company.  All rights reserved"
Class AddTailList :Predicate   |
                tokenList                  "<AlfList> of tokens to be parsed
                                           into a atoms, and then added to
                                           the rule in the clause instance
                                           variable"
                clause                     "<Clause> that represents the
                                           clause being compiled from an
                                           input string.  The compiler turns the
                                           tokenList into atoms, and adds
                                           these to the tail of this clause."
                compiler                   "<AlfCompiler>"

          |
|
"       poolDictionaries: ''"
"       category: 'Logic Programming: compiler'"

"AddTailList comment: 'I am a predicate used in the AlfCompiler to
compile clauses from strings.'"

! AddTailList methodsFor: 'accessing'

|
clause
        ^clause.

! AddTailList methodsFor: 'updating'

|
tokenList: aTokenList
        tokenList <- aTokenList.

|
clause: aClause
        clause <- aClause.

|
compiler: aComp
        compiler <- aComp.

!AddTailList class methodsFor: 'creation'

|
newWith: aTokenList clause: aClause compiler: aComp
        |newClause|

        newClause <- super new.
        newClause tokenList: aTokenList.
        newClause clause: aClause.
        newClause compiler: aComp.
        ^newClause.

|
```

```
        list2                   "<AlfAppend>"
        concat                  "<AlfAppend>"

          !
!
"       poolDictionaries: ''"
"       category: 'Logic Programming'"

"AlfAppend comment: 'I implement a the classic append predicate.'"

! AlfAppend methodsFor: 'updating'

!
list1: aValue
        list1 <- aValue.

!
list2: aValue
        list2 <- aValue.

!
concat: aValue
        concat <- aValue.

! AlfAppend methodsFor: 'unification'
"The rules that are set up are the standard ones, and normal unification
routines should work and no override logic is required.  We may
add overrides for efficiency later."

! AlfAppend class methodsFor: 'creation'

!
newWith: aValue with: anotherValue with: aList3
        |newAppend|
        newAppend <- self new.
        newAppend list1: aValue.
        newAppend list2: anotherValue.
        newAppend concat: aList3.
        ^newAppend.
!
```

```
"Copyright 1988 Eastman Kodak Company.  All rights reserved."
Class AlfBootStrap :Object   |

            sysPgm
            alfParser
            BootDone
            |
!
*       poolDictionaries: ''"
*       category: 'Logic Programming'"


"AlfBootStrap comment: 'I set up the clauses necessary to support the
AlfCompiler.  Once these are established, one can set up Alf clauses
by submitting strings to the compiler.'"



! AlfBootStrap methodsFor: 'setting up compiler clauses'

!
bootstrap

        "We only need to execute this once, or whenever a compiler
        rule changes."

        BootDone ifTrue: [^nil].   "boot already done"
        self makeBuiltIn.
        'making built-in rules ...' print.

        alfParser <- AlfProgram new:#alfParser.

        'making alfParser rules ...' print.
        self makeClauseRules.
        self makeClauseTypeRules.
        self makeAtomRules.
        self makeDoListAssignRules.
        self makeAddTailListRules.
        self makeSimpleIsTermRules1.
        self makeSimpleIsTermRules2.
        self makeListIsTermRules.
        self makeIsTermListRules.
        BootDone <- true.
        'Alf System Boot is done' print.

!
makeBuiltIn
        "add the built-in predicates to the system in program
        #AlfBuiltIn"

        sysPgm <- AlfProgram new: #AlfBuiltIn.

        self makeAlfSend.
        self makeAlfIs.
        self makeAlfError.
        self makeAlfAppend.
        self makeAlfCut.
        self makeAlfSplit.
        self makeAlfCall.
        self makeAlfNot.

!
makeAlfSend
        "add rule for Send?(...) <-
        This rule triggers the unification algorithm in the class
        AlfSend0, AlfSend1, ..."

        |clause sendIt classArray|

        classArray <- Array new: 6.
        classArray at: 1 put: AlfSend0.
        classArray at: 2 put: AlfSend1.
        classArray at: 3 put: AlfSend2.
        classArray at: 4 put: AlfSend3.
        classArray at: 5 put: AlfSend1DerefParm.
        classArray at: 6 put: AlfSend2DerefParm.

        classArray do: [:each|
                clause <- Clause new: 'See AlfBootStrap/makeAlfSend'.
                sendIt <- each new.

                "note that the value of the parms in the 'rule' being
                constructed default to nil.  The unification algorithm
                never uses these."

                clause head: sendIt.
                clause setCopyEnv.

                sysPgm addRule: clause
                ]
!
makeAlfIs
        "add rule for AlfIs and AlfIsNot"
        |clause atom logVar1 logVar2|

        "AlfIs(X,X) <- "

        logVar1 <- LogicVariable new:'X1:'.
        atom <- AlfIs newWithValue:logVar1 andValue:logVar1.

        clause <- Clause new: 'See AlfBootStrap/makeAlfIs/rule 1'.
        clause head: atom.
        clause setCopyEnv.

        sysPgm addRule: clause.

        "AlfIsNot(X,Y) <- "
        "AlfIsNot unification overrides that in class Object, so
        the following rule is not the one that is really in effect."

        logVar1 <- LogicVariable new:'X2:'
        logVar2 <- LogicVariable new:'X3·
        atom <- AlfIsNot newWithValue:'

        clause <- Clause new: 'See
        clause head: atom.
        clause setCopyEnv.

        sysPgm addRule: cl/
!
makeAlfError
        "add rule for
        |clause atc

        "AlfErr

        lo
```

```
        clause <- Clause new: 'See AlfBootStrap/makeAlfError'.
        clause head: atom.
        clause setCopyEnv.

        sysPgm addRule: clause

!
makeAlfAppend
        "add rules for AlfAppend()"
        |clause atom logVarL logVarL1 logVarL2 logVarL3
        logVarX |

        logVarL <- LogicVariable new:'L:'.
        "append([],L,L)."
        atom <- AlfAppend newWith: (AlfEmptyList new)
                    with:logVarL with:logVarL.

        clause <- Clause new: 'See AlfBootStrap/makeAlfAppend/rule 1'.
        clause head: atom.
        clause setCopyEnv.
        sysPgm addRule: clause.

        "append([X|L1], L2, [X|L3]) <- append(L1,L2,L3)."
        logVarL1 <- LogicVariable new:'L1:'.
        logVarL2 <- LogicVariable new:'L2:'.
        logVarL3 <- LogicVariable new:'L3:'.
        logVarX <- LogicVariable new:'X:'.

        atom <- AlfAppend newWith: (AlfList newWith: logVarX tail: logVarL1)
                    with: logVarL2
                    with: (AlfList newWith: logVarX tail: logVarL3).

        clause <- Clause new: 'See AlfBootStrap/makeAlfAppend/rule 2'.
        clause head: atom.
        atom <- AlfAppend newWith: logVarL1 with: logVarL2 with: logVarL3.
        clause addTail: atom.
        clause setCopyEnv.
        sysPgm addRule: clause

!
makeAlfCut
        "add rule for AlfCut()"
        |clause atom logVar|

        "AlfCut(X) <- "

        atom <- AlfCut new.

        clause <- Clause new: 'See AlfBootStrap/makeAlfCut'.
        clause head: atom.
        clause setCopyEnv.

        sysPgm addRule: clause.

!
makeAlfSplit
        "add rules for split lists"
        |clause atom logicVarX logicVarY logicVarZ logicVarM logicVarR|

        "AlfSplitR([X|Y], X, AlfSplitList([], [X|Y])."

        logicVarX <- LogicVariable new:'X:'.
        atom <- AlfSplitR newToSplit: (AlfList newWith: logicVarX tail:
                            logicVarY)
                splitAt: logicVarX
                result: (AlfSplitList newLL: (AlfEmptyList new)
                        rightL: (AlfList newWith: logicVarX tail: logicVarY)).

        clause <- Clause new: 'See AlfBootStrap/makeAlfSplit1'.
        clause head: atom.
        clause setCopyEnv.

        sysPgm addRule: clause.

        "AlfSplitR([X|Y], Z, AlfSplitList([X|M], R) <-
                AlfSplitR(Y, Z, AlfSplitList(M,R))."

        logicVarX <- LogicVariable new:'X:'.
        logicVarY <- LogicVariable new:'Y:'.
        logicVarZ <- LogicVariable new:'Z:'.
        logicVarM <- LogicVariable new:'M:'.
        logicVarR <- LogicVariable new:'R:'.

        atom <- AlfSplitR newToSplit: (AlfList newWith: logicVarX tail:
                            logicVarY)
                splitAt: logicVarZ
                result: (AlfSplitList newLL: (AlfList newWith: logicVarX
                                        tail: logicVarM)
                        rightL: logicVarR).

        clause <- Clause new: 'See AlfBootStrap/makeAlfSplit2'.
        clause head: atom.

        atom <- AlfSplitR newToSplit: logicVarY
                splitAt: logicVarZ
                result: (AlfSplitList newLL: logicVarM rightL: logicVarR).

        clause addTail: atom.
        clause setCopyEnv.

        sysPgm addRule: clause.

        "AlfSplitL([X|Y], X, AlfSplitList([X], Y)."

        logicVarX <- LogicVariable new:'X:'.
        logicVarY <- LogicVariable new:'Y:'.

        atom <- AlfSplitL newToSplit: (AlfList newWith: logicVarX tail:
                            logicVarY)
                splitAt: logicVarX
                result: (AlfSplitList newLL: (AlfList newWith: logicVarX)
                        rightL: logicVarY).

        clause <- Clause new: 'See AlfBootStrap/makeAlfSplit3'.
        clause head: atom.
        clause setCopyEnv.

        sysPgm addRule: clause.

        "AlfSplitL([X|Y], Z, AlfSplitList([X|M], R) <-
                AlfSplitL(Y, Z, AlfSplitList(M,R))."

        logicVarX <- LogicVariable new:'X:'.
        logicVarY <- LogicVariable new:'Y:'.
```

```
        logicVarZ <- LogicVariable new:'Z:'.
        logicVarM <- LogicVariable new:'M:'.
        logicVarR <- LogicVariable new:'R:'.

        atom <- AlfSplitL newToSplit: (AlfList newWith: logicVarX tail:
                                    logicVarY)
                splitAt: logicVarZ
                result: (AlfSplitList newLL: (AlfList newWith: logicVarX
                                                tail: logicVarM)
                        rightL: logicVarR).

        clause <- Clause new: 'See AlfBootStrap/makeAlfSplit4'.
        clause head: atom.

        atom <- AlfSplitL newToSplit: logicVarY
                splitAt: logicVarZ
                result: (AlfSplitList newLL: logicVarM rightL: logicVarR).

        clause addTail: atom.
        clause setCopyEnv.

        sysPgm addRule: clause.

|
makeAlfCall
        "add rule for AlfCall()"
        |clause atom logVar|

        "AlfCall(X) <- "

        atom <- AlfCall new.

        clause <- Clause new: 'See AlfBootStrap/makeAlfCall'.
        clause head: atom.
        clause setCopyEnv.

        sysPgm addRule: clause.

|
makeAlfNot
        "add rules for Not predicate"
        |clause logicVarX |

        "AlfNot(X:) <- AlfCall(X:), !, AlfFail"

        logicVarX <- LogicVariable new:'X:'.


        clause <- Clause new: 'See AlfBootStrap/makeAlfNot'.
        clause head: (AlfNot with: logicVarX).
        clause addTail: (AlfCall with: logicVarX).
        clause addTail: (AlfCut new).
        clause addTail: (AlfFail new).
        clause setCopyEnv.

        sysPgm addRule: clause.

        "AlfNot(X:)."

        clause <- Clause new: 'See AlfBootStrap/makeAlfNot2'.
        logicVarX <- LogicVariable new:'X:'.
        clause head: (AlfNot with: logicVarX).
        clause setCopyEnv.

        sysPgm addRule: clause.

|
makeClauseRules
        "add compiler rules for IsClause definition"

        |clause atom logicVarF logicVarT logicVarC logicVarAnon commonHead
        alfList1 alfList2 logicVarH logicVarH1 logicVarR logicVarT0
        compLV sendAtom|


        "IsClause(tokenList-T:,clause-C: compiler-compLV:) <-
                  IsFact(tokenList-T:, clause-C:, compiler-compLV:)."

        logicVarT <- LogicVariable new:'T:'.
        logicVarC <- LogicVariable new:'C:'.
        compLV <- LogicVariable new:'Comp:'.
        commonHead <- IsClause newWith: logicVarT obj: logicVarC
                                        compiler: compLV.


        clause <- Clause new: 'See AlfBootStrap/makeClauseRules rule 1'.
        clause head: commonHead.

        atom <- IsFact newWith: logicVarT obj: logicVarC compiler: compLV.
        clause addTail: atom.
        clause setCopyEnv.

        alfParser addRule: clause.

        "IsClause(tokenList-T:,clause-C: compiler-compLV:) <-
                IsRule(tokenList-T:,clause-C:, compiler-compLV:)."

        logicVarT <- LogicVariable new:'T:'.
        logicVarC <- LogicVariable new:'C:'.
        compLV <- LogicVariable new:'Comp:'.
        commonHead <- IsClause newWith: logicVarT obj: logicVarC
                                        compiler: compLV.
        clause <- Clause new: 'See AlfBootStrap/makeClauseRules rule 2'.
        clause head: commonHead.

        atom <- IsRule newWith: logicVarT obj: logicVarC compiler: compLV.
        clause addTail: atom.
        clause setCopyEnv.

        alfParser addRule: clause.

        "IsClause(tokenList-T:,clause-C:, compiler-compLV:) <-
                IsQuery(tokenList-T:,clause-C:, compiler-compLV)."

        logicVarT <- LogicVariable new:'T:'.
        logicVarC <- LogicVariable new:'C:'.
        compLV <- LogicVariable new:'Comp:'.
        commonHead <- IsClause newWith: logicVarT obj: logicVarC
                                        compiler: compLV.
        clause <- Clause new: 'See AlfBootStrap/makeClauseRules rule 3'.
        clause head: commonHead.

        atom <- IsQuery newWith: logicVarT obj: logicVarC compiler: compLV.
        clause addTail: atom.
        clause setCopyEnv.
```

```
!
makeClauseTypeRules
        "add compiler rules for IsFact, isRule, isQuery definition"

        |clause atom logicVarF logicVarT logicVarC logicVarAnon commonHead
        alfList1 alfList2 logicVarH logicVarH1 logicVarR logicVarT0
        compLV sendAtom|

        "IsFact(F, C, CLV) <- AlfSplitR(F,alfToken(#ARROW,_),
                        AlfSplitList(T, [alfToken(#ARROW,_)])),
                        !,
                IsAtom(T,H1, CLV),
                Send0(Clause, C, #new),   /*make new clause*/
                Send1(C, _, #head:, H1).    /*add the head*/"

        logicVarT <- LogicVariable new:'T:'.
        logicVarC <- LogicVariable new:'C:'.
        logicVarF <- LogicVariable new:'F:'.
        logicVarH1 <- LogicVariable new:'H1:'.
        compLV <- LogicVariable new:'Comp:'.
        logicVarAnon <- LogicVariable new:'_:'.

        clause <- Clause new: 'See AlfBootStrap/makeClauseTypeRules rule 1'.
        alfList1 <- AlfList newWith: (AlfToken type:#ARROW
                                tokenValue: logicVarAnon
                                start: (LogicVariable new: 'S:')
                                end: (LogicVariable new: 'E:')).
        clause head: (IsFact newWith: logicVarF obj: logicVarC compiler:
                                          compLV).

        clause addTail: (AlfSplitR newToSplit: logicVarF splitAt:
                                (AlfToken type: #ARROW
                                          tokenValue: (LogicVariable new: '_')
                                          start: (LogicVariable new: 'S2:')
                                          end: (LogicVariable new: 'E2:'))
                        result: (AlfSplitList newLL: logicVarT
                                rightL: alfList1)).

        clause addTail: AlfCut new.
        clause addTail:(IsAtom newWith: logicVarT obj: logicVarH1
                                compiler: compLV).
        clause addTail:(AlfSend0 newWithRcvr: Clause answer: logicVarC
                        selector: #new).

        logicVarAnon <- LogicVariable new:'_:'.
        sendAtom <- AlfSend1 newWithRcvr: logicVarC answer: logicVarAnon
                        selector: #head:.
        sendAtom parm1: logicVarH1.
        clause addTail: sendAtom.

        clause setCopyEnv.
        alfParser addRule: clause.

        "IsQuery(F, C, CLV) <- AlfSplitL(F, alfToken(#ARROW,_),
                        AlfSplitList([alfToken(#ARROW,_)], T)),
                !,
                Send0(Clause, C, #new),   /*make new clause*/
                AddTailList(T, C, CLV)."

        logicVarT <- LogicVariable new:'T:'.
        logicVarC <- LogicVariable new:'C:'.
        logicVarF <- LogicVariable new:'F:'.

clause <- Clause new: 'See AlfBootStrap/makeClauseTypeRules rule 2'.
alfList1 <- AlfList newWith: (AlfToken type:#ARROW
                        tokenValue: logicVarAnon
                        start: (LogicVariable new: 'S:')
                        end: (LogicVariable new: 'E:')).

clause head: (IsQuery newWith: logicVarF obj: logicVarC compiler:
                        compLV).

clause addTail: (AlfSplitL newToSplit: logicVarF splitAt:
                        (AlfToken type: #ARROW
                                tokenValue: (LogicVariable new: '_')
                                start: (LogicVariable new: 'S2:')
                                end: (LogicVariable new: 'E2:'))
                result: (AlfSplitList newLL: alfList1
                        rightL: logicVarT)).

clause addTail: (AlfCut new).
clause addTail:(AlfSend0 newWithRcvr: Clause answer: logicVarC
                selector: #new).
clause addTail: (AddTailList newWith: logicVarT clause: logicVarC
                        compiler: compLV).

clause setCopyEnv.
alfParser addRule: clause.

"IsRule(R:, C:, CLV) <- AlfSplitR(R:, alfToken(#ARROW,_),
                AlfSplitList(Head,[alfToken(#ARROW,_)|Tail])),
                !,
                IsAtom(Head, H1, CLV),
                !,
                Send0(Clause, C, #new),   /*make new clause*/
                Send1(C, _, #head:, H1),    /*add the head*/
                AddTailList(Tail, C, CLV)."

logicVarT <- LogicVariable new:'Tail:'.
logicVarT0 <- LogicVariable new:'T0:'.
logicVarC <- LogicVariable new:'C:'.
logicVarR <- LogicVariable new:'R:'.
logicVarH <- LogicVariable new:'Head:'.
logicVarH1 <- LogicVariable new:'H1:'.
logicVarAnon <- LogicVariable new:'_:'.
compLV <- LogicVariable new:'Comp:'.

clause <- Clause new: 'See AlfBootStrap/makeClauseTypeRules rule 3'.
clause head: (IsRule newWith: logicVarR obj: logicVarC
                        compiler: compLV).

clause addTail: (AlfSplitR newToSplit: logicVarR splitAt:
                        (AlfToken type: #ARROW
                                tokenValue: (LogicVariable new: '_')
                                start: (LogicVariable new: 'S2:')
                                end: (LogicVariable new: 'E2:'))
                result: (AlfSplitList newLL: logicVarH
                        rightL: (AlfList newWith:
                                (AlfToken type:#ARROW
                                tokenValue: logicVarAnon
                                start: (LogicVariable new: 'S:')
                                end: (LogicVariable new: 'E:'))

                                tail: logicVarT))).
```

```
clause addTail:(AlfCut new).
clause addTail:(IsAtom newWith: logicVarH obj: logicVarH1
                  compiler: compLV).

clause addTail:(AlfCut new).
clause addTail:(AlfSend0 newWithRcvr: Clause answer: logicVarC
            selector: #new).

logicVarAnon <- LogicVariable new:'_:'.
sendAtom <- AlfSend1 newWithRcvr: logicVarC answer: logicVarAnon
            selector: #head:.
sendAtom parm1: logicVarH1.
clause addTail: sendAtom.

clause addTail: (AddTailList newWith: logicVarT clause: logicVarC
                  compiler: compLV).

clause setCopyEnv.
alfParser addRule: clause.

!
makeAtomRules
      "add compiler rules for IsAtom"

      |clause logicVarT logicVarX logicVarAnon alfList1 logicVarY
      instVarLV answerLV targObjLV sourceObjLV sendAtom termLV toDoLV
      tailLV restLV compLV sendComp logicVarH|


      "
      IsAtom([alfToken(#CUT, T)], T, CLV).
      "

      logicVarT <- LogicVariable new:'T:'.
      compLV <- LogicVariable new:'Comp:'.

      clause <- Clause new: 'See AlfBootStrap/makeAtomRules rule 0'.
      clause head: (IsAtom newWith: (AlfList newWith:
                              (AlfToken type: #CUT
                              tokenValue: logicVarT
                              start: (LogicVariable new: 'S:')
                              end: (LogicVariable new: 'E:')))
                        obj: logicVarT
                        compiler: compLV).

      clause setCopyEnv.

      alfParser addRule: clause.

      "
      IsAtom([alfToken(#predicateName, T) alfToken(#LP, _) | X], T, CLV)
                  <-
                  AlfAppend(Y, [alfToken(#RP, _)], X),
                  AlfIs(X, [H: | _]),
                  AlfSend2DerefParm(CLV, _, #setSuccess:comment:,
                                          H:, comment).
                  DoListAssign(Y,TargObj,CLV).
      "

      logicVarT <- LogicVariable new:'T:'.
      logicVarX <- LogicVariable new:'X:'.
      logicVarY <- LogicVariable new:'Y:'.
      logicVarAnon <- LogicVariable new:'_:'.
```

```
compLV <- LogicVariable new:'Comp::'.
logicVarH <- LogicVariable new:'H:'.

alfList1 <- AlfList newWith:(AlfToken type: #predicateName
                        tokenValue: logicVarT
                        start: (LogicVariable new: 'S:')
                        end: (LogicVariable new: 'E:'))
                  with: (AlfToken type: #LP tokenValue: logicVarAnon
                        start: (LogicVariable new: 'S1:')
                        end: (LogicVariable new: 'E1'))
                  tail: logicVarX.


clause <- Clause new: 'See AlfBootStrap/makeAtomRules rule 1'.
clause head: (IsAtom newWith: alfList1 obj: logicVarT
                        compiler: compLV).

logicVarAnon <- LogicVariable new:'_:'.
alfList1 <- AlfList newWith: (AlfToken type: #RP
                        tokenValue: logicVarAnon
                        start: (LogicVariable new: 'S2:')
                        end: (LogicVariable new: 'E2:')).

clause addTail: (AlfAppend newWith: logicVarY
                        with: alfList1 with: logicVarX).

clause addTail: (AlfIs newWithValue: logicVarX andValue:
                        (AlfList newWith: logicVarH tail:
                              LogicVariable new)).

clause addTail: (AlfSend2DerefParm newWithRcvr: compLV
                  answer: (LogicVariable new: 'Ans:')
                  selector: #setSuccess:comment:
                  parm1: logicVarH parm2: clause comment).

clause addTail: (DoListAssign newWithList: logicVarY
                        withObj: logicVarT compiler: compLV).
clause setCopyEnv.

alfParser addRule: clause.

!
makeDoListAssignRules
      "add compiler rules DoListAssign "

      |clause logicVarT logicVarX logicVarAnon alfList1 logicVarY
      instVarLV answerLV targObjLV sourceObjLV sendAtom termLV toDoLV
      tailLV restLV compLV sendComp logicVarH|


      "
      DoListAssign([alfToken(#instVarName, InstVarLV)
                  AlfToken(#equal,_) | termLV], TargObj, CompLV) <-
                  AlfIs(termLV, [H: | _]),
                  AlfSend2DerefParm(compLV, _, #setSuccess:comment:,
                                          H:, comment),
                  IsTerm(termLV, SourceObj, compLV),
                  AlfSend2(TargObj, answer, #atName:put:, InstVarLV,
                        SourceObj).
      "
      termLV <- LogicVariable new:'Term:'.
      instVarLV <- LogicVariable new:'InstVar:'.
      answerLV <- LogicVariable new: 'Ans:'.
      targObjLV <- LogicVariable new: 'Targ:'.
```

```
logicVarAnon <- LogicVariable new:'_:'.
compLV <- LogicVariable new:'Comp:'.
logicVarH <- LogicVariable new:'H:'.


alfList1 <- AlfList newWith:(AlfToken type: #instVarName
                    tokenValue: instVarLV
                    start: (LogicVariable new: 'S:')
                    end: (LogicVariable new: 'E:'))
            with: (AlfToken type: #EQ
                    tokenValue: logicVarAnon
                    start: (LogicVariable new: 'S1:')
                    end: (LogicVariable new: 'E1'))
            tail: termLV.

clause <- Clause new: 'See AlfBootStrap/makeAtomRules rule 2'.
clause head: (DoListAssign newWithList: alfList1 withObj: targObjLV
            compiler: compLV).

clause addTail: (AlfIs newWithValue: termLV andValue:
                    (AlfList newWith: logicVarH tail:
                        LogicVariable new)).
clause addTail: (AlfSend2DerefParm newWithRcvr: compLV
            answer: (LogicVariable new: 'Ans2')
            selector: #setSuccess:comment:
            parm1: logicVarH parm2: clause comment).

clause addTail: (IsTerm newWith: termLV obj: sourceObjLV
            compiler: compLV).

sendAtom <- AlfSend2 newWithRcvr: targObjLV answer: answerLV
            selector: #atName:put:.
sendAtom parm1: instVarLV.
sendAtom parm2: sourceObjLV.
clause addTail: sendAtom.
clause setCopyEnv.

alfParser addRule: clause.


*
DoListAssign([alfToken(#instVarName, InstVarLV)
            alfToken(#equal,_) | TailLv],
            TargObj, CompLV) <-

            AlfSplitR(TailLV, alfToken(Comma,_),
                    AlfSplitList(termLV, [_|toDoLV])),
            IsTerm(termLV, SourceObj, CompLV),
            !,
            AlfSend2(TargObj, answerLV, #atName:put:, InstVarLV,
                    SourceObj)),
            AlfIs(tailLV, [H: | _]),
            AlfSend2DerefParm(compLV, _, #setSuccess:comment,
                        H:, comment).
            DoListAssign(toDoLV,TargObj, CompLV).


*
termLV <- LogicVariable new:'Term:'.
instVarLV <- LogicVariable new:'InstVar:'.
answerLV <- LogicVariable new: 'Ans:'.
tailLV <- LogicVariable new: 'Tail:'.
toDoLV <- LogicVariable new: 'ToDo:'.
```

```
sourceObjLV <- LogicVariable new: 'Source:'.
logicVarAnon <- LogicVariable new:'_:'.
compLV <- LogicVariable new:'Comp:'.
logicVarH <- LogicVariable new:'H:'.


alfList1 <- AlfList newWith:(AlfToken type: #instVarName
                    tokenValue: instVarLV
                    start: (LogicVariable new: 'S:')
                    end: (LogicVariable new: 'E:'))
            with: (AlfToken type: #EQ
                    tokenValue: logicVarAnon
                    start: (LogicVariable new: 'S1:')
                    end: (LogicVariable new: 'E1'))
            tail: tailLV.

clause <- Clause new: 'See AlfBootStrap/makeAtomRules rule 3'.
clause head: (DoListAssign newWithList: alfList1 withObj: targObjLV
            compiler: compLV).
logicVarAnon <- LogicVariable new:'_:'.

clause addTail: (AlfSplitR newToSplit: tailLV splitAt:
                    (AlfToken type: #COMMA
                        tokenValue: logicVarAnon
                        start: (LogicVariable new: 'S2:')
                        end: (LogicVariable new: 'E2:'))
            result: (AlfSplitList newLL: termLV
                    rightL: (AlfList newWith: (LogicVariable
                                    new: 'comma:')
                        tail: toDoLV))).

clause addTail: (IsTerm newWith: termLV obj: sourceObjLV
            compiler: compLV).
clause addTail: (AlfCut new).
sendAtom <- AlfSend2 newWithRcvr: targObjLV answer: answerLV
            selector: #atName:put:.
sendAtom parm1: instVarLV.
sendAtom parm2: sourceObjLV.
clause addTail: sendAtom.

clause addTail: (AlfIs newWithValue: tailLV andValue:
                    (AlfList newWith: logicVarH tail:
                        LogicVariable new)).
clause addTail: (AlfSend2DerefParm newWithRcvr: compLV
            answer: (LogicVariable new: 'Ans2')
            selector: #setSuccess:comment:
            parm1: logicVarH parm2: clause comment).

clause addTail: (DoListAssign newWithList: toDoLV withObj: targObjLV
            compiler: compLV).

clause setCopyEnv.

alfParser addRule: clause.
!
makeAddTailListRules
    "add compiler rules for AddTailList "

    |clause frontLV restLV listLV objLV ruleLV toDoLV anonLV
        alfList1 commonHead compLV logicVarH |

    *
    AddTailList(List, Rule, CLV) <- IsAtom(List, Obj, CLV),
```

```
                    AlfSend1(Rule, _, #addTail,  Obj)).
.

listLV <- LogicVariable new:'List:'.
objLV <- LogicVariable new:'Obj:'.
ruleLV <- LogicVariable new:'Rule:'.
anonLV <- LogicVariable new:'_:'.
compLV <- LogicVariable new:'Comp:'.


commonHead <- AddTailList newWith: listLV clause: ruleLV
                compiler: compLV.
clause <- Clause new: 'See AlfBootStrap/makeAddTailListRules rule 1'.

clause head: commonHead.
clause addTail: (IsAtom newWith: listLV obj: objLV
                compiler: compLV).
clause addTail: (AlfSend1 newWithRcvr: ruleLV
                answer: anonLV
                selector: #addTail:
                parm1: objLV).

clause setCopyEnv.
alfParser addRule: clause.

.
AddTailList(List, Rule, CLV) <-
                AlfSplitR(List, AlfToken(#COMMA,_),
                        AlfSplitList(Front, [_|Todo])),
                IsAtom(Front, Obj, CLV),
                !,
                AlfSend1(Rule, _, #addTail:,  Obj)),
                AlfIs(ToDo, [H: | _]),
                AlfSend2DerefParm(CLV, _, #setSuccess:comment:,
                                H:, comment),
                AddTailList(Todo, Rule, CLV).
.

frontLV <- LogicVariable new:'Front:'.
restLV <- LogicVariable new:'Rest:'.
listLV <- LogicVariable new:'List:'.
objLV <- LogicVariable new:'Obj:'.
ruleLV <- LogicVariable new:'Rule:'.
toDoLV <- LogicVariable new:'Todo:'.
anonLV <- LogicVariable new:'_:'.
compLV <- LogicVariable new:'Comp:'.
logicVarH <- LogicVariable new:'H:'.

commonHead <- AddTailList newWith: listLV clause: ruleLV
                compiler: compLV.
clause <- Clause new: 'See AlfBootStrap/makeAddTailListRules rule 2'.

clause head: commonHead.
clause addTail: (AlfSplitR newToSplit: listLV
                splitAt: (AlfToken type: #COMMA
                        tokenValue: (LogicVariable new: '_')
                        start: (LogicVariable new: 'S2:')
                        end: (LogicVariable new: 'E2:'))

                result: (AlfSplitList newLL: frontLV
                        rightL: (AlfList newWith:
                                (LogicVariable new: '_')
                                tail: toDoLV
                                                            ))).
                clause addTail: (IsAtom newWith: frontLV obj: objLV
                                compiler: compLV).

                clause addTail:(AlfCut new).
                anonLV <- LogicVariable new:'_:'.

                clause addTail: (AlfSend1 newWithRcvr: ruleLV
                                answer: anonLV
                                selector: #addTail:
                                parm1: objLV).

                clause addTail: (AlfIs newWithValue: toDoLV andValue:
                                (AlfList newWith: logicVarH tail:
                                        LogicVariable new)).
                clause addTail: (AlfSend2DerefParm newWithRcvr: compLV
                                answer: (LogicVariable new: 'Ans2')
                                selector: #setSuccess:comment:
                                parm1: logicVarH parm2: clause comment).

                clause addTail: (AddTailList newWith: toDoLV clause: ruleLV
                                compiler: compLV).

                clause setCopyEnv.
                alfParser addRule: clause.

!
makeSimpleIsTermRules1
        "add compiler rules for IsTerm"

        |clause termLV alfList anon1LV anon2LV assignListLV restLV
         sendAtom logicVarLV instLV answerLV termListLV
         tailPartLV tailTermLV compLV logicVarH|

        .
        IsTerm([alfToken(#CONSTANT, termLV) ], termLV, compLV) <-.
        .

        termLV <- LogicVariable new:'Term:'.
        clause <- Clause new: 'See AlfBootStrap/makeSimpleIsTermRules rule 1'.
        compLV <- LogicVariable new:'Comp:'.
        clause head:(IsTerm newWith: (AlfList newWith:
                                (AlfToken type: #CONSTANT
                                tokenValue: termLV
                                start: (LogicVariable new: 'S:')
                                end: (LogicVariable new: 'E:')))
                        obj: termLV compiler: compLV).

        clause setCopyEnv.

        alfParser addRule: clause.

        .
        IsTerm([alfToken(#logicVar,termLV)],termLV, compLV).
        .

        termLV <- LogicVariable new:'Term:'.
        compLV <- LogicVariable new:'Comp:'.
        clause <- Clause new: 'See AlfBootStrap/makeSimpleIsTermRules rule 2'.

        clause head:(IsTerm newWith: (AlfList newWith:
                                (AlfToken type: #logicVar
                                tokenValue: termLV
```

```
                end: (LogicVariable new: 'E:')))
            obj: termLV compiler: compLV).

    clause setCopyEnv.

    alfParser addRule: clause.

    "
    IsTerm([alfToken(#logicVar,logicVarLV)
            alfToken(#className, instLV)], logicVarLV, compLV) <-
                AlfSend2(logicVarLV, answerLV, #bindTo:withEnv:,
                    instLV, nil).

    An example string would be
            X:ClassOfSomeSort
    The intent is to type X: to class ClassOfSomeSort, which we
    do by binding X: to an instance of the appropriate class,
    with the instance variables of this instance all set to
    unbound logic variables.
    "

    logicVarLV <- LogicVariable new:'LogicVar:'.
    instLV <- LogicVariable new:'Inst:'.
    answerLV <- LogicVariable new:'Ans:'.
    compLV <- LogicVariable new:'Comp:'.

    alfList <- AlfList newWith: (AlfToken type: #logicVar
                tokenValue: logicVarLV
                start: (LogicVariable new: 'S:')
                end: (LogicVariable new: 'E:'))
            with: (AlfToken type: #className
                tokenValue: instLV
                start: (LogicVariable new: 'S1:')
                end: (LogicVariable new: 'S2:')).

    clause <- Clause new: 'See AlfBootStrap/makeSimpleIsTermRules rule 3'.
    clause head:(IsTerm newWith: alfList obj: logicVarLV
                compiler: compLV).
    sendAtom <- AlfSend2 newWithRcvr: logicVarLV answer: answerLV
                selector: #bindTo:withEnv:.
    sendAtom parm1: instLV.
    sendAtom parm2: nil.
    clause addTail: sendAtom.

    clause setCopyEnv.

    alfParser addRule: clause.

!
makeSimpleIsTermRules2
    "add compiler rules for IsTerm"

    |clause termLV alfList anon1LV anon2LV assignListLV restLV
     sendAtom logicVarLV instLV answerLV termListLV
     tailPartLV tailTermLV compLV logicVarH|
    "
    IsTerm([alfToken(#className, termLv) alfToken(#LP, _) | restLV],
            termLV, compLV) <-
                append(assignListLV,[ alfToken(#RP,_)], restLV),
                !,
                AlfIs(restLV, [H: | _]),
                AlfSend2DerefParm(compLV, _, #setSuccess:comment:,
                    H:, comment).
                DoListAssign(assignListLV, termLV, compLV).
    "

    termLV <- LogicVariable new:'Term:'.
    anon1LV <- LogicVariable new:'_:'.
    anon2LV <- LogicVariable new:'_:'.
    assignListLV <- LogicVariable new:'AssignList:'.
    restLV <- LogicVariable new:'R:'.
    compLV <- LogicVariable new:'Comp:'.
    logicVarH <- LogicVariable new:'H:'.

    alfList <- AlfList newWith: (AlfToken type: #className
                tokenValue: termLV
                start: (LogicVariable new: 'S:')
                end: (LogicVariable new: 'E:'))
            with: (AlfToken type: #LP
                tokenValue: anon1LV
                start: (LogicVariable new: 'S1:')
                end: (LogicVariable new: 'E1:'))
            tail: restLV.

    clause <- Clause new: 'See AlfBootStrap/makeSimpleIsTermRules rule 4'.

    clause head: (IsTerm newWith: alfList obj: termLV
                compiler: compLV).
    clause addTail: (AlfAppend newWith: assignListLV
                with: (AlfList newWith: (AlfToken type: #RP
                    tokenValue: anon2LV
                    start: (LogicVariable new: 'S2:')
                    end: (LogicVariable new: 'E2:')))
                with: restLV).

    clause addTail: (AlfCut new).
    clause addTail: (AlfIs newWithValue: restLV andValue:
                    (AlfList newWith: logicVarH tail:
                        LogicVariable new)).
    clause addTail: (AlfSend2DerefParm newWithRcvr: compLV
                answer: (LogicVariable new: 'Ans:')
                selector: #setSuccess:comment:
                parm1: logicVarH parm2: clause comment).

    clause addTail: (DoListAssign newWithList: assignListLV
                withObj: termLV compiler: compLV).

    clause setCopyEnv.

    alfParser addRule: clause.
    "
    IsTerm([alfToken(#predicateName, termLv) alfToken(#LP, _) | restLV],
            termLV, compLV) <-
                append(assignListLV,[ alfToken(#RP,_)], restLV),
                !,
                AlfIs(restLV, [H: | _]),
                AlfSend2DerefParm(compLV, _, #setSuccess:comment:,
                    H:, comment).
                DoListAssign(assignListLV, termLV, compLV).
    "

    termLV <- LogicVariable new:'Term:'.
    anon1LV <- LogicVariable new:'_:'.
    anon2LV <- LogicVariable new:'_:'.
    assignListLV <- LogicVariable new:'AssignList:'.
    restLV <- LogicVariable new:'R:'.
```

```
compLV <- LogicVariable new:'Comp:'.
logicVarH <- LogicVariable new:'H:'.

alfList <- AlfList newWith: (AlfToken type: #predicateName
                        tokenValue: termLV
                        start: (LogicVariable new: 'S:')
                        end: (LogicVariable new: 'E:'))
        with: (AlfToken type: #LP
                        tokenValue: anon1LV
                        start: (LogicVariable new: 'S1:')
                        end: (LogicVariable new: 'E1:'))
        tail: restLV.

clause <- Clause new: 'See AlfBootStrap/makeSimpleIsTermRules rule 5'.

clause head: (IsTerm newWith: alfList obj: termLV
                compiler: compLV).
clause addTail: (AlfAppend newWith: assignListLV
                with: (AlfList newWith: (AlfToken type: #RP
                        tokenValue: anon2LV
                        start: (LogicVariable new: 'S2:')
                        end: (LogicVariable new: 'E2:')))
                with: restLV).

clause addTail: (AlfCut new).
clause addTail: (AlfIs newWithValue: restLV andValue:
                        (AlfList newWith: logicVarH tail:
                                LogicVariable new)).
clause addTail: (AlfSend2DerefParm newWithRcvr: compLV
                answer: (LogicVariable new: 'Ans:')
                selector: #setSuccess:comment:
                parm1: logicVarH parm2: clause comment).

clause addTail: (DoListAssign newWithList: assignListLV
                withObj: termLV compiler: compLV).

clause setCopyEnv.

alfParser addRule: clause.

"
IsTerm([alfToken(#logicVar,logicVarLV) | restLV], logicVarLV
                compLV) <-
                IsTerm(restLV, termLV, compLV),
                AlfSend2(logicVarLV, answerLV, #bindTo:withEnv,
                        termLV, nil).
"

termLV <- LogicVariable new:'Term:'.
logicVarLV <- LogicVariable new:'LogicVar:'.
answerLV <- LogicVariable new:'Ans:'.
restLV <- LogicVariable new:'R:'.
compLV <- LogicVariable new:'Comp:'.

alfList <- AlfList newWith: (AlfToken type: #logicVar
                        tokenValue: logicVarLV
                        start: (LogicVariable new: 'S:')
                        end: (LogicVariable new: 'E:'))
        tail: restLV.

clause <- Clause new: 'See AlfBootStrap/makeSimpleIsTermRules rule 6'.
clause head:(IsTerm newWith: alfList obj: logicVarLV
                compiler: compLV).
clause addTail: (IsTerm newWith: restLV obj: termLV
                compiler: compLV).
sendAtom <- AlfSend2 newWithRcvr: logicVarLV answer: answerLV
                selector: #bindTo:withEnv:.
sendAtom parm1: termLV.
sendAtom parm2: nil.
clause addTail: sendAtom. .

clause setCopyEnv.

alfParser addRule: clause.

!
makeListIsTermRules
        "add compiler rules for IsTerm that involve lists"

        |clause termLV alfList anon1LV anon2LV assignListLV restLV
         logicVarLV instLV answerLV termListLV
         tailPartLV tailTermLV tailObj compLV logicVarH|

        "Alf list constructors work like prolog notation:
        [1 2 3] is a list, so is [1 2 3 | X], etc.

        Null list handled as a constant in the lexer.

        First, we handle lists without a tail specified (no '|'):

        IsTerm([alfToken(#LB,termLV) | restLV], termLV, compLV) <-
                        append(termListLV, [AlfToken(RB,_)], restLV),
                        AlfIs(restLV, [H:|_]),
                        AlfSend2DerefParm(compLV, _, #setSuccess:comment:,
                                        H:, comment),
                        IsTermList(termListLV,termLV, compLV).
        "
        logicVarLV <- LogicVariable new:'LogicVar:'.
        anon1LV <- LogicVariable new:'_:'.
        termLV <- LogicVariable new:'Term:'.
        termListLV <- LogicVariable new:'TermList:'.
        answerLV <- LogicVariable new:'Ans:'.
        restLV <- LogicVariable new:'R:'.
        compLV <- LogicVariable new:'Comp:'.
        logicVarH <- LogicVariable new:'H:'.

        alfList <- AlfList newWith: (AlfToken type: #LB
                                tokenValue: termLV
                                start: (LogicVariable new: 'S:')
                                end: (LogicVariable new: 'E:'))
                        tail: restLV.

        clause <- Clause new: 'See AlfBootStrap/makeListIsTermRules rule 1'.
        clause head:(IsTerm newWith: alfList obj: termLV
                        compiler: compLV).
        clause addTail: (AlfAppend newWith: termListLV
                        with: (AlfList newWith:
                                (AlfToken type: #RB
                                tokenValue: anon1LV
                                start: (LogicVariable new: 'S1:')
                                end: (LogicVariable new: 'E1:')))
                        with: restLV).

        clause addTail: (AlfIs newWithValue: restLV andValue:
                                (AlfList newWith: logicVarH tail:
                                        LogicVariable new)).
        clause addTail: (AlfSend2DerefParm newWithRcvr: compLV
                        answer: (LogicVariable new: 'Ans2')
```

```
clause addTail: (IsTermList newWith: termListLV obj:termLV
                compiler: compLV).

clause setCopyEnv.

alfParser addRule: clause.

*
Next, we handle lists with a tail specified:
We allow any term as the tail, but the only thing that would
really make sense is a logic variable, or an AlfList.

IsTerm([alfToken(#LB,termLV) | restLV], termLV, compLV) <-
        append(termListLV, [AlfToken(BAR,_) | tailPartLV], restLV),
        append( tailTermLV, [AlfToken(RB,_)], tailPartLV),
        IsTermList(termListLV,termLV, compLV),
        !,
        AlfIs(tailPartLV, [H:|_]),
        AlfSend2DerefParm(compLV, _, #setSuccess:comment:,
                        H:, comment),
        IsTerm(tailTermLV,tailObj, compLV),
        AlfSend1(termLV,_,#tail:,tailObj).
*

anon1LV <- LogicVariable new:'_:'.
anon2LV <- LogicVariable new:'_:'.
answerLV <- LogicVariable new:'Ans:'.
termLV <- LogicVariable new:'Term:'.
termListLV <- LogicVariable new:'TermList:'.
restLV <- LogicVariable new:'R:'.
tailPartLV <- LogicVariable new:'TailPart:'.
tailTermLV <- LogicVariable new:'TailTerm:'.
tailObj <- LogicVariable new:'TailObj:'.
compLV <- LogicVariable new:'Comp:'.
logicVarH <- LogicVariable new:'H:'.

alfList <- AlfList newWith: (AlfToken type: #LB
                        tokenValue: termLV
                        start: (LogicVariable new: 'S:')
                        end: (LogicVariable new: 'E:'))
                tail: restLV.

clause <- Clause new: 'See AlfBootStrap/makeListIsTermRules rule 2'.
clause head:(IsTerm newWith: alfList obj: termLV
                compiler: compLV).
clause addTail: (AlfAppend newWith: termListLV
                with: (AlfList newWith:
                                (AlfToken type: #BAR
                                tokenValue: anon1LV
                                start: (LogicVariable new: 'S1:')
                                end: (LogicVariable new: 'E1:'))
                        tail: tailPartLV)
                with: restLV).


clause addTail: (AlfAppend newWith: tailTermLV
                with: (AlfList newWith:
                        (AlfToken type: #RB
                        tokenValue: anon2LV
                        start: (LogicVariable new: 'S2:')
                        end: (LogicVariable new: 'E2:')))
clause addTail: (IsTermList newWith: termListLV obj:termLV
                compiler: compLV).
clause addTail: (AlfCut new).
clause addTail: (AlfIs newWithValue: tailPartLV andValue:
                        (AlfList newWith: logicVarH tail:
                                LogicVariable new)).
clause addTail: (AlfSend2DerefParm newWithRcvr: compLV
                answer: (LogicVariable new: 'Ans2')
                selector: #setSuccess:comment:
                parm1: logicVarH parm2: clause comment).
clause addTail: (IsTerm newWith: tailTermLV obj:tailObj
                compiler: compLV).
clause addTail: (AlfSend1 newWithRcvr: termLV
                answer: answerLV
                selector: #tail:
                parm1: tailObj).

clause setCopyEnv.

alfParser addRule: clause.
!
makeIsTermListRules
        "add compiler rules for IsTermList"

        |clause termLV alfList anon1LV anon2LV restLV
         sendAtom firstTermLV objLV answerLV termListLV compLV
         logicVarH|

        *

        In these rules, the second arg (termLV) is assumed to be an
        AlfList to which we are to add, at the end, the elements in
        the first arg, (termListLV), which is a list of terms.


        IsTermList(termListLV, termLV, compLV) <-
                IsTerm(termListLV, objLV, compLV),
                AlfSend1(termLV, _, #addLast:, objLV).
        *
        termLV <- LogicVariable new:'Term:'.
        termListLV <- LogicVariable new:'TermList:'.
        objLV <- LogicVariable new:'Obj:'.
        answerLV <- LogicVariable new:'Ans:'.
        compLV <- LogicVariable new:'Comp:'.

        clause <- Clause new: 'See AlfBootStrap/makeIsTermListRules rule 1'.
        clause head:(IsTermList newWith: termListLV obj: termLV
                compiler: compLV).
        clause addTail: (IsTerm newWith: termListLV obj: objLV
                compiler: compLV).
        sendAtom <- AlfSend1 newWithRcvr: termLV answer: answerLV
                selector: #addLast:.
        sendAtom parm1: objLV.
        clause addTail: sendAtom.

        clause setCopyEnv.

        alfParser addRule: clause.

        *
        IsTermList(termListLV, termLV, compLV) <-
                AlfAppend(firstTermLV, restLV, termListLV)
                IsTerm(firstTermLV, objLV, compLV),
```

```
        AlfSend1(termLV, _, #addLast:, objLV).
        AlfIs(restLV, [H:|_|]),
        AlfSend2DerefParm(compLV, _, #setSuccess:comment:,  H:,
                              comment),
        !,
        IsTermList(restLV, termLV, compLV).
    .

    firstTermLV <- LogicVariable new:'FirstTerm:'.
    termLV <- LogicVariable new:'Term:'.
    termListLV <- LogicVariable new:'TermList:'.
    objLV <- LogicVariable new:'Obj:'.
    restLV <- LogicVariable new:'R:'.
    answerLV <- LogicVariable new:'Ans:'.
    compLV <- LogicVariable new:'Comp:'.
    logicVarH <- LogicVariable new:'H:'.

    clause <- Clause new: 'See AlfBootStrap/makeIsTermListRules rule 2'.
    clause head:(IsTermList newWith: termListLV obj: termLV
                compiler: compLV).
    clause addTail: (AlfAppend newWith: firstTermLV with: restLV
                with: termListLV).
    clause addTail: (IsTerm newWith: firstTermLV obj: objLV
                compiler: compLV).
    sendAtom <- AlfSend1 newWithRcvr: termLV answer: answerLV
                selector: #addLast:.
    sendAtom parm1: objLV.
    clause addTail: sendAtom.

    clause addTail: (AlfIs newWithValue: restLV andValue:
                        (AlfList newWith: logicVarH tail:
                              LogicVariable new)).
    clause addTail: (AlfSend2DerefParm newWithRcvr: compLV
                answer: (LogicVariable new: 'Ans2')
                selector: #setSuccess:comment:
                parm1: logicVarH parm2: clause comment).

    clause addTail: (AlfCut new).
    clause addTail: (IsTermList newWith: restLV obj:termLV
                compiler: compLV).

    clause setCopyEnv.

    alfParser addRule: clause.

! AlfBootStrap class methodsFor: 'forcing a bootstrap'
!
bootstrap

    BootDone <- false.
    self new bootstrap.
!
```

```
Class AlfCompiler :Object   |

        errorMsg
        lastLexemeStart
        lastLexemeEnd
        stringForComp
        answerClause        "<Clause>, nil means string did not compile"
        tokenList
        alfMsg
        lastClauseComment
        compTrace
        compileQuery
        counting
        |
!
"       poolDictionaries: ''"
"       category: 'Logic Programming'"

"AlfCompiler comment: 'I implement the AlfCompiler.'"

! AlfCompiler methodsFor: 'accessing'

!
errorMsg
        ^errorMsg

!
stringForComp
        ^stringForComp

!
answerClause
        ^answerClause

!
tokenList
        ^tokenList

!
alfMsg
        ^alfMsg

!
compileQuery
        ^compileQuery

! AlfCompiler methodsFor: 'updating'

!
compTrace: aLevel
        compTrace <- aLevel.

!
countingOn
        counting <- true.

!
countingOff
        counting <- false.

!
        lastLexemeEnd <- anEnd.

!
lastLexemeStart: aStart
        lastLexemeStart <- aStart.

! AlfCompiler methodsFor: 'compiling'

!
alfCompile: aString forPgm: aPgmName comment: aComment
        |compileClause thePgm aStream|

        stringForComp <- aString.
        lastLexemeStart <- 0.
        lastLexemeEnd <- 0.
        alfMsg <- ''.

        compileQuery <- nil.
        tokenList <- (AlfLexer new) alfScan: aString.
        tokenList class = AlfList ifFalse:[errorMsg <- tokenList.
                "this is the error discovered by the lexer"
                ^self.].
        compileClause <- Clause new: aComment.
        answerClause <- LogicVariable new: 'clause'.
        compileClause addTail: (IsClause newWith: tokenList
                                ob): answerClause
                                compiler: self).
        compileClause setCopyEnv.
        compileQuery <- AlfQuery newQuery: compileClause
                                forPgmNamed: #alfParser.

        compTrace > 10 ifTrue: [compileQuery traceOn: 1].
        counting ifTrue: [compileQuery countingOn].

        compileQuery nextAnswer.
        answerClause <- answerClause dereference: compileQuery env.

        answerClause bound ifTrue:[
                answerClause <- answerClause binding.
                answerClause <- answerClause
                                replaceLexLogicVars: answerClause.
                                "This last statement replaces all of the
                                occurrences of LexLogicVar (which came out
                                of the AlfLexer, passed through the
                                AlfCompiler) with real LogicVariables."

                answerClause setCopyEnv.
                thePgm <- AlfProgram find: aPgmName.
                thePgm ifNil: [thePgm <- AlfProgram new: aPgmName].
                thePgm addRule: answerClause.
                errorMsg <- 'Compile successful: ', stringForComp.
                ^self.
                ].

        answerClause <- nil.
        aStream <- WriteStream on: (String new: 100).
        aStream nextPutAll: 'Was able to parse:'.
        aStream nl.

        lastLexemeStart > 1 ifTrue: [aStream nextPutAll:
                (stringForComp copyFrom: 1 to: lastLexemeStart-1).
                aStream nl.
                aStream nextPutAll: 'Failed somewhere in: '.
```

```
        aStream nextPutAll: (stringForComp copyFrom:
                lastLexemeStart to: lastLexemeEnd))
            ifFalse:[aStream nextPutAll: '(nothing) is there an <- ?'].
    aStream nl.
    aStream nextPutAll: alfMsg.

    errorMsg <-  aStream contents.
!
setError: aMsg start: aStart end: anEnd
    "If the end is larger than the stored lexemeEnd, we have
    parsed more of the string, and the new error message
    supercedes the old one.  This method is used in the
    ALF compiler rules to provide for error msgs."

    aStart >= lastLexemeStart ifTrue: [lastLexemeStart <- aStart.
                lastLexemeEnd <- anEnd.
                alfMsg <- aMsg].

!
setSuccess: aToken comment: aComment
    "This is called when we have successfully parsed the input
    string, up to, but not including, the first token in an AlfList,
    as supplied in the aToken.
    This method is used in the ALF compiler rules to provide for
    error msgs."

    |aStream index|

    index <- aToken lexemeStart.

    index >= lastLexemeStart ifTrue: [lastLexemeStart <- index.
                lastLexemeEnd <- stringForComp size.
                lastClauseComment <- aComment].

    compTrace > 0 ifTrue:[
        aStream <- WriteStream on: (String new: 100).
        aStream nextPutAll: 'Parsed:'.
        aStream nextPutAll:
                (stringForComp copyFrom: 1 to: lastLexemeStart-1).
        aStream nl.
        aStream nextPutAll: aComment.
        aStream contents print.]
!
dereferenceCopyUsingEnv: anEnv checking: circRef
    "This method is here to override that in Object, because the
    AlfCompiler points to a Query, which points to an AlfProgram,
    which points to Clauses (rules) which have environment LV's
    in them, which have nothing to do with the anEnv passed in,
    and which cause errors when we try to print them out using the
    anEnv."
    ^ ('anAlfCompiler:', self oopId printString). "debug only"

    "^super dereferenceCopyUsingEnv: nil checking: circRef."

! AlfCompiler class methodsFor: 'creating'

!
new
    |aCompiler|

    aCompiler <- super new.
    aCompiler compTrace: 0.
    aCompiler lastLexemeStart:  0.
    aCompiler lastLexemeEnd:  0.
    alfMsg <- ''.
    ^aCompiler.
!
```

```
Class AlfCut :Predicate   |

         |
[
"       poolDictionaries: ''"
"       category: 'Logic Programming'"


"AlfCut comment: 'I implement the Prolog Cut function.'"

| AlfCut methodsFor: 'unification'
|
unifyUsingEnv: myEnv withPredicate: ruleHead usingEnv: predEnv
                trailing: aTrail fromQuery: anAlfQuery
        anAlfQuery cut.
        ^nil.


| AlfCut methodsFor: 'printing'


|
shortPrintOn: aStream
        aStream nextPut: $!.


!
```

"Copyright 1988 Eastman Kodak Company. All rights reserved."

```
Class AlfEmptyList :Object   !

        !
!
"       poolDictionaries: ''"
"       category: 'Logic Programming'"


"AlfEmptyList comment: 'I implement the empty list, [], as in Prolog.'"

"The purpose of having a special class is to enable protocol that
acts differently from that in class AlfList.  It is not possible to
make up a special AlfList (with distinguished head/tail) to stand for
the empty list, since the term [X|Y] (X, Y are logic variables) will
unify with this 'empty list', contrary to what's expected (i.e. the above
term must not unify with the empty list).  We could have used a
special symbol (#emptyList) to stand for the empty list, but then
protocol sent to this (like print, do:, ...) would have been resolved
in class Symbol, which is not good either"


! AlfEmptyList methodsFor: 'updating'

"The empty list can not really be updated.  We return a new AlfList
instead.  (We could have used 'become', but this does not work
in Alltalk across classes, yet)."

!
head: aHead
        ^ (AlfList new) head: aHead.

!
tail: aTail
        ^ (AlfList new) tail: aTail.

!
addLast: anObject
        ^ (AlfList new) head: anObject.

!
addFirst: anObject
        ^ (AlfList new) head: anObject.

! AlfEmptyList methodsFor: 'comparing'

!
= anObject
        "all empty lists are the same"

        anObject class == AlfEmptyList ifTrue: [^true].
        ^false.


! AlfEmptyList methodsFor: 'enumerating'

!
do: aBlock
        ^nil.

! AlfEmptyList methodsFor: 'printing'

!
printOn: aStream
        aStream nextPutAll: '[]'.
!
```

```
        error                       "<String> representing an error to put
                                    out"

          !
!
"       poolDictionaries: ''"
"       category: 'Logic Programming'"


"AlfError comment: 'I post an error to the query in process'"



! AlfError methodsFor: 'updating'

!
error: anError
        error <- anError

! AlfError methodsFor: 'unification'


!
unifyUsingEnv:myEnv  withPredicate: ruleHead usingEnv: predEnv
                trailing: #Trail fromQuery: anAlfQuery

        "Our assumption is that self is a term in an atomToProve, and
        ruleHead is a term in a goal to prove.  We ignore the rule
        head, since this was set up only to cause the unification
        method to be invoked.  We would not be here unless
        atomToProve was of class AlfError"

        anAlfQuery postError: error.

        ^nil.

! AlfError class methodsFor: 'creation'

!
newWith: anError
        |newError|

        newError <- super new.
        newError error: anError.
        ^newError.
!
```

```
"Copyright 1988 Eastman Kodak Company.  All rights reserved."

Class AlfFail :Predicate   |
        |
!
"       poolDictionaries: ''"
"       category: 'Logic Programming'"

"AlfFail comment: 'I always fail to unify'"

! AlfFail methodsFor: 'unification'

!
unifyUsingEnv:myEnv  withPredicate: ruleHead usingEnv: predEnv
                trailing: aTrail fromQuery: anAlfQuery

        "Our assumption is that self is a term in an atomToProve, and
        ruleHead is a term in a goal to prove.  We ignore the rule
        head, since this was set up only to cause the unification
        method to be invoked.  We would not be here unless
        atomToProve was of class AlfFail"

        "Actually, since we do not set up any rules with AlfFail
        as the head, we never get here:  the resolution
        mechanism detects that there are no rules, and fails
        immediately."

        ^#fail.
!
```

```
"Copyright 1988 Eastman Kodak Company.  All rights reserved."
Class AlfIs :Predicate   |
        value1                  "<Object>"
        value2                  "<Object>"

          |             •
|
"       poolDictionaries: ''"
"       category: 'Logic Programming'"

"AlfIs comment: 'I implement a predicate that tests for equality.'"

! AlfIs methodsFor: 'updating'

!
value1: aValue
        value1 <- aValue.

!
value2: aValue
        value2 <- aValue.

! AlfIs methodsFor: 'unification'
"The rule that is set up is AlfIs(X,X) <-.  The normal unification
routines should work and no override logic is required"

! AlfIs class methodsFor: 'creation'

!
newWithValue: aValue andValue: anotherValue
        |newIs|
        newIs <- self new.
        newIs value1: aValue.
        newIs value2: anotherValue.
        ^newIs.
!
```

```
"Copyright 1988 Eastman Kodak Company.  All rights reserved."
Class AlfIsNot :AlfIs   |

        |
!
"       poolDictionaries: ''"
"       category: 'Logic Programming'"

"AlfIsNot comment: 'I implement a predicate that tests for inequality.'"


! AlfIsNot methodsFor: 'unification'


!
unifyUsingEnv:myEnv  withPredicate: ruleHead usingEnv: predEnv
            trailing: aTrail fromQuery: anAlfQuery

    "Our assumption is that self is a term in an atomToProve, and
    ruleHead is a term in a goal to prove.  We ignore the rule
    head, since this was set up only to cause the unification
    method to be invoked.  We would not be here unless
    atomToProve was of class AlfSend"

    |realValue1 realValue2|


    realValue1 <- value1.
    realValue1 <- value2.

    "Fail if either parameter is an unbound logic variable."
    realValue1 class -- LogicVariable ifTrue:
            [realValue1 <- realValue1 dereference: myEnv.
            realValue1 bound ifFalse:[^#fail]
            ].

    realValue2 class -- LogicVariable ifTrue:
            [realValue2 <- realValue2 dereference: myEnv.
            realValue2 bound ifFalse:[^#fail]
            ].

    realValue1 -- realValue2 ifFalse: [^#fail].
!
```

"Copyright 1988 Eastman Kodak Company. All rights reserved."

```
Class AlfLexer :Object    |

        inputString               "<String> to scan, plus a blank"
        lookAhead                 "<Integer> index into inputString"
        lookAheadChar             "<Character>"
        nextState                 "<Symbol>"
        lexemeStart               "<Integer>"
        lexemeEnd                 "<Integer>"
        lexemeDone                "<Boolean>"
        tokenList                 "<AlfList> output of lexer,
                                    unless errorMsg is not nil,
                                    in which case we return errorMsg"

        errorMsg                  "<String> nil means no error"
        symbolDictionary          "<Dictionary> to resolve common
                                   references to the same object"
        stringConstant            "<String> used to hold an input
                                  string constant."
        stringLength              "<Integer> used to keep track of
                                  a string length."
        negativeConstant          "indicates if constant is a
                                   negative number"
          |
!
:       poolDictionaries: ''"
:       category: 'Logic Programming'"

"AlfLexer comment: 'I implement the AlfLexer, the lexical analyzer for
the Alf language.'"


! AlfLexer methodsFor: 'scanning and tokenizing'

!
alfScan: aString
        "This lexical analyzer is based on 'Compilers, Principles,
        Techniques and Tools', by Aho et al, Chapter 3 (more or less).
        The idea is to build up an AlfList of AlfTokens that represent
        the tokenized aString.  The aString is assumed to be one
        AlfClause (i.e. a rule with a (possibly empty) head and a
        (possibly empty) tail. A token in this list consists of the
        token as a symbol, and a value as an object.  A primary
        function of the lexer is to build the correct objects, of the
        proper class, based on the class names supplied as prolog
        functors.  We also resolve common logic variable names to the
        same instance object of class LexLogicVariable"

        tokenList <- AlfList new.
        inputString <- aString, ' '.  "add blank to make eof easier"
        nextState <- #state0.
        lexemeStart <- 0.
        lexemeEnd <- 0.
        lexemeDone <- false. "This means we are in the middle of a
                              lexeme, and termination (out of
                              characters) is an error unless
                              lexemeDone is true."
        lookAhead <- 0.
        symbolDictionary <- Dictionary new.

        [true] whileTrue:[
                lookAhead <- lookAhead + 1.
                lookAhead > inputString size ifTrue:[
                        lexemeDone ifTrue:[^tokenList]
                                ifFalse:[^'Unexpected eof in AlfLexer']].
                lookAheadChar <- inputString at: lookAhead.
                self perform: nextState.
                errorMsg notNil ifTrue:[^errorMsg].
                ].

! AlfLexer methodsFor: 'private '

!
state0
        "assume we are at start of new lexeme"

        "for efficiency, we test for  most likely lookAheadChar's first"

        "Handle white space"
        lookAheadChar isSeparator ifTrue:[^nil "stay in state0"].

        lexemeStart <- lookAhead.
        lexemeEnd <-lookAhead.

        lookAheadChar isLetter ifTrue:[nextState <- #state1.
                                lexemeDone <- false.
                                ^nil].

        lookAheadChar == $< ifTrue:[nextState <- #state2.
                                lexemeDone <- false.
                                ^nil].

        lookAheadChar == $( ifTrue:[self acceptLP. ^nil].
        lookAheadChar == $) ifTrue:[self acceptRP. ^nil].
        lookAheadChar == $= ifTrue:[self acceptEQ. ^nil].
        lookAheadChar == $, ifTrue:[self acceptCOMMA. ^nil].
        lookAheadChar == $[ ifTrue:[self acceptLB. ^nil].
        lookAheadChar == $] ifTrue:[self acceptRB. ^nil].
        lookAheadChar == $| ifTrue:[self acceptBAR. ^nil].
        lookAheadChar == $! ifTrue:[self acceptCUT. ^nil].

        lookAheadChar isDigit ifTrue:[nextState <- #state3.
                                lexemeDone <- false.
                                negativeConstant <- false.
                                ^nil].

        lookAheadChar == $- ifTrue:[nextState <- #state4.
                                lexemeDone <- false.
                                negativeConstant <- true.
                                ^nil].

        lookAheadChar == $_ ifTrue:[nextState <- #state5.
                                lexemeDone <- false.
                                ^nil].

        lookAheadChar == $' ifTrue:[nextState <- #state7.
                                stringConstant <- String new: (inputString
                                                                size).
                                stringLength <- 0.
                                lexemeDone <- false.
                                ^nil].

        lookAheadChar == $$ ifTrue:[self acceptChar. ^nil].
```

```
        lookAheadChar ==$# ifTrue:[nextState <- #state8.
                                   lexemeDone <- false.
                                   ^nil].

        lookAheadChar ==$% ifTrue:[nextState <- #state9.
                                   lexemeDone <- false.
                                   ^nil].

!
state1
        "Presume working on the interior of an identifier name"

        lookAheadChar isDigit ifTrue:[lexemeEnd <- lexemeEnd +1. ^nil].

        lookAheadChar isLetter ifTrue:[lexemeEnd <- lexemeEnd +1. ^nil].

        self lexemeEnds ifTrue: [self acceptIdentifier. ^nil].

        lookAheadChar == $: ifTrue:[ lexemeEnd <- lexemeEnd +1.
                                    self acceptIdentifier.
                                    nextState <- #state0.
                                    ^nil].

        errorMsg <- 'Identifier not understood: ', (inputString copyFrom:
                    lexemeStart to: lookAhead).
!
state2
        "Presume working on the '-' after a '<'"

        lookAheadChar == $- ifTrue:[lexemeEnd <- lexemeEnd +1.
                                    self acceptARROW.
                                    nextState <- #state0.
                                    ^nil].

        errorMsg <- 'Arrow not understood: ', (inputString copyFrom:
                    lexemeStart to: lookAhead).
!
state3
        "Presume working on the interior of a number, to the left
        of any decimal"

        lookAheadChar isDigit ifTrue:[lexemeEnd <- lexemeEnd +1. ^nil].

        self lexemeEnds ifTrue:[self acceptNumber. ^nil.].

        lookAheadChar == $. ifTrue:[lexemeEnd <- lexemeEnd +1.
                                    nextState <- #state6.
                                    ^nil ].

        errorMsg <- 'A badly formed integer: ', (inputString copyFrom:
                    lexemeStart to: lookAhead).
!
state4
        "Presume working on the first character after the minus,
        in a negative number."

        lexemeEnd <- lexemeEnd + 1.
        lookAheadChar == _Space ifTrue:[ ^nil. "stay in same state"].

        lookAheadChar isDigit ifTrue:[lexemeStart <- lexemeEnd.
                                      "start at first digit in neg.
                                      number"
                                      nextState <- #state3.
                                      ^nil].

        errorMsg <- 'A badly formed negative number: ',
                (inputString copyFrom: lexemeStart to: lookAhead).
!
state5
        "Presume working on an anonymous logic variable."

        lookAheadChar == $: ifTrue:[lexemeEnd <- lexemeEnd +1.
                                    self acceptIdentifier.
                                    nextState <- #state0.
                                    ^nil].

        errorMsg <- 'A badly formed logic variable (must end in '':''): ',
                (inputString copyFrom: lexemeStart to: lookAhead).
!
state6
        "Presume working on the interior of a number, to the right
        of any decimal"

        lookAheadChar isDigit ifTrue:[lexemeEnd <- lexemeEnd +1. ^nil].

        self lexemeEnds ifTrue:[self acceptNumber. ^nil.].

        errorMsg <- 'A badly formed float: ', (inputString copyFrom:
                    lexemeStart to: lookAhead).
!
state7
        "Presume working on the interior of a string constant. String
        constants are enclosed in double quotes (like Smalltalk
        comments). This allows easy imbedding of the string into
        Smalltalk programs"

        lexemeEnd <- lexemeEnd + 1.
        lookAheadChar == $" ifTrue:
                [(inputString at:(lookAhead+1)) == $"
                        ifTrue:[stringLength <- stringLength + 1.
                                stringConstant at: stringLength put: $".
                                lookAhead <- lookAhead +1.
                                ^nil]
                        ifFalse:[stringLength = 0
                                ifTrue: [self acceptString:(String new:0)]
                                ifFalse: [self acceptString:(stringConstant
                                        copyFrom:1 to: stringLength)].
                                nextState <- #state0.
                                ^nil "end of lexeme"].
                ].

        stringLength <- stringLength + 1.
        stringConstant at: stringLength put: lookAheadChar.
        ^nil.
!
state8
        "Presume working on the interior of a symbol."

        self lexemeEnds ifTrue:[self acceptSymbol. ^nil].
```

```
        lexemeEnd <- lexemeEnd +1.
        ^nil.

!
state9
        "Presume working on the interior of a symbolic constant.
        This is begun with a %, and is either nil, true, false,
        or a class name."

        self lexemeEnds ifTrue:[self acceptSymbolicConstant. ^nil].

        lexemeEnd <- lexemeEnd +1.
        ^nil.
!
acceptLP
        tokenList addLast:(AlfToken type:#LP tokenValue:$(
                    start: lexemeStart end: lexemeEnd).
        lexemeDone <- true.

!
acceptRP
        tokenList addLast:(AlfToken type:#RP tokenValue:$)
                    start: lexemeStart end: lexemeEnd).
        lexemeDone <- true.

!
acceptEQ
        tokenList addLast:(AlfToken type:#EQ tokenValue:$=
                    start: lexemeStart end: lexemeEnd).
        lexemeDone <- true.

!
acceptCOMMA
        tokenList addLast:(AlfToken type:#COMMA tokenValue:$,
                    start: lexemeStart end: lexemeEnd).
        lexemeDone <- true.

!
acceptCUT
        tokenList addLast:(AlfToken type:#CUT tokenValue: (AlfCut new)
                    start: lexemeStart end: lexemeEnd).
        lexemeDone <- true.

!
acceptARROW
        tokenList addLast:(AlfToken type:#ARROW tokenValue:'<-'
                    start: lexemeStart end: lexemeEnd).
        lexemeDone <- true.

!
acceptLB
        (inputString at:(lookAhead + 1)) = $]
                ifTrue: [
                        tokenList addLast:(AlfToken type:#CONSTANT
                                tokenValue: (AlfEmptyList new)
                                start: lexemeStart end: lexemeEnd).
                        lookAhead <- lookAhead + 1.
                        ]
                ifFalse: [tokenList addLast:(AlfToken type:#LB
                        tokenValue: (AlfList new)
                        start: lexemeStart end: lexemeEnd).
                        ].
        lexemeDone <- true.

!
acceptRB
        tokenList addLast:(AlfToken type:#RB tokenValue:$]
                    start: lexemeStart end: lexemeEnd).
        lexemeDone <- true.

!
acceptBAR
        tokenList addLast:(AlfToken type:#BAR tokenValue:$|
                    start: lexemeStart end: lexemeEnd).
        lexemeDone <- true.

!
acceptNumber
        |number|

        number <- (inputString copyFrom: lexemeStart to: lexemeEnd)
                    asNumber.
        negativeConstant ifTrue: [number <- (0 - number)].
        tokenList addLast:(AlfToken type:#CONSTANT tokenValue:number
                    start: lexemeStart end: lexemeEnd).
        lexemeDone <- true.

!
acceptString: aString
        tokenList addLast:(AlfToken type:#CONSTANT tokenValue: aString
                    start: lexemeStart end: lexemeEnd).
        lexemeDone <- true.

!
acceptIdentifier
        |identifier alfToken|

        identifier <- inputString copyFrom: lexemeStart
                                to: lexemeEnd.

        alfToken <- symbolDictionary at: identifier ifAbsent:
                                [self newIdentifier: identifier].
        tokenList addLast: alfToken.
        lexemeDone <- true.
        ^nil.
!
acceptChar
        |char|

        lookAhead <- lookAhead + 1.
        char <- inputString at: lookAhead.
        tokenList addLast:(AlfToken type:#CONSTANT tokenValue: char
                    start: lexemeStart end: lexemeEnd).
        lexemeDone <- true.


!
acceptSymbol
        tokenList addLast:(AlfToken type:#CONSTANT tokenValue:
                    (inputString copyFrom: lexemeStart + 1 to: lexemeEnd)
                    asSymbol
                            start: lexemeStart end: lexemeEnd).
        lexemeDone <- true.

!
acceptSymbolicConstant
        |constObj constString|
```

```
        constString <- inputString copyFrom: lexemeStart + 1 to: lexemeEnd.
        constString = 'nil' ifTrue:
                [tokenList addLast:(AlfToken type: #CONSTANT tokenValue:nil
                        start: lexemeStart end: lexemeEnd).
                lexemeDone <- true.
                ^nil.
                ].

        constString = 'true' ifTrue:
                [tokenList addLast:(AlfToken type: #CONSTANT
                        tokenValue:true
                                start: lexemeStart end: lexemeEnd).
                lexemeDone <- true.
                ^nil.
                ].

        constString = 'false' ifTrue:
                [tokenList addLast:(AlfToken type: #CONSTANT
                        tokenValue:false
                                start: lexemeStart end: lexemeEnd).
                lexemeDone <- true.
                ^nil.
                ].

        "Test for class name: must be a global symbol"

        constObj <- self classNameAudit: constString.
        constObj isNil ifTrue:[^nil].

        tokenList addLast:(\lfToken type: #CONSTANT tokenValue:constObj
                start: lexemeStart end: lexemeEnd).
        lexemeDone <- true.
        ^nil.
!
newIdentifier: anIdentifier
        |aToken identClass logicVar|

        "We create a token to represent the anIdentifier, as well as the
         object that is pointed to by the tokenValue.  If the
         anIdentifier is a non-anonymous LexlogicVariable, we put the
         anIdentifier in the symbolDictionary in order that common
         LexlogicVariables point to the same instance of class
         LexLogicVariable.  "

        "Test for logic variable: first digit uppercase,
        last digit a :"

        (anIdentifier at:1) isUppercase ifTrue:[
                (anIdentifier at:(anIdentifier size)) == $: ifTrue:[
                        logicVar <- LexLogicVariable new: anIdentifier.
                        aToken <- AlfToken type:#logicVar
                                tokenValue: logicVar
                                start: lexemeStart end: lexemeEnd.
                        symbolDictionary at:anIdentifier put: aToken.

                        logicVar binding: (LogicVariable new: anIdentifier).
                        "we will replace the LexLogicVars with the
                        LogicVars they are bound to when the clause
                        gets initialized."
                        ^aToken].

                "Test for class name: must be a global symbol"

                identClass <- self classNameAudit: anIdentifier.

                identClass isNil ifTrue:[^nil].

                (identClass inheritsFrom: Predicate) ifTrue: [
                        aToken <- AlfToken type:#predicateName tokenValue:
                                (self initObj: (identClass new))
                                start: lexemeStart end: lexemeEnd.
                        ^aToken].

                aToken <- AlfToken type:#className tokenValue:
                                (self initObj: (identClass new))
                                start: lexemeStart end: lexemeEnd.
                ^aToken].

        "Handle anonymous logicVariables"

        (anIdentifier at:1) == $_ ifTrue:[
                        logicVar <- LexLogicVariable new: '_'.
                        aToken <- AlfToken type:#logicVar
                                tokenValue: logicVar
                                start: lexemeStart end: lexemeEnd.
                        logicVar binding: (LogicVariable new: anIdentifier).
                        ^aToken].

        "First digit not uppercase, not _: must be an instance variable name.
        Note that we do not support class objects as terms at this time."

        aToken <- AlfToken type:#instVarName tokenValue:
                                (anIdentifier asSymbol)
                                start: lexemeStart end: lexemeEnd.

        ^aToken.

!
classNameAudit: aString
        |identClass|

        identClass <- Smalltalk at: aString.

        "check to see aString is a class name.  If so, return class
        object.  If not, set errorMsg, and return nil"

        identClass isNil ifTrue:[errorMsg <- aString,
                ' is not a global name.'.
                ^nil].

        identClass class == identClass ifFalse:[
                errorMsg <- aString, ' is not a class name.'.
                ^nil].
        ^identClass.

!
initObj: anObj
        "Initialize the newly made object with anonymous logic
        variables."

        |instSize |

        instSize <- anObj class instSize.
        1 to: instSize do:[ :i| anObj instVarAt: i put:
                        (LexLogicVariable new binding: (LogicVariable new))].
        ^anObj.
!
lexemeEnds
        |test for end of lexeme|
```

```
lookAheadChar isSeparator ifTrue:[
                        lookAhead <- lookAhead -1.
                        nextState <- #state0.
                        ^true "end of lexeme"].

lookAheadChar == $, ifTrue:[
                        lookAhead <- lookAhead -1.
                        nextState <- #state0.
                        ^true "end of lexeme"].

lookAheadChar == $) ifTrue:[
                        lookAhead <- lookAhead -1.
                        nextState <- #state0.
                        ^true "end of lexeme"].

lookAheadChar == $] ifTrue:[
                        lookAhead <- lookAhead -1.
                        nextState <- #state0.
                        ^true "end of lexeme"].

lookAheadChar == ${ ifTrue:[
                        lookAhead <- lookAhead -1.
                        nextState <- #state0.
                        ^true "end of lexeme"].

lookAheadChar == $- ifTrue:[
                        lookAhead <- lookAhead -1.
                        nextState <- #state0.
                        ^true "end of lexeme"].

lookAheadChar == $[ ifTrue:[
                        lookAhead <- lookAhead -1.
                        nextState <- #state0.
                        ^true "end of lexeme"].

^false.
```

```
"Copyright 1988 Eastman Kodak Company.  All rights reserved."
Class AlfList :Object   |

        head
        tail
          |
!
"       poolDictionaries: ''"
"       category: 'Logic Programming'"


"AlfList comment: 'I implement logical lists, as in Prolog.'"
"The empty list is an object of class AlfEmptyList"


! AlfList methodsFor: 'accessing'

!
head
        ^ head.

!
tail
        ^ tail.

! AlfList methodsFor: 'updating'

!
head: aHead
        head <- aHead.

!
tail: aTail
        tail <- aTail.

!
addLast: anObject
        |link |

        #AlfUnInitList == head ifTrue:[head <- anObject. ^self].
        link <- self.
        [AlfEmptyList == link tail class] whileFalse: [link <- link tail].
        link tail: (AlfList new head: anObject).

!
addFirst: anObject
        |currentList|

        currentList <- self copy.
        head <- anObject.
        tail <- currentList.


! AlfList methodsFor: 'enumerating'

!
do: aBlock
        aBlock value: head.
        AlfEmptyList == tail class ifTrue: [^nil].
        AlfList == tail class ifTrue: [ tail do: aBlock]
                        ifFalse: [aBlock value: tail].

! AlfList methodsFor: 'printing'

!
printOn: aStream
        aStream nextPut: $[.
        head printOn: aStream.

        (AlfEmptyList == tail class) ifTrue: [aStream nextPut: $]. ^nil.].

        AlfList == tail class
                ifTrue: [tail do:
                        [:each| aStream nextPutAll:' '.
                        each printOn: aStream]]
                ifFalse:[ aStream nextPutAll: ' | '.
                        tail printOn: aStream].
        aStream nextPut: $].

! AlfList class methodsFor: 'creating'

!
new
        |newList|

        "Note that this does not make an empty list.  To make
        an empty list, send new to AlfEmptyList"

        newList <- super new.
        newList tail: (AlfEmptyList new).
        newList head: #AlfUnInitList.
        ^newList.
!
newWith: anObject
        |newList|

        newList <- self new.
        newList head: anObject.
        ^newList.

!
newWith: anObject with:anotherObj
        |newList tailList|

        tailList <- self new.
        tailList head: anotherObj.

        newList <- self new.
        newList head: anObject.
        newList tail: tailList.
        ^newList.
!
newWith: anObject tail: aTail
        |newList|

        newList <- self new.
        newList head: anObject.
        newList tail: aTail.
        ^newList.
!
newWith: anObject with:anotherObj tail: aTail
        |newList |

        newList <- self newWith: anotherObj tail:aTail.
        newList addFirst: anObject.
        ^newList.
!
```

```
"Copyright 1988 Eastman Kodak Company.  All rights reserved."

Class AlfNot :Predicate   |
        negated          "Can be a bound logic variable, or a predicate"

         |
!
"       poolDictionaries: ''"
"       category: 'Logic Programming'"


"AlfNot comment: 'I implement the Prolog Not function.'"

! AlfNot methodsFor: 'updating'

!
negated: aNegated
        negated <- aNegated

! AlfNot class methodsFor: 'creation'

!
with: aNegated

        |newCall|
        newCall <- super new.
        newCall negated: aNegated.
        ^newCall.
!
```

"Copyright 1988 Eastman Kodak Company.  All rights reserved."

```
Class AlfProgram :Object   |
            ruleDictionary   "<Dictionary> entries are lists of rules,
                             keyed by the head's predicate."
            name             "<Symbol> the name of the program."
            author           "<String>"
            date             "<String>"
            comment          "<String>"
            nextClauseNumber
                             "<Integer> to tag clauses with"
            clauseLists      "<OrderedCollection>  Each clauseList in
                             the orderedCollection is a LinkedList of
                             clauses.  All clauses in each such
                             LinkedList have the same head Predicate "
            PgmDictionary    "<IdentityDictionary> entries are the Alf
                             programs in the system, keyed by name"

         !
!
"      poolDictionaries: ''"
"      category: 'Logic Programming'"

"AlfProgram comment: 'I implement logic programs, as in Prolog.  The
        AlfProgram instance serves to group rules together."


! AlfProgram methodsFor: 'accessing'

!
ruleDictionary
        ^ ruleDictionary.

!
name
        ^ name.

!
rulesFor: anAtom
        "Return the rules for anAtom."

        ^ruleDictionary at:(anAtom class) ifAbsent:
                                [^ClauseList new].

!
rulesForCheckBuiltin: anAtom
        "Return the rules for anAtom.  If none are found, search
        the program #AlfBuiltin"

        |ruleList|

        ruleList <- self rulesFor: anAtom.
        ruleList isEmpty ifFalse: [^ruleList].
        #AlfBuiltin == name ifTrue: [^ruleList].
        ^ (AlfProgram find: #AlfBuiltin) rulesFor: anAtom.

!
listRules
        |aStream|

        aStream <- WriteStream on: (String new: 100).
        aStream nextPutAll: ('Rules for Pgm ', name asString).
        aStream nl.
        clauseLists do: [:each | each do: [:ruleLink |
                                ruleLink number printOn: aStream.
                                aStream nextPutAll: '. '.
                                ruleLink clause printOn: aStream.
                                aStream nl]].
        ^ aStream contents.

! AlfProgram methodsFor: 'updating'

!
ruleDictionary: aDictionary
         ruleDictionary <- aDictionary.

!
name: aPgmName
        name <- aPgmName.

!
nextClauseNumber: aNumber
        nextClauseNumber <- aNumber.

!
clearRules
         ruleDictionary <- IdentityDictionary new:16.
         nextClauseNumber <- 0.
         clauseLists <- OrderedCollection new.

!
clearRulesFor: aPredicate
        |ruleList|

         ruleList <- ruleDictionary removeKey: aPredicate ifAbsent: [nil].
         ruleList notNil ifTrue: [clauseLists remove: ruleList
                    ifAbsent: [nil]].

!
addRule: aRule
        |key ruleList needToOptimize newClauseLink newTailStack ruleArray|

        needToOptimize <- false.
        key <- aRule head class.
        ruleList <- ruleDictionary at: key ifAbsent: [
                   needToOptimize <- true.  "A new class of clause
                        appears in a rule head"
                   clauseLists addLast: (ruleDictionary at:key put:
                             (ClauseList new))].

        nextClauseNumber <- nextClauseNumber + 1.
        newClauseLink <- ruleList addLast: (ClauseLink with: aRule
                        number: nextClauseNumber inPgm: self).

        #AlfBuiltin == name ifTrue: [needToOptimize ifTrue: [
                   "adding a rule to the builtin rules means
                   optimize all programs."
                   AlfProgram optimizeAll.
                   ^self]].

        needToOptimize ifTrue: [self optimize]
              ifFalse:
              ["cache the LinkedList of rules that match, in each atom
              of the new rules tail"
```

```
        self indexTailAtoms: newClauseLink].

!
optimize
        "Cache rule lists in each (clauseLink ruleArray).  The subscript
        is that of the seqNumber of the atom in the tail of the rule
        we are dealing with. The list of rules that can match this atom
        is placed in the ruleArray at the atom's seqNumber.  This
        techique allows us to avoid searching for rules during the
        query processing."

        |ruleArray tail|

        clauseLists do: [:eachCList| eachCList do: [:clauseLink |
                self indexTailAtoms: clauseLink]].

!
indexTailAtoms: clauseLink
        "Use the ruleArray in the clauseLink to hold lists of rules that
        can unify with the atoms in the tail of the rule in clauseLink."

        |ruleArray tail|
        ruleArray <- clauseLink ruleArray.
        ruleArray ifNil:[ruleArray <- Array new:
                        (clauseLink clause numberTailAtoms).
                        clauseLink ruleArray: ruleArray].


        tail <- clauseLink clause tail.

        tail do: [:atomLink| ruleArray at: (atomLink seqNumber)
                put:(self rulesForCheckBuiltin: (atomLink atom))].

!
removeRule: aRule
        |key ruleList|

        key <- aRule head class.
        ruleList <- ruleDictionary at: key ifAbsent: [^ aRule].
        ruleList remove: aRule.
        ^aRule.

! AlfProgram class methodsFor: 'creating'

!
new: aPgmName
        |newPgm|

        self initIfRequired.
        newPgm <- super new.
        newPgm clearRules.
        newPgm name: aPgmName asSymbol.
        PgmDictionary at: aPgmName put: newPgm.
        newPgm nextClauseNumber: 0.
        ^newPgm.

! AlfProgram class methodsFor: 'accessing the pgm dictionary'

!
find: aPgmName
        "return nil if program not found"

        self initIfRequired.

        ^ PgmDictionary at: (aPgmName asSymbol) ifAbsent: [nil].

!
remove: aPgmName

        self initIfRequired.
        PgmDictionary removeKey: aPgmName ifAbsent: [nil].

! AlfProgram class methodsFor: 'optimizing all programs'

!
optimizeAll

        self initIfRequired.
        PgmDictionary do: [:pgm| pgm optimize].'

!
initIfRequired
        PgmDictionary isNil ifTrue:[PgmDictionary <- IdentityDictionary
                                                new:64].
!
```

```
"Copyright 1988 Eastman Kodak Company.  All rights reserved."
Class AlfQuery :Object   |
            queryClause         "<Clause> the clause to prove"
            env                 "<Array> the environment to use
                                for this invocation of the query"
            choicePointStack    "<Stack> of choicePoints.
                                Acts like a stack in that the
                                last choice point discovered
                                is first on the list.  When
                                this is empty, there are no
                                more choice points that can be
                                taken."
            goalStack           "<GoalStack> of GoalStackLinks
                                This represents the current set
                                of goals to prove.  When we
                                fail, or when this becomes empty,
                                we execute the next choice
                                point"
            alfPgm              "<AlfProgram> against which to
                                execute the query"
            errorStream         "<ReadWriteStream> this serves
                                as place to post errors during
                                processing of the query.
                                There is a built-in predicate
                                that can post to this.  It
                                serves the function of the
                                Prolog print statement."
            traceLevel          "<Integer>  non 0 means trace
                                this query."

            traceFormat         "<Integer> the lower, the less
                                data"

            totalChoicePoints   "<Integer> for debugging"
            counting            "<Boolean> true means count stats"
            trail               "<Trail> the trail of bindings
                                to undo at the various choice
                                points"

            currentFreezePt     "<Integer>  All goalLinks below,
                                and including the one marked by
                                this point are currently frozen,
                                and must not be altered.  This
                                means that some choicePoint is
                                pointing into the stack at this
                                point, and hence the stack must
                                be preserved starting with the
                                goalLink marked by this
                                currentFreezePoint."

            nextGoalSeq         "<Integer> the next sequence
                                number to use for the next
                                goalLink to be constructed."

            ruleLinkToPush      "<ClauseLink>  After a goal unifies
                                with a clause (rule), this points
                                to the clause whose tail to
                                push on the stack.  This can be
                                updated in the unification
                                methods in the builtin
                                Predicates"
        |
[ "     poolDictionaries: ''" "     category: 'Logic Programming'"

"Query comment: 'I implement logic Queries'"

"Note on subclassing:  The query itself is made available to
the method that unifies predicate symbols
(unifyUsingEnv:withPredicate:usingEnv:fromQuery).  The purpose in doing
this was to be able to pass data directly to the unification algorithm,
so that built-in predicates could have access to and pass back objects
directly.  A good example is the errorStream, which allows the building
up of an error message as a logic program executes.  Other, application
specific, predicates can use this mechanism by subclassing class
AlfQuery, adding fields, and then writing new built-in predicates that
can access these new fields."


! AlfQuery methodsFor: 'accessing'

!
queryClause
        ^ queryClause.

!
env
        ^ env.

!
pgm
        ^alfPgm

!
errorStream
        ^errorStream

! AlfQuery methodsFor: 'updating'

!
queryClause: aClause
        ^ queryClause <- aClause.

!
env: anEnv
        ^ env <- anEnv.

!
postError: anError
        anError printOn: errorStream.

!
ruleLinkToPush: aClauseLink
        ruleLinkToPush <- aClauseLink.

!
pushRule: aRule withEnv: anEnv
        "add the tail of the aRule to the goals to be proved in
        the goal stack, using anEnv with these new goals"
        |newGoal|

        newGoal <- goalStack addFirst:
                (GoalStackLink withRule: aRule usingEnv: anEnv
                        atSeq: nextGoalSeq).
        nextGoalSeq <- nextGoalSeq + 1.
        ^newGoal.
```

```
!
cut
        "The first goal on the goalStack is an AlfCut Predicate.
        Remove all alternatives in the choice points upto and including
        that designated by the AlfCut goal itself."
        |cutPoint thisChoice thisBind|

        cutPoint <- goalStack first cutPoint.
        [true] whileTrue: [choicePointStack first ifNil: [
                                currentFreezePt <- 0.
                                ^self].
                thisChoice <- choicePointStack removeFirst choicePoint.
                self setFreezePtAfterRemoving: thisChoice.
                totalChoicePoints <- totalChoicePoints - 1.
                thisChoice firstGoalStackLink: nil. "This is not
                                strictly necessary, but it allows
                                the garbage collector to discard
                                the goal stack associated with this
                                choice point sooner than otherwise."

                thisChoice == cutPoint ifTrue: [
                        counting ifTrue: [self debugger:
                                                'CUT!! tot ChoicePoints: '
                                                withObj: totalChoicePoints
                                                withEnv: nil
                                                atPosition: #cut].
                        ^self].
                ]

!
alfPgm: aPgm
        alfPgm <- aPgm.

!
traceOn: aLevel
        traceLevel <- aLevel.

!
traceOff
        traceLevel <- 0.

!
countingOn
        counting <- true.

!
countingOff
        counting <- false.

!
setFreezePtAfterRemoving: aChoicePoint

        "If the CP we have just removed is the one that has frozen
        the stack at its highest point, we reset the freezePt to
        that which the top CP on the stack is freezing"

        aChoicePoint iFreeze == currentFreezePt ifTrue: [
                choicePointStack first isNil ifTrue: [
                        currentFreezePt <- 0]
                ifFalse: [ currentFreezePt <- choicePointStack first
                        choicePoint iFreeze]].

!
setFreezePtAfterAdding: aChoicePoint
        |latestFreeze|

        latestFreeze <- aChoicePoint iFreeze.
        latestFreeze > currentFreezePt ifTrue: [ currentFreezePt <-
                                                        latestFreeze].

!
init
        "initialize the query"
        |aChoice ruleList firstAtom newGoal|

        env <- queryClause newEnv.
        choicePointStack <-  Stack new.
        goalStack <-  GoalStack new.
        totalChoicePoints <- 0.
        currentFreezePt <- 0. "Nothing is frozen yet"
        nextGoalSeq <- 1.
        trail <- Trail new.

        errorStream <- ReadWriteStream on: (String new: 64).
        newGoal <- self pushRule: queryClause withEnv: env.

        "set up first choicePoint to be the query itself"
        firstAtom <- queryClause tail first atom.
        ruleList <- alfPgm rulesForCheckBuiltIn: firstAtom.

        ruleList isEmpty ifTrue: [^#fail].  "no rules"

        newGoal ruleArray: nil.  "Query clause does not cache the
                                rules that could prove the atoms in
                                the query, so the ruleArray for this
                                goalStackLink element is nil.
                                When the goals come from rules in
                                the AlfProgram, we will see that we
                                cache the rules that can prove the
                                tail atoms of the rule in process."

        aChoice <- ChoicePoint tryRule: (ruleList first)
                        toProve: (goalStack first) startingTrail:
                                        (trail first).

        totalChoicePoints <- totalChoicePoints + 1.

                "the rule to try is obtained from the first rule in
                the list of rules kept in the class that is the same as
                the class of the first goal in the tail of the query."

        choicePointStack addFirst: (ChoicePointLink with: aChoice).
        traceLevel <- 0.
        traceFormat <- 0.
        self countingOff.

! AlfQuery methodsFor: 'solving'

"Although not the Smalltalk way, we have avoided recursive methods
in order to save stack space, in the methodsFor solving"

!
nextAnswer
        "solve the query by installing (and then removing) the first choice
        point. Retry if we fail, until we run out of choice points"
```

```
|nextChoice answer nextRule ruleForNextChoice |

errorStream <- ReadWriteStream on: (String new: 64).

[true] whileTrue:[ choicePointStack isEmpty ifTrue:[^#fail].
        nextChoice <- choicePointStack first choicePoint.

        "undo the bindings made by previous choice taken"
        trail reSetTo: (nextChoice undoBindings).

        nextRule <- nextChoice nextRuleToTry.

        nextRule isNil ifTrue: ["this choice point was for
                                    the cut only "
                    self setFreezePtAfterRemoving:
                            (choicePointStack removeFirst
                                    choicePoint).
                    totalChoicePoints <- totalChoicePoints - 1.]

                ifFalse:[
                    "restore the goal stack for this choice point"
                    goalStack firstLink: nextChoice
                                    firstGoalStackLink.
                    answer <- self solveChoice: nextChoice.
                    #fail -- answer ifFalse:[^answer].

                    0 = traceLevel ifFalse: [self debugger:
                            '    backtracking'
                            withObj: nil withEnv: nil
                            atPosition: #backtracking]
                    ]
        ]
!
solveChoice: thisChoice
        "solve all goals on stack, starting with the first one,
        and using the rule pointed to by thisChoice, until all goals
        are gone from the stack or until we fail to prove one.
        The parm thisChoice represents the set of rules that
        potentially can prove the first atom in the goal stack
        that is pointed to by thisChoice. As we discover alternatives
        to prove subsequent goals in the goal stack, we establish
        other choice points. This method only puts choicepoints on
        the stack, it does not remove them. However, it can update
        the existing choice point instead of making a new one."

        |tailToProve ruleToTry  ruleLinkToTry
        atomToProve goalEnv ruleEnv answer
        nextRule done ruleHead newChoice ruleList choiceToUpdate
        choiceToCut needChoice newGoal trailMarker |

        ruleLinkToTry <- thisChoice nextRuleToTry.
        tailToProve <- goalStack first.
        atomToProve <- tailToProve nextAtomToProve atom.
        choiceToUpdate <- thisChoice.  "We set choiceToUpdate to nil
                to mean that we are no longer working on the first
                atom in the goalStack that belongs to the choicePoint
                passed in."
        choiceToCut <- thisChoice.  "This is the choice point to
                        cut to if we encounter a cut in the tail of
                        the next rule used to prove the first goal
                        on the stack."

        [true] whileTrue:[

        "We stay in this loop for so long as we can prove
        atoms on the goal stack.  We add to the atoms on
        the goal stack when we find a rule whose head unifies
        with the atom we are proving (the tail of this rule
        is pushed to the goal stack).  When a rule is found
        that unifies with the current atomToProve, we must
        create a choicePoint to be able to store the next
        alternative rule that might match with the current
        atomToProve, and provide a place to cut back to if the
        rule that we unified with has any Cuts in its tail.  If
        we fail to prove some atom on the goal stack, we leave
        this loop, and the method, and expect to be recalled
        with a new choice point (backtracking)"

        goalEnv <- tailToProve env.
        done <- false.

        0 -- traceLevel ifFalse:[self debugger:
                'trying to prove goal: '
                withObj: atomToProve withEnv: goalEnv
                atPosition: #goalProving].

        "search for rule to unify with first goal to prove"
        [done] whileFalse: [
                ruleLinkToTry ifNil: [
                        "We are out of rules for this choice
                        point.  We remove it, and try the
                        next one."
                        choiceToUpdate notNil ifTrue:
                                "No rules worked in choice point
                                that was passed in."
                                [self setFreezePtAfterRemoving:
                                        (choicePointStack removeFirst
                                          choicePoint).
                                totalChoicePoints <-
                                        totalChoicePoints - 1].
                        ^#fail].

                ruleToTry <- ruleLinkToTry clause.
                ruleHead <- ruleToTry head.
                ruleEnv <- ruleToTry newEnv.

                 0 = traceLevel ifFalse: [
                        self debugger: '      using rule: '
                        withObj: ruleLinkToTry withEnv: ruleEnv
                        atPosition: #ruleMatching].


                "The built-in predicates depend on the
                atomToProve being the receiver of the
                unification message, and the ruleHead
                being the parameter"

                trailMarker <- trail first.
                ruleLinkToPush <- ruleLinkToTry.  "This can be
                                overridden in the unification
                                message"

                answer <- atomToProve unifyUsingEnv: goalEnv
                        withPredicate: ruleHead usingEnv: ruleEnv
                        trailing: trail fromQuery: self.
                #fail -- answer ifTrue: [

                                0 -- traceLevel ifFalse:
```

```
                        [self debugger:
                        '    head did not unify'
                        withObj: nil
                        withEnv: nil
                        atPosition: #unifyFail].

                    "try and get next rule"
                    ruleLinkToTry <- ruleLinkToTry nextLink]

                ifFalse: [done <- true "we unified"].
        ].

"we were successful in unifying the head of the
rule with the atom to prove. "

0 -- traceLevel ifFalse: [self debugger:
        '    head *did* unify:' withObj: atomToProve
                    withEnv: goalEnv
                    atPosition: #unifySucceed].

"We must mark all LV's in the rule as local, so that
any ones that remain unbound will be subsequently
unbound on backtracking, when they are bound later
upon unifying with a rule head"

ruleEnv do: [:each| each isLocal: false].

nextRule <- ruleLinkToTry nextLink.  "If nextRule is not
                nil, this means there is (potentially)
                another way to prove the goal."

ruleToTry <- ruleLinkToPush clause.  "The unification may
                have given us a new rule (tail) to
                be processing.  This happens in the
                AlfCall predicate"

choiceToUpdate notNil ifTrue: [
                "We update the choice point passed in
                to reflect the next rule in the list,
                if any.
                Note that ifFreeze in the current CP
                is valid for the updated CP"

                thisChoice nextRuleToTry: nextRule.
                nextRule isNil ifFalse: [self
                        setFreezePtAfterAdding: thisChoice].
                choiceToUpdate <- nil]

        ifFalse: ["we are no longer on the first atom
                of the choice point passed in, and
                are proving some subsequent atom.
                If the new rule has no AlfCut in it,
                and if there are no alternative rules
                with which to prove the atom we are on,
                then we need not create a choicePoint.
                If the rule has a cut in it, we must
                create a choice point in order to have
                a place to backtrack to when we process
                the cut."

                needChoice <- true.
                choicePointStack first isNil
                        ifFalse:[nextRule ifNil:
                                [ruleToTry hasCut ifFalse:
                                [needChoice <- false]]].

                needChoice ifTrue: [
                        "We must construct new choicePoint"

                        nextRule notNil ifTrue: [newChoice <-
                                ChoicePoint tryRule: nextRule
                                toProve: tailToProve
                                startingTrail: trailMarker]
                        ifFalse: [newChoice <-
                                ChoicePoint tryRule: nextRule
                                toProve: nil startingTrail:
                                trailMarker].
                        totalChoicePoints <-
                                totalChoicePoints + 1.
                        counting ifTrue: [self debugger:
                                'tot ChoicePoints: '
                                withObj: totalChoicePoints
                                withEnv: goalEnv
                                atPosition: #addChoice].
                        choicePointStack addFirst:
                            ( ChoicePointLink with:newChoice).
                        self setFreezePtAfterAdding:
                                                newChoice.

                        choiceToCut <- newChoice.  "We
                                eliminate alternatives
                                up to and including
                                this one, if we
                                encounter a cut as a
                                goal in the tail of the
                                rule whose head we just
                                unified with.  This cut
                                point is saved in the
                                goals pushed on our
                                stack, that are in the
                                tail of the current
                                rule."
                        ]
                ].

"remove the goal we have resolved"
goalStack popFreezing: currentFreezePt usingSeq: nextGoalSeq.
nextGoalSeq <- nextGoalSeq + 1.

"if the rule found has a tail, put its atoms on the stack
to prove"

ruleToTry tail isEmpty
        ifFalse: [ newGoal <- self
                        pushRule: ruleToTry
                        withEnv: ruleEnv.
                newGoal ruleArray: (ruleLinkToPush ruleArray).
                goalStack first cutPoint: choiceToCut]

        ifTrue: [0 -- traceLevel ifFalse:[self debugger:
                        'goal proved!: '
                        withObj: atomToProve
                        withEnv: goalEnv
                        atPosition: #goalProved]
                ].

goalStack isEmpty ifTrue:[^self "return the query
```

```
                                itself, as we have succeeded.
                                The env of the query will
                                contain the bindings of the
                                variables in the query
                                itself"].

        0 -- traceLevel ifFalse:[self goalStackPrint:
                'goals to prove: '
                withGoalStack: goalStack
                atPosition: #goalsToProve].

        tailToProve <- goalStack first.
        atomToProve <- tailToProve nextAtomToProve atom.

        "This new atom to prove will require us to search for
        a rule that could potentially unify.  We test for
        unification at the top of this loop.  If the rule
        does unify, we must set up a new choice point for
        this new atom, in order to mark a potential cut point,
        and hold alternative rules to prove this same atom.
        All this is done after we branch back to the top of
        this loop."

        nil -- tailToProve ruleArray ifTrue: [ruleList <- alfPgm
                                rulesForCheckBuiltin: atomToProve]
                ifFalse: [ruleList <- tailToProve ruleArray at: (
                        tailToProve nextAtomToProve seqNumber)].

        ruleList isEmpty ifTrue: [ruleLinkToTry <- ruleToTry <- nil]
                                                        "no rules"
                        ifFalse: [ruleLinkToTry <- ruleList first.
                                ruleToTry <- ruleLinkToTry clause].
        ].

!
printAnswer
    "This method assumes that an answer to the query has been
    found.  It creates a string that are the variables and values"
    |aStream|

    aStream <- WriteStream on: (String new: 16).
    env do: [:each |
            each printOn: aStream.
            aStream nl.
            ].
    ^aStream contents.

! AlfQuery methodsFor: 'debuggerActions'

!
debugger: msg withObj: anObject withEnv: anEnv atPosition: aPosition

    |aStream|

    aStream <- WriteStream on:(String new:16).
    aStream nextPutAll: msg.

    (aPosition = #addChoice or: [aPosition = #cut]) ifTrue: [
            "anObject printOn: aStream.
            aStream contents print.
            Stop stop.
            ^nil].

    aPosition = #goalProving ifTrue: [
            "(anObject dereferenceCopyUsingEnv: anEnv) printOn: aStream."
            anObject shortPrintOn:  aStream.
            aStream contents print.
            Stop stop.
            ^nil].

    aPosition = #ruleMatching ifTrue: [
            "Object passed in is a clause link"
            traceFormat = 0 ifTrue: [
                    anObject alfPgm name asString printOn: aStream.
                    aStream nextPutAll: ' / '.
                    anObject number asString printOn: aStream.
                    aStream contents print.
                    Stop stop.
                    ^nil]].

    anObject notNil ifTrue:[
            anObject shortPrintOn: aStream.
            anEnv notNil ifTrue: ( aStream nextPutAll:
                                            ' E('.
                                    aStream nextPutAll:
                                            (anEnv oopId printString).
                                    aStream nextPut: $)].
                    Stop stop.

                    ].

    aStream contents print.

!
goalStackPrint: msg withGoalStack: aStack  atPosition: aPosition

    |aStream|

    aStream <- WriteStream on:(String new:16).
    aStream nextPutAll: msg.

    aStack notNil ifTrue:[ aStack shortPrintOn: aStream.].

    aStream contents print.

! AlfQuery class methodsFor: 'setting up a new query'

!
newQuery: queryClause forPgm: anAlfPgm

    |aQuery aChoice|

    aQuery <- super new.
    aQuery queryClause: queryClause.
    aQuery alfPgm: anAlfPgm.
    aQuery init.
    ^aQuery.
!
newQuery: queryClause forPgmNamed: aPgmName

    |alfPgm|

    alfPgm <- AlfProgram find: aPgmName.
    alfPgm ifNil: [self error: ('program not found: ', aPgmName asString)].

    ^self newQuery: queryClause forPgm: alfPgm.
```

AlfQuery.st Wed Sep 28 11:15:52 1988

```
!
"Copyright 1988 Eastman Kodak Company.  All rights reserved."
Class AlfSend0 :Predicate    |
        receiver                  "<Object> if a LogicVariable, it
                                  must be bound"
        answer                    "<Object> if unbound, we
                                  bind it via unification; else we
                                  attempt to match it via a
                                  Smalltalk = to the answer return
                                  by the message send"
        selector                  "<Object> if a LogicVariable, it must
                                  be bound to a Symbol"

          |

:       poolDictionaries: ''"
•       category: 'Logic Programming'"


"AlfSend0 comment: 'I implement a predicate that sends a message
            with no parameters.'"

! AlfSend0 methodsFor: 'updating'

!
receiver: aReceiver
        receiver <- aReceiver.

!
answer: anAnswer
        answer <- anAnswer.

!
selector: aSelector
        selector <- aSelector.


! AlfSend0 methodsFor: 'unification'

!
unifyUsingEnv:myEnv  withPredicate: ruleHead usingEnv: predEnv
            trailing: aTrail fromQuery: anAlfQuery

        "Our assumption is that self is a term in an atomToProve, and
        ruleHead is a term in a goal to prove.  We ignore the rule
        head, since this was set up only to cause the unification
        method to be invoked.  We would not be here unless
        atomToProve was of class AlfSend"

        |rcvr ansDeref sel realAns undoBindings ansBound|

        rcvr <- receiver.
        ansDeref <- answer.
        sel <- selector.
        ansBound <- true.

        LogicVariable == answer class ifTrue:
                [ansDeref <- ansDeref dereference: myEnv.
                ansDeref bound ifTrue:[ansDeref <-
                                ansDeref binding]
                        ifFalse:[ undoBindings <- BindingList with: ansDeref.
                                ansBound <- false]
                ].

        "It might seem that we should fail if the receiver is an unbound
        logic variable.  However, logic variables themselves understand
        certain messages (like bindTo: withEnv:), and we do send such
        via rules for the AlfCompiler."

        "If the receiver, answer, or parameter is a bound logic variable,
        we should probably be using the deferenceCopy of that object,
        since the binding itself could also contain logic variables,
        and the method of the message send to be executed is not likely
        to understand lv's.  Sometimes, however, as in the compiler, we
        do not wish to dereference the objects.  It is up to the calling
        program to either pass objects with unbound lv's, or to
        dereference these, or to make up new AlfSend classes that
        can make dereference copies of the appropriate objects before
        doing the message send."

        LogicVariable == rcvr class ifTrue:
                [rcvr <- rcvr dereference: myEnv.
                rcvr bound ifTrue: [rcvr <-
                        rcvr binding]].

        LogicVariable == sel class ifTrue:
                [sel <- sel dereference: myEnv.
                sel bound ifFalse:[^#fail]. "sel must be bound"
                sel <- sel binding].

        Symbol == sel class ifFalse: [^#fail].

        realAns <- self sendAMsgTo: rcvr usingSel: sel env: myEnv.

        "Things are tricky here: if the receiver is a logic variable,
        and the message binds the reciever, and the receiver is
        returned as the answer, we must deal with this case.  This
        case occurs in the Alf compiler when we send the message
        bindTo:withEnv: to an unbound logic variable, in an attempt
        to bind it to parml.  AnsBound represents the state of the
        LV before the message was sent."

        ansBound ifFalse: [ansDeref bound ifFalse:
                                [aTrail addFirst: (Binding saveState:
                                                ansDeref).
                                ansDeref bindTo: realAns withEnv: nil.
                                        ansDeref <- realAns]
                        ifTrue: [ansDeref <- realAns]].

        #fail == realAns ifTrue: [^#fail].  "This is how one can cause
                                backtracking from the AlfSend clause.
                                If the msg send does not return #fail,
                                we will never fail the AlfSend clause."

        ansDeref = realAns ifTrue:[^nil].
        ^#fail.


!
sendAMsgTo: rcvr usingSel: sel env: myEnv

        ^ rcvr perform: sel.

! AlfSend0 class methodsFor: 'creation'

!
newWithRcvr: aReceiver answer: anAnswer selector: aSelector
        |newSend|
        newSend <- self new.
```

```
        newSend receiver: aReceiver.
        newSend answer: anAnswer.
        newSend selector: aSelector.
        ^newSend.
!

Class AlfSend1 :AlfSend0   |
                parm1

          |
[
"       poolDictionaries: ''"
"       category: 'Logic Programming'"

"AlfSend1 comment: 'I implement a predicate that sends a message
                with one parameter.'"

! AlfSend1 methodsFor: 'updating'

!
parm1: aParm
        parm1 <- aParm.

!
sendAMsgTo: rcvr usingSel: sel env: myEnv

        |actParm1|

        actParm1 <- parm1.

        "It might seem that we should insist on the logic variable
        parameter being bound.  However, the AlfCompiler assumes
        that we can assign an unbound logic variable to an instance
        variable of the Send1 message, so we can not do this audit"

        LogicVariable == actParm1 class ifTrue:
                [actParm1 <- actParm1 dereference: myEnv.
                actParm1 bound ifTrue:[actParm1 <- actParm1
                                binding]
                ].

        ^ rcvr perform: sel with: actParm1.

! AlfSend1 class methodsFor: 'creation'

!
newWithRcvr: aReceiver answer: anAnswer selector: aSelector parm1: aParm
        |newSend|
        newSend <- super newWithRcvr: aReceiver answer: anAnswer selector:
                                aSelector.
        newSend parm1: aParm.
        ^newSend.
!

Class AlfSend2 :AlfSend1   |
                parm2

          |
[
"       poolDictionaries: ''"
"       category: 'Logic Programming'"

"AlfSend2 comment: 'I implement a predicate that sends a message
                with two parameters.'"

! AlfSend2 methodsFor: 'updating'

!
parm2: aParm
        parm2 <- aParm.

!
sendAMsgTo: rcvr usingSel: sel env: myEnv

        |actParm1 actParm2|

        actParm1 <- parm1.
        LogicVariable == actParm1 class ifTrue:
                [actParm1 <- actParm1 dereference: myEnv.
                actParm1 bound ifTrue:[actParm1 <- actParm1
                                binding]
                ].

        actParm2 <- parm2.
        LogicVariable == actParm2 class ifTrue:
                [actParm2 <- actParm2 dereference: myEnv.
                actParm2 bound ifTrue:[actParm2 <- actParm2
                                binding]
                ].

        ^ rcvr perform: sel with: actParm1 with: actParm2.

! AlfSend2 class methodsFor: 'creation'

!
newWithRcvr: aReceiver answer: anAnswer selector: aSelector parm1: aParm1
                parm2: aParm2

        |newSend|
        newSend <- super newWithRcvr: aReceiver answer: anAnswer selector:
                                aSelector parm1: aParm1.
        newSend parm2: aParm2.
        ^newSend.
!

Class AlfSend3 :AlfSend2   |
                parm3

          |
[
"       poolDictionaries: ''"
"       category: 'Logic Programming'"

"AlfSend3 comment: 'I implement a predicate that sends a message
                with three parameters.'"

! AlfSend3 methodsFor: 'updating'

!
parm3: aParm
        parm3 <- aParm.

!
```

```
        |actParm1 actParm2 actParm3|

        actParm1 <- parm1.
        LogicVariable == actParm1 class ifTrue:
                [actParm1 <- actParm1 dereference: myEnv.
                actParm1 bound ifTrue:[ actParm1 <- actParm1
                                binding]
                ].

        actParm2 <- parm2.
        LogicVariable == actParm2 class ifTrue:
                [actParm2 <- actParm2 dereference: myEnv.
                actParm2 bound ifTrue:[actParm2 <- actParm2
                                binding]
                ].

        actParm3 <- parm3.
        LogicVariable == actParm3 class ifTrue:
                [actParm3 <- actParm3 dereference: myEnv.
                actParm3 bound ifTrue:[actParm3 <- actParm3
                                binding]
                ].

        ^ rcvr perform: sel with: actParm1 with: actParm2 with: actParm3.

! AlfSend3 class methodsFor: 'creation'

!
newWithRcvr: aReceiver answer: anAnswer selector: aSelector parm1: aParm1
                parm2: aParm2 parm3: aParm3

        |newSend|
        newSend <- super newWithRcvr: aReceiver answer: anAnswer selector:
                                aSelector parm1: aParm1 parm2: aParm2.
        newSend parm3: aParm3.
        ^newSend.
!

Class AlfSend1DerefParm :AlfSend1   |

          |
[
"       poolDictionaries: ''"
"       category: 'Logic Programming'"

"AlfSend1DerefParm comment: 'I implement a predicate that sends a message
                with one parameter, which must be dereferenced before
                executing the message send.'"

! AlfSend1DerefParm methodsFor: 'updating'

!
sendAMsgTo: rcvr usingSel: sel env: myEnv

        |actParm1|

        actParm1 <- parm1.

        LogicVariable == actParm1 class ifTrue:
                [actParm1 <- actParm1 dereference: myEnv.
                actParm1 bound ifTrue:[actParm1 <- actParm1
                ].

        ^ rcvr perform: sel with: actParm1.

!

Class AlfSend2DerefParm :AlfSend2 |

          |
[
"       poolDictionaries: ''"
"       category: 'Logic Programming'"

"AlfSend2DerefParm comment: 'I implement a predicate that sends a message
                with two parameters, that must be dereferenced.'"

! AlfSend2DerefParm methodsFor: 'updating'

!
sendAMsgTo: rcvr usingSel: sel env: myEnv

        |actParm1 actParm2|

        actParm1 <- parm1.
        LogicVariable == actParm1 class ifTrue:
                [actParm1 <- actParm1 dereference: myEnv.
                actParm1 bound ifTrue:[actParm1 <- actParm1
                        dereferenceCopyUsingEnv: myEnv]
                ].

        actParm2 <- parm2.
        LogicVariable == actParm2 class ifTrue:
                [actParm2 <- actParm2 dereference: myEnv.
                actParm2 bound ifTrue:[actParm2 <- actParm2
                        dereferenceCopyUsingEnv: myEnv]
                ].

        ^ rcvr perform: sel with: actParm1 with: actParm2.
!
```

```
"Copyright 1988 Eastman Kodak Company.  All rights reserved."

Class AlfSplitL :AlfSplitR   |

        |
|
"       poolDictionaries: ''"
"       category: 'Logic Programming'"


"AlfSplitR comment: 'I implement the splitting an AlfList at an
element, placing the element in the leftList.'"


|

 "Copyright 1988 Eastman Kodak Company.  All rights reserved."

 Class AlfSplitList :Object   |
        leftList                "<AlfList>"
        rightList               "<AlfList>"

        |
 |
 "      poolDictionaries: ''"
 "      category: 'Logic Programming'"


 "AlfSplitList comment: 'I represent an AlfList that has been split into
 two other lists.'"


 ! AlfSplitList methodsFor: 'updating'

 !
rightList: aList
        rightList <- aList.
!
leftList: aList
        leftList <- aList.

! AlfSplitList class  methodsFor: 'creating'


!
newLL: aLeftList rightL: aRightList
        |newSplit|

        newSplit <- super new.
        newSplit leftList: aLeftList.
        newSplit rightList: aRightList.
        ^newSplit.

!
```

"Copyright 1988 Eastman Kodak Company. All rights reserved."

```
Class AlfSplitR :Predicate    |
        listToSplit             "<AlfList>"
        splittingElement
        result                  "<AlfSplitList>"

          |
!
"       poolDictionaries: ''"
"       category: 'Logic Programming'"


"AlfSplitR comment: 'I implement the splitting an AlfList at an
element, placing the element in the rightList.'"


! AlfSplitR methodsFor: 'updating'

!
listToSplit: aList
        listToSplit <- aList.

!
splittingElement: anElement
        splittingElement <- anElement.

!
result: aSplitList
        result <- aSplitList.

! AlfSplitR class  methodsFor: 'creating'


!
newToSplit: aList splitAt: anElement result: aSplitList
        |newSplit|

        newSplit <- super new.
        newSplit listToSplit: aList.
        newSplit splittingElement: anElement.
        newSplit result: aSplitList.
        ^newSplit.

!
```

"Copyright 1988 Eastman Kodak Company. All rights reserved."

```
Class AlfToken :Object  |
        type            "<symbol> indicating the token type"
        tokenValue      "<various> the value from the lexer"
        lexemeStart     "<Integer> spot in input string where
                        the lexeme that was translated to this
                        token starts"
        lexemeEnd       "<Integer>"

    |
|
"       poolDictionaries: ''"
"       category: 'Logic Programming'"


"AlfToken comment: 'I implement the tokens that are output from the
        AlfLexer, which tokenizes strings in the Alf language.'"

! AlfToken methodsFor: 'accessing '

!
lexemeStart
        ^lexemeStart

!
lexemeEnd
        ^lexemeEnd

! AlfToken methodsFor: 'updating '

!
type: aType
        type <- aType.

!
tokenValue: aValue
        tokenValue <- aValue.

!
setStart: start end: end
        lexemeStart <- start.
        lexemeEnd <- end.

! AlfToken class methodsFor: 'creating tokens'

!
type: aType tokenValue: aValue start: aStart end: anEnd

        |newToken|

        newToken <- super new.
        newToken tokenValue: aValue.
        newToken type: aType.
        newToken setStart: aStart end: anEnd.
        ^newToken.
!
```

```
        atom                  "<Predicate>"
        seqNumber             "<Integer>, starts with 1, to number
                              the atoms in the chain"

        |
|
"       poolDictionaries: ''"
"       category: 'Logic Programming'"

"AtomLink comment: 'I am a link in a list of atoms.  The list could represent
a query or the tail of some rule."


| AtomLink methodsFor: 'accessing'

|
atom
        ^atom
|
seqNumber
        ^seqNumber

| AtomLink methodsFor: 'updating'

|
atom: aPredicate
        atom <- aPredicate.

|
seqNumber: anInt
        seqNumber <- anInt

| AtomLink class methodsFor: 'creating'

|
with: aPredicate seq: aNumber
        |newLink |

        newLink <- self new.
        newLink atom: aPredicate.
        newLink seqNumber: aNumber.
        ^newLink.

|
```

```
"Copyright 1988 Eastman Kodak Company.  All rights reserved."

Class Binding :Link |
        logicVariable
        oldBound
        oldBinding

          |
[
"       poolDictionaries: ''"
"       category: 'Logic Programming'"


"Binding comment: 'I am an entry in a list of the former state of
logic variables.  Here is a difference with normal Prolog:  Normal Prolog
need only keep track of which variables were bound, and then unbinds
them on backtracking.  Because of the type lattice, we can re-bind a
variable that is already bound, and thus must keep the old binding around
in order to backtrack."


! Binding methodsFor: 'updating '

!
saveState: aLogicVar
        logicVariable <- aLogicVar.
        oldBound <- aLogicVar bound.
        oldBinding <- aLogicVar binding.

! Binding methodsFor: 'unbinding '

!
reSet
        "Put the variable back to its old value"

        logicVariable reSet:oldBinding bound:oldBound.

! Binding class methodsFor: 'creating '

!
saveState: aLogicVariable
        |newBinding|
        newBinding <- self new.
        newBinding saveState: aLogicVariable.
        ^newBinding.
!
```

```
Class ChoicePoint :Link |

        firstGoalStackLink          "<GoalStackLink> A new
                                    goal stack (set of goals)
                                    for this choice
                                    point is constructed by making this
                                    the first link in the stack.
                                    Nil means that there is no
                                    remaining choice:  the record
                                    exists only to be able to
                                    execute the undo bindings."

        undoBindings                "<Binding> this points into the
                                    trail.  We must undo all bindings
                                    upto, but not including this
                                    link."

        nextRuleToTry               "<ClauseLink> element in the
                                    list of clauses.  The choice
                                    point begins by trying to unify
                                    the head of the rule in the
                                    nextRuleToTry against the first atom
                                    in the new goalStack. Nil means
                                    there are no more rules to try."

        iFreeze                     "<Integer> this is the goal
                                    seqNo that this CP points to, and
                                    hence this CP is freezing the
                                    stack for all goals with seqNo
                                    <= to this iFreeze"

    |
!
"     poolDictionaries: ''"
"     category: 'Logic Programming'"

"ChoicePoint comment: 'I provide a way to take another branch in the
proof tree for a query.  At every choice point, a new ChoicePoint is
added to the query's list of choice points, at the top of the list.
The choice point is taken by popping the current one off the list,
and resetting the queries goalStack to the one pointed to by
the choice point.  Choice points are set up after a goal is unified with
the head of a rule, and there is yet another rule than can be tried
against the same goal.  We place this potential rule in the nextRuleToTry,
and the bindings that we did for the current unification on the trail,
after the point indicated by the undoBindings.  The firstGoalStackLink
is that at the head of the current goalStack, and is for the goal that
we have just unified against.'"

! ChoicePoint methodsFor: 'accessing'

!
firstGoalStackLink
        ^firstGoalStackLink

!
undoBindings
        ^undoBindings

!
nextRuleToTry
        ^nextRuleToTry

!
iFreeze
        ^iFreeze

! ChoicePoint methodsFor: 'updating'

!
firstGoalStackLink: aStack
        ^firstGoalStackLink<- aStack

!
undoBindings: bindings
        undoBindings <- bindings.

!
nextRuleToTry: aClauseLink
        nextRuleToTry <- aClauseLink.

!
iFreeze: aSeqNo
        iFreeze <- aSeqNo

! ChoicePoint class methodsFor: 'creating'

!
tryRule: aClauseLink toProve:aGoalStackLink startingTrail: aTrailMarker

        "Make a choice point that tries to unify the first atom in the
        aGoalStackLink with the head of aRule"

        |newChoice seqNo |

        newChoice <- super new.
        newChoice firstGoalStackLink: aGoalStackLink.
        newChoice nextRuleToTry: aClauseLink.
        newChoice undoBindings: aTrailMarker.
        seqNo <- 0.
        aGoalStackLink notNil ifTrue: [seqNo <- aGoalStackLink seqNo].
        newChoice iFreeze: seqNo.
        ^newChoice.
!
```

```
"Copyright 1988 Eastman Kodak Company.  All rights reserved."
Class ChoicePointLink :Link|

          choicePoint           "<ChoicePoint>"

          |
[
"       poolDictionaries: ''"
"       category: 'Logic Programming'"


"ChoicePointLink comment: 'I am a link in a list of choicePoints. "


! ChoicePointLink methodsFor: 'accessing'

!
choicePoint
        ^choicePoint

! ChoicePointLink methodsFor: 'updating'

!
choicePoint: aChoicePoint
        choicePoint <- aChoicePoint.

! ChoicePointLink class methodsFor: 'creating'

!
with: aChoicePoint
        |newLink |

        newLink <- self new.
        newLink choicePoint: aChoicePoint.
        ^newLink.

!
```

```
Class Clause :Object   |
        head            "<Predicate>"
        tail            "<Stack>"
        copyEnv         "<Array>: we can copy this
                         environment to obtain a
                         new one when invoking this
                         clause. This saves execution
                         time when a new environment is
                         required when the clause is
                         invoked"
        envSize         "size of a copied environment"
        comment         "<String> to help debug"
        hasCut          "<Boolean> true means there is
                        a Cut in the tail of this
                        clause"
        numberTailAtoms "<Intger> number of atoms in the tail"
        safeLV          "<Array> an element corr. to the
                        env for this clause will be true
                        if that LV is safe to trim from
                        the env upon clause completion"

    |
!
"       poolDictionaries: ''"
"       category: 'Logic Programming'"

"Clause comment: 'I implement Horn Clauses (i.e. rules).  '"


! Clause methodsFor: 'accessing'

!
head
        ^ head.

!
tail
        ^ tail.

!
copyEnv
        ^copyEnv

!
comment
        ^comment

!
hasCut
        ^hasCut

!
numberTailAtoms
        ^numberTailAtoms.

! Clause methodsFor: 'obtaining a new environment'

!
newEnv
        |anEnv anLV|

        "Get a new environment.  This is a set of Logic variables
        in an Array.  The variables in the clause point to indexes in
        this new set via the envIndex field in the logic variables.
        (We call a logic variable that points to another one through the
        environment, an 'environment logic variable').  Use of
        environments allow us to invoke the same rule multiple times
        (perhaps recursively), and use the same clause to point to the
        logic variables that are being used for that invocation.

        Note that if a logicVariable in the clause is  bound, this means
        that the variable is typed, and it is pointing (via 'binding')
        to an object that itself (almost certainly) contains other logic
        variables.  The copy of such is set to point to the exact same
        object that that in the clause points to, but since any logic
        variable there-in will be dereferenced by the environment,
        this is exactly what we want:  we share the types ('structure
        sharing') among all the copies of the logic variables needed
        to execute the program.

        Also note that because of the way we dereference logic variables
        (see class LogicVariable), we never bind environment logic
        variables to other environment logic variables, but only to
        'pure' lv's, that need not go through an environment to be
        dereferenced."

        anEnv <- Array new:(envSize).
        (1 to: envSize) do: [:index | anLV <- anEnv at:index put:
                        ((copyEnv at:index) shallowCopy).
                        anLV bound ifTrue: [anLV bindersEnv: anEnv]].
        ^anEnv.

! Clause methodsFor: 'updating an environment '

!
nilSafeLVIn: anEnv
        (1 to: (anEnv size)) do: [:each| (safeLV at: each) ifTrue:
                        [anEnv at: each put: nil]].

! Clause methodsFor: 'updating'

!
head: aHead
        head <- aHead.

!
comment: aComment
        comment <- aComment.

!
hasCut: trueOrFalse
        hasCut <- trueOrFalse.
!
safeLV: anArray
        safeLV <- anArray.

!
addTail: anAtom
        "add aClause to the tail of this clause"

        numberTailAtoms <- numberTailAtoms + 1.
        tail addLast: (AtomLink with:anAtom seq: numberTailAtoms).
```

```
        AlfCut -- anAtom class ifTrue: [hasCut <- true].

!
numberTailAtoms: anInt
        numberTailAtoms <- anInt.
!
replaceLexLogicVars: anObj
        "we replace, recursively, any LexLogicVar in the instance
        variables of anObj with the LogicVariable it is bound to.
        The AlfLexer uses LexLogicVars instead of LogicVars in order
        that the compiler be able to treat LogicVars simply as objects,
        without any dereferencing.  Hence when the clause is output
        from the compiler, we need to replace these pseudo-logicVars
        with real ones.  The AlfLexer has 'bound' the pseudo lv's
        to the ones to use."

        |instVar indexVar|

        (1 to: (anObj class instSize)) do: [:index |
                instVar <- anObj instVarAt: index.
                LexLogicVariable -- instVar class ifTrue:
                        [anObj instVarAt: index put: (instVar binding)].
                self replaceLexLogicVars: instVar].

        anObj class isBits  ifFalse: [(1 to: anObj basicSize) do:
                        [:index |
                        indexVar <- anObj basicAt: index.
                        LexLogicVariable -- indexVar class ifTrue:
                                [anObj basicAt: index put:
                                (indexVar binding)].
                        self replaceLexLogicVars: indexVar.]].

!
setCopyEnv

        |counter lvArray|
        "set the copyEnv.  This need be done only  when the clause is
        established (or updated). All entries in the instance variables
        of head and tail are assumed to point to either constants, or
        logic variables.  The logic variables can point to other
        objects if they (the lv's)  are typed (i.e., they will be
        bound).  The target of these bound lv's can have lv's in them
        too.

        This routine will set the environIndex in each logic variable to
        the appropriate index in copyEnv, and set that element in copyEnv
        to a copy of the logic variable, with the same binding.  We
        assume that co-references are indicated by use of the same
        logic variable (i.e. oops match) in the common instance
        variables of the head and/or tail.  When we resolve this rule,
        we set up a new set of logic variables by (shallow) copying
        those in copyEnv, giving us a new environment for that
        invocation of the rule.  References to the new set of logic
        variables for that invocation go through the copied
        environment, via the environIndex field in the logic variable
        in the rule itself."

        "first, recursively nil all of the environIndex's in all of the logic
        variables. Count the number of (not necessarily unique) logic
        variables.  This count is an upper bound for the size of the
        environment array.  We live with the excess entries in copyEnv,
        but put the true number in actual environments set up by
        newEnv."

        counter <- 0.

        counter <- self nilAllEnvIndex: head counter: counter.
        tail isNil ifFalse: [tail do: [:each |
                counter <- self nilAllEnvIndex: each atom counter: counter]].

        "now, for each unique logic variable in the rule, set
        up an index in the copyEnv, and set that element to
        the logic variable"

        copyEnv <- Array new: counter. "counter is actually larger than
                        we need, possibly, but not too much so"

        safeLV <- Array new: counter withAll: true.  "LV's default to
                                safe"

        counter <- 0.
        counter <- self setCopyEnv: head counter: counter isHead: true
                        level: 0.
        tail isNil ifFalse: [tail do: [:each |
                counter <- self setCopyEnv: each atom counter: counter
                        isHead: false level: 0]].
        envSize <- counter.  "the true number of unique logic variables
                                in the clause"
        lvArray <- Array new: envSize.
        (1 to: envSize) do: [:each| lvArray at: each put: (copyEnv at: each).
                                (lvArray at: each) forClause: self.].
        copyEnv <- lvArray.


! Clause methodsFor: 'printing'

!
printOn: aStream
        |firstTime|

        firstTime <- true.

        head notNil ifTrue: [head printOn: aStream].
        aStream nextPutAll: ' <- '.
        tail isNil ifFalse: [tail do:[:each |
                firstTime ifTrue: [firstTime <- false]
                        ifFalse:[aStream nextPutAll: ', '].
                each atom printOn: aStream.
                ]]

!
shortPrintOn: aStream

        |firstTime|

        firstTime <- true.

        aStream nextPutAll: (self oopId printString).
        aStream nextPut: $:.
        head notNil ifTrue: [head shortPrintOn: aStream].
        aStream nextPutAll: ' <- '.
        tail isNil ifFalse: [tail do:[:each |
                firstTime ifTrue: [firstTime <- false]
                        ifFalse:[aStream nextPutAll: ', '].
                each atom shortPrintOn: aStream.
                ]]
```

```
! Clause methodsFor: 'private'

!
tail: aTail
	"This should not be called unless the the caller checks
	the tail for a cut, and updates hasCut appropriately"

	^ tail <- aTail.

!
nilAllEnvIndex: anObj counter: aCounter
		|myCounter|

	"recursively set envIndex to nil in all logicVariables in
	anObj. One could make the case that this code belongs in
	class Object, but this seems tacky. Besides, the routine
	after this one (setCopyEnv) clearly belongs in this class, and they
	are very similar and should be kept together"

	myCounter <- aCounter.
	LogicVariable -- anObj class
		ifTrue: [ anObj setEnvIndex: nil.
			myCounter <- myCounter + 1.
			anObj bound ifTrue:[
				myCounter <- self nilAllEnvIndex:
					anObj binding counter: myCounter]]

		ifFalse:[(1 to: (anObj class instSize)) do: [:index |
				myCounter <- self nilAllEnvIndex:
				(anObj instVarAt: index) counter: myCounter].

			anObj class isBits ifFalse:
				[(1 to: anObj basicSize)
				do: [:index | myCounter <- self
					nilAllEnvIndex: (anObj basicAt:
						index) counter: myCounter]]
			].
	^myCounter.

!
setCopyEnv: anObj counter: aCounter isHead: isLocal level: curLevel
		|myCounter newLV|

	"set the copyEnv to point to copies of all logic variables in the
	anObj, and set the envIndex in the logic variables to point to
	the correct index in envIndex. Note that multiple occurrences of
	the same logical variable have only one entry in envIndex. This
	assures that when we copy the copyEnv, our copy has the same
	co-references as the original set. Note that the copies of the
	logic variables in the anObj that were placed in the copyEnv
	will be bound to the same object that those in the anObj were
	bound to. This is the way that we share structure."

	myCounter <- aCounter.
	LogicVariable -- anObj class
		ifTrue: [anObj environIndex isNil ifTrue: [
				myCounter <- myCounter + 1.
				anObj setEnvIndex: myCounter.
				newLV <- copyEnv at: myCounter
					put: anObj shallowCopy.
				newLV setEnvIndex: nil.
				"logic variables in the head have
				newLV isLocal: isLocal.
				curLevel > 1 ifTrue: [safeLV at: myCounter
						put: false].
				]
			ifFalse: [curLevel > 1 ifTrue: [ safeLV at:
				(anObj environIndex) put: false]].

			anObj bound ifTrue:[
				myCounter <- self setCopyEnv:
				anObj binding counter: myCounter
					isHead: isLocal level: (curLevel+1)]]

		ifFalse:[(1 to: (anObj class instSize)) do: [:index |
				myCounter <- self setCopyEnv:
				(anObj instVarAt: index) counter: myCounter
					isHead: isLocal level: (curLevel+1)].

			anObj class isBits ifFalse:
				[(1 to: anObj basicSize) do: [:index |
					myCounter <- self setCopyEnv:
					(anObj basicAt: index) counter:
						myCounter isHead: isLocal
						curLevel: (curLevel+1)]]
			].
	^myCounter.

! Clause class methodsFor: 'creation'

!
new: aComment
	|newClause|

	newClause <- self new.
	newClause comment: aComment.
	^newClause.
!
new
	|newClause|

	newClause <- super new.
	newClause tail: (Stack new).
	newClause hasCut: false.
	newClause numberTailAtoms: 0.
	^newClause.
!
```

```
"Copyright 1988 Eastman Kod.k Company.  All rights reserved."
Class ClauseLink :Link|

        clause            "<Clause>"
        number            "<Integer> to tag clause within program"
        alfPgm            "<AlfProgram> that is including the
                          clause.  A backpointer"
        ruleArray          "<Array> of LinkedLists.  Each element
                          has a list of rules in the alfPgm that
                          have a head that could match with a
                          tail atom.  The seqNumber of the
                          tail atom is the index into this
                          array.  This data is cached when the
                          alfPgm is compiled, to save time
                          looking up the rules at query
                          processing time."

        |
!
"       poolDictionaries: ''"
"       category: 'Logic Programming'"

"ClauseLink comment: 'I am a link in a list of clauses (rules). "

! ClauseLink methodsFor: 'accessing'

!
clause
        ^clause

!
number
        ^number

!
alfPgm
        ^alfPgm
!
ruleArray
        ^ruleArray

! ClauseLink methodsFor: 'updating'

!
clause: aClause
        clause <- aClause.

!
number: aNumber
        number <- aNumber.

!
alfPgm: anAlfPgm
        alfPgm <- anAlfPgm.
!
ruleArray: anArray
        ruleArray <- anArray.

! ClauseLink class methodsFor: 'creating'

!
with: aClause number: aNumber inPgm: anAlfPgm

        |newLink |

        newLink <- self new.
        newLink clause: aClause.
        newLink number: aNumber.
        newLink alfPgm: anAlfPgm.
        ^newLink.
!
```

```
"Copyright 1988 Eastman Kodak Company.  All rights reserved."
Class ClauseList :LinkedList   |

        |
!
"       poolDictionaries: ''"
"       category: 'Logic Programming'"

"ClauseList comment: 'I am a list of clauses.'"

! ClauseList methodsFor: 'updating'

!
remove: aClause

        self isEmpty ifTrue: [^self].
        self do: [:each| each clause = aClause ifTrue: [self remove: each]].
!



"Copyright 1988 Eastman Kodak Company.  All rights reserved."
Class DoListAssign :Predicate   |
        list                    "<AlfList>"
        targObj                 "<Object>"
        compiler                "<AlfCompiler>"

        |
!
"       poolDictionaries: ''"
"       category: 'Logic Programming'"

"DoListAssign comment: 'I implement the predicate to assign instance
        variables of an object from a list of assignment statements,
        represented  as AlfTokens.  I am used in the AlfCompiler.'"

! DoListAssign methodsFor: 'updating'

!
list: aValue
        list <- aValue.

!
targObj: aValue
        targObj <- aValue.

!
compiler: aValue
        compiler <- aValue.

! DoListAssign class methodsFor: 'creation'

!
newWithList: aList withObj: anObj compiler: aComp
        |newDoListAssign|

        newDoListAssign <- self new.
        newDoListAssign list: aList.
        newDoListAssign targObj: anObj.
        newDoListAssign compiler: aComp.
        ^newDoListAssign.
!
```

"Copyright 1988 Eastman Kodak Company. All rights reserved."

```
Class GoalStack :Stack   |
        |

|
"       poolDictionaries: ''"
"       category: 'Logic Programming'"

"GoalStack comment: 'I represent a list of atoms to be proven"

! GoalStack methodsFor: 'accessing' .

|
emptyCheck
        (nil == firstLink) ifTrue: [self errorEmptyCollection].
                "This method re-coded here for efficiency"


! GoalStack methodsFor: 'updating'

|
popFreezing: aFreezePoint usingSeq: aSeqNo
        "Return the first link in the stack. We create a new link for
        the top of stack, in order to advance the stack of goals.
        A copy of the link is required (instead of just updating the
        link to point to the next atom) when the goalLink is at or
        beneath the aFreezePoint because, if we just updated the
        first link on the stack we would corrupt any choice points that
        may be pointing into the stack above this link. If we are above
        any ChoicePoint in the stack, we can avoid the copy."

                |oldTop newTop nextAtom thisAtom|

        oldTop <- self first.
        thisAtom <- oldTop nextAtomToProve.
        nextAtom <- thisAtom nextLink.
        nextAtom isNil ifTrue: ["we have processed all atoms
                                in this rule, and are ready to start
                                at the first atom of the next rule."

                                "If there are no more choice points
                                that use the environment for this
                                rule, we can trim this env, which
                                involves deleting all of the 'safe'
                                LV's"
                                ^self removeFirst].

        oldTop seqNo > aFreezePoint ifTrue: [
                ^oldTop nextAtomToProve: nextAtom].

        "We must preserve the old goal stack because we are below
        a CP. We start a new goal stack that shares the old one"

        newTop <- self removeFirst copy. "process next atom in current rule"
        newTop nextAtomToProve: nextAtom.
        newTop seqNo: aSeqNo.
        self addFirst: newTop.   "put new top on our stack"
        ^oldTop.

! GoalStack methodsFor: 'printing'

|
shortPrintOn: aStream
          |atomList|

          atomList <- Stack new.

          self do: [:eachGoal|
                  atomList firstLink: (eachGoal nextAtomToProve ).
                  atomList do: [:eachAtom| eachAtom atom shortPrintOn:
                                  aStream.
                          eachAtom nextLink isNil ifFalse: [
                                  aStream nextPutAll: ', ']
                          ].
                  aStream nextPutAll: ' E('.
                  aStream nextPutAll: (eachGoal env oopId printString).
                  aStream nextPutAll: '). '
                  ].
|
printOn: aStream
          |atomList|

          atomList <- Stack new.

          self do: [:eachGoal|
                  atomList firstLink: (eachGoal nextAtomToProve ).
                  atomList do: [:eachAtom| (eachAtom atom
                                  dereferenceCopyUsing: (eachGoal env))
                                  printOn: aStream.
                          eachAtom nextLink isNil ifFalse: [
                                  aStream nextPutAll: ', ']
                          ].
                  aStream nextPut: $. .
                  ].
|
```

```
"Copyright 1988 Eastman Kodak Company.  All rights reserved."
Class GoalStackLink :Link|

        nextAtomToProve                 "<AtomLink> next atom to prove.
                                        This is an atom in some tail of
                                        some clause.  When this becomes
                                        nil, the next goal to prove is
                                        that pointed to by the next
                                        link in this GoalStackLink.
                                        The list elements of nextAtomToProve
                                        are all in the tail of a single
                                        rule"
        env                             "<Array> This is the environment
                                        that was set up for this rule
                                        execution"
        cutPoint                        "<ChoicePoint>  If the
                                        nextAtomtoProve is Predicate
                                        Cut, eliminate all choices up to
                                        and including the one indicated
                                        by the cutPoint"
        ruleArray                       "<Array> This is from the ClauseLink
                                        that links the rule (whose tail
                                        is the nextAtomToProve) with
                                        the AlfProgram that it came
                                        from.  We can use the
                                        nextAtomToProve's seqNumber to
                                        index into this array, to get a
                                        ruleList that could match the
                                        nextAtomToProve."
        seqNo                           "<Integer> The links are numbered
                                        consecutively, starting with 1.
                                        As links are added to the stack,
                                        this number is incremented.  It
                                        is never reset during the query
                                        processing: it always increases.
                                        It is used to mark the freeze
                                        point it the stack."
          |
|
"       poolDictionaries: ''"
"       category: 'Logic Programming'"

"GoalStackLink comment: 'I am a link in a list of goals.  Each list
element points to a member of the tail of some rule whose head has
unified with a previous goal."

! GoalStackLink methodsFor: 'accessing'

!
nextAtomToProve
        ^nextAtomToProve

!
env
        ^env

!
cutPoint
        ^cutPoint

!
ruleArray
        ^ruleArray
!
seqNo
        ^seqNo

! GoalStackLink methodsFor: 'updating'

!
initWithRule: aRule
        nextAtomToProve <- aRule tail first.

!
env: anEnv
        env <- anEnv

!
nextAtomToProve: anAtom
        ^nextAtomToProve <- anAtom.

!
cutPoint: aCutPoint
        cutPoint <- aCutPoint

!
ruleArray: anArray
        ruleArray <- anArray.

!
seqNo: aSeqNo
        seqNo <- aSeqNo.

! GoalStackLink methodsFor: 'printing'

!
shortPrintOn: aStream
        nextAtomToProve shortPrintOn: aStream.

! GoalStackLink class methodsFor: 'creating'

!
withRule: aRule usingEnv: anEnv atSeq: aSeqNo
        |newLink |

        newLink <- self new.
        newLink initWithRule: aRule.
        newLink env: anEnv.
        newLink seqNo: aSeqNo.
        ^newLink.

!
```

```
"Copyright 1988 Eastman Kodak Company.  All rights reserved."
Class IsAtom :IsClause   |

          |
!
"       poolDictionaries: ''"
"       category: 'Logic Programming: compiler'"


"IsAtom comment: 'I implement rules for the Alf compiler to test
               for atoms'"

"Copyright 1988 Eastman Kodak Company.  All rights reserved."
Class IsClause :Predicate   |
               tokenList            "<AlfList> of tokens to be parsed
                                    into an object, from the text, via
                                    the alflexer"
               object               "<Object> that represents the
                                    tokenList"
               compiler             "<AlfCompiler> that is compiling
                                    the clause.  Used for error
                                    feedback."

          |
!
"       poolDictionaries: ''"
"       category: 'Logic Pr>gramming: compiler'"


"Clause comment: 'I impleme>t rules for the Alf compiler to test
               for a clause'"

! IsClause methodsFor: 'accessing'

!
object
        ^object.

!
compiler
        ^ compiler.

! IsClause methodsFor: 'updating'

!
tokenList: aTokenList
        tokenList <- aTokenList.


!
object: anObj
        object <- anObj.

!
compiler: aComp
        compiler <- aComp

!IsClause class methodsFor: 'creation'

!
newWith: aTokenList obj: anObj compiler: aComp
        |newObj|

        newObj <- super new.
        newObj tokenList: aTokenList.
        newObj object: anObj.
        newObj compiler: aComp.
        ^newObj.

!
```

```
"Copyright 1988 Eastman Kodak Company.  All rights reserved."
Class IsFact :IsClause   |

         |
[
"       poolDictionaries: ''"
"       category: 'Logic Programming: compiler'"


"Clause comment: 'I implement rules for the Alf compiler to test
                for a fact clause'"


]



"Copyright 1988 Eastman Kodak Company.  All rights reserved."

Class IsQuery :IsClause   |

         |
[
"       poolDictionaries: ''"
"       category: 'Logic Programming: compiler'"


"Clause comment: 'I implement rules for the Alf compiler to test
                for a query clause'"


]



"Copyright 1988 Eastman Kodak Company.  All rights reserved."
Class IsRule :IsClause   |

         |
[
"       poolDictionaries: ''"
"       category: 'Logic Programming: compiler'"


"Clause comment: 'I implement rules for the Alf compiler to test
                for a rule clause'"


]


"Copyright 1988 Eastman Kodak Company.  All rights reserved."
Class IsTerm :IsClause   |

         |
[
"       poolDictionaries: ''"
"       category: 'Logic Programming: compiler'"


"IsTerm comment: 'I implement rules for the Alf compiler to construct
                term values'"


]
```

```
"Copyright 1988 Eastman Kodak Company.  All rights reserved."
Class IsTermList :IsClause   |

         |
[
"       poolDictionaries: ''"
"       category: 'Logic Programming: compiler'"


"IsAtom comment: 'I implement rules for the Alf compiler to test
              for list of terms'"

|
```

"Copyright 1988 Eastman Kodak Company.  All rights reserved."

```
Class LexLogicVariable :Object|

        binding                 "<LogicVariable>"
        userName                "<String>"

          |
!
"       poolDictionaries: ''"
"       category: 'Logic Programming'"

"LexLogicVariable comment: 'This is used to output logic variables from
the AlfLexer.  It is somewhat difficult to manipulate logic variables
in the alf compiler, since they would normally be dereferenced, and
we wish to treat them purely as objects (not as variables) when we
output them from the lexer to the compiler.  The AlfLexer will bind
these LexLogicVariables to the appropriate LogicVariable, and we
will replace these LexLogicVariables with their bindings when the
compiled clause is initialized.'"

! LexLogicVariable methodsFor: 'accessing'

!
binding
        ^binding.

!
userName
        ^userName.

! LexLogicVariable methodsFor: 'updating'

!
binding: aBinding
        binding <- aBinding
!
userName: aName
        userName <- aName.
!
bindTo: aBinding withEnv: anEnv
        "We may assume that I am bound to a logicVariable, from
        the AlfLexer logic.  When the compiler sends me the message
        bindTo:, what we really do is bind my logicVariable to the
        thing to be bound to."

        binding bindTo: aBinding withEnv: anEnv


! LexLogicVariable class methodsFor: 'creating'

!
new: aName
        |newVar|

        newVar <- super new.
        newVar userName: aName.
        ^newVar.
```

"Copyright 1988 Eastman Kodak Company. All rights reserved."

```
Class LogicVariable :Object   |

        bound                   "<Boolean>"
        binding
        userName                "<String>"
        isLocal                 "<Boolean> true means that the LV does
                                not need to be unbound on backtracking"

        environIndex            "nil means this LogicVariable is not
                                resolved through the environment array,
                                but points directly to its binding.
                                notNil means that the LogicVariable must
                                be resolved through the logic variable in
                                the environIndex, in the environment.
                                This is the case when the logic variable
                                is in a rule, and we use copies of the
                                logic variables to do unification (one
                                environment set up for each invocation of
                                the rule."

        bindersEnv              "<Array>  If a logic variable points
                                to a term that itself has logic
                                variables in it, we use this to
                                resolve those logic variables.  This
                                is needed to trace back the
                                variables in the original query,
                                and when a logic variable in one
                                rule is bound to a term that contains
                                a logic variable from another rule:
                                E.G.
                                <- q(X).                env1
                                q(f(Z)) <- r(Z).        env2
                                r(a).
                                The query q(X) has X bound to the
                                term f(Z), using env1 and env2.
                                We then bind r(Z)/env2 to r(a).
                                The only way to get from the original
                                query to the answer is to place env2
                                in logic variable X, so that it can
                                be used to dereference f(Z)/env2.
                                For environment logicVariables (i.e.
                                those with environIndex not nil), we
                                are assured that the bindersEnv is
                                always nil (that is the way they were
                                set up when the clause was created)."
        forClause               "<Clause> or nil.  The clause that
                                generated this, if any.  A backpointer
                                for debugging. "

            |
!
"       poolDictionaries: ''"
"       category: 'Logic Programming'"

"LogicVariable comment: 'A logic variable is used as the value of
an instance variable, to proclaim it to be a variable. When bound is
true, binding points to the object that is the current value of the
logic variable (this may also be a logic variable).  This class
should not be subclassed, since for efficiency, we often test using
X isMemberOf: LogicVariable, which is true only if x is of class
LogicVariable.'"

"Summary of how logic variables are used and bound:

1.      If the variable is in a clause, we go through the environIndex.
        A new environment (an array of logicVariables) is established
        every time we execute the clause, and the variable in the clause
        itself is used only to get the 'real' variable in the current
        environment, via the environIndex.  Thus these 'environment
        variables' are never bound to anything, in the sense that
        binding is always nil.

2,      See class Clause for more documentation on environments.

3.      It should be noted that whenever a logic variable X is bound to
        another logic variable Y, Y can not be an environment logic
        variable.  The reason is that we always 'dereference' logic
        variables before binding them to another one.  Thus if Y is
        unified with another logic variable (X), and X is an
        environment variable, we will dereference X to its 'non
        environment variable', Z, and bind Y to Z which is not an
        environment variable (Z is a member of the environment array,
        and has environIndex set to nil).  Note that in our example, Z
        could itself be a term that contains environment logic
        variables, resolved by a different env: the bindersEnv which
        will be found in Y.

4.      When a logic variable is unified with another term, we are
        passed the 2 environments: one for the logic variable (lv) and one
        for the term (t1).  If our term is not itself a logic variable,
        but contains logicVariables, the term environment is necessary
        for further unification if any.  In order to be able to access
        the terms environment upon subsequent unifications, we place
        the terms environment in our lv's 'bindersEnv'.  Then when
        unifying a new term (T) against our lv, we dereference our lv,
        but then unify t1 against T using as an environment for t1,
        the bindersEnv stored in lv.

5.      Thus, in general, when attempting the recursive unification
        algorithm, logic variables are dereferenced either through
        their environIndex (first priority), or their binding.
        If they are bound, the environment to use for what they
        are bound to is found in the logic variables 'bindersEnv',
        the latter having meaning only for bound lv's, else it
        is nil.

6.      Local vs. Global logic variables.  Logic variables in
        environments can sometimes be replaced in their home env
        instead of bound to a term they are unifying with.  The
        reason is that they need never be undone on backtracking and
        they are not being bound to terms that contain logic variables
        from another environment (these latter would pose a problem,
        since there is no place to store the bindersEnv if we just
        replace the env slot with the term we are unifying with.  Class
        Clause sets isLocal to true in the LVs that are in the head of
        the clause.  When unifying with an env LV that has a local LV
        in its env slot, we just replace the slot value with the term we
        are trying to bind to, provided we are not binding to a term
        that contains an environment LV, nor one that itself has
        a local LV somewhere in it.

        The following 2 cases are good to keep in mind:  case 1:

                <- A(X:)                        /env)
```

```
        A(F(Y:)) <- B(Y:)                  /env2
        B(a)
        B(c)

case 2:
        <- A(F(X:))                        /env1
        A(Y:) <- B(Y:)                     /env2
```

In case 1, if we bind X: to F(Y:), and then Y: to a (by replacing the slot in env2 with a), we will not be able to backtrack to pick up c, since we will have altered what Y: points to (a) permanently by changing the env slot that Y: points to. In case 2, if we bind Y: to F(X:) by replacing the env slot in env2 with F(X:), we will not be able to dereference this slot, since it is pointing to an env LV (X:, in F(X:), which belongs to a different env (env1). Note that we handle this latter case with our bindersEnv, which would be stored in LV Y:, along with its binding (F(X:)). If we avoid these cases, however, we can often just replace the env slot with the term we are trying to bind to, which saves storage and execution time. Such LV's are called 'local', and the others are called 'global' in the literature.

To simplify our processing, we will over-write an environment slot only with LV's (which can be bound), not with general terms. If the LV is bound, it will contain the bindersEnv, which will handle case 2. In the resolution processing (class AlfQuery) after the head unifies, we will mark all variables as global. This will prevent goals in the tail from having their env slots over-written. This handles case 1.

A future improvement would be to detect when terms (other than LV's) do not contain env LV's, and hence can be used to over-write env slots (generalizing case 2). This is somewhat complicated in that progams are assuming that dereferenceWithEnv: always returns an LV that is not an env LV (but it could now return an env LV). These programs get at the binding of the dereferenced LV by just accessing the the binding slot (this is not appropriate if the LV is an env LV, since the binding is really contained in the env slot pointed to by environIndex).

```
! LogicVariable methodsFor: 'testing'

!
isLogicVariable
        ^ true.

! LogicVariable methodsFor: 'de-referencing'

!
dereference: anEnviron

        "Return the de-reference of the binding, which we define as
        the first binding that is a logic variable that is not bound to
        another logic variable.

        Note that variables are bound together by being in a list
                X->Y->Z->Q

        If we are to bind X to something, it is important to follow
        the chain to the end, so that all variables that X is bound to
        are also bound to the new value of X.  Thus we would bind
        Q to the new value, so that X, Y, Z, Q all are bound to the
        new value."

        "primitive 1 (class) used as message send for efficiency"

        environIndex isNil ifFalse:[^ (anEnviron at: environIndex)
                                        dereference: anEnviron].

        bound ifTrue: [ (LogicVariable -- <primitive 1 binding >) ifTrue:
                                        [^ binding dereference:bindersEnv]].
        ^ self.

!
dereferenceCopyUsingEnv: anEnv checking: copies
        |envToUse myCopy |

         "The purpose of this method is to override the corresponding one
         in class Object, in order to build up an object that is the
         same as self, except that logic variables are replaced by
         their values.  Note that the original object is a copy of the
         original."

        "If our lv  has no environment because there is no resolution in
         process, we just return the lv itself.  This happens when
         we are using the lv itself as an object, not as a variable
         standing for some other object."

        "We do not check for circularities in the LV bindings
        themselves, and we count on class object to check if
        the dereferenced object has been put out already."

        environIndex notNil ifTrue: [anEnv isNil ifTrue: [myCopy <- self ]].
        myCopy ifNil: [myCopy <- self dereference: anEnv].

        myCopy bound ifTrue:
                [myCopy <- myCopy binding dereferenceCopyUsingEnv:
                        (myCopy bindersEnv) checking: copies].

        ^myCopy.

! LogicVariable methodsFor: 'unification'

!
unifyUsingEnv:myEnv  withTerm: aTerm usingEnv: termEnv trailing: aTrail
        "If self unifies with aTerm, bind the variables that accomplish
        the unification, and return the binding list that
        undoes the binding.  Else, undo all bindings made in the
        attempt to unify, and return #fail."

        "The following algorithm is PSI unification [Hassan Ait-Kaci and
        Roger Nasr, MCC tech rept AI-082-85], as simplified for a type
        lattice with single inheritance.  Basically, logic variables
        can be typed (represented on ALF by being bound to an object).
        All structures that contain variables are assumed to really be
        the type of (another, possibly anonymous) logic variable.
```

```
Thus the term
    *  Animal(name-X, age-32, ...)
is really taken to be a typed logic variable:
        Z:Animal(name-X, age-32, ...).

Two logic variables can unify if they are type compatible.
I.e. one is a subclass of the other.  A typed logic variable can
unify with a constant term if the type of the logic variable is
a superclass of the class of the constant term.

E.g.  assume Mammal is a subclass of Animal.
        X:Animal(name-Y, age-32,...)
unifies with (the constant)
        Mammal(name-'herman', age-32,...)
by binding X to Mammal(name-'herman', age-32,...), and Y to 'herman'.

Similarly,
        X:Animal(name-Y, age-32,...)
unifies with
        Z:Mammal(name-'herman', age-W,...)
by binding X to Mammal(name-'herman, age-W, ...), Y to 'herman',
and W to 32.
"

        |selfDeref termDeref aTermBinding
        unifyAns oldBinding
        myEnvToUse termEnvToUse myBinding termIndex termClass
        selfIsLocal termIsLocal myBindingClass termBindingClass
        bindingEnvOfTerm trailReset |

"Note: primitive 7 (==) and primitive 1 (class) used instead
of message sends, for efficiency"

selfIsLocal <- false.
termIsLocal <- false.
bindingEnvOfTerm <- termEnv.
selfDeref <- self dereference: myEnv.
trailReset <- aTrail first.
environIndex isNil ifFalse:[
        selfDeref isLocal ifTrue: [selfIsLocal <- true]].

LogicVariable == <primitive 1 aTerm >
        ifTrue:[termDeref <- aTerm dereference: termEnv.
                selfIsLocal ifTrue: [selfDeref bound ifFalse:
                                [myEnv at: environIndex
                                put: termDeref.
                                ^nil.]].

                termDeref bound ifTrue: [aTermBinding <- termDeref
                                binding]
                                ifFalse: [aTermBinding <- termDeref].
                termEnvToUse <- termDeref bindersEnv.
                termEnvToUse ifNil: [termEnvToUse <- termEnv].
                termDeref bound ifTrue:[ bindingEnvOfTerm <-
                                        termEnvToUse]
                                ifFalse: [bindingEnvOfTerm <- nil].
                termIndex <- aTerm environIndex.
                termIndex isNil ifFalse:[ termDeref isLocal
                        ifTrue: [termIsLocal <- true]]]

        ifFalse:[termDeref <- aTerm.
                aTermBinding <- aTerm.
                termEnvToUse <- termEnv].
```

```
myEnvToUse <- selfDeref bindersEnv.
myEnvToUse ifNil: [myEnvToUse <- myEnv].
myBinding <- selfDeref binding.

termIsLocal ifTrue: [termDeref bound ifFalse: [
        termEnv at: (aTerm environIndex) put: selfDeref.
        ^nil]].

"Unification of an unbound logicVariable (=self) with any term
justs binds self to the term. The algorithm must not bind
a LogicVariable to itself, which could happen as in unifying
problem(XX,XX) with problem(YY,YY):  the first occurrence of
XX gets bound to YY.  The second occurrence of XX will be
dereferenced to YY, and will attempt to unify with itself.
Note that we do not do the occurs check."

<primitive 7 selfDeref termDeref> ifTrue: [^nil].
selfDeref bound ifFalse: [selfIsLocal ifTrue:[
                selfDeref bindTo: termDeref withEnv: bindingEnvOfTerm.
                ^nil].

        oldBinding <- Binding saveState: selfDeref.
        selfDeref bindTo: termDeref withEnv: bindingEnvOfTerm.
        ^ aTrail addFirst: oldBinding].


"Handle common case with variable typed same as term"
myBindingClass <- <primitive 1 myBinding>.
termBindingClass <- <primitive 1 aTermBinding>.

<primitive 7 myBindingClass termBindingClass> ifTrue:
        [^myBinding unifyUsingEnv: myEnvToUse
                instVarsWith: aTermBinding usingEnv:termEnvToUse
                trailing: aTrail].

termClass <- <primitive 1 aTerm>.

"This Psi unification needs a lot of work"
LogicVariable == termClass
        ifTrue: [ termDeref bound ifFalse:
                        [oldBinding <- Binding saveState: termDeref.
                        termDeref bindTo: selfDeref binding
                                withEnv: myEnvToUse.
                        ^aTrail addFirst: oldBinding].

                (termDeref binding inSuperChain:
                        (selfDeref binding class))
                        ifTrue: ["self is higher in
                                hierarchy than aTerm.  Bind
                                self to aTerm, then unify
                                all instance variables in
                                self to those in aTerm"

                                oldBinding <- selfDeref binding.

                                aTrail addFirst:(
                                        Binding saveState:
                                        selfDeref).

                                selfDeref bindTo: termDeref binding
                                        withEnv: termEnvToUse.

                                unifyAns <- oldBinding
                                        unifyUsingEnv:myEnvToUse
```

```
                    instVarsWith:
                    termDeref binding
                    usingEnv: termEnvToUse
                    trailing: aTrail.

                unifyAns = #fail ifTrue: [aTrail
                    reSetTo: trailReset.
                    ^#fail].
                ^nil.
                ].

        [selfDeref binding inSuperChain:
            (termDeref binding class)]
            ifTrue:[
                oldBinding <- termDeref binding.

                aTrail addFirst:(
                    Binding saveState:
                        termDeref).

                termDeref bindTo: selfDeref
                        binding withEnv:
                        myEnvToUse.

                unifyAns <- oldBinding
                    unifyUsingEnv: termEnvToUse
                    instVarsWith: selfDeref binding
                    usingEnv: myEnvToUse
                    trailing: aTrail.

                unifyAns = #fail ifTrue: [aTrail
                    reSetTo: trailReset.
                    ^#fail].
                ^nil.
                ].

        ^#fail. "no relationship between classes of self
            and aTerm"
        ].

"The logicVariable is already bound to anObject, and aTerm is not
a logicVariable. "

(aTerm inSuperChain: (selfDeref binding class))
    ifTrue: ["self is higher in
        hierarchy than aTerm.  It can unify if instance
        variables can unify"

        aTrail addFirst: (Binding saveState: selfDeref).

        oldBinding <- selfDeref binding.
        selfDeref bindTo: aTerm withEnv: termEnvToUse.

        unifyAns <- oldBinding unifyUsingEnv:myEnvToUse
            instVarsWith: aTerm usingEnv:termEnvToUse
            trailing: aTrail.

        unifyAns = #fail ifTrue: [aTrail reSetTo: trailReset.
            ^#fail].
        ^nil.
        ].

"The LogicVariable (self) is bound, aTerm is not a logic
variable, and the binding of self is not type compatible with the
        term"

        ^#fail.

! LogicVariable methodsFor: 'accessing'

!
bound
        ^bound.

!
binding
        ^binding.

!
environIndex
        ^environIndex.

!
userName
        ^userName.

!
bindersEnv
        ^bindersEnv.
!
isLocal
        ^isLocal

! LogicVariable methodsFor: 'updating'

!
bindTo: aBinding withEnv: aBindersEnv
        binding <- aBinding.
        bound <- true.
        bindersEnv <- aBindersEnv.

!
unBind
        bound <- false.
        binding <- nil.
        bindersEnv <- nil.

!
setName: aName
        userName <- aName.

!
setEnvIndex: anIndex
        environIndex <- anIndex

!
reSet: aBinding  bound: oldBound
        binding <- aBinding.
        bound <- oldBound.
        bound ifFalse: [bindersEnv <- nil].

!
bound: aBound
        bound <- aBound.
!
binding: aBinding
        binding <- aBinding.
```

```
!
bindersEnv: anEnv
        bindersEnv <- anEnv.

!
isLocal: aBool
        isLocal <- aBool.

!
forClause: aClause
        forClause <- aClause

! LogicVariable methodsFor: 'printing'

!
printOn: aStream
        bound ifTrue:[aStream nextPutAll: (userName, '=').
                (binding dereferenceCopyUsingEnv: bindersEnv) printOn:
                aStream.
                ^nil].
        aStream nextPutAll: userName.
        ^nil.


! LogicVariable class methodsFor: 'creating'

!
new: aName
        |newVar|

        newVar <- super new.
        newVar unBind.
        newVar setName: aName.
        newVar isLocal: false.
        ^newVar.

!
new
        ^self new: '__:'.  "anonymous logic variable"
!
```

```
"Copyright 1988 Eastman Kodak Company.  All rights reserved."
Class Predicate :Object   |

         |
!
"       poolDictionaries: ''"
"       category: 'Logic Programming'"


"Predicate comment: 'I implement logical predicates.  My instance
        variables are arguments to the predicate'"



! Predicate methodsFor: 'testing'

!
isPredicate
        ^ true.

! Predicate methodsFor: 'unification'

!
unifyUsingEnv: myEnv withPredicate: ruleHead usingEnv: predEnv
                        trailing: aTrail fromQuery: anAlfQuery

        |answer|

        "There is no type compatibility between Predicates, as there
        are for terms.  For two atoms to match, the predicate symbols
        must be identical, and each argument must unify.
        We assume we are called with the receiver (self) is an atom
        to prove, and the ruleHead is the head of some rule."

        " following audit should never fail

        self class -- ruleHead class ifFalse: [^#fail].
        "

        ^self unifyUsingEnv: myEnv instVarsWith: ruleHead usingEnv: predEnv
                trailing: aTrail.

! Predicate methodsFor: 'printing'

!
printOn: aStream
        |instObj bound|

        bound <- self class instSize.
        aStream nextPutAll:(self class name, '(').
        (1 to: bound) do: [:index |
                aStream nextPutAll: (self instVarName: index), '='.
                instObj <- self instVarAt: index.
                instObj printOn:aStream.
                index = bound ifFalse: [aStream nextPutAll: ', ']
                ].
        aStream nextPut: $).

!
shortPrintOn: aStream

        aStream nextPutAll: (self class name).
        aStream nextPut: $(.
        aStream nextPutAll: (self oopId printString).
        aStream nextPut: $).

!
```

```
"Copyright 1988 Eastman Kodak Company.  All rights reserved."
Class Stack :SequenceableCollection
        | firstLink |
!
        "poolDictionaries: ''"
        "category: 'Collections-Sequenceable'"

"Stack comment: 'I implement ordered collections using a chain of
elements.  I can be initialized using Stack with: Link new.
For efficiency, we have eliminated the empty check:  it is up to the
user to check for empty stack before accessing first element''"


! Stack methodsFor: 'accessing'

!
first
        ^firstLink

!
size
        "Answer how many elements the receiver contains."
        | tally |
        tally <- 0.
        self do: [:each | tally <- tally + 1].
        ^tally


! Stack methodsFor: 'testing''

!
isEmpty
        ^nil == firstLink


! Stack methodsFor: 'updati.g'

!
firstLink: aLink
        firstLink <- aLink.

! Stack methodsFor: 'adding'


!
addFirst: aLink
        "Add aLink to the beginning of the receiver's list."

        aLink nextLink: firstLink.
        firstLink <- aLink.
        ^aLink


!
addLast: aLink
        " add a link to the tail of this stack (rarely done)"
        |lastLink|

        firstLink ifNil: [firstLink <- aLink. ^self].

        lastLink <- firstLink.
        [lastLink nextLink notNil] whileTrue: [lastLink <- lastLink nextLink].
        lastLink nextLink: aLink

! Stack methodsFor: 'removing'


!
removeFirst
        "Remove the first element.
        Answer the removed element."
        | oldLink |
        oldLink <- firstLink.
        firstLink <- oldLink nextLink.
        ^oldLink


!
empty
        firstLink <- nil.


! Stack methodsFor: 'enumerating'

!
do: aBlock
        | aLink |
        aLink <- firstLink.
        [nil == aLink] whileFalse:
                [aBlock value: aLink.
                 aLink <- aLink nextLink]

! Stack class methodsFor: 'creating'

!
with: aLink
        |newStack|

        newStack <- super new.
        newStack firstLink: aLink.
        ^newStack.
!
```

"Copyright 1988 Eastman Kodak Company. All rights reserved."

```
Class Trail :Stack   |
          |
|
"       poolDictionaries: ''"
"       category: 'Logic Programming'"

"Trail comment: 'I am a list of the previous bindings of logic
variables that have become bound to something else. "

! Trail methodsFor: 'updating'

|
reSetTo: aLink
        "Reset each logic variable in the list to an unbound state "

        [true] whileTrue: [self first == aLink ifTrue: [^self].
                    self removeFirst reSet].
|
```

We claim:

1. A program tool, comprising a. a workstation having an operator interface, a mass memory, a CPU, and main memory;

b. an object oriented programming language system including, (1) an object oriented programming language, and (2) object oriented language compiler means for translating source code written in the object oriented programming language into objects and interpreter code;

c. a logic programming language system, having components representing terms, clauses, predicates, atoms, and variables, including, (1) a logic programming language, and (2) logic compiler means for translating source code written in the logic programming language into objects;

d. a database residing in said mass memory, for storing objects and components of a logic programming language as objects in a common data structure format, applications data, and applications stored as compiled interpreter code;

e. object database management for representing objects and components of a logic program in said common data structure format as objects, and responsive to calls for retrieving and storing such objects in said database, and for automatically deleting objects from said data base when they become obsolete;

f. interpreter means for executing said interpreter code and generating calls to said database management means; and g. logic subsystem means for solving logic queries, said logic subsystem means treating any object as a term in the logic programming language.

2. The programming tool claimed in claim 1, wherein said object oriented programming language system includes means for calling subroutines written in another language and treating the call as an object.

3. The programming tool claimed in claim 1 or 2, wherein said logic programming language system includes means for processing attribute labels in a manner such that the attribute labels are taken as identical to object attribute names in the object programming language.

4. The programming tool claimed in claim 3, wherein said object oriented language compiler means comprises:

a. first phase means for performing compilation including parsing, optimization, and interpreter code generation;

b. second phase means in communication with said first phase means for resolving global symbols and loading the database with objects and interpreter code; and c. an assembler-like intermediate language for communication between said first and second phase means.

5. The programming tool claimed in claim 3, wherein said object-oriented programming language system includes a language that is a dialect of Smalltalk (Alltalk), and means for treating primitive invocations as objects; and wherein said logic programming language system includes a language that is an extension of Prolog (ALF), and means for treating attribute labels as identical to instance variable names, and means for typing logic variables using objects.

6. The programming tool claimed in claim 5, wherein said interpreter code comprises a plurality of types of bytecodes, and said interpreter includes a plurality of bytecode handler means, one such means for processing each type of bytecode.

7. The programming tool claimed in claim 6, wherein said bytecode types comprise:

execute a primitive, send a message, define a block, evaluate a block, return from a block or method, branch, and assign from one variable to another.

8. The programming tool claimed in claim 7, wherein said interpreter means includes means for maintaining blocks as C data structures, and for making blocks into objects when blocks are assigned to instance variables, or returned as the result of a message.

9. The programming tool claimed in claim 8, wherein said interpreter means includes means for maintaining contexts as C data structures, and for making blocks into objects if and when an associated block is made into an object.

10. The programming tool claimed in claim 9, wherein the bytecode handler means for the "define a block" type bytecode generates block stubs, and wherein said interpreter means creates active context(s) for a block stub, stored separately from said block stub, and wherein said active contexts associated with block stubs obey a stack discipline.

11. The programming tool claimed in claim 10, wherein said interpreter means maintains running data structures for object-oriented processes in an array, each element in the array representing one process, each element containing a stack of active contexts, a pointer to the current context in the stack, an array of block stubs, and a pointer to the next available block stub.

12. The programming tool claimed in claim 11, wherein said interpreter means manages processes by creating processes, switching processes, destroying processes, and performing optimizations on processes.

13. The programming tool claimed in claim 12, wherein said interpreter means performs optimization on processes by message flattening.

14. The programming tool claimed in claim 12, wherein said interpreter means performs optimizations on processes by treating each primitive as its own bytecode.

15. The programming tool claimed in claim 5, wherein said logic programming language includes a set of built in predicates SEND N and including means for sendng messages between the logic programming language system and the object-oriented programming system by employing said predicates SEND N.

16. The programming tool claimed in claim 15, wherein said set of built-in predicates take arguments "receiver", "answer", "selector", and n additional arguments; wherein "receiver" is the receiver of the message to be sent, "answer" is the object returned from the message, and "selector" is that of the message send, and n remaining arguments are arguments to the message send itself.

17. The programming tool claimed in claim 5, wherein all clauses in the logic programming language are represented as instances of class "Clause", and are rules, facts and queries, and wherein included in the instance variables of class "Clause" are "head" and "tail"; if "head" is nil, the clause is a query, if "tail" is nil, the clause is a fact; "head" is of class "Predicate", or a sub-class thereof, "tail" is of class "LinkedList" whose links are of class "Predicate", or a sub-class thereof; and wherein values of the instance variables of the "head" and "tail links" can be arbitrary objects.

18. The programming tool claimed in claim 3, wherein said database management means includes:

a. object manager means employed by the object oriented language compiler, the interpreter means, primitives, and utilities for providing access to objects in the object database and for mainatining the orginization of objects in the database;

b. method fetcher means for calling the object manager means to fetch methods for the interpreter;

c. access manager means for managing access to the database, and being called by, (1) a buffer manager for retrieving objects from the database, (2) a transaction manager for adding/updating objects in the object database at commit points, and (3) the object manager for providing higher level interface of the database;

d. buffer manager means for, (1) generating calls to the access manager means when called by the object manager means, and (2) keeping an in-memory copy of objects when called by the pool manager means;

e. pool manager means for maintaining memory for buffers; and f. garbage collector means integrated with said object manager means and said interpreter means for identifying objects in main memory that are no longer reachable.

19. The programming tool claimed in claim 18, wherein said garbage collector means includes means for defining numbered regions for garbage collection, such that when a context is created, it is assigned a region number, each object created or accessed being assigned the region number of the context that created or accessed it, unless it was previously associated with a lower number; and when an object is returned from a called method to the calling method, the object being moved to the region of the calling method, and when a reference is made from a first object to a second object in another region, the second object being moved to the region of the first object, and when returning from a method, if the context to which it is returning belongs to a region whose number is at least two lower than that of the current region, then the said garbage collector means collects garbage in the regions with the higher numbers than that of the context to which return is being made.

20. The programming tool claimed in claim 19, wherein said garbage collector means includes region cleaning means for detecting when a region has accumulated an excessive number of objects and cleanng the region thus detected.

21. The programming tool claimed in claim 19, wherein said garbage collector means includes means for detecting when objects are shared across processes and for insuring that no object is discarded that is in use by another process.

22. The programming tool claimed in claim 19, wherein said garbage collector means includes an off-line mark/sweep collector means for periodically removing objects from the object database that have become unreachable by any other object in the database, by first marking all objects in the database that can be reached, and then sweeping the database to remove unmarked objects.

23. The programming tool claimed in claim 22, wherein said object database contains constants that are permanently marked such that they cannot be removed by said off-line mark/sweep collector means.

24. The programming tool claimed in claim 3, wherein said logic subsystem means performs unification of logic variables to answer logic queries, and in doing so, takes into account the typing of the logic variables to enable constraint of permissible values of logic variables.

25. The programming tool claimed in claim 3, further comprising debugger means for providing debugging functions comprising setting break points, stepping through program execution, tracing information (e.g. messages, blocks, bytecodes, processes), and displaying values of data structures, said debugger means being integrated with said interpreter means and including a set of C routines for performing tasks associated with the debugger commands, code within the interpreter, and a set of global variables and constants used to communicate between the C routines and the code in the interpreter.

26. The programming tool claimed in claim 3, wherein said object database comprises a key file and a prime file, the prime file having records of variable length containing objects, and the key file having records of fixed length containing the address and record length of objects in the prime file.

27. The programming tool claimed in claim 26, wherein objects in the prime file can be one of 6 types, including:

normal objects, a symbol cross reference record that contains a string for a symbol and associated object identification of a symbol object, a dictionary cross reference, a control record, a checkpoint integrity record, and logically deleted objects.

28. In a heap based programming language system, having garbage collector means for removing objects from memory that are no longer reachable by the system, and improved garbage collector means, wherein the improvement comprises: means for defining numbered regions for garbage collection, such that when a context (representing the state of a method which is executing in the system) is created, it is assigned a region number, when an object is created or accessed by a method it is assigned the region number of the on context of the method that created or accessed it, unless the object was previously assigned a lower number; means for moving an object to the region of a calling method when an object is returned from a called method to the calling method, means for moving a second object to the region of a first object when reference is made from the first object to the second object assigned to another region and wherein said garbage collector means collects garbage when returning from a method, if the context to which it is returning belongs to a number at least two lower than the current region number before returning; the regions with the higher number than that of the context to which it is returning being collected (i.e. the objects in the regions are discarded).

29. The improvement claimed in claim 28 wherein; said garbage collector means includes region cleaning means for detecting when a region has accumulated an excessive number of objects, and cleaning the regions thus detected.

30. The improvement claimed in claim 28 wherein said garbage collector means includes means for detecting when objects are shared across processes for ensuring that no object is collected that is in use by another process.

31. The improvement claimed in claim 28, wherein said system further comprises an object database and wherein said garbage collector means includes off-line mark/sweep collector means for periodically removing objects from the database that have become unreachable by any other object in the database, by first marking all objects in the database that can be reached, and then sweeping the database to remove unmarked objects.

32. The improvement claimed in claim 31 wherein said object database contains constants that are permanently marked, and said off-line mark/sweep collector means includes means for recognizing said marks and preventing removal of said constants by said collector means from said database.

33. The improvement claimed in claims 28, 29, 30, 31, or 32, wherein said system further comprises an in-use table containing a list of objects that must be kept in-memory, said table including a field designating each object's region.

* * * * *